US006468688B2

(12) United States Patent
Kazacos et al.

(10) Patent No.: US 6,468,688 B2
(45) Date of Patent: *Oct. 22, 2002

(54) HIGH ENERGY DENSITY VANADIUM ELECTROLYTE SOLUTIONS, METHODS OF PREPARATION THEREOF AND ALL-VANADIUM REDOX CELLS AND BATTERIES CONTAINING HIGH ENERGY VANADIUM ELECTROLYTE SOLUTIONS

(75) Inventors: Michael Kazacos; Maria Skyllas Kazacos, both of Sylvania Heights (AU)

(73) Assignee: Pinnacle VRB Limited, Armadale (AU)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,869
(22) PCT Filed: May 3, 1996
(86) PCT No.: PCT/AU96/00268
§ 371 (c)(1),
(2), (4) Date: Feb. 24, 1998
(87) PCT Pub. No.: WO96/35239
PCT Pub. Date: Nov. 7, 1996

(65) Prior Publication Data
US 2001/0028977 A1 Oct. 11, 2001

(30) Foreign Application Priority Data
May 3, 1995 (AU) .............................................. PN2747
Jul. 25, 1995 (AU) .............................................. PN4394

(51) Int. Cl.⁷ .............................................. H01M 4/36
(52) U.S. Cl. ........................ 429/101; 429/129; 429/247
(58) Field of Search .................................. 429/101, 129, 429/247

(56) References Cited
U.S. PATENT DOCUMENTS
3,279,949 A    10/1966   Schaefer et al. .............. 136/80
(List continued on next page.)

FOREIGN PATENT DOCUMENTS
AU    55562/86    8/1987
(List continued on next page.)

OTHER PUBLICATIONS
Liu, Galasco and Savinell, *U.K.J.of Electrochem. Soc.* (1981) 128: (8) 1755–1757.
(List continued on next page.)

*Primary Examiner*—Laura Weiner
(74) *Attorney, Agent, or Firm*—Morgan & Finnegan, LLP

(57) ABSTRACT

Disclosed is a method for preparing a high energy density (HED) electrolyte solution for use in an all-vanadium redox cells, a high energy density electrolyte solution, in particular an all-vanadium high energy density electrolyte solution, a redox cell, in particular an all-vanadium redox cell, comprising the high energy density electrolyte solution, a redox battery, in particular an all-vanadium redox battery, comprising the HED electrolyte solution, a process for recharging a discharged or partially discharged redox battery, in particular an all-vanadium redox battery, comprising the HED electrolyte solution, a process for the production of electricity from a charged redox battery, and in particular a charged all-vanadium redox battery, comprising the HED electrolyte, a redox battery/fuel cell and a process for the production of electricity from a redox battery/fuel cell. A method for stabilising an electrolyte solution for use in a redox cell, in particular for stabilising an electrolyte solution for use in an all-vanadium redox cell, a stabilised electrolyte solution, in particular an all-vanadium stabilised electrolyte solution, a redox cell, in particular an all-vanadium redox cell, comprising the stabilised electrolyte solution, a redox battery, in particular an all-vanadium redox battery comprising the stabilised electrolyte solution, a process for recharging a discharged or partially discharged redox battery, in particular an all-vanadium redox battery, comprising the stabilised electrolyte solution, and a process for the production of electricity from a charged redox battery, and in particular a charged all-vanadium redox battery, comprising the stabilised electrolyte solution are disclosed. Also disclosed are a redox battery/fuel cell and a process for the production of electricity from a redox battery/fuel cell.

27 Claims, 30 Drawing Sheets

U.S. PATENT DOCUMENTS

| | | | |
|---|---|---|---|
| 4,018,508 A | 4/1977 | McDermott et al. | 350/160 R |
| 4,410,606 A | 10/1983 | Loufy et al. | 429/17 |

FOREIGN PATENT DOCUMENTS

| | | |
|---|---|---|
| AU | 85862/91 | 4/1992 |
| EP | 0 517 217 A1 | 4/1992 |
| EP | 566019 | 10/1993 |
| FR | 2034755 | 12/1970 |
| GB | 2113208 | 8/1983 |
| JP | 54138502 A | 10/1979 |
| JP | 56042970 | 4/1981 |
| JP | 57009072 | 1/1982 |
| JP | 57009073 | 1/1982 |
| WO | PCT/AU88/00471 | 6/1989 |
| WO | WO 89/05363 | 6/1989 |
| WO | WO 89/05528 | 6/1989 |
| WO | PCT/AU94/00711 | 5/1995 |

OTHER PUBLICATIONS

Chen et al., *J. of Electrochem, Soc. Energy Storage* (128) 1460–1467.

Chen et al. *J. of Electrochemn. Soc.* (1982) 129(1): 61–66.

Murthy et al. *J. of Power Sources* (1989) 27(2): 119–126.

Kazacos et al. *J. of Applied Electrochem* (1990) 20: 463–467.

6001 Chem. Abst. (1989) No. 22, 111:198495s.

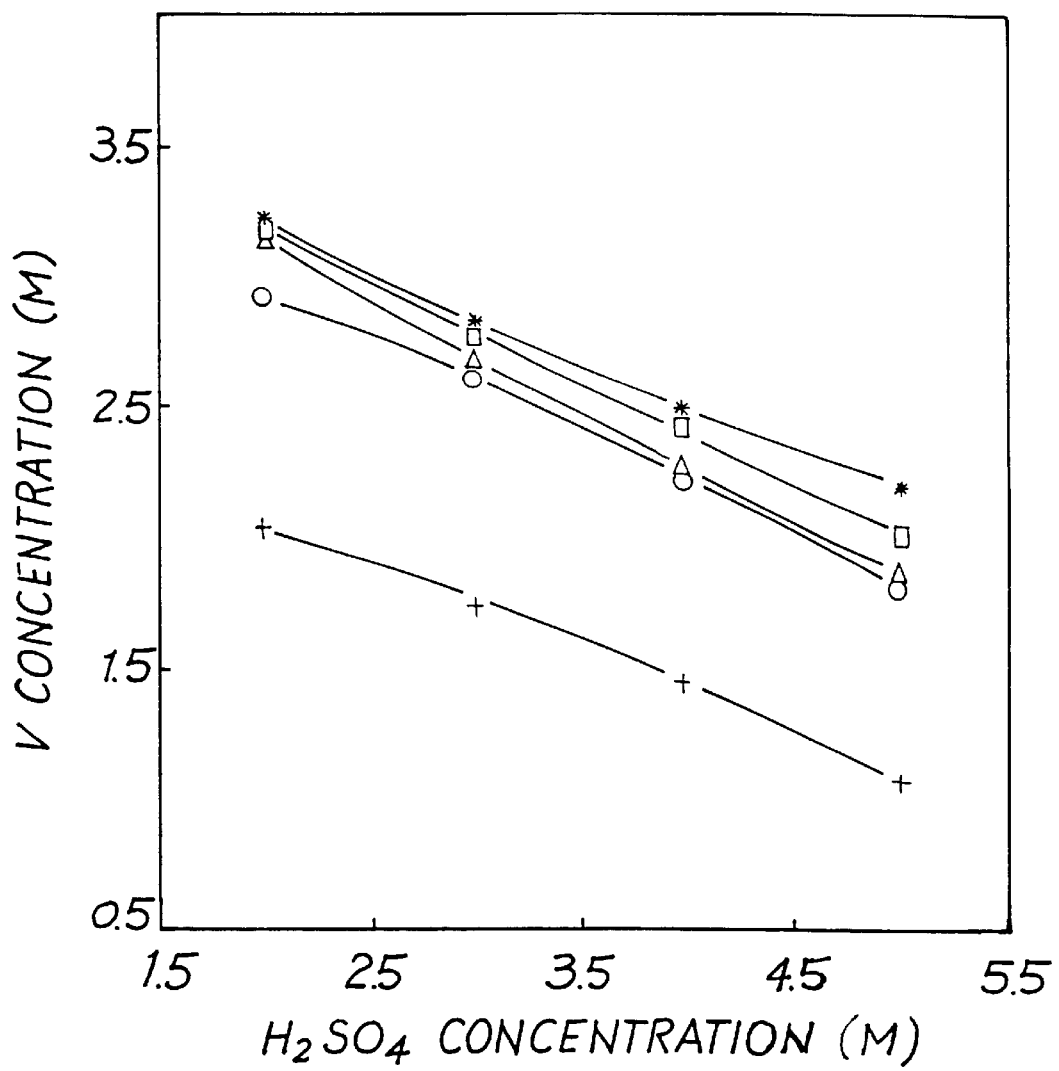
FIG. 27 EFFECT of $H_2SO_4$ CONCENTRATION on $V(II)$ SULPHATE SOLUBILITY; (+) 10°, (o) 30°, (△) 40°, (□) 50° and (*) 60°C.

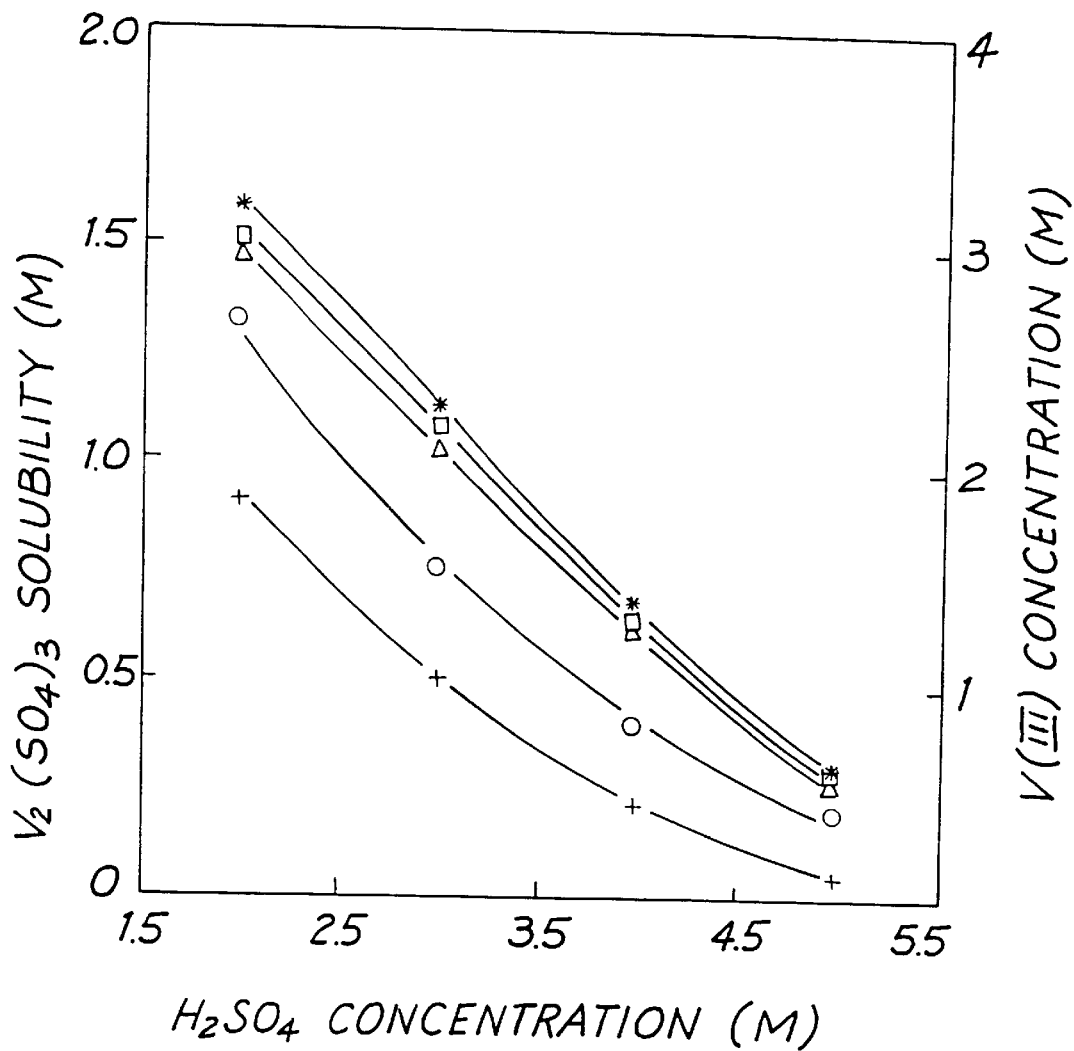
FIG. 28 EFFECT of $H_2SO_4$ CONCENTRATION on $V(III)$ SULPHATE SOLUBILITY; (+) 10°, (o) 30°, (△) 40°, (□) 50°, and (*) 60°C.

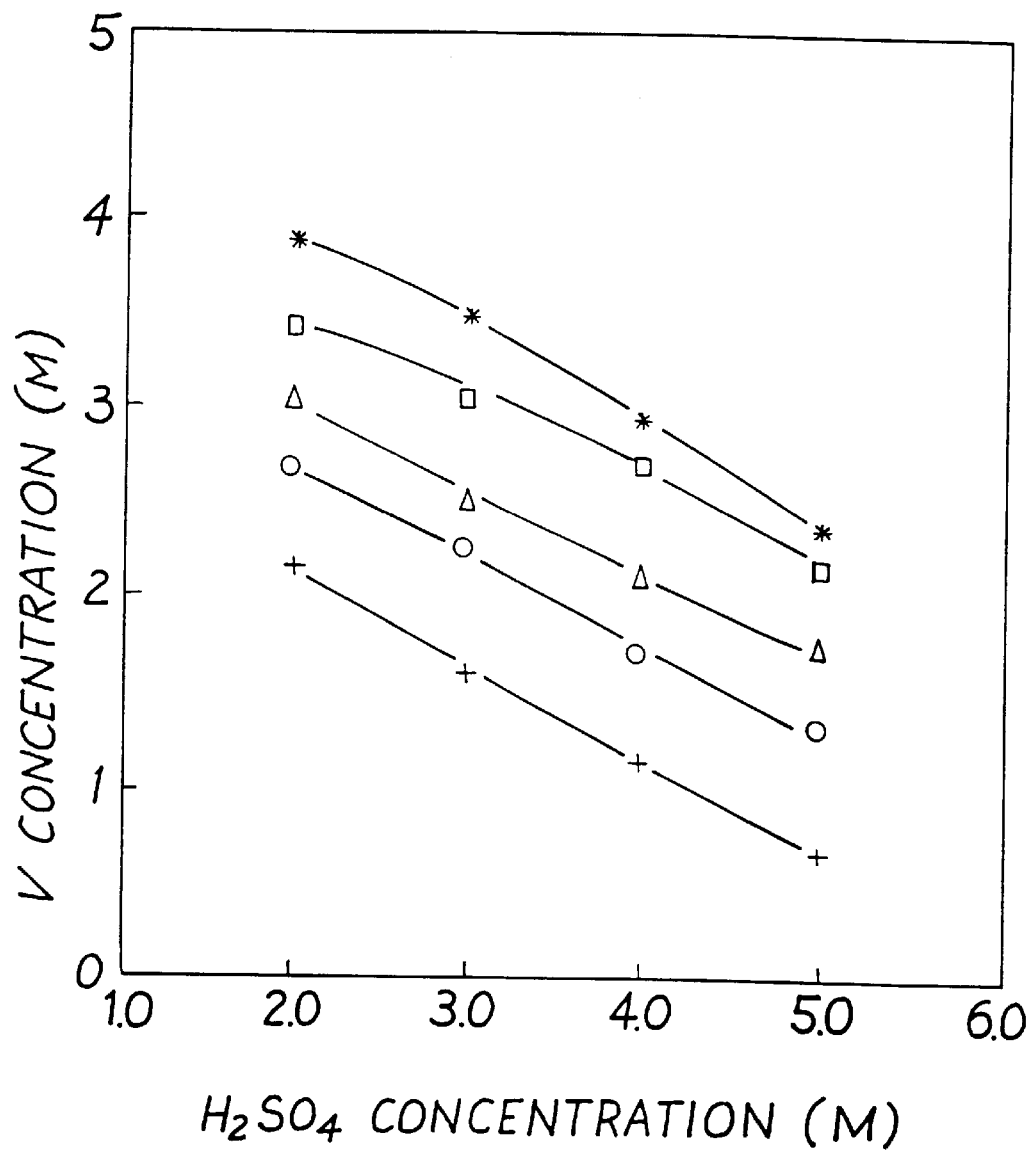
FIG. 29  EFFECT of $H_2SO_4$ CONCENTRATION on VANADYL SULPHATE SOLUBILITY; (+) 10°, (o) 30°, (△) 40°, (□) 50°, and (*) 60°C.

HIGH ENERGY DENSITY VANADIUM ELECTROLYTE SOLUTIONS, METHODS OF PREPARATION THEREOF AND ALL-VANADIUM REDOX CELLS AND BATTERIES CONTAINING HIGH ENERGY VANADIUM ELECTROLYTE SOLUTIONS

The present invention relates to a method for preparing a high energy density (HED) electrolyte solution for use in an all-vanadium redox cell, a high energy density electrolyte solution, in particular an all-vanadium high energy density electrolyte solution, a redox cell, in particular an all-vanadium redox cell, comprising the high energy density electrolyte solution, a redox battery, in particular an all-vanadium redox battery, comprising the HED electrolyte solution, a process for recharging a discharged or partially discharged redox battery, in particular an all-vanadium redox battery, comprising the HED electrolyte solution, a process for the production of electricity from a charged redox battery, and in particular a charged all-vanadium redox battery, comprising the HED electrolyte, a redox battery/fuel cell and a process for the production of electricity from a redox battery/fuel cell. The present invention also relates to a method for stabilising an electrolyte for use in a redox cell, in particular for stabilising an electrolyte for use in an all-vanadium redox cell, a stabilised electrolyte, in particular an all-vanadium stabilised electrolyte, a redox cell, in particular an all-vanadium redox cell, comprising the stabilised electrolyte, a redox battery, in particular an all-vanadium redox battery, comprising the stabilised electrolyte, a process for recharging a discharged or partially discharged redox battery, in particular an all-vanadium redox battery, comprising the stabilised electrolyte solution, a process for the production of electricity from a charged redox battery, and in particular a charged all-vanadium redox battery, comprising the stabilised electrolyte solution, a redox battery/fuel cell and a process for the production of electricity from a redox battery/fuel cell.

BACKGROUND OF THE INVENTION

Since the energy density available from batteries based on oxidation/reduction reactions of ions in the electrolyte solution is directly proportional to the concentration of redox ions undergoing oxidation or reduction in the electrolyte solution, the energy density available from batteries based on redox electrolyte solutions is limited generally by the maximum solubility of redox salts of the various oxidation states in the electrolyte solution, and in particular the redox component with the lowest solubility.

In the vanadium redox battery employing V(II)/V(III) and V(IV)/V(V) redox couples in the $H_2SO_4$ for the negative and positive half-cell electrolyte solutions respectively, the vanadium concentration has been limited to less than 2M (about 1.8M) due to precipitation of V(II) and V(III) at low temperatures and the thermal precipitation of V(V) at high temperatures. The solubility of the V(II), V(III) and V(IV) ions increases with increasing temperatures, however, V(V) undergoes thermal precipitation to $V_2O_5$ at temperatures above 30° C.

For example if a 2M V(V) solution is exposed to temperatures of 30° C., a slight precipitate will start to form after 2 days, with heavy precipitation evident after only 4 days. At 40° C., a heavy precipitate will form after 2 days in a 2M V(V) solution. Even a 1.8M V(V) solution will precipitate after 6 days at 40° C.

This problem in use can be avoided by reducing the vanadium ion concentration to less than 1.8M for applications where the temperature is likely to exceed 40° C. and where the systems will be maintained in fully charged state for long periods. However in many applications it is not desirable to reduce the vanadium ion concentration below 2.0M since such a reduction effectively reduces the capacity and energy density of the battery. Thus, there is a need for a vanadium-based redox electrolyte solution which contains a higher concentration of vanadium ions.

In PCT/AU94/00711, a stabilised vanadium electrolyte solution was described which employed stabilising agents to inhibit the precipitation of vanadium from supersaturated solutions. Thus, 3M V(V) solution could be stabilised for several weeks by addition of 1–3 wt % glycerol, while 3M V(II) was stabilised by 1–3 wt % ammonium oxalate. A mixture of glycerol and ammonium oxalate inhibited precipitation of both V(II) and V(V) ions allowing a 3M vanadium electrolyte solution to operate successfully in a vanadium redox cell for close to six months. A large number of other organic and inorganic additives were also shown to inhibit the precipitation of vanadium from supersaturated solutions.

While these additives play a vital role in inhibiting precipitation of vanadium ions from supersaturated solutions of 2 to 4M vanadium surprisingly, the author has found that in the above case of V(V) solutions, at concentrations above 4M, the thermal precipitation reaction is completely inhibited even without the use of stabilising agents. Thus, a 5.5M V(V) solution produced by oxidation of 5.5M $VOSO_4$ in 2M $H_2SO_4$ showed no signs of precipitation even after 6 weeks at 50° C.

One of the objects of this invention is thus an all-vanadium redox battery employing vanadium solutions of greater than 2M and especially above 1.8M, more typically above 2M, even more typically above 3M, 4M or 5M concentration which can operate over a wide range of temperatures and operating conditions. To avoid the precipitation of V(II), V(III) or V(IV) ions at these concentrations the operating temperature of the system is maintained above 25° C. However, it has also been discovered that with the use of suitable stabilizing agents, the operating temperature can be extended below 25° C.

FUNDAMENTAL PRINCIPLE OF INVENTION

In the vanadium cell however, you cannot use normal chelating or complexing methods to increase the concentration of vanadium in a vanadium electrolyte solution since V(V) is strongly oxidizing and will oxidize most of these compounds eventually to $CO_2$, producing gas in the system which stops the pumps and can cause the whole stack to burst if not able to escape.

Surprisingly, however, it has been found by inventors that if used in low concentrations, these type of compounds have a stabilising ability and inhibit precipitation in highly supersaturated solutions of vanadium by adsorbing on the nuclei and preventing ions from approaching the nuclei, therefore stopping crystal growth.

At such low concentrations, these additives do not have sufficient reducing power and can thus not be oxidized by the V(V) in the positive half cell electrolyte solution. The solutions are thus stable for long periods and over so much wider temperature range than unstabilised solutions.

For example if a 2M V(V) solution are exposed to temperatures of 30° C., a slight precipitate will start to form after 2 days, with heavy precipitation evident after only 4 days. At 40° C., a heavy precipitate will form after 2 days in a 2M V(V) solution. Even a 1.8M V(V) solution will precipitate after 3 days at 40° C.

This problem in use can be avoided by reducing the vanadium ion concentration to less than 1.8M for applications where the temperature is likely to exceed 40° C. and where the systems will be maintained in fully charged state for long periods. However in many applications it is not desirable to reduce the vanadium ion concentration below 2.0M since such a reduction effectively reduces the capacity and energy density of the battery. Thus, there is a general need for redox electrolyte solutions which contain higher concentrations of redox ions. Thus, there is a need for a vanadium-based redox electrolyte solution which contains a higher concentration of vanadium ions. There is also a need for redox electrolyte solutions in which the precipitation of redox species from the redox electrolyte solution is prevented or reduced. In particular, there is a need for a vanadium-based redox electrolyte solution in which the precipitation of vanadium species from the vanadium-based redox electrolyte solution is prevented or reduced.

OBJECTS OF INVENTION

Accordingly, it is an object of the present invention to provide a method for preparing a high energy density electrolyte solution for use in an all-vanadium redox cell or all-vanadium redox battery.

Other objects include: (a) providing a HED an all-vanadium electrolyte solution; (b) an all-vanadium redox cell, comprising the HED electrolyte solution; (c) an all-vanadium redox battery, comprising the HED electrolyte solution; (d) a process for recharging a discharged or partially discharged all-vanadium redox battery, comprising the HED electrolyte solution; (e) a process for the production of electricity from a charged all-vanadium redox battery; (f) processes for producing a HED vanadium electrolyte solution, optionally highly supersaturated; (g) an all-vanadium redox charge cell; and (h) a process for charging a charge anolyte and a charge catholyte of an all-vanadium redox charge cell. Another object of the present invention to provide a method for stabilising an electrolyte solution for use in a redox cell or redox battery, in particular for stabilising an electrolyte solution for use in an all-vanadium redox cell or all-vanadium redox battery.

Other objects include: (a) providing a stabilised electrolyte solution, in particular a redox electrolyte solution and more particularly an all-vanadium stabilised electrolyte solution; (b) a redox cell, in particular an all-vanadium redox cell, comprising the stabilised electrolyte solution; (c) a redox battery, in particular an all-vanadium redox battery, comprising the stabilised electrolyte solution; (d) a process for recharging a discharged or partially discharged redox battery, in particular an all-vanadium redox battery, comprising the stabilised electrolyte solution; (e) a process for the production of electricity from a charged redox battery, in particular an all-vanadium redox battery, (f) processes for producing a stabilized vanadium electrolyte solution, optionally highly supersaturated; (g) an all-vanadium redox charge cell; and (h) a process for charging a charge anolyte and a charge catholyte of an all-vanadium redox charge cell.

It is a further object of the present invention to provide an improved all-vanadium redox cell and all-vanadium redox battery which can operate over a wide range of temperatures and operating conditions.

Another object is to provide a redox battery/fuel cell and a process for the production of electricity from a redox battery/fuel cell.

DISCLOSURE OF THE INVENTION

In this specification when reference is made to the electrolyte solutions of the all-vanadium redox charge cell the positive and negative electrolyte solutions are referred to as the catholyte and anolyte respectively. This is opposite to normal convention used in electrolytic processes but for convenience and consistency with nomenclature relating to batteries and other all-vanadium redox battery patent applications by the present applicant, the former convention has been adopted.

In this specification when reference is made to the electrolyte solutions of the all-vanadium redox charge cell the positive and negative electrolyte solutions are referred to as the catholyte and anolyte respectively. This is opposite to normal convention used in electrolytic processes but for convenience and consistency with nomenclature relating to batteries and other all-vanadium redox battery patent applications by the present applicant, the former convention has been adopted.

Throughout the specification the expression "acceptable" is used with reference to a precipitation rate of vanadium compounds from an electrolyte solution containing vanadium redox ions which rate is such, that to be acceptable or suitable, the amount of any resultant precipitation is less than that which would substantially interfere with and, typically less than that which would substantially reduce or limit, normal operation (including standing, charging and discharging operations) of an all-vanadium redox battery. In particular, "acceptable" includes reference to a precipitation rate of vanadium compounds from an electrolyte solution containing vanadium redox ions, which rate is such that the amount of any resultant precipitation does not substantially interfere with and substantially reduce catholyte and/or anolyte flow (e.g. flow of anolyte and catholyte solutions through the positive and negative compartments of an all-vanadium battery such as when it is pumped through such compartments) during normal operation of an all-vanadium redox flow battery (an all-vanadium flow battery being one in which the anolyte and catholyte are not immobilized).

Throughout the specification the expression "stabilising agent" refers to a substance that enables the upper concentration of redox ions in a redox electrolyte solution to be increased by adding an effective stabilising amount of the stabilising agent to the redox electrolyte solution. The stabilising agent may permit preparation of supersaturated solutions of redox ions in the redox electrolyte solution. The stabilising agent may also reduce or prevent precipitation of redox species from the redox electrolyte solution. The oxidation and reduction and other products of a compound/substance added to the redox electrolyte solution to stabilise the redox ions in solution are included within the definition of stabilising agent. The reason for this is that many of these compounds/substances may be converted to other products in the electrolyte solution. For example, organic compounds may be oxidised/reduced into other compounds or may combine with the vanadium ions/compounds to form new products or the products of the above compounds may combine with vanadium ions/compounds to form new products. These other products may act as stabilising agents. Thus throughout the specification and claims "stabilising agent" is to be taken to include products arising after addition of a compound/substance to the redox electrolyte solution to stabilise the redox ions in solution.

The energy density of redox flow batteries is determined by the concentration of the redox ions in the electrolyte solution. In the case of the vanadium redox flow battery, this has been limited to 2 moles/liter to avoid precipitation of $V(II)$ or $V(III)$ ions in the negative half-cell electrolyte solution at temperatures below 15° C. and thermal precipitation of $V(V)$ ions in the positive half-cell solution at temperatures above 40° C.

It has now been found that one way of increasing the stability of the vanadium electrolyte solutions can be enhanced by adjusting the sulphuric acid concentration or total sulphate concentration. However, while an increased $H_2SO_4$ concentration will stabilise the V(V) ions at elevated temperatures, the increased sulphate level will reduce the saturation solubility of the V(II), V(III) and V(IV) ions. For the 2M vanadium electrolyte solutions, a total sulphate level of 5 moles per liter has been found to be the optimum concentration for providing adequate thermal stability for the V(V) ions while avoiding precipitation in the negative half-cell electrolyte solution at the lower temperatures.

Because of the relatively slow rates of precipitation of the various ions at their corresponding temperature limits, it is often possible to extend the temperature range for short periods of time, especially if the battery is undergoing continuous charge-discharge cycling, as in the case of load-levelling applications. In applications such as remote area power supply or emergency back-up systems, where the battery can remain for several days or weeks at one state-of-charge (SOC), the vanadium ion concentration may need to be reduced below 2M if the electrolyte solution temperature is likely to fall below 15° C. or exceed 40° C. for significant periods.

Thus in very hot or cold climates where the battery is subjected to intermittent charge-discharge cycling, the vanadium ion concentration must be reduced to between 1.5 and 1.8M depending on the local climate and operating conditions. While this may extend the operating temperature range of the battery, it has the undesirable effect of reducing the energy density of the system. In applications such as electric vehicles, furthermore, vanadium ion concentrations significantly higher than 2M would be needed to make the vanadium battery viable. It is thus desirable to increase the vanadium ion concentration while avoiding precipitation of the redox ions during normal operation of the battery.

It is shown that the use of small amounts of stabilising agents such as ammonium oxalate and glycerol enhances the stability of the vanadium ions by inhibiting their precipitation in supersaturated solutions. Thus, a stabilised 3M vanadium electrolyte solution subjected to continuous charge-discharge cycling in a cell for approximately 6 months was stable, while 2M V(II) and V(V) solutions were shown to have increased stability at 5° C. and 48° C. respectively in the presence of a wide range of organic and inorganic stabilising agents. Even a 5M supersaturated V(V) solution was found to be stable for several weeks at 48° C. in the presence of approximately 1% additives such as fructose and sorbitol.

Further work has shown however, that while these additives decrease the rate of precipitation in supersaturated solutions of V(II), V(III) and V(IV) ions at low temperatures, surprisingly, in the case of the V(V) ion, increasing the concentration above the previous 2M limit, actually increases its thermal stability even in the absence of any stabilising agents. While a 2M V(V) solution will precipitate after only 2 days at 50° C. a 5.4M V(V) solution shows no signs of precipitation even after 8 weeks at 48° C. What is even more surprising, however, is that the viscosity of the solution slowly decreases with time and its conductivity increases. The rate at which these changes occur increases with increasing temperature.

This surprising result thus makes it possible to enhance the thermal stability of a supersaturated positive half-cell electrolyte solution by actually increasing the concentration of the vanadium ions. The upper temperature limit can thus be dramatically increased above the previous limit of 45° C. As the saturation solubility of the other vanadium ions is also higher at the higher temperatures, their precipitation is also avoided by operating the battery at elevated temperatures, thus avoiding the need to use stabilising agents. If a wider operating temperature range is required, however, stabilising agents can be employed to inhibit precipitation of V(II), V(III) and V(IV) ions at the lower temperatures.

In particular, in the case of vanadium electrolyte solution systems, it is now possible as a result of the present invention to achieve a substantial increase in the concentration of vanadium ions (especially V(V) ions, up to and including supersaturated concentrations, or greater than 1.8M to 15M or 2 to 15M or 3 to 10M or 4 to 10M and in particular 5.001 to 10M) in vanadium electrolyte solutions, especially vanadium redox electrolyte solutions. Alternatively a $V/O_2$ redox fuel cell using a HED V(II)/V(IV) electrolyte solution in the negative half cell and gaseous or liquid oxidant such as air, oxygen or hydrogen peroxide in positive half cell can be employed.

Another approach to enabling the increase of the upper concentration of redox ions in a redox electrolyte solution (such as increasing the upper concentration of metal ions in an aqueous solution) is the addition of an effective stabilising amount of one or more stabilising agents to the solution. The inventors have also found surprisingly that the stabilising agent may also reduce precipitation of redox species from the redox electrolyte solution.

In particular, in the case of vanadium electrolyte solution systems, it has been found that it is possible to achieve a substantial increase in the concentration of vanadium ions (especially V(II), V(III), V(IV) and, in particular V(V) ions, up to and including supersaturated concentrations, or 0.1 to 15M or 1.801M or 2M or 2.01M to 10M and in particular 5.001 to 7.5M) in vanadium electrolyte solutions, especially vanadium redox electrolyte solutions, by the addition of relatively small amounts of one or more of stabilising agents to a vanadium electrolyte solution. Stabilising agents have been found which are capable of stabilising $V^V, V^{IV}, V^{III}$ and $V^{II}$ species and increasing their solubility. Because they are used in low concentrations, the stabilising agents are not oxidised by V(V) at a significant rate.

Stablising Agents—Theoretical Model Development

Of the stabilising agents tested, most carboxylic acids were found to slowly oxidize in the V(V) solutions, producing $CO_2$. When used at low levels, ammonium oxalate was found to oxidize only very slowly, while EDTA and malic acid oxidized quite rapidly, even at low concentrations. In the case of glycerine, reduction of V(V) was observed at relatively high levels of glycerine but at low concentrations, the rate of glycerine reduction was effectively stopped.

From the above observations, it can be concluded that in order to prevent oxidation of the stabilising agent by V(V) the best compounds should be alcohols with OH groups on secondary at tertiary carbon atoms as these are more stable to oxidation than carboxylic acids or primary alcohols. Polyhydric secondary and tertiary alcohols, either ring or chain compounds would thus be expected to be the best stabilising agents to use for the vanadium redox cell as these would offer the greatest resistance to oxidation by V(V).

Similarly organic compounds with 2 or more secondary or tertiary —SH or —NH, groups or mixtures of secondary or tertiary —OH, —SH, or —$NH_2$ groups can be selected as suitable stabilizing agents for highly concentrated vanadium solutions.

Alternatively a V/O$_2$ redox fuel cell using a stabilised V(II)/V(IV) electrolyte solution in the negative half cell and gaseous or liquid oxidant such as air, oxygen or hydrogen peroxide in positive half cell can be employed.

SUMMARY OF INVENTION

Typically the electrolyte solution is circulated separately through the positive and negative compartments.

According to a first embodiment of the present invention there is provided a method for preparing a high energy density ("HED") electrolyte solution for use in an all-vanadium redox cell.

In particular there is provided a method of preparing a HED electrolyte solution for use in an all-vanadium redox cell, said solution containing an electrolyte, the method comprising:

(A) dissolving a first substance in the solution which first substance when dissolved in the solution produces vanadium redox ions in the solution.

The method may further comprise:

(A') optionally dissolving a stabilizing amount of stabilizing agent in the solution;

(B) reducing the redox ions in the solution to a lower oxidation state to generate a reductant capable of dissolving a second substance in the solution;

(C) adding a second substance in the solution which second substance when dissolved in the solution produces vanadium redox ions in the solution;

(D) dissolving the second substance in the solution;

(E) optionally reducing the vanadium redox ions in the solution to a lower oxidation state to generate a reductant capable of dissolving more of the second substance in the solution;

(E') optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(F) optionally repeating steps (A)–(E), or (A)–(E) and (E'), or (A) to (E'), or (C) to (E), or (C) to (D) and (E'), or (C) to (E') to obtain the required high concentration of the vanadium redox ions in the solution.

For V(III) and/or V(IV) concentrations above 4M, to prevent crystallisation from occurring during electrolyte solution preparation the solution temperature is generally maintained above 25° C., more typically 35° C. or above and even more typically 40° C. or above and yet even more typically 35–50° C.

Alternatively there is provided a method of preparing a HED electrolyte solution for use in an all-vanadium redox cell, said solution containing an electrolyte, the method comprising:

(a) adding a first substance to an electrolyte solution which first substance when dissolved in the solution produces vanadium redox ions in the solution;

(b) dissolving the first substance in the solution;

(b') optionally dissolving a stabilizing amount of stabilizing agent in the solution;

(c) optionally reducing the redox ions in the solution to a lower oxidation state to generate a reductant capable of dissolving a second substance in the solution which second substance when dissolved in the solution produces vanadium redox ions in the solution;

(c') optionally oxidising the vanadium redox ions in the solution to produce vanadium redox ions in the solution at a higher oxidation state to generate an oxidant capable of dissolving a second substance in the solution which second substance when dissolved in the solution produces vanadium redox ions in the solution;

(d) optionally adding the second substance to the solution which second substance when dissolved in the solution produces vanadium redox ions in the solution;

(e) optionally dissolving the second substance in the solution;

(f) optionally reducing the redox ions in the solution to a lower oxidation state to generate a reductant capable of dissolving more of the second substance in the solution;

(f') optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(g) optionally repeating steps (d)–(f), or (d), (e) and (f') or (d) to (f') to obtain the required concentration of the vanadium redox ions in the solution.

The first substance may be the same as the second substance. The first substance may be different from the second substance.

For V(III) and/or V(IV) concentrations above 4M the solution temperature is generally higher than 25° C. to prevent the V(III) and/or V(IV) ions from crystallising or precipitating during electrolyte solution preparation, more typically 35° C. or above and even more typically 40° C. or above and yet even more typically 35–50° C.

Alternatively a HED V(V) electrolyte solution is prepared by dissolving and oxidising a V(II), V(III) or V(IV) salt dissolved or partially dissolved in a supporting electrolyte solution until fully dissolved and converted to V(V) oxidation state in the positive compartment of an electrolyte solution cell. The oxidation may optionally be conducted in the presence of a suitable stabilizing agent added to the solution.

In steps (A) and (D) said dissolving may be selected from the group consisting of chemically dissolving, simply dissolving, electrolytically dissolving and a combination of chemically dissolving and electrolytically dissolving.

In step (a) and (e) said dissolving may be selected from the group consisting of chemically dissolving, simply dissolving, electrolytically dissolving and a combination of chemically dissolving and electrolytically dissolving.

A HED electrolyte solution produced by the method of the invention is included within the scope of the invention.

According to a second embodiment of the present invention there is provided a HED electrolyte solution for use in a vanadium redox cell, the HED electrolyte solution comprising vanadium redox ions and an electrolyte.

In particular there is provided an all-vanadium high energy density ("HED") electrolyte solution for use in an all-vanadium redox cell, the electrolyte solution comprising vanadium redox ions in a high concentration and an electrolyte.

By vanadium redox ions in a high concentration is meant vanadium redox ions above saturated concentration typically above 1.8M up to and including supersaturated concentration.

The conditions of the electrolyte solution may be such as to reduce precipitation of the vanadium redox ions from the electrolyte solution to a rate whereby the all-vanadium electrolyte solution is acceptable for use in an all-vanadium redox battery.

The conditions of the electrolyte solution may be controlled or maintained so as to reduce precipitation of the vanadium redox ions from the electrolyte solution to a rate whereby the all-vanadium electrolyte solution is acceptable for use in an all-vanadium redox battery.

The temperature of the solution may be such as to reduce precipitation of the vanadium redox ions from the electrolyte solution to a rate whereby the all-vanadium electrolyte solution is acceptable for use in an all-vanadium redox battery.

The concentration of the electrolyte may be such as to reduce precipitation of the vanadium redox ions from the electrolyte solution to a rate whereby the all-vanadium electrolyte solution is acceptable for use in an all-vanadium redox battery.

The concentration of the electrolyte and the temperature of the solution may be such as to reduce precipitation of the vanadium redox ions from the electrolyte solution to a rate whereby the all-vanadium electrolyte solution is acceptable for use in an all-vanadium redox battery.

Generally the electrolyte solution contains vanadium redox ions which may or may not be present in the form of a redox couple(s). Typically the solution is an aqueous solution.

Included within the scope of the second embodiment is an electrolyte solution for use in a vanadium redox cell comprising an aqueous solution of vanadium ions and an acid.

The electrolyte solution may further comprising a stabilising amount of a stabilising agent, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery. The stabilising agent may allow the operating temperature range of the electrolyte solution to be extended (e.g. 0–95° C.).

The condition of the solution may be maintained and/or controlled (e.g. the concentration of the electrolyte and/or the temperature of the solution and/or the stabilising amount of stabilising agent) to reduce precipitation of the vanadium redox ions from the electrolyte solution to a rate whereby the all-vanadium electrolyte solution is acceptable for use during at least one period in an all-vanadium redox battery, said period being selected from the group consisting of between at least one recharging cycle of the battery, during at least one recharging cycle of the battery, between at least one recharging cycle of the battery and during at least one recharging cycle of the battery, between at least one discharging cycle of the battery, in a fully mixed state, in an over discharged state, during at least one discharging cycle of the battery, between at least one discharging cycle of the battery and during at least one discharging cycle of the battery, between at least one recharging cycle of the battery and during at least one recharging cycle of the battery and during at least one discharging cycle of the battery, between at least one recharging cycle of the battery and during at least one recharging cycle of the battery and during at least one discharging cycle of the battery, between at least one recharging cycle of the battery and during at least one discharging cycle of the battery, between at least one recharging cycle of the battery and between at least one discharging cycle of the battery, between at least one recharging cycle of the battery and during at least one recharging cycle of the battery and between at least one discharging cycle of the battery and during at least one discharging cycle of the battery, during standing of the electrolyte solution in a fully charged state, during standing of the electrolyte solution in a partially charged state, during standing of the electrolyte solution in a fully discharged state, during standing of the electrolyte solution in a partially discharged state and during standing of the electrolyte solution in at least a partially uncharged state.

The vanadium ions may be in a concentration above 1.8M, more typically above 2M, even more typically above 2.5M or 3M, or more typically from 4M and more typically from 5.0001M up to and including a highly supersaturated concentration.

The vanadium redox ions may be in a concentration range up to and including a highly supersaturated concentration, such as above 1.8M, more typically above 2M, above 2.5M, 3M to 10M, 3M to 9M, 3M to 8M, 3M to 7M, 3M to 10M, 5M to 10M, 5.001M to 10M, 5.001M to 7.5M, 5.001M to 7.0M, and 5.001M to 6M, 3.0M to 12M, 4.0M to 12M, 5M to 12M, 5.001M to 12M, 5.001 to 8M. A HED electrolyte solution wherein the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of tetravalent and pentavalent vanadium ions is particularly useful.

The HED electrolyte solution may contain a stabilizing amount of a suitable stabilizing agent if a wider operating temperature is required.

According to another embodiment of the present invention there is provided a HED vanadium electrolyte solution for use in a vanadium redox cell comprising an aqueous solution of vanadium redox ions and an electrolyte solution, with the optional use of a stabilizing amount of a stabilizing agent for a wider operating temperature range.

According to a third embodiment of the present invention there is provided a vanadium redox cell or redox battery comprising an HED electrolyte solution produced by the method of the first embodiment.

According to another embodiment of the present invention there is provided a vanadium redox cell or redox battery comprising a HED electrolyte solution of the second embodiment.

According to a fourth embodiment of this invention there is provided an all-vanadium redox battery having a positive compartment containing a catholyte in electrical contact with a positive electrode, the catholyte comprising an electrolyte solution containing vanadium redox ions selected from the group consisting of an catholyte vanadium redox couple, catholyte vanadium redox ions and a mixture of an catholyte vanadium redox couple and catholyte vanadium redox ions, a negative compartment containing an anolyte in electrical contact with a negative electrode, the anolyte comprising an electrolyte solution containing vanadium redox ions selected from the group consisting of an anolyte vanadium redox couple, anolyte vanadium redox ions and a mixture of an anolyte vanadium redox couple and anolyte vanadium redox ions, and a separator or membrane disposed between the positive and negative compartments and in contact with the catholyte and anolyte to provide ionic communication therebetween, at least one of the electrolyte solutions being a high energy density electrolyte solution, means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Alternatively, by using a stabilizing amount of a suitable stabilizing agent(s) a wider operating temperature can be achieved (e.g. above 0° C.).

Also disclosed is a an all-vanadium redox battery having a positive compartment containing a catholyte in electrical contact with a positive electrode, the catholyte comprising an electrolyte solution containing vanadium redox ions selected from the group consisting of an catholyte vanadium redox couple, catholyte vanadium redox ions and a mixture of an catholyte vanadium redox couple and catholyte vanadium redox ions, a negative compartment containing an anolyte in electrical contact with a negative electrode, the anolyte comprising an electrolyte solution containing vanadium redox ions selected from the group consisting of an anolyte vanadium redox couple, anolyte vanadium redox ions and a mixture of an anolyte vanadium redox couple and anolyte vanadium redox ions, and a separator or membrane disposed between the positive and negative compartments and in contact with the catholyte and anolyte to provide ionic communication therebetween, the catholyte and/or anolyte having a vanadium ion or vanadium couple concentration above 1.8M, more typically above 2M, even more typically above 2.5M or 3M, or 4M or above 5M, more typically 3M-4M, 3M-5M, 4M-5M, 5M-supersaturated concentration, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Alternatively, by using a stabilizing amount of a suitable stabilizing agent(s) a wider operating temperature can be achieved (e.g. above 0° C.).

The redox ions may be above 1.8M, more typically above 2M, even more typically above 2.5M or 3M, or 4M and are typically between 5.0001M up to and including a highly supersaturated concentration.

According to a fifth embodiment of this invention there is provided a process for recharging a discharged or partially discharged redox battery according to the fourth embodiment/invention which process comprises providing electrical energy to the positive and negative electrodes to derive reduced redox ions in the anolyte and oxidised redox ions in the catholyte.

According to a sixth embodiment of this invention there is provided an all-vanadium redox battery having a positive compartment containing a catholyte in electrical contact with a positive electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the electrolyte solutions has a concentration above 1.8M, more typically above 2M, even more typically above 2.5M or 3M, or 4M or above 5M, more typically 3M-4M, 3M-5M, 4M-5M, 5M-supersaturated concentration, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Alternatively, by using a stabilizing amount of a suitable stabilizing agent(s) a wider operating temperature can be achieved (e.g. above 0° C.).

In the all-vanadium redox battery of the invention at least one of the HED electrolyte solutions may be the catholyte, the anolyte or the anolyte and the catholyte.

Also disclosed is an all-vanadium redox battery having a positive compartment containing a catholyte in electrical contact with a positive electrode, the catholyte comprising an electrolyte solution containing trivalent and/or tetravalent vanadium ions and/or pentavalent vanadium ions, a negative compartment containing an anolyte in electrical contact with a negative electrode, the anolyte comprising an electrolyte solution containing tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have a concentration above 1.8M, more typically above 2M, even more typically above 2.5M or 3M, or 4M or above 5M, more typically 3M-4M, 3M-5M, 4M-5M, 5M-supersaturated concentration, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Alternatively, by using a stabilizing amount of a suitable stabilizing agent(s) a wider operating temperature can be achieved (e.g. above 0° C.).

The vanadium ions in the catholyte and/or anolyte may be above 1.8M, more typically above 2M, even more typically above 2.5M or 3M, or typically from 4M and more typically from 5M up to and including a highly supersaturated concentration.

According to another embodiment of this invention there is provided an all-vanadium redox battery having a positive compartment containing a catholyte in electrical contact with a positive electrode, the catholyte comprising an electrolyte solution containing above 1.8M, more typically above 2M, even more typically above 2.5M or 3M, or typically 5M up to and including a highly supersaturated concentration, 3M to 15M, 4M to 15M, 5.001 to 15M, 5.001 to 10M, optionally 5.001 to 9M, 4M to 9M or 3M to 9M trivalent and/or tetravalent vanadium ions and/or pentavalent vanadium ions, a negative compartment containing an anolyte in electrical contact with a negative electrode, the anolyte comprising an electrolyte solution containing above I.8M, more typically above 2M, even more typically above 2.5M or 3M, or typically 5M up to and including a supersaturated concentration, 3M to 15M, 4M to 15M, 5.001 to 15M, 5.001 to 10M, 3M to 10M, optionally 3M to 9M, 4M to 9M, 5.001 to 9M, tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have a concentration above 1.8M, more typically above 2M, even more typically above 2.5M or 3M, or above 4M or typically from 5M up to or including a highly supersaturated concentration, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Alternatively, by using a stabilizing amount of a suitable stabilizing agent(s) a wider operating temperature can be achieved (e.g. above 0° C.).

According to a seventh embodiment of this invention there is provided a process for recharging a discharged or partially discharged all-vanadium redox battery of the invention which process comprises providing electrical energy to the positive and negative electrodes to derive divalent vanadium ions in the anolyte and pentavalent vanadium ions in the catholyte.

During the process of recharging the conditions of the anolyte and/or catholyte solutions may be such so as to reduce precipitation of the vanadium redox ions from the electrolyte solution to a rate whereby the all-vanadium electrolyte solution is acceptable for use in an all-vanadium redox battery.

During the process of recharging the conditions of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the temperatures of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the temperatures of the anolyte and/or catholyte solutions and the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

According to a eighth embodiment of this invention there is provided a process for the production of electricity from a charged redox battery of the invention which process comprises withdrawing electrical energy from the redox battery by loading an external circuit in electronic communication with the positive and negative electrode.

During the process of the production of electricity the conditions of the anolyte and/or catholyte solutions may be such so as to reduce precipitation of the vanadium redox ions from the electrolyte solution to a rate whereby the all-vanadium electrolyte solution is acceptable for use in an all-vanadium redox battery.

During the process of the production of electricity the conditions of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the temperatures of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the temperatures of the anolyte and/or catholyte solutions and the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

Conditions that may be maintained and/or controlled apart from electrolyte concentration in the anolyte and/or catholyte (e.g. sulphuric acid concentration and/or total sulphate concentration) and/or temperature of the anolyte and/or catholyte solutions, include pH's of the anolyte and/or catholyte, pumping rates of the anolyte and/or catholyte through the negative and positive compartments, concentrations of the various vanadium redox ions and/or couples in the anolyte and/or catholyte, and oxygen concentrations of the various vanadium redox ions and/or couples in the anolyte and/or catholyte. The pH and concentrations and pumping rates of the above mentioned species may be measured by appropriate probes or other appropriate means known in the art.

Typically the operating temperatures of the process for recharging a discharged or partially discharged all-vanadium redox battery of the invention and the process for the production of electricity from a charged redox battery of the invention are such so as to substantially prevent or significantly reduce crystallisation or precipitation of vanadium substances/compounds from the catholyte and/or anolyte, typically above 20, more typically above 25° C. typically up to about 90° C.

An all-vanadium redox battery system is also provided consisting of a combination of the all-vanadium redox battery of the sixth embodiment and an anolyte reservoir for storing anolyte coupled to the negative compartment by anolyte supply and return lines via a pump and a catholyte reservoir for storing catholyte coupled to the positive compartment by catholyte supply and return lines via a pump.

Another all-vanadium redox battery is provided which consists of a combination of the all-vanadium redox battery of the sixth embodiment and an anolyte charge reservoir having anolyte charge supply and return line or lines for charging further anolyte which is to be delivered to the negative compartment and a catholyte charge reservoir having catholyte charge supply and return line or lines for charging further catholyte which is to be delivered to the positive compartment an anolyte storage reservoir having anolyte storage supply and return line or lines for storing anolyte from the negative compartment and a catholyte storage reservoir having catholyte storage supply and return line or lines for storing catholyte from the positive compartment and pumping means associated with the anolyte storage line or lines and/or the anolyte charge line or lines and with the catholyte storage line or lines and/or the catholyte charge line or lines for pumping:

(i) the catholyte through the catholyte storage line or lines, the positive compartment and the catholyte charge line or lines; and (ii) the anolyte solution through the anolyte solution storage line or lines, the negative compartment and the anolyte solution charge line or lines.

Discharging and charging of the catholyte and anolyte may be conducted in sealed air tight cells and can be conducted under an inert atmosphere such as nitrogen, argon, helium or neon or mixtures thereof although an inert atmosphere can be avoided in a sealed system. During discharging and charging the electrolyte solutions may be stirred or agitated preferably by bubbling an inert gas and/or with a mechanical stirrer or by pumping the electrolyte solutions (i.e. the anolyte and catholyte) through the positive and negative compartments. To prevent air oxidation of the V(II) to V(III) in the anolyte, a blanket of an inert immiscible liquid such as paraffin oil or other hydrocarbon oil or a mineral oil, a vegetable oil e.g. arachis oil, olive oil, sesame oil, groundnut oil, peanut oil or coconut oil, a fish oil e.g. tuna oil, mackeral oil, sand eel oil, menhaden oil, anchovy oil, sardine oil, horse mackeral oil, salmon oil, herring oil, cod oil, capelin oil, pilchard oil, sprat oil, whale oil, Pacific oyster oil, Norway pout oil, seal oil and sperm whale oil or a plant oil e.g. pine oil, wheat germ oil and linseed oil or the like, can be used to cover the anolyte (e.g. 0.5 cm to 5 cm, typically about 1 cm in depth) and thus prevent the diffusion of air into the anolyte. To prevent oxygen effects in respect of the V(V) and V(III) and V(IV) in the catholyte, a blanket of an inert immiscible liquid such as paraffin oil or other hydrocarbon oil or a mineral oil, a vegetable oil e.g. arachis oil, olive oil, sesame oil, groundnut oil, peanut oil or coconut oil, a fish oil e.g. tuna oil, mackeral oil, sand eel oil, menhaden oil, anchovy oil, sardine oil, horse mackeral oil, salmon oil, herring oil, cod oil, capelin oil, pilchard oil, sprat oil, whale oil, Pacific oyster oil, Norway pout oil, seal oil and sperm whale oil or a plant oil e.g. pine oil, wheat germ oil and linseed oil or the like, can be used to cover the catholyte (e.g. 0.5 cm to 5 cm, typically about 1 cm in depth) and thus prevent the diffusion of air into the catholyte.

Also disclosed is an uncharged all-vanadium redox battery having a positive compartment containing a catholyte in electrical contact with a positive electrode, said catholyte comprising an electrolyte solution containing tetravalent vanadium ions, a negative compartment containing an anolyte in electrical contact with a negative electrode, said anolyte comprising an electrolyte solution optionally containing tetravalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration above 1.8M, more typically above 2M, even more typically above 2.5M or 3M, or typically of 5M up to and including a supersaturated concentration, 5.001 to 15M, 5.001 to 10.0M, 3M to 10M optionally 5 to 9M or 5 to 7M or 5.001M to 10M or 5.001M to 7.5M or 3M to 9M or 3M to 7M, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

Also disclosed is an uncharged all-vanadium redox battery having a positive compartment containing a catholyte in electrical contact with a positive electrode, said catholyte comprising an electrolyte solution containing tetravalent vanadium ions, a negative compartment containing an anolyte in electrical contact with a negative electrode, said anolyte comprising an electrolyte solution containing trivalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration above 1.8M, more typically above 2M, even more typically above 2.5M or 3M, or typically of 5M up to and including a supersaturated concentration, 5.001 to 15M, 5.001 to 10.0M, 5 to 9M or 5 to 7M or 5.001M to 10M or 5.001M to 7.5M, or 3M to 9M or 3M to 7M, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

Also disclosed is an all-vanadium redox battery having a negative compartment containing an anolyte in electrical contact with a negative electrode, said anolyte comprising an electrolyte solution optionally containing divalent vanadium ions, a positive compartment containing a catholyte in electrical contact with a positive electrode, said catholyte comprising an electrolyte solution containing above 1.8M, more typically above 2M, even more typically above 2.5M or 3M, or typically 5M up to and including a supersaturated concentration, 5.001 to 15M, 5.001 to 10.0M, 5 to 9M or 5 to 7M or 5.001M to 10M or 5.001M to 7.5M or 3M to 9M or 3M to 7M pentavalent vanadium ions; and an ionically conducting separator disposed between said positive compartment and negative compartments and in contact with said catholyte and said anolyte to provide ionic communication therebetween, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

Further disclosed is an all-vanadium redox battery having a negative compartment containing an anolyte in electrical contact with a negative electrode, said anolyte comprising an electrolyte solution optionally containing trivalent vanadium ions, a positive compartment containing a catholyte in electrical contact with a positive electrode, said catholyte containing up to and including a supersaturated concentration, 1.801M to 15M, 2.01M to 15M, 3M to 15M, 5.001 to 15M, 5.001 to 10.0M, optionally 3M to 9M, 5 to 9M or 5 to 7M or 5.00M to 10M or 5.00M to 7.5M, pentavalent vanadium ions; and an ionically conducting separator disposed between said positive and negative compartments and in contact with said catholyte and said anolyte to provide ionic communication therebetween, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

In addition there is disclosed an all-vanadium redox battery having a positive compartment containing a catholyte in electrical contact with a positive electrode, said catholyte comprising an electrolyte solution containing tetravalent vanadium ions in a concentration above 1.8M, more typically above 2M, even more typically above 2.5M or 3M, or typically 5M up to and including a supersaturated concentration, 5.001 to 15M, 5.001 to 10.0M, optionally 3 to 9M, 5 to 9M or 5 to 7M or 5.001M to 10M or 5.001M to 7.5M, a negative compartment containing an anolyte in electrical contact with a negative electrode, said anolyte comprising an electrolyte solution optionally containing divalent vanadium ions in a concentration of above 1.8M, more typically above 2M, even more typically above 2.5M or 3M, or typically 5M up to and including a supersaturated concentration, and an ionically conducting separator disposed between said positive compartment and said negative compartment and in contact with said catholyte and said anolyte to provide ionic communication therebetween, and optionally means to maintain and/or control the operating conditions (e.g. temperature and/or electrolyte concentration) of the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

In addition there is disclosed an all-vanadium redox battery having a negative compartment containing an anolyte in electrical contact with a negative electrode, said anolyte comprising an electrolyte solution optionally containing tetravalent vanadium ions in a concentration of above 1.8M, more typically above 2M, even more typically above 2.5M or 3M, or typically from 5M up to and including a supersaturated concentration, a positive compartment containing a catholyte in electrical contact with a positive electrode, said catholyte comprising an electrolyte solution containing 3M up to and including a supersaturated concentration, 3 to 15M, 5.001 to 15M, 5.001 to 10.0M, optionally 3 to 9M, 5 to 9M or 5 to 7M or 5.001M to 10M or 5.001M to 7.5M, pentavalent vanadium ions, and an ionically conducting separator disposed between said positive and said negative compartments and in contact with said catholyte and said anolyte to provide ionic communication therebetween, and optionally means to maintain and/or control the operating conditions (e.g. temperature and/or electrolyte concentration) the all-vanadium redox battery so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

According to another embodiment of this invention there is provided a redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxidising gas electrode, an oxidising liquid electrode, an oxygen electrode and an air electrode, the catholyte comprising an electrolyte solution containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolyte solutions having a vanadium concentration above 1.8M, more typically above 2M, even more typically above 2.5M or 3M, or typically above 5M, said positive electrode having a gas contacting portion said gas contacting portion being disposed so as to be capable of contacting a gas selected from the group consisting of an oxidising gas, oxygen, an oxygen containing gas, and air, or said catholyte containing an oxidising solution such as hydrogen peroxide, means to maintain and/or control the operating conditions (e.g. temperature and/or electrolyte concentration) of the all-vanadium redox battery/fuel cell so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

According to another embodiment of this invention there is provided a redox battery/fuel cell having a positive compartment containing a catholyte in electrical contact with a positive electrode, the catholyte comprising an containing redox ions selected from the group consisting of an catholyte redox couple, catholyte redox ions and a mixture of an catholyte redox couple and catholyte redox ions, a negative compartment containing an anolyte in electrical contact with an anolyte contacting portion of a negative electrode, said anolyte contacting portion of said negative electrode being disposed in said negative compartment, said negative electrode being selected from the group consisting of a reducing gas electrode, a hydrogen gas electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolyte solutions having a vanadium ion concentration above 1.8M, more typically above 2M, even more typically above 2.5M or 3M, or typically above 5M, said negative electrode having a gas contacting portion said gas contacting portion being disposed so as to be capable of contacting a gas selected from the group consisting of a reducing gas, a hydrogen containing gas, and hydrogen, and optionally means to maintain and/or control the operating conditions (e.g. temperature and/or electrolyte concentration) of the all-vanadium redox battery/fuel cell so as to substantially prevent or significantly reduce crystallisation or precipitation of vanadium substances/compounds from the catholyte and/or anolyte, typically above 20, more typically above 25° C. Optionally, by adding a stabilizing amount of a suitable stabilizing agent(s) to the anolyte and/or catholyte a wider operating temperature can be achieved (e.g. above 0° C.).

Also disclosed is a process for the production of electricity from a redox battery/fuel cell of the invention when said battery/fuel cell is charged or partially charged, which process comprises withdrawing electrical energy from the redox battery/fuel cell by loading an external circuit in electronic communication with the positive and negative electrode. The redox ions may be above 1.8M, more typically above 2M, even more typically above 2.5M or 3M, or typically from 5M up to and including a highly supersaturated concentration.

Further embodiments of this invention are:

A. A HED all-vanadium electrolyte solution for use in an all-vanadium redox battery, the HED electrolyte solution comprising vanadium redox ions and an electrolyte at an operating temperature above 25° C. to reduce precipitation of the V(II), V(III) or V(IV) ions.

B. An all-vanadium redox battery having a positive compartment containing a catholyte in electrical contact with a positive electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the anolyte and catholyte is a HED all-vanadium electrolyte solution for use in an all-vanadium redox battery, the HED electrolyte solution comprising greater than 3M or typically above 5M vanadium redox ions and an electrolyte and optionally means to maintain and/or control the operating temperature of the all-vanadium redox battery so as to substantially reduce crystallisation or precipitation of vanadium substances/compounds from the catholyte and/or anolyte, typically above 20, more typically above 25° C., to a rate whereby the HED all-vanadium electrolyte solution is acceptable for use in an all-vanadium redox battery.

C. A process for recharging an all-vanadium redox battery according to B, when said battery is discharged or partially discharged, which process comprises providing electrical energy to the positive and negative electrodes to derive divalent vanadium ions in the anolyte and pentavalent vanadium ions in the catholyte.

D. A process for the production of electricity from an all-vanadium redox battery according to B, when said battery is charged or partially charged, which process comprises withdrawing electrical energy from the redox battery by loading an external circuit in electronic communication with the positive and negative electrode.

E. A method of preparing a HED all-vanadium electrolyte solution for use in an all-vanadium redox battery, the HED electrolyte solution comprising higher than 3M vanadium redox ions and an electrolyte the method comprising:

(A) dissolving a first substance in an electrolyte solution which first substance when dissolved in the solution produces vanadium redox ions in the electrolyte solution;

F. The method of E may further comprise:

(B) reducing the vanadium redox ions in the solution to a lower oxidation state to generate a reductant capable of dissolving a second substance in the solution;

(C) adding a second substance in the solution which second substance when dissolved in the solution produces vanadium redox ions in the solution;

(D) dissolving the second substance in the solution;

(E) optionally reducing the vanadium redox ions in the solution to a lower oxidation state to generate a reductant capable of dissolving more of the second substance in the solution;

(F) optionally repeating steps (A) to (E) or (B)–(E) to obtain the required concentration of the vanadium redox ions in the solution.

G. The method of E may further comprise:

(C') oxidising the vanadium redox ions in the solution to produce vanadium redox ions in the solution at a higher oxidation state;

(C) reducing the vanadium redox ions at a higher oxidation state in the solution to a lower oxidation state to generate a reductant capable of dissolving a second substance in the solution;

(D) adding a second substance in the solution which second substance when dissolved in the solution produces vanadium redox ions in the solution;

(E) dissolving the second substance in the solution;

(F) optionally reducing the vanadium redox ions in the solution to a lower oxidation state to generate a reductant capable of dissolving more of the second substance in the solution;

(G) optionally repeating steps (C')–(F) to obtain the required concentration of the vanadium redox ions in the solution.

H. A method of preparing a HED all-vanadium electrolyte solution for use in an all-vanadium redox battery, the HED electrolyte solution comprising higher than 3M vanadium redox ions and an electrolyte the method comprising:

(a) adding a first substance to the solution which first substance when dissolved in the solution produces vanadium redox ions in the solution;

(b) dissolving the first substance in the solution;

(c) optionally reducing the vanadium redox ions in the solution to a lower oxidation state to generate a reductant capable of dissolving a second substance in the solution which second substance when dissolved in the solution produces vanadium redox ions in the solution;

(d) optionally adding the second substance to the solution which second substance when dissolved in the solution produces vanadium redox ions in the solution;

(e) optionally dissolving the second substance in the solution;

(f) optionally reducing the vanadium redox ions in the solution to a lower oxidation state to generate a reductant capable of dissolving more of the second substance in the solution;

(g) optionally repeating steps (a)–(f) or (d)–(f) to obtain the required concentration of the vanadium redox ions in the solution.

I. A method of preparing a HED all-vanadium electrolyte solution for use in an all-vanadium redox battery, the HED electrolyte solution comprising higher than 3M vanadium redox ions and an electrolyte the method comprising:

(a) adding a first substance to the solution which first substance when dissolved in the solution produces vanadium redox ions in the solution;

(b) dissolving the first substance in the solution;

(b') optionally oxidising the vanadium redox ions in the solution to produce vanadium redox ions in the solution at a higher oxidation state;

(c) optionally reducing the vanadium redox ions at a higher oxidation state in the solution to a lower oxidation state to generate a reductant capable of dissolving a second substance in the solution which second substance when dissolved in the solution produces vanadium redox ions in the solution;

(d) optionally adding the second substance to the solution which second substance when dissolved in the solution produces vanadium redox ions in the solution;

(e) optionally dissolving the second substance in the solution;

(e') optionally oxidising the vanadium redox ions in the solution to produce vanadium redox ions in the solution at a higher oxidation state;

(f) optionally reducing the vanadium redox ions at a higher oxidation state in the solution to a lower oxidation state to generate a reductant capable of dissolving more of the second substance in the solution;

(g) optionally repeating steps (a)–(f) or (d)–(f) to obtain the required concentration of the vanadium redox ions in the solution.

J. A HED vanadium electrolyte solution produced by the method of any one of embodiments E to I.

K. An immobilized HED all-vanadium electrolyte solution for use in an immobilized electrolyte solution containing all-vanadium redox battery, comprising the HED electrolyte solution of the invention, including embodiment A, immobilized with an effective immobilising amount of an immobilising agent.

L. An immobilized stabilised all-vanadium electrolyte solution for use in an immobilized electrolyte solution containing all-vanadium redox battery, comprising the HED electrolyte solution of the invention, including embodiment A, immobilized with an effective immobilising amount of an immobilising agent selected from the group consisting of gels, gums, Xanthan gum, Guar gum, starch, furcellaran, hypnean, dextran, tamarind, alginates, pectic gels, sodium pectate, alkylcellulose hydrophilic colloids; hydroxyalkylcellulose, carboxyalkylcellulose, hydroxypropyl methyl cellulose, sodium carboxymethylcellulose, potassium carboxymethyl cellulose, hydroxymethylcellulose, ethyl succinylated Cellulose, succinylated zein, carboxymethylcellulose, sodium poly (styrene sulphonate) with poly (vinyl methyl pyridinium) chloride, sodium poly (styrene sulphonate) with poly (vinyl benzyl trimethyl ammonium) chloride, vinyl acetate homopolymer, polyvinyl alcohol resin, carboxypolymethylene, sodium alginate, a mixture of gelatin and sodium alginate, potassium alginate, gelatine, acacia gum, deacetylated gellan gum, karaya gum, locust bean gum, tragacanth gum, agar—agar, algin and derivatives and alkali metal salts thereof, thereof, carrageenin, furcellaran, carrageenan, carob bean gum, oat gum, pectin, methyl cellulose, (hydroxypropyl)methyl cellulose, sodium carboxymethyl cellulose, polygalacturonic acid and mixtures thereof.

M. An immobilized electrolyte solution containing all-vanadium redox battery having a positive compartment containing an immobilized catholyte in electrical contact with a positive electrode, the immobilized catholyte comprising an effective immobilizing amount of a catholyte immobilizing agent and an electrolyte containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an immobilized anolyte in electrical contact with a negative electrode, the anolyte comprising an effective immobilizing amount of an anolyte immobilizing agent and an electrolyte solution containing vanadium ions selected from the group consisting of tetravalent vanadium ions, trivalent vanadium ions, divalent vanadium ions, and a mixture of at least two of divalent vanadium Ions, trivalent vanadium ions, and tetravalent vanadium ions, and a separator or membrane disposed between the positive and negative compartments and in contact with the catholyte and anolyte to provide ionic communication therebetween and optionally means to maintain and/or control the operating temperature of the battery so as to substantially prevent or significantly reduce crystallisation or precipitation of vanadium substances/compounds from the catholyte and/or anolyte, typically above 20, more typically above 25° C.

N. A process for recharging an immobilized electrolyte solution containing all-vanadium redox battery according to embodiment M, when said battery is discharged or partially discharged, which process comprises providing electrical energy to the positive and negative electrodes to derive divalent vanadium ions in the anolyte and pentavalent vanadium ions in the catholyte.

O. A process for the production of electricity from an immobilized electrolyte solution containing all-vanadium redox battery according to embodiment M, when said battery is charged or partially charged, which process comprises withdrawing electrical energy from the redox battery by loading an external circuit in electronic communication with the positive and negative electrode.

P. A method of preparing an immobilized all-vanadium electrolyte solution for use in an immobilized electrolyte solution containing all-vanadium redox battery, comprising preparing the all-vanadium electrolyte solution according to the method of the invention including by the method of any one of embodiments E to I and immobilizing the all-vanadium electrolyte solution with an effective immobilizing amount of an immobilizing agent.

Q. A method of preparing an immobilized all-vanadium electrolyte solution for use in an immobilized electrolyte solution containing all-vanadium redox battery, comprising preparing the all-vanadium electrolyte solution according to the method of the invention, including the method of any one of embodiments E to I and immobilizing the all-vanadium electrolyte solution with an effective immobilizing amount of an immobilizing agent wherein the immobilizing agent is selected from the group consisting of gels, gums, Xanthan gum, sodium hexametaphosphate, myo-inositol, Guar gum, starch, furcellaran, hypnean, dextran, tamarind, alginates, pectic gels, sodium pectate, potassium pectate, alkylcellulose hydrophilic colloids, hydroxyalkylcellulose, carboxyalkylcellulose, hydroxypropylmethyl cellulose, sodium carboxymethylcellulose, potassium carboxymethyl cellulose, hydroxymethylcellulose, ethyl succinylated Cellulose, succinylated zein, carboxymethylcellulose, sodium poly (styrene sulphonate) with poly (vinyl methyl pyridinium) chloride, sodium poly (styrene sulphonate) with poly (vinyl benzyl trimethyl ammonium) chloride, vinyl acetate homopolymer, polyvinyl alcohol resin, carboxypolymethylene, sodium alginate, gelatin, a mixture of gelatin and sodium alginate, a mixture of gelatin and potassium alginate, potassium alginate, gelatine, acacia gum, deacetylated gellan gum, karaya gum, locust bean gum, tragacanth gum, agar—agar, algin and derivatives and alkali metal salts thereof, thereof, carrageenin, furcellaran, carrageenan, carob bean gum, oat gum, pectin, methyl cellulose, (hydroxypropyl)methyl cellulose, polygalacturonic acid and mixtures thereof.

R. An all-vanadium redox battery of the invention the temperature of at least one of the anolyte or catholyte being such as to reduce precipitation of the vanadium redox ions from at least one of the anolyte or catholyte to a rate whereby the all-vanadium electrolyte solution is acceptable for use in an all-vanadium redox battery.

S. An all-vanadium redox battery of the invention, the concentration of at least one of the anolyte or catholyte being such as to reduce precipitation of the vanadium redox ions from at least one of the anolyte or catholyte to a rate whereby the all-vanadium electrolyte solution is acceptable for use in an all-vanadium redox battery.

T. An all-vanadium redox battery of the invention, the concentration of at least one of the anolyte or catholyte and the temperature of the solution being such as to reduce precipitation of the vanadium redox ions from at least one of the anolyte or catholyte to a rate whereby the all-vanadium electrolyte solution is acceptable for use in an all-vanadium redox battery.

Generally the operating temperatures of the methods and processes of the invention are so as to substantially reduce or prevent crystallisation or precipitation of vanadium substances/compounds, typically above 20, more typically above 25° C. or above 0° C. in the presence of a stabilizing amount of stabilizing agent(s).

Generally the temperature of the immobilized all-vanadium electrolyte solution of the invention is at such a level so as to substantially reduce or prevent crystallisation or precipitation of vanadium substances/compounds, typically above 20, more typically above 25° C. or above 0° C. in the presence of a stabilising amount of stabilising agent.

Typically in the HED electrolyte solution the vanadium ions are present in the solution above 1.8M, more typically above 2M, even more typically above 2.5M or 3M, or typically from 5M up to and including a highly supersaturated concentration.

The HED electrolyte solution is typically an aqueous solution, and the electrolyte is selected from the group consisting of $H_2SO_4$, trifluoromethanesulphonic acid, $Na_2SO_4$, ammonium sulphate, $K_2SO_4$, $H_3PO_4$, $Na_3PO_4$, $K_3PO_4$, $HNO_3$, $KNO_3$, $NaNO_3$, sulphonic acid, $C_6$–$C_{14}$ arylsulphonic acid such as p-toluenesulphonic acid, benzenesulphonic acid, naphthalenesulphonic acid, $C_1$–$C_6$ alkylsulphonic acid such as methylsulphonic acid and ethylsulphonic acid, acetic acid and mixtures thereof, more typically the electrolyte is $H_2SO_4$.

Typically the HED solution is an aqueous solution and the vanadium redox ions (and electrolyte e.g. $H_2SO_4$ alternatively expressed as total sulphate concentration) are (each) present in a range selected from the group consisting of 1.801M, optionally 2M up to and including a highly supersaturated concentration, aM, bM, a concentration in the range aM–bM, and a concentration range in the range aM–bM, where a is selected from the group consisting of a value presented in the column headed "a" in Table A below at one of entries 1–24, and b is selected from the group of the values presented in the column headed "b" adjacent the corresponding "a" entry:

TABLE A

| Entry | a | b |
|---|---|---|
| 1 | 2 | 2.01, 2.25, 2.5, 2.75, 3, 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 2 | 2.01 | 2.25, 2.5, 2.75, 3, 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 3 | 2.25 | 2.5, 2.75, 3, 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 4 | 2.5 | 2.75, 3, 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 5 | 2.75 | 3, 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 6 | 3 | 3.01, 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 7 | 3.01 | 3.25, 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 8 | 3.25 | 3.5, 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 9 | 3.5 | 3.75, 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75,9,9.25,9.5,9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 10 | 3.75 | 4, 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |

TABLE A-continued

| Entry | a | b |
|---|---|---|
| 11 | 4 | 4.25, 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 12 | 4.25 | 4.5, 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 13 | 4.5 | 4.75, 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 14 | 4.75 | 5, 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 15 | 5 | 5.01, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 16 | 5.01 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 17 | 5.25 | 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 18 | 5.5 | 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 19 | 5.75 | 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 20 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 21 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 22 | 8 | 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 23 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 24 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |

Advantageously where a sulphate electrolyte is used (e.g. sulphuric acid) the mole:mole ratio of vanadium ions:total sulphate is from 0.1 to 1, typically 2:5. Thus for a 2M vanadium ion solution 5M total sulphate is typically used. For 1.801–5M vanadium ion concentration 5–7M total sulphate is typically used as the electrolyte concentration.

Advantageously the HED electrolyte solution is selected from the group consisting of a HED electrolyte anolyte solution and a HED electrolyte catholyte solution.

Generally the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of trivalent, tetravalent and pentavalent vanadium ions and a mixture of tetravalent and pentavalent vanadium ions.

Advantageously the HED electrolyte solution without stabilising agents is maintained, controlled and/or operated in a redox cell, redox battery or redox battery/fuel cell at a temperature selected from the group consisting of e°C., f°C., a temperature in the range e°C.–f°C. and a temperature range in the range e°C.–f°C., where e is selected from the group consisting of a value presented in the column headed "e" in Table B below at one of entries 1–9, and f is selected from the group of the values presented in the column headed "f" adjacent the corresponding "e" entry:

TABLE B

| Entry | e | f |
|---|---|---|
| 1 | 20 | 25, 27, 30, 33, 35, 37, 40, 43, 45, 48, 50, 55, 60, 65, 70, 75, 80, 90 |
| 2 | 25 | 27, 30, 33, 35, 37, 40, 43, 45, 48, 50, 55, 60, 65, 70, 75, 80, 90 |
| 3 | 30 | 33, 35, 37, 40, 43, 45, 48, 50, 55, 60, 65, 70, 75, 80, 90 |
| 4 | 35 | 37, 40, 45, 50, 55, 60, 65, 70, 75, 80, 90 |
| 5 | 40 | 45, 50, 55, 60, 65, 70, 75, 80, 90 |
| 6 | 45 | 50, 55, 60, 65, 70, 75, 80, 90 |
| 7 | 50 | 55, 60, 65, 70, 75, 80, 90 |
| 8 | 55 | 60, 65, 70, 75, 80, 90 |
| 9 | 60 | 65, 70, 75, 80, 90 |
| 10 | 65 | 70, 75, 80, 90 |

In the all-vanadium battery of the invention the catholyte may be a HED all-vanadium electrolyte solution. The vanadium ions in the catholyte may be above 1.8M, more typically above 2M, even more typically above 2.5M or 3M, or typically 5M and above (e.g. up to 20M).

In the all-vanadium battery of the invention the anolyte may be a HED all-vanadium electrolyte solution. The vanadium ions in the anolyte may be above 1.8M, more typically above 2M, even more typically above 2.5M or 3M, or typically 5M up to 10M or 20M.

In the all-vanadium battery of the invention the anolyte and catholyte may be HED all-vanadium electrolyte solutions. The vanadium ions in the anolyte and the catholyte may be above 1.8M, more typically above 2M, even more typically above 2.5M or 3M, or typically from 5M up to 10M or 20M.

In the methods of the invention the concentration of vanadium redox ions in the solution may be further increased by removing water (e.g. by evaporation, vacuum evaporation, pervaporation) from the solution containing the required concentration of vanadium ions in the solution.

In the methods of the invention a concentrate comprising vanadium redox ions in the solution may be formed by removing water from the solution containing the required concentration of vanadium ions in the solution and further comprising adding water to the concentrate in an amount whereby the vanadium redox ions are at a predetermined concentration in the solution.

In the methods of the invention that use two substances the first substance may be different from the second substance. Typically the first substance is the same as the second substance and is selected from vanadium pentoxide, ammonium metavanadate, $V_2O_3$, $V_2O_4$, and $VOSO_4$, $NH_4VO_3$.

Typically the immobilising agent is present in a range selected from the group consisting of w % to x % wt/vol of the solution, w % to x % wt/wt of the solution, w % to x % wt/wt of the vanadium ions in the solution, w % to x % vol/vol of the solution, w % to x % vol/wt of the solution, w % to x % vol/wt of the vanadium ions in the solution, and w % to x % mole/mole of the vanadium ions in the solution, where w is selected from the group consisting of a value presented in the column headed "w" in Table C below at one of entries 1–25, and x is selected from the group of the values presented in the column headed "x" adjacent the corresponding "w" entry.

TABLE C

| Entry | w | x |
|---|---|---|
| 1 | 1 | 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8,8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 2 | 1.25 | 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 3 | 1.5 | 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 4 | 1.75 | 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16,16.5, 17, 17.5, 18, 18.5, 19, 19.5, 20, 25, 30, 35, 40, 45, 50, 55, 60, 70, 80 |
| 5 | 2 | 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 6 | 2.25 | 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |

TABLE C-continued

| Entry | w | x |
|---|---|---|
| 7 | 2.5 | 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 8 | 2.75 | 3,3.25,3.5,3.75,4,4.25,4.5,4.75, 5,5.25,5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 9 | 3 | 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 10 | 3.25 | 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 11 | 3.5 | 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 12 | 3.75 | 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 13 | 4 | 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 14 | 4.5 | 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 15 | 5 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 16 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |

TABLE C-continued

| Entry | w | x |
|---|---|---|
| 17 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 18 | 8 | 8.25, 8.5, 8.75, 9, 9.25, 9.5, 9.75, 10, 10.25, 10.5, 10.75, 11, 11.25, 11.51 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 19 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 20 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 21 | 11 | 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 22 | 12 | 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 23 | 13 | 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 24 | 14 | 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 25 | 15 | 15.25, 15.5, 16, 16.5, 17, 17.5, 18, 18.5, 19, 19.5, 20, 25, 30, 35, 40, 45, 50, 55, 60, 70, 80 |

According to further embodiment of this invention there is provided an all-vanadium redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxygen electrode and an air electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolyte solutions having the vanadium ions above 1.8M, more typically above 2M, even more typically above 2.5M or 3M, or typically above 5M, said positive electrode having a gas contacting portion said gas contacting portion being disposed so as to be capable of contacting a gas selected from the group consisting of oxygen, an oxygen containing gas, and air, and optionally means to maintain and/or control the operating temperature of the all-vanadium redox battery/fuel cell so as to substantially prevent or significantly reduce crystallisation or precipitation of vanadium substances/compounds from the at least one of the electrolyte solutions having the vanadium ions, typically above 20, more typically above 25° C.

According to further embodiment of this invention there is provided an all-vanadium redox battery/fuel cell having a positive compartment containing a catholyte in electrical contact with a positive electrode, said positive electrode being disposed in said positive compartment, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions, a negative compartment containing an anolyte in electrical contact with an anolyte contacting portion of a negative electrode, said anolyte contacting portion being disposed in said negative compartment, said negative electrode being selected from the group consisting of a reducing gas electrode, a hydrogen gas electrode, the anolyte comprising an electrolyte solution containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolyte solutions having a higher than 5M vanadium ions in at least one of the electrolyte solutions, said negative electrode having a gas contacting portion said gas contacting portion being disposed so as to be capable of contacting a gas selected from the group consisting of a reducing gas, a hydrogen containing gas, and hydrogen, and optionally means to maintain and/or control the operating temperature of the all-vanadium redox battery/fuel cell so as to substantially prevent or significantly reduce crystallisation or precipitation of vanadium substances/compounds from the at least one of the electrolyte solutions having the vanadium ions, typically above 20, more typically above 25° C.

Also disclosed is a process for the production of electricity from an all-vanadium redox battery/fuel cell of the invention when said battery/fuel cell is charged or partially charged, which process comprises withdrawing electrical energy from the redox battery/fuel cell by loading an external circuit in electronic communication with the positive and negative electrode.

Also disclosed are HED vanadium electrolyte solutions for use in an all-vanadium redox battery comprising vanadium redox ions V(II), V(III) and/or V(IV) ions above 1.8M, more typically above 2M, even more typically above 2.5M or 3M, or typically at 5M up to 10M or 20M, in the negative ½-cell of the battery and V(III), V(IV) and/or V(V) ions at above 1.8M, more typically above 2M, even more typically above 2.5M or 3M, or typically 5M up to 10M or 20M, in the positive ½-half cell of the battery, each with a supporting aqueous electrolyte typically comprising 0.5–10M $H_2SO_4$.

Also disclosed are HED vanadium electrolyte solutions for use in an all-vanadium redox battery comprising vanadium redox ions V(II), V(III) and/or V(IV) ions above 1.8M, more typically above 2M, even more typically above 2.5M or 3M, or typically at 5M up to 10M or 20M, in the negative ½-cell of the battery and V(III), V(IV) and/or V(V) ions above 1.8M, more typically above 2M, even more typically above 2.5M or 3M, or typically at 5M up to 10M or 20M, in the positive ½-cell of the battery, each with a supporting aqueous electrolyte typically of 0.5–10M $H_2SO_4$.

Also disclosed are 1.801–10 or 3–10 or 5–10 molar, typically 5 molar, vanadium redox ion containing electrolyte solutions for use in an all-vanadium redox battery comprising vanadium redox ions V(II), V(III) and/or V(IV) ions at above saturated concentrations in the negative ½-cell and V(III), V(IV) and/or V(V) ions at above saturated concentrations in the ½-half cell, each with a supporting electrolyte typically of 0.5–12M $H_2SO_4$.

Also disclosed are 5 molar vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting aqueous electrolyte typically of 0.5–10M $H_2SO_4$ and operating at a temperature above 25° C. which is sufficient to reduce precipitation of the vanadium redox ions from the HED electrolyte solution to a rate whereby the HED all-vanadium electrolyte solution is acceptable for use in an all-vanadium redox battery and in particular which is acceptable for long term stability on standing in the temperature range 25–70° C.

Also disclosed are 5–6 molar vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting aqueous electrolyte typically of 0.5–10M $H_2SO_4$ and operating at a temperature above 25° C. which is sufficient to reduce precipitation of the vanadium redox ions from the HED electrolyte solution to a rate whereby the HED all-vanadium electrolyte solution is acceptable for use in an all-vanadium redox battery and in particular is acceptable for long term stability on standing.

Also disclosed are 3–4 molar supersaturated vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting electrolyte typically of 0.5–10M $H_2SO_4$ and operating at a temperature above 25° C. which is sufficient to reduce precipitation of the vanadium redox ions from the HED electrolyte solution to a rate whereby the all-vanadium electrolyte solution is acceptable for use in an all-vanadium redox battery.

Also disclosed are 4–5 molar supersaturated vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting electrolyte typically of 0.5–10M $H_2SO_4$ and operating at a temperature above 25° C. which is sufficient to reduce precipitation of the vanadium redox ions from the HED electrolyte solution to a rate whereby the all-vanadium electrolyte solution is acceptable for use in an all-vanadium redox battery.

Also disclosed are 2–12, more typically 3–12, more typically 5–12 molar supersaturated vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting aqueous electrolyte typically of 0.5–12M $H_2SO_4$ and an operating temperature above 25° C. which is sufficient to reduce precipitation of the vanadium redox ions from the HED electrolyte solution to a rate whereby the HED all-vanadium electrolyte solution is acceptable for use in an all-vanadium redox battery.

Also disclosed are supersaturated vanadium electrolytes for use in an all-vanadium redox battery comprising supersaturated vanadium redox ions V(II), V(III) and/or V(IV) ions in the negative ½-cell and V(III), V(IV) and/or V(V) ions in the positive ½-half cell, each with a supporting aqueous electrolyte typically of 0.5–12M $H_2SO_4$ (or total sulphate) and an operating temperature above 25° C. which is sufficient to reduce precipitation of the vanadium redox ions from the HED electrolyte solution to a rate whereby the HED all-vanadium electrolyte solution is acceptable for use in an all-vanadium redox battery and in particular to reduce precipitation of the vanadium ions from the HED supersaturated vanadium electrolyte solution to a rate which is acceptable for long term stability on standing.

Also disclosed is a process for making HED supersaturated electrolyte solution by electrolytic oxidation of a suspension of $V_2O_3$ and/or $V_2O_4$ and/or $VOSO_4$ powder to V(V) ions at above 1.8M, more typically above 2M, even more typically above 2.5M or 3M, or typically from 5M up to and including a supersaturated concentration at the anode of electrolysis cell containing a supporting aqueous electrolyte typically of 0.5–12M $H_2SO_4$ (or total sulphate). The V(II), V(III) and V(IV) redox ions are produced by reduction of V(V) in solution at up to and including a supersaturated concentration.

Also disclosed is a process for making HED supersaturated electrolyte solution by electrolytic reduction of $V_2O_5$ suspension at cathode of electrolysis cell containing supporting aqueous electrolyte typically of 0.5–12M $H_2SO_4$ (or total sulphate) and reducing for sufficient time to produce 50:50 mixture of V(III) or V(IV) ($V^{3.5+}$) which is then placed into both sides of the vanadium redox battery ("VRB") and charged to V(II) and V(V) states respectively or left in discharged form of V(III) and V(IV) respectively until needed.

Also disclosed is a process for making HED supersaturated $V^{3.5+}$ electrolyte solution by concentrating a 2M $V^{3.5+}$ solution.

Also disclosed is a process for making $V^{3.5+}$ electrolyte concentrate (as suspended slurry) by process for making HED supersaturated $V^{3.5+}$ electrolyte solution by concentrating a 2M $V^{3.5+}$ solution by boiling or pervaporation or applying vacuum and/or heat to remove required amount of water and reconstituting by adding required amount of water to redissolve vanadium precipitate to form supersaturated solution just prior to addition to vanadium redox battery electrolyte solution tanks.

The vanadium redox ions may be above 1.8M, more typically above 2M, even more typically above 2.5M or 3M, or typically 5M up to 10M or 20M.

Typically the negative and positive compartments are sealed air-tight.

Optionally the negative and positive compartments are deaerated.

Typically the negative electrolyte solution is covered with a blanket of inert oil to oxidise air.

All-vanadium redox charge and discharge cells of the invention can be operated over a broad temperature range, e.g. 25° C. to 99° C. or 30° C. to 99° C. but are typically operated in the temperature range 25° C. to 65° C. or 30° C. to 65° C., 30° C. to 50° C., or 25° C. to 50° C.

In the methods and processes of the invention for forming a HED solution of vanadium ions, initially a viscous HED solution is generally formed (which may be a colloidal particle/solution mixture) of vanadium ions (typically >3M vanadium ions, typically 3.0M–10M, more typically 5.01M–6.5M). The viscous HED solution is then typically maintained, with or without stirring, at room temperature for about 2 weeks to a month or more, or at 25–95° C. for 0.1 day-30 days, typically 0.5 day-20 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions. Advantageously the viscous HED solution/colloidal particle mixture is maintained at a temperature or temperature range e°C.–f°C. where e is selected from the group consisting of a value presented in the column headed "e" in Table B at one of entries 1–10, and f is selected from the group of the values presented in the column headed "f" adjacent the corresponding "e" entry to substantially reduce or prevent crystallisation or precipitation of vanadium substances/compounds for a time in a range selected from the group consisting of w days to x days, where w is selected from the group consisting of a value presented in the column headed "w" in Table F at one of entries 1–25, and x is selected from the group of the values presented in the column headed "x" adjacent the corresponding "w" entry.

The anolyte and the catholyte comprise an electrolyte which is typically an aqueous solution which includes at least one of $H_2SO_4$, trifluoromethanesulphonic acid, $Na_2SO_4$, $K_2SO_4$, $H_3PO_4$, $Na_3PO_4$, $K_3PO_4$, $HNO_3$, $KNO_3$, $NaNO_3$, sulphonic acid, $C_6$–$C_{14}$ arylsulphonic acid such as p-toluenesulphonic acid, benzenesulphonic acid, naphthalenesulphonic acid, $C_1$–$C_6$ alkylsulphonic acid such as methylsulphonic acid and ethylsulphonic acid, acetic acid or mixtures thereof in a concentration of from 0.01M to 20M, or 0.01M to 15M, 0.01M to 10M. It is especially preferred to use $H_2SO_4$ (alternatively expressed as total sulphate concentration) in a concentration of from 1.5M to 10M, more preferably 1.75M to 10M (other concentration ranges include 0.25M to 10M, 2M to 10M, 2M to 9M, 2.5M to 9M, 2.8M to 8M, 3M to 7M, 3M to 6M, 4M to 6.5M, 5.00M to 10M, 5.00M to 7.5M, 5.001M to 10M, 5.001M to 7.0M, and 5.001M to 6M) $H_2SO_4$ (or total sulphate). It is especially preferred to use $H_2SO_4$ (alternatively expressed as total sulphate concentration) in a concentration of from 2M to 9M, more preferably 4.5M to 9M.

The electrolyte solution typically has vanadium ions (V(II), V(II), V(IV) and/or V(V) ions in any form, (examples of forms include vanadate ions such as metavanadate, orthovanadate, pyrovanadate, as well as vanadyl ions such as vanadylous and divalent vanadyl ions) in sufficient concentration for high discharge capacity in the discharge battery, for example, up to and including a supersaturated concentration, 1.801M to 15M, 3M to 15M, 5.001 to 15M, 5.1M to 12M, 5.25M to 10M, 5M to 10M, 5M to 9M, 5.5M to 9M, 5M to 8M, 5M to 7M, 5M to 6M, 5.001M to 10M, 5.001M to 7.5M, 5.001M to 10M, 5.001M to 7.0M, and 5.001M to 6M, 3M to 7M or 3M to 6M are typical in the charge and discharge cells of the invention. The vanadium ions in the electrolyte solution are prepared by dissolving an oxide, sulphate, phosphate, nitrate, halogenide or other salt or complex of vanadium which is soluble or which can be solubilized in the electrolyte solution. Examples of suitable vanadium salts include ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3$ $V_2O_5$); cesium vanadium sulphate ($VCs(SO_4)_2$ $12H_2O$); iron metavanadate ($Fe(VO_2)_3$); lead metavanadate ($Pb(VO_5)_2$); potassium metavanadate ($KVO_3$); potassium vanadium sulphate ($KVSO_4$); rubidium vanadium sulphate ($RbV(SO_4)_2$); sodium meta vanadate ($NaVO_3$); meta vanadic acid ($HVO_3$); sodium orthovanadate ($Na_3VO_4$); potassium orthovanadate ($K_3VO_4$); ammonium orthovanadate; sodium pyrovanadate ($Na_4V_2O_7$); potassium pyrovanadate ($K_4V_2O_7$); ammonium pyrovanadate; sodium hexavanadate ($Na_4V_6O_{17}$); potassium hexavanadate ($K_4V_6O_{17}$); ammonium hexavanadate; thallium pyrovanadate ($Tl_4V_2O_7$); thallium metavanadate ($TlVO_3$); thallium pyrovanadate ($ThV_2O_7$ $6H_2O$); vanadium pentoxide ($V_2O_5$); vanadium sulphate ($V(SO_4)_2$); vanadium sulphate ($V_2(SO_4)_2$); vanadium oxide VO; and calcium and magnesium vanadates including calcium metavanadate and magnesium metavanadate. Other vanadium salts and complexes can also be dissolved and reduced in an electrolyte solution. Generally for an all-vanadium redox battery, the catholyte and anolyte include a solution of vanadium prepared from a salt selected from the group consisting of a salt of the formula $VO(X)_y$ where y is 2 and X is F, Br or Cl, a salt of the formula $VO(X)y$ where y is 1 and X is $SO_4$ or O, $V_2O_5$, $V_2O_3$, $V_2O_4$, $VSO_4$, $V_2(SO_4)_3$, $(VO_2)_2SO_4$, and $NH_4VO_3$. Vanadium salts or complexes such as ammonium metavanadate ($NH_4VO_3$), $V_2O_5$, $V_2O_3$, $V_2O_4$, $VSO_4$, $V_2(SO_4)_3$, $VOSO_4$ and ammonium vanadium sulphate ($NH_4V(SO_4)_2$) are particularly advantageous since no additional ions other than vanadium sulphate and ammonium are introduced permitting higher concentrations of vanadium ions to be prepared and reducing further treatment of electrolyte solution to remove unwanted products. It is especially preferable to dissolve vanadyl sulphate in 1M to 10M, more typically 1 to 9M, and even more typically 1 to 8M and yet even more typically 1 to 7.5M $H_2SO_4$ or $V_2O_5$ or ammonium metavanadate in 3M to 12M, more typically 3 to 10M, and even more typically 3 to 10M and yet even more typically 5 to 7.5M $H_2SO_4$ by electrolytic dissolution or by chemical leaching with V(III) or other suitable reductant (see e.g. International Application No. PCT/AU88/00471 the contents of which are incorporated herein by cross reference).

The cells and batteries of the invention may be constructed according to generally known methods for construction of redox cells.

The electrochemical reactions of the redox cell can be conducted in any electrochemical cell which has an anode compartment and a cathode compartment through which the appropriate fluids can be transported.

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the separator can be a microporous separator or a ionically conducting membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark), Selemion (Trade Mark) or New Selemion (Trade Mark) material as manufactured by Asahi Glass Company. Other suitable membranes are as disclosed in International Application No. PCT/AU92/00491, the contents of which are incorporated herein by cross reference).

Although the design of the anode and cathode compartments of the redox cell are not critical to the practice of this invention, certain embodiments are preferred. For example, a parallel plate electrochemical cell in which anode and cathode compartments alternate in order to increase voltage and decrease current is a preferred embodiment. The configuration of the cell may be such that there are intermediate bipolar electrodes between end plate electrodes. The electrode material will depend on the nature and composition of the anolytes and catholytes in the redox cell and are typically chosen on efficiency and stability grounds, i.e. the higher the efficiency and the greater stability in the particular anolyte and catholyte used in the redox battery, then generally the more it is favoured. Typical positive and negative electrodes may be metal, carbon/graphite, with suitable metals including transition metals such as titanium, iron, nickel, copper, silver, platinum, gold, palladium, tin, tantalum, cobalt, cadmium, lead, rithenium oxide, and alloys and mixtures thereof. Suitable carbon/graphite electrodes include those described in International Patent Application No. PCT/AU93/00456 incorporated herein by cross reference, glassy (amorphous) carbons, reticulated vitreous carbons, pyrolytic carbons, carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os, Re, Rh and/or Ag; platinised Ti; platinised Ru; platinised Ir; platinised Pd; Pt; Pt black; dimensionally stabilized anode (DSA-Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Tl; Bi; Pb; In; Cd; Ga; Sb; Zn; Pb/Hg; Pb/Bi; Hg/In; Hg/Cd; or Hg/Ga or other suitable electrodes. Generally, carbon/graphite electrodes such as glassy (amorphous) carbons, reticulated vitreous carbons, pyrolytic carbons, carbon and graphite felt, mat, plate, rod, knit, fibre, and cloth; are bonded onto a conducting substrate such as carbon impregnated teflon, carbon impregnated polyethylene, carbon impregnated polypropylene, carbon impregnated polystyrene, carbon impregnated polyvinylchloride and carbon impregnated polyvinylidenechloride, etc. Thus for the positive electrode typical stable materials include graphite/carbon based electrodes, Dimensionally Stable Anodes i.e. metal oxides such as $TiO_2$, $RuO_2$, $Ir_2O_3$, PtO, $MnO_2$ or mixtures of these coated onto a titanium substrate. Alternatively coatings of anion activated polypyrrole on conducting plastic where the conducting plastic can be graphite impregnated polyethylene/polypropylene or polyethylene/polypropylene impregnated with a mixture of 5–50% polypyrrole powder plus 5–20% graphite fibres or graphic felt/cloth/mat bonded onto a substrate of conducting plastic made of carbon black (10–50%), polyethylene or polypropylene (40–60%) and rubber (such as EPR) (10–40%). These conducting plastics can be used as substrates for coating polypyrrole electroactive films. For the negative reducing electrode typical cathode stable materials include graphite, carbon, graphite filled conducting plastics, Pb, Pt, Au, nickel, steel, etc or graphite felt/cloth/mat bonded onto a conducting plastic substrate made of carbon black, polyethylene or polypropylene and rubber.

The construction of the electrode will depend on the material type, with metal electrodes generally being in the form of plates, bars, and screens, or being sintered to form a highly porous structure. The positive and negative electrodes can be any shape desired. It is preferred that the positive and negative electrodes are rectangular-plate shaped. Metal electrodes may also be formed by depositing a film or layer of the metal on a nonconductive substrate, such as glass. The structure of carbon/graphite electrodes will depend upon the type of carbon. Glassy carbon electrodes are generally flat, polished surfaces while reticulated vitreous carbons are glass-like porous structures, typically pyrolyzed polyacrylonitriles. Pyrolytic carbons are produced by vapour phase deposition of carbon on a substrate, resulting in a polycrystalline structure with a high degree of atomic orientation. Preferred is the use of graphite, carbon/graphite or carbon felt electrodes which have been found to provide particularly effective catalytic sites after an oxidation pretreatment. The graphite, carbon/graphite or carbon felt electrodes are generally bonded onto a conducting carbon or graphite filled plastic electrode to form the final electrode configuration (see International Patent Application No. PCT/AU93/00456 incorporated herein by cross reference). Carbon felts are generally woven from yarns which are bundles of individual carbon monofilaments generally having a diameter in the range from about 1 to 50 mm, usually in the range from about 5 to 10 mm. The yarns will typically include from about 100 to 20,000 monofilaments, usually having from about 3,000 to 6,000 filaments. The denier of the yarns used as in fabricating the carbon felts will typically be in the range from about 500 to 5,000 mg/m, usually being in the range from about 1,000 to 2,000 mg/m. Denier is equal to the number of grams which yield 9,000 meters of the yarn or filament. The yarns are woven by conventional weaving machines yielding large fabrics which may be cut into the desired dimensions for the electrode. Each electrode may employ a plurality of layers of the fabric, so that the final dimensions of the electrode may vary widely. Generally, the electrodes will have a height in the range from about 0.5 cm to 2 meters, more typically, 5 to 1000 cm, a width in the range from about 0.1 cm to 2 meters, more typically, 5 to 1000 cm, and a thickness in the range from about 0.1 cm to 1.0 cm. The particular dimensions chosen will depend primarily on the power output of the electrochemical cell. Carbon felts suitable for use in the present invention may be obtained commercially from suppliers such as FMI Fibre Materials, Inc., Biddleford, Me.; Hercules, Inc., Wilmington, Del.; Celanese Engineering, Chatham, N.J.; Ultra Carbon Corp., Bay City, Mich.; and Union Carbide Corp., Mitsubishi, Japan, Toray, Japan, Kureha, Toyoba, Japan, Sigri, Germany, Specialty Polymers and Composites Division, Danbury, Conn.

The redox cell includes monopolar and bipolar type discharge cells, charge cells or charge/discharge cells. A bipolar discharge cell typically includes a plurality of positive discharge compartments each having a positive discharge electrode therein and a plurality of negative discharge compartments each having a negative discharge electrode therein and wherein each of the compartments are separated by a membrane. A bipolar discharge cell is typically of the flat plate-or filter press-type.

For other methods of dissolving $V_2O_5$ and other vanadium salts are disclosed below. According to another embodiment of this invention there is provided a process for producing a HED vanadium electrolyte solution, of above 1.8M, typically 3M up to and including supersaturated concentration, by dissolving and reducing a reducible vanadium compound disposed in, but not wholly dissolved in, an aqueous electrolyte by utilizing an electrochemical cell which aqueous electrolyte is in electrical contact with a positive electrode and a negative electrodes to dissolve and reduce at least a part of the compound in the electrolyte solution.

According to a tenth embodiment of this invention there is provided a process for producing a HED vanadium electrolyte solution, of above 1.8M, typically 3M up to and including supersaturated concentration, by dissolving and reducing a reducible vanadium compound disposed in, but not wholly dissolved in, an aqueous electrolyte by utilizing an electrochemical cell having a positive compartment containing a catholyte in electrical contact with a positive electrode, a negative compartment containing an anolyte comprising an aqueous electrolyte in electrical contact with a negative electrode, and an ionically conducting separator disposed between the positive and negative compartments and in contact with the catholyte and the anolyte to provide ionic communication therebetween which process comprises adding the vanadium compound to the aqueous electrolyte or wherein the vanadium compound is predisposed in the aqueous electrolyte, and providing electrical energy from an external circuit to the positive and negative electrodes to dissolve and reduce at least a part of the compound in the aqueous electrolyte.

The aqueous electrolyte can include vanadium (II) and/or vanadium (III) ions predisposed therein. The vanadium compound is thus reduced and dissolved by the V(II)/V(III) ions in addition to the aqueous solution and resultant V(IV) ions can be reduced at the negative electrode to V(II)/V(III) ions. Generally above saturated concentrations, or above 1.801M to supersaturated concentration, above 2M to supersaturated concentration, or 3M to 15M, or 5.1 to 15M, or 5.05 to 10M typically 5.25M to 8M or 3M to 8M V(II)/V(III) ions are included in the aqueous electrolyte. By V(II)/V(III) is meant V(II) ions alone or V(III) alone or a mixture of V(II) and V(III) ions.

According to a eleventh embodiment of this invention there is provided a process for producing a HED vanadium electrolyte solution, of above saturated concentration, by dissolving and reducing a reducible vanadium compound disposed in, but not wholly dissolved in, an aqueous electrolyte which process comprises adding a chemical reductant to the electrolyte solution to dissolve and reduce the compound in the electrolyte solution. According to a twelfth embodiment of this invention there is provided a process for producing a HED vanadium electrolyte solution, of above saturated concentration, by dissolving and reducing a reducible vanadium compound disposed in, but not wholly dissolved in, an aqueous electrolyte by utilizing a chemical reductant and an electrochemical cell having the aqueous electrolyte in electrical contact with a positive electrode and a negative electrode which process comprises:

(a) adding a chemical reductant to the electrolyte solution to assist in dissolution and reduction of the compound in the electrolyte solution; and (b) providing electrical energy from an external circuit to the positive and negative electrodes to dissolve and reduce at least a part of the compound in the electrolyte solution.

According to a thirteenth embodiment of this invention there is provided a process for producing a HED vanadium electrolyte solution, of 1.801M, typically 3M up to and including supersaturated concentration, by dissolving and reducing a reducible vanadium compound disposed in, but not wholly dissolved in, an aqueous electrolyte by utilizing a chemical reductant and an electrochemical cell having a positive compartment containing a catholyte in electrical contact with a positive electrode, a negative compartment containing an anolyte comprising the aqueous electrolyte in electrical contact with a negative electrode, and an ionically conducting separator disposed between the positive and negative compartments and in contact with the catholyte and the anolyte to provide ionic communication therebetween which process comprises:

(a) adding a chemical reductant to the anolyte to assist in dissolution and reduction of the compound in the anolyte; and (b) providing electrical energy from an external circuit to the positive and negative electrodes to dissolve and reduce at least a part of the compound in the electrolyte solution.

Alternative processes for the preparation of a HED vanadium electrolyte solution, optionally highly supersaturated with vanadium ions can be performed by adapting the processes described in AU85862/91, the contents of which are incorporated by cross reference.

The chemical reductant can be a V(II), V(III) or V(IV) compound, which is soluble in the electrolyte solution or an aqueous solution containing V(II), V(III) and/or V(IV) ions, particularly an aqueous solution of $VSO_4$.dihydrate, hydrated $(V_2(SO_4)_3)$ and/or $VSO_4.7H_2O$, in an amount sufficient to dissolve and reduce the vanadium compound. It is particularly preferred that a V(II) or V(III) compound, or the aqueous solution contains V(II) and/or V(III) ions. Even more preferable is that a V(III) compound is used as a reductant for $V_2O_5$ or $NH_4VO_3$.

The chemical reductant may also be $KHC_2O_4.H_2O$, $K_2C_2O_4$, $Na_2C_2O_4$, $(NH_4)_2C_2O_4NH_4HC_2O_4.H_2O$, $LiHC_2O_4.H_2O$, $NaHC_2O_4.H_2O$, $Li_2C_2O_4$, $SO_2$, $H_2C_2O_4$, $H_2SO_3$, $NaHSO_3$, $Na_2SO_3$, $Na_2S_2O_3$, $Na_2S_2O_4$, $Na_2S_2O_5$, $Na_2S_2O_6$, $Li_2SO_3$, $Li_2SO_6$, $KHSO_3$, $K_2SO_3$, $K_2S_2O_3$, $K_2S_2O_4$, $K_2S_2O_5$, $K_2S_2O_6$, $NH_4HSO_3$, $(NH_4)_2SO_3$, $(NH_4)_2SO_4$, $(NH_4)_2SO_5$, $N_2H_4$, $H_2N_2H_2 \cdot H_2O$, $H_2N_2H_2 \cdot H_2SO_4$, $(NH_4)_2SO_6$, $NaBH_4$, $LiBH_4$, $KBH_4$, $Be(BH_4)_2$, $D_2$, $T_2$, S, $H_2O_2$, hydrazine, sulphurous acid, hydrazine dihydrochloride, hydrogen peroxide, $CaH_2$, $MgH_2$, $H_2$ or calcium and magnesium salts of sulphurous acid, alkali-hydrogen-phosphites (Li, K, Na), alkali hypophosphites (Li, K, Na), hydroxyl amines, pyrosulphurous acid and dithioneous acid. Other chemical reductants can be used. For example, in principle it should possible to use a reducing organic water-soluble compound such as a reducing organic water-soluble mercapto group-containing compound including SH-containing water-soluble lower alcohols (including SH-containing $C_1$–$C_{12}$ primary, secondary and tertiary alkyl alcohols), SH-containing $C_1$–$C_{12}$ primary, secondary and tertiary alkyl carboxylic acids, SH-containing $C_1$–$C_{12}$ primary, secondary and tertiary alkyl amines and salts thereof, SH-containing $C_1$–$C_{12}$ primary, secondary and tertiary alkyl amine acids and di- or tripeptides such as 2-mercaptoethylamine hydrochloride, 2-mercaptoethanol, 2-mercaptopropionylglycine, 2-mercaptopropionic acid, cystenylglycine, cysteine, carbamoyl cysteine, homocysteine, glutathione, cysteine hydrochloride ethyl ester and acetylcysteine. In principle it should also be possible to employ photocatalytic reduction and photoreduction at a semiconductor photocathode.

Reductants such as $(NH_4)_2C_2O_4NH_4HC_2O_4.H_2O$, $SO_2$, S, $H_2O_2$, $H_2C_2O_4$, $NH_4HSO_3$, $(NH_4)_2SO_3$, $(NH_4)_2SO_4$, $(NH_4)_2SO_5$, $N_2H_4$, $H_2N_2H_2.H_2O$, $H_2N_2H_2.H_2SO_4$, $(NH_4)_2SO_6$ and $H_2$ are particularly advantageous as reductants since at least some of the reaction product is gaseous permitting higher concentrations of vanadium ions to be prepared and reducing further treatment of electrolyte solution to remove unwanted products.

The vanadium compound can be ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3$ $V_2O_5$); cesium vanadium sulphate ($VCs(SO_4)_2$ $12H_2O$); iron metavanadate ($Fe(VO_2)_3$); lead metavanadate ($Pb(VO_5)_2$); potassium i metavanadate ($KVO_3$); potassium vanadium sulphate ($KVSO_4$); rubidium vanadium sulphate ($RbV(SO_4)_2$); sodium meta vanadate ($NaVO_3$); meta vanadic acid ($HVO_3$); sodium orthovanadate ($Na_3VO_4$); sodium pyrovanadate ($Na_4V_2O_7$); sodium hexavanadate ($Na_4V_6O_{17}$); thallium pyrovanadate ($Tl_4V_2O_7$); thallium metavanadate ($TlVO_3$); thallium pyrovanadate ($ThV_2O_7$ $6H_2O$); vanadium pentoxide ($V_2O_5$); vanadium sulphate ($V(SO_4)_2$); $V_2O_3$, $V_2O_4$, $VO_2$, VO and calcium and magnesium vanadates including calcium metavanadate and magnesium metavanadate. Other vanadium salts and complexes can also be dissolved and reduced in an electrolyte solution by the processes of the invention. For example, in principle it should also be possible to produce highly supersaturated HED vanadium electrolyte solutions by dissolving and reducing vanadium salts occurring in vanadium-bearing minerals such as patronite, bravoite, sulvanite, davidite, roscoelite, carnotite, vanadinite, descloizite, cuprodescloizite, vanadiferous phosphate rock and titaniferous magnetite using the processes of the invention as well as for recovering vanadium from spent catalysts and fly-ash.

Vanadium salts or complexes such as ammonium metavanadate ($NH_4VO_3$), $VOSO_4$, and ammonium vanadium sulphate ($NH_4V(SO_4)_2$), $V_2O_5$, $V_2O_3$, $V_2O_4$, $VO_2$, are particularly advantageous since they permit higher concentrations of vanadium ions to be prepared and reduce further treatment of electrolyte solution to remove unwanted products.

Supersaturated vanadium electrolyte solutions can also be prepared by adding V(II), V(III) or V(IV) compounds to a solution containing V(V) ions which act as an oxidising agent to oxidise and dissole the normally insoluble vanadium compound. For example, $V_2O_3$ can be dissolved by a V(V) solution to produce a supersaturated V(IV) solution. The electrolyte typically comprises an aqueous solution which includes $H_2SO_4$, trifluoromethanesulphonic acid, $Na_2SO_4$, $K_2SO_4$, ammonium sulphate, $H_3PO_4$, $Na_3PO_4$, $K_3PO_4$, $HNO_3$, $KNO_3$, $NaNO_3$, $C_6$–$C_{14}$, arylsulphonic acid such as p-toluenesulphonic acid monohydrate, sulphamic acid, $C_1$–$C_6$ alkylsulphonic acid such as methylsulphonic acid and ethylsulphonic acid or acetic acid or mixtures thereof in a concentration of from 0.01M to 15M, 0.01M to 10M or 0.25M to 10M, more typically 1M to 10M, even more typically 1.801M to 10M, 2 to 10M, 2.01M to 10M, 2.5M to 10M, yet even more typically 3 to 10M, yet even more typically 4 to 7M, and yet even more typically 5 to 9M. It is especially preferred to use $H_2SO_4$ in a concentration of from 0.25M to 10M, more typically 1M to 10M, even more typically 2 to 10M, yet even more typically 3 to 10M, yet even more typically 4 to 10M, and yet even more typically 5 to 9M.

The processes of the invention are typically performed in the temperature range 10–99° C., 25–99° C., or 25–70° C. more typically 25–60° C., more typically 35–60° C.

During the processes of the invention the electrolyte solution is typically stirred or agitated preferably with a mechanical stirrer or by fluidization of the solid reactants using electrolyte solution flow.

The processes of the invention are typically, but not necessarily, conducted under an inert atmosphere such as nitrogen, argon, helium or neon or mixtures thereof.

The means to maintain and/or control the operating temperature of the all-vanadium redox battery or redox battery/ fuel cell, so as to substantially prevent or significantly reduce crystallisation or precipitation of vanadium substances/compounds from the catholyte and/or anolyte, may be any suitable heating and/or cooling and/or insulating means, e.g. a hotplate, hot water or steam jacket, hot gas jacket (heated with, for example, hot gas exhausted from a car engine or solar heated hot air), heating mantle, electrical heater, heat exchanger (including a solar heat exchanger such as a solar hot water heat exchanger), or a gas flame (such as a flame from a Bunsen burner or from a natural gas burner) or polystyrene insulation.

The positive and negative electrodes can be any shape desired. It is preferred that the positive and negative electrodes are rectangular-plate shaped although the positive electrode can be an expanded metal sheet to allow for zero gap from the membrane while facilitating escape of $O_2$ gas.

A carbon slurry positive electrode can be used to depolarise the cell and lower the energy requirements.

The positive and negative electrodes can be carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os, Re, Rh and/or Ag; platinised Ti; platinised Ru; platinised Ir; platinised Pd; Pt; Pt black; dimensionally stabilized anode (DSA-Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Tl; Bi; Pb; In; Cd; Ga; Sb; Zn; Pb/Hg; Pb/Bi; Hg/In; Hg/Cd; or Hg/Ga or other suitable electrodes.

In particular the positive electrode can be selected from the group consisting of DSA; Pb; Pb alloy (E.g. Pb—Bi alloy); platinised Ti; platinised Ru; platinised Ir; and $V_2O_5$ coated on Pb, Ti, Zr, Hf, Ta, W or Nb which are also suitable materials for use as positive charge electrodes in an all-vanadium redox charge cell as has been disclosed in the PCT/AU88/00472, the contents of which are incorporated herein by cross reference. $V_2O_5$ coated electrodes would be unsuitable negative electrodes as they would dissolve. A DSA electrode performs well as a positive or negative electrode.

Preferably a DSA, Pb, $V_2O_5$ on Pb or graphite anode is used. It is preferred that a Pb or graphite cathode is used.

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the ionically conducting separator can be a microporous separator such as Daramic (Trade Mark) or a membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark) or Selemion (Trade Mark) material as manufactured by Asahi Glass Company.

The electrochemical cell includes monopolar and bipolar type cells. A bipolar cell typically includes a plurality of positive compartments each having a positive electrode therein and a plurality of negative compartments each having a negative electrode therein and wherein each of the compartments are separated by a membrane. A bipolar cell is typically of the flat plate- or filter press-type.

By the processes of the invention HED electrolyte solution having vanadium ions in sufficient concentration in an aqueous electrolyte, above saturated concentrations, or 0.5 to 15M or 3M to 10M, 5M to 10M, and more typically 3M to 8M or 5M to 8M which are suitable for use in a practical all-vanadium battery can be prepared in a single step process. Typically a HED aqueous electrolyte having vanadium ions 1.801M to 15M, 2M to 15M, 2.01M to 15M, 3M to 15M or 5M to 15M or 5M to 10M, more typically 3M to 9M or 5 to 9M, yet even 2M to 7M, 2.01M to 5.5M, 2.01M to 7M, 3M to 7M or 5.75 to 6.75M or 7.5 to 7.5M or 6.5 to 7.5M or 5 to 5.5M or 5.5 to 6.5M or 5.001 to 10M or 5.001 to 5.5M, or 5.001 to 6M or 5.001 to 6.5M or 5.001 to 7M or 5.001 to 8M or 5.001 to 9M, for example, vanadium ions (including V(II), V(III), V(IV), and V(V) ions) may be prepared. It is especially preferred to use $H_2SO_4$ in a concentration of from 0.25M to 17M, more typically 1M to 10M, even more typically 2 to 9M, yet even more typically 3 to 8M, yet even more typically 4 to 9M, and yet even more typically 5 to 9M. By passage of the appropriate number of coulombs an electrolyte solution consisting of 50% M V(III) to 50% M V(IV) can be obtained. Equal volumes of this solution can then be used for each half-cell so that no overcharge of the positive side is required for the initial charging process.

If precipitation of any of the vanadium ions does eventually occur however, it can easily be redissolved by combining the catholyte with the anolyte. This will result in dissolution of the precipitate forming a solution which is mixture of V(III) and V(IV) as in an uncharged battery which can readily be recharged and return battery to its original state. Occasional mixing of the catholyte and anolyte is beneficial as it assists in rebalancing the cell. Unequal rates of diffusion of the different ions of vanadium across a membrane gradually leads to a greater concentration of vanadium ions on one side, but by periodically mixing the catholyte and anolyte and equally dividing the volumes into the +ve and −ve tanks, a rebalanced cell can be readily achieved. Alternatively any precipitate formed in the battery can be redissolved by reversing the polarity of the cell or stack (or battery) and slowly recharging the electrolyte solutions.

According to a fourteenth embodiment of this invention there is provided an all-vanadium redox charge cell having:
 a negative charge compartment having a negative charge electrode for charging a charge anolyte in electrical contact with said negative charge electrode, the charge anolyte comprising an electrolyte solution containing trivalent and/or tetravalent vanadium ions of above 1.8M, more typically above 2M, even more typically above 2.5M or 3M, or typically 5M up to 10M to 20M;
 a positive charge compartment having a positive charge electrode for charging a charge catholyte in electrical contact with said positive charge electrode, the charge catholyte comprising an electrolyte solution containing tetravalent vanadium ions of above 1.8M, more typically above 2M, even more typically above 2.5M or 3M, or typically 5M up to 10M to 20M; and
 an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode.

The positive and negative charge electrodes can be any shape desired. It is preferred that the positive and negative charge electrodes are rectangular-plate shaped.

The positive and negative charge electrodes are chosen from electrode materials which are stable in the charge catholyte and charge anolyte respectively in the potential ranges in which the respective charge reactions occur.

The negative charge electrode has a higher hydrogen overvoltage than copper to minimise $H_2$ evolution during the charging reaction at the positive charge electrode. Low $H_2$ evolution during charging means low volume water loss from the cell electrolyte solution, low risk of $H_2$ explosion and high coulombic charging efficiency at the negative charge electrode. The negative charge electrode can be selected from the group consisting of Tl; Bi; Pb; Pb alloys; Hg; In; Cd; Ag; Ga; Sb; Zn; Pb/Hg; Pb/Bi; Hg/In; Hg/Cd; Hg/Ga; Hg/Ag; carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; and cellulose (most of the metallic materials could not be used to discharge the negative half-cell because they will corrode or passivate at the discharge potentials). In an all-vanadium redox charge cell in which the charge anolyte comprises up to and including supersaturated concentrations, or above 1.8M to supersaturated concentration, or 2M to 15M, or 2.01M to 15M, 3M to 15M or 5.01M–15M trivalent/tetravalent vanadium ions in 00.01M–18M, or 01M–10M $H_2SO_4$ and the charge catholyte comprises above saturated concentrations, or 1.801M to 15M or 2M to 15M, 2.01M–15M Or 3–15M pentavalent-tetravalent vanadium redox system in 0.01M–18M $H_2SO_4$, the open circuit potential of the negative charge cell is about −0.4V vs SHE. It is preferable to select the negative charge electrode from electrode materials which are stable to corrosion at the open circuit potential. Whilst some of the preceding negative charge electrode materials will dissolve/complex/corrode at open circuit (e.g. Cd and In) they can still be utilized but in such instances there is a need to continuously apply a suitable negative potential to such materials as they are bought into contact with the anolyte, so that the potential of the materials is more negative than −0.4V vs SHE, thus preventing the materials from corroding.

The inventor has found surprisingly that many materials are unsuitable for use as a positive charge electrode and they have also found unpredictably that a number of materials which are suitable for use as the positive charge electrode can be selected from the group consisting of Pb, Pb alloys, DSA, platinised Ti; platinised Ru; platinised Ir; and $V_2O_5$ coated on Pb, Ti, Zr, Hf, Ta, W or Nb. The $V_2O_5$ coated electrodes would be unsuitable for the positive half-cell in a discharging battery as it would dissolve at the discharge potential range. A DSA electrode would perform well for both charging and discharging but it is an expensive electrode material and the lifetime of DSA electrodes is limited as has been found by cycling experiments.

The charge cell of the invention includes monopolar and bipolar type charge cells. A bipolar charge cell typically includes a plurality of positive charge compartments each having a positive charge electrode therein and a plurality of negative charge compartments each having a negative charge electrode therein and wherein each of the compartments are separated by a membrane. A bipolar charge cell is typically of the flat plate or containing filter press-type.

The charge cell can include a charge anolyte reservoir for storing charge anolyte operatively coupled to the negative charge compartment by charge anolyte supply and return lines via a pump and a charge catholyte reservoir for storing charge catholyte operatively coupled to the positive charge compartment by charge catholyte supply and return lines via a pump.

In an alternative arrangement the charge cell can include a charge anolyte charge reservoir having charge anolyte charge supply and return line or lines for charging further charge anolyte which is to be delivered to the negative charge compartment, and optionally means to maintain and/or control the operating temperature of anolyte in the charge anolyte charge reservoir and optionally in the charge anolyte charge supply and return line or lines so as to substantially prevent or significantly reduce crystallisation or precipitation of vanadium substances/compounds from the charge anolyte, typically above 20, more typically above 25° C., and a charge catholyte charge reservoir having charge catholyte charge supply and return line or lines for charging further charge catholyte which is to be delivered to the positive charge compartment, and optionally means to maintain and/or control the operating temperature of catholyte in the charge catholyte charge reservoir and optionally in the charge catholyte charge supply and return line or lines so as to substantially prevent or significantly reduce crystallisation or precipitation of vanadium substances/compounds from the charge catholyte, typically above 20, more typically above 25° C., a discharge anolyte storage reservoir having discharge anolyte storage supply and return line or lines for storing discharged anolyte from the negative charge compartment, and optionally means to maintain and/or control the operating temperature of discharge anolyte in the discharge anolyte discharge reservoir and optionally in the discharge anolyte discharge supply and return line or lines so as to substantially prevent or significantly reduce crystallisation or precipitation of vanadium substances/compounds from the discharge anolyte, typically above 20, more typically above 25° C., and a discharge catholyte storage reservoir having discharge catholyte storage supply and return line or lines for storing discharge catholyte from the positive charge compartment, and optionally means to maintain and/or control the operating temperature of discharge catholyte in the discharge catholyte discharge reservoir and optionally in the discharge catholyte discharge supply and return line or lines so as to substantially prevent or significantly reduce crystallisation or precipitation of vanadium substances/compounds from the discharge catholyte, typically above 20, more typically above 25° C., and pumping means operatively coupled to the charge anolyte storage line or lines and/or the discharge anolyte discharge line or lines and to the charge catholyte storage line or lines and/or the discharge catholyte discharge line or lines for pumping:

(i) the catholyte through the charge catholyte storage line or lines, the positive charge compartment and the discharge catholyte discharge line or lines; and (ii) the anolyte through the charge anolyte solution storage line or lines, the negative charge compartment and the discharge anolyte solution discharge line or lines.

Alternatively, a wider operating temperature range can be used by including a stabilising amount of asuitable stabilizing agent(s).

According to a fifteenth embodiment of this invention there is provided a process for charging a charge anolyte and a charge catholyte of an all-vanadium redox charge cell having:

a negative charge compartment containing a charge anolyte and having a negative charge electrode for charging said charge anolyte in electrical contact with said negative charge electrode, the charge anolyte comprising an electrolyte solution containing trivalent and/or tetravalent vanadium ions of above 1.8M, more typically above 2M, even more typically above 2.5M or 3M, or typically 5M above saturated concentrations;

a positive charge compartment containing a charge catholyte and having a positive charge electrode for charging said charge catholyte in electrical contact with said positive charge electrode, the charge catholyte comprising an electrolyte solution containing tetravalent vanadium ions of above 1.8M, more typically above 2M, even more typically above 2.5M or 3M, or typically 5M up to and including supersaturated concentrations; and an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode; which process comprises providing electrical energy to the positive and negative charge electrodes to derive divalent vanadium ions in the charge anolyte above 1.8M, more typically above 2M, even more typically above 2.5M or 3M, or typically from 5M up to and including supersaturated concentrations, and pentavalent vanadium ions in the charge catholyte above 1.8M, more typically above 2M, even more typically above 2.5M or 3M, or typically from 5M up to and including supersaturated concentrations.

A further embodiment of the invention involves an electrochemical apparatus for power delivery employing an array of cells comprising a positive electrode at one end of the array, a negative electrode at the other end of the array, and one or more bipolar electrodes between the end electrodes. A hydrogen peroxide solution or a bubbly dispersion of air/oxygen in an electrolyte solution is pumped through the positive half cells of the array while a HED solution of V(II) or V(II)/V(III) is pumped through the negative half-cells to produce energy (and thus electricity) according to the reactions:

Positive electrode: $\frac{1}{2}O_2 + 2H^+ + 2e \rightarrow H_2O$

Negative electrode: $\frac{1}{2}V^2 \rightarrow 2V^{3+} + 2e$

Stabilised Electrolyte Solution

Typically the electrolyte solution is circulated separately through the the positive and negative compartments According to a another embodiment of the present invention there is provided a method for stabilising an electrolyte solution for use in a redox cell, the method comprising: adding a stabilising amount of a stabilising agent to the electrolyte solution.

In particular there is provided a method of preparing a stabilised electrolyte solution for use in a redox cell, said solution containing an electrolyte, the method comprising:

(A) dissolving a first substance in the solution which first substance when dissolved in the solution produces redox ions in the solution;

(B) adding a stabilising amount of a stabilising agent to the solution to stabilise the redox ions in the solution.

The stabilising agent may be added to the solution before, at the same time, or after the first substance is dissolved in the solution.

The method may further comprise:

(C) optionally oxidising the vanadium redox ions in the solution to produce vanadium redox ions in the solution at a higher oxidation state to generate an oxidant capable of dissolving a second substance in the solution which second substance when dissolved in the solution produces vanadium redox ions in the solution;

(C') optionally reducing the vanadium redox ions at a higher oxidation state in the solution to a lower oxidation state to generate a reductant capable of dissolving a second substance in the solution which second substance when dissolved in the solution produces vanadium redox ions in the solution;

(D) adding a second substance in the solution which second substance when dissolved in the solution produces vanadium redox ions in the solution;

(E) if required, dissolving an additional stabilising amount of a second stabilising agent in the solution in an amount capable of stabilising said more of the vanadium redox ions wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(F) dissolving the second substance in the solution;

(G) optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(G') optionally reducing the vanadium redox ions at a higher oxidation state in the solution to a lower oxidation state to generate a reductant capable of dissolving more of the second substance in the solution which second substance when dissolved in the solution produces vanadium redox ions in the solution;

(H) optionally repeating steps (C)–(G'), or (C)–(G), or (C), (D), (E), (F) and (G'), or (C')–(G'), or (C')–(G), or (C'), (D), (E), (F) and (G') to obtain the required concentration of the vanadium redox ions in the solution.

Alternatively, the method may further comprise:

(C) reducing the vanadium redox ions at a higher oxidation state in the solution to a lower oxidation state to generate a reductant capable of dissolving a second substance in the solution;

(D) adding a second substance in the solution which second substance when dissolved in the solution produces vanadium redox ions in the solution;

(E) if required, dissolving an additional stabilising amount of a second stabilising agent in the solution in an amount capable of stabilising said more of the vanadium redox ions wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(F) dissolving the second substance in the solution;

(G) optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(G') optionally reducing the vanadium redox ions at a higher oxidation state in the solution to a lower oxidation state to generate a reductant capable of dissolving more of the second substance in the solution which second substance when dissolved in the solution produces vanadium redox ions in the solution;

(H) optionally repeating steps (C)–(G'), or (C)–(G), or (C). (D), (E), (F) and (G') to obtain the required concentration of the vanadium redox ions in the solution.

The additional stabilising agent may be added to the solution before, at the same time, or after the second substance is added to the solution.

Alternatively there is provided a method of preparing a stabilised all-vanadium electrolyte solution for use in an all-vanadium redox battery, the stabilised electrolyte solution comprising vanadium redox ions, an electrolyte and a stabilising amount of a stabilising agent, the method comprising:

(a) adding a first substance to an electrolyte solution which first substance when dissolved in the solution produces vanadium redox ions in the solution;

(b) dissolving a stabilising amount of a first stabilising agent in the solution capable of stabilising the redox ions in the solution wherein the stabilising amount of the first stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(c) dissolving the first substance in the solution;

(c') optionally oxidising the vanadium redox ions in the solution to produce vanadium redox ions in the solution at a higher oxidation state to generate an oxidant capable of dissolving a second substance in the solution which second substance when dissolved in the solution produces vanadium redox ions in the solution;

(d) optionally reducing the vanadium redox ions at a higher oxidation state in the solution to a lower oxidation state to generate a reductant capable of dissolving a second substance in the solution which second substance when dissolved in the solution produces vanadium redox ions in the solution;

(e) optionally adding the second substance to the solution which second substance when dissolved in the solution produces vanadium redox ions in the solution;

(f) optionally dissolving a stabilising amount of a second stabilising agent to the solution capable of stabilising the vanadium redox ions in the solution wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(g) optionally dissolving the second substance in the solution;

(g') optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(h) optionally reducing the vanadium redox ions at a higher oxidation state in the solution to a lower oxidation state to generate a reductant capable of dissolving more of the second substance in the solution which second substance when dissolved in the solution produces vanadium redox ions in the solution;

(i) optionally repeating steps (e)–(h), or (e)–(g'), or (e), (f), (g) and (h) to obtain the required concentration of the vanadium redox ions in the solution.

The stabilising agent in (b) may be dissolved in the solution before, at the same time, or after the first substance is added to or dissolved in the solution.

The stabilising agent in (f) may be dissolved in the solution before, at the same time, or after the second substance is added to or dissolved in the solution.

The first substance may be the same as the second substance. The first substance may be different from the second substance.

The stabilising amount of the stabilising agent is less (e.g. 50molar % or lower, more typically less than 10molar %) than that required to fully complex the redox ions in the electrolyte solution.

In steps (A) and (F) said dissolving may be selected from the group consisting of chemically dissolving, simply dissolving, electrolytically dissolving and a combination of chemically dissolving and electrolytically dissolving.

In step (c) and (g) said dissolving may be selected from the group consisting of chemically dissolving, simply dissolving, electrolytically dissolving and a combination of chemically dissolving and electrolytically dissolving.

A stabilised electrolyte solution produced by the method of the invention is included within the scope of the invention.

According to a further embodiment of the present invention there is provided a stabilised electrolyte solution for use in a redox cell, the stabilised electrolyte solution comprising redox ions, an electrolyte and a stabilising amount of a stabilising agent.

Generally the electrolyte solution contains redox ions which may or may not be present in the form of a redox couple(s). Typically the solution is an aqueous solution.

Included within the scope of the invention is an electrolyte for use in a vanadium redox cell comprising an aqueous solution of vanadium ions, an acid and a stabilising amount of a stabilising agent.

The vanadium ions may be in a concentration of up to and including a supersaturated concentration.

The redox ions may be metal ions including transition metal ions (including the various forms of metal ions that exist in the solution under consideration) and the redox couple may be a metal ion redox couple (including the various forms of couples that exist in the solution under consideration). Examples of redox ions are vanadium ions, chromium ions, tin ions, titanium ions, iron ions, manganese ions, molybdenum ions, lead ions, nickel ions, copper ions, cobalt ions, cerium ions, bismuth ions, silver ions, gold ions, cadmium ions, mercury ions, platinum ions, palladium ions, iridium ions, osmium ions, rhenium ions, tungsten ions, tantalum ions, zirconium ions, hafnium ions, lanthanum ions, europium ions, samarium ions, neodymium ions, yttrium ions, zirconium ions, and niobium ions or any mixture thereof, for example (e.g. in a concentration range up to and including a supersaturated concentration, such as above 1.8M, above 2M, 0.25M to 10M, 2M to 10M, 2M to 9M, 2M to 8M, 2.5M to 9M, 2.8M to 8M, 3M to 7M, 3M to 6M, 4M to 6.5M, 5.001M to 10M, 5.001M to 7.5M, 5.001M to 10M, 5.001M to 7.0M, and 5.001M to 6M). Vanadium redox ions and vanadium redox couples are especially suitable to use in the invention (especially in a concentration range such as above 1.8M, above 2M, 0.25M to 10M, 2M to 10M, 2M to 9M, 2M to 8M, 2.5M to 9M, 2.8M to 8M, 3M to 7M, 3M to 6M, 4M to 6.5M, 5.001M to 10M, 5.001M to 7.5M, 5.01M to 10M, 5.001M to 7.0M, and 5.001M to 6M). A stabilised electrolyte solution wherein the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of tetravalent and pentavalent vanadium ions is particularly useful.

According to another embodiment of the present invention there is provided a stabilised electrolyte solution for use in a redox cell comprising an aqueous solution of redox ions, an electrolyte and a stabilising amount of a stabilising agent.

According to a further embodiment of the present invention there is provided a redox cell or redox battery comprising a stabilised electrolyte solution produced by the method of the invention.

Typically the redox cell is an all vanadium redox cell and the redox battery is an all vanadium redox battery.

According to a further embodiment of this invention there is provided a redox battery having a positive compartment containing a catholyte in electrical contact with a positive electrode, the catholyte comprising an electrolyte solution containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolyte solutions having an effective stabilising amount of a stabilising agent for stabilising the redox ions in at least one of the electrolyte solutions.

Also disclosed is a redox battery having a positive compartment containing a catholyte in electrical contact with a positive electrode, the catholyte comprising an electrolyte solution containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, the catholyte and/or anolyte having an effective stabilising amount of a stabilising agent for stabilising the catholyte and/or anolyte respectively.

The redox ions may be stabilised at up to and including a supersaturated concentration.

According to another embodiment of this invention there is provided an all-vanadium redox battery having a positive compartment containing a catholyte in electrical contact with a positive electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the electrolyte solutions has an effective stabilising amount of a stabilising agent for stabilising the at least one of the electrolyte solutions.

In the all-vanadium redox battery of the invention the at least one of the electrolyte solutions may be the catholyte, the anolyte or the anolyte and the catholyte.

Also disclosed is an all-vanadium redox battery having a positive compartment containing a catholyte in electrical contact with a positive electrode, the catholyte comprising an electrolyte solution containing trivalent and/or tetravalent vanadium ions and/or pentavalent vanadium ions, a negative compartment containing an anolyte in electrical contact with a negative electrode, the anolyte comprising an electrolyte solution containing tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have an effective stabilising amount of a stabilising agent for stabilising the catholyte and/or anolyte respectively.

The vanadium ions in the catholyte and/or anolyte may be stabilised at up to and including a supersaturated concentration.

According to another embodiment of this invention there is provided an all-vanadium redox battery having a positive compartment containing a catholyte in electrical contact with a positive electrode, the catholyte comprising an electrolyte solution containing up to and including a supersaturated concentration, 0.001 to 15M, 0.5 to 10M, optionally 3 to 9M, trivalent and/or tetravalent vanadium ions and/or pentavalent vanadium ions, a negative compartment containing an anolyte in electrical contact with a negative electrode, the anolyte comprising an electrolyte solution containing up to and including a supersaturated concentration, 0.001 to 15M, 0.5 to 10M, optionally 3 to 9M, tetravalent vanadium ions, trivalent vanadium ions and/or divalent vanadium ions, and a separator or membrane disposed between the positive and negative compartments and in contact with the catholyte and anolyte to provide ionic communication therebetween and wherein the catholyte and/or anolyte have an effective stabilising amount of a stabilising agent for stabilising the catholyte and/or anolyte respectively.

Also disclosed is a process for recharging an all-vanadium redox battery of the invention when said battery is discharged or partially discharged, which process comprises providing electrical energy to the positive and negative electrodes to derive divalent vanadium ions in the anolyte and pentavalent vanadium ions in the catholyte.

During the process of recharging the conditions of the anolyte and/or catholyte solutions may be such so as to reduce precipitation of the vanadium redox ions from the electrolyte solution to a rate whereby the all-vanadium electrolyte solution is acceptable for use in an all-vanadium redox battery.

During the process of recharging the conditions of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the temperatures of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

During the process of recharging the temperatures of the anolyte and/or catholyte solutions and the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

Also disclosed is a process for the production of electricity from an all-vanadium redox battery of the invention when said battery is charged or partially charged, which process comprises withdrawing electrical energy from the redox battery by loading an external circuit in electronic communication with the positive and negative electrode.

During the process of the production of electricity the conditions of the anolyte and/or catholyte solutions may be such so as to reduce precipitation of the vanadium redox ions from the electrolyte solution to a rate whereby the all-vanadium electrolyte solution is acceptable for use in an all-vanadium redox battery.

During the process of the production of electricity the conditions of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the temperatures of the anolyte and/or catholyte solutions may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

During the process of the production of electricity the temperatures of the anolyte and/or catholyte solutions and the concentrations of the electrolyte in the anolyte and/or catholyte may be maintained and/or controlled so as to reduce precipitation of the vanadium redox ions from the electrolyte solution to a rate whereby the all-vanadium electrolyte solution is acceptable for use in an all-vanadium redox battery.

Conditions that may be maintained and/or controlled apart from electrolyte concentration in the anolyte and/or catholyte (e.g. sulphuric acid concentration and/or total sulphate concentration) and/or temperature of the anolyte and/or catholyte solutions, include pH's of the anolyte and/or catholyte, pumping rates of the anolyte and/or catholyte through the negative and positive compartments, concentrations of the stabilizing agent(s) in the anolyte and/or catholyte, concentrations of the various vanadium redox ions and/or couples in the anolyte and/or catholyte, and oxygen concentrations of the various vanadium redox ions and/or couples in the anolyte and/or catholyte. The pH and concentrations and pumping rates of the above mentioned species may be measured by appropriate probes or other means known in the art.

An all-vanadium redox battery system is also provided consisting of a combination of the all-vanadium redox battery of the invention and an anolyte reservoir for storing anolyte coupled to the negative compartment by anolyte supply and return lines via a pump and a catholyte reservoir for storing catholyte coupled to the positive compartment by catholyte supply and return lines via a pump.

Another all-vanadium redox battery is provided which consists of a combination of the all-vanadium redox battery of the invention and an anolyte charge reservoir having anolyte charge supply and return line or lines for charging further anolyte which is to be delivered to the negative compartment and a catholyte charge reservoir having catholyte charge supply and return line or lines for charging further catholyte which is to be delivered to the positive compartment an anolyte storage reservoir having anolyte storage supply and return line or lines for storing anolyte from the negative compartment and a catholyte storage reservoir having catholyte storage supply and return line or lines for storing catholyte from the positive compartment and pumping means associated with the anolyte storage line or lines and/or the anolyte charge line or lines and with the catholyte storage line or lines and/or the catholyte charge line or lines for pumping:

(i) the catholyte through the catholyte storage line or lines, the positive compartment and the catholyte charge line or lines; and (ii) the anolyte solution through the anolyte solution storage line or lines, the negative compartment and the anolyte solution charge line or lines.

Discharging and charging of the catholyte and anolyte may be conducted in sealed air tight cells and can be conducted under an inert atmosphere such as nitrogen, argon, helium or neon or mixtures thereof although an inert atmosphere can be avoided in a sealed system. During discharging and charging the electrolyte solutions may be stirred or agitated preferably by bubbling an inert gas and/or with a mechanical stirrer or by pumping the electrolyte solutions (i.e. the anolyte and catholyte) through the positive and negative compartments. To prevent air oxidation of the V(II) to V(III) in the anolyte, a blanket of an inert immiscible liquid such as paraffin oil or other hydrocarbon oil or a mineral oil, a vegetable oil e.g. arachis oil, olive oil, sesame oil, groundnut oil, peanut oil or coconut oil, a fish oil e.g. tuna oil, mackeral oil, sand eel oil, menhaden oil, anchovy oil, sardine oil, horse mackeral oil, salmon oil, herring oil, cod oil, capelin oil, pilchard oil, sprat oil, whale oil, Pacific oyster oil, Norway pout oil, seal oil and sperm whale oil or a plant oil e.g. pine oil, wheat germ oil and linseed oil or the like, can be used to cover the anolyte (e.g. 0.5 cm to 5 cm, typically about 1 cm in depth) and thus prevent the diffusion of air into the anolyte. To prevent oxygen effects in respect of the V(V) and V(III) and V(IV) in the catholyte, a blanket of an inert immiscible liquid such as paraffin oil or other hydrocarbon oil or a mineral oil, a vegetable oil e.g. arachis oil, olive oil, sesame oil, groundnut oil, peanut oil or coconut oil, a fish oil e.g. tuna oil, mackeral oil, sand eel oil, menhaden oil, anchovy oil, sardine oil, horse mackeral oil, salmon oil, herring oil, cod oil, capelin oil, pilchard oil, sprat oil, whale oil, Pacific oyster oil, Norway pout oil, seal oil and sperm whale oil or a plant oil e.g. pine oil, wheat germ oil and linseed oil or the like, can be used to cover the catholyte (e.g. 0.5 cm to 5 cm, typically about 1 cm in depth) and thus prevent the diffusion of air into the catholyte.

Also disclosed is an uncharged all-vanadium redox battery having a positive compartment containing a catholyte in electrical contact with a positive electrode, said catholyte comprising an electrolyte solution containing a stabilizing amount of a stabilizing agent, tetravalent vanadium ions, a negative compartment containing an anolyte in electrical contact with a negative electrode, said anolyte comprising an electrolyte solution optionally containing a stabilizing amount of a stabilizing agent, and containing tetravalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration of up to and including a supersaturated concentration, 0.001 to 15M, 0.001 to 10.0M, optionally 2 to 9M or 3 to 7M or 5.001M to 10M or 5.001M to 7.5M or 5.001M to 6M.

Also disclosed is an uncharged all-vanadium redox battery having a positive compartment containing a catholyte in electrical contact with a positive electrode, said catholyte comprising an electrolyte solution containing a stabilizing amount of a stabilizing agent, tetravalent vanadium ions, a negative compartment containing an anolyte in electrical contact with a negative electrode, said anolyte comprising an electrolyte solution optionally containing a stabilizing amount of a stabilizing agent, and containing trivalent vanadium ions, and an ionically conducting separator disposed between said positive compartment and said negative compartment and in contact with said catholyte and said anolyte to provide ionic communication therebetween and wherein said anolyte and said catholyte includes vanadium ions in a concentration of up to and including a supersaturated concentration, 0.001 to 15M, 0.001 to 10.0M, 1.801 to 10.0M, 2.01 to 10M, 2 to 9M or 3 to 7M or 5.001M to 10M or 5.001M to 7.5M or 5.001M to 6M.

Also disclosed is an all-vanadium redox battery having a negative compartment containing an anolyte in electrical contact with a negative electrode, said anolyte comprising an electrolyte solution optionally containing a stabilizing amount of a stabilizing agent, and containing divalent vanadium ions, a positive compartment containing a stabilizing amount of a stabilizing agent, and containing a catholyte in electrical contact with a positive electrode, said catholyte comprising an electrolyte solution containing a stabilizing amount of a stabilizing agent and up to and including a supersaturated concentration, 0.001 to 15M, 0.001 to 10.0M, 1.801 to 10.0M, 2.01 to 10M, 2 to 9M or 3 to 7M or 5.001M to 10M or 5.001M to 7.5M or 5.001M to 6M, pentavalent vanadium ions; and an ionically conducting separator disposed between said positive compartment and negative compartments and in contact with said catholyte and said anolyte to provide ionic communication therebetween.

Further disclosed is an all-vanadium redox battery having a negative compartment containing an anolyte in electrical contact with a negative electrode, said anolyte comprising an electrolyte solution optionally containing a stabilizing amount of a stabilizing agent, and containing trivalent vanadium ions, a positive compartment containing a catholyte in electrical contact with a positive electrode, said catholyte comprising an electrolyte solution containing a stabilizing amount of a stabilizing agent, and containing up to and including a supersaturated concentration, 0.001 to 15M, 0.001 to 10.0M, 1.801 to 10.0M, 2.01 to 10M, optionally 2 to 9M or 3 to 7M or 5.001M to 10M or 5.001M to 7.5M or 5.001M to 6M, pentavalent vanadium ions; and an ionically conducting separator disposed between said positive and negative compartments and in contact with said catholyte and said anolyte to provide ionic communication therebetween.

In addition there is disclosed an all-vanadium redox battery having a positive compartment containing a catholyte in electrical contact with a positive electrode, said catholyte comprising an electrolyte solution containing a stabilizing amount of a stabilizing agent, and containing tetravalent vanadium ions in a concentration of up to and including a supersaturated concentration, 0.001 to 15M. 0.001 to 10.0M, 1.801 to 10.0M, 2.01 to 10M, optionally 2 to 9M or 3 to 7M or 5.001M to 10M or 5.001M to 7.5M or 5.001M to 6M, a negative compartment containing an anolyte in electrical contact with a negative electrode, said anolyte comprising an electrolyte solution optionally containing a stabilizing amount of a stabilizing agent, and containing divalent vanadium ions in a concentration of up to and including a supersaturated concentration, and an ionically conducting separator disposed between said positive compartment and said negative compartment and in contact with said catholyte and said anolyte to provide ionic communication therebetween.

In addition there is disclosed an all-vanadium redox battery having a negative compartment containing an anolyte in electrical contact with a negative electrode, said anolyte comprising an electrolyte solution optionally containing a stabilizing amount of a stabilizing agent, and containing tetravalent vanadium ions in a concentration of up to and including a supersaturated concentration, a positive compartment containing a catholyte in electrical contact with a positive electrode, said catholyte comprising an electrolyte solution containing a stabilizing amount of a stabilizing agent, and containing up to and including a supersaturated concentration, 0.001 to 15M, 0.001 to 10.0M, 1.801 to 10.0M, 2.01 to 10M, optionally 2 to 9M or 3 to 7M or 5.001M to 10M or 5.001M to 7.5M or 5.001M to 6M, pentavalent vanadium ions, and an ionically conducting separator disposed between said positive and said negative compartments and in contact with said catholyte and said anolyte to provide ionic communication therebetween.

According to another embodiment of this invention there is provided a redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxidising gas electrode, an oxygen electrode and an air electrode, the catholyte comprising an electrolyte solution containing redox ions selected from the group consisting of an catholyte redox couple, catholyte redox ions and a mixture of an catholyte redox couple and catholyte redox ions, a negative compartment containing an anolyte in electrical contact with a negative electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolyte solutions having an effective stabilising amount of a stabilising agent for stabilising the redox ions in at least one of the electrolyte solutions, said positive electrode having a gas contacting portion said gas contacting portion being disposed so as to be capable of contacting a gas selected from the group consisting of an oxidising gas, oxygen, an oxygen containing gas, and air.

According to another embodiment of this invention there is provided a redox battery/fuel cell having a positive compartment containing a catholyte in electrical contact with a positive electrode, the catholyte comprising an containing redox ions selected from the group consisting of an catholyte redox couple, catholyte redox ions and a mixture of an catholyte redox couple and catholyte redox ions, a negative compartment containing an anolyte in electrical contact with an anolyte contacting portion of a negative electrode, said anolyte contacting portion of said negative electrode being disposed in said negative compartment, said negative electrode being selected from the group consisting of a reducing gas electrode, a hydrogen gas electrode, the anolyte comprising an electrolyte solution containing redox ions selected from the group consisting of an anolyte redox couple, anolyte redox ions and a mixture of an anolyte redox couple and anolyte redox ions, and a separator or membrane disposed between the positive and negative compartments and in contact with the catholyte and anolyte to provide ionic communication therebetween, at least one of the electrolyte solutions having an effective stabilising amount of a stabilising agent for stabilising the redox ions in at least one of the electrolyte solutions said negative electrode having a gas contacting portion said gas contacting portion being disposed so as to be capable of contacting a gas selected from the group consisting of a reducing gas, a hydrogen containing gas, and hydrogen.

Also disclosed is a process for the production of electricity from a redox battery/fuel cell of the invention when said battery/fuel cell is charged or partially charged, which process comprises withdrawing electrical energy from the redox battery/fuel cell by loading an external circuit in electronic communication with the positive and negative electrode. The redox ions may be stabilised at up to and including a supersaturated concentration.

Further embodiments of this invention are:

A. A stabilised all-vanadium electrolyte solution for use in an all-vanadium redox battery, the stabilised electrolyte solution comprising vanadium redox ions, an electrolyte and a stabilising amount of a stabilising agent, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

B. An all-vanadium redox battery having a positive compartment containing a catholyte in electrical contact with a positive electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the anolyte and catholyte is a stabilised all-vanadium electrolyte solution for use in an all-vanadium redox battery, the stabilised electrolyte solution comprising vanadium redox ions, an electrolyte and a stabilising amount of a stabilising agent, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

C. A process for recharging an all-vanadium redox battery according to B, when said battery is discharged or partially discharged, which process comprises providing electrical energy to the positive and negative electrodes to derive divalent vanadium ions in the anolyte and pentavalent vanadium ions in the catholyte.

D. A process for the production of electricity from an all-vanadium redox battery according to B, when said battery is charged or partially charged, which process comprises withdrawing electrical energy from the redox battery by loading an external circuit in electronic communication with the positive and negative electrode.

E. A method of preparing a stabilised all-vanadium electrolyte solution for use in an all-vanadium redox battery, the stabilised electrolyte solution comprising vanadium redox ions, an electrolyte and a stabilising amount of a stabilising agent, the method comprising:

(A) dissolving a first substance in an electrolyte solution which first substance when dissolved in the solution produces vanadium redox ions in the electrolyte solution;

(B) adding a stabilising amount of a stabilising agent to the solution to stabilise the vanadium redox ions in the solution, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

F. The method of E may further comprise:

(C) reducing the vanadium redox ions in the solution to a lower oxidation state to generate a reductant capable of dissolving a second substance in the solution;

(D) adding a second substance in the solution which second substance when dissolved in the solution produces vanadium redox ions in the solution;

(E) if required, dissolving an additional stabilising amount of a second stabilising agent in the solution in an amount capable of stabilising said more of the vanadium redox ions wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(F) dissolving the second substance in the solution;

(G) optionally reducing the vanadium redox ions in the solution to a lower oxidation state to generate a reductant capable of dissolving more of the second substance in the solution;

(H) optionally repeating steps (C)–(G) to obtain the required concentration of the vanadium redox ions in the solution.

G. The method of E may further comprise:

(C') oxidising the vanadium redox ions in the solution to produce vanadium redox ions in the solution at a higher oxidation state;

(C) reducing the vanadium redox ions at a higher oxidation state in the solution to a lower oxidation state to generate a reductant capable of dissolving a second substance in the solution;

(D) adding a second substance in the solution which second substance when dissolved in the solution produces vanadium redox ions in the solution;

(E) if required, dissolving an additional stabilising amount of a second stabilising agent in the solution in an amount capable of stabilising said more of the vanadium redox ions wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(F) dissolving the second substance in the solution;

(G) optionally reducing the vanadium redox ions in the solution to a lower oxidation state to generate a reductant capable of dissolving more of the second substance in the solution;

(H) optionally repeating steps (C)–(G) to obtain the required concentration of the vanadium redox ions in the solution.

H. A method of preparing a stabilised all-vanadium electrolyte solution for use in an all-vanadium redox battery, the stabilised electrolyte solution comprising vanadium redox ions, an electrolyte and a stabilising amount of a stabilising agent, the method comprising:

(a) adding a first substance to the solution which first substance when dissolved in the solution produces vanadium redox ions in the solution;

(b) dissolving a stabilising amount of a first stabilising agent in the solution capable of stabilising the redox ions in the solution wherein the stabilising amount of the first stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(c) dissolving the first substance in the solution;

(d) optionally reducing the vanadium redox ions in the solution to a lower oxidation state to generate a reductant capable of dissolving a second substance in the solution which second substance when dissolved in the solution produces vanadium redox ions in the solution;

(e) optionally adding the second substance to the solution which second substance when dissolved in the solution produces vanadium redox ions in the solution;

(f) optionally dissolving a stabilising amount of a second stabilising agent to the solution capable of stabilising the vanadium redox ions in the solution wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(g) optionally dissolving the second substance in the solution;

(h) optionally reducing the vanadium redox ions in the solution to a lower oxidation state to generate a reductant capable of dissolving more of the second substance in the solution;

(i) optionally repeating steps (e)–(h) to obtain the required concentration of the vanadium redox ions in the solution.

I. A method of preparing a stabilised all-vanadium electrolyte solution for use in an all-vanadium redox battery, the stabilised electrolyte solution comprising vanadium redox ions, an electrolyte and a stabilising amount of a stabilising agent, the method comprising:

(a) adding a first substance to an electrolyte solution which first substance when dissolved in the solution produces vanadium redox ions in the solution;

(b) dissolving a stabilising amount of a first stabilising agent in the solution capable of stabilising the redox ions in the solution wherein the stabilising amount of the first stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(c) dissolving the first substance in the solution;

(c') optionally oxidising the vanadium redox ions in the solution to produce vanadium redox ions in the solution at a higher oxidation state to generate an oxidant capable of dissolving a second substance in the solution which second substance when dissolved in the solution produces vanadium redox ions in the solution;

(d) optionally reducing the vanadium redox ions at a higher oxidation state in the solution to a lower oxidation state to generate a reductant capable of dissolving a second substance in the solution which second substance when dissolved in the solution produces vanadium redox ions in the solution;

(e) optionally adding the second substance to the solution which second substance when dissolved in the solution produces vanadium redox ions in the solution;

(f) optionally dissolving a stabilising amount of a second stabilising agent to the solution capable of stabilising the vanadium redox ions in the solution wherein the stabilising amount of the second stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery;

(g) optionally dissolving the second substance in the solution;

(g') optionally oxidising the vanadium redox ions in the solution to produce vanadium redox ions in the solution at a higher oxidation state to generate an oxidant capable of dissolving more of the second substance in the solution which second substance when dissolved in the solution produces vanadium redox ions in the solution;

(h) optionally reducing the vanadium redox ions at a higher oxidation state in the solution to a lower oxidation state to generate a reductant capable of dissolving more of the second substance in the solution;

(i) optionally repeating steps (e)–(g'), or (e)–(g) and (h), or (e)–(h) to obtain the required concentration of the vanadium redox ions in the solution.

J. A stabilised electrolyte solution produced by the method of any one of embodiments E to I.

K. An immobilized stabilised all-vanadium electrolyte solution for use in an immobilized electrolyte solution containing all-vanadium redox battery, comprising the stabilised electrolyte solution of the invention, including embodiment A, immobilized with an effective immobilizing amount of an immobilizing agent.

L. An immobilized stabilised all-vanadium electrolyte solution for use in an immobilized electrolyte solution containing all-vanadium redox battery, comprising the stabilised electrolyte solution of the invention, including embodiment A, immobilized with an effective immobilizing amount of an immobilizing agent selected from the group consisting of gels, gums, Xanthan gum, Guar gum, starch, furcellaran, hypnean, dextran, tamarind, alginates, pectic gels, sodium pectate, alkylcellulose hydrophilic colloids, hydroxyalkylcellulose, carboxyalkylcellulose, hydroxypropylmethyl cellulose, sodium carboxymethylcellulose, potassium carboxymethyl cellulose, hydroxymethylcellulose, ethyl succinylated Cellulose, succinylated zein, carboxymethylcellulose, sodium poly (styrene sulphonate) with poly (vinyl methyl pyridinium) chloride, sodium poly (styrene sulphonate) with poly (vinyl benzyl trimethyl ammonium) chloride, vinyl acetate homopolymer, polyvinyl alcohol resin, carboxypolymethylene, Sodium alginate, a mixture of gelatin and sodium alginate, potassium alginate, gelatine, acacia gum, deacetylated gellan gum, karaya gum, locust bean gum, tragacanth gum, agar—agar, algin and derivatives and alkali metal salts thereof, thereof, carrageenin, furcellaran, carrageenan, carob bean gum, oat gum, pectin, methyl cellulose, (hydroxypropyl)methyl cellulose, sodium carboxymethyl cellulose, polygalacturonic acid and mixtures thereof.

M. An immobilized electrolyte solution containing all-vanadium redox battery having a positive compartment containing an immobilized catholyte in electrical contact with a positive electrode, the immobilized catholyte comprising an effective immobilizing amount of a catholyte immobilizing agent and an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, and pentavalent vanadium ions, a negative compartment containing an immobilized anolyte in electrical contact with a negative electrode, the anolyte comprising an effective immobilizing amount of an anolyte immobilizing agent and an electrolyte solution containing vanadium ions selected from the group consisting of tetravalent vanadium ions, trivalent vanadium ions, divalent vanadium ions, and a mixture of at least two of divalent vanadium ions, trivalent vanadium ions, and tetravalent vanadium ions, and a separator or membrane disposed between the positive and negative compartments and in contact with the catholyte and anolyte to provide ionic communication therebetween and wherein at least one of the anolyte and catholyte is a stabilised all-vanadium electrolyte solution for use in an immobilized electrolyte solution containing all-vanadium redox battery, the stabilised electrolyte solution comprising vanadium redox ions, an electrolyte and a stabilising amount of a stabilising agent, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an immobilized electrolyte solution containing all-vanadium redox battery.

N. A process for recharging an immobilized electrolyte solution containing all-vanadium redox battery according to embodiment M, when said battery is discharged or partially discharged, which process comprises providing electrical energy to the positive and negative electrodes to derive divalent vanadium ions in the anolyte and pentavalent vanadium ions in the catholyte.

O. A process for the production of electricity from an immobilized electrolyte solution containing all-vanadium redox battery according to embodiment M, when said battery is charged or partially charged, which process comprises withdrawing electrical energy from the redox battery by loading an external circuit in electronic communication with the positive and negative electrode.

P. A method of preparing an immobilized stabilised all-vanadium electrolyte solution for use in an an immobilized electrolyte solution containing all-vanadium redox battery, comprising preparing the stabilised all-vanadium electrolyte solution according to the method of the invention including by the method of any one of embodiments E to I and immobilizing the stabilised all-vanadium electrolyte solution with an effective immobilizing amount of an immobilizing agent.

Q. A method of preparing an immobilized stabilised all-vanadium electrolyte solution for use in an immobilized electrolyte solution containing all-vanadium redox battery, comprising preparing the stabilised all-vanadium electrolyte solution according to the method of the invention, including the method of any one of embodiments E to I and immobilizing the stabilised all-vanadium electrolyte solution with an effective immobilizing amount of an immobilizing agent wherein the immobilizing agent is selected from the group consisting of gels, gums, Xanthan gum, sodium hexametaphosphate, myo-inositol, Guar gum, starch, furcellaran, hypnean, dextran, tamarind, alginates, pectic gels, sodium pectate, potassium pectate, alkylcellulose hydrophilic colloids, hydroxyalkylcellulose, carboxyalkylcellulose, hydroxypropylmethyl cellulose, sodium carboxymethylcellulose, potassium carboxymethyl cellulose, hydroxymethylcellulose, ethyl succinylated Cellulose, succinylated zein, carboxymethylcellulose, sodium poly (styrene sulphonate) with poly (vinyl methyl pyridinium) chloride, sodium poly (styrene sulphonate) with poly (vinyl benzyl trimethyl ammonium) chloride, vinyl acetate homopolymer, polyvinyl alcohol resin, carboxypolymethylene, sodium alginate, gelatin, a mixture of gelatin and sodium alginate, a mixture of gelatin and potassium alginate, potassium alginate, gelatine, acacia gum, deacetylated gellan gum, karaya gum, locust bean gum, tragacanth gum, agar—agar, algin and derivatives and alkali metal salts thereof, thereof, carrageenin, furcellaran, carrageenan, carob bean gum, oat gum, pectin, methyl cellulose, (hydroxypropyl)methyl cellulose, polygalacturonic acid and mixtures thereof.

Typically, the stabilising amount of the stabilising agent is sufficient to reduce precipitation of the vanadium redox ions from the stabilised electrolyte solution to a rate whereby the stabilised all-vanadium electrolyte solution is acceptable for use during at least one period in an all-vanadium redox battery, said period being selected from the group consisting of between at least one recharging cycle of the battery, during at least one recharging cycle of the battery, between at least one recharging cycle of the battery and during at least one recharging cycle of the battery, between at least one discharging cycle of the battery, in a fully mixed state, in an over discharged state, during at least one discharging cycle of the battery, between at least one discharging cycle of the battery and during at least one discharging cycle of the battery, between at least one recharging cycle of the battery and during at least one recharging cycle of the battery and during at least one discharging cycle of the battery, between at least one recharging cycle of the battery and during at least one recharging cycle of the battery and during at least one discharging cycle of the battery, between at least one recharging cycle of the battery and during at least one recharging cycle of the battery and between at least one discharging cycle of the battery, between at least one recharging cycle of the battery and during at least one recharging cycle of the battery and between at least one discharging cycle of the battery and during at least one discharging cycle of the battery, during standing of the electrolyte solution in a fully charged state, during standing of the electrolyte solution in a partially charged state, during standing of the electrolyte solution in a fully discharged state, during standing of the electrolyte solution in a partially discharged state and during standing of the electrolyte solution in at least a partially uncharged state.

Typically in the stabilised electrolyte solution the vanadium ions are present in the solution at above saturated concentration. The stabilised electrolyte solution is typically an aqueous solution, and the electrolyte is selected from the group consisting of $H_2SO_4$, trifluoromethanesulphonic acid, $Na_2SO_4$, ammonium sulphate, $K_2SO_4$, $H_3PO_4$, $Na_3PO_4$, $K_3PO_4$, $HNO_3$, $KNO_3$, $NaNO_3$, sulphonic acid, $C_6$–$C_{14}$ arylsulphonic acid such as p-toluenesulphonic acid, benzenesulphonic acid, naphthalenesulphonic acid, $C_1$–$C_6$ alkylsulphonic acid such as methylsulphonic acid and ethylsulphonic acid, acetic acid and mixtures thereof, more typically the electrolyte is $H_2SO_4$.

Typically, the solution is an aqueous solution and the vanadium redox ions (and electrolyte e.g. sulphuric acid optionally expressed as total sulphate concentration) are (each) present in a range selected from the group consisting of 1.801M, optionally 2M up to and including a highly supersaturated concentration, aM, bM, a concentration in the range aM–bM, and a concentration range in the range aM–bM, where a is selected from the group consisting of a value presented in the column headed "a" in Table A* below at one of entries 1–26, and b is selected from the group of the values presented in the column headed "b" adjacent the corresponding "a" entry:

TABLE A*

| Entry | a | b |
|---|---|---|
| 1 | 0.1 | 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 2 | 0.25 | 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 3 | 0.5 | 1, 1.25, 1.5, 1.75, 2, [] 2S 2 _i, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 4 | 0.75 | 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 5 | 1 | 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 6 | 1.25 | 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 7 | 1.5 | 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 8 | 1.75 | 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 9 | 2 | 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 10 | 2.25 | 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 11 | 2.5 | 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 12 | 2.75 | 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 13 | 3 | 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 14 | 3.25 | 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 15 | 3.5 | 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 16 | 3.75 | 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 17 | 4 | 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 18 | 4.25 | 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 19 | 4.5 | 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |

TABLE A*-continued

| Entry | a | b |
|---|---|---|
| 20 | 4.75 | 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 21 | 5 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 22 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 23 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 24 | 8 | 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 25 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |
| 26 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5 |

Advantageously where a sulphate electrolyte is used (e.g. sulphuric acid) the mole:mole ratio of vanadium ions:total sulphate is from 0.1 to 1, typically 2:5. Thus for a 2M vanadium ion solution 5M total sulphate is typically used. For 1.801–5M vanadium ion concentration 5–7M total sulphate is typically used as the electrolyte concentration.

Advantageously the stabilised electrolyte solution is selected from the group consisting of a stabilised electrolyte anolyte solution and a stabilised electrolyte catholyte solution.

Generally the redox ions are selected from the group consisting of pentavalent vanadium ions, tetravalent vanadium ions, trivalent vanadium ions, divalent vanadium ions, a mixture of divalent and trivalent vanadium ions, a mixture of divalent and tetravalent vanadium ions, a mixture of trivalent and tetravalent vanadium ions, a mixture of divalent, trivalent and tetravalent vanadium ions, a mixture of divalent, trivalent, tetravalent and pentavalent vanadium ions, a mixture of trivalent, tetravalent and pentavalent vanadium ions and a mixture of tetravalent and pentavalent vanadium ions.

Advantageously the stabilising agent is present in a range selected from the group consisting of c % wt/vol of the solution, c % wt/wt of the solution, c % wt/wt of the vanadium ions in the solution, c % vol/vol of the solution, c % vol/wt of the solution, c % vol/wt of the vanadium ions in the solution, c % mole/mole, d % wt/vol of the solution, d % wt/wt of the solution, d % wt/wt of the vanadium ions in the solution, d % vol/vol of the solution, d % vol/wt of the solution, d % vol/wt of the vanadium ions in the solution, d % mole/mole, c % to d % wt/vol of the solution, c % to d % wt/wt of the solution, c % to d % wt/wt of the vanadium ions in the solution, c % to d % vol/vol of the solution, c % to d % vol/wt of the solution, c % to d % vol/wt of the vanadium ions in the solution, and c % to d % mole/mole of the vanadium ions in the solution, where c is selected from the group consisting of a value presented in the column headed "c" in Table B* below at one of entries 1–33, and d is selected from the group of the values presented in the column headed "d" adjacent the corresponding "c" entry.

TABLE B*

| Entry | c | d |
|---|---|---|
| 1 | 0.01 | 0.025, 0.05, 0.075, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 2 | 0.025 | 0.05, 0.075, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 3 | 0.05 | 0.75, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 4 | 0.075 | 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 5 | 0.1 | 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 6 | 0.25 | 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 7 | 0.5 | 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 8 | 0.75 | 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 9 | 1 | 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |

TABLE B*-continued

| Entry | c | d |
|---|---|---|
| 10 | 1.25 | 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 11 | 1.5 | 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 12 | 1.75 | 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 13 | 2 | 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 14 | 2.25 | 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 15 | 2.5 | 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 16 | 2.75 | 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 17 | 3 | 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 18 | 3.25 | 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 19 | 3.5 | 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 20 | 3.75 | 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 21 | 4 | 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19 5 20 25, 30 |
| 22 | 4.5 | 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 23 | 5 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 24 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 25 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 26 | 8 | 8.25, 8.5, 8.75, 9, 9.25, 9.5, 9.75, 10, 10.25, 10.5, 10.75, 11, 11.25, 11.5,11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 27 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 28 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 29 | 11 | 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 30 | 12 | 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 31 | 13 | 13.25, 13.5, 13.75, 14, 14.25, 14.5, 14.75, 15, 15.25, 15.5, 16, 16.5, 17, 17.5, 18, 18.5, 19, 19.5, 20, 25, 30 |
| 32 | 14 | 14.25, 14.5, 14.75, 15, 15.25, 15.5, 16, 16.5, 17, 17.5, 18, 18.5, 19, 19.5, 20, 25, 30 |
| 33 | 15 | 15.25, 15.5, 16, 16.5, 17, 17.5, 18, 18.5, 19, 19.5, 20, 25, 30 |

Advantageously, the solution is stabilised at a temperature selected from the group consisting of e°C., f°C., a temperature range e°C.–f°C. and a temperature range in the range e°C.–f°C. where e is selected from the group consisting of a value presented in the column headed "e" in Table C* below at one of entries 1–14, and f is selected from the group of the values presented in the column headed "f" adjacent the corresponding "e" entry.

TABLE C*

| Entry | e | f |
|---|---|---|
| 1 | 0 | 5, 10, 15, 20, 25, 30, 35, 40, 45, 50, 55, 60, 65, 70, 80, 90 |
| 2 | 5 | 10, 15, 20, 25, 30, 35, 40, 45, 50, 55, 60, 65, 70, 80, 90 |

TABLE C*-continued

| Entry | e | f |
|---|---|---|
| 3 | 10 | 15, 20, 25, 30, 35, 40, 45, 50, 55, 60, 65, 70, 80, 90 |
| 4 | 15 | 20, 25, 30, 35, 40, 45, 50, 55, 60, 65, 70, 80, 90 |
| 5 | 20 | 25, 30, 35, 40, 45, 50, 55, 60, 65, 70, 80, 90 |
| 6 | 25 | 30, 35, 40, 45, 50, 55, 60, 65, 70, 80, 90 |
| 7 | 30 | 35, 40, 45, 50, 55, 60, 65, 70, 80, 90 |
| 8 | 35 | 40, 45, 50, 55, 60, 65, 70, 80, 90 |
| 9 | 40 | 45, 50, 55, 60, 65, 70, 80, 90 |
| 10 | 45 | 50, 55, 60, 65, 70, 80, 90 |
| 11 | 50 | 55, 60, 65, 70, 80, 90 |
| 12 | 55 | 60, 65, 70, 80, 90 |
| 13 | 60 | 65, 70, 80, 90 |
| 14 | 65 | 70, 80, 90 |

Typically the at least one period is for a period in the range g months-h months where g is selected from the group consisting of a value presented in the column headed "g" in Table D below at one of entries 1–33, and h is selected from the group of the values presented in the column headed "h" adjacent the corresponding "g" entry.

TABLE D

| Entry | g | h |
|---|---|---|
| 1 | 0.01 | 0.025, 0.05, 0.075, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 2 | 0.025 | 0.05, 0.075, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 3 | 0.05 | 0.075, 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 4 | 0.075 | 0.1, 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 5 | 0.1 | 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |

TABLE D-continued

| Entry | g | h |
|---|---|---|
| 6 | 0.25 | 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 7 | 0.5 | 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 8 | 0.75 | 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 9 | 1 | 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 10 | 1.25 | 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5:19, 19.5, 20, 25, 30, 40, 50, 60, 70, 100, 150, 200, 250, 300, 350, 400, 500, 600, 700, 1000 |
| 11 | 1.5 | 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 12 | 1.75 | 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 13 | 2 | 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |

TABLE D-continued

| Entry | g | h |
|---|---|---|
| 14 | 2.25 | 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 15 | 2.5 | 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 16 | 2.75 | 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 17 | 3 | 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 18 | 3.25 | 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 19 | 3.5 | 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 20 | 3.75 | 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 21 | 4 | 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 22 | 4.5 | 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 23 | 5 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 24 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 25 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 26 | 8 | 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 27 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 28 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 29 | 11 | 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 30 | 12 | 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 31 | 13 | 13.25, 13.5, 13.75, 14, 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 32 | 14 | 14.25, 14.5, 14.75, 15, 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |
| 33 | 15 | 15.25, 15.5, 16, 16.5, 17, 17.5, 18, 18.5, 19, 19.5, 20, 25, 30, 40, 50, 60, 70, 100, 150, 200, 250, 300, 350, 400, 500, 600, 700, 1000 |

Advantageously the number of discharge cycles and recharge cycles is in the range s–t where s is selected from the group consisting of a value presented in the column headed "s" in Table E below at one of entries 1–14, and t is selected from the group of the values presented in the column headed "t" adjacent the corresponding "s" entry.

TABLE E

| Entry | s | t |
|---|---|---|
| 1 | 1 | 5, 10, 15, 20, 25, 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 2 | 5 | 10, 15, 20, 25, 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 3 | 10 | 15, 20, 25, 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 4 | 15 | 20, 25, 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 5 | 20 | 25, 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 6 | 25 | 30, 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 7 | 30 | 35, 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 8 | 35 | 40, 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 9 | 40 | 45, 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 10 | 45 | 50, 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 11 | 50 | 55, 60, 65, 70, 80, 100, 150, 200, 300, 500, 750, 1000, 2500, 5000, 10000, 15000, 20000, 25000, 30000, 50000, 75000, 100000, 500000, 1000000 |
| 12 | 100 | 150, 200, 300, 500, 750, 1000, 2500, 5000, 10000, 15000, 20000, 25000, 30000, 50000, 75000, 100000, 500000, 1000000 |
| 13 | 500 | 750, 1000, 2500, 5000, 10000, 15000, 20000, 25000, 30000, 50000, 75000, 100000, 500000, 1000000 |
| 14 | 1000 | 2500, 5000, 10000, 15000, 20000, 25000, 30000, 50000, 75000, 100000, 500000, 1000000 |

In the all-vanadium battery of the invention the catholyte may be a stabilised all-vanadium electrolyte solution. The vanadium ions in the catholyte may be stabilised at up to and including a supersaturated concentration.

In the all-vanadium battery of the invention the anolyte may be a stabilised all-vanadium electrolyte solution. The vanadium ions in the anolyte may be stabilised at up to and including a supersaturated concentration.

In the all-vanadium battery of the invention the anolyte and catholyte may be stabilised all-vanadium electrolyte solutions. The vanadium ions in the anolyte and the catholyte may be stabilised at up to and including a supersaturated concentration.

In the methods of the invention that use two stabilising agents the second stabilising agent may be the same as or different from the first stabilising agent.

In the methods of the invention the concentration of vanadium redox ions in the solution may be further increased by removing water (e.g. by evaporation, vacuum evaporation, pervaporation) from the solution containing the required concentration of vanadium ions in the solution.

In the methods of the invention a concentrate comprising vanadium redox ions in the solution may be formed by removing water from the solution containing the required concentration of vanadium ions in the solution and further comprising adding water to the concentrate in an amount whereby the vanadium redox ions are at a predetermined concentration in the solution.

In the methods of the invention that use two substances the first substance may different from the second substance. Typically the first substance is the same as the second substance and is selected from vanadium pentoxide, ammonium metavanadate, $V_2O_3$, $V_2O_4$, and $VOSO_4$.

Typically the immobilising agent is present in a range selected from the group consisting of w % to x % wt/vol of the solution, w % to x % wt/wt of the solution, w % to x % wt/wt of the vanadium ions in the solution, w % to x % vol/vol of the solution, w % to x % vol/wt of the solution, w % to x % vol/wt of the vanadium ions in the solution, and w % to x % mole/mole of the vanadium ions in the solution, where w is selected from the group consisting of a value presented in the column headed "w" in Table F below at one of entries 1–25, and x is selected from the group of the values presented in the column headed "x" adjacent the corresponding "w" entry.

TABLE F

| Entry | w | x |
|---|---|---|
| 1 | 1 | 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 2 | 1.25 | 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 3 | 1.5 | 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 4 | 1.75 | 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 5 | 2 | 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 6 | 2.25 | 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |

TABLE F-continued

| Entry | w | x |
|---|---|---|
| 7 | 2.5 | 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 8 | 2.75 | 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 9 | 3 | 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 10 | 3.25 | 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 11 | 3.5 | 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 12 | 3.75 | 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 13 | 4 | 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 14 | 4.5 | 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 15 | 5 | 5.25, 5.5, 5.75, 6, 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 16 | 6 | 6.25, 6.5, 6.75, 7, 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 17 | 7 | 7.25, 7.5, 7.75, 8, 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 18 | 8 | 8.25, 8.5, 8.75, 9, 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 19 | 9 | 9.25, 9.5, 9.75, 10, 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 20 | 10 | 10.25, 10.5, 10.75, 11, 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 21. | 11 | 11.25, 11.5, 11.75, 12, 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 22 | 12 | 12.25, 12.5, 12.75, 13, 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 23 | 13 | 13.25, 13.5, 13.75, 14, 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 24 | 14 | 14.25, 14.5, 14.75, 15, 15.25, 15.5, 16, 16.5, 17, 17.5, 18, 18.5, 19, 19.5, 20, 25, 30, 35, 40, 45, 50, 55, 60, 70, 80 |
| 25 | 15 | 15.25, 15.5, 16, 16.5, 17, 17.5, 18, 18.5, 19, 19.5, 20, 25, 30, 35, 40, 45, 50, 55, 60, 70, 80 |

According to further embodiment of this invention there is provided an all-vanadium redox battery/fuel cell having a positive compartment containing a catholyte in electrical contact with a catholyte contacting portion of a positive electrode, said catholyte contacting portion being disposed in said positive compartment, said positive electrode being selected from the group consisting of an oxygen electrode and an air electrode, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions, a negative compartment containing an anolyte in electrical contact with a negative electrode, the anolyte comprising an electrolyte solution containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolyte solutions having an effective stabilising amount of a stabilising agent for stabilising the vanadium ions in at least one of the electrolyte solutions, said positive electrode having a gas contacting portion said gas contacting portion being disposed so as to be capable of contacting a gas selected from the group consisting of oxygen, an oxygen containing gas, and air.

According to further embodiment of this invention there is provided an all-vanadium redox battery/fuel cell having a positive compartment containing a catholyte in electrical contact with a positive electrode, said positive electrode being disposed in said positive compartment, the catholyte comprising an electrolyte solution containing vanadium ions selected from the group consisting of trivalent vanadium ions, tetravalent vanadium ions, pentavalent vanadium ions, and a mixture of at least two of trivalent vanadium ions, tetravalent vanadium ions, pentavalent vanadium ions a negative compartment containing an anolyte in electrical contact with an anolyte contacting portion of a negative electrode, said anolyte contacting portion being disposed in said negative compartment, said negative electrode being selected from the group consisting of a reducing gas electrode, a hydrogen gas electrode, the anolyte comprising an electrolyte solution containing vanadium ions selected from the group consisting of tetravalent vanadium ions, trivalent vanadium ions, divalent vanadium ions, and a mixture of at least two of trivalent vanadium ions, tetravalent vanadium ions, divalent vanadium ions, and a separator or membrane disposed between the positive and negative compartments and in contact with the catholyte and anolyte to provide ionic communication therebetween, at least one of the electrolyte solutions having an effective stabilising amount of a stabilising agent for stabilising the vanadium ions in at least one of the electrolyte solutions, said negative electrode having a gas contacting portion said gas contacting portion being disposed so as to be capable of contacting a gas selected from the group consisting of a reducing gas, a hydrogen containing gas, and hydrogen.

Also disclosed is a process for the production of electricity from an all-vanadium redox battery/fuel cell of the invention when said battery/fuel cell is charged or partially charged, which process comprises withdrawing electrical energy from the redox battery/fuel cell by loading an external circuit in electronic communication with the positive and negative electrode.

Also disclosed are stabilized supersaturated vanadium electrolyte solutions for use in an all-vanadium redox battery comprising vanadium redox ions V(II), V(III) and/or V(IV) ions at above saturated concentrations in the negative ½-cell of the battery and V(III), V(IV) and/or V(V) ions at above saturated concentrations in the positive ½-half cell of the battery, each with a supporting aqueous electrolyte typically comprising 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed are stabilized supersaturated vanadium electrolyte solutions for use in an all-vanadium redox battery comprising vanadium redox ions V(II), V(III) and/or V(IV) ions at above saturated concentrations in the negative ½-cell of the battery and V(III), V(IV) and/or V(V) ions at above saturated concentrations in the positive ½-cell of the battery, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium ions from the up to and including stabilized supersaturated concentration of vanadium redox ions to a rate which is acceptable for long term stability on standing in the temperature range 20–30° C.

Also disclosed are stabilized 1.801–2.5 molar, typically 2 molar, vanadium redox ion containing electrolyte solutions for use in an all-vanadium redox battery comprising vanadium redox ions V(II), V(III) and/or V(IV) ions at above saturated concentrations in the negative ½-cell and V(III), V(IV) and/or V(V) ions at above saturated concentrations in the ½-half cell, each with a supporting electrolyte solution typically of 0.5–12M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular which is acceptable for long term stability on standing in the temperature range 10–40° C.

Also disclosed are stabilized 2 molar vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting aqueous electrolyte typically of 0.5–10M $H_2 SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular which is acceptable for long term stability on standing in the temperature range 0–50° C.

Also disclosed are stabilized 2–3 molar vanadium electrolyte solutions for use in an all-vanadium redox battery comprising vanadium redox ions V(II), V(III) and/or V(IV) ions in the negative ½-cell and V(I), V(IV) and/or V(V) ions in the positive ½-half cell, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular is acceptable for long term stability on standing in the temperature range 10–40° C.

Also disclosed are stabilized 2 molar vanadium electrolyte solutions for use in an all-vanadium redox battery comprising vanadium redox ions V(II), V(III) and/or V(IV) ions in the negative ½-cell and V(II), V(IV) and/or V(V) ions in the positive ½-half cell, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular which is acceptable for long term stability on standing in the temperature range 0–50° C.

Also disclosed are stabilized 3–4 molar supersaturated vanadium electrolyte solutions for use in an all-vanadium redox battery comprising vanadium redox ions V(II), V(III) and/or V(IV) ions in the negative ½-cell and V(II), V(IV) and/or V(V) ions in the positive ½-half cell, each with a supporting electrolyte solution typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed are stabilized supersaturated vanadium electrolyte solutions for use in an all-vanadium redox battery comprising supersaturated vanadium redox ions V(II), V(III) and/or V(IV) ions in the negative ½-cell and supersaturated V(I), V(IV) and/or V(V) ions in the positive ½-half cell, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular to reduce precipitation of the vanadium ions from the stabilized supersaturated vanadium electrolyte solution to a rate which is acceptable for long term stability on standing in the temperature range 20–30° C.

Also disclosed are stabilized 4–5 molar supersaturated vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting electrolyte solution typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed are stabilized supersaturated vanadium electrolyte solutions for use in an all-vanadium redox battery comprising vanadium redox ions V(II), V(III) and/or V(IV) ions in the negative ½-cell and V(II), V(IV) and/or V(V) ions in the positive ½-half cell, each with a supporting electrolyte solution typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular to reduce precipitation of the vanadium ions from the stabilized supersaturated vanadium electrolyte solution to a rate which is acceptable for long term stability on standing in the temperature range 20–30° C.

Also disclosed are stabilized 5–12 molar supersaturated vanadium electrolyte solutions for use in an all-vanadium redox battery comprising vanadium redox ions V(II), V(III) and/or V(IV) ions in the negative ½-cell and V(III), V(IV) and/or V(V) ions in the positive ½-half cell, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed are stabilized supersaturated vanadium electrolyte solutions for use in an all-vanadium redox battery comprising supersaturated vanadium redox ions V(II), V(III) and/or V(IV) ions in the negative ½-cell and V(III), V(IV) and/or V(V) ions in the positive ½-half cell, each with a supporting aqueous electrolyte typically of 0.5–10M $H_2SO_4$ and a stabilising amount of a stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery and in particular to reduce precipitation of the vanadium ions from the stabilized supersaturated vanadium electrolyte solution to a rate which is acceptable for long term stability on standing in the temperature range 20–30° C.

Also disclosed is a process for making stabilized supersaturated electrolyte solution by electrolytic oxidation of a suspension of $V_2O_3$ and/or $VO_4$ and/or $VOSO_4$ powder to V(V) ions at up to and including a supersaturated concentration at the anode of electrolysis cell containing a supporting aqueous electrolyte typically of 0.5–10M $H_2SO_4$ and stabilising amount of stabilising agent wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery. The V(II), V(III) and V(IV) redox ions are produced by reduction of V(V) in solution at up to and including a supersaturated concentration.

Also disclosed is a process for making stabilized supersaturated electrolyte solution by electrolytic reduction of $V_2O_5$ suspension at cathode of electrolysis cell containing supporting aqueous electrolyte typically of 0.5–10M $H_8SO_4$ and stabilising amount of stabilising agent and reducing for sufficient time to produce 50:50 mixture of V(II) or V(IV) ($V^{3.5}$) which is then placed into both sides of VRB and charged to V(II) and V(V) states respectively or left in discharged form of V(III) and V(IV) respectively until needed, wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed is a process for making stabilized supersaturated $V^{3.5+}$ electrolyte solution by concentrating a 2M $V^{3.5+}$ solution containing a stabilizing agent by boiling or pervaporation or applying vacuum and/or heat to remove required amount of water wherein the stabilising amount of the stabilising agent is less than that required to fully complex the vanadium redox ions in the electrolyte solution and is sufficient to reduce precipitation of the vanadium redox ions from the stabilised electrolyte solution to a rate whereby the stabilised all-vanadium electrolyte solution is acceptable for use in an all-vanadium redox battery.

Also disclosed is a process for making $V^{3.5+}$ electrolyte solution concentrate (as suspended slurry) by process for making stabilized supersaturated $V^{3.5+}$ electrolyte solution by concentrating a 2M $V^{3.5+}$ solution by boiling or pervaporation or applying vacuum and/or heat to remove required amount of water and reconstituting by adding required amount of water to redissolve vanadium precipitate to form supersaturated solution just prior to addition to vanadium redox battery electrolyte solution tanks.

The vanadium redox ions may be stabilised at up to and including a supersaturated concentration.

Typically the negative and positive compartments are sealed air-tight.

Typically the negative and positive compartments are deaerated.

All-vanadium redox charge and discharge cells of the invention can be operated over a broad temperature range, e.g. −5° C. to 99° C. but are typically operated in the temperature range 2° C. to 65° C., or 5° C. to 45° C., and even more typically 10° C. to 40° C.

The anolyte and the catholyte comprise an electrolyte solution which is typically an aqueous solution which includes at least one of $H_2SO_4$, trifluoromethanesulphonic acid, $Na_2SO_4$, $K_2SO_4$, $H_3PO_4$, $Na_3PO_4$, $K_3PO_4$, $HNO_3$, $KNO_3$, $NaNO_3$, sulphonic acid, $C_6$–$C_{14}$ arylsulphonic acid such as p-toluenesulphonic acid, benzenesulphonic acid, naphthalenesulphonic acid, $C_1$–$C_6$ alkylsulphonic acid such as methylsulphonic acid and ethylsulphonic acid, acetic acid or mixtures thereof in a concentration of from 0.01M to 20M, or 0.01M to 15M, 0.01M to 10M. It is especially preferred to use $H_2SO_4$ in a concentration of from 1.5M to 10M, more preferably 1.75M to 10M (other concentration ranges include 0.25M to 10M, 2M to 10M, 2M to 9M, 2.5M to 9M, 2.8M to 8M, 3M to 7M, 3M to 6M, 4M to 6.5M, 5.001M to 10M, 5.001M to 7.5M, 5.00M to 10M, 5.001M to 7.0M, and 5.001M to 6M). It is especially preferred to use $H_2SO_4$ in a concentration of from 2M to 8M, more preferably 4.5M to 8M.

The electrolyte solution typically has vanadium ions (V(II), V(III), V(IV) and/or V(V) ions in any form, (examples of forms include vanadate ions such as metavanadate, orthovanadate, pyrovanadate, as well as vanadyl ions such as vanadylous and divalent vanadyl ions) in sufficient concentration for high discharge capacity in the discharge battery, for example, up to and including a supersaturated concentration, 0.001 to 15M, 0.1M to 12M, 0.25M to 10M, 2M to 10M, 2M to 9M, 2.5M to 9M, 2.8M to 8M, 3M to 7M, 3M to 6M, 4M to 6.5M, 5.00M to 10M, 5.001M to 7.5M, 5.00M to 10M, 5.001M to 7.0M, and 5.001M to 6M are typical in the charge and discharge cells of the invention. The vanadium ions in the electrolyte solution are prepared by dissolving an oxide, sulphate, phosphate, nitrate, halogenide or other salt or complex of vanadium which is soluble or which can be solubilized in the electrolyte solution. Examples of suitable vanadium salts include ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3$ $V_2O_5$); cesium vanadium sulphate (VCs $(SO_4)_2$ $12H_2O$); iron metavanadate ($Fe(VO_2)_3$); lead metavanadate ($Pb(VO_5)_2$); potassium metavanadate ($KVO_3$); potassium vanadium sulphate ($KVSO_4$); rubidium vanadium sulphate ($RbV(SO_4)_2$); sodium meta vanadate ($NaVO_3$); meta vanadic acid ($HVO_3$); sodium orthovanadate ($Na_3VO_4$); potassium orthovanadate ($K_3VO_4$); ammonium orthovanadate; sodium pyrovanadate ($Na_4V_2O_7$); potassium pyrovanadate ($K_4V_2O_7$); ammonium pyrovanadate; sodium hexavanadate ($Na_4V_6O_{17}$); potassium hexavanadate ($K_4V_6O_{17}$); ammonium hexavanadate; thallium pyrovanadate ($Tl_4V_2O_7$); thallium metavanadate ($TlVO_3$); thallium pyrovanadate ($ThV_2O_7$ $6H_2O$); vanadium pentoxide ($V_2O_5$); vanadium sulphate ($V(SO_4)_2$); vanadium sulphate ($V_2(SO_4)_2$); vanadium oxide VO; and calcium and magnesium vanadates including calcium metavanadate and magnesium metavanadate. Other vanadium salts and complexes can also be dissolved and reduced in an electrolyte solution. Generally for an all-vanadium redox battery, the catholyte and anolyte include a solution of vanadium prepared from a salt selected from the group consisting of a salt of the formula $VO(X)y$ where y is 2 and X is F, Br or Cl, a salt of the formula $VO(X)y$ where y is 1 and X is $SO_4$ or O, $V_2O_5$, $V_2O_3$, $V_2O_4$, $VSO_4$, $V_2(SO_4)_3$, $(VO_2)_2SO_4$, and $NH_4VO_3$. Vanadium salts or complexes such as ammonium metavanadate ($NH_4VO_3$), $V_2O_5V_2O_3$, $V_2O_4$, $VSO_4$, $V_2(SO_4)_3$, $VOSO_4$ and ammonium vanadium sulphate ($NH_4V(SO_4)_2$) are particularly advantageous since no additional ions other than vanadium sulphate and ammonium are introduced permitting higher concentrations of vanadium ions to be prepared and reducing further treatment of electrolyte solution to remove unwanted products. It is especially preferable to dissolve vanadyl sulphate in 0.5M to 10M, more typically 3 to 9M, and even more typically 4 to 8M and yet even more typically 5 to 7.5M $H_2SO_4$ or $V_2O_5$ or ammonium metavanadate in 0.5M to 10M, more typically 3 to 9M, and even more typically 4 to 8M and yet even more typically 5 to 7.5M $H_2SO_4$ by electrolytic dissolution or by chemical leaching with V(III) or other suitable reductant (see e.g. International Application No. PCT/AU88/00471 the contents of which are incorporated herein by cross reference).

The stabilising agent is selected in accordance with the types of redox ions involved. Depending on those ions the stabilising agent may be $K_2SO_4$, $Na_2SO_4$, $KHC_2O_4.H_2O$, $K_2C_2O_4$, $Na_2C_2O_4$, $(NH_4)_2C_2O_4$, $NH_4HC_2O_4.H_2O$, $LiHC_2O_4.H_2O$, $NaHC_2O_4.H_2O$, $Li_2C_2O_4$, $H_2C_2O_4$. Other stabilising agents can be used. For example, in principle it should possible to use a reducing organic water-soluble compound such as a reducing organic water-soluble mercapto group—containing compound including SH—containing water-soluble lower alcohols (including SH—containing $C_1$–$C_{12}$ primary, secondary and tertiary alkyl alcohols), SH—containing $C_1$–$C_{12}$ primary, secondary and tertiary alkyl carboxylic acids, SH—containing $C_1$–$C_{12}$ primary, secondary and tertiary alkyl amines and salts thereof, SH—containing $C_1$–$C_{12}$ primary, secondary and tertiary alkyl amine acids and di- or tripeptides such as 2-mercaptoethylamine hydrochloride, 2-mercaptoethanol, 2-mercaptopropionylglycine, 2-mercaptopropionic acid, cystenylglycine, cysteine, carbamoyl cysteine, homocysteine, glutathione, cysteine hydrochloride ethyl ester and acetylcysteine. Other suitable stabilising agents include a β-diketone, aminomethylene phosphonates, N, N-bis(phosphononmethyl)cysteic acid and the Na, K and ammonium salts thereof, polyether polyamino methylene phosphonates, the salts of ethylenediamine tetraacetic acid (EDTA) such as ethylenediaminetetra-acetic acid disodium salt, ethylenediaminetetraacetic acid diammonium salt, ethylenediamine, ethylenediaminetetraacetic acid trisodium salt, triethylene tetramine, triethylene tetramine hexaacetic acid, ethylenediaminetetraacetic acid tetra-sodium salt, ethylenediaminetetraacetic acid tetra-potassium salt, ethylenediaminetetraacetic acid tetraammonium salt, etc., EDTA (disodium calcium, barium or magnesium salt), EDTA (dipotassium calcium, barium or magnesium salt), EDTA (diammonium calcium, barium or magnesium salt, methyl EDTA, the salts of diethylenetriamine-pentaacetic acid (DTPA) such as diethylenetriamine-pentaacetic acid pentasodium salt, diethylenetri-aminepentaacetic acid pentapotassium salt, diethylenetriamine pentaacetic acid trisodium barium, calcium or magnesium salt, diethylenetriamine pentaacetic acid tripotassium barium, calcium or magnesium salt, etc., glycolether diamine tetraacetic acid, diaminopropanedioltetraacetic acid, the salts of (N-hydroxyethyl) ethylenediaminetriacetic acid (HEDTA) such as (N-hydroxyethyl) ethylenediamine-triacetic acid trisodium salt, (N-hydroxyethyl) ethyl-enediaminetriacetic acid tripotassium salt, etc., nitrilotriacetic acid, the salts of nitrilotriacetic acid (NTA) such as nitrilo-triacetic acid trisodium salt, humic acid, pyridine-2,6-dicarboxylic acid, pyridine carboxaldoxime, nitrilotriacetic acid tripotassium salt, stabilising agents such as triethanolamine, diethanolamine, monoethanolamine, organic carboxylic acid stabilising agents, organic aminopolycarboxylic acids, organic phosphoric acid stabilising agents, inorganic phosphoric acid stabilising agents, polyhydroxy compounds, phenanthroline, ethylenediamine diorthohydroxyphenylacetic acid, diaminopropanetetraacetic acid, nitrilotriacetic acid, dihydroxyethylglycine, ethylenediaminediacetic acid (EDDA), ethylene-diaminedipropionic acid, iminodiacetic acid, diethylenetriaminepentaacetic acid, hydroxyethylimino-diacetic acid, diaminopropanolteraacetic acid, transcyclohexanediaminetetraacetic acid, ethylenediaminetetraacetic acid, iminodiacetic acid, glycol ether diaminetetraacetic acid, ethylenediaminetetrakismethylenephosphonic acid, nitrilotrimethylenephosphonic acid, 1-hydroxyethylidene-1, 1'-diphosphonic acid, 1,1'-diphosphonoethane-2-carboxylic acid, 2-phosphonobutane-1,2,4-tricarboxylic acid, hydroxyethyliminodiacetic acid, 1-hydroxy-1-phosphonopropane-1, 2,3-tricarboxylic acid, catechol-3,5-disulfonic acid, sodium pyrophosphate, sodium tetrapolyphosphate, sodium hexametaphosphate, orthophosphoric acid, polyphosphoric acid, mono- and di-hydrogen-phosphoric acid, substituted ring carbon compounds (aryl and alkyl and alkenyl) containing 3 or more (typically 3–15, more typically 3–10) carbon atoms including at least two groups selected from the group consisting of —OH, =O, —COOH, —NH$_2$, and —SH, aminopolycarboxylic acids, including the salts thereof, N-hydroxyethyl aminodiacetic acid and the polyaminocarboxylic acids including N-hydroxyethylethylenediaminetriacetic acid, diethylenetriaminepentaacetic acid, cyclohexene diamine tetraacetic acid, triethylene tetraamine hexa-acetic acid and salts thereof and the like; aminophosphonate acids such as ethylene diamine tetra(methylene phosphonic acid), aminotri (methylene phosphonic acid), diethylenetriamine penta (methylene phosphonic acid); phosphonate acids such as 1-hydroxy ethylidene-1,1-diphosphonic acid, 2-phosphono acetic acid, 2-phosphono propionic acid, and 1-phosphono ethane 1,2-dicarboxylic acid; amino-polyphosphonates including nitrilotris phosphate (N(CH$_2$PO$_3$H$_2$)$_3$), the Dequest range generally, and, in particular, including Dequest 2000, 2054, 2010, 2016D, 2041, 2046, 2060S, 2066 or 2006; the Briquest range generally including BRIQUEST 221-60A, (2-Hydroxyethyliminobis(methylenephosphonic), HOCH$_2$CH$_2$N(CH$_2$PO$_3$H$_2$)$_2$ BRIQUEST 231-A, iso-Propyliminobis-(methylenephosphonic), i-PrN(CH$_2$PO$_3$H$_2$)$_2$, BRIQUEST 2N31-A, n-Propyliminobis-(methylenephosphonic), n-PrN(CH$_2$PO$_3$H$_2$)$_2$, BRIQUEST 2N41-A, n-Butyliminobis-(methylenephosphonic), n-BuN(CH$_2$PO$_3$H$_2$)$_2$, BRIQUEST 2N61-A, n-Hexyliminobis-(methylenephosphonic), n-HexylN(CH$_2$PO$_3$H$_2$)$_2$, BRIQUEST 2N71-A, n-Heptyliminobis (methylenephosphonic), n-HeptylN(CH$_2$PO$_3$H$_2$)$_2$, BRIQUEST 281-A, (2-Ethylhexyl) iminobis-(methylenephosphonic), (2-Ethylhexyl)N(CH$_2$PO$_3$H$_2$)$_2$, BRIQUEST 2N81-A, n-Octyliminobis-(methylenephosphonic), n-octylN(CH$_2$PO$_3$H$_2$)$_2$, BRIQUEST 291-A, iso-Nonyliminobis-(methylenephosphonic), iso-nanylN(CH$_2$PO$_3$H$_2$)$_2$, BRIQUEST 2121-A, Dodecyl iminobis-(methylenephosphonic), dodecyl N(CH$_2$PO$_3$H$_2$)$_2$, BRIQUEST ADPA-60A, 1-Hydroxyethane-1,1-diphosphonic, CH$_3$C(OH) (PO$_3$H$_2$)$_2$, BRIQUEST 301-50A, Nitrilotris-(methylenephosphonic), N(CH$_2$PO$_3$H$_2$)$_3$, BRIQUEST 422-100A, Ethylenediaminetetrakis-(methylenephosphonic), [CH$_2$N(CH$_2$PO$_3$H$_2$)$_2$]$_2$, BRIQUEST 462-A, Hexamethylenediaminetetrakis-(methylenephosphonic), [C$_3$H$_6$N(CH$_2$PO$_3$H$_2$)$_2$]$_2$, BRIQUEST 543-45AS, Diethylenetriamine-pentakis (methylenephosphonic), H$_2$O$_3$PCH$_2$N[C$_2$H$_4$N(CH$_2$PO$_3$H$_2$)$_2$]$_2$, BRIQUEST 664-A, Triethylenetetramine-hexakis (methylenephosphonic), C$_{12}$H$_{36}$N$_4$O$_{18}$P$_6$, BRIQUEST 785-A, Tetraethylenepentamine-heptakis (methylenephosphonic), C$_{15}$H$_{44}$N$_5$O$_{21}$P$_7$, BRIQUEST 8106-A, Pentaethylenehexamine-octakis (methylenephosphonic), C$_{18}$H$_{52}$N$_6$O$_{24}$P$_8$, as well as the sodium, potassium and ammonium salts of all these acids, aminophosphonate acids such as ethylene diamine tetra (methylene phosphonic acid), aminotri(methylene phosphonic acid), diethylenetriamine penta(methylene phosphonic acid), 1-hydroxy ethylidene (1,1-diphosphonic acid), ethylene diamine tetra (methylene phosphonic acid), hexamethylene diamine tetra (methylene phosphonic acid), diethylene triamine penta (methylene phosphonic acid), as well as the sodium, potassium and ammonium salts of all these acids, substituted anilines, 2-phosphonobutane-1,2,4-tricarboxylic acid, nitrilotrimethylenephosphonic acid, 1-hydroxyethylidene-1,1'-diphosphonic acid, 1,1'-diphosphonoethane-2-carboxylic acid, 1-hydroxy-1-phosphonopropane-1,2,3-tricarboxylic acid, catechol-3,5-disulfonic acid, sodium pyrophosphate, sodium tetrapolyphosphate, phosphonate acids such as 1-hydroxy ethylidene-1,1-diphosphonic acid, 2-phosphono acetic acid, 2-phosphono propionic acid, and 1-phosphono ethane 1,1, 2-dicarboxylic acid, sodium hexametaphosphate, aminopolycarboxylic acids, including the salts thereof, poly-hydroxy stabilising agents such as a saccharide including L- and D-isomers and α and β forms where appropriate, including monosaccharides in particular acid-soluble monosaccharides, such as glucose, fructose, mannose, L-streptose, an aldose including aldomonose, aldodiose, aldotriose, aldotetrose, aldopentose, aldohexose, aldoheptose, aldooctose, aldononose, and aldodecose, a ketose including ketomionose, ketodiose, ketotriose, ketotetrose, ketopentose, ketohexose, ketoheptose, ketooctose, ketononose, and ketodecose, idose, galactose, allose, arabinose, gulose, fucose, glycose, glycosulose, erythrose, threose, ribose, xylose, lyxose, altrose, idose, talose, erythrulose, ribulose, mycarose, xylulose, psicose, sorbose, tagatose, glucuronic acid, glucaric acid, gluconic acid, glucuronic acid, glyceraldehyde, glucopyranose, glucofuranose, aldehydo-glucose, arabinofuranose, galacturonic acid, manuronic acid, glucosamine, galactosamine and neuraminic acid, disaccharides, in particular acid-soluble disaccharides, such as sucrose, maltose, cellobiose, lactose, strophanthobiose, and trehalose, acid-soluble, branched or unbranched or cyclic, homo- or hetero-oligosaccharides, in particular acid-soluble oligosaccharides, including di-, tri-, tetra-, penta-, hexa-, hepta-, octa-, nona- and deca-saccharides, cyclodextrin, cycloheptaamylose, cyclomaltoheptaose, and acid-soluble, branched or unbranched or cyclic, homo- or hetero-polysaccharides in particular acid-soluble polysaccharides, such as a small starch molecules, as well as homo or heteropolymers thereof, glycosides such as ethyl glucopyranoside, an amino carboxylic acid (typically containing $C_1$–$C_{12}$ and typically $C_1$–$C_{12}$ primary, secondary or tertiary alkyl, alkenyl or alkynyl), $C_2$–$C_{12}$ primary, secondary or tertiary carbon chain compound selected from the group consisting of $C_2$–$C_{12}$ alkyl, $C_2$–$C_{12}$ alkenyl, and $C_2$–$C_{12}$ alkynyl, the carbon chain compound including at least two groups selected from the group consisting of —OH, =O, —COOH, —$NH_2$, and —SH, an amino polycarboxylic acid (having two or more carboxylic acids e.g. 2–10), (typically containing $C_1$–$C_{12}$ and typically $C_1$–$C_{12}$ primary, secondary or tertiary alkyl, alkenyl or alkynyl), a polyaminocarboxylic acid (having two or more amino groups e.g. 2–10), (typically containing $C_1$–$C_{12}$ and typically $C_1$–$C_{12}$ primary, secondary or tertiary alkyl, alkenyl or alkynyl), a polyamino-polycarboxylic acid (having two or more amino groups e.g. 2–10, and having two or more carboxylic acids e.g. 2–10), (typically containing $C_1$–$C_{12}$ and typically $C_1$–$C_{12}$ primary, secondary or tertiary alkyl, alkenyl or alkynyl), a polycarboxylic acid (having two or more carboxylic acids e.g. 2–10), (typically containing $C_1$–$C_{12}$ and typically $C_1$–$C_{12}$ primary, secondary or tertiary alkyl, alkenyl or alkynyl), a hydroxycarboxylic acid, (typically containing $C_1$–$C_{12}$ and typically $C_1$–$C_{12}$ primary, secondary or tertiary alkyl, alkenyl or alkynyl), a hydroxypolycarboxylic acid, (having two or more carboxylic acids e.g. 2–10), (typically containing $C_1$–$C_{12}$ and typically $C_1$–$C_{12}$ primary, secondary or tertiary alkyl, alkenyl or alkynyl), a polyhydroxycarboxylic acid, (having two or more hydroxy groups e.g. 2–12), (typically containing $C_1$–$C_{12}$ and typically $C_1$–$C_{12}$ primary, secondary or tertiary alkyl, alkenyl or alkynyl), a polyhydroxypolycarboxylic acid, (having two or more hydroxy groups e.g. 2–12 and having two or more carboxylic acids e.g. 2–10), (typically containing $C_1$–$C_{12}$ and typically $C_1$–$C_{12}$ primary, secondary or tertiary alkyl, alkenyl or alkynyl), a mercaptocarboxylic acid, (typically containing $C_1$–$C_{12}$ and typically $C_1$–$C_{12}$ primary, secondary or tertiary alkyl, alkenyl or alkynyl), a mercaptopolycarboxylic acid, (having two or more carboxylic acids e.g. 2–10), (typically containing $C_1$–$C_{12}$ and typically $C_1$–$C_{12}$ primary, secondary or tertiary alkyl, alkenyl or alkynyl), a polymercaptocarboxylic acid, (having two or more SH groups e.g. 2–12), (typically containing $C_1$–$C_{12}$ and typically $C_1$–$C_{12}$ primary, secondary or tertiary alkyl, alkenyl or alkynyl), a polymercaptopolycarboxylic acid, (having two or more mercapto groups e.g. 2–12 and having two or more carboxylic acids e.g. 2–10), (typically containing $C_1$–$C_{12}$ and typically $C_1$–$C_{12}$ primary, secondary or tertiary alkyl, alkenyl or alkynyl), a mercaptohydroxycarboxylic acid, (typically containing $C_1$–$C_{12}$ and typically $C_1$–$C_{12}$ primary, secondary or tertiary alkyl, alkenyl or alkynyl), a mercaptohydroxypolycarboxylic acid, (having two or more carboxylic acids e.g. 2–10), (typically containing $C_1$–$C_{12}$ and typically $C_1$–$C_{12}$ primary, secondary or tertiary alkyl, alkenyl or alkynyl), a polymercaptohydroxycarboxylic acid, (having two or more SH groups e.g. 2–12), (typically containing $C_1$–$C_{12}$ and typically $C_1$–$C_{12}$ primary, secondary or tertiary alkyl, alkenyl or alkynyl), a polymercaptohydroxypolycarboxylic acid, (having two or more mercapto groups e.g. 2–12 and having two or more carboxylic acids e.g. 2–10), (typically containing $C_1$–$C_{12}$ and typically $C_1$–$C_{12}$ primary, secondary or tertiary alkyl, alkenyl or alkynyl), mono- or poly-mercaptomono- or poly-hydroxymono- or poly-carboxylic acid, (having one or more mercapto groups e.g. 1–12, having one or more hydroxy groups e.g. 1–12 and having one or more carboxylic acids e.g. 1–10), (typically containing $C_1$–$C_{12}$ and typically $C_1$–$C_{12}$ primary, secondary or tertiary alkyl, alkenyl or alkynyl), a mercaptopolyhydric alcohol (having two or more OH groups e.g. 2–15, more typically 2–10), (typically containing $C_1$–$C_{12}$ and typically $C_1$–$C_{12}$ primary, secondary or tertiary alkyl, alkenyl or alkynyl), a polymercaptopolyhydric alcohol (having two or more SH groups e.g. 2–15, more typically 2–10, and having two or more OH groups e.g. 2–15, more typically 2–10), (typically containing $C_1$–$C_{12}$ and typically $C_1$–$C_{12}$ primary, secondary or tertiary alkyl, alkenyl or alkynyl), a polymercaptohydric alcohol (having two or more SH groups e.g. 2–15, more typically 2–10), (typically containing $C_1$–$C_{12}$ and typically $C_1$–$C_{12}$ primary, secondary or tertiary alkyl, alkenyl or alkynyl), a polyhydric alcohol (having two or more OH groups e.g. 2–15, more typically 2–10), (typically containing $C_1$–$C_{12}$ and typically $C_1$–$C_{12}$ primary, secondary or tertiary alkyl, alkenyl or alkynyl), such as —$CH_2$—CHOH—$CH_2$OH, —$CH_2$-(CHOH)$_2$—$CH_2$OH, —$CH_2$-(CHOH)$_3$—$CH_2$—OH, —$CH_2$-(CHOH)$_4$—$CH_2$OH, or mannitol, sorbitol, glycidol, inositol, pentaerythritol, galacitol, adonitol, xylitol, alabitol, or stabilising agents such as glycols, glycol ethers, polyethylene glycol, propylene glycol monostearate, propylene glycol distearate, ethylene glycol monostearate, diglycerol, ethylene glycol, ethylene glycol distearate, ammonium lauryl stearate, monothioglycerol, mono-, di and tri-glycerides, diethylene glycol, dipropylene glycol, hexamethylene glycol, cyclohexamethylenediol, 1,1,1-trimethylolpropane, pentaerythritol, urea, butylene glycol, dibutylene glycol, hexylene glycol, 1,3 propane diol, 1,2 propane diol, butenediol, 1,4 butane diol, 1,3 butane diol, butenediol, 1,4 cyclohexane dimethanol, 1,3 cyclopentane dimethanol, 2,3 butane diol, 2-methylenepropane-1,3-diol, 2-methylpropane-1,3-diol, 2-ethylenepropane-1,3-diol, 2-ethylpropane-1,3-diol, 1,2-cyclopentane diol, 1,2-cyclohexane diol, neopentyl glycol, bis-hydroxymethyl cyclohexane, cyclohexanol, hexane-diol, hexane-triol, cyclohexane-diol, cyclohexane-triol, cycloheptanol, cycloheptane-diol, cycloheptane-triol, cyclopentanol, cyclopentane diol, cyclopentane triol, 2-methyl-enepropane-1,3-diol, 2-methylpropane-1,3-diol, pinacol, 2-butoxyethanol, ethylene glycol monomethyl ether, ethylene glycol monoethyl ether, propylene glycol monomethyl ether, propylene glycol monoethyl ether, monomethyl ether, monoethyl ether, diethylene glycol monomethyl ether, diethylene glycol monoethyl ether, triethylene glycol, tripropylene glycol, ethylene glycol, benzyl benzoate, dioxolanes, glycerine formals, thiosorbital, tetrahydrofurfuryl alcohol, $C_2$–$C_{10}$ polyhydroxyalkanols, more typically $C_2$–$C_4$ polyhydroxyalkanols, $C_1$–$C_{12}$ alcohols including $C_1$–$C_{12}$ alkanols, monohydric and polyhydric aliphatic alcohols having 1 to 6 carbon atoms such as ethyl alcohol, isopropyl alcohol and hexanol, glycol ethers, 2-methoxyethanol, 2-butoxyethanol, 5-ethoxy-1-pentanol, diethyleneglycol monoethyl ether, propylene glycol, 1,2 propylene glycol, dipropylene glycol, tripropylene glycol, triols, polyols, lactates, glycerin, lecithin, polyoxyethylene sorbitan monoleate, sorbiton monoleate, albumin, glyconolactone, glucopyranose, mannopyranose, galactopyranose, fructopyranose, arabinopyranose, glucopyranoside, fructofuranoside, ($C_1$–$C_6$ alkyl), glucopyranoside (where n=1–4), ($C_1$–$C_6$ alkyl)$_n$ fructofuranoside (where n=1–4), ($C_1$–$C_6$ alkyl)$_n$glucose (where n=1–4) including methyl glucose, ($C_1$–$C_6$ alkyl)$_n$glucoside (where n=1–4) including methyl glucoside, levulose, hydrogenated starch hydrolysates, maltitol, lecithin, ketones such as cyclohexanone, isophorone, diacetone alcohol, and methyl ethyl ketone. Any of the —OH functional groups in the above mentioned compounds may be replaced with an —SH functional group. Also included are ammonium compounds such as ammonium bromide, ammonium chloride, ammonium hypophosphite, ammonium phosphate, ammonium phosphite, ammonium fluoride, acidic ammonium fluoride, ammonium fluoroborate, ammonium arsenate, ammonium aspartate, ammonium hydrogen fluoride, ammonium hydrogen sulfate, ammonium sulfate, ammonium iodide, ammonium nitrate, ammonium pentaborate, ammonium acetate, ammonium adipate, ammonium taurinetricarboxylate, ammonium benzoate, ammonium carbamate, ammonium citrate, ammonium diethyldithiocarbamate, ammonium formate, ammonium hydrogen malate, ammonium hydrogen succinate, ammonium hydrogen phthalate, ammonium hydrogen tartarate, ammonium lactate, ammonium malate, ammonium maleate, ammonium oxalate, ammonium phthalate, ammonium picrate, ammonium pyrollidinedithiocarbamate, ammonium salicylate, ammonium succinate, ammonium sulfanilate, ammonium tartarate, ammonium thioglycolate and ammonium 2,4,6-trinitrophenol as well as the sodium and potassium salts of all of the above ions. Other suitable ammonium compounds include lauryltrimethylammonium chloride, stearyltri(2-hydroxyethyl) ammonium chloride, lauryldimethylbenzyl-ammonium chloride, dilauryldimethylammonium chloride, cetyldimethylbenzylammonium chloride, dicetyldimethy-lammonium chloride, laurylpyridinium chloride, cetylpyridinium chloride, N-(soya alkyl)-N,N,N-trimethyl ammonium chloride, polydiallyldimethyl-ammonium chloride, diallyldimethyl ammonium salt copolymerized with acrylamide, guarhydroxypropyltrimonium chloride, copolymer of N-vinyl-pyrrolidone and N,N-dimethylaminoethyl-methacrylate, quaternized with dimethyl-sulfate, copolymer of acrylamide and N,N-dimethylaminoethyl methacrylate, quaternized with dimethyl sulfate, cationic hydroxyethyl-cellulosics, cationic hydroxyethyl-cellulosics, cetyltrim-ethylammonium chloride, decyldimethyloctylammonium chloride, myristyltrimethylammonium chloride, polyoxyethylene (2)-cocomonium chloride, methylbis(2-hydroxyethyl)cocomonium chloride, methylpolyoxyethylene-(15) cocoammonium chloride, methyl bis (2-hydroxyethyl) octadecyl ammonium chloride, methylpolyoxyethylene-(15) octadecylammonium chloride, methylbis(2-hydroxyethyl) oleylammonium chloride and methylpolyoxyethylene-(15) oleylammonium chloride and any combination thereof.

Other suitable stabilising agents include glycerol, thioglycerol, sterols, glutathione, ascorbic acid, citric acid, oleic acid, stearic acid, palmitic acid, hexanediol, thiodiglycol, malic acid, citramalic acid, mucic acid, glycolic acid, hydroxyglutaric acid, syringin, turanose, validamycin A, B, C, D, E, or F, vanillin, vanilmandelic acid, vicianose, aloin, amygdalin, anthragallol, anthralin, anthrarufin, anthrarobin, apiose, arbutin, erythritol, D-erythrose, L-erythrose, L-erythrulose, D-erythrulose, fomeci A, fomecin B, frangulin A, frangulin B, fructose-6-phosphate, D-fucose, L-fucose, melezitose, melibiose, vanylglycol, methylglucoside, monotropein, mycarose, neopentyl glycol, orcinol, pantolactone, pentaerythritol, picrocrocin, pinacol, potassium glycerophosphate, sodium glycerophosphate, ammonium glycerophosphate, primeverose, protocatechualdehyde, pyrogallol, pyrocatechol, D-quercitol, L-quercitol, guinic acid, glutamic acid, raffinose, reductic acid, resorcinol, resorcylaldehyde, resorcylic acid, rhamnose, potassium salicylate, sodium salicylate, gallacetophenone, D-glucoascorbic acid, L-glucoascorbic acid, glucogallin, glucovanillin, glucuronolactone, D-gulose, L-gulose, hamamelose, helicin, D-manno-heptulose, L-manno-heptulose, 3-hydroxycamphor, inositol monophosphate, isoascorbic acid, kethoxal, 2-oxopentanedioic acid, 2-oxo-L or D-gulonic acid, lactulose, leucocyanidin, linamarin, 1,2,4-benzenetriol, glyceric acid, carminic acid, cellobiose, d-chalcose, l-chalcose, chitin, chlorogenic acid, coniferin, cymarose, 2-deoxy-D or L-glucose, D-2-deoxyribose, digitalose, digitoxose, L-2-deoxyribose, dioscin, D-streptose, taxicatin, thevetose, 5-thio-β-D-glucose, hydroxybutyric acid, hydroxyvaleric acid, acetonic acid, erythorbic acid, glucuronic acid, gluconic acid, gluconolactone, L-cysteine, D-penicillamine, L-lactic acid, monosodium glutamate, 2-mercaptosuccinic acid, catechol acid, oxalic acid, succinic acid, L-malic acid, monosodium phosphate, Tiron (Sigma Chemical Company, St. Louis, Mo., USA), DFOA (Ciba-Geigy, Barcelona Spain), $NaH_2PO_4.2H_2O$, D-penicillamine, DFO (a trihydroxamic acid iron siderophore) 2,3-dimercapto-1-propanal, tartaric acid, salicyclic acid, adipic acid EDDHA, picolinic acid 2,4-pentanedione (acetylacetone), acetylacetone, aliphatic (aceto, glycine, alanine and sorbo-), aromatic (salicyl-) and heterocyclic (nicotinic and histidine) monohydroxamic acids and dihydroxoamic rhodotorulic acid, 3,4-LICAMS (a linear catecholcarboxamide), NaNMGDTC, BGDTC, MeOBGDTC, MeOBGD, MeOBGDTC, BLDTG, MeBLDTC, malonic acid, HBED, CDTA, rhodotorulic acid, dihydroxyethyl glycine, cyclohexanone, dimercaprol, edetate calcium disodium, acetylacetonato, N, N-Diethylthiocarbamate, 2,2'-Dipyridyl (dipy), deferoxamine mesylate, o-Phenylenebisdimethylarsine (diars), aminopyridine, diethylenetriamine (dien), iminodiacetic acid (and salts thereof), triethylenetetramine (trien), nitrilotriacetic acid, nitrilotripropionic acid, 1,8-Bis (salicylideneamino)-3,6-dithiaoctane pyridine, edetate disodium, trientine hydrochloride, dimercaptosuccinic acid (DMSA), nitrilotriacetic acid and salts thereof, ethyleneglycol-bis-(β-aminoethyl ether)-N,N-tetraacetic acid and salts thereof, EDTA-HEDTA, glucosaccharic acid and Na, K, and ammonium salts thereof, Coco imidazoline betaine, Coco imidazoline betaine dicarboxylate, lauryl imidazoline betaine, Cheelox B-13 (GAF Corp. mixed alkyl-diaminepolyacetic acids, as sodium salts and alkanolamines), N-(hydroxyethyl) ethylene diaminetriacetate trisodium salt, nitriloacetate trisodium salt, trisodium salt of hydroxyethylethylenediaminetriacetic acid, diethylenetriamine-penta-acetic acid, pentasodium diethylenetriaminepenta-acetic acid, acetic acid, hydroxy acetic acid, lactic acid, hydroxy lactic acid, potassium lactate, sodium lactate, tetrasodium ethylene-diaminetetraacetate, trisodium n-hydroxyethylenediaminetriacetate, diammonium ethylene-diaminetetraacetate, sodium acetate, potassium acetate, sodium ferric ethylene-diaminetetraacetate, ammonium ferric ethylene-diaminetetraacetate, trisodium magnesium diethylenetriaminepentaacetate, diethanolglycine sodium salt, ethanoldiglycine disodium salt, Hexol Q (GAF corporation, complex phosphate compound) Interstab CH-55, CH-55R (Interstab Chem. Inc.—organophosphites), Kalex (Hart Products Corp, organic amino acid type), disodium dihydroxyethyl ethylenediamine diacetate, pentasodium diethylenetriamine pentaacetate, Miranol CM Conc. (Miranol Chem. Co., Inc.—monocarboxylated cocoyl imidazolinie derivative), Miranol HS Conc. (Miranol Chem. Co., Inc.—sulfonated lauric derivative, sodium salt) calcium salt of DTPA, 1,5-anhydro-glucitol, 1,4-sorbitan, isosorbide, cyclitols including myo-inositol (see W. W. Wells and F.

Eisenberg. Jr., eds. "Cyclitols and Posphoinositides", Academic Press, New York, 1978, the contents of which are incorporated herein by cross reference), cladinose, glucal triacetate, 2-deoxy-ribofuranose, rhamnopyranose, ammonium gluconate, lithium gluconate, sodium gluconate, potassium gluconate, ammonium acid gluconate, lithium acid gluconate, sodium acid gluconate, potassium acid gluconate, ammonium D-gluconate, lithium D-gluconate, sodium D-gluconate, potassium D-gluconate, gluconic acid, gluconic D acid, gluconic L acid, ammonium L-gluconate, lithium L-gluconate, sodium L-gluconate, potassium L-gluconate, magnesium gluconate, magnesium acid gluconate, magnesium D-gluconate, magnesium L-gluconate, calcium gluconate, calcium acid gluconate, calcium D-gluconate, calcium L-gluconate, ammonium sorbate, lithium sorbate, sodium sorbate, potassium sorbate, ammonium acid sorbate, lithium acid sorbate, sodium acid sorbate, potassium acid sorbate, ammonium D-sorbate, lithium D-sorbate, sodium D-sorbate, potassium D-sorbate, ammonium L-sorbate, lithium L-sorbate, sodium L-sorbate, potassium L-sorbate, magnesium sorbate, magnesium i acid sorbate, magnesium D-sorbate, magnesium L-sorbate, calcium sorbate, calcium acid sorbate, calcium D-sorbate, calcium L-sorbate, ammonium glucuronate, lithium glucuronate, sodium glucuronate, potassium glucuronate, lithium acid glucuronate, sodium acid glucuronate, ammonium acid glucuronate, potassium acid glucuronate, ammonium D-glucuronate, lithium D-glucuronate, sodium D-glucuronate, potassium D-glucuronate, glucuronic acid, glucuronic D acid, glucuronic L acid, ammoniium L-glucuronate, lithium L-glucuronate, sodium L-glucuronate, potassium L-glucuronate, magnesium glucuronate, magnesium acid glucuronate, magnesium D-glucuronate, magnesium L-glucuronate, calcium glucuronate, calcium acid glucuronate, calcium D-glucuronate, calcium L-glucuronate, ammonium glucoheptonate, lithium glucoheptonate, sodium glucoheptonate, potassium glucoheptonate, lithium acid glucoheptonate, sodium acid glucoheptonate, ammonium acid glucoheptonate, potassium acid glucoheptonate, ammonium D-glucoheptonate, lithium D-glucoheptonate, sodium D-glucoheptonate, potassium D-glucoheptonate, glucoheptonic acid, glucoheptonic D acid, glucoheptonic L acid, ammonium L-glucoheptonate, lithium L-glucoheptonate, sodium L-glucoheptonate, potassium L-glucoheptonate, magnesium glucoheptonate, magnesium acid glucoheptonate, magnesium D-glucoheptonate, magnesium L-glucoheptonate, calcium glucoheptonate, calcium acid glucoheptonate, calcium D-glucoheptonate, calcium L-glucoheptonate, ammonium glyconate, lithium glyconate, sodium glyconate, potassium glyconate, ammonium acid glyconate, sodium acid glyconate, lithium acid glyconate, potassium acid glyconate, ammonium D-glyconate, lithium D-glyconate, sodium D-glyconate, potassium D-glyconate, glyconic acid, glyconic D acid, glyconic L acid, ammonium L-glyconate, lithium L-glyconate, sodium L-glyconate, potassium L-glyconate, magnesium glyconate, magnesium acid glyconate, magnesium in D-glyconate, magnesium L-glyconate, calcium glyconate, calcium acid glyconate, calcium D-glyconate, calcium L-glyconate, DTPA HEDTA, NTA, Seqlene 190, 270 and ES-40 (Pfanstiehl Laboratories-Reaction mixture forming, sodium-α-d-glucoheptonate, sodium-n-d-glucoheptonate, aldobionates and other complex carbohydrates), sodium-α-1-glucoheptonate, sodium-β-1-glucoheptonate, $Na_2EDTA$, $Na_2CaEDTA$, $(NH_4)_2$ EDTA, $Na_2(CuEDTA)$, $Na(FeEDTA)$, $Na_3CaDTPA$ $(NH_4)_4$ EDTA, $H_4EDTA$, carboxymethyl mercaptosuccinic acid, L-dopa, meso-2,3-di mercapto-succinic acid, DL-Malic acid, picolinic acid, 2,4-pentandione, tetracycline, 3,4-LICAMS, 3-ethyl-3-hydroxypyr-4-one, DMSA, DMPS, DMPA, trien, DF, gallic acid, 2-ethyl-3-hydroxypyr4-one, 1-ethyl-3-hydroxypyridin-2-one, 1,2-dimethyl-3-hydroxypyridin-4-one, 1-methyl-2-ethyl-3-hydroxypyridin-one, 1-ethyl-2-methyl-3-hydroxypyridin-4-one, 1,2-diethyl-3-hydroxypyridin-4-one, 1-propyl-2-methyl-3-hydroxypyridin-one, 1-butyl-2-methyl-3-hydroxypyridin-4-one, 1-[ethan-1'-ol]-2-methyl-3-hydroxypyridin-4-one, 1-methoxyethyl-2-methyl-3-hydroxypyridin-4-one, 1,1-ethoxypropyl-2-methyl-3-hydroxypyridin4-one, acetohydroxamic acid, glycine hydroxamate, DL-Alanine hydroxamate, L-Histidine hydroxamate, Sobrohydroxamic acid, salicylhydroxamic acid, nicotinic acid hydroxamate, Rhodotorulic acid, DFO, 3,4,3-LICAM, 3,4,3-LICAM(S), 3,4,3-LICAM(C), BAL (and analogs thereof see M. M. Jones, Critical Reviews in Toxicology (1991) 21, 209 the contents of which is incorporated herein by cross reference), DDTC, D-penicillamine, D,L-penicillamine, N-acetyl-D-penicillamine, DMSA, $Na_2DMSA$, meso DMSA, D,L-DMPS, DMPS, TRIEN or deferroxamine B or other like Substances and any combination thereof. Other polyhydroxy stabilising agents including L- and D-isomers and α and β forms where appropriate, include Higher alditols, allo-Hexoses, altro-Hexoses, galacto-Hexoses, gluco-Hexoses, gulo-Hexoses, ido-Hexoses, manno-Hexoses, talo-Hexoses, Higher Aldoses, erythro-Pentuloses, threo-Pentuloses, fruto-Hexuloses, psico-Hexuloses, tagoto-Hexuloses, Miscellaneous ketoses, Higher ketoses, 6-Deoxyaltroses, 6-Deoxyalloses, 6-Deoxytaloses, 6-Deoxyglucoses, 6-Deoxyguloses, 6-Deoxyidoses, 6-Deoxymannoses, 6-Deoxygalactoses, Other 6-deoxy sugars, Glycosyl halides and other 1,1-halogenosugars, 2-Halogenosugars, 3-Halogenosugars, 4-Halogenosugars, 5-Halogenosugars, 6-Halogenosugars, Glycosylamines, 2-Amino-2-deoxysugars, 3-Amino-3-deoxysugars, 4-Amino-4-deoxysugars, 5-Amino-5-deoxysugars, 6-Amino-6-deoxysugars, Azido sugars, Thioglycosides and 1-thiosugars, other thiosugars, 1-Deoxy sugars, 2-Deoxy sugars, 3-Deoxy sugars, 3-Deoxy sugars, 4-Deoxy sugars, 5-Deoxy sugars, 2,6-Dideoxy sugars, 3,6-Dideoxy sugars, 4,6-Dideoxy sugars, Polydeoxy sugarsUnsaturated sugars; 1-ens, Unsaturated sugars; 2-enes, Unsaturated sugars; 3-enes, Unsaturated sugars; 4-enes, Unsaturated sugars; 5-enes, Other unsaturated sugars, Branched chain sugars, Dicarbonyl sugars; glycos-2-uloses, Nucleosides, 1,2-Anhydrosugars, 1,3-Anhydrosugars, 1,4-Anhydrosugars 1,5-Anhydrosugars, 1,6-Anhydrosugars 2,3-Anhydrosugars, 2,5-Anhydrosugars 2,6-Anhydrosugars, 3,4-Anhydrosugars 3,6-Anhydrosugars, 4,6-Anhydrosugars, 5,6-Anhydrosugars, Dianhydrosugars, Other anhydrosugars, Dicarbonyl sugars, Polysaccharides, glycos-3-uloses, Dicarbonyl sugars, Tetroses, glycos-4-uloses, Dicarbonyl sugars; glycos-5-uloses, Diuloses, Dialdoses, Pentitols, arabino-Pentoses, xylo-Pentoses, ribo-Pentoses, xylo-Pentoses, Aldonic acids, Hexitols, Ketoacids, Cyclitols, Sugar phosphates, Glycuronic acids, Aldaric acids, Oligosaccharides, Aminodeoxyalditols, Higher acids, Other acids, Glycerol derivatives, Tetritols, and Disaccharides (see Carbohydrates, P. M. Collins (editor), Chapman and Hall Ltd, New York 1987, CRC Handbook of Oligosaccharides, Volumes I and II, CRC Press, Inc., Boca Raton, Florida, 1990, and Modern Carbohydrate Chemistry, R. W. Binkley, Marcel Dekker, Inc., New York, 1988, the contents of all of which are incorporated herein by cross reference). Further examples of stabilising agents include 1,2-O-

Isopropylidene-6-thio-α-D-glucofuranose, 1,2-O-Isopropylidene-5-thio-α-D-xylofuranoset Methyl 2-acetamido-2-deoxy-5-thio-β-D-glucopyranoside, Methyl 2-deoxy-arabino-hexopyranoside; α-D-form, 3-O-Methylgalactose; D-form, Di-Et dithioacetal, Methyl α-D-glucothiapyranoside, Methyl β-D-glucothia-pyranoside, Methyl tetra-O-acetyl-α-D-glucothiapyranoside, Methyl tetra-O-acetyl-β-D-glucothiapyranoside, 5'-S-Methyl-5'-thioadenosine, 2-Methylthioadenosine 5'-(dihydrogen phosphate), Methyl 5-thio-α-D-ribo-pyranoside, Methyl 5-thio-β-D-ribo-pyranoside, 1,2,3,4,6-Penta-O-acetyl-5-deoxy-5-mercapto-L-ido-pyranose 2,3,4,5,6-Penta-O-acetyl-D-galactose diethyldithioacetal, 2,3,4,5,6-Penta-O-acetyl-D-glucose diethyldithioacetal, Phenyl 2,3,4,6-tetra-O-acetyl-6-thio-α-D-gluco-pyranoside, Phenyl 2,3,4,6-tetra-O-acetyl-6-thio-β-D-gluco-pyranoside, 7-Ribofuranosyladenine; β-D-form, 2-Methylthio, D-Ribothiafuranose, L-Ribothiafuranose, α-D-Ribothiapyranose, 2,3,4,6-Tetra-O-acetyl-5-thio-α-D-glucopyranosyl bromide, Tetra-O-acetyl-5-thio-β-D-ribopyranose, 1,2,3,4-Tetra-O-acetyl-5-thio-α-D-xylopyranose, 1,2,3,4-Tetra-O-acetyl-5-thio-β-D-xylopyranose, 3,4,5,6-Tetra-O-benzoyl-D-glucose diethyldithioacetal, 3'-Thioadenosine, 2-(4-Thioarabinofuranosyl)-adenine; β-D-form, 5-Thioarabinose; L-Furanose-form, 5-Thioglucose; α-D-Pyranose-form, Penta-Ac, 5-Thioglucose; α-D-Pyranose-fom, Me glycoside, 6-phosphate, 5-Thioglucose; β-D-Pyranose-form, Penta-Ac, 5-Thioglucose; β-D-Pyranose-form, 1-Bromo, tetra-Ac, 6-Thioglucose; β-D-Pyranose-form, 1,2,3,4,6-Penta-Ac, 5-Thioribose; β-D-Pyranose-form, 2-Thioridine, 4-Thioridine, 2-(4-Thiooxyloguranosyl)-adenine; α-D-Pyranose-form, 2-(4-Thioxylofuranosyl)-adenine; β-D-form, 5-Thioxylose, 2,3,4-Tri-O-acetyl-1,6-di-S-benzoyl-1,6-dithio-β-D-glucopyranose, 3,5,6-Tri-O-benzoyl-D-glucose diethyldithioacetal, 2,7-Anhydro-1-deoxy, 4,5-O-isopropyliden-β-D-ribo-hepto-2,3-diulo-2,6-pyranose, 1,5-Anhydro-2,3,4,6-tetra-O-benzoyl -L-threo-hex-4-enitol, 1,O-Benzoyl-L-fucitol, 1,3-O-Butylidene-L-fucitol, 1-Deoxy-threo-pentulose; D-form, 1,5-Dideoxy-1,5-imino-D-glucitol, 1,5-Dideoxy-1,5-(methyl-imino)-D-glucitol, 2,3:4,5-Di-O-isopropylidene-L-fucitol, manno-2-Heptulose; D-form, 1-Deoxy, 1,2,3,4,5-Penta-O-acetyl-L-fucitol, 1,2,3,4,5-Penta-O-benzoyl-L-fucitol, Rhodeitol, 3-Acetamideo-2,3,6-trideoxy-D-arabino-hexopyranose, Acosamine, 5'-(2-Adeninyl)-2',dideoxy-ribofuranosyladenine, Δ2-Amino-2-(2-deoxy-β-D-erythro-pentoruranosyl)purin-6-one, 3-Amino-2,3,6-trideoxy-arabino-hexose, D-Pyranose-form, 1,6-Anhydro-2,3-dideoxy-β-D-glycero-hexopyranos-4-ulose, 3-Benzamido-4-O-benzoyl-2,3,6-trideoxy-3-C-methyl-α-L-xylo-hexopyranose, Δ5-Bromo-2'dexoyuridine, Δ2'-Deoxyadenosine, Δ2'-Deoxycytidine, 2'-Deoxy-5-diazouridine, Δ2'-Deoxy-5-fluorineidine, 2'-Deoxy-L-guanosine, 2-Deoxy-arabino-hexose; α-D-pyranose-form, 2-Deoxy-arabino-hexose; β-D-pyranose-form, 2-Deoxy-lyxo-hexose; 2-Deoxy-Ii)l-hexose, 2-Deoxy-xylo -hexose, Δ2'-Deoxy-5-iodouridine, 6-Deoxy-3-O-methylallose; D-form Δ2'-Deoxy-5-methylcytidine, 2-(2-Deoxy-erythro-pento-furanosyl)adenine; 2-(2-Deoxy-erythro-pento-furanosyl)adenine; α-D-form, 2-(2-Deoxy-erythro-pento-furanosyl)adenine; α-L-form, 2-Deoxy-threo-pentose; D-form, 2-(Deoxy-threo-pentose; L-form, 3-(2'-Deoxyribofuranosyl)-adenine; α-D-form, 3-(2'-Deoxyribofuranosyl)-adenine; α-L-form; β-D-form, 2'-Deoxyribofuranosylguanine; α-D-form. 2'-Deoxyribofuranosylguanine; β-D-form, 2'-Deoxyribofuranosylguanine; α-L-form, 2-Deoxyribose; D-form 2-Deoxyribose; L-form, 2-Deoxyribose; DL-form, Δ2'-Deoxyuridine, 2',3'-Dideoxyadenosine, 2',5'-Dideoxyadenosine, 3-(Dimethylamino)-2,3,6-trideoxy-lyxo-hexopyranose; Ethyl 3,6-anhydro-2-deoxy-4,5-O-isopropylidene-D-allo-heptonate, Ethyl 3-benzamido-3-C-methyl-2,3,6-trideoxy-α-L-lyxo-hexopyranoside, Ethyl 6-O-benzoyl-2,3-dideoxy-α-D-glycero-hexopyranosid-4-ulose, Ethyl 2,3-dideoxy-α-D-glycero-hexopyranosid-4-ulose, Forosamine, Javose, Methyl 3-acetamido-2,3,6-trideoxy-α-D-arabino-hexo-pyranoside, Methyl 3-acetamido-2,3,6-trideoxy-β-D-arabino-hexo-pyranoside, Methyl 4-(acetamido)-2,4,6-trideoxy-3-O-methyl-α-D-xylo-hexopyranoside, Methyl 4-acetamido-2,4,6-trideoxy-3-O-methyl-β-D-xylo-hexopyranoside, Methyl 3-amino-3-C-methyl-2,3,6-trideoxy-α-L-lyxo-hexo-pyranoside, Methyl 3-amino-2,3,6-trideoxy-3-C-methyl-α-lyxo-hexopyranoside, Methyl 4-amino-2,4,6-tri-deoxy-3-O-methyl-α-D-xylo-hexopyranoside, Methyl 3,6-anhydrous-4, 5, 7-tri-O-benzyl-2-deoxy-allo-heptonate, Methyl 3-benzamido-4-O-benzoyl-2,3,6-trideoxy-3-C-methyl-α-L-xylo-hexo-pyranoside, Methyl 3-benzamido-4-O-benzyl-2,3,6-trideoxy-3-C-methyl-62 -L-xylo-hexo-pyranoside, Methyl 3-benzamido-2,3,6-trideoxy-3-C-methyl-α-L-xylo-hexopyranoside, Methyl 4,6-O-benzyl-2-deoxy-α-D-arabino-hexopyranoside, Methyl 4,6-O-benzylidene-2-deoxy-β-D-arabino-hexo-pyranoside, Methyl 4,6-O-benzylidene-2-deoxy-α-D-erythro-hexo-pyranosid-3-ulose, Methyl 4,6-O-benzylidene-2-deoxy-threo-hexopyranos-3-ulose; α-D-form, Methyl 4,6-O-benzylidene-2-deoxy-threo-hexopyranos-3-ulose; β-D-form, Methyl 4,6-O-benzylidene-β-D-xylo-hexopyranoside, Methyl 4,6-benzylidene-β-D-lyxo-hexopyranoside, Methyl 2-deoxy-3,4-O-cyclo-hexylidene-β-D-erythro-pento-pyranoside, Methyl 2-deoxy-α-D-arabino-hexofuranoside, Methyl 2-deoxy-arabino-hexopyranoside; β-D-form, Methyl 2-deoxy-α-D-lyxo-hexo-pyranoside, Methyl 6-deoxy-2-O-methyl-α-D-allopyranoside, Methyl 6-deoxy-2-O-methyl-β-D-allopyranoside, Methyl 6-deoxy-3-O-methyl-α-D-allopyranoside, Methyl 2-dexoy-erythro-pento-furanoside; α-D-form, Methyl 2-deoxy-erythro-pento-pyranoside; α-D-form, Methyl 2-deoxy-erythro-pento-pyranoside; x-L-form, Methyl 2-deoxy-erythro-pento-pyranoside; β-L-form, Methyl 2-deoxy-5-O-trityl-α-D-erythro-pentopyranoside; β-L-form, Methyl 2-deoxy-5-O-trityl-β-D-erythro-pentpyranoside Methyl 2,3-dideoxy-β-D-glycero-hexopyranosid-4-ulose, Methyl 2,6-dideoxy-L-erythro-hexopyranosid-3-ulose; α-L-form, Methyl 2,6-dideoxy-4-O-methyl-α-L-erythro-hexopyrano-sid-3-ulose, Methyl 2,6-dideoxy-4-O-methyl-β-L-erythro-hexopyrano-sid-3-ulose, Methyl 3-(dimethylamino)-2,3,6-trideoxy-α-D-lyxo-hexopyranoside, Rhodosamine, 1,3,5 6-Tetra-O-acetyl-2-deoxy-α-D-arabino-hexo-furanose, 1,3,4,6-Tetra-O-acetyl-2-deoxy-β-D-arabino-hexo-pyranose, 1,3,4,6-Tetra-O-acetyl-2-deoxy-α-D-arabino-hexo-pyranose, 1,3,5-Tri-O-benzoyl-2-deoxy-α-D-erythro-pentofuranose, 1,3,5-Tri-O-benzoyl-2-deoxy-β-D-erythro-pentofuranose, 1,3,4-Tri-O-benzol-2-deoxy-α-D-erythro-pentopyranose, 1,3,4-Tri-O-benzoyl-2-deoxy-β-D-erythro-pentopyranose, 1,3,4-Tri-O-benzoyl-2-deoxy-erythro-pentose, 3-Deoxy sugars, 2-Amino-2,3-dideoxy-ribo-hexopyranose; D-form, 1,6-Anhydro-3-deoxy-β-D-erythro-hexopyranos-4-ulose, 1,6-Anhydro-3-deoxy-β-D-threo-hexopyranos-4-ulose, 1,6-Anhydro-2,3-dideoxy-β-D-glycero-hexopyranos-4-ulose, Benzyl 4,6-O-benzylidene-3-deoxy-α-D-erythro-hexo-pyranosid-2-ulose, ΔCordycepin, Cordycepose, 3-Deoxy-1, 2:5,6-di-O-iso-propylidene-α-D-xylo-hexo-pyranose, 3-Deoxy-D-arabino-hexonic acid, 3-Deoxy-D-ribo-hexonic acid, 3-Deoxy-xylo-hexonic acid, 3-Deoxy-xylo-hexonic acid, 3-Deoxy-D-arabino-hexono-1,4-lactone, 3-Deoxy-D-rib(o-hexono-1,4-lactone, 3-Deoxy-D-xylo-hexono-1,4-lactone, 3-Deoxy-D-ribo-hexopyranose; α-D-form, 3-Deoxy-D-ribo-hexopyranose; β-D-form, 3-Deoxy-arabino-hexose; D-form, 3-Deoxy-lyxo-hexose; D-form, 3-Deoxy-arabino-hexose; L-form, Dimethyl dithioacetal, 3-Deoxy-xylo-hexose; D-form, 3-Deoxy-erythro-hexos-2-ulose; D-fi)7i, 3-Deoxy-1,2-O-isopropylidene-ribo-hexafuranose; α-D-form, 3-Deoxy-1,2-O-isopropylidene-6-O-trityl-α-D-ribo-hexofuronose; 3-Deoxy-erythro-pentose; L-form, 3-Deoxy-2, 4,6-tri-O-benzoyl-D-arabino-hexono-1, 5-lactone 2,6-Diacetamido-2,3,4,6-tetradeoxy-D-erythro-hexose diethyl dithioacetal, 2,4-Di-O-acetyl-1,6-anhydro-3-deoxy-β-D-ii/lo-hexo-pyranoside, 2',3'-Dideoxyadenosine, Ethyl 6-O-benzoyl-2,3-dideoxy-α-D-glycero-hexopyranosid-4-ulose, Ethyl 2,4-diacetamido-2,3,4,-6-tetradeoxy-β-D-arabino-hexo-pyranoside, Ethyl 2,6-Diacetamido-2,3,4-6-tetradeoxy-α-D-erythro-hexopyranoside, Ethyl 2,6-diacetamido-2,3,6-trideoxy-α-D-ribo-hexo-pyranoside, Ethyl 2,3-dideoxy-α-D-glycero-hexopyranoside-4-ulose, Forosamine, Methyl 2-acetamido-4,6-O-benzylidene-2,3-dideoxy-β-D-ribo-hexopyranoside, Methyl 2-amino-2,3-dideoxy-α-D-ribo-hexopyranoside, Methyl 2-benzamido-2,3-dideoxy-β-D-ribo-hexopyranoside, Methyl 4,6-O-benzylidene-3-deoxy-α-D-ribo-hexo-pyranoside, Methyl 4,6-O-benzylidene-3-deoxy-β-D-ribo-hexo-pyranoside, Methyl 4,6-O-benzylidene-3-deoxy-erythro-hexopyranosid-2-ulose, Methyl 4,6-O-benzylidene-3-deoxy-α-D-ribo-hexo-pyranosid-2-ulose, Methyl 4,6-O-benzylidene-3-deoxy-β-D-threo-hexo-pyranosid-2-ulose, Methyl 3-deoxy-α-D-ribo-hexo-pyranoside, Methyl 3-deoxy-α-D-xylo-hexo-pyranoside, Methyl 3-deoxy-α-D-threo-hexopyranosid-2-ulose, Methyl 3-deoxy-β-D-threo-hexopyranosid-2-ulose, Methyl 3-deoxy-α-D-erythro-pentofuranoside, Methyl 3-deoxy-β-D-erythro-pentopyranoside. Methyl 3-deoxy-α-L-erythro-pentopyranoside, Methyl 3-deoxy-β-D-erythro-pentopyranoside, Methyl 2,4-diacetamido-2,3,-4,6-tetradeoxy-α-D-arabino-hexopyranoside, Methyl 2,4-diacetamido-2,3,-4,6-tetradeoxy-β-D-arabino-hexopyranoside, Methyl 2,6-diacetamido-2,3,-6-trideoxy-α-D-ribo-hexo-furanoside, Methyl 2,6-diacetamido-2,3,-6-trideoxy-α-D-ribo-hexo-pyranoside, Methyl 2,6-diamino-2, 3,4,6,-tetradeoxy-α-D-erythro-hexopyranoside, Methyl 2,3-dideoxy-β-D-glycero-hexopyranosid-4-ulose, Methyl 3,6-dideoxy-α-L-threo-hexopyranosid-2-ulose, Methyl 3,4-dideoxy-4-C-methyl-6-O-trityl-α-D-threo-hexopyranosid-2-ulose, Phenyl 4,6-O-benzylidene-3-deoxy-β-D-threo-hexo-pyranosid-2-ulose, Phenyl 3-deoxy-β-D-ribo-hexopyranoside, Phenyl 3-deoxy-β-D-threo-hexopyranosid-2-ulose, 1,2,4,6-Tetra-O-acetyl-3-deoxy-α-D-xylo-hexopyranose, 1,2,4,6-Tetra-O-acetyl-3-deoxy-β-D-xi l1)-hexopyranose, 1,2,4,6-Tetra-O-acetyl-3-deoxy-α-D-ribo-hexo-pyranose, 4-Acetamido-4-deoxy-α-D-glucopyranoside, 4-Amino-4-deoxyglucose; D-form, 1,6-Anhydro-3,4-dideoxy-β-D-glycero-hexopyranose-2-ulose, 4-Deoxy-xylo-hexose, 4-Deoxy-erythro-pentopyranose; L-form, 4-Deoxy-erythro-pento-pyranose; DL-form, 2,6-Diacetamido-2,3,4,6-tetradeoxy-D-erythro-hexose diethyl dithioacetal, Ethyl 4-deoxy-β-L-erythro-pentopyranoside, Ethyl 2,6-diacetamido-2,3,4,6-tetradeoxy-α-D-erythro-hexopyranoside, Ethyl 3,4,6-trideoxy-3-Dimethylamino-α-D-xylo-hexopyranoside, Ethyl 3,4,6-trideoxy-3-dimethylamino-β-D-xylo-hexopyranoside, Lyxosylamnine, β-D-Pyranose-form, N-Ac, Lyxosylamine, β-D-Pyranose-form, N, 2,3,4-Tetra-Ac, Methyl 4-deoxy-α-D-xylo-hexopyranoside, Methyl 4-deoxy-α-D-xylo-hexopyranoside, Methyl 4-deoxy-β-L-erythro-pentopyranoside, Methyl 2,6-diamino-2,3,4,6-tetradeoxy-α-D-erythro-hexopyranoside, Methyl 4,6-dideoxy-4-dimethylamino-α-D-gluco-pyranoside, Methyl 4,6-dideoxy-4-dimethylamino-D-gluco-pyranoside, Methyl 3,4-dideoxy-4-C-methyl-6-O-trityl-α-D-threo-hexopyranoside, Methyl 2,3,6-tri-O-acetyl-4-deoxy-α-D-xylo-hexopyranoside, 1,2,3,6-Tetra-O-acetyl-4-deoxy-β-L-threo-hex-4-enopyranose, 1,2,3,6-Tetra-O-acetyl-4-deoxy-α-L-threo-hex-4-enopyranose 1,2,3,6-Tetra-O-acetyl-4-deoxy-β-D-threo-hexo-pyranose 1,2,3,6-Tetra-O-acetyl-4-deoxy-α-L-threo-hex-4-enopyranose, 2,3,4-Tri-O-acetyl-β-D-lyxopyranosylamino, 3,4,6-Trideoxy-3-dimethylamino-xylo-hexose, 5'-(2-Adeninyl)-2',5'-dideoxyribofuranosyladenine; β-D-form, 5-Deoxyarabinose; L-form, 5'-Deoxy-5'-bromouridine, 5'-Deoxy-2-fluroadensine, 5-Deoxy-ribo-hexose, 5-Deoxy-xylo-hexose, 5-Deoxy-1,2-O-isopropylidene-α-D-xylo-hexofuranoside, 5-Deoxy-1,2-O-iso-propylidene-α-D-erythro-pentofuranos-3-ulose, 5-Deoxy-1,2-O-iso-propylidene-β-D-threo-pentofuranos-3-ulose, 5-Deoxy-1,2-O-iso-propylidene-α-D-threo-pentofuranos-3-ulose, 3,6-Di-O-benzoyl-5-deoxy-1,2-O-isopropylidene-α-D-ribo-hexofuranoside, 2',5'-Dideoxyadenosine, Methyl 2,3-anhydro-5-deoxy-α-D-ribofuranoside, Methyl 2,3-anhydro-5-deoxy-α-D-ribofuranoside, Methyl 2,3-anhydro-D-erythro-pentopyranoside, Methyl 2,3-anhydro-β-L-erythro-pentopyranosid-4-ulose, Methyl 5-deoxy-2,3-O-ispropylidene-β-D-ribo-hexofuranoside, Methyl 2-deoxy-5-O-trityl-α-D-glycero-pentofuranosid-3-ulose, Methyl 2-deoxy-5-O-trityl-β-D-glycero-pentofuranosid-3-ulose, Methyl 2,3-O-isopropylidene-β-L-erythro-pentopyranosid-4-ulose, Streptose, 3-Acetamido-2,3,6-trideoxy-D-lyxo-hexose, 3-O-Acetyl-2,6-dideoxy-lyxo-hexopyranose, Δ Aklavine, 4-Amino-2,4,6-trideoxy-3-O-methyl-arabino-hexose, Aexonse, 3-Benzamido-2,3,6-trideoxy-D-lyxo-hexose, 3-Benzamido-2,3,6-trideoxy-L-lyxo-hexose, Cladinose, Curacin, Cymaronic acid, D-form, Cymaronic acid, D-form, 1,5-Lactone, 5-Me Cymaronic acid, D-form, 1,5-Lactone, 4-Me, Cymarose, Daunosamine, 2,6-Didexoy-arabino-hexo-pyranose, D-form, 2,6-Didexoy-arabino-hexo-pyranose, L-form, 2,6-Didexoy-lyxo-hexose, 2,6-Didexoy-ribo-hexose, 2,6-Didexoy-α-1-hexose, 2,6-Didexoy-3-O-methyl-D-ribo-hexono-1,4-lactone, 2,6-Didexoy-4-O-methyl-lyxo-hexopyranose, 2,6-Didexoy-3-C-methyl-ribo-hexose, D-form, 2,6-Didexoy-3-C-methyl-ribo-hexose, DL-form, 2,6-Didexoy-3-C-methyl-lyxo-hexose, D-form, 2,6-Didexoy-3-C-methyl-lyxo-hexose, L-form, 2',6-Didexoy-3-O-methyl-ribo-hexose, D-form, 4-Dimethylamino-2,3,4,6-tetradeoxy-threo-hexose, 3-Dimethylamino-2,3,6-tetradeoxy-arabino-hexose, Ethyl 2,4,6-β-L-arabino-hexopyranoside, Evermicose, Kijanose, Methyl 4-acetamido-3-O-methyl-2,4,6-trideoxy-β-D-ribo)-hexopyranoside, Methyl 4-acetamido-2,4,6-trideoxy-3-O-methyl-α-L-arabino-hexopyranoside, Methyl 4-acetamido-2,4,6-trideoxy-3-O-methyl-β-L-arabino-hexopyranoside, Methyl 4-acetamido-2,4,6-trideoxy-3-O-methyl-α-D-ribo-hexopyranoside, Methyl 3-O-acetyl-2,6-dideoxy-α-D-lyxo-hexo-pyranoside, Methyl 3-O-acetyl-2,6-dideoxy-α-D-ribo-hexo-pyranoside, Methyl 4-C-acetyl-2,6-dideoxy-β-L-xylo-hexopyranoside, Methyl 3-amino-2,3,6-trideoxy-α-L-lyxo-hexoside, Methyl 2,6-dideoxy-α-D-arabino-hexopyranoside, Methyl 2,6-dideoxy-β-D-arabino-hexopyranoside, Methyl 2,6-dideoxy-α-D-ribo-hexopyranoside, Methyl 2,6-dideoxy-α-D-xylohexopyranoside, Methyl 2,6-dideoxy-3-C-methyl-α-D-ribo-lhexo-pyranoside, Methyl 2,6-dideoxy-3-C-methyl-α-L-ribo-hexo-pyranoside. Methyl 2,6-dideoxy-3-C-methyl-α-L-xylo-hexo-pyranoside, Methyl 2,6-dideoxy-3-C-methyl-β-L-xylo-hexo-pyranoside, Methyl 2,6-dideoxy-3-C-methyl-α-L-xylo-hexo-pyranoside, Methyl 2,6-dideoxy-3-O-methyl-α-D-ribo-hexo-pyranoside, Methyl 2,6-dideoxy-3-O-methyl-α-D-xylo-hexo-pyranoside, Methyl 2,6-dideoxy-3-O-Methyl-β-D-xylo-hexo-pyranoside, Methyl 2,6-dideoxy-4-O-methyl-α-D-lyxo-hexo-pyranoside, Methyl 2,6-dideoxy-4-O-methyl-α-D-1y3or-hexo-pyranoside, Methyl 2,6-dideoxy-3-C-methyl-3-O-methyl-α-D-ribo-hexopyranoside, Methyl 2,6-dideoxy-3-C-methyl-3-O-methyl-α-L-ribo-hexopyranoside, Methyl 4-(dimethylamino)-2,3,4,6-tetradeoxy-α-D-threo-hexopyranoside, Methyl 4-(dimethylamino)-2,3,6-tetradeoxy-β-D-arabino-hexopyranoside, Methyl 4-(dimethylamino)-2,3,6-tetradeoxy-α-D-arabino-hexopyranoside, Methyl 2,3,6-trideoxy-4-C-benzoyl methylcarbonyl-α-D-threo-hexopyranoside, Methyl 2,3,6-trideoxy-4-C-benzoyl methylcarbonyl-α-L-threo-hexopyranoside, Mitiphyline, Mycarose, Mycosamine, v-Octose, v-Octose; 1,1'-Anhydro, Oleandrose, D-form, Oleandrose, L-form, Olivomycose, Ristosamile, Samentose, 3,6-Dideoxy-D-arabino-hexose, 3,6-Dideoxy-L-arabino-hexose, 3,6-Dideoxy-ribo-arabino-hexose, D-form, 3,6-Dideoxy-xylo-arabino-hexose, D-form, 3,6-Dideoxy-xylo-arabino-hexose, L-form, 3,6-Dideoxy-1,2-O-iso-propylidene-α-D-ribo-hexofuranose, 3,6-Dideoxy-1,2-O-iso-propylidene-xylo-hexo-furanoside, 4-Dimethylamino-2,3,4,6-tetradeoxy-threo-hexose; D-form, Methyl 3,6-di deoxy-α-D-arabino-hexopyranoside, Methyl 3,6-dideoxy-β-D-arabino-hexopyranoside, Methyl 3,6-dideoxy-D-xylo-hexopyranoside, Methyl 3,6-dideoxy-β-L-xylo-hexopyranoside, Methyl 3,6-dideoxy-β-L-threo-hexopyranosid-2-ulose, Methyl 4-(dimethylamino)-2,3,4,6-tetradeoxy-α-D-threo-hexopyranoside, AD 11, 4,6-Dideoxy-3-O-methyl-xylo-hexose; D-form, 4,6-Dideoxy-3-O-methyl-xylo-hexose; β-D-form, A micetose, 2-Amino-2,3,4,6-tetradeoxy-6-methylamino-D-ribo-heptose, 4,5-Dihydroxylhexanal, Ethyl 2,3,6-trideoxy-D-erythro-hexopyranose, Methyl 2,6-diacetamido-2,3,4,6,7-pentadeoxy-α-DL-ribo-heptopyranoside, Methyl 2,3,6-trideoxy-D-erythro-hexopyranoside, Methyl 2,3,6-trideoxy-α-D-glycero-hexopyranosid-4-ulose, Methyl 2,3,6-trideoxy-α-L-glycero-hexopyranosid-4-ulose, Methyl 3,4,6-trideoxy-4-C-methyl-β-L-threo-hexo-pyranosid-2-ulose, Multistriatin, Purpurosamine B, Rhodinose, 2',3',5'-Trideoxyadenosine, 6-Deoxyallose; 6-Deoxy-2,3-di-O-methyl-allose; D-form, Methyl 2,3-anhydro-5-O-benzyl-6-deoxy-α-D-allofuranoside, Methyl-β-D-mycinoside, 6-Deoxyaltrose; D-form, 6-Deoxyaltrose; L-form, 6-Deoxy-3-O-methylaltrose; L-form, 6-Deoxy-4-O-methylaltrose; D-Pyranose-form, Methyl 6-deoxy-4-O-methyl-α-D-altropyranoside, Methyl 6-deoxy-4-O-methyl-β-D-altropyranoside, 1,2,4-Tri-O-acetyl-6-deoxy-3-O-methyl-α-L-altro-phyranoside, 4-Amino-4,6-dideoxygalactose; D-Pyranose-form, 4-Aminophenyl fucopyranoside; α-L-form, 4-Aminophenyl 1-thio-β-D-fucopyranoside, 4-Aminophenyl 1-thio-α-L-fucopyranoside, 4-Aminophenyl 1-thio-β-L-fucopyranoside, 6-Deoxy-3-O-Methylgalactose; D-form, 6-Deoxy-3-O-methylgalactose; L-form, 6-Deoxy-4-O-methylgalactose; D-form, 2,4-Diacetamido-2,4,6-trideoxy-D-galactose, Fuconic acid, D-form, Fuconic acid, L-form, D-Fucose, D-Fucose; α-Pyranose-form, L-Fucose, 3,4-O-Isopropylidene-α-D-fucopyranose, 1,2-O-Isopropylidene-3-O-α-D-fucofuranoside, 1-O-N-Methylacetimidyl-2,3,4-tri-O-benzyl fucopyranose; β-L-form, Methyl 4-amino-4,6-dideoxy-α-D-galactopyranoside, Methyl 2-O-benzyl-3,4-O-isopropylidene-α-L-fucopyranoside, Methyl α-L-fucopyranoside, Methyl D-fucopyranoside; α-form, Methyl D-fucopyranoside; β-form, Methyl L-fucopyranoside; α-form, Methyl L-fucopyranoside; β-form, Methyl 3,4-O-isopropylidene-fucopyranoside-L-form, Methyl 3,4-O-isopropylidene-2-O-tosyl-α-L-fuco-pyranoside, Methyl 3-O-methyl-α-D-fuco-pyranoside, Methyl α-L-rhamnopyranoside, Methyl 2,3,4-tri-O-acetyl-α-D-fucopyranoside, Methyl 2,3,4-tri-O-acetyl-:-D-fucopyranoside, Methyl 2,3,4-tri-O-acetyl-(1-L-fucopyranoside, Methyl 2,3,4-tri-O-acetyl-β-L-fucopyranoside, Methyl 2,3,4-tri-O-acetyl-α-L-rhamnopyranoside, Methyl 2,3,4-tri-O-benzoyl-α-L-fucopyranoside, Methyl 2,3,4-tri-O-benzyl-α-L-fucopyranoside, 1,2,3,4-Tetra-O-acetyl-α-D-fucopyranose, 1,2,3,4-Tetra-O-acetyl-β-D-fucopyranose, 1,2,3,4-Tetra-O-acetyl-α-L-fucopyranose, 1,2,3,4-Tetra-O-acetyl-β-L-fucopyranose, 4-Acetamido-2-amino-2,4,6-trideoxy-D-glucose, 2-Acetamido-1,4-anhydro-2-deoxy-5,6-O-Isopropylidene-arabino-hex-1-enitol, D-form, 2-Amino-2,6-dideoxyglucose; D-form, 2-Amino-2,6-dideoxyglucose; L-form, 2-Amino-2,6-dideoxyglucose; L-form, N-Me, 3-Amino-3,6-dideoxyglucose; D-form 3-Amino-3,6-dideoxyglucose; L-form 4-Aminophenyl fucopyranoside; α-D-form, 6-(4-Azido-3,5-diiodo-2-hydroxybenzamido)-6-deoxy-glucose, D-form, Benzyl 2,4-diacetamido-2,4,6-trideoxy-α-D-glucopyranoside, Cerberose, 6-Deoxy-1,2:3,5-di-O-isopropylidene-α-D-gluco-furanose, 6-Deoxy-3,5-di-O-mesyl-1,2-α-isopropylidene-α-D-gluco-furanose, 6-Deoxy-2,4:3,5-di-O-methylene-D-glucitol, 6-Deoxy-2,4:3,5-di-O-methylene-L-glucitol, 6-Deoxyglucose; α-D-Pyranose-form, 6-Deoxy-1,2-O-isopropylidene-glucofuranose; α-D-form, 6-Deoxy-2), 4-O-methylene-D-glucitol, 6-Deoxy-2,4-O-methylene-L-glucitol, 6-Deoxy-3-α-methylglucose; D-form, 2,4-Diacetamido-1,3-di-O-acetyl-2,4,6-trideoxy-D-glucopyranose, 6-Dideoxy-3-(dimethylamino-glucose; β-L-Pyranose-form, 4,6-Dideoxy-4-methylamino-α-D-glucopyranoside, Methyl 3-acetamido-3,6-dideoxy-α-L-glucopyranoside, Methyl 3-acetamido-3,6-dideoxy-β-L-glucopyranoside, 2,4-Diacetamido-2,4,6-trideoxy-D-glucose, 3,5-Di-O-1-benzyl-6-deoxy-1,2-O-isopropylidene-α-D-gluco-furanose, 3,6-Dideoxy-3-dimethylamino-glucose; β-D-Pyranose-form, 6-Dideoxy-3-dimethylamino-glucose; D-L-Pyranose-form, 4,6-Dideoxy-4-methylamino-α-D-glucopyranoside, Methyl 3-acetamido-3,6-dideoxy-α-L-gluco-pyranoside, Methyl 3-acetamido-3,6-dideoxy-β-L-glucopyranoside, Methyl 3-acetamido-3,6-dideoxy-β-L-glucopyranoside, Methyl-3-amino-3,6-dideoxy-α-D-glucopyranoside, Methyl-3-amino-3,6-dideoxy-α-L-glucopyranoside, Methyl-3-amino-3,6-dideoxy-β-L-glucopyranoside, Methyl-3-amino-3,6-dideoxy-α-D-glucopyranoside, Methyl-6-dideoxy-α-D-gluco-pyranoside, Methyl-6-dideoxy-β-D-gluco-pyranoside, Methyl-6-dideoxy-3-O-methyl-α-D-gluco-pyranoside, Methyl-6-dideoxy-3-O-methyl-D-D-gluco-pyranoside, Methyl 3,6-dideoxy-3-dimethylamino-α-D-gluco-pyranoside, Methyl 3,6-dideoxy-3-dimethylamino-α-L-gluco-pyranoside, 1,2,3,4,5-Penta-O-acetyl-6-deoxy-D-glucitol, 1,2,3,4,5-Penta-O-acetyl-6-deoxy-L-glucitol, Pyolipic acid, 1,2,3,4-Tetra-O-acetyl-6-deoxy-α-D-glucopyranose, 1,2,3,4-Tetra-O-acetyl-6-deoxy-β-D-glucopyranose, 1,2,3,4-Tetra-O-acetyl-6-deoxy-α-L-glucopyranose, 1,2,3,4-Tetra-O-acetyl-6-deoxy-β-L-glucopyranose, 1,2,4-Tri-O-acetyl-6-deoxy-3-O-methyl-α-

D-glucopyranose, 1,2,4-Tri-O-acetyl-6-deoxy-3-O-methyl-β-D-glucopyranose, 1,2,4-Tri-O-acetyl-6-deoxy-3-O-methyl-α-L-glucopyranose. 1,2,4-Tri-O-acetyl-6-deoxy-3-O-methyl-β-L-glucopyranose, Viosamine, 6-Deoxyguloses: D-form, 6-Deoxyguloses; L-form, 6-Deoxy-1,2-O-isopropylidene-3-O-methyl-α-D-gulofuranose, 6-Deoxy-3-O-methylgulose, Methyl-4-O-acetyl-2,3-anhydro-6-deoxy-α-D-gulopyranoside, Methyl-4-O-acetyl-2,3-anhydro-6-deoxy-β-D-gulopyranoside, Methyl-2,3-anhydro-6-deoxy-α-D-gulopyranoside, Methyl-2,3-O-isopropylidene-α-D-gulopyranoside, 1,2,3,4-Tetra-O-acetyl-6-deoxy-β-D-gulopyranoside, 6-Deoxyidose; D-form, 6-Deoxyidose; L-form, 6-Deoxyidose; β-L-Furanose-form, 1,2-O-Isopropylidene. di-Ac, 6-Deoxy-1,2-O-isopropylidene-3-L-idofuranose, Methyl 6-deoxy-β-L-idopyranoside, 2-Acetamido-2,6-dideoxy-D-galactose, 2-Acetamido-2,6-dideoxy-L-galactose, 2-Amino-2,6-dideoxygalactose; L-form, 2-Amino-2,6-dideoxygalactose; D-form, 2-Amino-1,6-dideoxygalactose; DL-form 2-Amino-2,6-dideoxymannose; D-form, 2-Amino-2,6-dideoxycymannose; L-form, 4-Amino-4,6-dideoxymannose; D-form, Benzyl 2,3-O-endo-benzylidene-α-L-rhamnoside, Benzyl 2,3-exo-benzylidene-α-L-rhamnoside, Benzyl rhamnoside; α-L-Pyranose-form, Benzyl 2,3,4-tri-α-acetyl-α-L-rhamnopyranoside, 6-Deoxymannonic acid; L-form, 6-Deoxy-3-O-methylmannose; L-form, 6-deoxy-2,3,4-tri-O-acetyl-α-L-mannopyranosyl chloride, 1,2:3,5-Di-O-methylene-rhamnofuranose; β-L-form, Ethyl rhamnofuranoside; α-L-form, Isodulcitol, 2,3-O-Isopropylidene-rhamnofuranose; α-L-form, 2,3-O-Isopropylidene-rhamnofuranose; β-L-form, 2,3-O-Isopropylidene-5-O-tosyl-D-L-rhamnofuranose, Methyl 3-acetamido-3,6-dideoxy-β-L-rhamnofuranose, Methyl 3-amino-3,6-dideoxy-α-D-mannopyranoside, Methyl 3-amino-3,6-dideoxy-α-D-mannopyranoside, Methyl 4-amino-4,6-dideoxy-α-D-mannopyranoside, Methyl 4-amino-4,6-dideoxy-α-L-mannopyranoside, Methyl 2,3-anhydro-6-deoxy-4-D-mannopyranoside, Methyl 2,3-O-isopropylidene-4-O-mesyl-α-L-rhamnoside, Methyl 2,3-O-isopropylidene-α-L-rhamnofuranoside, Methyl 2,3-O-isopropylidene-α-D-rhamnopyranoside, Methyl 2,3-O-isopropylidene-α-L-rhamnopyranoside, Methyl 2,3-O-isopropylidene-5-O-tosyl-β-D-rhamno-furanoside, Methyl 2,3-O-isopropylidene-5-O-tosyl-α-L-rhamno-furanoside, Methyl 2,3-O-isopropylidene-5-O-tosyl-β-L-rhamno-furanoside, Methyl 2,3-O-isopropylidene-5-O-tosyl-α-L-rhamno-furanoside, Methyl rhamnofuranoside; α-L-form, Methyl α-D-rhamnofuranoside; Methyl O-L-rhamnofuranoside; Methyl 2,3,4-tri-O-acetyl-β-L-rhamnopyranoside; Phenyl 6-deoxy-α-L-mannopyranoside, Phenyl 6-deoxy-β-L-mannopyranoside, L-Rhamnonamide, L-Rhamnono-1,4-lactone, L-Rhamnono-1,5-lactone, Rhamnose; D-form, Rhamnose; α-L-form, Rhamnose; α-L-Pyranose-form, Phenyl glycoside, tri-Ac, Rhamnosylamine; L-Pyranose-form, 1,2,3,4-Tetra-O-acetyl-6-deoxy-β-L-mannopyranose, 1,2,3,4-Tetra-O-acetyl-6-deoxy-β-L-mannopyranose, 3-Acetamido-3,6-dideoxy-D-talose, Acovenose, D-form, Acovenose, L-form, 2-Amino-2,6-dideoxytalose; D-form, 3-Amino-3,6-dideoxytalose; D-form, 3-Amino-3,6-dideoxytalose; L-form, 6-Deoxy-D-talitol, 6-Deoxy-L-talitol, 6-Deoxytalose, D-form, 6-Deoxytalose, L-form, 6-Deoxytalose, L-Pyranose-form, 1,4-Di-O-acetyl-6-deoxy-2-O-methyl-3-C-methyl-α-L-talopyranose, 1,4-Di-O-acetyl-6-deoxy-2-O-methyl-3-C-methyl-β-L-talopyranose, Methyl 3-acetamido-3,6-dideoxy-α-D-talopyranoside, Methyl 3-acetamido-3,6-dideoxy-α-L-talopyranoside, Methyl 6-deoxy-2,3-O-isopropylidene-α-L-talofuranoside, Methyl 6-deoxy-2,3-O-isopropylidene-α-L-talofuranoside, Methyl 6-deoxy-2-O-methyl-α-L-talofuranoside, Methyl 6-deoxy-α-L-talo-furanoside, Methyl 2,3,4-tri-O-acetyl 6-deoxy-α-D-talofuranoside, Methyl 2,3,4-tri-O-acetyl 6-deoxy-β-L-talofuranoside, Pneumosamine, Vinelose, ΔAmphotericin B, 1,5-Anhydro-2,6-dideoxy-D-ribo-hex-1-enitol, Benzyl 6-deoxy-2,3-O-isopropylidene-α-L-lyxo-pyranosid-4-ulose, 6-Deoxy-L-gulal, 6-Deoxy-arabino-hexos-5-ulose,; D-form, 6-Deoxy-1,2-O-isopropylidene-β-D-arabino-hexofuranos-5-ulose, 6-Deoxy-4-O-methyl-L-gulal, 3,4-Di-O-acetyl-6-deoxy-D-allal, 5,6-Dideoxy-3-O-benzyl-1,2-O-isopropylidene-α-D-hex-5-enofuranose, 6',6'-Dideoxyhexabenzoyl-sucrose, 5',6'-Dideoxy-1,2-O-isopropylidene-α-D-xylo-hex-5-enofuranose, 5',6'-Dideoxy-1,2-O-isopropylidene-3-O-methyl-α-D-xylo-hex-5-enofuranose, Methyl 2,3-anhydro-6-deoxy-α-D-ribo-hexopyranosid-4-ulose, Methyl 3-bromo-3,6-deoxy-α-D-xylo-hexopyranosid-4-ulose, Methyl 6-deoxy-2,3-di-O-methyl-α-D-ribo-hexo-pyranosid-4-ulose, Methyl 6-deoxy-2,3-di-O-methyl-α-D-xylo-hexo-pyranosid-4-ulose, Methyl 3-C-methyl-6-deoxy-α-D-ribo-hexo-pyranosid-4-ulose, Noviose 2-Acetamido-3-O-(2-acetamido-2,3-dideoxy-5,6-O-iso-propylidene-α-D-erythro-hex-2-enofuranosyl)-1,4-anhydro-2-deoxy-5,6-O-isopropylidene-D-arabino-hex-1-enitol, 2-Acetamido-3-O-(2-acetamido-2,3-dideoxy-5,6-O-iso-propylidene-β-D-erythro-hex-2-enofuranosyl)-1,4-anhydro-2-deoxy-5,6-O-iso-propylidene-D-arabino-hex-1-enitol, 2-Acetamido-1,2-dideoxy-D-arabino-hex-1-enitol, 4-O-Acetyl-6-deoxy-3-O-methyl-D-glucal, 4-O-Acetyl-3-O-methyl-L-rhamnal, 2-Actamido-1,4-anhydro-2-deoxy-5,6-O-isopropylidene-D-arabino-hex-1-enitol, Allal; D-form, Allal; D-form, 4,6-O-Benzylidene, 1,5-Anhydro-2-azido-2-deoxy-D-ribo-hex-1-enitol, 2,6-Anhydro-1-deoxy-galacto-hept-1-enitol; D-form, 2,6-Anhydro-1-deoxy-gluco-hept-1-enitol; D-form, 1,4-Anhydro-2-deoxy-arabino-hex-1-enitol; D-form, 5,6-O-Isopropylidene, 1,4-Anhydro-2-deoxy-5-O-methoxymethyl-D-erythro-pent-1-enitol, 2,6-Anhydro-1-deoxy-3,4,5,7-tetra-O-acetyl-D-gluco-hept-1-enitol, 1,5-Anhydro-2,6-dideoxy-D-ribo-hex-1-enitol, 3,6-Anhydro-1,2-dideoxy-4,5-O-isopropylidene-D-arabino-hex-1-enitol, 3,7-Anhydro-1,2-dideoxy-D-glycero-L-manno-1-octenitol; 5,6,8-Tribenzyl, Arabinal; D-form, Arabinal; L-form, 4,6-O-Benzylidene-1,2-dideoxy-threo-hex-1-enopyranos-3-ulose; D-form, 4,6-O-Benzylidene-1,2-dideoxy-2-C-methyl-ribo-hex-1-enopyranos-3-ulose; D-form, Cellobial, Daucic acid, 6-Deoxy-L-gulal, 6-Deoxy-4-O-methyl-L-gulal, 3,4-Di-O-acetyl-D-arabinal, 3,4-Di-O-acetyl-L-arabinal, 3,4-Di-O-acetyl-6-deoxy-D-allal, 3,4-Di-O-acetyl-L-fucal, 4,6-Di-O-acetyl-3-O-methyl-D-glucal, 3,4-Di-O-acetyl-L-rhamnal, 3,4-Di-O-acetyl-D-xylal, 2,6:3,4-Dianhydro-1-deoxy-talo-hept-1-enitol; 3,4-Di-O-benzoyl-D-arabinal, 3,5:4,6-Di-O-benzylidene-1,2-dideoxy-L-xylo-hex-1-enitol, 1,2-Dideoxy-3,5:4,6-di-O-ethylidene-L-xylo-hex-1-enitol, 1,2-Dideoxy-arabino-hex-1-enitol; D-form, 1,2-Dideoxy-arabino-hex-1-entiol; D-form, 3,4:5,6-Di-O-isopropylidene, 1,2-Dideoxy-xylo-hex-1-enitol; L-form, 1,2-Dideoxy-erythro-hex-1-enopyranos-3-ulose, D-form, 1,2-Dideoxy-erythro-hex-1-enopyranos-3-ulose; D-form, 4,6-O-Benzylidene, 1,2-Dideoxy-erythro-hex-1-enopyranos-3-ulose; D-form, 4,6-O-Isopropylidene, 1,2-Dideoxy-D-arabino-hex-1-ynitol, 1,2-Dideoxy-3,4,5,6-tetra-O-acetyl-L-xylo-hex-1-enitol, 1,2:4,5-Di-O-isopropylidene-3-O-methyl-arabino-hex-1-enitol, 3,4-Di-O-methyl-D-xylal, Δ2-Ethoxy-4-methyl-3,4-dihydro-2H-pyran, Fucal; L-form, Galactal; D-form, Galactal; D-form, 3,4-O-Isopropylidene, Galactal; D-form, 3,4-O-

Isopropylidene, 6-mesyl, Galactal; D-form, 3,4-O-Isopropylidene, 6-tosyl, Galactal; D-form, Tri-Ac, Galactal; D-form, Tribenzoyl, Galactal; D-form, Tri-Me, Glucal; D-form, Glucal; D-form, Glucal; D-form, 3-O-β-D-glucosyl, Δ1,5-Hexadiene-3,4-diol, 5-Hexyne-1,2,3,4-tetrol; (2R,3S,4R)-form, 2-Hydroxy-2,3,4-tri-O-acetyl-D-xylal, 2-Hydroxy-2,3,4-tri-O-benzoyl -D-xylal, Lactal, 3-O-Methyl-D-rhamnal, 3-O-Methyl-L-rhamnal, Rhamnal; D-form, Rhamnal; L-form, Tetra-O-acetyl-2-hydroxy-D-glucal, Tetra-O-benzoyl-2-hydroxy-D-glucal, 3,4,6-Tri-O-acetyl-D-allal, 3,4,6-Tri-O-acetyl-D-glucal, 3,4,6-Tri-O-acetyl-D-glucal, 3,4,6-Tri-O-benzoyl-D-glucal, 3,4,6-Tri-O-benzoyl-D-glucal, Xylal; D-form, 2-Acetamido-4,6-O-benzylidene-2,3-deoxy-D-erythro-hex-2-enono-1,5-lactone, 2-Acetamido-2,3-dideoxy-D-threo-hex-2-enonic acid γ-lactone, 2-Acetamido-2,3-dideoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1,5-lactone, 2-Acetamido-2,3-dideoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-dideoxy-4,6-O-isopropylidene-D-erythro-hex-2-enono-1,5-lactone, 2-Acetamido-2,3-dideoxy-4,6-O-isopropylidene-D-threo-hex-2-enono-1,5-lactone, 1,6-Anhydro-2,3-dideoxy-, β-D-glycero-hex-2-enopyranos-4-ulose, 4,6-O-Benzylidene-2,3-dideoxy-D-erythro-hex-5-lactone, 3-Deoxy-1,2,4,6-tetra-O-acetyl-erythro-hex-2-enopyranose, 3-Deoxy-1,2,4,6-tetra-O-acetyl-erythro-hex-2-enopyranose; 4,6-Di-acetyl-D-erythro-hex-2-enono-1,5-lactone, 2,3-Dideoxy-erythro-hex-2-enono-1,5-lactone; D-form, 4,6-Di-Ac, 2-Acetoxy, 2,3-Dideoxy-erythro-hex-2-enono-1,5-lactone; D-form, 4,6-Di-Ac, 2,3-diacetoxy, 2,3-Dideoxy-erythro-hex-2-enono-1,5-lactone; D-form, 4,6-Dibenzoyl, 2,3-Dideoxy-erythro-hex-2-enono-1,5-lactone; D-form, 4,6-Dibenzoyl, 2-Benzoyloxy, 2,3-Dideoxy-erythro-hex-2-enopyranose; α-D-form, Et glycoside, 4,6-di-Ac, 2,3-Dideoxy-erythro-hex-2-enopyranose; α-D-form, Et glycoside, 4,6-dimesyl, 2,3-Dideoxy-erythro-hex-2-enopyranose; α-D-form, Et glycoside, 4,6-dibenzyl, 2,3-Dideoxy-erythro-hex-2-enopyranose; α-D-form, Me glycoside, 4,6-dibenzoyl, 2,3-Dideoxy-erythro-hex-2-enopyranose; α-D-form, Me glycoside, 4,6-dibenzyl, 2-(2,3-Dideoxy-glycero-pent-2-enofuranosyl)adenine; β-D-form, 1-(2,3-Dideoxy-glycero-pent-2-enofuranosyl)cytosine; β-D-form, 1-(2,3-Dideoxy-glycero-pent-2-enofuranosyl)thymine; β-D-form, 2,3-Dideoxy-1,4,6-tri-O-acetyl-α-D-threo-hex-2-enopyranose, Ethyl 2,3-dideoxy-α-D-erythro-hex-2-enopyranose, Ethyl 2,3-dideoxy-α-D-glycero-hex-2-enopyranos-4-ulose, Maltal, Methyl 4-amino-2,3,4-trideoxy-α-D-erythro-hex-2-enopyranosiduronic acid, Methyl 2-azido-4,6-O-benzylidene-2,3-dideoxy-α-D-erythro-hex-2-enopyranoside, Methyl 4,6-O-benzylidene-2,3-dideoxy-erythro-hex-2-enopyranoside, α-D-form, Methyl 4,6-O-benzylidene-2,3-dideoxy-erythro-hex-2-enopyranoside, α-D-form, Methyl 4,6-O-benzylidene-2,3-dideoxy-α-D-threo-hex-2-enopyranoside, Methyl 4,6-O-benzylidene-2,3-dideoxy-β-D-threo-hex-2-enopyranoside, Methyl 4,6-O-benzylidene-2,3-dideoxy-2-C-methyl-3-nitro-α-D-threo-hex-2-enopyranoside, Methyl 4,6-O-benzylidene-2,3-dideoxy-2-C-methyl-3-nitro-D-erythro-hex-2-enopyranoside, Methyl 4,6-O-benzylidene-2,3-dideoxy-2-C-methyl-3-nitro-α-D-threo-hex-2-enopyranoside, Methyl 4,6-O-benzylidene-2,3-dideoxy-3-nitro-erythro-hex-2-enopyranoside, Methyl 4,6-O-benzylidene-2,3-dideoxy-3-nitro-erythro-hex-2-enopyranoside, β-D-form, Methyl 4,6-O-benzylidene-2,3-dideoxy-3-nitro-α-D-erythro-hex-2-enopyranoside, Methyl 4,6-O-benzylidene-2,3-di deoxy-3-nitro-α-D-erythro-hex-2-enopyranoside, Methyl 4,6-O-benzylidene-2,3-dideoxy-3-nitro-threo-hex-2-enopyranoside, Methyl 4,6-O-benzylidene-2,3-dideoxy-3-nitro-threo-hex-2-enopyranoside, β-D-form Methyl 4,6-O-acetyl-2,3-dideoxy-α-D-threo-hex-2-enopyranoside, Methyl 2,3-dideoxy-α-D-threo-hex-2-enopyranoside, 4,5,6,7-Tetra-O-acetyl-2,3-dideoxy-D-arabino-hept-2-enonic acid, 4,5,6,7-Tetrahydroxy-2-heptenoic acid; (2E,4R,-5S, 6R)-form, 4,5,6,7-Tetrahydroxy-2-heptenoic acid; (2E,4S,-5R,6S)-form, Me ester, 4,5,6,7-tetra-Ac, 2,4,6-Tri-O-benzyl-3-deoxy-threo-hex-2-enono-1,5-lactone; L-form, 3-O-Acetyl-1,2:5,6-di-O-isopropylidene-α-D-erythro-hex-3-enofuranose, 1,6-Anhydrose-3,4-dideoxy-α-D-glycero-hex-3-enopyranos-2-ulose, 1,6-Anhydro-erythro-hex-3-enopyranose; β-D-form, 3-Deoxy-1,2:5,6-di-O-isopropylidene-erythro-hex-3-enofuranose; α-D-form, Methyl 2-O-acetyl-3-C-allyl-4,6-O-benzylidene-3-deoxy-α-D-erythro-hex-3-enopyranose, Methyl 2-O-acetyl-3-C-benzyl-4,6-O-benzylidene-3-deoxy-α-D-erythro-hex-3-enopyranose, Methyl 2-O-acetyl-4,6-O-benzylidene-3-deoxy-β-D-erythro-hex-3-enopyranose, Methyl 2-O-acetyl-4,6-O-benzylidene-3-deoxy-3-C-α-D-erythro-hex-3-enopyranose, Methyl 4,6-O-benzylidene-2-bromo-2,3-deoxy-threo-hex-3-enopyranose, α-D-form, Methyl 4,6-O-benzylidene-3-deoxy-erythro-hex-3-enopyranose, β-D-form, Methyl 3,4-deoxy-2,6-di-O-methanesulfonyl-α-D-erythro-hex-3-enopyranose, Methyl 3,4-deoxy-erythro-hex-3-enopyranose, Methyl 3,4-deoxy-α-D-glycero-hex-3-enopyranose-2-ulose, Methyl 3,4-dideoxy-6-O-trityl-α-erythro-hex-3-enopyranoside, Methyl 3,4-dideoxy-6-O-trityl-α-glycero-hex-3-enopyranosid-2-ulose, 3-O-Acetyl-5-deoxy-1,2-isopropylidene-β-threo-pent-4-enofuranose, 1,5-Anhydro-2,3,4,6-tetra-O-benzoyl-L-threo-hex-4-enitol, 1,5-Anhydro-2,3,6-tri-O-benzoyl-4-deoxy-L-erythro-hex-4-enitol, 6-Deoxy-2,3-O-isopropylidene-threo-hex-5-enulofuranose; 4-Deoxy-1,2-O-isopropylidene-threo-pent-4-enopyranose; β-D-form, 4-Deoxy-1,2-O-isopropylidene-threo-pent-4-enopyranose; β-L-form 5-Deoxy-1,2-O-isopropylidene-3-O-tetrahydropyranyl-β-L-enofuranose, 1-(5-Deoxy-erythro-pent-4-enofuranosyl)cytosine; β-D-form, 1-(5'-Deoxy-erythro-pent-4-enofuranosyl)uracil; β-D-form, Δ3,4-Dihydro-2-ethoxy-2H-pyran, Ethyl 2,6-diacetamido-2,3,4,6-tetradeoxy-α-D-glycero-hex-4-enopyranoside, Methyl 5-deoxy-2,3-O-isopropylidene-β-D-erythro-pent-4-enofuranoside, Methyl 2,3-di-O-acetyl-4-deoxy-β-L-erythro-hex-4-enodialdo-1,5-pyranose, Methyl 2,3-di-O-benzyl-4,6-dideoxy-α-D-threo-hex-4-enopyranose, Methyl 4,6-dideoxy-2,3-di-methyl-β-D-erythro-hex-4-enopyranoside, Methyl 4,6-dideoxy-2,3-O-isopropylidene-β-D-erythro-hex-4-enopyranoside, Methyl 4,6-dideoxy-2,3-O-isopropylidene-:-L-erythro-hex-4-enopyranoside, Methyl(methyl 4-deoxy-β-L-threo-hex-4-enopyranosid)-uronate, Methyl(methyl 4-deoxy-β-L-threo-hex-4-enopyranosid)-uronate, 1,2,3,4,5-Penta-O-acetyl-α-L-threo-hex-4-enopyranose, 1,2,3,4,6-Penta-O-benzoyl-α-L-threo-hex-4-enopyranose, 1,2,3,6-Tetra-O-acetyl-4-deoxy-α-L-threo-hex-4-enopyranose, 1,2,3,6-Tetra-O-benzoyl-4-deoxy-α-L-threo-hex-4-enopyranose, 1,2,3-Tri-O-acetyl-4-deoxy-α-L-erythro-hex-4-enodialdo-1,5-pyranose, 1,2,3-Tri-O-acetyl-4-deoxy-β-L-erythro-hex-4-enodialdo-1,5-pyranose, 1,5-Anhydro-6-deoxy-lyxo-hex-5-enitol; D-form, 1,5-Anhydro-2,3,4-tri-)-benzoyl-6-deoxy-D-lyxo-hex-5-enitol; D-form, 6-Deoxy-1,2,:3,4-di-O-isopropylidene-arabino-hex-5-enopyranose; β-L-form, 5-Deoxy-1,2-O-isopropylidene-xylo-hex-5-enofuranose; α-L-form, 5-Deoxy-1,2-O-isopropylidene-xylo-hex-5- enofuranose; α-D-form, 5-Deoxy-1,2-O-isopropylidene-6-O-methyl-α-D-xylo-hex-5-enofuranose; 5,6-Dideoxy-3-O-benzyl-1,2-O-isopropylidene-α-D-xylo-hex-5-enofuranose; 5,6-Dideoxy-1,2-O-isopropylidene-α-D-xylo-hex-5-enofuranose; 5,6-Dideoxy-1,2-O-isopropylidene-3-O-methyl-α-D-xylo-hex-5-enofuranose; Δ1,5-Hexadiene-3,4-diol, Methyl 4-O-acetyl-6-deoxy-2,3-di-O-tosyl-β-D-xylo-hex-5-enopyranoside, Methyl 4-O-acetyl-6-deoxy-3-O-methyl-α-D-xylo-hex-5-enopyranoside, Methyl 3,4-anhydro-6-deoxy-arabino-hex-5-enopyranoside; α-L-form, Methyl 3,4-anhydro-6-deoxy-ribo-hex-5-enopyranoside; β-L-form, Methyl 6-deoxy-β-D-xylo-hex-5-enopyranoside, Methyl 6-deoxy-2,3-O-isopropylidene-α-D-lyxo-hex-5-enopyranoside, Methyl 6-deoxy-2,3,4-tri-O-acetyl-α-D-lyxo-hex-5-enopyranoside, Methyl 5,6-dideoxy-2,3-O-isopropylidene-D-lyxo-hex-5-enofuranoside, Methyl 5,6-dideoxy-2,3-isopropylidene-α-L-lyxo-hex-5-enofuranoside, Methyl 5,6-dideoxy-2,3-O-isopropylidene-β-D-ribo-hex-5-enofuranoside, Methyl 2,3,4-tri-O-acetyl-6-deoxy-α-D-xylo-hex-5-enopyranoside, Methyl 2,3,4-tri-O-acetyl-6-deoxy-β-D-xylo-hex-5-enopyranoside, 1,2,3,4-Tetra-O-acetyl-6-deoxy-α-D-xylo-hex-5-enopyranose, 1,2,3,4-Tetra-O-acetyl-6-deoxy-α-D-xylo-hex-5-enopyranose, 2,3,4-Tri-O-acetyl-1,5-anhydro-6-deoxy-D-xylo-hex-5-enitol, 2,3,4-Trihydroxy-5-hexenal, 1,2:5,6-Di-O-isopropylidene-3-deoxy-3-C-methylene-α-D-ribo-hexofuranose, Methyl 4,6-O-benzylidene-3-deoxy-3-C-methylene-α-D-ribohexopyranose, Methyl 5,6-dideoxy-2,3:8,-9:10,11-tri-O-iso-propylidene-L-lyxo-α-L-talo-undec-5-enodialdo-1,4-furanoside-11,7-pyranose; (E)-form, Methyl 5,6-dideoxy-2,3:8,-9:10,11-tri-O-iso-propylidene-L-lyxo-α-L-talo-undec-5-enodialdo-1,4-furanoside-11,7-pyranose; (Z)-form, 4-O-Acetylarcanose, Aldgarose; α-D-form, 1,2-O-Isopropylidene, Apiose-D-form, Apiose-D-form, 2,3-Isopropylidene, Apiose; α-D-erythro-tetrofiranose-form, Apiose; β-D-erythro-tetrofiranose-form, Apiose, β-D-erythro-tetrofilranose-form, glycoside, 2,3,3'-Tri-Me Arcanose, Axenose, 3-Benzamido-4-O-benzoyl-2,3,6-trideoxy-3-C-methyl-c-L-xylo-hexopyranose, Benzyl 5-deoxy-3-C-(hydroxy-methyl)-α-L-lyxofuranoside, 4,6-O-Benzylidene-1,2-dideoxy-2-C-methyl-ribo-hex-1-enopyranose, 3-C-[1-(Carboxyoxy)ethyl]-4,6-dideoxy-D-ribo-hexose intramol, 1',3-ester(S), Chromose B, Cladinose, 3-Deoxy-2-C-hydroxymethyl-D-erythropentono-1,4-lactone, 5-Deoxy-3-C-hydroxymethyllyxose; β-L-Furanose-form, 1,2-O-Isopropylidene, 3-Deoxy-2-C-hydroxymethyl-D-erythro-pentonic acid, 3-Deoxy-2-C-hydroxymethyl-threo-pentonic acid; D-form, 3-Deoxy-2-C-hydroxymethyl-threo-pentono-1,4-lactone, 3-Deoxy-2-C-hydroxymethyl-2,2',4-5-tetra-O-acetyl-D-erythro-pentonic acid; 2-(3-Deoxy-3-C-hydroxymethyl-threofuranosyl) adenine; α-L-form, 2-(3-Deoxy-3-C-hydroxymethyl-threofuranosyl)adenine; β-L-form, 2-(3-Deoxy-3'-C-methylallfuranosyl)adenine; β-L-form, 2-(3-Deoxy-3-C-methylribo-furanosyl)adenine; β-L-form, 1,4-Di-O-acetyl-6-deoxy-2-O-methyl-3-C-methyl-α-L-talopyranose, 1,4-Di-O-acetyl-6-deoxy-2-O-methyl-3-C-methyl-β-L-talopyranose, 3,3'-Di-O-acetyl-1,2-O-isopropylidene-3-L-threo-tetrofuranose, 1,2:3,3'-Di-O-acetyl-1,2-O-isopropylidene-α-D-erythro-tetrofuranose, 3,3'-Di-O-benzyl-1,2-O-isopropylidene-α-L-erythro-tetrofuranose, 3,3'-Di-O-benzyl-1,2-O-isopropylidene-β-L-threo-tetrofuranose, 1,2:5,6-Di-O-cyclohexylidene-3-C-ethyl-α-D-allofuranose, 1,2:5,6-Di-O-cyclohexylidene-3-C-methyl-α-D-allo-furanose, 1,2:5,6-Di-O-cyclohexylidene-3-C-vinyl-α-D-allofuranose, 2,6-Dideoxy-3-C-methyl-ribo-hexose; D-form, 2,6-Dideoxy-3-C-methyl-ribo-hexose; DL-form, 4,6-Didexoy-3-C-methyl-4(methylamino)mannose; D-form, 2,6-Dideoxy-3-C-methyl-3-O-methyl-ribo-hexose; D-form, 2,6-Dideoxy-3-C-methyl-3-O-methyl-xylo-hexose; D-form, 1,2:3,3'-Di-O-isopropylidene-α-D-erythro-tetrofuranose, 1,2:3,3'-Di-O-isopropylidene-β-L-threo-tetrofuranose, Ethyl 3-benzamido-3-C-methyl-2,3,6-trideoxy-α-L-lyxo-hexopyranoside, Evermicose, Everninonitrose, Evertetrose, Flambeurekanose, β-D-Fructofuranosyl α-D-arabino-hexopyranosid-2-ulose, Garosamine, Hamamelitannin, Hamamelose, 2-Hydroxyhymenoxone, 4-C-Hydroxymethyl-1,2:3,4-di-O-isopropylidene-D-glycero-pentose, 4-C-Hydroxymethyl-1,2:3,4-di-O-isopropylidene-L-glycero-pentose, 4-C-Hydroxyethyl-2,3:4,4'-di-O-isopropylidene-D-glycero-pentose, 4-C-Hydroxymethyl-2,3:4,4'-di-O-isopropylidene-L-glycero-pentose, 2-C-Hydroxymethylribose, 3-C-Hydroxymethylriburonic acid, Hymenolide, ΔHymenoxon, 1,2-O-Isopropylideneapoise; β-L-threo-form, 1,2-O-Isopropylideneapoise; 5-L-threo-form, 3'-Thio, 3,3'-di-Ac, 1,2-O-Isopropylideneapoise; α-D-erythro-form, 1,2-O-Isopropylideneapoise; α-L-erythro-form, 2,3-O-Isopropylidene-2-C-methyl-D-ribonolactone, Kijanose, Methyl 2-O-acetyl-3-C-allyl-4,6-O-benzylidene-3-deoxy-α-D-erythro-hex-3-eno-pyranoside, Methyl 2-O-acetyl-3-C-4,6-O-benzylidene-3-deoxy-α-D-erythro-hex-3-enopyranoside, Methyl 2-O-acetyl-3-C-4,6-O-benzylidene-3-deoxy-3-C-α-D-erythro-hex-3-eno-pyranoside, Methyl 4-C-acetyl-2,6-dideoxy-α-L-xylo-hexo-pyranoside, Methyl 4-C-acetyl-2,6-dideoxy-β-L-xylo-hexo-pyranoside, Methyl aldgaroside A, Methyl aldgaroside B, Methyl 3-amino-3-C-methyl-2,3,6-trideoxy-α-L-lyxo-hexopyranoside, Methyl 3-amino-2,3,6-trideoxy-3-C-methyl-α-L-lyxo-hexopyranoside, Methyl 2,3-anhydro-6-deoxy-α-D-ribo-hexopyranosid-4-ulose, Methyl 3-benzamido-4-O-benzoyl-2,3,6-trideoxy-3-C-methyl-α-L-xylo-hexopyranoside, Methyl 3-benzamido-4-O-benzoyl-2,3,6-trideoxy-3-C-methyl-β-L-xylo-hexo-pyranoside, Methyl 3-benzamido-2,3,6-trideoxy-3-C-methyl-α-L-xylo-hexopyranoside, Methyl 4,6-O-benzylidene-3-deoxy-3-C-methyl-α-D-arabino-hexopyranosid-2-ulose, Methyl 4,6-O-benzylidene-2,3-dideoxy-2-C-methyl-3-nitro-α-D-erythro-hex-2-enopyranoside, Methyl 4,6-O-benzylidene-2,3-dideoxy-2-C-methyl-3-nitro-β-D-erythro-hex-2-eno-pyranoside, Methyl 4,6-O-benzylidene-2,3-dideoxy-2-C-methyl-3-nitro-α-D-threo-hex-2-eno-pyranoside, Methyl 4,6-O-benzylidene-3-C-methyl-α-D-allopyranoside, Methyl 5-deoxy-3-C-(hydroxy-methyl)-α-L-lyxofuranoside, Methyl 5-deoxy-3-C-(hydroxy-methyl)-β-L-lyxofuranoside, Methyl 3-deoxy-4-C-methyl-3-(N-methylacetamido)-β-L-arabinopyranoside, Methyl 6-deoxy-2-O-methyl-3-C-methyl-α-L-talopyranoside, Methyl 2,6-dideoxy-3-C-methyl-α-D-ribo-hexo-pyranoside, Methyl 2,6-dideoxy-3-C-methyl-α-L-ribo-hexo-pyranoside, Methyl 2,6-dideoxy-3-C-methyl-α-L-xylo-hexo-pyranoside, Methyl 2,6-dideoxy-3-C-methyl-β-L-xylo-hexo-pyranoside, Methyl 2,6-dideoxy-3-C-methyl-3-O-methyl-α-D-ribo-hexopyranoside, Methyl 2,6-dideoxy-3-C-methyl-3-O-methyl-α-L-ribo-hexopyranoside, Methyl 2,6-dideoxy-3-C-methyl-3-O-methyl-α-D-xylo-hexopyranoside, Methyl 3,4-dideoxy-4-C-6-O-trityl-α-D-threo-hexo-pyranosid-2-ulose, 2-C-Methylerythritol; D-form, 2-C-Methyl-1,4-erythrono-lactone; D-form, Methyl 2-C-hydroxymethyl-3,4-O-ispropylidene-β-D-ribopyranoside, Methyl 2-C-hydroxymethyl-α-D-ribopyranoside, Methyl 3,4-O-isopropylidene-α-L-erythro-pentopyranosid-2-ulose, Methyl 3,4-O-isopropylidene-β-L-erythro-pentopyranosid-2-ulose, Methyl 3-C-methyl-6-deoxy-α-D-ribohexopyranosid-4-ulose, Methyl 3-C-methyl-2,3-O-isopropylidene-α-D-mannofuranoside, 2-C-Methylribonic acid; D-form, 2-C-Methylribonic acid; D-form, 1,4-lactone, 2-C-Methylribonolactone; D-form, 2-C-Methylribonolactone; L-form, Methyl α-sibrosaminide, Methyl α-sibrosaminide, Methyl 3,4,6-tri-O-benzyl-α-D-arabino-hexopyranosid-2-ulose, Methyl 2,3,6-trideoxy-4-C-benzoyloxymethylcarbonyl-α-D-threo-hexopyranoside, Methyl 2,3,6-trideoxy-4-C-benzoyloxymethylcarbonyl-α-L-threo-hexopyranoside, Methyl 3,4,6-trideoxy-4-C-methyl-α-L-threo-hexo-pyranosid-2-ulose, Moenuronic acid; α-Pyranose-form Me glycoside, Mycarose, Neurotensin, Nogalose; D-form, Nogalose; L-form, Noviose, γ-Octose, γ-Octose; 1,1'-Anhydro, Oleandrose; L-form, Olgose, Olivomycose, Phenyl 3,4-O-isopropylidene-β-L-erythro-pentopyranosid-2-ulose, Reflexin, Rubranitrose; D-form, Rubranitrose; L-form, Streptobiosamine, Streptose; L-form, 3,4,6-Tri-O-acetyl-α-D-arabino-hexopyranosyl-2-ulose chloride, 3,4,6-Tri-O-benzoyl-α-D-arabino-hexopyranosyl-2-ulose bromide, 2,3,6-Tri-O-benzoyl-2-C-methyl-D-ribonolactone, Vancosamine, Vinelose, AD II, Affinoside B, Affinoside C, 1,6-Anhydro-3,4-O-endo-benzylidene-α-D-ribo-hexopyranos-2-ulose, 1,6-Anhydro-3,4-O-exo-benzylidene-α-D-lyxo-hexopyranos-2-ulose, 1,6-Anhydro-3,4-O-exo-benzylidene-β-D-ribo-hexopyranos-2-ulose, 1,6-Anhydro-3-deoxy-erythro-hexopyranos-2-ulose; β-D-form, 1,6-Anhydro-3-deoxy-4-O-methyl-β-D-erythro-hexopyranos-2-ulose, 1,6-Anhydro-3-deoxy-4S-phenyl-4-thio-β-D-erythro-hexopyranos-2-ulose, 1,6-Anhydro-3,4-dideoxy-β-D-glycero-hex-3-enopyranos-2-ulose, 1,6-Anhydro-3,4-dideoxy-β-D-glycero-enopyranos-2-ulose, 1,6-Anhydro-lyxo-hexopyranos-2-ulose; β-D-form, 1,6-Anhydro-ribo-hexopyranos-2-ulose; β-D-form, 1,6-Anhydro-3,4-O-isopropylidene-β-D-lyxo-hexopyranos-2-ulose, 1,6-Anhydro-3,4-O-isopropylidene-β-D-ribo-hexopyranos-2-ulose, Benzyl 4,6-O-benzylidene-3-deoxy-α-D-erythro-hexopyranosid-2-ulose, 4,6-O-Benzylidene-3-deoxy-D-erythro-hexos-2-ulose, Benzyl 3,4-O-isopropylidene-α-D-erythro-pentopyranosid-2-ulose, tert-Butyl 3,4-O-isopropylidene-α-L-erythro-pentopyranosid-2-ulose, tert-Butyl 3,4-O-isopropylidene-β-L-erythro pentopyranosid-2-ulose, Coleosol, 3-Deoxy-erythro-hexos-2-ulose; D-form, 1,3-Di-O-acetyl-4,6-di-O-methyl-α-D-arabino-hexopyranos-2-ulose, 1,6:3,4-Dianhydro-D-lyxo-hexopyranos-2-ulose, 1,6:3,4-Dianhydro-D-ribo-hexopyranos-2-ulose, 2,3:4,5-Di-O-isopropylidene-β-D-arabino-hexos-2-ulo-2,6-pyranose, Gomphoside, arabino-Hexopyranos-2-ulose; D-form, arabino-Hexopyranos-2-ulose; β-D-form, arabino-Hexopyranos-2-ulose; β-D-form, Me glycoside, 3,4,6-Tri-Ac, Humistratin, Methyl 3-O-benzoyl-4,6-O-benzylidene-α-D-arabino-hexopyranosid-2-ulose, Methyl 3-O-benzoyl4-, 6-O-benzlidene-β-D-arabino-hexopyranoside-2-ulose, Methyl 3-O-benzoyl-α-D-arabino-hexopyranosid-2-ulose, Methyl 4,6-O-benzylidene-3-O-acetyl-α-D-arabino-hexopyranosid-2-ulose, Methyl 4,6-O-benzylidene-3-deoxy-erythro-hexopyranosid-2-ulose; D-form, Methyl 4,6-O-benzylidene-3-deoxy-α-D-threo-hexo-pyranosid-2-ulose; D-form, Methyl 4,6-O-benzylidene-3-deoxy-β-D-threo-hexo-pyranosid-2-ulose, Methyl 4,6-O-benzylidene-3-deoxy-3-C-methyl-a-D-arabino-hexopyranosid-2-ulose, Methyl 4,6-O-benzylidene-3-O-methyl -α-D-arabino-hexo-pyranosid-2-lose; Methyl 4,6-O-benzylidene-3-O-methyl-α-D-arabino-hexo-pyranosid-2-ulose; Methyl 4,6-O-benzylidene-3-O-tosyl-α-D-arabino-hexo-pyranosid-2-Ulose; Methyl 4,6-O-benzylidene-3-O-tosyl-α-D-arabino-hexo-pyranosid-2-ulose; Methyl 3-deoxy-α-D-threo-hexopyranosid-2-ulose; Methyl 3-deoxy-β-D-threo-hexopyranosid-2-ulose; Methyl 3,5-di-O-benzoyl-α-threo-pentofuranosid-2-ulose; Methyl 3,4-dideoxy-α-D-glycero-hex-3-enopyranosid-2-ulose, Methyl 3,4-dideoxy-4-C-methyl-6-O-trityl-c-D-threo-hexopyranosid-2-ulose, Methyl 3,4-dideoxy-6-O-trityl-α-D-glycero-hex-3-enopyranosid-2-ulose, Methyl α-D-arabino-hexo-pyranosid-2-ulose, Methyl α-D-arabino-hexopyranosid-2-ulose, Methyl 3,5-O-isopropylidene-β-D-threo-pentofuranoside, Methyl 3,5-O-isopropylidene-α-D-threo-pentofuranoside-2-ulose, Methyl 3,4-O-isopropylidene-β-D-erythro-pentopyranoside-2-ulose, Methyl 3,4,6-trideoxy-4-C-methyl-α-L-threo-hexo-pyranosid-2-ulose, Phenyl 4,6-O-benzylidene-3-deoxy-β-D-threo-hexo-pyranosid-2-ulose, Phenyl 3-deoxy-β-D-threo-hexo-pyranosid-2-ulose, 1,3,4,6-Tetra-O-benzoyl-β-D-arabino-hexopyranos-2-ulose, 1-O-Acetyl 2,7-anhydro-4,5-O-isopropylidene-β-ribo-hepto-2,3-diulo-2,6-pyranose, 5-O-Acetyl-1,2-O-isopropylidene-α-D-erythro-pentofuranos-3-ulose tosylhydrazone, 2,7-Anhydro-4,5-O-exo-benzylidene 1-O-trityl-D-D-ribo-hepto-2,3-diulo-2,6-pyranose, 1,6-Anhydro-4-O-benzyl-2-O-tosyl-D-D-arabino-hexopyranos-3-ulose, 2,7-Anhydro-1-deoxy-4,5-O-isopropylidene-β-D-ribo-hepto-2,3-diulo-2,6-pyranose, 1,6-Anhydro-2-4-di-O-benzoyl-β-D-lyxo-hexopyranos-3-ulose, 1,6-Anhydro-2-4-di-O-benzoyl-β-D-lyxo-hexopyranos-3-ulose, 1,6-Anhydro-2-4-di-O-tosyl-β-D-arabino-hexopyranos-3-ulose, 1,6-Anhydro-2-4-di-O-tosyl-β-D-lyxo-hexopyranos-3-ulose, 2, 7-Anhydro-ribo-hepto-2,3-diulo-2,6-pyranose; β-D-form, 1,6-Anhydro-α-D-arabino-hexopyranos-3-ulose, 1,6-Anhydro-β-D-lyxo-hexopyranos-3-ulose, 2,7-Anhydro-4,5-O-isopropylidene-α-D-ribo-hepto-2-3-diulo-2,6-pyranose, 2,7-Anhydro-4,5-O-isopropylidene-1-O-tosyl-β-D-ribo-hepto-2,3-diulo-2,6-pyranose, 2, 7-Anhydro-4,5-O-iso-propylidene-1-O-trityl-α-D-ribo-hepto-2,3-diulo-2,6-pyranose, 5-O-Benzoyl-1,2-O-iso-propylidene-α-D-erythro-pentofuranos-3-ulose, Benzyl 4,6-O-benzylidene-β-D-arabino-hexopyranosid-3-ulose, Benzyl 4,6-O-benzylidene-β-D-xylo-hexopyranosid-3-ulose, 4,6-O-Benzylidene-1,2-dideoxy-threo-hex-1-enopyranos-3-ulose; D-form, 4,6-O-Benzylidene-1,2-O-isopropylidene-α-D-ribo-hexo-pyranos-3-ulose, 4,6-O-Benzylidene-1,2-O-propylidene-α-D-ribo-hexopyranos-3-ulose, 1,2-O-Cyclohexylidiene-α-D-ribo-hexofuranos-3-ulose, 5-Deoxy-1,2-O-isopropylidene-α-D-erythro-pentofuranos-3-ulose, 5-Deoxy-1,2-O-isopropylidene-β-D-threo-pentofuranos-3-ulose, 5-Deoxy-1,2-O-isopropylidene-β-L-threo-pentofuranos-3-ulose, 2,4-Di-O-acetyl-1,6-anhydro-D-lyxo-hexopyranose-3-Ulose, 1,2:5,6-Di-O-cyclohexylidiene-α-D-ribo-hexofuranos-3-ulose, 1,2-Dideoxy-erythro-hex-1-enopyranos-3-ulose; D-form, 1,2-Dideoxy-erythro-hex-1-enopyranos-3-ulose; D-form, 1,2-Dideoxy-erythro-hex-1-enopyranos-3-ulose; D-form, 4,6-O-isopropylidene, 1,2:5,6-Di-O-isopropylidene-α-D-arabino-hexofuranos-3-ulose, 1,2:5,6-Di-O-isopropylidene-α-D-lyxo-hexofuranos-3-ulose, 1,2:5,6-Di-O-isopropylidene-ribo-hexofuranos-3-ulose; α-D-form, 1,2:4,6-Di-O-isopropylidene-α-D-xylo-hexofuranos-3-ulose; 4,6-O-Ethylidene 1,2-O-isopropylidene-α-D-ribo-hexopyranos-3-ulose, 4,6-O-Ethylidene-1,2-O-isopropylidene-α-D-xylo-hexopyranos-3-ulose, ribo-Hexos-3-ulose, D-Furanose-form, xylo-Hexos-3-ulose, α-D-Pyranose-form, 1,2:4,6-Di-O-isopropylidene, 4-nitro-phenylhydrazone, 1,2-O-Isopropylidene-β-D-ribohexofuranos-3-ulose, 1,2-O-isopropylidene-α-L-glycero-tetrofuranos-3-ulose, 1,2-O-isopropylidene-α-L-glycero-tetrofuranose-3-ulose, 1,2-O-Isopropylidene-5-O-tosyl-α-D-erythro-pentofuranos-3-ulose, 1,2-O-Isopropylidene-5-O-trityl-α-D-erythropentofuranos-3-ulose, Methyl 2-acetamido-4,6-O-benzylidene-2-deoxy-α-D-ribo-hexopyranosid-3-ulose, Methyl 2-acetamido-4,6-O-benzylidene-2-deoxy-α-D-ribo-hexopyranosid-3-ulose, Methyl 2-O-acetyl-4,6-O-benzylidene-β-D-ribo-hexopyranosid-3-ulose, Methyl 2-O-acetyl-4,6-O-benzylidene-α-D-xylo-hexopyranosid-3-ulose, Methyl 2-azido-4,6-O-benzylidene-2-deoxy-α-D-ribo-hexopyranosid-3-ulose, Methyl 2-azido-4,6-O-benzylidene-2-deoxy-α-D-ribo-hexopyranosid-3-ulose, Methyl 2-benamido-4,6-O-benzylidene-2-deoxy-α-D-ribo-hexopyranosid-3-ulose, Methyl 2-O-benzoyl-4,6-O-benzylidene-α-D-ribo-hexopyranosid-3-ulose, Methyl 2-O-benzoyl-4,6-O-benzylidene-α-D-ribo-hexopyranosid-3-ulose, Methyl 2-O-benzoyl-4,6-O-benzylidene-α-D-arabino-hexopyranosid-3-ulose oxime, Methyl 4,6-O-benzylidene-2-bromo-2-deoxy-β-D-ribo-hexo-pyranosid-3-ulose, Methyl 4,6-O-benzylidene-2-deoxy-α-D-erythro-hexo-pyranosid-3-ulose, Methyl 4,6-O-Benzylidene-2-deoxy-threo-hexopyranos-3-ulose, Methyl 4,6-O-benzylidene-2-deoxy-threo-hexopyranos-3-ulose; β-D-form, Methyl 4,6-O-benzylidene-α-D-ribo-hexopyranosid-3-ulose, Methyl 4,6-O-benzylidene-α-D-ribo-hexopyranosid-3-ulose, Methyl 4,6-O-benzylidene-2-O-mesyl-α-D-ribo-hexopyranosid-3-ulose, Methyl 4,6-O-benzylidene-2-O-methyl-α-D-ribo-hexo-pyranosid-Methyl 4,6-O-benzylidene-2-O-methyl-β-D-ribo-hexo-pyranosid-3-ulose, Methyl 4,6-O-benzylidene-2-O-tosyl-α-D-ribo-hexo-pyranosid-3-ulose, Methyl 2-deoxy-5-O-trityl-α-D-glycero-pentofuranosid-3-ulose, Methyl 2-deoxy-5-O-trityl-β-D-glycero-pentofuranosid-3-ulose, Methyl 2,6-dideoxy-L-erythro-hexopyranosid-3-ulose; α-L-form, Methyl 2,6-dideoxy-4-O-methyl-β-L-erythro-hexo-pyranosid-3-ulose, Methyl 4,6-O-ethylidene-2-O-methyl-α-D-arabino-hexopyranosid-3-ulose, Methyl α-D-erythro-pentopyranosid-3-ulose, Methyl β-D-erythro-pento-pyranosid-3-ulose, 1,6-Anhydro-2,3-O-benzylidene-β-D-ribo-hexopyranos-4-ulose, 1,6-Anhydro-3-deoxy-β-D-erythro-hexopyranos-4-ulose, 1,6-Anhydro-3-deoxy-β-D-threo-hexopyranos-4-ulose, 1,6-Anhydro-2,3-dideoxy-α-D-glycero-hex-2-enopyranos-4-ulose, 1,6-Anhydro-2,3-dideoxy-α-D-glycero-hexopyranos-4-ulose, 1,6-Anhydro-arabino-hexopyranos-4-ulose; β-D-form, 1,6-Anhydro-lyxo-hexopyranos-4-ulose; β-D-form 1,6-Anhydro-ribo-hexopyranos-4-ulose; β-D-form, 1,6-Anhydro-2,3-O-isopropylidene-β-D-lyxo-hexopyranos-4-ulose, 1,6-Anhydro-2,3-O-isopropylidene-β-D-ribo-hexopyranos-4-ulose, Benzyl 6-deoxy-2,3-O-isopropylidene-α-L-lyxo-pyranosid-4-ulose, Benzyl 2,3-di-O-benzyl-62 -L-threo-pentopyranosid-4-ulose, 1,6:2,3-Dianhydro-D-lyxo-hexopyranos-4-ulose, 1,6:2,3-Dianhydro-D-ribo-hexopyranos-4-ulose, Ethyl 6-O-benzoyl-2,3-dideoxy-α-D-glycero-hexopyranosid-4-ulose, Ethyl 2,3-dideoxy-α-D-glycero-hex-2-enopyranos-4-ulose, Ethyl 2,3-dideoxy-α-D-glycero-hexopyranoside-4-ulose, Methyl 2,3-anhydro-6-deoxy-α-D-hexopyranosid-4-ulose, Methyl 2,3-anhydro-6-dideoxy-α-D-lyxo-hexopyranosid-4-ulose, Methyl 2,3-anhydro-D-erythro-pentopyranosid-4-ulose, Methyl 2,3-anhydro-β-L-erythro-pentopyranosid-4-ulose, Methyl 3-bromo-3,6-dideoxy-α-D-xylo-hexopyranosid-4-ulose, Methyl 6-deoxy-2,3-di-O-methyl-α-D-ribo-hexopyranosid-4-ulose, Methyl 6-deoxy-2,3-di-O-methyl-α-D-xylo-hexopyranosid-4-ulose, Methyl 6-deoxy-2,3-O-isopropylidene-α-D-lyxo-hexopyranosid-4-ulose, Methyl 6-deoxy-2,3-O-isopropylidene-α-lyxo-hexopyranosid-4-ulose, Methyl 6-deoxy-2,3-O-isopropylidene-β-L-lyxo-hexopyranosid-4-ulose, Methyl 6-deoxy-2,3-O-isopropylidene-α-D-ribo-hexopyranosid-4-ulose, Methyl 6-deoxy-2,3-O-isopropylidene-β-D-ribo-hexopyranosid-4-ulose, Methyl 2,3-di-O-benzyl-6-O-trityl-α-D-xylo-hexopyranosid-4-ulose, Methyl 2,3-dideoxy-β-D-glycero-hexopyranosid-4-ulose, Methyl 2,3-d i-O-methyl-6-O-trityl-α-D-xylo-hexopyranosid-4-ulose, Methyl 2,3-di-O-methyl-6-trityl-β-D-xylo-hexopyranosid-4-ulose, Methyl α-D-xylo-hexo-pyranosid-4-ulose, Methyl β-D-xylo-hexo-pyranosid-4-ulose, Methyl 2,3-O-isopropylidene-6-O-mesyl-α-D-lyxo-hexopyranosid-4-ulose, Methyl 2,3-O-isopropylidene-6-O-methyl-α-D-lyxo-hexopyranosid-4-ulose, Methyl 2,3-O-isopropylidene-β-L-erythro-pentopyranosid-4-ulose, Methyl 3-C-methyl-6-deoxy-α-D-ribo-hexopyranosid-4-ulose, Methyl β-L-threo-pentopyranosid-4-ulose, Methyl-α-L-threo-pento-pyranosid-4-ulose O-methloxime, Methyl 2,3,6-tri-O-benzoyl-β-D-xylo-hexopyranosid-4-ulose, Methyl 2,3,6-trideoxy-α-D-glycero-hexopyranoside-4-ulose, Methyl 2,3,6-trideoxy-α-L-glycero-hexopyranosid-4-ulose, 3-O-Benzyl-6-deoxy-1,2-O-isopropylidene-α-D-xylo-hexofuranos, 3-O-Benzyl-1,2-O-isopropylidene-α-D-xylo-hexofuranos-5-ulose, 3-O-Benzyl-1,2-O-isopropylidene-6-trityl-O-α-D-xylo-hexofuranos-5-ulose, 6-Deoxy-arabino-hexos-5-ulose; D-form, 6-Deoxy-xylo-hexos-5-ulose; D-form, 6-Deoxy-1,2-O-isopropylidene-β-D-arabino-hexofuranos-5-ulose, 6-Deoxy-1,2-O-isopropylidene-α-D-xylo-hexofuranos-5-ulose, 6-Deoxy-1,2-O-methylene-α-D-xylo-hexofuranos-5-ulose, 6-Deoxy-1,2-O-methylene-3-O-tosyl-α-D-xylo-hexofuranos-5-ulose, 3,6-Di-O-benzyl-1,2-O-isopropylidene-α-D-xylo-hexofuranos-5-ulose, xylo-Hexos-5-ulose; α-D-Furnose-form, 1,2-O-Isopropylidene, di-Me acetal, 6-phosphate, bis (cyclohexylammonium)salt, 1,2-O-Isopropylidene-α-D-xylo-hexofuranos-5-ulose, 1,2-O-Isopropylidene-3-O-methyl-6-O-tosyl-α-D-xylo-hexofuranos-5-ulose, Methyl 6-deoxy-2,3-di-O-tosyl-β-D-xylo-hexofuranosid-5-ulose, Benzyl 1-deoxy-4,5-O-iso-propylidene-D-erythro-hexo-2,3-diulo-3,6-furanoside, 1-deoxy-4,5-O-erythro-hexo-2,3-diulose, 1-deoxy-4,5-O-isopropylidene-D-erythro-hexo-2), 3-diulo-3,6-furanoside, 1,2:4,5-di-O-cyclohexylidene-β-D-erythro-hexo-2,3-diulose-2,6-furanoside, 1,2:4,5-di-O-isopropylidene-β-D-erythro-hexo-2,3-diulose-2,6-furanoside, threo-Hexo-2,5-diulose; D-form, 1,2-O-Isopropylidene-β-D-erythro-hexo-2,3-di ulose-2,6-pyranose, ΔUscharin, 3-O-1,2-cyclohexylidene-α-D-xylo-pentodialdo-1,4-furanose, 3-O-Benzyl-1,2-O-isopropylidene-α-D-xylo-pentodialdo-1,4-furanose, 1,2-O-Cyclohexylidene-α-D-xylo-pentodialdo-1,4-furanose, 1,2:3,4-Di-O-isopropylidene-galacto-hexodialdo-1,5-pyranose; α-D-form, 1,2-O-Isopropylidene-gluco-hexodialdo-1,4-furanose: α-D-form, Methyl 2,3-di-O-acetyl-4-deoxy-β-L-erythro-hex-4-enodialdo-1,5-pyranose, Methyl 2,3-isopropylidene-ribo-pentodialdo-1,4-furanose; β-D-form, xylo-Pentodialdo-1,4-furanose; α-D-form, 1,2-O-Isopropylidene, semi-carbazone, 1,2,3-Tri-O-acetyl-4-deoxy-α-L-erythro-hex-4-enodialdo-1,5-pyranose, 1,2,3-Tri-O-acetyl-4-deoxy-β-L-erythro-hex-4-enodialdo-1,5-pyranose Allonic acid; D-form, Allonic acid; D-form, 2,5-Anhydro, Me ester, Allonic acid; L-form, D-Allono-1,4-lactone, L-Allono-1,4-lactone, Altronic acid, Altronic acid; 2,5-Anhydro-3,4,6-tribenzoyl, 2-Amino-5-O-carbamoyl-2-deoxy-L-xylonic acid, 2-Amino-2-deoxygluconic acid; D-form, 2-Amino-2-deoxygluconic acid; D-form, 3-Me, 2-Amino-2-deoxygluconic acid; D-form, 3,4,6-Tri-Me, 2-Amino-2-deoxygluconic acid; D-form, Me ester, 2-Amino-2-deoxygluconic acid; D-form, N-Benzoyl, Et ester, 2-Amino-2-deoxygluconic acid; D-form, N-Me, 2-Amino-2-deoxygluconic acid; D-form, N-Ac, 4,6-O-isopropylidene, 2-Amino-2-deoxygluconic acid; D-form, N-Ac, Me ester, 2-Amino-2-deoxygluconic acid; D-form, N-Ac, Me ester, 3,4,6-tribenzyl, 2-Amino-2-deoxygluconic acid; D-form, N-Ac, Me ester, 5,6-O-isopropylidene, 2-Amino-2-deoxygluconic acid; D-form, N-Ac, Me ester, 3,4,5,6-tetra-Ac, 2-Amino-2-deoxygluconic acid; D-form, N-Ac, 1,4-lactone, 2-Amino-2-deoxygluconic acid; D-form, N-Ac, 1,4-lactone, 5,6-O-isopropylidene, 2-Amino-2-deoxygluliconic acid; D-form, N-Ac, 1,5-lactone, 2-Amino-2-deoxygluconic acid; D-form, N-Ac, 1,5-lactone, 2-Amino-2-deoxygluconic acid; D-form, N-Ac, 1,5-lactone, 3,4-di-Me, 2-Amino-2-deoxygluconic acid; D-form, N-Ac, 1,5-lactone, 4,6-O-isopropylidene, 2-Amino-2-deoxygluconic acid; D-form, N-Ac, 1,5-lactone, 4,6-O-benzylidene, 2-Amino-2-deoxy-D-xylonic acid; 2-Amino-2-deoxy-L-xylonic acid; 2-Amino-3,4,5-trihydroxypentonoic acid; 4,5-O-Isopropylidene, 2,5-Anhydro-D-allonic acid, L-Arabinoamide, Arabinonic acid; D-form, Arabinonic acid; D-form, Et ester, 2,3,4,5-tetra-Ac, Arabinonic acid; D-form, Butyl ester, 2,3,4,5-tetra-Ac, Arabinonic acid; D-form, Amide, 1N, 2,3,5-tetrabenzyl, Arabinonic acid; L-form, Arabinonolactone; 1,4-lactone, D-form, 2-Benzyl, D-Arabinono-1,4-lactone, L-Arabinono-1,4-lactone, L-Arabinono-1,5-lactone, 4,6-O-Benzylidene-2,3-dideoxy-D-erythro-hex-2-etionic acid δ-lactone, 4,6-O-Benzylidene-D-glucono-1,5-lactone, Benzyl1,2-O-isopropylidene-3,5-O-benzylidene-α-D-gluconate, Butyl-D-arabinonate, 2,3-O-Cyclohexylidene-D-ribono-1,4-lactone, Cymaronic acid; D-form, Cymaronic acid; D-form, 1,4-lactone, 5-Me, Cymaronic acid; D-form, 1,5-Lactone, 4-Me, 3-Deoxy-3-fluoro-D-gluconic acid, 2-Deoxy-D-arabino-hexonic acid, 2-Deoxy-D-arabino-hexonic acid; 1,4-Lactone, tri-Me, 3-Deoxy-D-arabino-hexonic acid, 3-Deoxy-D-ribo-hexonic acid, 3-Deoxy-xylo-hexonic acid; D-form, 3-Deoxy-xylo-hexonic acid, D-form, Anilide, 2-Deoxy-D-arabino-hexono-1,4-lactone, 2-Deoxy-D-arabino-hexono-1,5-lactone, 3-Deoxy-D-arabino-hexono-1,4-lactone, 3-Deoxy-D-ribo-hexono-1,4-lactone, 3-Deoxy-D-xylo-hexono-1,4-lactone, 3-Deoxy-2-C-hydroxymethyl-threo-pentonic acid; D-form, 3-Deoxy-2-C-hydroxymethyl-D-threo-pentono-1,4-lactone, 6-Deoxymannonic acid; L-form, 6-Deoxy-3-O-methyl-L-talono-1,4-lactone, 5-Deoxyribonolactone: D-form, 3-Deoxy-2,4,6-tri-O-benzyl-D-arabino-hexono-1,5-lactone, 4,6-Di-O-acetyl-D-erythro-hex-2-eno-1,5-lactone, 3,6-Diamino-5-hydroxyhexanoic acid, 2,4:3,5-Di-O-benzylidene-D-xylonic acid, 2,3-Dideoxy-erythro-hex-2-enono-1,5-lactone; D-form, 4,6-Dibenzoyl, 2,6-Dideoxy-3-O-methyl-D-ribo-hexono-1,4-lactone, 2,6-Dideoxy-3-O-methyl-D-ribo-hexono-1,5-lactone, 2,3-Dihydroxybutanoic acid, 2,5-Dihydroxyhexanedoic acid, 2,3:5,6-Di-O-isopropylidene-D-gulono-1,4-lactone, 2,3:5,6-Di-O-isopropylidene-L-gulono-1,4-lactone, 2,3:5,6-Di-O-isopropylidene-D-mannono-1,4-lactone, 2,3-Di-O-methyl-L-xylono-1,4-lactone, 3,5-Di-O-methyl-L-xylono-1,4-lactone, Eritadenine; (2R,3R)-form, Eritadenine; (2R,3S)-form, Eritadenine; (2S,3R)-form, Ethyl-D-arabinoate, Ethyl 2-deoxy-3,4,5-tetra-O-acetyl-D-arabino-hexonate, Ethyl D-gluconate, 4,6-O-Ethylidene-D-glucono-1,5-lactone, Ethyl D-mannonate, Ethyl 2,3,4,5,6-penta-O-acetyl-D-galactonate, Ethyl 2,3,4,6-tetra-O-benzoyl-D-gluconate, Ethyl 2,3,5,6-tetra-O-benzoyl-D-gluconate, Fuconic acid; D-form, Fuconic acid; L-form, D-Galactonamide, L-Galactonamide, Galactonic acid; D-form, Galactonic acid; D-form, 2-Methylpropyl ester 2,3,4,5,6-penta-Ac, Galactonic acid; D-form, 6-Me, Galactonic acid; D-form, 2,3,4-Tri-Me, Galactonic acid; D-form, 2,3,4,6-Tetra-Me, Galactonic acid; D-form, Amide 2,3,4,6-tetra-Me, Galactonic acid; D-form, Amide, 2,3,5,6-tetra-Me, Galactonic acid; D-form, Amide, N-Ph, Galactonolactone; 1,4-Lactone, D-form, 2,3,5,6-Tetrabenzoyl, Galactonolactone; 1,4-Lactone, D-form, 2,3,5,6-Tetra-Me, Galactonolactone; 1,5-Lactone, D-form, 2,3,4-Tri-Me, Galactonolactone; 1,5-Lactone, D-form, 2,3,4,6-Tetra-Me, D-Galactono-1,4-lactone, D-Galactono-1,5-lactone, L-Galactono-1,5-lactone, D-Gluconamide, Gluconic acid; D-form, Gluconic acid; D-form, 2,3,4,5,6-Penta-Ac, Gluconic acid; Amide, 1N, 2,3,4,5,6-hexabenzoyl, 1,4-Gluconacetone; D-form, 1,5-Gluconacetone; D-form, D-Glucononitrile, Glucuronic acid; D-form, Glucuronic acid; D-form, 3-Me, Glucuronic acid; D-form, 4-Me, Glucuronic acid; D-form, 2,3,-Di-Me, Glucuronic acid; D-form, 3,4,-Di-Me, Glucuronic acid; D-form, 2,3,4-Tri-Me, Glucuronic acid; D-form, 1-Ac, D-Gulonamide, Gulonic acid; D-form, Gulonic acid; DL-form, D-Gulono-1,4-lactone, L-Gulono-1,4-lactone, 2,3,4,5,6,7,8-Hepta-O-acetyl-D-erythro-L-gluco-octonic acid, D-glycero-D-galacto-Haptonamide, D-glycero-D-galacto-Heptonic acid, D-glycero-D-galacto-Heptono-1,4-lactone, Idonic acid; L-form, L-Idono-1,4-lactone, 1,2-O-Isopropylidene-3,5-O-benzylidene-α-D-glucuronic acid, 5,6-O-Isopropylidene-D-galactono-1,4-lactone, 4,6-O-Isopropylidene-D-glucono-1,5-lactone, 1,2-O-Isopropylidene-α-D-glucuronic acid, 2,3-O-Isopropylidene-D-gulono-1,4-lactone, 2,3-O-Isopropylidene-D-lyxono-1,4-lactone, 3,5-O-Isopropylidene-D-lyxono-1,4-lactone, 2,3-O-Isopropylidene-2-C-methyl-D-ribonolactone, Isopropyl 2,3,4,5,6-penta-O-acetyl-D-galactonate, Isopropyl 2,3,4,5,6-pentα-O-acetyl-D-gluconate, D-Lactonic acid, D-Lactono-1,5-lactone, Lyxonic acid; D-form, D-Lyxono-1,4-lactone, Maltobionic acid, Maltotetraonic acid, Mannolactone; 1,4-Lactone-D-form, 2,3-O-Isopropylidene, Mannolactone; 1,4-Lactone-D-form, 2,3-O-Isopropylidene, 5,6-di-Me, Mannolactone; 1,4-Lactone-D-form, 3,5,6-Tri-Me, Mannolactone, 1,5-Lactone-D-form, 2,3,4-Tribenzoyl, 6-deoxy, Mannolactone, 1,5-Lactone-L-form, 3,4,6-Tri-Me, D-Mannonamide, L-Mannonamide, Mannonic acid; D-form, Mannonic acid; L-form, D-Mannono-1,4-lactone, D-Mannono-1,5-lactone, L-Mannono-1,4-lactone, L-Mannono-1,5-lactone, Mannononitrile; D-form, Mannononitrile; D-form, 2,3,4,5-Tetra-Me, Melibionic acid, Methyl 2-deoxy-D-arabino-hexonate, Methyl 2-deoxy-3,4,5,6-tetra-O-acetyl-D-arabino-hexonate, Methyl 2,4:3,5-di-O-benzylidene-D-xylonate, Methyl 2,3,4,5,6,7,8-hepta-O-acetyl-D-erythro-L-gluco-octonate, Methyl D-mannonate, Methyl octa-O-methyl-D-lactonate, Methyl octa-O-methyl-maltobioniate, Methyl octa-O-methyl-melibionate, Methyl 2,3,4,5,6-penta-O-acetyl-D-gluconate, Methyl 2,3,4,5,6-penta-O-acetyl-L-idonate, Methyl penta-O-acetyl-D-mannonate, Methyl penta-O-acetyl-L-mannonate, 2-C-Methylribonic acid; D-form, 2-C-Methylribonic acid; D-form, 1,4-Lactone, 2-C-Methylribonolactone; D-form, 2-C-Methylribonolactone; L-form, Methyl 2,3,4,6-tetra-O-benzoyl-D-gluconate, Methyl 2,3,5,6-tetra-O-benzoyl-D-gluconate, Methyl 2,3,4-tri-O-methyl-β-D-glucopyranosiduronic acid, Methyl D-xylonate, Mycolic acid, D-erythro-L-gluco-Octonic acid, Pangamic acid, Pantetheine, ΔPanthenol, 2,3,4,5,6-Penta-O-acetyl-D-galactonic acid, 2,3,4,5,6-Penta-O-acetyl-L-galactonic acid, 2,3,4,5,6-Pentaacetyl-D-gluconamide, 2,3,4,5,6-Penta-O-acetyl-D-glucononitrile, 2,3,4,5,6-Penta-O-acetyl-D-mannonitrile, 2,3,4,5,6-Penta-O-acetyl-D-talonic acid, 2,3,4,5,6-Penta-O-benzoyl-D-gluconamide, 2,3,4,5,6-Penta-O-benzoyl-D-gluconitrile, 2,3,4,5,6-Penta-O-methyl-D-mannonitrile, Propyl 2,3,4,5,6-Penta-O-acetyl-D-galactonate, Reflex in, L-Rhamnonamide, L-Rhamnono- 1,4-lactone, L-Rhamnono-1,5-lactone, Ribonic acid; D-form, Ribonic acid; D-form, 1,4-Lactone, 5-Me, Ribonic acid; D-form, 1,4-Lactone, 3,5-di-Me, D-Ribono-1,4-lactone, L-Ribono-1,4-lactone, Talonic acid; D-form, Talonic acid; L-form, D-Talono-1,4-lactone, L-Talono-1,4-lactone, 2,3,4,5-Tetra-O-acetyl-D-arabinonic acid, 4,5,6,7-Tetra-O-acetyl-2,3-dideoxy-D-arabino-hept-2-enionic acid, 2,3,4,6-Tetra-O-acetyl-D-glucono-1,5-lactone, 2,3,5,6-Tetra-O-acetyl-D-glucono-1,4-lactone, 2,3,4,6-Tetra-O-acetyl-D-mannono-1,5-lactone, 2,3,5,6-Tetra-O-acetyl-D-mannono-1,4-lactone, 2,3,4,5-Tetra-O-acetyl-D-xylonic acid, 2,3,4,5-Tetra-O-acetyl-DL-xylonic acid, 2,3,4,5-Tetra-O-acetyl-L-xylonic acid, 2,3,4,6-Tetra-O-benzoyl-D-glucono-1,5-lactone, 2,3,5,6-Tetra-O-benzoyl-D-glucono-1,4-lactone, 2,3,4,6-Tetra-O-benzyl-D-1-2-O-(D-glucopyranosylidene)-ethanediol, 4,5,6,7-Tetrahydroxy-2-heptenoic acid; (2E,4R,-5S, 6R)-form 4,5,6,7-Tetrahydroxy-2-heptenoic acid; (2E,4S,-5R,6S)-form, Me ester, 4,5,6,7-tetra-Ac, 2,3,4,6-Tetra-O-methyl-D-gluconamide, 2,3,5,6-Tetra-O-methyl-D-gluconamide, 2,3,4,6-Tetra-O-methyl-D-glucono-1,5-lactone, 2,3,5,6-Tetra-O-methyl-D-glucono-1,4-lactone, 2,3,4,6-Tetra-O-methyl-D-gluconitrile, 2,3,5,6-Tetra-O-methyl-D-gluconitrile, 2,3,4,6-Tetra-O-methyl-D-mannono-1,5-lactone, 2,3,4,6-Tetra-O-methyl-L-mannono-1,5-lactone, 2,3,5,6-Tetra-O-methyl-D-mannono-1,4-lactone, 2,3,5-Triamino-2,3,5-tride-oxy-D-arabino-1,4-lactone, 2,3,6-Tri-O-benzoyl-2-C-methyl-D-ribonolactone, 2,3,5-Tri-O-benzyl-D-arabino-1,4-lactone, 2,4,6-Tri-O-benzyl-3-deoxy-threo-hex-2-enono-1,5-lactone; L-form, 2,3,4-Trihydroxybutanoic acid, 2,3,4-Tri-O-methyl-D-xylono-1,5-lactone, 2,3,5-Tri-O-methyl-L-xylono-1,4-lactone, D-Xylonamide, Xylonic acid; D-form, Xylonic acid; L-form, 1,4-Xylonolactone; D-form, 1,4-Xylonolactone; L-form, 2-Acetamido-4,6-O-benzylidene-2,3-deoxy-D-erythro-hex-2-enono-1,5-lactone, 2-Acetamido-2-deoxy-L-galacturonic acid, 2-Acetamido-2,3-dideoxy-D-threo-hex-2-enonic acid γ-lactone, 2-Acetamido-2,3-dideoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1,5-lactone, 2-Acetamido-2,3-dideoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-(dideoxy-4,6-O-isopropylidene-D-erythro-hex-2-enono-1,5-lactone, 2-Acetamido-2,3-dideoxy-4,6-O-isopropylidene-D-threo-flex-2-enono-1,5-lactone, 2-Amino-2-deoxygalacturonic acid; L-form, 2-Amino-2-deoxygalacturonic acid; D-form, 2-Amino-2-deoxyglucuronic acid; D-form, 2-Amino-2-deoxyglucuronic acid; α-D-pyranose-form, Benzyl glycoside, N-benzyloxycarbonyl, 4-Amino-4-deoxyglucuronic acid; D-form, 2-Amino-2-deoxyglucuronic acid; L-form, 2-Amino-2-deoxymannuronic acid; D-form, 2-Amino-2-deoxymannuronic acid; D-form, N-Ac, 2-Amino-2-deoxymannuronic acid; o-D-pyranose-form, Benzyl glycoside, di-Ac, Me ester, Benzyl 2-acetamido-2-deoxy-α-D-mannopyranosiduronic acid, Benzyl 2,3-di-O-benzyl-galactopyranosiduronic acid; β-D-from, Benzyl glucopyranosiduronic acid; α-D-form, Benzyl glucopyranosiduronic acid; β-D-form, Benzyl glucopyranosiduronic acid; α-D-form, Me ester, 2,3-dibenzyl, Benzyl β-D-ribofuranosiduronic acid, Benzyl 2,3,4-tri-O-benzyl-β-D-glucopyranosiduronic acid, Cellobiouronic acid. Chondrosine, 1,2-O-Cyclohexylidene-α-D-glucurono-6,3-lactone, 2,3-Diacetamido-2,3-dideoxy-D-glucuronic acid, 2,3-Diacetamido-2,3-dideoxy-L-glucuronic acid, 2,3-Diamino-2,3-dideoxy-glucuronic acid; D-form, 2,3-Di-O-methyl-D-galacturonic acid, 2,4-Di-O-methyl-D-galacturonic acid, 3,4-Di-O-methyl-D-galacturonic acid, 2,3-Dioxopropanoic acid, Galacturonic acid; D-form, Galacturonic acid; α-D-pyranose-form, Galacturonic acid; α-D-pyranose-form, 1,2:3,4-Di-O-benzylidene, Galacturonic acid; α-D-pyranose-form, Galacturonic acid; α-D-furanose-form, Galacturonic acid; β-D-furanose-form, Me glycoside, Me ester, 2,3-di-Me, Galacturonic acid; β-D-furanose-form, Me glycoside, Me ester, 2,3,5-tri-Me, Glucuronamide; α-D-form, Me pyranoside, 3,4-di-Me, ΔGlucurono-6,3-lactone; D-form, Glucurono-6,3-lactone; D-form, 5-Benzyl, Glucurono-6,3-lactone; α-1,2,-O-Cyclohexylidene, 5-benzyl, Glucurono-6-3-lactone; α-D-furanose-form, Me glycoside, 5-benzyl, 2-Me, Glucurono-6,3-lactone; α-D-furanose-form, Me glycoside, 2,5-di-Me, Glucurono-6,3-lactone; α-D-furanose-form, Me glycoside, 5-benzyl, 2-Me, Glucurono-6,3-lactone; α-D-furanose-form; Me glycoside, 2,5-di-Me, Glucuronic acid; L-form, Guluronic acid; L-form, 3,6-Lactone, Hyalbiuronic acid, 3-C-Hydroxymethylriburonic acid; D-form, Iduronic acid; D-form, D-Idurono-1,4-lactone, L-Idurono-1,4-lactone, 1,2-O-Isopropylidenegluco-fururono-6,3-lactone; α-D-form, 1,2-O-Isopropylidene-α-D-glucuronamide, 1,2-O-Isopropylidene-L-idurono-1,4-lactone, Laetrile, Lyxuronic acid; D-form, Lyxuronic acid; L-form, Maltobiouronic acid, Mannuronic acid; D-form, Mannuronic acid; α-D-Pyranose-form, Me glycoside, 2,3,4-tri-Ac, Mannuronic acid; L-form, Methyl 4-amino-4-deoxy-α-D-glucopyranosiduronic acid, Methyl 4-amino-2,3,4-trideoxy-α-D-erythro-hex-2-enopyranosiduronic acid, Methyl(benzyl 2,3-O-benzyl-α-D-galactopyranosid)uronate, Methyl(benzyl β-D-glucopyranosid)uronate, Methyl(benzyl hexa-O-acetyl-β-maltobiopyranosid)uronate, Methyl(benzyl 2,3-O-isopropylidene-β-D-ribo-furanosid)uronate, Methyl(benzyl 2,3,4-tri-O-acetyl-β-D-gluco-pyranosid)uronate, Methyl (benzyl-2,3,4-tri-O-acetyl-β-D-glucopyranosid)-uronate, Methyl(benzyl 2,3,4-tri-O-benzyl-D-D-glucopyranosid)-uronate, Methyl, 2;:3,4-di-O-benzylidene-α-D-galactopyranosuronate. Methyl 1,2:3,4-di-O-isopropylidene-α-D-galacto-pyranosuronate, Methyl 2,5-di-O-methyl-α-D-glucopyranosiduronamide, Methyl 2,5-di-O-methyl-β-D-glucopyranosiduronamide, Methyl β-D-furanosidurono-6,3-lactone, Methyl α-D-galacto-pyranosiduronamide, Methyl galactopyranosiduronic acid; α-D-form, Methyl galactopyranosiduronic acid; α-D-form, 3,4-Di-Me, Methyl galactopyranosiduronic acid; α-D-form, Me ester, 2,3-dibenzyl, Methyl galactopyranosiduronic acid; α-D-form, Me ester, 2-Me, Methyl galactopyranosiduronic acid; α-D-form, Me ester, 3,4-di-Me, Methyl galactopyranosiduronic acid; α-D-form, Me ester, 2,3,4-tri-Me, Methyl galactopyranosiduronic acid; α-D-form, Me ester, 2,3-dibenzyl, Methyl galactopyranosiduronic acid; α-D-form, Methyl galactopyranosiduronic acid; β-D-form, 2,3,4-Tri-Me, Methyl galactopyranosiduronic acid; α-D-form, Me ester, 2,3-di-Me, Methyl galactopyranosuronate, Methyl galactosiduronamide; α-D-Pyranose-form, 3,4-O-Isopropylidene, 2-Ac, Methyl galactosiduronamide; α-D-Pyranose-form, 2-Me, Methyl galactosiduronamide; α-D-Pyranose-form, 3,4-Di-Me, Methyl galactosiduronamide; α-D-Pyranose-form, 2,3,4-Tri-Me, Methyl galactosiduronamide; α-D-Furanose-form, 2,3-Di-Me, Methyl α-D-glucofuranosidurono-6,3-lactane, Methyl β-D-glucopyranosiduron-amide, Methyl glucopyranosiduronic acid; α-D-form, Methyl glucopyranosiduronic acid; β-D-form, Methyl glucopyranosiduronic acid; β-D-form, 4-Ac, 2,3-di-Me, Methyl glucopyranosiduronic acid; β-D-form, Me ester, 4-Ac, 2,3-di-Me, 2-O-(4-O-Methyl-α-D-glucopyranuronosyl)-D-xylose, Methyl glucuronate; α-D-form, Methyl glucuronate; α-D-form, Me pyranoside, 4-Me, Methyl glucuronate; β-D-form, Me pyranoside, 2,3,4-tri-Ac, Methyl hepta-O-acetyl-maltobiuronate, Methyl 3,4-O-isopropylidene-α-D-galactopyranosiduron-amide, Methyl 1,2-O-isopropylidene-α-D-ribofuranuronate, Methyl 2,3-O-isopropylidene-β-D-ribofuranuronate, Methyl L-lyxuronate, Methyl mannofuranosidurono-6,3-lactone; α-D-form, Methyl mannofuranosidurono-6,3-lactone; β-D-form, Methyl α-D-manno-pyranosiduronamide, Methyl α-D-manno-pyranosiduronic acid, Methyl α-D-manno-pyranosidurono-6,3-lactone, Methyl(methyl 3-benzamido-2-O-benzoyl-3,4-dideoxy-α-D-xylo-hexopyranosid)uronate, Methyl( methyl 3-benzamido-2-O-benzoyl-3,4-dideoxy-β-D-xylo-hexopyranosid)uronate, Methyl(methyl 4-deoxy-α-L-threo-hex-4-enopyranosid)-uronate, Methyl (methyl 4-deoxy-β-L-threo-hex-4-enopyranosid)-uronate, Methyl(methyl α-D-galacto-pyranosid)uronate, Methyl (methyl β-D-galacto-pyranosid)uronate, Methyl 4-O-methyl-α-D-gluco-pyranosiduronamide, Methyl 4-O-methyl-β-D-gluco-pyranosiduronamide, Methyl(methyl 3,4-O-iso-propylidene-α-D-galacto-pyranosid)uronate, Methyl(methyl 3,4-O-iso-propylidene-β-D-galacto-pyranosid)uronate, Methyl(methyl α-D-manno-pyranosid) uronate, Methyl(methyl β-D-ribo-furanosid)uronate, Methyl (methyl 2,3,4-tri-O-acetyl-α-D-galacto-pyranosid)uronate, Methyl(methyl 2,3,4-tri-O-acetyl -β-D-gluco-pyranosid) uronate, Methyl(methyl 2,3,4-tri-O-benzoyl-α-D-galactopyranosid)uronate, Methyl(methyl 2,3,4-tri-O-methyl-α-D-gluco-pyranosid)uronate, Methyl(methyl 2,3,4-tri-O-methyl-oα-D-gluco-pyranosid)uronate, Methyl(methyl 2,3,4-tri-O-methyl-α-D-manno-pyranosid)uronate, Methyl (phenyl α-D-gluco-pyranosid)uronate, Methyl(phenyl 2,3,4-tri-O-acetyl-α-D-gluco-pyranosid)uronate, Methyl (phenyl 2,3,4-tri-O-acetyl-β-D-gluco-pyranosid)uronate, Methyl 1,2,3,4-tetra-O-acetyl-α-D-glucuronate, Methyl 1,2,3,4-tetra-O-acetyl-β-D-glucuronate, Methyl 2,3,5-tri-O-methyl-α-D-galactopyranosid uronamide, Methyl 2,3,4-tri-O-methyl-α-D-glucopyranosiduronamide, Methyl 2,3,4-tri-O-methyl-β-D-glucopyranosiduronamide, Methyl 2,3,4-tri-O-methyl-β-D-glucopyranosiduronin acid, Moenuronic acid; α-Pyranose-form, Me glycoside, Phenyl glucopyranosiduronic acid; α-D-form, Phenyl glucopyranosiduronic acid; β-D-form, Riburonic acid; D-form, Riburonic acid; α-D-furanose-form, 2,3-O-Isopropylidene, Riburonic acid; α-D-furanose-form, 2,3-O-Isopropylidene, 1,5-lactone, Riburonic acid; β-D-furanose-form, Benzyl glycoside, 2,3-O-Isopropylidene, Riburonic acid; β-D-furanose-form, Me glycoside, 2,3-O-Isopropylidene, Riburonic acid; β-D-furanose-form, Me glycoside, 2,3-O-Isopropylidene, Me ester, Riburonic acid; α-furanose-form, Me glycoside, 2,3-O-Isopropylidene, isopropyl ester, Riburonic acid; L-form, 1,2,5-Tri-O-acetyl-α-D-glucurono-6,3-lactone, 1,2,5-Tri-O-acetyl-α-D-glucurono-6,3-lactone, 2,3,4-Tri-O-methyl-D-galacturonic acid, Allaric acid; D-form, D-Allaric acid diamide, D-Allaric acid, Arabinaric acid; D-form, Arabinaric acid; L-form, Diamide, tri-Me, 2,4-O-Benzylidene-D-glucaric acid, 2,3-Di-O-acetyl-L-tartaric acid, 2,6-Diamino-2,4,5,6-tetra-deoxy-arabino-heptaric acid, 2,6-Diamino-2,4,5,6-tetra-deoxy-lyxo-heptaric acid, 2,6-Diamino-2,4,5,6-tetra-deoxy-ribo-heptaric acid, 2,6-Diamino-2,4,5,6-tetra-deoxy-xylo-heptaric acid, 2,3-Di-O-benzoyl-L-tartaric acid, 2,4:3,5-Di-O-benzylidene-D-idaric acid, Diethyl D-allarate, Diethyl galactarate, Diethyl L-tartrate, Diethyl meso-tartrate, Dihydroxybutenedioic acid, 2,3-Dihydroxy-2,3-dimethyl-butanedioic acid, 2,4-Dihydroxypentanedioic acid, 2,3-Dimethoxybutanedioic acid, Dimethyl 2,4:3,5-di-O-benzylidene-D-idarate, Dimethyl galactarate, Dimethyl D-glucarate, Dimethyl DL-tartrate, Dimethyl L-tartrate, Dimethyl meso-tartrate, 1,3-Dioxolane-4,5-dicarboxylic acid, Diphenyl L-tartrate, Fukiic acid, ΔGalactaric acid, Galactaric acid; 2,3,4,5-Tetra-Ac, Galactaric acid; 2,3,5-Tri-Me((±)-), Galactaric acid; Mono-Et ester ((±)-), Galactaric acid; Di-Me ester, 2,3,4,5-tetra-Ac, Galactaric acid; Di-Et ester, di-O-isopropylidene, Galactaric acid; Di-Et ester, 2,3,4,5-tetra-Ac, Galactaric acid; Di-Et ester, 2,3:4,5-di-O-methylene, Galactaric acid; Di-Et ester, 2,5:3,4-di-O-methylene, Galactaric acid; Diamide, Galactaric acid; Diamide, 1N, 2,3,5,6N-penta-Me ((±)-), Galactaric acid; Diamide, 2,3,4,5-tetra-Ac, Galactaric acid; Diamide, 2,3,4-tri-Me ((±)-), Galactaric acid; 1,4-Lactone, Et ester ((±)-), Glucaric acid; D-form, Di-Me ester, 5-Ac, Glucaric acid; D-form, Di-Me ester, 2,3,:4,5-di-O-benzylidene, Glucaric acid; D-form, Di-Me ester, 3,4-O-isopropylidene, Glucaric acid; D-form, Di-Me ester, 3,4-O-isopropylidene, 2,5-di-Me, Glucaric acid; D-form, Di-Me ester, 3,5-di-Ac, Glucaric acid; D-form, Di-Me ester, 2,3,4,5-tetra-Me, Glucaric acid; D-form, Di-Me ester, 3,4-O-benzylidene, 2,5-di-Me, Glucaric acid; D-form, 6-Amide, 1-Me ester, 2,4-O-benzylidene, Glucaric acid; D-form, Diamide, Glucaric acid; D-form, Diamide, 2,4-O-benzylidene, Glucaric acid; D-form, Diamide, 3,4-O-isopropylidene, Glucaric acid; D-form, Diamide, 3,4-O-isopropylidene, 2,5-di-Me, 1,4:6,3-Glucarodilactone; D-form, 1,4:6,3-Glucarodilactone; D-form, 2,5-Di-Me, 1,5:6,3-Glucarodilactone; D-form, Glucarodilactone; 1,4-Lactone, D-form, 6-Me ester, 2,3,5-tri-Me, Glucarodilactone; 1,5-Lactone, D-form, 2,3,4-Tri-Me, Glucarodilactone; 1,5-Lactone, D-form, 6-Benzyl ester, 2,3,4-tribenzyl, Glucarodilactone; 1,5-Lactone, D-form, 6-Me-ester, 2,3,4-tri-Me, Glucarodilactone; 6,3-Lactone, D-form, 1-Et ester, 2,4-O-benzylidene, Glucarodilactone; 6,3-Lactone, D-form, -Et ester, 2,4-O-benzylidene, 5-Ac, Glucarodilactone; 6,3-Lactone, D-form, 1-Et ester, 2,4-O-benzylidene, 5-benzoyl, Glucarodilactone; 6,3-Lactone, D-form, 1-Et ester, 2,4-O-methylene, Glucarodilactone; 6,3-Lactone, D-form, 1-Me ester, 2,4-O-benzylidene, Glucarodilactone; 6,3-Lactone, D-form, 1-Me ester, 2,4-O-benzylidene, 5-Ac, Glucarodilactone; 6,3-Lactone, D-form, 1-Me ester, 2,4-O-methylene, Glucarodilactone; 6,3-Lactone, D-form, 1-Amide, 2,4-O-benzylidene, D-Glucaro-1,4-lactone, D-Glucaro-1,5-lactone, D-Glucaro-6,3-lactone, L-Gularic acid, A Hydroxybutanediol acid, Idaric acid; D-form, Mannaric acid; D-form, Mannaric acid; D-form, 1,4-Lactone, phenylhydrazide, D-Mannaric acid diamide, L-Mannaric acid diamide, D-Mannaro-1,4:6,3-bislactone, L-Mannaro-1,4:6,3-bislactone, Piscidic acid, Ribaric acid, Ribaric acid; 1,4-lactone, Ribarci acid; Diamide, 1,5-di-N-Me 1,2,3,4-tri-Me, ΔSuccinic acid, Talaric acid: L-form, D-Talaro-1,4-lactone, D-Talaro-6,3-lactone, Tartaric acid; (2R,3R)-form, Diamide, ΔD-Tartaric acid, meso-Tartaric acid, Tetrahydro-α-3,5-trimethyl-6-oxo-2H-pyran-2-acetic acid, D-Threatic acid, ΔL-Threatic acid, Xylaric acid, Xylaric acid; Di-Me ester, tri-Ac, Xylaric acid: Anhydride, tri-Ac. Xylaric acid; Diamide, tri-Me, N-Acetylneuramine acid, 6-O-(N-Acetyl-α-D-neuraminyl)-D-galactose, Araboascorbic acid; L-form, Araboascorbic acid; L-form, 3-Me, Ascorbalamic acid, Ascorbic acid; D-form, Ascorbic acid; L-form, Ascorbic acid 2-phosphate; L-form, 5,6-O-Cyclohexylidene-L-threo-hex-2-enono-1,4-lactone, Dehydroascorbic, 3-Deoxy-D-arabinoheptulosonic acid 7-phosphate, 3-Deoxy-D-manno-oct-2-ulosonic acid, 3-Deoxy-D-manno-oct-2-ulosonic acid; α-pyranose-form, 4,5,7,8-Tetra-Ac, 2,3:4,6-Di-O- isopropylidene-β-L-xylo-2-hex Ulosonic acid, Glucoascorbic acid; D-form, Glucoascorbic acid; D-form, 3-Me, Glucoascorbic acid; D-form, 2,3-Di-Me, arabino-2-Hexulosonic acid, xylo-5-Hexulosonic acid; D-form, Isoascorbic acid, 5,6-O-isopropylidene-L-threo-hex-2-enono-1,4-lactone, Methyl 3-deoxy-D-manno-oct-2-ulono-1,4-lactone, Methyl 3-deoxy-α-D-manno-oct-2-ulopyranosidonic acid, Methyl 3-deoxy-β-D-manno-oct-2-ulopyranosidonic acid, Methyl 3-deoxy-2,4,5,7,8-penta-O-acetyl-D-manno-oct-2-ulopyranosonate, Methyl(methyl 3-deoxy-4,6,7,-8-tetra-O-benzoyl-α-D-manno-oct-2-ulpyranosidonate), Methyl 2,3,4,6-tetra-O-acetyl-D-hex-5-ulosonate, Neuraminic acid, Neuraminic acid, N-Benzoyl, Neuraminic acid, N-Benzyloxy-carbonyl, 2,3,5,7-Penta-O-methyl-D-arabino-hept-2-enono-1,4-lactone, Sialic acid, ΔVitamin C, 4,7-Anhydro-5,6,8-O-tri-benzyl-2,3-dideoxy-2,2,3,3-tetrahydro-D-allo-octonic acid methyl ester, 4,7-Anhydro-5,6,8-O-tri-benzyl-2,3-dideoxy-2,2,3,3-tetrahydro-D-altro-octonic acid methyl ester, Ascorbalamic acid, 3-Deoxy-D-arabinoheptulosonic acid 7-phosphate, 3-Deoxy-D-manno-oct-2-ulosonic acid, 3-Deoxy-D-manno-oct-2-ulosonic acid; α-Pyranose-form, 4,5,7,8-Tetra-Ac, Glucoascorbic acid; D-form, Glucoascorbic acid; D-form, 3-Me, Glucoascorbic acid; D-form, 2,3-Di-Me, D-Glycero-D-ido-heptono-1,4-lactone, N-Glycolylneuraminic acid, 2,3,4,5,6,7,8-Hepta-O-acetyl-D-erythro-L-manno-octonic acid, 2,3,4,5,6,7,8-Hepta-O-acetyl-D-erythro-L-gluco-octonic acid, D-glycero-D-galacto-Hepton-amide, D-glycero-L-manno-Hepton-amide, D-glycero-D-ido-Heptonic acid, D-glycero-D-galacto-Heptonic acid, D-glycero-D-gulo-Heptonic-amide, D-glycero-D-gulo-Heptonic-amide, 1,4-Lactone, 2,3,5,6,7-penta-Me, D-glycero-D-talo-Heptonic acid, D-glycero-L-manno-Heptonic acid, D-glycero-D-galacto-Heptono-1,4-lactone, D-glycero-D-gulo-Heptono-1,4-lactone, D-glycero-D-talo-Heptono-1,4-lactone, D-glycero-L-manno-Heptono-1,4-lactone, Methyl 3,6-anhydro-2-deoxy-4,5,7,8-di-O-isopropylidene-D-glycero-D-talo-octonate, Methyl 3,6-anhydro-2-deoxy-4,5:7,8-d i-O-isopropylidene-D-glycero-D-galacto-octonate. Methyl 3-deoxy-D-manno-oct-2-ulono-1,4-lactone, Methyl 3-deoxy-α-D-manno-oct-2-ulopyranosidonic acid, Methyl 3-deoxy-β-D-manno-oct-2-ulopyranosidonic acid, Methyl 3-deoxy-2,4,5,7-penta-O-acetyl-D-manno-oct-2-ulopyranosonate, Methyl 2,3,4,5,7,8-penta-O-acetyl-D-manno-oct-2-ulopyranosonate, Methyl 2,3,5,6,7,8-hepta-O-acetyl-D-erythro-L-gluco-octonate, Methyl(methyl-4,6,7,8-tetra-O-benzoyl-β-D-manno-oct-2-ulopyranosidonate), Neuraminic acid, Neuraminic acid; N-Benzoyl, Neuraminic acid; N-Benzyl-oxycarbonyl, D-erythro-L-manno-Octonic acid, D-erythro-L-gluco-Octonic acid, 2,3,5,6,7-Penta-O-methyl-D-arabino-hept-2-enono-1,4-lactone, Acetylmuramic acid, Benzyl 2-acetamido-4,6-O-benzylidene-3-O-(1-carboxy-ethyl)-2-deoxy-α-D-gluco-pyranoside, Benzyl 2-acetamido-3-O-(1-carboxyethyl)-2-deoxy-α-D-glucopyranoside, 3-Deoxy-2-C-hydroxymethyl-D-erythropento-1,4-lactone, 3-Deoxy-2-C-hydroxymethyl-D-erythro-pentonic acid, 3-Deoxy-2-C-hydroxymethyl-2,2',4,5-tetra-O-acetyl-D-erythro-pentonic acid, Methyl 2-acetamido-4,6-O-benzylidene-3-O-(1-carboxyethyl)-2-deoxy-α-D-glycopyranoside, 2-C-Methyl-1,4-erythro-nolactone; D-form, Muramic acid, Quinic acid, Δ3-Benzyloxy-1,2-propanediol, Cytidine diphosphate glycerol, Δ1,3-Dioxolane-4-methanol, Erythroflavin, 1-O-β-D-Galactofuranosyl-D-glycerol, O-α-D-Galactopyranosyl-(1→2)-O-α-D-glucopyranosyl-(1→1)-D-glycerol, 2-O-α-D-Galactopyranosyl-glycerol, ΔGlycerol, ΔGlycerol 1-acetate, Glycerol 2-acetate, Glycerol 1,2-dihexadecanoate-3-phosphoinositol, Glycerol 1,2-di-9,12-oct-adecadienoate 3-phosphoinositol, Glycerol1,2-di-9,12-oct-adecadienoate 3-phosphoserine, Glycerol 1-dodecanoate 2-2-octadecadienoate 3-phosphoinositol, Glycerol 1-hexadecanoate 2-2-octadecadienoate 3-phosphoinositol, Glycerol 1-monophosphate, Glycerol 2-monophosphate, Glycerol 1-9,12-octadecadienoate 3-phosphoinositol, Glycerol 1-octadecanoate 2,9-octadecenoate 3-phosphoinositol, ΔGlycerol triacetate, ΔGlycerol trinitrate, Glycosyldiacylglycerols, 1,2-O-Isopropylideneglycerol; (R)-form, 1,2-O-Isopropylideneglycerol; (S)-form, 1,2-O-Isopropylideneglycerol; (±)-form, D-1,2-O-Isopropylidene-tritylglycerol; 2-Methyl-1,2,3-butanetriol, 2-Methyl-1,3-dioxolane-4-methanol, Δ3-(2-Methylphenoxy)-1,2-propanediol, Militarine, Parishin, 1,2,3-Pentanetriol, 1,2,5-Pentanetriol, 1,3,4-Pentanetriol, 1,3,5-Pentanetriol, 2,3,4-Pentanetriol, 7-Phenyl-4,6-heptadiyne-1,2,3-triol, 1-Phenyl-1,2,3-propanetriol, 1,3,2,4-Di-O-benzylidene-erythritol, 1,2,3,4-Di-O-benzylidene-DL-erythritol, 1,2:3,4-Di-O-benzylidene-L-erythritol, ΔErythritol, 1,2,3,4-Hexanetetrol, 1,2,5,6-Hexanetetrol, 1,3,4,6-Hexanetetrol, 2,3,4,5-Hexanetetrol, 2,3-O-Isopropylidene-D-threitol, 2,3-O-Isopropylidene-L-threitol, 2-C-Methylerythritol; D-form, Montagnetol, Putidolumazine, 1,2,3,4-Tetra-O-acetyl-erythritol, 1,2,3,4-Tetra-O-benzoyl-erythritol, Threitol; (2R,3R), Threitol; (2S,3S), Threitol; (±)-form, Arabinitol; D-form, Arabinitol; L-form, Araboflavin; D-form, Araboflavin; L-form, Araboflavin; DL-form, 1,3-O-Benzylidene-D-arabinitol, 3,5-O-Benzylidene-L-arabinitol, 10-Deazariboflavin, 2,3:4,5-Di-O-benzylidene-D-arabinitol, 2,3:4,5-Di-O-isopropylidene-D-arabinitol, 2,3:4,5-Di-O-isopropylidene-L-arabinitol, Kelletinin II, Lyxoflavin; D-form, Lyxoflavin; L-form, 1,2,3,4,5-Penta-O-acetyl-D-arabinitol, 1,2,3,4,5-Penta-O-acetyl-L-arabinitol, ΔRibitol, Ribitol; 2,4-O-Benzylidene Ribitol; 2,3:4,5-Di-O-benzylidene, Ribitol; 2,3,4-Tribenzoyl, 10 1,5-diphosphate, Ribitol; 2,3,4-Tribenzyl, 1,5-ditrityl, ΔRiboflavin, 2,3,4-Tri-O-benzoyl-1,5-di-O-tosyl-L-arabinitol, Umbilicin, ΔXylitol, Xylitol; 1,2:3,4-Di-O-isopropylidene, Xylitol; Penta-Ac, Xylitol; Pentabenzoyl, Δ-Acritol, Allitol, Allitol; 2,4:3,5-Di-O-methylene, Allitol; 2,4:3,5-Di-O-methylene, 1,6-ditosyl, Allitol; 1,2,3,4,6-Penta-Me, Allitol; 1,2,4,6-Penta-Me, 1-Amino-1-deoxyglucitol; D-form, 2-Amino-2-deoxyglucitol; D-form, B, HCl, 1-Amino-1-deoxymannitol; D-form, 1-Amino-1-deoxyribitol; D-form, 1-Amino-1-deoxyribitol; L-form, 1,4-Anhydro-DL-allitol, 1,5-Anhydro-D-allitol, 1,4-Anhydro-2,3:5,6-di-O-isopropylidene-D-mannitol, 1,5-Anhydro-2,3:4,5-di-O-isopropylidene-D-mannitol, 1,5-Anhydrogalactitol; D-form, 1,4-Anhydroglucitol; D-form, 1,5-Anhydroglucitol; D-form, 1,5-Anhydroglucitol; D-form, 2,3,4-Tri-Ac, 1,5-Anhydroglucitol; D-form, Tetra-Ac, 1,4-Anhydromannitol; D-form, 1,4-Anhydromannitol; D-form, 2,3-O-Isopropylidene, 6-tosyl, 2,5-Anhydrotalitol; D-form, 1-O-Benzoyl-2,3:4,5-di-O-isopropylidene-D-allitol, 1-O-Benzoyl-L-glucitol, 3-O-Benzyl-D-allitol, 1,3-O-Benzylidenearabinitol; D-form, 4,6-O-Benzylidene-D-glucitol, 1,3-O-Butylidene-L-glucitol, 6-Deoxy-2,4:3,5-di-O-methylene-D-glucitol, 6-Deoxy-2,4:3,5-di-O-methylene-L-glucitol, 1-Deoxy-D-gulitol, 1-Dexoy-L-gulitol, 6-Deoxy-2,4-O-methylene-D-glucitol, 6-Deoxy-2,4-O-methylene-L-glucitol, 6-Deoxy-D-talitol, 6-Deoxy-L-talitol, 2,5-Di-O-acetyl-1,4:3,6-dianhydro-D-iditol, 2,5-Di-O-acetyl-1,4:3,6-dianhydro-L-iditol, 1,2-Diamino-1,2-dideoxyglucitol; D-form, 1,4-Diamino-1,4-dideoxyglucitol; D-form, 1,2-Diamino-1,2-dideoxymannitol; D-form, 1,4:3,6-Dianhydro-2,5-di-O-benzoyl-D-iditol, 1,4:3,6-

Dianhydro-2,5-di-O-benzoyl-L-iditol, 1,4:3,6-Dianhydro-2,5-di-O-mesyl-D-iditol, 1,4:3,6-Dianhydro-2,5-di-O-mesyl-L-iditol, 1,4:3,6-Dianhydro-2,5-di-O-tosyl-D-iditol, 1,4:3,6-Dianhydro-2,5-di-O-tosyl-L-iditol, Δ1,4:3,6-Dianhydroglucitol; D-form, 1,4:3,6-Dianhydroglucitol; D-form, 2-Ac, 5-tosyl, 1,4:3,6-Dianhydroglucitol; D-form, 5-Ac, 2-tosyl, 1,4:3,6-Dianhydroglucitol; D-form, 2,5-Ditosyl, 1,4:3,6-Dianhydroglucitol; D-form, 2,5-Dibenzyl, 1,4:3,6-Dianhydroiditol; L-form, 1,4:3,6-Dianhydromannitol; D-form, 1,4:3,6-Dianhydromannitol; D-form, 2,5-Di-Ac, 1,4:3,6-Dianhydromannitol; D-form, 2,5-Dibenzoyl, 1,4:3,6-Dianhydromannitol; D-form, 2,5-Ditosyl, Deoxystreptamine, 4,6-Diamino-1,2,3,5-cyclohexanetetrol, ΔDibekacin, 3,4-Dicaffeoylquinic acid, 3,5-Dicaffeoylquinic acid, 4,5-Dicaffeoylquinic acid, 1,2:3,4-Di-O-cyclohexylidene-cis-inositol, 1,2:3,4-Di-O-cyclohexylidene-epi-inositol, 1,2:5,6-Di-O-cyclohexylidene-myo-inositol, 2,3:5,6-Di-O-isopropylidene-1,4-di-O-methyl-D-chiro-inositol, 1,2:4,5-Di-O-isopropylidene-muco-inositol, 1,2:4,S-Di-O-isopropylidene-myo-inositol, 1,2:4,5-Di-O-isopropylidene-L-chiro-inositol, Galactinol, Gentamine $C_{1a}$, Glycerol 1,2-dihexadecanoate 3-phosphoinositol, Glycerol 1,2-di-9,12-octadecadienoate 3-phosphoinositol, Glycerol 1,2-di-9,12-octadecadienoate 3-phophoserine, Glycerol 1-dodecanoate 2-2-octadecenoate 3-phosphoinositol, Glycerol-1-hexadecanoate 2-2-octadecenoate 3-phosphoinositol, Glycerol 1,9,12-octadecadienoate 2,9-octadecenoate 3-phosphoinositol, Glycerol 1-octadecanoate 2,9-octadecenoate 3-phosphinositol, 1,2,3,4,5,6-Hexa-O-acetyl-epi-inositol, 1,2,3,4,5,6-Hexa-O-acetyl-muco-inositol, 1,2,3,4,5,6-Hexa-O-acetyl-neo-inositol, 1,2,3,4,5,6-Hexa-O-acetyl-scyllo-inositol, 1,2,3,4,5,6-Hexa-O-benzoyl-cis-inositol, 1,2,3,4,5,6-Hexa-O-benzoyl-myo-inositol, Homoquinic acid; 1,3,4.5-tetra-Ac, Homoquinic acid; Nitrile, 2-Hydroxybutirosin, 4-Hydroxymethyl-1,2,3-hexanetriol, allo-Inositol, cis-Inositol, d-Inositol, epi-Inositol, 1-Inositol, muco-Inositol, muco-Inositol, 1-Me, myo-Inositol, myo-Inositol, 1-phosphate, myo-Inositol, 1,4-Di-phosphate, neo-Inositol, scyllo-Inositol, D-Inosose, epi-Inosose-2; (+)-form, epi-Inosose-2; (−)-form, myo-Inosose-1; (−)-form, myo-Inosose-2, myo-Inosose-2; Penta-Ac, myo-Inosose-2; Pentabenzoyl, Kanamine, Kasaganobiosamine, (−)-Laminitol, (−)-Leucanthemitol, D-(−)-Liriodendritol, Mannimositose, 2-O-α-D-Mannopyranosyl-myo-inositol, Melibiitol, N-Methyl-2-deoxystreptamine, 1-O-Methyl-D-chiro-inositol, 1-O-Methyl-L-chiro-inositol, 1-O-Methyl-D-myo-inositol; D-form, 1-O-Methyl-D-chiro-inositol; L-form, 2-O-Methyl-D-myo-inositol, 4-O-Methyl-D-myo-inositol; D-form, 5-O-Methyl-D-myo-inositol, Mytilitol, ΔNarciclasine, Neosurugatoxin, Penta-O-acetyl-(+)-epi-inosose, Penta-O-acetyl-1-O-methyl-D-myo-inosose, Penta-O-acetyl-1-O-methyl-L-myo-inosose, 1,2,3,4,6-Penta-O-acetyl-5-O-methyl-myo-inositol, 1,2,3,5,6-Penta-O-acetyl-4-O-methyl-myo-inositol, 1,2,4,5,6-Penta-O-acetyl-2-O-methyl-myo-inositol, Penta-O-benzoyl-(+)-epi-inosose, Penta-O-benzoyl-(−)-epi-inosose, ΔPhytic acid, D-Pinitol, L-Pinitol, Pinpollitol, Quebrachitol; L-form, Quebrachitol; L-form, 5,6-O-Isopropylidene, Quebrachitol; L-form, 3,4:5,6-Di-O-isopropylidene, L-Quebrachitol, proto-Quercitol; (+)-form, Pentabenzoyl, proto-Quercitol; (+)-form, 3,4-O-Isopropylidene, scyllo-Quercitol; Penta-Ac, scyllo-Quercitol; 3-Me, vibo-Quercitol; L-form, vibo-Quercitol; L-form, Penta-Ac, vibo-Quercitol; L-form, Pentabenzoyl, vibo-Quercitol; L-form, 2-Me, Saccharocin, Streptamine, 2,4,5,6-Tetra-O-acetyl-dambonitol, 1,2,5,6-Tetra-O-acetyl-myo-inositol, 1,2:3,4:5,6-Tri-O-cyclo-hexylidene-epi-inositol, 1,2:3,4:5,6-Tri-O-iso-propylidene-allo-inositol, 1,2:3,4:5,6-Tri-O-iso-propylidene-L-chiro-inositol, Wilfordine, Bis(methyl-4,6-O-benzylidene-[2,3-b][2'3'-k]-1,4,7,10,-13,16-hexaoxacyclo-octadecane, Bis(methyl-4,6-O-benzylidene-[2,3-b][3'2'-k]-1,4,7,10,-13,16-hexaoxacyclo-octadecane, 3,6-Dideoxy-D-ribo-hexitol, 3,6-Dideoxy-D-xylo-hexitol, Δ1-O-α-D-Mannopyranosyl-L-erythritol, Tannin, 2-Acetamido-2-deoxy-α-D-glucose 1-(dihydrogen phosphate), 2-Acetamido-2-deoxy-β-D-glucose 1-(dihydrogen phosphate), ΔAdenosine diphosphate, Adenosine 2',5'-diphosphate, Adenosine 3',5'-diphosphate, Adenosine diphosphate ribose, Adenosine 5'-diphospho-glucose, ΔAdenosine triphosphate, Adenosine 5'-uridine 5'-phosphate, ΔAdenylic acid, 2'-Adenylic acid, 3'-Adenylic acid, Adenylosuccinic acid, εADP, Agrocin 84, 2-Amino-2-deoxyglucitol; D-form, 3-phosphate, 2-Amino-2-deoxyglucopyranosyl phosphate; α-D-form, 2-Amino-2-deoxyglucose 1-(dihydrogen phosphate); D-form, 2-Amino-2-deoxyglucose 3-(dihydrogen phosphate); D-form, 2-Amino-2-deoxyglucose 6-(dihydrogen phosphate); D-form, N-(5-Amino-1-β-D-ribo-furanosylimidazole-4-carbonyl)-L-aspartic acid 5'-phosphate, 5-Amino-1-ribofuranosyl-1H-imidazole-4-carboxamide; β-D-form, 5'-Phosphate, 5-Amino-1-ribofuranosyl-imidazole-4-carboxamide, 5'-(dihydrogen phosphate); β-D-form, 3'-&, 5'-RAMP, Anthranilic deoxyribulotide, 1-Arabinofuranosyluracil; β-D-form, 5'-Phosphate, Ascorbic acid 2-phosphate; L-form, εATP, 8-Azaguanosine; 5'-Phosphate, 6-Azathymidine; 3'-Phosphate, 6-Azathymidine; 5'-Phosphate, 6-Azathymidine; 3',5'-Phosphate, 6-Azauridine 5'-phosphate, Benzyl 2-amino-4,6-O-benzylidene-2-deoxy-α-D-glucopyranoside-3-(dihydrogen phosphate), Coenzyme A, ΔCoenzyme 1, Coenzyme II, ΔCyclic AMP, Cyclic GMP, Cytidine 2'-(dihydrogen phosphate), Cytidine 3'-(dihydrogen phosphate), ΔCytidine 5'-(dihydrogen phosphate) Cytidine diphosphate ethanolamine, Cytidine diphosphate glycerol, Cytidine 2',3'-phosphate, 2'-Deoxyadenosine; 3'-Phosphate, 2'-Deoxyadenosine; 5'-Phosphate, 2'-Deoxycytidine; 3'-Phosphate, 2'-Deoxycytidine; 5'-Phosphate, 6-Deoxy-6-fluoro-α-D-galactopyranose 1-(dihydrogen phosphate), 2'-Deoxyribofuranosylguanine; β-D-form, 5'-Phosphate, $P^1,P^4$-Diguanosine 5 5'-tetraphosphate, 1,2:3,4-Di-O-isopropylidene-α-D-galactopyranose 6-dihydrogen phosphate, N-Dimethyladenosine; 5'-Phosphate, Fructose 1,6-bis(dihydrogen phosphate); D-form, Fructose 1-dihydrogen phosphate; D-form, Fructose 2-dihydrogen phosphate, Fructose 6-dihydrogen phosphate; D-form, FUDRP, Galactose 1-dihydrogen phosphate; α-D-Pyranose-form, Galactose 1-dihydrogen phosphate; β-D-Pyranose-form, Galactose 3-dihydrogen phosphate; D-form, Galactose 3-dihydrogen phosphate; D-form, Isopropylidene, 4,6-O-ethylene, Galactose 6-dihydrogen phosphate; D-form, Glucose 1-dihydrogen phosphate; α-D-Pyranose-form, Glucose 1-dihydrogen phosphate; α-L-Pyranose-form, Glucose 2-dihydrogen phosphate; D-form, Glucose 3-dihydrogen phosphate; D-form, Glucose 4-dihydrogen phosphate; D-form, Glycerol 1,2-di-9,12-octadecadienoate 3-phosphoinositol, Glycerol 1,2-di-9,12-octadecadienoate 3-phosphoserine, Glycerol 1-dodecanote 2-2-octadecanoate 3-phosphoinositol, Glycerol 1-hexadecanoate 2-2-octadecenoate 3-phosphoinositol, Glycerol 1-monophosphate, Glycerol 2-monophosphate, Glycerol 1-9,12-octadecadienoate 2,9-octadecenoate 3-phosphoserine, ;Glycerol 1-octadecanoate 2,9-octadecanoate 3-phosphoinositol, Guanosine 5'-diphosphate, Guanosine diphosphate mannose, ΔGuanosine 5'-triphosphate, 3'-Guanylic acid, Δ5'-Guanylic acid, L-glycero-D-manno-heptose; 1-Phosphate, dicyclohexylammonium salt, altro-2-Heptulose; D-form, 7-Phosphate, xylo-Hexos-5-ulose; α-D-Furanose-form, 1,2-O-Isopropylidene, di-Me acetal, 6-phosphate, bis(cyclohexylammonium) salt, myo-Inositol; 1-Phosphate myo-Inositol; 1,4-Di-phosphate, Mannose; β-D-Pyranose-form, 2,3,4,6-Tetra-Ac, 1-(dihydrogen phosphate), 2-Methyladenosine; 5'-Phosphate, 2-Methylthioadenosine; 5'-di-hydrogen phosphate, Orotidine 5'-(dihydrogen phosphate), Phosphoramidon, ΔPhytic acid, Ribitol; 2,3,4-Tribenzyl, 1,5-diphosphate, 2-Ribofuranosyluric acid; β-D-form, 5'-Phosphate, Robison ester, ΔSpongoadenosine, Tagatose; D-form, Tagatose; α-D-furanose-form, 1,2:3,4-Di-O-isopropylidene, 6-phosphate, Talopeptin, 5-Thioglucose; α-D-Pyranose-form, Me glycoside, 6-phosphate, 4-Thiourine; 5'-Diphosphate, 4-Thiourine; 5'-Triphosphate, Thuringiensin, Thymidine, 5'-Phosphate. Thymidine 5'-pyrophosphate, Trehalose 6-(dihydrogen phosphate). 1,3,4-Trihydroxy-2-butanone; (R)-form, Dimethyl ketal 1-phosphate, Uridine diphosphate glucose, ΔUridine 5'-(tetrahydrogen triphosphate), Uridine 5'-(trihydrogen diphosphate), 5'-Uridylic acid, Xylose 1-dihydrogen phosphate; α-D-Pyranose-form, Xylose 1-dihydrogen phosphate; α-D-Pyranose-form, Xylose 3-dihydrogen phosphate; D-form, Xylose 5-dihydrogen phosphate; D-form, Acaciabiuronic acid, 2-Acetamido-3-O-(2-acetamido-2,3-dideoxy-5,6-O-iso-propylidene-α-D-erythro-hex-2-enofuranosyl)-1,4-anhydro-2-deoxy-5,6-iso-propylidene-D-arabino-hex-1-enitol, 2-Acetamido-3-O-(2-acetamido-2,3-dideoxy-5,6-O-iso-propylidene-β-D-erythro-hex-2-enofuranosyl)-1,4-anhydro-2-deoxy-5,6-iso-propylidene-D-arabino-hex-1-enitol, 1,4:3,6-Dianhydromannitol; D-form, 2,5-Ditrityl, 1,3:2,4-Di-O-benzylidene-D-glucitol, 2,3:4,5-Di-O-benzylidene-D-glucitol, Δ1,6-Dibromo-1,6-dideoxy-galactitol, 1,6-Dibromo-1,6-dideoxy-3,4-O-isopropylidene-D-mannitol, Δ1,6-Dibromo-1,6-dideoxy-mannitol; D-form, 1,6-Dibromo-1,6-dideoxy-mannitol; D-form, 3,4-O-Isopropylidene, 2,5-di-Ac, 1,2:3,4-Di-O-ethylidene-D-glucitol, 1,6-Di-O-β-D-glucopyranosyl-D-mannitol, 2,3:4,5-Di-O-isopropylidene-L-fucitol, 2,3:4,5-Di-O-isopropylidene-L-rhamnitol, 2,3:4,5-Di-O-isopropylidene-D-talitol, 2,3:4,5-Di-O-isopropylidene-5-O-tosyl-L-rhamnitol, 2,3:4,5-Di-O-methylene-D-mannitol, 1,3:4,5-Di-O-methylene-D-talitol, 2,3:4,5-Di-O-methylene-D-talitol, 1,6-Di-O-trityl-D-mannitol, 4,6-O-Ethylidene-D-glucitol, Galactitol, Galactitol; Hexa-Ac, Galactitol; 1,6-Dibenzoyl, Galactitol; Hexabenzoyl, 3-O-α-D-Galactofuranosyl-D-mannitol, Glucitol; DL-form, 1-β-D-Glucopyranosyl-D-mannitol; α-form, 1-β-D-Glucopyranosyl-D-mannitol; β-form, 3-O-β-D-Glucopyranosyl-D-mannitol; 1,2,3,4,5,6-Hexa-O-acetyl-D-glucitol, 1,2,3,4,5,6-Hexa-O-acetyl-D-iditol, 1,2,3,4,5,6-Hexa-O-acetyl-L-iditol, 1,2,3,4,5,6-Hexa-O-acetyl-D-mannitol, 1,2,3,4,5,6-Hexa-O-acetyl-D-talitol, 1,2,3,4,5,6-Hexa-O-benzoyl-D-glucitol, 1,2,3,4,5,6-Hexa-O-benzoyl-L-iditol, 1,2,3,4,5,6-Hexa-O-benzoyl-D-mannitol, 6-(1H-Indol-3-yl)-8-(2,3,4,5-tetrahydroxypentyl)-2,4,7-(1H,3H,8H)-pteridinetrione, 3,4-O-Isopropylidene-L-iditol, 3,4-O-Isopropylidene-L-rhamnitol, ΔMannitol; D-form, Mannitol; L-form, A Mannomustine, 1,2,3,4,5-Penta-O-acetyl-6-deoxy-D-glucitol, 1,2,3,4,5-Penta-O-acetyl-6-deoxy-L-glucitol, 1,2,3,4,5-Penta-O-acetyl-L-fucitol, 1,2,3,4,5-Penta-O-acetyl-L-fucitol, Rhamnitol; D-form, Rhamnitol; L-form, Rhamnitol; DL-form, Rhiodeitol, Sorbierite, Sorbieritol, AD-Sorbitol, L-Sorbitol, Styracitol, Talitol; D-form, Talitol; L-form, Talitol; DL-form, Talitol; DL-form, Hexa-Ac, 2,3,4,5-Tetra-O-acetyl-1,6-di-O-tosyl-D-mannitol, 2,3,4,5-Tetra-O-benzoyl-1,6-di-O-tosyl-D-mannitol, 2,4,5-Tri-O-acetyl-1,3-O-benzylidene-D-arabinitol, 1,3:2,4:5,6-Tri-O-benzylidene-D-glucitol, 1,2:3,4:5,6-Tri-O-iso-propylidene-D-glucitol, 1,2:3,4:5,6-Tri-O-iso-propylidene-L-iditol, 1,3:2,4:5,6-Tri-O-methylene-D-talitol, Valolaginic acid, Vescalagin, 3,7-Anhydro-1,2-dideoxy-D-glycero-L-manno-1-octenitol; 5,6,8-Tribenzyl, 7-Deoxy-D-glycero-D-manno-heptitol, 7-Deoxy-D-glycero-D-manno-heptitol, Tri-O-benzylidene, glycero-gulo-Heptitol, glycero-gulo-Heptitol, Hepta-Ac, glycero-gulo-Heptitol, 1,2:4,5:6,7-Tri-O-iso-propylidene, D-glycero-D-manno-Heptitol, D-glycero-D-manno-Tri-O-benzylidene, D-glycero-D-manno-Heptitol; Hepta-Ac, D-glycero-D-galacto-Heptitol, D-glycero-D-galacto-Heptitol, 1,2:4,5:6,7-Tri-O-iso-propylidene, D-glycero-D-galacto-Heptitol, Hepta-Ac, D-glycero-D-gluco-Heptitol, D-glycero-L-gulo-Heptitol, D-glycero-L-gulo-Heptitol, heptabenzoyl, D-glycero-L-talo-Heptitol, D-glycero-L-galacto-Heptitol, D-glycero-L-galacto-Heptitol, Hepta-Ac, D-arabino-L-galacto-Nonitol, D-arabino-L-galacto-Nonitol, Nona-Ac, D-erythro-D-galacto-Octitol, D-erythro-D-galacto-Octitol, Octabenzoyl, Actinamine, ΔAmikacin, 4-O-(6-Amino-6-deoxygluco-pyranosyl)-2,5-dideoxy-streptamine, 1-Amino-4',5'-dideoxy-butirosin A, 1-Amino-6-hydroxymethyl-1,2,3-cyclohexanetriol, 5"-Amino-3',4,5"-trideoxy-butirosin A, Amylostatin, Aphloiol, Bluensidene, Butikacin, ΔButirosamine, ΔButirosin A, Conduritol A, Conduritol B, Conduritol C, Conduritol D, Conduritol E, 1-O-p-Coumaroylquinic acid, 3-O-p-Coumaroylquinic acid, 4-O-p-Coumaroylquinic acid, 5-O-p-Coumaroylquinic acid, Crotepoxide, 1,2,3,4-Cyclohexanetetrol, 1,2,3,5-Cyclohexanetetrol, 1,2,4,5-Cyclohexanetetrol, 1,2,3-Cyclohexanetetrol, 1,2,4-Cyclohexanetetrol, 1,3,5-Cyclohexanetetrol, 1,2-O-Cyclohexylidene-myo-inositol, 1,2,3,4,5-Cyclopentanepentol, 1,2,3,4-Cyclopentanetrol, 1,2,3-Cyclopentanetriol, 1,2,4-Cycoopentanetriol, Dambonitol, 2-Deoxy-chiro-inositol, 2-Deoxy-L-chiro-inositol, Acetobromocellobiose, Acetobromoisoprimeverose, Acetobromolactose, Acetobromolactose, Acetobromomaltose, Acetobromomelibiose, Acetobromomorutinose, Acetobromosophorose, Acetobromoturanose, Acetochlorocellobiose, Acetochlorogentiose, Acetochlorolactose, Acetochloromaltose, Acetochloromelibiose, Acetochloroprimeverose, Acetochlororutinose, Acetochloroturanose, 6-O-(N-Acetyl-α-D-neuraminyl)-D-galactose, Acetoside, Agarobiose, Amicetamine, ΔAmicetin, Amorphol, ΔAmygdalin, Δ1',2-Anydro-1-β-D-fructo-furanose-D-fructofuranose, 1',2-Anydro-1-O-fructosyl-furanose-Dipyranosyl-form, 1',2-Anydro-1-O-fructosyl-furanose-Furanosyl-form, Arabinofuranobiose, Arabinopyranobiose, Azralidose, 2-Bromoethyl 4-O-(2,3,4,6-tetra-O-acetyl-α-D-galactopyranosyl)-2,3,6,-tri-O-acetyl-β-D-galactopyranoside, 2-Bromoethyl 4-O-(2,3,4,6-tetra-O-acetyl-α-D-galactopyranosyl)-2,3,6,-tri-O-acetyl-α-D-galactopyranoside, 6'-O-(tert-Butylphenyl)-sucrose, Carrabiose, Cellobial, Cellobiose, Cellobiose, α-Pyranose-form, Cellobiose, β-Pyranose-form, Me glycoside, hepta-Ac, Cellobiouronic acid, Cellobiulose, Chondrosine, 1'-Deoxy-1'-fluorosucrose, 6',6-Diamino-6',6-dideoxysucrose, 1,6-Dichloro-1,6-dideoxy-β-D-fructofuranosyl 4-chloro-4-deoxy-α-D-galactopyranoside, 6',6-Dichloro-6',6-dideoxy-hexabenzoylsucrose, 6',6-Dideoxyhexabenzoyl-sucrose, 1,6-Di-O-β-D- glucopyranosyl-D-mannitol, 13,28-Epoxy-11-oleanene-3, 16-diol, Eryscenobiose, 8-Ethoxycarbonyl 2-acetamido-2-deoxy-3-O-β-D-galacto-pyranosyl-β-D-gluco-pyranoside, 8-Ethoxycarbonyl hepta-O-acetyl-α-D-cellobio-pyranoside, 8-Ethoxycarbonyl hepta-O-acetyl-β-D-lactopyranoside, 8-Ethoxycarbonyl hepta-O-acetyl-α-D-maltopyranoside, 8-Ethoxycarbonyl hepta-O-acetyl-β-D-maltopyranoside, Everninose, Flambabiose, Forsythiaside, β-D-Fructofuranosyl-α-D-arabino-hexopyranosid-2-ulose, Furcatin, Galactinol, 6-O-β-D-Galactofuranosyl-D-galactose, 1-O-β-D-Galactofuranosyl-D-glycerol, 3-O-β-D-Galactofuranosyl-D-mannitol, α-D-Galactopyranosyl-α-D-galactopyranoside, α-D-Galactopyranosyl-α-D-galactopyranoside, β-D-Galactopyranosyl-β-D-galactopyranoside, 3-O-β-D-Galactopyranosyl-D-galactose, 4-O-α-D-Galactopyranosyl-D-galactose, Galactopyranosyl-D-galactose, 6-O-α-D-Galactopyranosyl -D-galactose, 2-O-x -D-Galactopyranosyl-glycerol, α-D-Galactopyranosyl-1-thio-5-galactopyranoside, Galiosin, Gein, Gentiobiose; α-Pyranose-form, Gentiobiose; β-Pyranose-form, Glucal; D-form, 3-O-α-D-glucosyl, 2-O-β-D-Glucopyranosyl-L-arabinose, 6-O-β-D-Glucopyranosyl-D-galactose, 1-β-D-Glucopyranosyl-D-mannitol; α-form, 1-β-D-Glucopyranosyl-D-mannitol; O-form, 3-O-β-D-Glucopyranosyl-D-mannitol; α-form, 3-O-:-D-Glucopyranosyl-D-mannose, Grandifoline, 1,2,2', 3,3',4',6'-Hepta-O-acetyl-6-deoxy-6-iodo-D-lactose. 1',2,2', 3,3',4',6'-Hepta-O-acetyl lactose-D-form; Hepta-O-acetyl-α-D-lactosyl bromide, Hepta-O-acetyl-α-D-primeveropyranose, Hepta-O-acetyl-p-primeveroside, Hepta-O-acetyl-α-rutinose, Hexa-O-acetyl-α-robinobiosyl chloride, Hyalbiuronic acid, Inulbiose, Isomaltose, Isomaltulose, Isoprimeverose, Kasuganobiosamine, Kojibiose, Lactal, Lacto-N-biose, Lactosan, Lactose; α-form, Lactose; β-form. Lactulose, Laminaribiose, Laceolarin, Leucrose, Levanbiose, Lucumin, Lycobiose, Lycoricyanin, ΔMacrozamin, Maltal, Maltobionic acid, Maltobiouronic acid, Maltosamine, ΔMaltose, Maltulose, Mannobiose, Mannobiose; β-Pyranose-form, 1-O-β-D-Mannopyranosyl-L-erythriol, 2-O-α-Mannopyranosyl-myo-inositol, Mannosylglucosaminide, Marsectobiose, Melibiitol, Melibionic acid, Melibiose, [2-(4-Methoxycarbonylbutane-carboxamido)ethyl]-2-acetamido-2-deoxy-3-O-β-D-galactopyranosyl-α-D-galactopyranoside, [2-(4-Methoxycarbonylbutane-carboxamido)ethyl]-2-acetamido-2-deoxy-3-O-β-D-galactopyranosyl-β-D-galactopyranoside, 8-Methoxycarbonyloctyl-α-D-cellobiopyranoside, 8-Methoxycarbonyloctyl-β-D-cellobiopyranoside, 8-Methoxycarbonyloctyl α-D-lactopyranoside, 8-Methoxycarbonyloctyl β-D-lactopyranoside, 8-Methoxycarbonyloctyl a -D-maltopyranoside, 8-Methoxycarbonyloctyl β-D-maltopyranoside, 22-Methoxy-3,26-furostane-diol, Methyl α-carrabioside. Methyl f3-carrabioside, Methyl gentiobioside; α-form, Methyl gentiobioside; β-form, Methyl 4-O-β-D-glucopyranosyl-α-D-glucopyranoside, Methyl 4-O-α-D-gluco-pyranosyl-α-D-gluco-pyranoside, 2-O-(4-O-methyl-α-D-gluco-pyranuronosyl)-D-xylose, Methyl hepta-O-acetyl-α-D-galactopyranosyl-β-D-glucoside, Methyl hepta-O-acetylmalto-biuronate, Methyl hepta-O-methyl-α-D-galactopyranosyl-α-D-glucoside, Methyl hepta-O-methyl-α-D-galactopyranosyl-β-D-glucoside, Methyl α-D-lactopyranoside, Methyl β-D-lactopyranoside, Methyl maltopyranoside; α-D-form, Methyl octa-O-methylmalto-bionate, Methyl octa-O-methylmeli-bionate, Nasunin, Neoagarobiose, Neohesperidose Neolactose, Neolloydosin, Nigerose, Octa-O-acetyl-α-D-lactopyranose, Octa-O-acetyl-β-D-lactopyranose, Octa-O-acetyl-β-neolactose, Octa-O-acetyl-α-neolactose, Octa-O-acetyl-α-D-turano-furanose, Octa-O-acetyl-β-D-turano-furanose, Octa-O-acetyl-α-turano-pyranose, Octa-O-acetyl-β-turano-pyranose, 6-O-Oleuropeoylsucrose, 3-Pentenoic acid, Periandrin III, Phenyl 2,2',3,3',4',6,6'-hepta-O-acetyl-α-D-lactoside, Phenyl 2,2',3,3',4',6,6'-hepta-O-acetyl-α-D-lactoside, Phenyl α-D-lactopyranoside, Phenyl α-D-maltoside, Phenyl 1-D-maltoside, Planteobiose, Primeverin, Prmeverose, Primulaverin, Rhoifolin, β-D-Ribofuranosyl-β-D-ribo-furanoside, ΔRobinin, Robinobiose, ΔRutin, Rutinose, Saikogenin F, Saikogenin G, Sambubiose, Sarsaparilloside, Solabiose. Sophoraflavanoloside, Sophorose, Strophanthobiose; Pyranose-form, Sucrose; Octa-Ac, Sucrose; Octabenzoyl, 6-O-(2,3,4,6-Tetra-O-acetyl-β-D-glucopyranosyl)-tri-O-acetyl-α-D-glucopyranosyl bromide, 2-Trehalosamine, 3-Trehalosamine, 4-Trehalosamine, α,α-Trehalose, α,α-Trehalose; Octa-Ac, α,β-Trehalose; β,β-Trehalose; Trehalose 6-(dihydrogen phosphate), α,α-Trehalose; 6,6'-dimycolate, 1',6',6-Triamino-1',6',6-trideoxysucrose, 2,2,2-Trichoroethyl 2-acetamido-2-deoxy-3-O-β-D-galactopyranosyl-β-D-glucopyranoside, 1,2,5-Trideoxy-4-O-β-D-glucopyranosyl)-1,5-imino-D-arabino-hexitol, Troxerutin, Turanose, Umbilicin, Vicianose, Xylobiose, Xylobiose; Pyranose-form, Acarbose, Ajugose, Avenacin, Celloheptaose, Cellohexaose, Cellopentaose; β-form, Cellotetraose, Cellotriose, ΔCyclamin, ΔCycloheptaamylose, ΔCyclohexaamylose, Cyclooctaamylose, 24-Dammarene-3,12,20-triol, Dextrantriose, 4,6-Di-O-α-D-gluco-pyranosyl)-D-glucopyranose, 5,6-Dimethylcytidine, Everninonitrose, Evertetrose, Evertriose, Flambeurekanose, O-α-D-Galactopyranosyl-(12)-O-α-D-glucopyranosyl-(1)-D-glycerol, Galactotriose, Gentianose, Gentiotetraose, Gentiotriose, F-Gitonin, Ipolearoside, 1-Kestose, 6-Kestose, Kojitriose, D-Lactonic acid, D-Lactono-1,5-lactone, Lactulosucrose, Laminaritriose, Maltohexaose, Maltopentaose, α-Maltosylfructose, Maltotetraitol, Maltotetraonic acid, Maltotetraose, Maltotriose, Mannimositose, Melezitose, Methyl octa-O-methyl-D-lactonate, Neokestose, Olgose, Operculinic acid Panose, Papyrioside L-IIa, Planteose, Raffinose, Rhynchosporosides, Solatriose, Stachyose, Strophanthotriose, Trestatin A, Umbelliferose, Verbascose, Violutin, Xanthorhamnin, Xylohexaose, Xylopentaose, Xylotetraose, 3,3'-Di-O-acetyl-1,2-O-isopropylidene-β-L-tetrofuranose, 1,2:3,3'-Di-O-acetyl-1,2-O-isopropylidene-α-erythro-tetrofuranose, 3,3'-Di-O-benzyl-1,2-O-isopropylidene-α-L-erythrotetrofuranose, 3,3'-Di-O-benzyl-1,2-O-isopropylidene-β-L-threo-tetrofuranose, 1,2:3:3'-Di-O-isopropylidene-α-D-erythro-tetrofuranose, 1,2:3,3'-Di-O-isopropylidene-β-L-threo-tetrofuranose, Erythrose; D-form, Erythrose; α-D-Furanose-form, 1,2-O-Isopropylidene, Erythrose; L-form, Erythrose; β-D-Furanose-form, 2,3-O-Isopropylidene, 1,2-O-lsopropylideneapiose; β-L-threo-form, 1,2-α-O-Isopropylideneapiose; α-D-erythro-form, 1,2-O-Isopropylideneapiose; α-L-erythro-form, 1,2-O-Isopropylideneapiose; β-D-threo-furanose, 1,2-O-Isopropylidene-β-L-threofuranose, Threose; D-form, Threose; L-form, Threose; L-form, 2,4-O-Benzylidene, 1,3, 4-Trihydroxy-2-butanone; (R)-form . 1,3,4-Trihydroxy-2-butanone; (S)-form, 2-Amino-2-deoxyarabinose; D-form, 2-Amino-2-deoxyarabinose; L-form, Arabinose; D-form, Arabinose; DL-form, Arabinose diethyldithioacetal;

D-form, Arabinose diethyldithioacetal; L-form, Arabinosylamine; L-form, Benzyl arabinopyranoside; α-D-form, Benzyl arabinopyranoside: β-D-form. Benzyl arabinopyranoside; α-L-form, Benzyl arabinopyranoside; β-L-form, Benzyl 3,4-O-benzylidene-,β-L-arabinopyranoside, Benzyl 3,4-O-(R)-benzylidene-α-D-arabinopyranoside, Benzyl 3,4-O-isopropylidene-2-O-tosyl-α-D-arabinopyranoside, Benzyl 2,3,4-tri-O-acetyl-β-D-arabinopyranoside, Benzyl 2,3,4-tri-O-acetyl-α-L-arabinopyranoside, Benzyl 2,3,4-tri-O-acetyl-β-L-arabinopyranoside, Benzyl 5 2,3,4-tri-O-benzoyl-β-L-arabinopyranoside, 1,2:3,4-Di-O-isopropylidene-β-D-arabinopyranose, 1,2:3,4-Di-O-isopropylidene-β-L-arabinopyranoside, 2,3:4,5-Di-O-isopropylidene-D-arabinose, 1,2-O-Isopropylidenearabinofuranose; β-L-form, 3,4-O-Isopropylidenearabinopyranose; β-D-form, 3,4-O-Isopropylidenearabinopyranose; β-L-form, 1,2-O-Isopropylidene-5-O-tosyl-, β-D-arabinofuranose, Methyl arabinofuranoside; α-D-form, Methyl arabinofuranoside; β-D-form, Methyl arabinofuranoside; α-L-form, Methyl arabinopyranoside; β-L-form, Methyl D-arabinopyranoside; α-form, Methyl D-arabinopyranoside; β-form, Methyl L-arabinopyranoside; α-form, Methyl L-arabinopyranoside; β-form, Methyl 3,4-O-benzylidene-β-L-arabinopyranoside, Methyl 3,4-di-O-methyl-D-L-arabinopyranoside, Methyl 3,4-O-ethylidene-β-L-arabinopyranoside, Methyl 3,4-O-isopropylidenearabinopyranoside; β-L-form, Methyl 3,4-O-isopropylidene-α-D-arabinopyranoside, Methyl 3,4-O-isopropylidene-β-D-arabinopyranoside, Methyl 4-O-methylarabinopyranoside; β-D-form, Methyl 4-O-methylarabinopyranoside; β-L-form, Methyl 4-O-methylarabinopyranoside; α-DL-form, Methyl 5-O-tosyl-α-L-arabinofuranoside, Methyl 5-O-tosyl-β-L-arabinofuranoside, Methyl 2,3,4-tri-O-acetyl-α-D-arabinopyranoside, Methyl 2,3,4-tri-O-acetyl-α-D-arabinopyranoside, Methyl 2,3,4-tri-O-acetyl-β-D-arabinopyranoside, Methyl 2,3,4-tri-O-methyl-β-D-arabinopyranoside, Methyl 2,3,4-tri-O-methyl-β-L-arabinopyranoside, Methyl 5-O-trityl-α-L-arabinofuranoside, Pectinose, 1,2,3,5-Tetra-O-acetyl-α-D-arabinofuranose, 1,2,3,4-Tetra-O-acetyl-α-D-arabinopyranose, 1,2,3,4-Tetra-O-acetyl-α-L-arabinopyranose, 1,2,3,4-Tetra-O-acetyl-β-L-arabinopyranose, 2,3,4,5-Tetra-O-acetyl-D-arabinose diethyldithioacetal, 2,3,4,5-Tetra-O-acetyl-L-arabinose diethyldithioacetal, 1,2,3,4-Tetra-O-benzoyl-α-D-arabinopyranose, 1,2,3, 4-Tetra-O-benzoyl -β-D-arabinopyranose, 1,2,3,4-Tetra-O-benzoyl-α-L-arabinopyranose, 1,2,3,4-Tetra-O-benzoyl -β-L-arabinopyranose, 1-Thioarabinose, L-form, 5-Thioarabinose; L-Furanose-form, 2,3,4-Tri-O-acetyl-β-L-arabinopyranoside, 2-Amino-2-deoxylyxose; D-form, 2-Amino-2-deoxylyxose; L-form, 5-O-Benzoyl-2,3-O-carbonyl-α-D-lyxofuranosyl bromide, Benzyl 2,3-O-isopropylidene-α-D-lyxofuranoside, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 1,2,3,5-Di-O-benzylidene-α-D-xylofuranose, 1,2-O-Isopropylidene-β-L-lyxofuranose, 2,3-O-Isopropylidenelyxose; α-D-Furanose-form, Lyxose; D-form, Lyxose; α-D-Pyranose form, Lyxose; L-form, Lyxose; DL-form, Lyxosylamine; D-form, Lyxosylamine; L-form, Lyxosyl bromide; α-D-Pyranose-form, 2-C-Bromo, tribenzoyl, Lyxosyl chloride; α-D-Pyranose-form, Tribenzoyl, 2-C-chloro, Lyxosyl chloride; β-D-Pyranose-form, Tribenzoyl, 2-C-chloro, Methyl 5-O-benzyl 2,3-O-isopropylidene-α-D-lyxofuranoside, Methyl 2,3-O-isopropylidene-α-D-lyxopyranoside, Methyl 2,3-O-isopropylidene-L-lyxopyranoside, Methyl lyxofuranoside; α-D-form, Methyl lyxofuranoside; β-D-form, Methyl lyxopyranoside; α-D-form, Methyl lyxopyranoside; and β-D-form, Methyl 2,3,4-tri-O-acetyl-β-D-lyxopyranoside. Methyl 2,3,5-tri-O-tosyl-β-D-ribofuranoside, Methyl 2,3,5-tri-()-benzoyl-β-D-lyxofuranoside, D-Ribopyranosylamine, Methyl 2,3,4-tri-O-benzoyl-α-D-lyxopyranoside, Ribose; D-form, Methyl 5-O-trityl-α-D-lyxofuranoside, Ribose; L-form, Methyl 5-atrityl-β-D-lyxofuranoside, Ribose; DL-form, 1,2,3,4-Tetra-O-acetyl-α-D-lyxopyranose, D-Ribothiafuranose, 1,2,3,4-Tetra-O-acetyl-β-D-lyxopyranose, L-Ribothiafuranose, Tetra-O-acetyl-α-L-xylofuranose, α-D-Ribothiapyranose, Tetra-O-acetyl-a-D-xylopyranose, Tetra-O-acetyl-5-thio-β-D-ribopyranose, Tetra-O-acetyl-β-D-xylopyranose, 1-Thioribose; D-form Tetra-Ac, Tetra-O-acetyl-β-L-xylopyranose, 5-Thioribose; O-D-Pyranose-form, 1,2,3,4-Tetra-O-benzoyl-α-D-lyxopyranose, 1,2,3,4-Tetra-O-benzoyl-α-D-lyxopyranose, 1,2,3,4-Tetra-O-benzoyl-α-D-xylopyranoside, 2,3,4,5-Tetra-O-benzoyl-β-L-xylopyranoside, 2,3,5-Tri-O-acetyl-1-O-benzoyl-β-D-xylofuranose, 2-Amino-2-deoxyxylose; α-D-form, 2,3,5-Tetra-O-acetyl-α-D-lyxofuranosyl chloride, 2-Amino-2-deoxyxylose; ax-L-form, 2,3,4-Tri-O-acetyl-α-D-lyxopyranosyl chloride, 4-Aminophenyl xylopyranoside; β-D-form, Xylose; D-form, 1,2-O-Cyclohexylidenexylofuranose; D-form, Xylose; L-form, 1,2-O-Cyclohexylidenexylofuranose; D-form, 3,5-Dimesyl, Xylose; DL-form, 2-()-Cyclohexylidenexylofuranose, D-form, 3,5-Ditosyl, 1,2:3,5-Di-O-cyclohexylidene-β-D-xylofuranose, 1,2,3,5-Di-O-isopropylidene-α-D-xylofuranose, 3-Acetamido-1,2,5-tri-O-acetyl-3-deoxy-O-ribofuranose, 2,3-Di-O-methyl-α-D-xylopyranose, 3-Amino-3-deoxy-1,2-O-isopropylidene-α-D-ribofuranose, 2,4-Di-O(-methyl-β-D-xylopyranose, 2-Amino-2-deoxyribose, D-form, 2,5-Di-()-methyl-D-xylose, 2-Amino-2-deoxyribose; L-form, 3,4-Di-O-methyl-D-xylose, 3-Amino-3-deoxyribose; D-form, 3,5-Di-O-methyl-D-xylose. 1,2-O-Benzylidene-α-D-ribofuranose. 1,2-O-Isopropylidene-5-thio-α-D-xylofuranose, 2,3-O-(R)-Benzylidene-β-D-ribofuranose, 1,2-()-Isopropylidenexylofuranose; a -D-form, 2,3-O-(S)-Benzylidene-β-D-ribofuranose, Methyl 3,5-O-isopropylidene-α-D-xylofuranoside, 5-O-Benzyl-1,2-O-isopropylidene-α-D-ribofuranose, Methyl 2-O-methyl-α-D-xylopyranose, Benzyl 3,4-O-isopropylidene-β-D-ribopyranoside, Methyl 1-thio-α-D-xylopyranoside, Benzyl riboside, β-D-Pyranose-form, Methyl 2,3,4-tri-O-acetyl-α-D-xylopyranoside, Benzyl riboside, β-D-Furanose-form, Methyl 2,3,4-tri-O-acetyl-β-D-xylopyranoside, Benzyl riboside; β-D-Furanose-form, 5-Tosyl, Methyl 2,3,4-tri-O-benzoyl-α-D-xylopyranoside, Benzyl riboside; β-L-Pyranose-form, Methyl 2,3,4-tri-O-benzoyl-β-D-xylopyranoside, Benzyl 2,3,4-tri-O-benzoyl-β-D-ribopyranoside, Methyl xylofuranoside; α-D-form, 1,2:3,4-Di-O-isopropylidene-α-D-ribopyranose, Methyl xylopyranoside; α-D-form, Ethyl 1-thio-α-D-ribofuranoside, Methyl xylopyranoside, 5-D-form3, 1,2-O-Isopropylideneribofuranose; α-D-form, 2-()-Methylxylose, D-form, 2,3-O-Isopropylideneribofuranose; D-form, 2-O-Methylxylose, D-form, Diethyldithioacetal, 1,2-O-Isopropylidene-α-D-ribopyranose, 2-O-Methylxylose, β-D-Pyranose-form, 3,4-O-Isopropylidene-α-D-ribopyranose, 3-O-Methylxylose; D-form, 1,2-O-Isopropylidene-5-O-tosyl-α-D-ribofuranose, 1,2,3,4-Tetra-O-acetyl-5-Tetra-D-xylopyranose, 1,2-O-Isopropylidene-5-O-trityl-α-D-ribofuranose, 1,2,3,4-Tetra-O-acetyl-5-thio-β-D- xylopyranose, Methyl 3-acetamido-2,5-di-O-acetyl-3-deoxy-, β-D-ribofuranose, 2,3,4,5-Tetra-O-acetyl-D-xylose diethyldithioacetal, Methyl 3-acetamido-2,5-di-O-acetyl-3-deoxy-, α-D-ribofuranoside, 2 3 4,5-Tetra-O-acetyl-L-xylose diethyldithioacetal, Methyl 3-acetamido-2,4-di-O-acetyl-3-deoxy-α-D-ribopyranoside, 1-Thioxylose-D-form, Methyl 3-amino-3-deoxy-β-D-ribofuranose, 5-Thioxylose, Methyl 5-()-benzoyl-2,3-O-benzylidene-β-D-ribofuranoside, 2,3,4-Tri-()-methyl-D-xylose, Methyl 5-O-benzoyl-2,3-()-methylene-β-D-ribofuranoside, 2,3,5-Tri-()-methyl-D-xylose, Methyl 2,3-O-isopropylidene-β-D-ribofuranoside, Xylose diethyldithioacetal; D-form, Methyl 2,3-O-isopropylidene-β-L-ribofuranoside, Xylose diethyldithioacetal, L-form, Methyl 3,4-O-isopropylidene-β-D-ribopyranoside, Xylose 1-dihydron phosphate, α-D-Pyranose form, Methyl 2,3-O-isopropylidene-5-O-tosyl-β-D-ribofuranoside, Xylose 1-dihydrogen phosphate; β-D-Pyranose form, Methyl 2,3-O-isopropylidene-5-O-tosyl-β-L-ribofuranoside, Xylose 3-dihydrogen phosphate; D-form, Methyl ribofuranoside; α-D-form, Xylose 5-dihydrogen phosphate; D-form, Methyl ribofuranoside; β-D-form, Xylosylamine; D-form, Methyl ribofuranoside; α-L-form. Xylosylamine; L-form, Methyl ribofuranoside; (3-L-form, Methyl ribopyranoside; α-D-form, Methyl ribopyranoside; β-D-form, Methyl 5-thio-α-D-ribopyranoside, Methyl 5-thio-α-D-ribopyranoside, 3-Acetamido-3-deoxy-1,2:5,6-di-O-isopropylidene-α-D-allofuranose, Methyl 2,3,5-tri-O-benzoyl-β-D-ribofuranoside, 3-Acetamido-3-deoxy-1,2-O-isopropylidene-α-D-allofuranose, 1-O-Acetyl-2,3:5,6-di-O-isopropylidene-β-D-allofuranose, Allose; D-form, Allose: D-form, Di-Et dithioacetal, Allose; D-form, 3-Tosyl, Allose; α-D-Pyranose-form, 1,2-O-Ethylidene, 4,6-di-Ac, 3-benzyl, Allose, β-D-Pyranose-form, Allose; β-D-Pyranose-form, 1,2,4,6-Tetrabenzoyl, 3-Me, Allose; β-D-Furanose-form, (i,&S)-2,3:5,6-Di-O-ethylidene, Allose; β-D-Furanose-form, (R,R)-2,3:5,6-Di-O-ethylidene, 1-Ac, Allose; β-D-Furanose-form, (S,S)-2,3:5,6-Di-O-ethylidene, 1-Ac, Allose; L-form, 1,2-O-Isopropylidene-3,5,6-tri-O-benzoyl-α-D-allofuranose, 2-Amino-2-deoxyallose; D-form, 1,2-O-Isopropylidene-6-O-trityl-α-D-allofuranose 3-Amino-1,2:5,6-di-O-cyclohexylidene-3-deoxy-α-D-allofuranose, Methyl 2-acetamido-4,6-O-benzylidene-2-deoxy-α-D-allopyranoside, 1-()-Benzoyl-2,3,5,6-di-()-isopropylidene-5-D-allofuranose, Methyl 2-1-acetyl-4,6-O-benzylidene-α-D-allopyranoside, 3-()-Benzyl-1,2:4,6-di-O-ethylidene-α-D-allopyranose, Methyl 2-()-acetyl-4,6-()-benzylidene-α-D-galactopyranoside, 1,2-Cyclohexylidenexylofuranose; c-D-form, Methyl 3-O-acetyl-4,6-O-benzylidene-α-D-galactopyranoside, 2,6-Diacetamido-2,6-dideoxy-α-D-allopyranoside, 3-()-Methyl-β-D-allopyranose, 2,3-Diamino-2,3-dideoxyallose; D-form, Methyl alloside; α-D-Pyranose-form, 2,6-Diamino-2,6-dideoxyallose: α-D-allofuranose, Methyl alloside; α-D-Pyranose-form, 3,4-O-Isopropylidene, 6-benzoyl, 2-tosyl, 1,2:5,6-Di-O-cyclohexylidene-α-D-allofuranose, Methyl alloside; α-D-Pyranose-form, 3,4-()-Isopropylidene, 2-tosyl, 1,2,5,6-Di-()-cyclohexylidene-3-('-ethyl-α-D-allofuranose, Methyl alloside; α-D-Pyranose-form, 3,4-()-Isopropylidene, 2,6-ditosyl, 1,2:5,6-Di-O-cyclohexylidene-3-O-mesyl-α-D-allofuranose, Methyl alloside; α-D-Pyranose-form, 3,Benzyl, 2-Me, 6-tosyl, 1,2:5,6-Di-()-cyclohexylidene-3-('-methyl-α-D-allofuranose, Methyl alloside; β-D-Pyranose-form, 1,2:5,6-Di-O-cyclohexylidene-3-('-vinyl-a-D-allofuranose, Methyl alloside, β-D-Pyranose-form, 2,4-Di-Ac, 3,6-ditosyl, 2,3:5,6-Di-O-ethylidene-α-D-allopyranose, ethyl alloside, o-D-Furanose-form, 1,2 5,6-Di-O-isopropylidene-α-D-allofuranose Methyl alloside; β-D-Furanose-form, 2,3:5,6-Di-()-isopropylideneallofuranose; D-form, Methyl alloside; β-L-Furanose-form, 2,3-O-Isopropylidene, 6-Me, 5-tosyl, 2,3,5,6-Di-O-isopropylideneallofuranose; D-form, 1-(4-Nitrobenzoyl), Methyl 2,3-anhydro-4,6-O-benzylidene-β-D-allopyranoside, 2,3 5,6-Di-O-isopropylideneallofuranose, β-D-form, Methyl 2,3-anhydro-4,6-()-benzylidene-3-C-nitro-β-D-allopyranoside, 1,2:5,6-Di-O-isopropylidene-3-O-tosyl-α-D-allofura nose, Methyl 5,6-anhydro-2,3-O-isopropylidene-β-L-allofuranoside, Helicide, Methyl 2-benzamido-4,6-O-benzylidene-2-deoxy-α-D-allopyranoside, 1,2-O-isopropylideneallofuranose; α-D-form, Methyl 2-O-benzoyl-4,6-O-benzylidene-α-D-allopyranoside, 1,2-O-isopropylideneallofuranose; α-D-form, 3-Ac, Methyl 2-O-benzoyl-4,6-O-benzylidene-α-D-galactopyranoside, 1,2-()-isopropylideneallofuranose; α-D-form, 5,6-Di-Ac, Methyl 3-O-benzoyl-4,6-()-benzylidene-α-D-galactopyranoside, 1,2-O-isopropylideneallofuranose; α-D-form, 5,6-Di-Ac, 3-tosyl, Methyl 4,6-()-benzylideneallopyranoside; α-D-form, 1,2-O-Isopropylideneallofuranose; α-D-form, 5,6-Di-Ac, 3-benzyl, Methyl 4,6-O-benzylidene-α-D-galactopyranoside; 2,3-Di-Me, 1,2-O-isopropylideneallofuranose; α-D-form, 3-Benzoyl, Methyl 4,6-()-benzylidene-2,3)-O-isopropylidene-α-D-allopyranoside, 1,2-O-Isopropylideneallofuranose; o-D-form, 5-Benzoyl, Methyl 4,6-O-benzylidene-2-O-mesyl-α-D-allopyranoside, 1,2-O-Isopropylideneallofuranose; α-D-form, 6-Benzoyl, 3-Me, 5-tosyl, Methyl 4,6-O-benzylidene-2-O-tosyl-α-D-allopyranoside, 1,2-O-Isopropylideneallofuranose; α-D-form, 3,5-Dibenzoyl, Methyl 4,6-O-benzylidene-2-O-tosyl-α-D-galactopyranoside, 1,2-O-Isopropylideneallofuranose; α-D-form, 3-Tosyl, Methyl 4,6-()-benzylidene-3-O-tosyl-α-D-galactopyranoside, 1,2-O-Isopropylideneallofuranose; α-D-form, 6-Tosyl, Methyl 3-O-benzyl-2-O-methyl-α-D-allopyranoside, 1,2-O-Isopropylideneallofuranose; α-D-form, 3,6-Ditosyl, Methyl 5,6-O-cyclohexylidene-α-D-allofuranoside, 1,2-O-Isopropylideneallofuranose; α-D-form, 3-Me, Methyl 2,3-di-()-acetyl-4,6-O-benzylidene-α-D-allopyranoside, 1,2-O-Isopropylideneallofuranose; α-D-form, 3,5,6-Tri-Me, Methyl 2,3-di-O-acetyl-4,6-O-benzylidene-α-D-galactopyranoside, 1,2-()-Isopropylideneallofuranose; α-D-form, 5,6-O-Isopropylidene, 3-Ac, Methyl 2,6-dibenzamido-2,6-dideoxy-α-D-allopyranoside, 1,2-O-Isopropylideneallofuranose; α-D-form, 5,6-O-Isopropylidene, 3-benzoyl, Methyl 2,3:4,6-di-O-ethylidene-α-D-allopyranoside, 1,2-()-Isopropylideneallofuranose; α-D-form, 5,6-O-Isopropylidene, 3-benzyl, Methyl 2,3,5,6-di-O-isopropylidene-α-D-allofuranoside, 1,2-O-Isopropylideneallofuranose, α-D-form, 5,6-()-Isopropylidene, 3-Me, Methyl 2,3:5,6-di-O-isopropylidene-α-D-allofuranoside, 1,2-O-Isopropylideneallofuranose; α-D-form, 3-Benzyl, Methyl 2,3-O-isopropylidene-3-L-allofuranoside, 1,2-O-Isopropylidene-3,5,6-tri-O-acetyl-α-D-allofuranose, Methyl 2,3-O-isopropylidene-6-()-Methyl-3-L-allofuranoside, 1,2-O-Isopropylidene-3,5,6-tri-()-benzoyl-α-D-allofuranose, Methyl 2,3,4,6-tetra-O-acetyl-α-D-allopyranoside, 1,2-()-Isopropylidene-6-()-trityl-α-D-allofuranose, 1,2,3,4,6-Penta-O-acetyl-β-D-allopyranose, Methyl 2-acetamido-4,6-()-benzylidene-2-deoxy-α-D-allopyranoside, 1,5,6-Tri-O-acetyl-2,3-O-ethylidene-β-D-allofuranose, Methyl 2-O-acetamido-4,6-O-benzylidene-x-D-allopyranoside, 3,4,6-Tri-O-acetyl-1,2-O-ethylidene-α-D-allopyranose, Methyl 2-O-acetamido-4,6-O-benzylidene-α-D-galactopyranoside, Methyl 3-()-O-acetamido-4,6-O- benzylidene-α-D-galactopyranoside, 3-O-Methyl-β-D-allopyranose, Methyl alloside; -α-D-Pyranose-form, Methyl alloside; -α-D-Pyranose-form, 3,4-O-Isopropylidene, 6-benzoyl, 2-tosyl, Altrose; D-form, Methyl alloside; -α-D-Pyranose-form, 3,4-O-Isopropylidene, 2-tosyl, Altrose; L-form, Methyl alloside; -α-D-Pyranose-form, 3,4-O-Isopropylidene, 2,6-ditosyl, Altrose; L-form, me glycoside, 2,3-dibenzyl, 6-trityl, Methyl alloside, -α-D-Pyranose-form, 3-Benzyl, 2-Me, 6-tosyl, 2-Amino-2-deoxyaltrose; D-Pyranose-form, Methyl alloside; -β-D-Pyranose-form, 1,2:5,6-Di-O-isopropylidene-β-D-altrofuranose, Methyl alloside; -β-D-Pyranose-form, 2,4-Di-Ac, 3,6-ditosyl, 1,2,3,4-Di-O-isopropylidene-β-D-altropyranose, Methyl alloside; -α-D-Furanose-form, 1,2-O-Isopropylidenealtrose; β-D-Pyranose-form, Methyl alloside; -β-D-Furanose-form, 1,2-O-Isopropylidenealtrose; β-D-Furanose-form, Methyl alloside; -β-L-Furanose-form, 2,3-O-Isopropylidene, 6-Me, 5-tosyl, 1,2-O-Isopropylidenealtrose; β-D-Furanose-form, 5,6-()-Isopropylidene, 3-Ac, Methyl 2,3-anhydro-4,6-O-benzylidene-α-D-allopyranoside, Methyl altropyranoside; α-D-form, Methyl 2,3-anhydro-4,6-()-benzylidene-3-('-nitro-5-D-allopyranoside, Methyl altropyranoside; α-D-form, 4,6-O-Isopropylidene, 2,3-di-Ac, Methyl 5,6-anhydro-2,3-α-O-Isopropylidene-β-L-allofuranoside, Methyl altropyranoside, α-D-form, 4,6-O-Ethylidene, 2-Me, Methyl 2-benzamido-4,6-O-benzylidene-2-deoxy-α-D-allopyranoside, Methyl altropyranoside, α-D-form, 2,3-Dibenzyl, 6-tosyl, Methyl 2-()-benzoyl-4,6-O-benzylidene-α-D-allopyranoside, Methyl altropyranoside, α-D-form, 2-Me, 3-tosyl, Methyl 2-O-benzoyl-4,6-O-benzylidene-α-D-galactopyranoside, Methyl altropyranoside; α-D-form, 2-Me, 4,6-dibenzoyl, 3-tosyl, Methyl 3-O-benzoyl-4,6-O-benzylidene-α-D-galactopyranoside, Methyl altropyranoside; α-D-form, 2-Me. 4-Ac, 3-tosyl, 6-trityl, Methyl 4,6-()-benzylideneallopyranoside-α-D-form, Methyl altropyranoside;, α-D-form, 2-Benzoyl, 3,4-dimesyl, 6-trityl, Methyl 4,6-O-benzylideneallopyranoside-α-D-form, 2-Tosyl, 3-benzyl, Methyl 2-O-benzoyl-4,6-O-benzylidene-α-D-altropyranoside, Methyl 4,6-()-benzylideneallopyranoside-oα-D-form, 2-Me, 3-tosyl, Methyl 3-()-benzoyl-4,6-O-benzylidene-α-D-altropyranoside, Methyl 4,6-O-benzylideneallopyranoside-α-D-form, 2-Me, 3-benzyl. Methyl 4,6-O-benzylidene 2,3-di-O-methyl-α-D-altropyranoside, Methyl 4,6-()-benzylideneallopyranoside-β-D-form, Methyl 4,6-O-benzylidene-2-O-methyl-α-D-altropyranoside, Methyl 4,6-()-benzylidene-α-D-galactopyranoside, Methyl 4,6-O-benzylidene-3-()-methyl-α-D-altropyranoside, Methyl 4,6-O-benzylidene-α-D-galactopyranoside; 2,3-Dibenzoyl, Methyl 2,3-Di-O-benzoyl-4,6-()-benzylidene-α-D-altropyranoside, Methyl 4,6-O-benzylidene-α-D-galactopyranoside, 2,3-Dibenzyl, Methyl 2,3-di-()-benzyl-α-L-altrofuranoside, Methyl 4,6-()-benzylidene-α-D-galactopyranoside; 2,3-Dibenzyl, Methyl 2,3-di-O-benzyl-β-L-altrofuranoside, Methyl 2,3-di-O-benzyl-α-D-altropyranoside, 2,4-Diamino-2,4-dideoxygalactose; D-form, Methyl 2,3-di-O-benzyl-4,6-()-benzylidene-α-D-altropyranoside, 2,6-Diamino-2,6-dideoxygalactose; α-D-Pyranose-form, Methyl 3,4-O-isopropylidene-c-D-altropyranoside, 2,6-Di-O-benzyl-α-D-galactopyranoside, Methyl 4,6-O-isopropylidene-α-D-altropyranoside, 1,2:3,4-Di-O-cyclohexylidene-6-O-tosyl-α-D-galactopyranose, 1,2,3,4,6-Penta-O-acetyl-α-D-altropyranose, 1,2 5,6-Di-O-isopropylidene-α-D-galactofuranose, 1,2:3,4-Di-O-isopropylidenegalactopyranose α-D-form, 6-Ac, 1,2:3,4-Di-()-isopropylidenegalactopyranose, α-D-form, 6-Mesyl, 1,2:3,4-Di-O-isopropylidenegalactopyranose, α-D-form, 6-Tosyl, 1,2:3,4-Di-O-isopropylidenegalactopyranose; α-D-form, 6-Allyl, 4-Acetamido-4-deoxy-D-galactose, 1,2:3,4-Di-O-isopropylidenegalactopyranose, α-D-form, 6-Benzyl, Allyl 4,6-O-benzylidene-a -D-galactopyranoside, 1,2:3,4-Di-()-isopropylidenegalactopyranose; α-D-form, 6-Me, Allyl 4,6-di-O-benzyl-α-D-galactopyranoside, 1,2,4-Di-O-isopropylidenegalactopyranose; α-D-form, 6-Trityl, Allyl 4,6-di-O-benzyl-α-D-galactopyranoside, 1,2:3,4-Di-O-isopropylidene-α-D-galactopyranose; 6-hydrogen phosphate, Allyl galactopyranoside, α-D-form, 1,2.3,4-Di-O-isopropylidene-6-O-methyl-α-D-galactopyranoside, Allyl galactopyranoside; β-D-form, 2,3-Di-()-methylgalactose; D-form, Allyl galactopyranoside; β-D-form, 3,4-O-Isopropylidene, 2,3-Di-()-methylgalactose; α-D-Pyranose-form, Me glycoside, 6-benzoyl, Allyl galactopyranoside; α-D-form, 4,6-O-Isopropylidene, 2,4-Di-()-methylgalactose; D-form, Allyl galactopyranoside; β-D-form, 2,6-Di-Ac, 2,6-Di-()-methylgalactose; D-form, 4-Amino-4-deoxygalactose; D-form, 2,6-Di-()-methylgalactose; α-D-Pyranose-form, Me glycoside, 4-Aminophenyl 2-acetamido-2-deoxygalactopyranoside, α-D-form, 3,4-Di-O-methylgalactose; D-form, 4-Aminophenyl 2-acetamido-2-deoxygalactopyranoside, β-D-form, 3,6-Di-O-methylgalactose; D-form, 4-Aminophenyl, α-D-form, 4,6-Di-()-methylgalactose; D-form, 4-Aminophenyl; β-D-form, 5,6-()-Ethyldiene-D-galactose diethyldithioacetal, 1,6-Anhydro-2,3,4-tri-O-methyl-α-D-galactopyranoside, 3,4-()-Ethylidene-1,2-O-isopropylidene-α-D-galactopyranose, 2-Azido-2-deoxy-3,4,6-tri-O-acetyl-α-D-galactopyranosyl bromide, Ethyl 1-thio-α-D-galactofuranoside, 6-(4-Azido-3,5-diiodobenzamido-2-hydroxy)-6-deoxygalactose; D-form, Ethyl 1-thio-α-D-galactopyranoside, Benzyl 2-O-benzoyl-4,6-O-benzylidene-β-D-galactopyranoside, Ethyl 1-thio-β-D-galactopyranoside, Benzyl 4,6-O-benzylidene-β-D-galactopyranoside, Galactose; D-form, 2-Benzyl, Benzyl 4,6-O-benzylidene-α-D-galactopyranoside, Galactose; D-form, 2,3-Dibenzyl, Benzyl galactopyranoside, α-D-form, 4,6-O-Benzylidene, 2,3-dibenzyl, Galactose; α-D-Pyranose-form, Benzyl galactopyranoside; β-D-form, Galactose, α-D-Pyranose-form, 4,6-O-Benzylidene, 2,3-dibenzyl, Benzyl galactopyranoside; β-D-form, 4,6-()-Benzylidene, 2,3-dibenzoyl, Galactose; α-D-Pyranose-form, Benzyl galactopyranoside; β-D-form, 3,4-()-Isopropylidene, 6-benzoyl, Galactose; L-form, Benzyl galactopyranoside; β-D-form, 3,4-O-Isopropylidene, 2,6-dibenzoyl, Galactose diethyldithioacetal; D-form, 4,6-()-Benzylidene-α-D-galactopyranose, Galactose 1-dihydrogen phosphate; α-D-Pyranose-form, Benzyl 3,4-O-isopropylidene-α-D-galactopyranoside, Galactose 1-dihydrogen phosphate; β-D-Pyranose-form, Benzyl 4,6-O-isopropylidene-β-D-galactopyranoside, Galactose 3-dihydrogen phosphate; D-Pyranose-form, Benzyl 3,4-O-isopropylidene-6-()-trityl-β-D-galactopyranoside, Galactose 3-dihydrogen phosphate; D-Pyranose-form, α-1,2-()-Isopropylidene, Benzyl 2,3,4-tri-O-benzyl-α-D-galactopyranoside, 4,6-O-ethylidene, Benzyl 2,3,4-tri-()-benzyl-β-D-galactopyranoside, Galactose 6-dihydrogen phosphate; D-form, Benzyl 2,3,6-tri-O-benzyl-α-D-galactopyranoside, Galactosylamine; D-form, 2-Bromoethyl galactopyranoside, α-D-form, Tetra-Ac, Idaein, 2-Bromoethyl galactopyranoside; α-D-form, Tetrabenzyl, 1,2-O-Isopropylidene-3,6-di-()-methyl-α-D-galactofuranose. 2-Bromoethyl galactopyranoside; β-D-form, 4,6-O-Benzylidene, 1,2-()-Isopropylidenegalactofuranose, α-D-form, 5,6-O-Isopropylidene, 4,6-O-(1-Carboxyethylidene)galactose, (β-D-Pyranose, 1′R)-form, 3-tosyl, 4,6-O-(1-Carboxyethylidene)galactose; (β-D-Pyranose, 1′S)-form, 1,2-O-Isopropylidenegalactopyranose; α-D-form, 3,4-O-Ethylidene, 6-tosyl, Cerebrose, 1,2-O-Isopropylidenegalactopyranose, α-D-form, 4,6-O-Ethylidene, 3-benzyl, Chondrosamine, 1,9-O-Isopropylidenegalactopyranose. α-D-form, 4,6-O-Ethylidene, 2,3-Diamino-2,3-dideoxygalactose; D-form, 3-(methylthiomethyl), 3,4-()-Isopropylidene-D-galactopyranose, 2-O-Methylgalactose; D-form, 4,6-()-Isoproylidene-D-galactopyranose, 2-O-Methylgalactose; α-D-Pyranose-form, Me glycoside, 4,6-O-benzylidene, 5,6-O-Isopropylidene-D-galactopyranose. 3-()-Methylgalactose, D-form, 3,4-O-Isopropylidene-6-O-methyl-D-galactose, 3-O-Methylgalactose, D-form, Di-Et dithioacetal, 2-(4-Methoxycarbonylbutanecarboxamido) ethyl, 2-acetamido-2-deoxygalacto-, 3-O-Methylgalactose; α-D-Furanose-form, isopropylidene, pyranoside; α-D-form, 4-O-Methylgalactose; D-form, 2-(4-Methoxycarbonylbutanecarboxamido)ethyl, 2-acetamido-2-deoxygalacto-, 6-O-Methylgalactose; D-form, pyranoside; β-D-form, Methyl 3,4-O-isopropylidene-2,6-di-O-methyl-α-D-(galactopyranoside, Methyl 2-O-acetyl-4,6-O-benzylidene-α-D-galactopyranoside, Methyl 5,6-O-Isopropylidene-α-D-Galactofuranoside, Methyl 3-O-acetyl-4,6-O-benzylidene-β-D-galactopyranoside, Methyl 5,6-O-isopropylidene-β-D-galactofuranoside, Methyl 2-O-benzoyl-4,6-O-benzylidene-β-D-galactopyranoside, Methyl 3,4-O-isopropylidene-β-D-galactopyranoside, Methyl 3-O-benzoyl-4,6-O-benzylidene-β-D-galactopyranoside, Methyl 4,6-O-isopropylidene-β-D-galactopyranoside, Methyl 6-O-benzoyl-3,4-O-benzylidene-α-D-galactopyranoside, Methyl 3,4-O-isopropylidene-2-O-methyl-α-D-galactopyranoside, Methyl 6-()-benzoylgalactopyranoside-α-D-form, Methyl 3,4-α-isopropylidene-2-O-methyl-β-D-galactopyranoside, Methyl 2-O-benzyl-4,6-O-benzylidene-β-D-galactopyranoside, Methyl 2-()-mesyl-3,4,6-tri-O-methyl-β-D-galactopyranoside, Methyl 4,6-()-benzylidene-2,3-di-O-methyl-α-D-galactopyranoside, Methyl 4,6-O-methylene-α-D-galactopyranoside. Methyl 4,6-O-benzylidene-2,3-di-()-methyl-β-D-galactopyranoside. Methyl 3-O-methyl-β-D-galactofuranoside, Methyl 4,6-O-benzylidene-2,3-di-O-tosyl-1-D-galactopyranoside, Methyl 2-O-methyl-α-D-galactopyranoside. Methyl 3,4-O-benzylidene-β-D-galactopyranoside, Methyl 2-()-methyl-α-D-galactopyranoside, Methyl 4,6-O-benzylidene-β-D-galactopyranoside, Methyl 3-O-methyl-α-D-galactopyranoside, Methyl 4,6-()-benzylidene-β-D-galactopyranoside, 2,3-Di-Me, Methyl 3-()-methyl-β-D-galactopyranoside, Methyl 4,6-()-benzylidene-3-O-methyl-α-D-galactopyranoside, Methyl 4-()-methyl-α-D-galactopyranoside, Methyl 4,6-O-benzylidene-3-O-methyl-β-D-galactopyranoside, Methyl 4-()-methyl-α-D-galactopyranoside, Methyl 4,6-O-benzylidene-3-O-tosyl-β-D-galactopyranoside. Methyl 6-()-methyl-α-D-galactopyranoside, Methyl 3,4-()-(1-carboxyethylidene)-β-D-galactopyranoside, Methyl 6-O-methyl-β-D-galactopyranoside. Methyl 2,3-di-O-acetyl-4,6-()-benzylidene-β-D-galactopyranoside, Methyl 3)-O-methyl-6-O-trityl-β-D-galactofuranoside, Methyl 3,6-di-O-benzoyl-α-D-galactopyranoside, Methyl 2,3,5,6-tetra-()-benzyl-β-D-galactofuranoside, Methyl 2,3-di-O-benzyl-4,6-O-benzylidene-β-D-galactopyranoside, Methyl 2,3,5,6-tetra-O-benzyl-β-D-(galactofuranoside. Methyl 2,3-di-()-benzyl-α-D-galactofuranoside. Methyl 2,3,4,6-tetra-()-benzyl-β-D-galactopyranoside, Methyl 2,3-di-O-benzyl-D-D-galactopyranoside, Methyl 2,3,5,6-tetra-O-methyl-α-D-galactofuranoside, Methyl 2,3-Di-O-benzyl-5,6-O-isopropylidene-α-D-galactofuranoside, Methyl 1-thio-β-D-galactopyranoside, Methyl 2,3-di-O-benzyl-5,6-O-isopropylidene-β-D-galactofuranoside, Methyl 6-O-tosyl-α-D-galactopyranoside, Methyl 2,3-di-()-methyl-α-D-galactopyranoside, Methyl 2,3,6-tri-C-benzoyl-α-D-galactopyranoside, Methyl 2,3-di-()-methyl-β-D-galactopyranoside, Methyl 2,3,4-tri-O-methyl-α-D-galactopyranoside, Methyl 2,4-di-n-methyl-α-D-galactopyranoside, Methyl 2,3,5-tri-O-methyl-α-D-galactofuranoside, Methyl 2,4-di-()-methyl-β-D-galactopyranoside, Methyl 2,3,6-tri-()-methyl-α-D-galactopyranoside, Methyl 3,4-di-O-methyl-β-D-galactopyranoside, Methyl 2,3,6-tri-()-methyl-β-D-galactopyranoside, Methyl 3,6-di-O-methyl-β-D-galactopyranoside, Methyl 2,4,6-tri-()-methyl-α-D-galactopyranoside, Methyl 4,6-di-O-methyl-β-D-galactopyranoside, Methyl 2,4,6-tri-1-methyl-β-D-galactopyranoside, Methyl 2,6-di-()-methyl-3,4-O-isopropylidene-β-D-galactopyranoside, Methyl 6-O-trityl-β-D-galactofuranoside, Methyl 3,4-()-ethylidene-β-D-galactopyranoside, Methyl 6-O-trityl-β-D-galactopyranoside, Methyl 4,6-()-ethylidene-α-D-galactopyranoside, Penta-O-acetyl(galactose; α-D-Pyranose-form, Methyl galactofuranoside; α-D-form, Penta-O-acetylgalactose; β-D-Pyranose-form, Methyl galactofuranoside; β-D-form, Penta-O-acetyl; galactose, α-D-Furanose-form, Methyl α-D-galactopyranoside, Penta-O-acetylgalactose; β-D-Furanose-form, Methyl α-D-galactopyranoside, 2,3-Dibenzyl, 2,3,4,5,6-Penta-O-acetyl-D-galactose diethyldithioacetal, Methyl β-D-galactopyranoside, Phenyl 4,6-O-benzylidene-α-D-galactopyranoside, Methyl β-D-galactopyranoside, 9,3,6-Tribenzyl, Phenyl 4,6-O-benzylidene-β-D-galactopyranoside, Methyl β-D-galactopyranoside; Tetra-Me, Phenyl galactopyranoside; α-D-form, Phenyl galactopyranoside; β-D-form, 1,6-Anhydro-2,3,5-tri-O-methyl-f-D-glucose, Phenyl-thio-α-D-galactofuranoside, Arbutin, Phenyl 2,3,4-tri-O-benzyl-α-D-galactopyranoside, Asperuloside Phenyl 2,3,4-tri-O-benzyl-β-D-galactopyranoside, 2-Azido-2-deoxyglucopyranosyl bromide, α-D-form, 2,3,4,6-Tetra-O-benzyl-α-D-galactopyranosyl chloride, 2-Azido-2-deoxyglucose, D-form, 2,3,4,6-Tetra-O-benzylgalactose; α-D-Pyranose-form, 6-O-Benzoyl-3,5-()-benzylidene-1,2-()-isopropylidene-α-D-glucofuranose, 2,3,4,6-Tetra-O-benzylgalactose, α-D-Pyranose-form, Ac, 3-O-Benzoyl-1,2:4,6-di-O-benzylidene-α-D-glucopyranose, 2,3 4,6-Tetra-()-methylgalactose, α-D-Pyranose-form, 3-O-Benzoyl-1,2,:5,6-di-O-isopropylidene-α-D-glucopyranose, 2,3,4,6-Tetra-()-methyl(galactose; β-D-Pyranose-form, 1-O-Benzoylglucose, β-D-form, 2,3,5,6-Tetra-()-methylgalactose, D-Furanose-form, 6-O-Benzoyl-D-glucose diethyldithioacetal, 6-()-Tosyl-D-galactopyranose, 6-O-Benzyl-3,5-O-benzylidene-1,2-O-cyclohexlyidene-α-D-glucofuranose, 2,3,4-Tri-O-benzyl-α-D-galactopyranose, Benzyl 4,6-O-benzylidene-α-D-glucopyranoside, 2,3,6-Tri-O-benzyl-D-galactopyranose, Benzyl 4,6-O-benzylidene-β-D-glucopyranoside, 2,4,6-Tri-O-benzyl-D-galactopyranose, 6-O-Benzyl-3,5-O-benzylidene-1,2-O-isopropylidene-α-D-glucofuranose, 2,2,2-Trichloroethyl galactopyranoside, α-D-form, Benzyl 4,6-O-benzylidene-2-O-tosyl-α-D-glucopyranoside, 2,2,2-Trichloroethyl galactopyranoside; α-D-form, 2,3,6-Tribenzoyl, Benzyl 4,6-O-benzylidene-2,3-(O-tosyl-α-D-glucopyranoside, 2,2,2-Trichloroethyl 2,3,4,6-tetra-O-acetyl-α-D-galactopyranoside, 3,0-Benzyl-1,2-O-cyclohexylideneglucofuranose; α-D-form, 2,2,2-

Trichloroethyl 2,3,4,6-tetra-O-acetyl-β-D-galactopyranoside, Benzyl 2,4-diamino-2,4-dideoxy-α-D-glucopyranoside, 2,3,4-Tri-O-methylgalactose; α-D-Pyranose-form, Benzyl 2,3-O-dibenzyl-4,6-O-benzylidene-α-D-glucopyranoside, 2,3,5-Tri-()-methyl(galactose; D-Furanose-form, Benzyl 2,3-di-O-benzyl-, 6-O-benzylidene-β-D-glucopyranoside, 2,3,6-Tri-O-methylgalactose; D-Pyranose-form, Benzyl 2,3-di-O-benzyl-β-D-glucopyranoside, 2,4,6-Tri-O-methylgalactose; α-D-Pyranose-form, Benzyl 2,3-O-dibenzyl-6-O-trityl-α-D-glucopyranoside, 3,4,6-Tri-α-O-methylgalactose; α-D-Pyranose-form, Benzyl 2,3-di-O-benzyl-D-D-glucopyranoside, Benzyl glucopyranoside-α-D-form, 2-O-Benzylglucose; D-form, 3,5-O-Benzylidene-1,2-O-cyclohexylidene-α-D-glucofuranose, 4,6-O-Benzylideneglucopyranose, α-D-form, Acacipetalin, 1,2-O-Benzylideneglucose; α-D-Pyranose-form, 3-Acetamido-3-deoxy-β-D-glucopyranose, 1,2-O-Benzylideneglucose; α-D-Furanose-form, 4-Acetamido-4-deoxy-α-D-glucopyranoside, 1,2-O-Benzylidene-5,6-O-isopropylidene-α-D-glucofuranose, 3-Acetamido-3-deoxy-1,2-O-isopropylidene-α-D-glucofuranose, 3,5-O-Benzylidene-1,2-O-isopropylideneglucofuranose; α-D-form, 2-Acetamido-2-deoxy-5-thio-β-D-glucopyranose, 4,6-O-Benzylidene-1,2-O-isopropylidene-α-D-glucopyranose, 2-Acetamido-2-deoxy-3,4,6-tri-()-acetylglucopyranosyl chloride, 3,5-O-Benzylidene-1,2-O-isopropylidene-6-O-mesyl-α-D-glucofuranose, 6-O-Acetyl-3,5-O-benzylidene-1,2-O-isopropylidene-α-D-glucofuranose, 6-O-Benzyl-1,2-()-isopropylidene-3,5-di-O-methyl-α-D-glucofuranose, 3-()-Acetyl-4,6-O-benzylidene-1,2-O-(1-methoxyethylidene)-α-D-glucopyranose, 3-O-Benzyl-1,2-O-isopropylidene-α-D-glucofuranose, 3-()-O-Acetyl-1,2:4,6-di-O-benzylidene-α-D-glucopyranose, 6-O-Benzyl-1,2-O-isopropylidene-α-D-glucofuranose, 3-O-Acetyl-1,2-4,5-di-()-isopropylidene-α-D-glucoseptanoside, Benzyl 1-thio-α-D-glucopyranoside, 6-()-Acetylglucose; D-form, Benzyl 2,3,4-tri-O-benzyl-β-D-glucopyranoside. Allyl glucopyranoside, α-D-form, Benzyl 2,3,6-tri-O-benzyl-α-D-glucopyranoside, Allyl glucopyranoside; β-D-form, Benzyl 2,3,6-tri-O-benzyl-α-D-glucopyranoside, Amarogentin, Blepharin, Amaroswerin, 2-Bromoethyl 4,6-O-benzylidene-α-D-glucopyranoside, 3-Amino-3-deoxyglucose; α-D-Pyranose-form, Me glycoside, N-Ac, 2-Bromoethyl 2,3,6-tri-O-benzyl-α-D-glucopyranoside, 4-Amino-4-deoxyglucose; D-form, 8-Carboxyoctyl glucopyranose; α-D-form, 2-Amino-2-deoxy-5-thioglucose; α-D-Pyranose form, N, 1,3,4,6-Penta-Ac, 8-Carboxyoctyl glucopyranose; β-D-form, 4-Aminophenyl glucopyranoside; α-D-form, Cerasine, 4-Aminophenyl glucopyranoside; β-D-form, Corolin, 1,6-Anhydro-2,4-diazido-2,4-dideoxy-β-D-glucopyranose, Coronarian, 5,6-Anhydro-1,2-O-isopropylidene-α-D-glucofuranose, Coronillin, Crassinodine, 2-Glucopyranosyltheophylline; β-D-form, 1,2-O-Cyclohexylideneglucofuranose; α-D-form, Glucose, D-form, Phenylhydrazone, 1,2-O-Cyclohexylideneglucofuranose; α-D-form, 3,5,6-Orthoformate, Glucose; D-form, Phenylosazone, 1,2-O-Cyclohexylideneglucofuranose-3,5-()-methylene-α-D-glucofuranose, Glucose; D-form, Oxime, penta-Ac, Diedaclin, Glucose; D-form, Di-Me dithioacetal, 2,4-Diacetamido-2,4-dideoxy-D-glucose, Glucose; D-form, Dibenzyl dithioacetal, 2,3-Diamino-2,3-dideoxyglucose; α-D-Pyranose-form, Glucose; α-D-Pyranose-form, 2,3-Diamino-2,3-dideoxyglucose; β-D-Pyranose-form, Glucose; β-D-Pyranose-form, 2,4-Diamino-2,4-dideoxyglucose; D-form, Glucose; L-form, 2,4-Diazido-2,4-dideoxyglucose; D-form, Glucose; DL-form, 1,2:3,5-Di-O-benzylidene-α-D-glucofuranose, aldehydo-Glucose; D-form, 2,3,4,5,6-Pentabenzoyl, 1,2 4,6-Di-()-benzylidene-α-D-glucopyranose, aldehydo-Glucose; D-form, 2,3,4,5,6-Pent α-Ac, 1,2:4,6-Di-O-benzylidene-3-mesyl-α-D-glucopyranose, aldehydo-Glucose; D-form, 2,3,4,5,6-Penta-Me, 1,2:5,6-Di-O-cyclohexylidene-()-D-glucofuranose, aldehydo-Glucose, D-form, Dibenzyl acetal, 1,3,5,6-di-O-isopropylidene, 1,2:5,6-Di-O-cyclohexylidene-3-()-tosyl-α-D-glucofuranose, aldehydo-Glucose; D-form, Dibenzyl acetal, 3,4:5,6-di-O-isopropylidene, 1,2:5,6-Di-O-isopropylideneglucofuranose; α-D-form, Glucose diethyldithioacetal; D-form, 1,2:5,6-Di-()-isopropylideneglucofuranose; α-D-form, 3-(2,2,2-, Glucose diethyldithioacetal, D-form, 6-Benzoyl, 2,3:4,5-di-O-, Trifluoroethanesulfonyl), isopropylidene, 1,2:5,6-Di-O-isopropylideneglucofuranose; α-D-form, 3-,Glucose 1-dihydrogen phosphate; α-D-Pyranose-form, (Pentafluorobenzenesulfonyl), Glucose 1-dihydrogen phosphate; α-L-Pyranose-form, 1,2:5,6-Di-O-isopropylideneglucofuranose. α-D-form, 3-, Glucose 2-dihydrogen phosphate; D-form, Xanthate, Glucose 3-dihydrogen phosphate, D-form, 1,2:5,6-Di-O-isopropylideneglucofuranose; α-D-form, 3-tert-Butyl, Glucose 4-dihydrogen phosphate, D-form, 1,2:5,6-Di-O-isopropylideneglucofuranose, α-D-form, 3-Trityl, Glucose diphenylformazan, 1,2:3,4-Di-O-isopropylidene-α-D-glucoseptanoside, Glucosylamine; D-form, 1,2:5,6-Di-O-isopropylidene-3-O-mesyl-α-D-glucofuranose, D-Glucothiapyranose, 1,2:3,4-Di-O-isopropylidene-5-O-methyl-α-D-glucoseptanoside, Gynocardin, 1,2 5,6-Di-O-isopropylidene-3-O-tosyl-α-D-glucofuranose, D-glycero-L-manno-Heptitol, 2,3-Di-O-methylglucose; α-D-Pyranose-form, D-glycero-L-manno-Heptitol; Hepta-Ac, 2,4-Di-O-methylglucose; β-D-Pyranose-form, 1,2-O-Isopropylidene-3,5-di-()-methyl-α-D-glucofuranose, 2,6-Di-()-methylglucose; D-form, 1,2-O-Isopropylidene-5,6-di-()-methyl-α-D-glucofuranose, 3,4-Di-()-methylglucose; β-D-Pyranose-form, 1,2-()-Isopropylidene-3,4-di-()-methyl-α-D-glucopyranose, 3,5-Di-()-methylglucose; D-Furanose-form, 1,2-O-Isopropylidene-3,5-di-()-methyl-6-()-tosyl-α-D-(glucofuranose, 3,6-Di-()-methylglucose; α-D-Pyranose-form, 1,2-()-Isopropylidene-3,5-di-()-methyl-6-O-trityl-α-D-glucofuranose, 4,6-Di-()-methylglucose; α-D-Pyranose-form, 1,2-O-isopropylideneglucofuranose;-α-D-form, 5,6-Di-()-methylglucose, D-form, 1,2-O-Isopropylideneglucofuranose;-α-D-form, 5,6-Carbonate, 1,6-Dithioglucose; D-form, 1,2-O-Isopropylideneglucofuranose-α-D-form, 5,6-Thiocarbonate, Ethyl glucoside; α-D-Pyranose-form, 1,2-O-Isopropylidene-α-glucoseptanose, Ethyl glucoside; β-D-Pyranose-form, 1,2-O-Isopropylidene-6-O-mesyl-α-D-glucofuranose, Ethyl glucoside; α-D-Furanose-form, 1,2-O-Isopropylidene-5-O-methyl-α-D-glucofuranose, Ethyl glucoside; β-D-Furanose-form, 1,2-()-Isopropylidene-6-thio-α-D-glucofuranose, Ethyl 2,3,4,6-tetra-O-acetyl-1-thio-α-D-mannopyranoside, 1,2-O-Isopropylidene-3-O-tosyl-α-D-glucofuranose, Ethyl 1-thio-β-D-glucofuranoside, 1,2-()-Isopropylidene-6-O-tosyl-α-D-glucofuranose, Ethyl 1-thio-α-D-glucopyranoside, 1,2-O-Isopropylidene-3,5,6-tri-()-methyl-α-D-glucofuranose, Ethyl 1-thio-β-D-mannopyranoside, 1,2-O-Isopropylidene-3,4,6-tri-1-()-methyl-α-D-glucopyranose, Ethyl 2,3,4-tri-O-acetyl-β-D-glucopyranoside, Isoranunculin, Ethyl 3,4,6-tri-()-benzyl-α-D-glucopyranoside, Kanosamine, Ethyl 3,4,6-tri-O-benzyl-β-D-glucopyranoside, Lilioside B, Eximin, Lilioside A, Linamarin, Methyl 4,6-di-O-methyl-α-D- glucopyranoside, Melampyroside, Methyl 4,6-di-O-methyl-α-D-glucopyranoside, Methyl 3-acetamido-4,6-O-benzylidene-3-deoxy-α-D-glucopyranoside, Methyl 3,4-di-O-methyl-6-O-trityl-β-D-(glucopyranoside, Methyl 2-acetamido-2-deoxy-5-thio-β-D-glucopyranoside. Methyl o-D-glucofuranoside, 1-O-(N-Methyl)acetamidyl-2,3,4,6-tetra-O-acetyl-α-D-glucopyranoside, Methyl α-D-glucofuranoside; 5,6-Carbonate, Methyl 2-O-acetyl-4,6-O-benzylidene-α-D-glucopyranoside, Methyl D-D-glucofuranoside, Methyl 3-O-acetyl-4,6-O-benzylidene-α-D-glucopyranoside, Methyl β-D-glucofuranoside, 5,6-Carbonate, Methyl 6-O-acetyl-α-D-glucopyranoside, Methyl α-D-glucopyranoside, Methyl 6-O-acetyl-β-D-glucopyranoside, Methyl α-D-glucopyranoside; 4,6-O-Ethylidene, Methyl 3-amino-4,6-O-benzylidene-3-deoxy-α-D-glucopyranoside, Methyl α-D-glucopyranoside, Methyl 3-amino-3-deoxy-β-D-glucopyranoside, Methyl α-L-glucopyranoside, Methyl 4,6-O-benzylidene-2-O-benzoyl-α-D-glucopyranoside, 2-O-Methylglucose; D-form, Methyl 4,6-O-benzylidene-2,3-di-O-benzoyl-α-D-glucopyranoside, 3-()-Methylglucose; α-D-Pyranose-form, Methyl 4,6-O-benzylidene-2,3-di-O-tosyl-α-D-glucopyranoside, 3-()-Methylglucose; β-D-Pyranose-form, Methyl 4,6-O-benzylidene-2,3-di-O-tosyl-β-D-glucopyranoside, 4-O-Methylglucose; D-form, Methyl 4,6-O-benzylidene-α-D-glucopyranoside, 5-O-Methylglucose; D-form, Methyl 4,6-O-benzylidene-β-D-glucopyranoside, 6-O-Methylglucose; D-form, Methyl 4,6-O-benzylidene-2-O-methyl-α-D-glucopyranoside, Methyl β-D-glucoseptanoside, Methyl 4,6-O-benzylidene-2-O-methyl-β-D-glucopyranoside, Methyl α-D-glucopyranoside, Methyl 4,6-O-benzylidene-3-O-methyl-α-D-glucopyranoside, Methyl β-D-glucothiapyranoside, Methyl 4,6-O-benzylidene-3-O-methyl-yl-D-glucopyranoside, Methyl 4,6-()-isopropylideneglucopyranoside; α-D-form, Methyl 4,6-()-benzylidene-2 ()-tosyl-β-glucopyranoside, Methyl 4,6-()-isopropylideneglucopyranoside, β-D-form, Methyl 4,6-O-benzylidene-3-O-tosyl-α-D-glucopyranoside, Methyl 4,5-()-isopropylidene-α-D-glucoseptanoside, Methyl 4,6-O-benzylidene-3-O-tosyl-β-D-glucopyranoside, Methyl 4,6-()-methylene-α-D-glucopyranoside, Methyl 2-O-benzyl-3,4,6-tri-O-methyl-5-D-glucopyranoside, Methyl 4,6-O-methylene-β-D-glucopyranoside, Methyl 2,3-di-O-acetyl 4,6-O-benzylidene-α-D-glucopyranoside, Methyl 2-O-methyl-α-D-glucopyranoside, Methyl 2,3-di-()-acetyl 4,6-O-benzylidene-β-D-glucopyranoside. Methyl 2-()-methyl-β-D-glucopyranoside, Methyl 2,3-di-O-benzoyl-6-()-benzyl-α-D-glucopyranoside, Methyl 3-O-methyl-α-D-glucopyranoside, Methyl 2,3-di-O-benzoyl-4,6-O-benzylidene-β-D-glucopyranoside, Methyl 3-O-methyl-β-D-glucopyranoside, Methyl 2,3-di-O-benzyl-4,6-O-benzylidene-β-D-glucopyranoside, Methyl 4-O-methyl-α-D-glucopyranoside, Methyl 2,3-di-()-benzyl-β-D-glucofuranoside, Methyl 4-O-methyl-β-D-glucopyranoside. Methyl 2,3-di -O-benzyl-α-D-glucopyranoside, Methyl 6-()-methyl-α-D-glucopyranoside. Methyl 2,3-di ()-benzyl-β-D-glucopyranoside, Methyl 6-O-methyl-α-D-glucopyranoside. Methyl 2,3-di-O-benzyl-α-S-mesyl-O-β-trityl-β-D-glucofuranoside, Methyl 4,6-O-propylidene-α-D-glucopyranoside, Methyl 2,3:4,6-di-O-isopropylidene-β-D-glucopyranoside, Methyl 4,6-O-salicylidene-α-D-glucopyranoside, Methyl 2,3:4,5-di-()-isopropylidene-α-D-glucoseptanoside, Methyl tetra-O-acetyl-α-D-glucothiapyranoside, Methyl 2,3:4,5-di-O-isopropylidene-α-D-glucoseptanoside, Methyl tetra-O-acetyl-α-D-glucothiapyranoside, Methyl 2,3:4,5-di-O-isopropylidene-β-D-glucoseptanoside, Methyl 2,3,4,6-tetra-O-benzyl-α-D-glucopyranoside, Methyl 3,6-di-O-methyl-2,4-di-O-tosyl-β-D-glucopyranoside, Methyl 2,3,4,6-tetra-O-benzyl-β-D-glucopyranoside, Methyl 4,6-di-O-methyl-2,3-di-O-tosyl-α-D-glucopyranoside, Methyl 2,3,5,6-tetra-O-methyl-β-D-glucofuranoside, Methyl 2,3-di-O-methyl-α-D-glucopyranoside, Methyl 2,3,4,6-tetra-O-methyl-α-D-glucopyranoside, Methyl 2,3-di-()-methyl-β-D-glucopyranoside, Methyl 2,3,4,6-tetra-O-methyl-D-D-glucopyranoside, Methyl 2,4-di-()-methyl-β-D-D-glucopyranoside, Methyl 2,3,4,6-tetra-O-tosyl-β-D-glucopyranoside, Methyl 2,6-di-O-methyl-α-D-glucopyranoside, Methyl 6-thio-β-D-galactoseptanoside, Methyl 2,6-di-()-methyl-D-D-(glucopyranoside, Methyl 1-thio-α-D-glucopyranoside, Methyl 2,6-di-()-methyl-β-D-glucopyranoside, Methyl 1-thio-β-D-glucopyranoside, Methyl 3,4-di-()-methyl-yl-D-glucopyranoside, Methyl 6-O-tosyl-α-D-glucopyranoside, Methyl 3,4-di-O-methyl-β-D-glucopyranoside, Methyl 3,4,6-tri-O-acetyl-2-O-benzyl-β-D-glucopyranoside, Methyl 3,6-di-O-methyl-β-D-glucopyranoside, Methyl 2,3,6-tri-O-benzyl-α-D-glucopyranoside, Methyl 2,3,5-tri-O-methyl-α-D-glucofuranoside, Methyl 3,5,6-ti-1-()-methyl-yl-D-glucofuranoside, Methyl 2,3,4-tri-O-methyl-β-D-glucopyranoside, Methyl 2,3,6-tri-()-()-methyl-β-D-glucofuranoside, Methyl 2,3,6-tri-O-methyl-β-D-glucopyranoside, Methyl 2,4,6-tri-O-methyl-β-D-glucopyranoside, Methyl 3,4,6-tri-O-methyl-α-D-glucopyranoside, Methyl 3,4,6-tri-()-methyl-β-D-glucopyranoside, Methyl 2,4,6-tri-O-methyl-3-()-tosyl-α-D-glucopyranoside. Methyl 2,4,6-tri-()-1-ethyl-3-()-tosyl-β-D-glucopyranoside, Methyl 6-()-(triphenylmethyl)(glucopyranoside, α-D-form, Methyl 6-O-(triphenylmethyl)glucopyranoside; β-D-form, Neosamine C, 6-()-Acetylarbutin, 1,2,3,5,6-Penta-O-acetylglucofuranoside, β-D-form, 1,2,3,4,6-Penta-()-acetylglucopyranose; α-D-form, 1,2,3,4,6-Penta-O-acetylglucopyranose β-D-form, 2,3,4,5,6-Penta-O-acetyl-D-glucose diethyldithioacetal, 1,2,3,4,6-Penta-O-acetyl-6-thio-α-D-galactopyranose, 1,2,3,4,5-Penta-O-acetyl-6-thio-α-D-galactoseptanose, 1,2,3,4,5-Penta-O-acetyl-6-thio-β-D-galactoseptanose, 2,4-Diacetamido-2,4-dideoxy-D glucose, isopropylidene, Penta-O-acetyl-1-thio-β-D-glucopyranoside, 2,3,4,5,6-Penta-O-methylglucose; D-form, Phenyl 4,6-O-benzylidene-α-D-glucopyranoside. Phenyl 4,6-O-benzylidene-α-O-tosyl-α-D-, glucopyranoside, Phenyl 2,3-O-acetyl-4,6-O-benzylidene-β-D-, glucopyranoside, Phenyl 2,3-di-O-methyl-β-D-glucopyranoside, Phenyl 2,4-di-O-methyl-β-D-glucopyranoside, Phenyl glucopyranoside; α-D-form, Phenyl glucopyranoside; β-D-form, Phenyl 2,3,4,6-tetra-O-acetyl-6-thio-α-D-, galactopyranoside, Phenyl 2,3,4,6-tetra-O-acetyl-6-thio-β-D-, galactopyranoside, Phenyl 2,3,4,6-tetra-O-acetyl-6-thio-α-D-, glucopyranoside, Phenyl 2,3,4,6-tetra-O-acetyl-6-thio-α-D-glucopyranoside, Phenyl 1-thio-α-D-glucofuranoside, Phenyl 1-thio-α-D-glucopyranoside, Piptoside, Procacaciberin, Ranuncoside, Ranunculoside, Robinson ester, 1-Selenoglucose, O-(2,3,4,6-Tetra-O-acetyl-α-D-glucopyranosyl )-, trichloroacetimidate, 2,3,4,6-Tetra-O-acetyl-1-thio-β-D-glucopyranose, 2,3,4,6-Tetra-O-acetyl-5-thio-α-D-glucopyranosyl, bromide, 3,4,5,6-Tetra-O-benzoyl-D-glucose, diethyldithioacetal, 1,2,3,6-Tetra-O-benzoyl-5-O-methyl-β-D-, glucofuranose, O-(2,3,4,6-Tetra-O-benzyl-α-D-glucopyranosyl)-, trichoroacetimidate, 2,3,4,6-Tetra-O-benzylglucose; α-D-Pyranose-, form, 2,3,4,6-Tetra-O-methylglucose; α-D-Pyranose-, form, 2,3,4,6-Tetra-O-methylglucose; β-D-Pyranose-, form, 2,3,5,6-Tetra-O-methylglucose; D-Furanose-, form, 2,3,5,6-Tetra-O-methyl- 11-O-tosyl-α-D-, glucopyranose, Tetraphyllin B, 1-Thioglucose; D-form, 5-Thioglucose; α-D-Pyranose-form, Penta-Ac, 5-Thioglucose; α-D-Pyranose-form, Me, glycoside, 6-phosphate, 5-Thioglucose; β-D-Pyranose-form, Penta-Ac, 5-Thioglucose; β-D-Pyranose-form, 1-Bromo-tetra-Ac, 6-Thioglucose; α-D-Pyranose-form, 1,2,3,4,6-, Penta-Ac, 1-Thiomannose; β-D-Pyranose-form, 3-O-Tosylglucose; D-form, 3,5,6-Tri-O-acetyl-1,2-O-benzylidene-α-D-, glucofuranose, 3,4,6-Tri-O-acetyl-1,2-O-(R)-benzylidene-α-D-, glucopyranose, 3,4,6-Tri-O-acetyl-1,2-O-(S)-benzylidene-α-D-, glucopyranose, 1,3,6-Tri-O-acetyl-2,4-diazido-2,4-dideoxy-α-D-, glucopyranose, 3,4,6-Tri-O-acetyl-1,2-O-(1-methoxyethylidene)-, α-D-glucopyranose, Tribenoside, 3,4,6-Tri-O-acetyl-1,2-O-(1-methoxyethylidene)-, α-D-glucopyranose, 1,2,3-Tri-O-benzoyl-4,6-O-benzylidene-α-D-, glucopyranose, 1,2,3-Tri-O-benzoyl-4,6-O-benzylidene-β-D-glucopyranose, 3,5,6-Tri-O-benzoyl-D-glucose diethyldithioacetal, 3,4,6-Tri-O-benzyl-1,2-O-(1-methoxyethylidene)-, -D-glucopyranose, 2,2,2-Trichloroethyl 2,3,4,6-tetra-O-acetyl-α-D-, glucopyranoside, 2,2,2-Trichloroethyl 2,3,4,6-tetra-O-acetyl-β-D-, glucopyranoside, 2,3, 4-Tri-O-methylglucose; D-Pyranose-form, 2,3,5-Tri-O-methylglucose; D-form, 2,3, 6-Tri-O-methylglucose; α-D-Pyranose-form, 2,4,6-Tri-O-methylglucose; α-D-Pyranose-form, 3,4,6-Tri-O-methylglucose; α-D-Pyranose-form, 3,4,6-Tri-O-methylglucose; β-D-Pyranose-form, Trimethylsilyl glucopyranoside, Trimethylsilyl 2,3,4,6-tetra-O-acetyl-β-D-, glucopyranoside, Trimethylsilyl 2,3,4,6-tetra-O-benzyl-α-D-, galactopyranoside, Trimethylsilyl 2,3,4,6-tetra-O-methyl-α-D-, glucopyranoside, Trimethylsilyl 2,3,4,6-tetra-O-methyl-α-D-, glucopyranoside, 6-Tuliposide, Uridine diphosphate glucose, Vicine, 3-O-Acetyl-1,2:5,6-di-O-isopropylidene-α-D-, glucofuranose, 2-Amino-2-deoxygulose; D-form, 2-Amino-2-deoxygulose; L-form, 5,6-Anhydro-1,2-O-isopropylidene-3-O-methyl-ac-, D-gulofuranose, 3-O-Benzyl-1,2:5,6-di-O-isopropylidene-α-D-, gulofuranose, 3-O-Benzyl-1,2-O-isopropylidene-α-D-, gulofuranose, 1,2:5,6-Di-O-isopropylidenegulofuranose; α-D-, form, 1,2:5,6-Di-O-isopropylidenegulofuranose; α-D-, form, 3-Me, 1,2:5,6-Di-O-isopropylidene-3-O-tosyl-α-, gulofuranose, 4,6-Di-O-Ethylidene-1,2-O-isopropylidene-α-D-, gulopyranose, Gulose; D-form, Gulose; α-D-Pyranose-form, 4,6-Di-O-Ethylidene, 1,2-O-isopropylidene, 3-benzoyl, Gulose; o-D-Pyranose-form, 4,6-Di-O-Ethylidene, 1,2-O-isopropylidene, 3-tosyl, Gulose; L-form, Gulose; α-L-Pyranose-form, 1,2-O-Isopropylidenegulofuranose; α-D-form, 5,6-Di-Ac, 3-benzyl, 1,2-O-Isopropylidenegulofuranose; α-D-form, 6-, Benzoyl, 3-Me, 1,2-O-Isopropylidenegulofuranose; α-D-form, 3-, Me, 1,2-()-Isopropylidene-3,5,6-tri-O-acetyl-α-D-, gulofuranose, Methyl 4,6-()-benzylidene-α-D-gulopyranoside, Methyl 4,6-O-benzylidene-β-D-gulopyranoside, Methyl 2,3:5,6-(Ii-O-isopropylidene-β-D-, gulopyranoside, Methyl 2,3:5,6-(1i-O-isopropylidene-D-L-, gulofuranoside, Methyl gulopyranoside; α-D-form, Methyl gulopyranoside; β-D-form, Methyl gulopyranoside; - D-form, 4,6-O-, Benzylidene, 2,3-dibenzoyl, Methyl gulopyranoside; α-L form, Methyl gulopyranoside; β-L form, Methyl 2,3-O-isopropylidene-β-D-gulofuranoside, Methyl 2,3-O-isopropylidene-β-L-gulofuranoside, Methyl 4,6-O-isopropylidene-α-D-gulopyranoside, Methyl 2,3,4,6-tetra-O-acetyl-α-D-, gulopyranoside, Methyl 2,3,4,6-tetra-O-acetyl-β-D-,gulopyranoside. Methyl 2,3,4,6-tetra-O-acetyl-α-L-, gulopyranoside, Methyl 2,3,4,6-tetra-O-acetyl-β-L-gulopyranoside, Penta-O-acetyl-α-D-gulopyranose, 2-Amino-2-deoxyidose; D-form, 3-O-Benzyl-1,2:5:6.-di-O-isopropylidene-p-, idofuranose, 3,5-O-Benzylidene-1,2-O-isopropylidene-β-L-, idofuranose, 3,5-O-Benzylidene-1,2-O-isopropylidene-6-O-tosyl-β-L-idofuranose, 1,2:5,6-Di-O-isopropylidene-β-D-idofuranose, 1,2:5,6-Di-O-isopropylidene-β-L-idofuranose, Idose; D-form, Idose; α-D-Pyranose-form, Idose: α-L-Pyranose-form, 1,2-O-isopropylideneidofuranose; β-D-form, 1,2-O-isopropylideneidofuranose; β-L-form, Methyl α-D-idopyranoside, Methyl β-D-idopyranoside, Methyl α-L-idopyranoside, Methyl β-L-idopyranoside, Neosamine B, 1,2,3,4,6-Penta-O-acetyl-5-deoxy-5-mercapto-L-, idopyranose, 1,2,3,4,6-Penta-O-acetyl-α-D-idopyranose, 1,2,3,4,6-Penta-O-benzoyl-α-D-idopyranose, 2,3, 4,6-Tetra-O-benzylidopyranose, 3,5,6-Tri-O-acetyl-1,2-O-isopropylidene-β-L-, idofuranose, Allyl 2,3:5,6-di-O-isopropylidene-α-D-, mannofuranoside, Allyl 2,3:5,6-di-O-isopropylidene-β-D-, mannofuranoside, Allyl 2,3-O-isopropylidene-α-D-mannofuranoside, 2-Amino-2-deoxymannose; D-form, 2-Amino-2-deoxymannose; L-form, 4-Aminophenyl-mannopyranoside; α-D-form, 4-Aminophenyl-mannopyranoside; α-D-form, N, N-Di-Me, Benzyl 2,3-anhydro-4,6-O-benzylidene-α-D-, mannopyranoside, Benzyl 4,6-O-benzylidene-α-D-mannopyranoside, Benzyl 2,3:4,6-O-benzylidene-α-D-, mannopyranoside, Benzyl mannoside: α-D-Pyranose form, Benzyl mannoside; α-D-Furanose form, Benzyl mannoside; α-D-Furanose form, endo-1,2,0-(1-Benzyloxyethylidene)-β-D-, mannopyranose, exo-1,2,0-(1-Benzyloxyethylidene)-β-D-, mannopyranose, 2,6-Diamino-2,6-dideoxymannose; α-D-Pyranose, form, 2,3:5,6-Di-O-isopropylidene-α-D-mannofuranose, 2,3:5,6-Di-O-isopropylidene-α-L-, mannofuranoside, 2,3-Di-O-methylmannose; D-form, 2 4-Di-O-methyl mannose; D-form, 2,6-Di-O-methyl-D-mannose, 3,4-Di-O-methyl mannose; D-form, 3,5-Di-O-methylmannose; D-form, 3,6-Di-O-methyl-D-mannose, 4,6-Di-O-methylmannose; D-form, Man nose; α-D-Pyranose-form, Mannose; β-D-Pyranose-form, Mannose; L-form, Mannosylamine; D-form, Methyl 2,3-anhydro-4,6-O-benzylidene-α-D-, mannopyranoside, Methyl 2,3-anhydro-4,6-O-benzylidene-β-D-, mannopyranoside, Methyl 2-O-benzoyl-4,6-O-benzylidene-α-D-, mannopyranoside, Methyl 3-O-benzoyl-4,6-O-benzylidene-α-D-, mannopyranoside, Methyl 2-O-benzyl-4,6-O-benzylidene-α-D-, mannopyranoside, Methyl 2-O-benzyl-4,6-O-benzylidene-β-D-, mannopyranoside, Methyl 3-O-benzyl-4,6-O-benzylidene-α-D-, mannopyranoside, Methyl 3-O-benzyl-4,6-O-benzylidene-β-D-, mannopyranoside, Methyl 4,6-O-benzylidene-2,3-dimesyl-β-D-, mannopyranoside, Methyl 4,6-O-benzylidene-2,3-O-isopropylidene, α-D-mannopyranoside, Methyl 4,6-O-benzylidene-α-D-, mannopyranoside, Methyl 4,6-O-benzylidene-β-D-, mannopyranoside Methyl 4,6-O-benzylidene-3-O-tosyl-α-D-, mannopyranoside, Methyl 4-O-benzyl-6-O-trityl-α-D-, mannopyranoside, Methyl 2,3:4,6-di-O-benzylidene-α-D-, mannopyranoside, Methyl 2,3:4,6-di-O-ethylidene-α-D-mannopyranoside, Methyl 2,3:4,6-di-O-ethylidene-β-D-, mannopyranoside, Methyl 2,3:5,6-di-O-isopropylidene-α-D-, mannofuranoside, Methyl 2,3:5,6-di-O-isopropylidene-β-D-, mannofuranoside, Methyl 2,3:5,6-di-O-isopropylidene-β-D-, mannofuranoside, Methyl 2,3:4,6-di-O-isopropylidene-α-D-, mannopyranoside, Methyl 1,6-dimesyl-2,3-O-isopropylidene-α-L-, mannofuranoside, Methyl 2,3:5,6-di-O-methylene-α-D-, mannofuranoside, Methyl 2,3:4,6-di-O-methylene-α-D-, mannopyranoside, Methyl 2,3-di-O-methyl-α-D-mannopyranoside, Methyl 2,4-di-O-methyl-α-D-mannopyranoside, Methyl 3,4-di-O-methyl-α-D-mannopyranoside, Methyl 4,6-di-O-methyl-α-

D-mannopyranoside, Methyl 4,6-di-O-ethylidenhemannopyranoside; α-D-form, Methyl 4,6-di-O-ethylidenemannopyranoside; α-D-form, 3-Tosyl, Methyl 4,6-di-O-ethylidenemannopyranoside; α-D-form, 2,3-Ditosyl, Methyl 4,6-di-O-ethylidenemannopyranoside; β-D-form, 2,3-Ditosyl, Methyl 2,3-O-isopropylidenemannopyranoside: α-D-form, Methyl 2,3-O-isopropylidene-6-O-trityl-β-D-, mannopyranoside; Methyl mannofuranoside; α-D-form, Methyl mannofuranoside; '-D-form, Methyl α-D-mannopyranoside, Methyl β-D-mannopyranoside, Methyl α-L-mannopyranoside, 2-O-Methylmannose; D-form, 3-O-Methylmannose; D-form, 4-O-Methylmannose; D-form, 6-O-Methylmannose; D-form, Methyl 4,6-O-methylene-α-D-mannopyranoside, Methyl 4-O-methyl-α-D-mannopyranoside, Methyl 6-O-methyl-α-D-mannopyranoside, Methyl 2,3,4,6-tetra-O-acetyl-α-D-, mannopyranoside, Methyl 2,3,4,6-tetra-O-benzoyl-α-D-, mannopyranoside, Methyl 2-O-tosyl-6-O-trityl-α-D-, mannopyranoside, Methyl 3-O-tosyl-6-O-trityl-α-D-, mannopyranoside, Methyl 4-O-tosyl-6-O-trityl-α-D-, mannopyranoside, Methyl 2,3,4-tri-O-benzyl-6-O-trityl-β-D-, mannopyranoside, Methyl 2,3,6-tri-O-methyl-α-D-mannopyranoside, Methyl 2,4,6-tri-O-methyl-α-D-mannopyranoside, Methyl 3,4,6-tri-O-methyl-α-D-mannopyranoside, Methyl 6-O-tritylmannofuranoside; α-D-form, Methyl 6-O-tritylmannopyranoside; α-D-form, 1,2,3,4,6-Penta-O-acetyl-α-D-mannopyranose, 1,2,3,4,6-Penta-O-acetyl-β-D-mannopyranose, 1,2,3,4,6-Penta-O-acetyl-β-D-mannopyranose, 1,2,3,4,6-Penta-O-benzoyl-β-D-mannopyranose, 1,2,3,4,6-Penta-O-benzoyl-β-D-mannopyranose, 2-Propenyl mannopyranoside, 2,3,4,6-Tetra-O-acetyl -β-D-mannopyranoside, endo-3,4,6-Tri-O-acetyl-1,2-O-(1-, methoxyethylidene)-β-D-mannopyranose, exo-3,4,6-Tri-O-acetyl-1,2-O-(1-, methoxyethylidene)-β-D-mannopyranose, 2,3,4-Tri-O-methyl-D-mannose, 2,3,6-Tri-O-methylmannose; D-form. 2), 4,6-Tri-O-methyl mannose; D-form, 3,4,6-Tri-O-methylmannose; α-D-Pyranose-, form, 3-O-Acetyl-1,2:5,6-(di-O-isopropylidene-β-D-, talofuranose, 2-Amino-2-deoxytalose; D-form, 2,5-Anhydrotalose; D-form, 2,5-Anhydro-3,4,6-tri-O-benzoyl-L-talose, dimethylacetal, 2,5-Anhydro-3,4,6-tri-O-benzyl-L-talose dimethylacetal, 3-O-Benzyl-1,2-O-isopropylidene-β-D-, talopyranose, 1,2:5,6-Di-O-isopropylidene-β-D-talofuranose, 1,2:5,6-Di-O-isopropylidene-β-L-talofuranose, 1,2:5,6-Di-O-isopropylidene-3-O-tosyl-β-D-, talofuranose, 1,2:5,6-Di-O-isopropylidene-3-O-tosyl-β-L-, talofuranose, 1,2-O-isopropylidene-3-O-methyl-D-D-, talopyranose, 1,2-O-isopropylidenetalofuranose; β-L-form, 1,2-O-isopropylidenetalofuranose; β-L-form, 5,6-O-Isopropylidene, 3-benzyl, 1,2-O-isopropylidenetalofuranose; β-L-form, 3-, Benzoyl, 1,2-O-isopropylidenetalofuranose; P3-L-form, 6-, Benzoyl, 3-Me, 1,2-O-isopropylidenetalofuranose; β-L-form, 5,6-, Dibenzoyl, 3-Me, 1,2-O-isopropylidenetalofuranose; β-L-form, 3-, Benzyl, 5,6-dibenzoyl, 1,2-O-isopropylidenetalofuranose; β-L-form, 5-, Tosyl, 3-benzyl, 6-trityl, 1,2-O-isopropylidenetalofuranose; 3-L-form, 3-, benzyl, 6-trityl, Methyl 2,3-anhydro-4,6-O-, benzylidenetalopyranoside; α-D-form, Methyl 2,3-anhydro-4,6-O-, benzylidenetalopyranoside; β-D-form, Methyl 2,3-isopropylidene-6-O-methyl-α-D-, talopyranoside, Methyl 6-O-methyl-()-D-talopyranoside, Methyl α-D-talofuranoside, Methyl α-D-talofuranoside, Methyl o-D-talopyranoside, Methyl β-D-talopyranoside, 1,2,3,4,6-Penta-O-acetyl-α-D-talopyranose, 1,2,3,5,6-Penta-O-benzoyl-α-D-talofuranoside, Talose; α-D-Pyranose-form, Talose; α-D-Pyranose-form, Me glycoside, 2,3-, O-isopropylidene, 4-Ac, 6-Me, Talose; β-D-Pyranose-form, Talose; L-form, 3,5,6-Tri-O-benzoyl-1,2-O-isopropylidene-β-D-, talofuranose, 2-Amino-1,3,4-isosanetriol, 7-Deoxy-D-glycero-D-gluco-heptose, 7-Deoxy-L glycero-L-galacto-heptose, 7-Deoxy-L glycero-L-galacto-heptose; α-, Pyranose-form, Penta-Ac, 7-Deoxy-L glycero-L-galacto-heptose; β-, Pyranose-form, Penta-Ac, 7-Deoxy-L glycero-D-gluco-heptose; 1,2:5,6-Di-O-isopropylidene-D-glycero-L-gluco, -β-heptofuranose, 1,2:6,7-Di-O-isopropylidene-D-glycero-L-gluco, -β-heptofuranose, 1,2:3,4-Di-O-isopropylidene-L-glycero-α-D-, galacto-7-octulopyranose trimethylenedithioacetal, D-glycero-D-gluco-Heptose, D-glycero-D-gluco-Heptose; α-Furanose-form, D-glycero-D-galacto-Heptose; α-form, D-glycero-D-galacto-Heptose; D-form, D-glycero-D-manno-Heptose, D-glycero-D-manno-Heptose; Hexa-Ac, D-glycero-D-gluco-Heptose, D-glycero-L-manno-Heptose; 2,3,4,5,6,7-Hexa-Ac, D-glycero-L-manno-Heptose; β-Pyranose-form, 1,2,3,4,6-Pentabenzoyl, D-glycero-L-manno-Heptose; β-Pyranose-form, Me glycoside, D-glycero-L-manno-Heptose; β-Pyranose-form, Et glycoside, D-glycero-L-manno-Heptose; β-Furanose-form, 2,3:6,7-Di-O-isopropylidene, D-glycero-L-galacto-Heptose, D-glycero-L-gluco-Heptose; β-form, D-glycero-L-gluco-Heptose; D-form, L-glycero-D-manno-heptose, L-glycero-D-manno heptose; 1-Phosphate, dicyclohexylammonium salt, Hikosamine; Me α-glycoside, N-Ac, Hikosamine; Me β-glycoside, N-Ac, Lincomycin, Lincosamine; Di-Me dithioacetal, Methyl 6-amino-6,8-dideoxy-1-thio-β-D-erythro-α-, D-galacto-octopyranoside, Methyl 7-deoxy-L-glycero-L-galacto-, heptofuranoside, Methyl 7-deoxy-L-glycero-L-galacto-α-, heptopyranoside, Methyl 7-deoxy-L-glycero-L-galacto-, heptopyranoside, Methyl 5,6-dideoxy-1,3:8,9:10,11-tri-O-, isopropylidene L-lyxo-α-L-talo-undec-5-, enodialdo-1,4-furanoside-11,7-pyranose; (E)-, form, Methyl 5,6-dideoxy-2,3:8,9:10,11-tri-O-, isopropylidene L-lyxo-α-L-talo-undec-5-, enodialdo-1, 4-furanoside-11,7-pyranose; (Z)-, form, Methyl D-glycero-D-gulo-α-heptofuranoside, Methyl D-glycero-D-gulo-p-heptofuranoside, Methyl D-glycero-D-gulo-α-heptopyranoside, Methyl D-glycero-D-gulo-p-heptopyranoside, Methyl D-glycero-D-galacto-α-heptopyranoside, D-erythro-D-galacto-Octose, D-erythro-L-galacto-Octose, D-erythro-L-galacto-Octose; Me glycoside, v-Octose, v-Octose; 1,1'-Anhydro, 1,2:3,4:6,7-Tri-O-isopropylidene-D-glycero-D-, galacto-α-heptopyranose, 1,2:3,4:6,7-Tri-O-isopropylidene-D-glycero-L-, galacto-heptopyranose, Anthranilic deoxyribulotide, 3,5-O-Benzylidene-1-deoxy-erythro-pentulose: D-, form, 1-(2-Carboxyanilino)-1-deoxyribulose; D-form, 1,2:3,4-Di-O-isopropylidene-α-D-erythro-2-, pentulose, 1,2:3,4-Di-O-isopropylidene-β-D-erythro-2-, pentulose, erythro-2-Pentulose; D-form, erythro-2-Pentulose; L-form. 1-Deoxy-threo-pentulose; D-form, 2,3-O-isopropylidene-β-D-threo-pentulofuranose, Methyl c-D-threo-pentulofuranoside, 1,4-Anhydro-2-deoxy-5-O-methoxymethyl-D-erythro-pent-1-enitol, 1,4-Anhydro-2,3:5,6-di-O-isopropylidene-D-mannitol, 1,4-Anhydro-2,3-di-O-methyl-α-D-arabino-pyranose 1,4-Anhydroglucitol; D-form, 1,4-Anhydroglucose. α-D-Pyranose-form, 1,4-Anhydromannitol; D-form, 1,4-Anhydromannitol, D-form, 2,3-O-Isopropylidene, 6-tosyl, 1,4-Anhydro-2,3,6-tri-O-benzyl-α-D-glucopyranose, 1,4-Anhydro-2,3,6-tri-O-methyl-β-D-galacto-pyranoside, 1,5-Anhydro-D-allitol, 1,5-Anhydro-2,3,4,5-di-O-isopropylidene-D-mannitol, 1,5-Anhydrogalactitol, D-form, 1,5-Anhydroglucitol. D-form, 1,5-Anhydroglucitol, D-form, 2,3,4-Tri-Ac, 1,5-Anhydroglucitol; D-form, Tetra-Ac, 1,5-Anhydro-2,3,6-tri- O-benzoyl-4-deoxy-L-erythro-hex-4-enitol, Arabinal; D-form, Arabinal; L-form, 3,4-Di-O-acetyl-D-arabinal, 3,4-Di-O-acetyl-L-arabinal, 3,4-Di-O-benzoyl-D-arabinal, Styracitol, 2,3,4-Tri-O-acetyl-1,5-anhydro-6-deoxy-D-xylo-hex-5-enitol, 1,6-Anhydro-endo-3,4-O-benzylidene-β-D-galactopyranose, 1,6-Anhydro-exo-3,4-O-benzylidene-β-D-galactopyranose, 1,6-Anhydro-2,3-O-benzylidene-α-D-ribo-hexopyranose-4-ulose, 1,6-Anhydro-3,4-O-endo-benzylidene-β-D-ribo-hexopyranose-2-ulose, 1,6-Anhydro-3,4-O-benzylidene-β-D-lyxo-hexopyranose-2-ulose, 1,6-Anhydro-3,4-O-exo-benzylidene-α-D-ribo-hexopyranos-2-ulose, 1,6-Anhydro-4-O-exo-benzyl-2-O-α-D-arabino-hexopyranos-3-ulose, 1,6-Anhydro-3-deoxy-erythro-hexopyranos-2-ulose; β-D-form, 1,6-Anhydro-3-deoxy-β-D-threo-hexopyranos-4-ulose, 1,6-Anhydro-3-deoxy-4-O-methyl-β-D-erythro-hexopyranos-2-ulose, 1,6-Anhydro-3-deoxy-4 S-phenyl-4-thio-β-D-erythro-hexopyranos-2-ulose, 1,6-Anhydro-2,4-diazido-2,4-dideoxy-β-D-glucopyranose, 1,6-Anhydro-2,4-di-O-benzoyl-β-D-lyxo-hexopyranos-3-ulose, 1,6-Anhydro-2,4-di-O-benzyl-β-D-lyxo-hexopyranos-3-ulose, 1,6-Anhydro-2,4-dideoxy-2,4-difluoroglucopyranose, β-D-form, 1,6-Anhydro-2,3-dideoxy-β-D-glycero-hex-2-enopyranose-4-ulose, 1,6-Anhydro-3,4-dideoxy-β-D-gIycero-hex-3-enopyranos-2-ulose, 1,6-Anhydro-3,4-dideoxy-β-D-glycero-hexopyranos-2-ulose, 1,1,6-Anhydro-2,4-di-O-tosyl-β-D-arabino-hexopyranos-3-lose, 1,6-Anhydro-2,4-di-O-tosyl-β-D-lyxo-hexopyranos-3-ulose, 1,6-Anhydrogalactofuranose; α-D-form, 1,6-Anhydrogalactofuranose, α-D-form, 2-Tosyl, 1,6-Anhydrogalactofuranose; α-D-form, 3-Tosyl, 1,6-Anhydrogalactofuranose; α-D-form, 5-Tosyl, 1,6-Anhydro (galactopyranose; β-D-form, 1,6-Anhydroglucose, β-D-Pyranose-form, Tri-Ac, 1,6-Anhydroglucose; β-D-Pyranose-form, Tribenzyl, 1,6-Anhydroglucose; β-D-Pyranose-form, Tribenzoyl, 1,6-Anhydrogulose; β-D-Pyranose-form, 2,3-O-Isopropylidene, 1,6-Anhydrogulose. β-D-Pyranose-form. Tri-Ac, 1,6-Anhydrogulose; β-D-Pyranose-form, Tribenzoyl, 1,6-Anhydrogulose; β-D-Pyranose-form, Tritosyl, 1,6-Anhydrogulose; α-L-Furanose-form, 1,6-Anhydro-erythro-hex-3-enopyranose, β-D-form, 1,6-Anhydro-lyxo-hexopyranos-2-ulose, 1,6-Anhydro-ribo-hexopyranos-2-ulose, β-D-form, 1,6-Anhydro-D-arabino-hexopyranos-3-ulose, 1,6-Anhydro-β-D-lyxo-hexopyranos-3-ulose, 1,6-Anhydro-arabino-hexopyranos-4-ulose, β-D-form, 1,6-Anhydro-lyxo-hexopyranos-4-ulose, β-D-form, 1,6-Anhydro-ribo-hexopyranos-4-ulose, β-D-form, 1,6-Anhydro-3,4-O-isopropylidene-α-D-galacto-pyranose, 1,6-Anhydro-3,4-O-isopropylidene-β-D-galacto-pyranose, 1,6-Anhydro-2,3-O-isopropylidene-α-L-gulofuranose, 1,6-Anhydro-2,3-O-isopropylidene-β-D-Lyxo-hexopyranose-4-ulose, 1,6-Anhydro-2,3-O-isopropylidene-β-D-ribo-hexopyranose-4-ulose, 1,6-Anhydro-4-O-isopropylidene-β-D-lyxo-hexopyranose-2-ulose, 1,6-Anhydro-3,4-O-isopropylidene-β-D-ribo-hexopyranose-2-ulose, 1,6-Anhydro-2,3-O-isopropylidene-β-D-mannofuranose, 1,6-Anhydro-2,3-O-isopropylidene-β-D-mannopyranose, 1,6-Anhydromannose-β-D-Pyranose-form, 2,3-O-Benzylidene, 1,6-Anhydromannose-α-D-Furanose-form, 1,6-Anhydromannose-β-D-Furanose-form, Tritosyl, 1,6-Anhydro-2,3,4-tri-O-methyl-α-D-galacto-pyranoside, 1,6-Anhydro-2,3,5-tri-O-methyl-β-D-glucose, 2,4-Di-O-acetyl-1,6-anhydro-3-deoxy-β-D-ribo-hexopyranoside, 2,4-Di-O-acetyl-1,6-anhydro-β-D-lyxo-hexopyranose-3-ulose, 2,4-Dideoxy-2,4-difluoroglucose; β-D-Pyranose-form, 1,6-Anhydro, D-Galactosan, Lactosan, Levoglucansan, D-Mannosan, Multistriatin, 2,3,4-Tri-O-acetyl-1,6-anhydro-α-L-gulofuranose, 2,3,5-Tri-O-acetyl-1,6-anhydro-β-D-mannofuranose, 2,3,5-Tri-O-acetyl-1,6-anhydro-β-D-mannopyranose, 2,3-Anhydroallopyranose, α-D-form, 2,3-Anhydro-6-O-benzyl-5-O-tosyl-α-D-allofuranose, 2,3-Anhydro-5,6-di-O-benzoyl-β-D-allofuranose, 2,3-Anhydro-5,6-di-O-tosyl-β-D-allofuranose, 2,3-Anhydrolyxose, α-D-Furanose-form, Me glycoside, 5-p-nitrobenzyl, 2,3-Anhydrolyxose; α-D-Furanose-form, Me glycoside, 5-tosyl, 2,3-Anhydrolyxose; α-D-Furanose-form, Et glycoside, 5-tetrahydropyranyl, 2,3-Anhydrolyxose; β-D-Furanose-form, Me glycoside, 5-p-nitrobenzoyl, 2,3-Anhydrolyxose; β-D-Furanose-form, Me glycoside, 5-tosyl, 2,3-Anhydrolyxose; β-D-Furanose-form, Et glycoside, 5-Ac, 2,3-Anhydrolyxose, β-D-Furanose-form, Et glycoside, 5-tetrahydropyranyl, 2,3-Anhydroribofuranose, α-D-form, Me glycoside, 5-nitrobenzoyl, 2,3-Anhydroribofuranose; β-D-form, Me glycoside, 5-tosyl, 2,3-Anhydroribopyranose; α-D-form, Benzyl glycoside, 4-triflate, Benzyl 2,3-anhydro-α-D-allopyranoside, Benzyl 2,3-anhydro-4,6-O-benzylidene-α-D-allo-pyranoside, Benzyl 2,3-anhydro-4,6-O-benzylidene-β-D-gulo-pyranoside, Benzyl 2,'-anhydro-4,6-O-benzylidene-α-D-manno-pyranoside, Benzyl 2,3-anhydro-α-D-manno-pyranoside, Benzyl 2,3-anhydro-β-D-manno-pyranoside, Benzyl 2,3-anhydro-4-O-methyl-D-D-ribopyranoside, Benzyl 2,3-anhydro-α-D-ribo-pyranoside, Benzyl 2,3-anhydro-D-manno-pyranoside, Ethyl 5-O-acetyl-2,3-anhydro-α-D-lyxofuranoside, Ethyl 2,3-Anhydro-α-D-lyxo-furanoside, Ethyl 2,3-Anhydro-D-lyxo-furanoside, Methyl 4-O-acetyl-2,3-anhydro-6-deoxy-α-D-gulo-pyranoside, Methyl 4-O-acetyl-2,3-anhydro-6-deoxy-β-D-gulo-pyranoside, Methyl 5-O-acetyl-2,3-anhydro-α-D-lyxopyranoside, Methyl 5-O-acetyl-2,3-anhydro-D-lyxopyranoside, Methyl 4-O-acetyl-2,3-anhydro-D-ribopyranoside, Methyl 5-O-acetyl-2,3-anhydro-β-D-ribopyranoside, Methyl 2,3-anhydro-α-D-allo-pyranoside. Methyl 2,3-anhydro-β-D-allo-pyranoside, Methyl 2,3-anhydro-5-O-benzoyl-α-D-lyxofuranoside, Methyl 2,3-anhydro-5-O-benzoyl-β-D-ribofuranoside, Methyl 2,3-anhydro-5-O-benzoyl-β-D-ribopyranoside, Methyl 2,3-anhydro-5-O-benzyl-6-deoxy-α-D-allo-furanoside, Methyl 2,3-anhydro-6-O-benzyl-α-D-gulopyranoside, Methyl 2,3-anhydro-4-6-O-benzylidenetalopyranoside, Methyl 2,3-anhydro-4,6-O-benzylideneallopyranoside; β-D-form, Methyl 2,3-anhydro-4,6-O-benzylidene-β-D-allo-pyranoside; Methyl 2,3-anhydro-4,6-O-benzylidene-α-D-gulo-pyranoside; Methyl 2,3-anhydro-4,6-O-benzylidene-β-D-gulo-pyranoside; Methyl 2,3-anhydro-4,6-O-benzylidene-α-D-manno-pyranoside; Methyl 2,3)-anhydro-4,6-O-benzylidene-α-D-manno-pyranoside Methyl 2,3-anhydro-4,6-O-benzylidene-3-C-nitro-D-allopyranoside; Methyl 2,3-anhydro-4,6-O-benzylidenetalopyranoside; α-D-form, Methyl 2,3-anhydro-4,6-O-benzylidenetalopyranoside; α-D-form, Methyl 2,3-anhydro-5-O-benzyl-α-D-lyxofuranoside, Methyl 2,3-anhydro-5-O-benzyl-β-D-lyxofuranoside, Methyl 2,'-anhydro-5-O-benzyl-α-D-ribofuranoside Methyl 2,3-anhydro-5-O-benzyl-β-D-ribofuranoside, Methyl 2,3-anhydro-6-deoxy-α-D-gulopyranoside, Methyl 2,3-anhydro-6-deoxy-β-D-gulopyranoside, Methyl 2,3-anhydro-6-deoxy-α-D-hexopyranosid-4-ulose, Methyl 2,3-anhydro-6-deoxy-α-D-lyxo-hexopyranosid-4-ulose, Methyl 2,3-anhydro-6-deoxy-α-D-ribo-hexopyranosid-4-ulose, Methyl 2,3-anhydro-6-deoxy-α-D-mannopyranoside, Methyl 2,3-anhydro-5-deoxy-α-D-ribofuranoside, Methyl 2,3-anhydro-5-deoxy-β-D-ribofuranoside, Methyl 2,3-anhydro-α-D-lyxo-furanoside, Methyl 2,3-anhydro-D-lyxo-furanoside. Methyl 2,3-anhydro-4-O-deoxy-α-D- mannopyranoside, Methyl 2,3-anhydro-4-O-deoxy-β-D-mannopyranoside, Methyl 2,3-anhydro-5-O-methyl-β-D-lyxofuranoside, Methyl 2,3-anhydro-5-O-methyl-β-D-lyxofuranoside, Methyl 2,3-anhydro-4-O-methyl-β-D-ribopyranoside, Methyl 2,3-anhydro-β-D-ethyl-β-pentopyranosid-4-ulose, Methyl 2,3-anhydro-L-ethyl-β-pentopyranosid-4-ulose, Methyl 2,3-anhydro-α-D-ribofuranoside, Methyl 2,3-anhydro-β-D-1-ribofuranoside, Methyl 2,3-anhydro-α-D-ribopyranoside, Methyl 2,3-anhydro-β-D-1-ribopyranoside, Methyl 2,3-anhydro-6-O-tosyl-α-D-gulopyranoside, Methyl 2,3-anhydro-4-O-tosyl-α-D-ribopyranoside, Methyl 2,3-anhydro-4-O-tosyl-β-D-ribopyranoside, N ethyl 2,3-anhydro-5-O-(triphenylmethyl)-β-D-ribo-pyranoside, Methyl 2,3'-anhydro-6-O-trityl-β-D-lyxopyranoside, Methyl 2,3-anhydro-5-O-trityl-α-D-lyxopyranoside, Phenyl 2,3-anhydro-4,6-O-benzylidene-α-D-manno-pyranoside, 1,5,6-Tri-O-acetyl-2,3-anhydro-β-D-allofuranose, Allonic acid; D-form, 2,5-Anhydro, Me ester, Alltronic acid, 2,5-Anhydro, 3,4,()-tribenzoyl, 2,5-Anhydro-D-allonic acid, 2,5-Anhydroallose, DL-form, 2,5-Anhydro-6-O-benzoyl-3,4-O-isopropylidene-D-allo-nonitrile, 2,5-Anhydro-6-O-benzoyl-3,4-O-isopropylidene-D-allose, 2,5-Anhydro-3,4-di-O-tosyl-D-lyxose dimethyl acetal, 2,5-Anhydro-3,4-di-O-tosyl-L-lyxose dimethyl acetal, 2,5-Anhydro-3,4-O-isopropylidene-D-allonitrile, 2,5-Anhydrotalitol; D-form, 2,5-Anhydrotalose; D-form, 2,5-Anhydro-6-O-tosyl-L-idose dimethyl acetal, 2,5-Anhydro-3-O-tosyl-D-xylose dimethyl acetal, 2, 5-Anhydro-3,4,6-tri-O-benzoyl-D-allononitrile, 2,5-Anhydro-3,4,6-tri-O-benzoyl-L-talose dimethylacetal, 2,5-Anhydro-3,4,6-tri-O-benzyl-D-allose, 2,5-Anhydro-3,4,6-tri-O-benzyl-L-talose dimethylacetal, 2,5-Anhydrolyxose; D-form, Dimethyl acetal, 3,4-ditosyl, 2,6-Anhydro-1-deoxy-galacto-hept-1-enitol; D-form, 2,6-Anhydro-1-deoxy-gluco-hept-1-enitol; D-form, 2,6-Anhydro-1-deoxy-3,4,5,7-tetra-O-acetyl-D-gluco-hept-1-enitol, 2,6-Anhydrofructofuranose; β-D-fructofuranose, 3,4-Anhydro-1,2-O-isopropylidene-α-D-tagatose, Methyl 3 .4-anhydro-6-deoxy-arabino-hex-5-enopyranoside; α-L-form, Methyl 3,4-anhydro-6-deoxy-ribo-hex-5-enopyranoside; β-L-form, Methyl 3,4-anhydro-1,6-di-O-tosyl-α-tagatofuranoside. methyl 3,4-anhydro-1,6-di-O-tosyl-β-tagatofuranoside, Methyl 3,4-anhydro-α-D-tagatofuranoside, N Methyl 3,4-anhydro-β-D-tagatofuranoside, Methyl 1,6-di-O-acetyl-3,4-anhydro-α-D-tagato-furanoside, Methyl 1,6-di-O-acetyl-3, 4-anhydro-β-D-tagato-furanoside, Agarobiose, 3,6-Anhydro-1,2-dideoxy-D-allo-hept-1-ynitol, 3,6-Anhydro-1,2-dideoxy-D-allo-hept-1-ynitol, 3,6-Anhydro-1,2-dideoxy-4,5-O-isopropylidene-D-allo-hept-1-ynitol, 3,6-Anhydro-1,2-dideoxy-4,5-O-isopropylidene-D-allo-hept-1-ynitol, 3,6-Anhydro-1,2-dideoxy-4,5-O-isopropylidene-D-arabino-hex-1-enitol, 3,6-Anhydrogalactose; D-form, 3,6-Anhydrogalactose. L-form, 3,6-Anhydroglucose, D-form, 3,6-Anhydro-1,2-O-iso-propylidene-α-D-galacto-pyranose, 1,6-Anhydro-1,2-O-iso-propylidene-α-L-galactose, 3,6-Anhydro-1,2-O-isopropylidene-α-D-glucofuranoside, Ethyl 1,6-anhydro-2-deoxy-2-(formylamino)-4,5:7,8-di-O-isopropylidene-D-erythro-L-manno-octonate, Ethyl 3,6-anhydro-2-deoxy-4,5-O-isopropylidene-D-allo-heptonate, Methyl 2-acetamido-4-O-acetyl-3,6-anhydro-2-deoxy-α-D-glucopyranoside, Methyl 3,6-anhydro-2-acetamido-deoxy-α-D-glucopyranoside, Methyl 3,6-anhydro-2-deoxy-4,5,7,8-di-O-isopropylidene-D-glycero-D-talo-octonate, Methyl 3,6-anhydro-2-deoxy-4,5,7,8-di-O-isopropylidene-D-glycero-D-galacto-octonate, Methyl 3,6-anhydro-α-D-galactopyranoside, Methyl 3,6-anhydro-β-D-galactopyranoside. Methyl 3,6-anhydro-i-D-glucofuranoside, Methyl 3,6-anhydro-D-glucofuranoside, Methyl 3,6-anhydro-()-D-glucopyranoside, Methyl 3,6-anhydro-α-D-glucopyranoside, Methyl 3,6-anhydro-4,5,7-tri-O-benzyl-2-deoxy-allo-heptonate, 2,3,4,6-Tetra-O-benzyl-α-D-galactopyranosyl bromide, Methyl 4,6-anhydro-2,3-di-O-methyl-α-D-galactopyranose, 5,6-Anhydro-1,2-O-isopropylidene-α-D-glucofuranose, 5,6-Anhydro-1,2-O-isopropylidene-β-L-form 5,6-Anhydro-1,2-O-iso-propylidene-3-O-mesyl-β-L-idofuranose, 5,6-Anhydro-1,2-O-iso-propylidene-3-O-mesyl-α-D-gulofuranose, 5,6-Anhydro-1,2-O-iso-propylidene-3-O-tosyl-β-L-idofuranose, Methyl 5,6-Anhydro-2,3-O-isopropylidene-3-β-D-L-allo-furanoside, 4-O-Acetyl-1,6,2,3-dianhydro-β-D-gulopyranose, 2,5-Di-O-acetyl-1,4:3,5-dianhydro-D-iditol, v-Octose; 1,1'-Anhydro, 2-Acetamido-2-deoxy-3,4:6-tri-O-acetyl-α-D-glucopyranosyl bromide, 2-Acetamido-2-deoxy-3,4,0-tri-O-acetylglucopyranosyl chloride, 2-Acetamido-2-deoxy-3,4,6-tri-O-acetylglucopyranosyl chloride; α-D-form, 2-Acetamido-3, 4,6-tri-O-acetyl-2-deoxy-α-D-galactopyranosyl chloride, Acetobromocellobiose, Acetobromo-L-fucose, Acetobromoglucose; α-D-Pyranose-form, Acetobromoglucose; β-Pyranose-form, Acetobromoglucose; α-L-Pyranose-form, Acetobromoisoprimeverose, Acetobromolactose, Acetobromolactose, Acetobromomaltose, Acetobromo-L-rhamnose, Acetobromorutinose, Acetobromosophorose, Acetobromomoturanose, Acetochlorocellobiose, Acetochlorogenitiobiose, Acetochlorolactose, Acetochloromaltose, Acetochloroprimeverose, Acetochlororutinose, Acetochloroturanose, 4-O-Acetyl-2,3-O-carbonyl-α-L-rhamnopyranosyl bromide, 2-O-Acetyl-3, 5-di-O-benzoyl-β-D-ribofuranosyl fluoride, 3-O-Acetyl-2, 5-di-O-benzoyl-β-D-ribofuranosyl fluoride, 5-O-Acetyl-2, 3-di-O-benzoyl-β-D-ribofuranosyl fluoride, 2-Amino-2-deoxygalacto-pyranosyl bromide; α-D-form, Tri-Ac, 2-Amino-2-deoxyglucopyranosyl bromide; α-D-form, Tri-Ac, 2-Amino-2-deoxy-3,4,6-tri-O-benzoyl-α-D-galactopyranosyl bromide. Arabinofuranosyl bromide, α-D-form, Tris-4-nitrobenzoyl, Arabinofuranosyl chloride, α-D-form, Tris(4-nitro-benzoyl), Arabinofuranosyl chloride; α-D-form, Tribenzyl, 2-Azido-5-O-benzoyl-3'-O-(4-nitrobenzoyl)-α-D-arabino-furanosyl chloride, 2-Azido-2-deoxyglucopyranosyl bromide; α-D-form, 2-Benzamido-3, 4,6-tri-O-benzoyl-2-deoxy-α-D-glucopyranosyl bromide, 5-O-Benzoyl-2,3-O-carbonyl-α-D-lyxofuranosyl bromide, 2-O-Benzyl-, 5-bis-O-(4-nitrobenzoyl)-α-D-arabino-furanosyl chloride, 2-O-Benzyl-3,4,6-tris(4-nitrobenzoyl)-α-D-(glucopyranosyl bromide, 2-O-Benzyl-3,4,6-tris(4-nitrobenzoyl)-α-D-glucopyranosyl bromide, 6-Bromo-6-deoxy-2,3,4-tri-O-acetyl-α-D-galactopyranosyl bromide, 1-Deoxy-1-fluoro-2,3 4,5-di-O-isopropylidene-D-fructose, 6-Deoxy-6-fluoro-1,2:3,4-di-O-isopropylidene-α-L-galactopyranose, 1-Deoxy-1-fluorofructose. D-form, 6-Deoxy-6-fluorogalactose, L-Pyranose-form, 6-Deoxy-6-fluoro-α-D-glucopyranosyl fluoride, 6-Deoxy-6-fluoro-β-D-glucopyranosyl fluoride, 1'-Deoxy-I'-fluorosucrose. 6-Deoxy-6-iodo-2,3,4-tri-O-acetyl-c-D-mannopyranosyl bromide, 6-Deoxy-2,3,4-tri-O-acetyl-β-L-mannopyranosyl chloride, 2-Deoxy-3,4,6-tri-O-acetyl-2-trifluoroacetamido-α-D-galactopyranosyl bromide, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 2,3-Di-O-benzoyl-5-O-tosyl-α-L-arabinofuranosyl bromide, 2,3-Di-O-benzyl-5-O-(4-nitrobenzoyl)-α-D-arabinofuranosyl chloride, 1,6-Dibromo-1,6-dideoxy-3,4-O-isopropylidene-D-mannitol, 1,6-Dibromo-1,6-dideoxy-mannitol; D-form, 1,6-Dibromo-1,6-dideoxy-mannitol;

D-form, 3,4-O-Iso-propylidene, 2-5-di-Ac, 2,3:5,6-Di-O-isopropylidene-α-D-mannofuranosyl chloride, Galactosyl chloride; α-D-Pyranose-form, 2,3,4-Tri-Ac, 6-tosyl, Galactosyl chloride; o-D-Pyranose-form, 3,4,6-Tri-Ac, 2-trichloroacetyl, Galactosyl chloride; α-D-Pyranose-form, Tetrabenzyl, Galactosyl chloride, β-D-Pyranose-form, 3,4, 6-Tri-Ac, 2-(trichloroacetyl), Glucopyranosyl fluoride; β-D-form, Glucopyranosyl fluoride; α-D-form, 6-Trityl, Hepta-O-acetyl-α-D-bromide, Hexa-O-acetyl-robinobiosyl chloride, Lyxosyl bromide; α-D-Pyranose-form, 2-C-Bromo, tribenzyl, Lyxosyl chloride, α-D-Pyranose-form, Tribenzyl, 2-C-chloro, Lyxosyl chloride; β-D-Pyranose-form, Tribenzyl, 2-C-chloro, Mannosyl chloride; α-D-Pyranose-form, 4,6-Di-Ac, 2,3-dibenzyl, Mannosyl chloride; α-D-Pyranose-form, 2,4-Di-Ac, 3,6-dibenzyl, Mannosyl chloride, α-D-Pyranose-form, Di-O-cyclohexylidene, Methyl 6-deoxy-6-fluoro-α-D-galactopyranoside, Methyl 6-deoxy-6-fluor-β-D-galactopyranoside, Methyl 2,3,4-tri-O-acetyl-6-deoxy-6-fluor-β-α-D-galactopyranoside, Methyl 2,3,4-tri-O-acetyl-6-deoxy-6-fluoro-β-D-galactopyranoside, 2-O-Nitro-3,5-bis(4-nitrobenzoyl)-β-D-arabino-fuanosyl chloride, 2-O-Nitro-3,5-bis(4-nitrobenzoyl)-β-D-arabino-furanosyl chloride, Rhamnopyranosyl bromide; β-L-form, Tribenzyl, Ribofuranosyl bromide; β-D-form, 2,3-O-Isopropylidene, 5,(4-nitrobenzoyl), Ribofuranosyl bromide; β-D-form, 3,5-Dibenzyl, Ribofuranosyl bromide; β-D-form, 3,5-Dibenzoyl, 2-Ac, Ribofuranosyl bromide; β-form, 3,5-Dibenzoyl, 2,(4-nitrobenzoyl), Ribofuranosyl bromide, β-D-form, Tribenzoyl, Ribofuranosyl bromide; β-D-form, Tris(4-nitrobenzoyl), Ribofuranosyl chloride; α-D-form, 2,3-O-Isopropylidene, 5-trityl, Ribofuranosyl chloride; β-D-form, 2,3-O-Isopropylidene, 5-Me, Ribofuranosyl chloride; β-D-form, 2,3-O-Isopropylidene. 5-methyloxymethyl, 2,3, 5,6-Tetra-O-acetyl-β-D-galactofuranosyl chloride, 2,3,4,6-Tetra-O-acetyl-α-D-galactopyranosyl Bromide, 2,3,4,6-Tetra-O-acetyl-α-D-galactopyranosyl chloride, 2,3,4,6-Tetra-O-acetyl-p-galactopyranosyl chloride, 2,3,4,6-Tetra-O-acetyl-α-D-gluco-pyranosyl chloride, 2,3,4,6-Tetra-O-acetyl-β-D-chloride, 2,3,4,6-Tetra-O-acetyl-α-D-gluco-pyranosyl fluoride, 2,3,4,6-Tetra-O-acetyl-β-D-gluco-pyranosyl fluoride, 6-O-(2,3), 4,6-Tetra-O-acetyl-β-D-gluco-pyranosyl)-tri-O-acetyl-α-D-gluco-pyranosyl bromide, 2,3,4,6-Tetra-O-acetyl-α-D-manno-pyranosyl bromide, 2,3,4,6-Tetra-O-acetyl-α-D-manno-pyranosyl chloride, 2,3,4,6-Tetra-O-acetyl-α-D-manno-pyranosyl chloride, 2,3,4,6-Tetra-O-acetyl-5-thio-α-D-gluco-pyranosyl bromide, 2,3,4,6-Tetra-O-benzoyl-α-D-gluco-pyranosyl bromide, 2,3,4,6-Tetra-O-benzoyl-α-D-gluco-pyranosyl chloride, 2,3,4,6-Tetra-O-benzoyl-β-D-gluco-pyranosyl chloride, 2,3,4,6-Tetra-O-benzoyl-α-D-gluco-pyranosyl fluoride, 2,3,4,6-Tetra-O-benzoyl-α-D-manno-pyranosyl bromide, 2,3,4,6-Tetra-O-benzoyl-α-D-manno-pyranosyl chloride, 2,3,4,6-Tetra-O-benzoyl-β-D-manno-pyranosyl chloride, 2,3,4,6-Tetra-O-benzyl-α-D-galacto-pyranosyl chloride, 2,3,4,6-Tetra-O-benzyl-α-D-gluco-pyranosyl bromide, 2,3,4,6-Tetra-O-benzyl-α-D-gluco-pyranosyl chloride, 2,3,4,6-Tetra-O-benzyl-fi-D-gluco-pyranosyl fluoride, 5-Thioglucose; β-D-Pyranose-form, 1-Bromo, tetra-Ac, 2,3,4-Tri-O-acetyl-β-D-arabinopyranosyl bromide, 2,3,4-Tri-O-acetyl-β-L-arabinopyranosyl bromide, 2,3,4-Tri-O-acetyl-β-D-arabinopyranosyl chloride, 2,3), 4-Tri-O-acetyl-α-L-arabinopyranosyl chloride, 2,3,4-Tri-O-acetyl-β-L-arabinopyranosyl chloride, 3,4,6-Tri-O-acetyl-2-Benzamido-2-deoxy-α-D-glucopyranosyl bromide, 3,4,6-Tri-O-acetyl-2-O-benzyl-α-D-galactopyranosyl chloride, 2,3,4-Tri-O-acetyl-6-deoxy-6-fluoro-α-D-galactopyranosyl bromide, 2,3,4-Tri-O-acetyl-6-deoxy-6-fluoro-α-D-glucopyranosyl fluoride, 2,3,4-Tri-O-acetyl-6-deoxy-6-fluoro-D-glucopyranosyl fluoride, 3,4,6-Tri-O-acetyl-2-deoxy-2-nitroso-glucopyranosyl chloride; α-D-form, 3,4,6-Tri-O-acetyl-2-deoxy-2-phthalimido-β-D-gluocpyranosyl bromide, 2,3,4-Tri-O-acetyl-α-D-galactopyranosyl chloride, 3,4,6-Tri-O-acetyl-α-D-galactopyranosyl chloride, 3,4,6-Tri-O-acetyl-α-D-arabino-hexopyranosyl-2-ulose chloride, 2,3,5-Tri-O-acetyl-α-D-lyxofuranosyl chloride, 2,3,4-Tri-O-acetyl-α-D-lyxopyranosyl bromide, 2,3,4-Tri-O-acetyl-α-D-lyxopyranosyl chloride, 2,3,5-Tri-O-acetyl-α-D-ribofuranosyl chloride, 2,3,5-Tri-O-acetyl-β-D-ribofuranosyl chloride, 2,3,4-Tri-O-acetyl-β-D-ribopyranosyl bromide, 2,3,4-Tri-O-acetyl-β-D-ribopyranosyl chloride, 2,3,4-Tri-O-acetyl-α-D-xylopyranosyl bromide, 2,3,4-Tri-O-acetyl-α-D-xylopyranosyl chloride, 2,3,4-Tri-O-acetyl-β-D-xylopyranosyl chloride, 2,3,4-Tri-O-benzoyl-α-D-arabino-furanosyl bromide, 2,3,4-Tri-O-benzoyl-β-D-arabino-furanosyl bromide, 2,3,4-Tri-O-benzoyl-β-D-arabino-pyranosyl bromide, 2,3,4-Tri-O-benzoyl-β-L-arabino-pyranosyl bromide, 2,3), 6-Tri-O-benzoyl-α-D-glucopyranosyl bromide, 3,4,6-Tri-O-benzoyl-α-D-arabino-hexopyranosyl-2-ulose bromide, 2,3,5-Tri-O-benzoyl-α-D-ribofuranosyl fluoride, 2,3,4-Tri-O-benzoyl-α-D-ribopyranosyl bromide, 2,3,4-Tri-O-benzoyl-α-D-ribopyranosyl bromide. 2,3,4-Tri-O-benzoyl-α-D-ribopyranosyl chloride, 2,3,4-Tri-O-benzoyl-β-D-ribopyranosyl chloride, 2,3,4-Tri-O-benzoyl-β-D-xylopyranosyl bromide, 2,3,4-Tri-O-benzoyl-β-D-xylopyranosyl bromide, 2,3,4-Tri-O-benzoyl-α-D-xylopyranosyl chloride, 2,3,4-Tri-O-benzoyl-α-D-xylopyranosyl chloride, 2,3,4-Tri-O-benzyl-α-L-fucopyranosyl bromide, 2,3,5-Tri-O-benzyl-α-D-ribofuranosyl fluoride, Acetobromomelibiose, Acetochloromelibiose, 1,6-Anhydro-2,4-dideoxy-2,4-diflouro-glucopyranose; α-D-form, 2-Azido-2-deoxy-3,4,6-tri-O-acetyl-α-D-galactopyranosyl bromide, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, 1-(2-Bromo-2-deoxy-3,4,6-tri-O-acetyl-α-D-glucopyranosyl)-4-methylpyridinium bromide, 2-Deoxy-2-fluoroarabinose; D-form, 2-Deoxy-2-fluoroglucose; D-form, 4-Deoxy-4-fluoro-1,2-O-isopropylidene-β-D-tagatopyranose, 4-Deoxy-4-fluoro-D-tagatose, 3,4-Di-O-benzoyl-2-bromo-2-deoxy-α-D-lyxopyranosyl bromide, 3,4-Di-O-benzoyl-2-bromo-2-deoxy-β-D-lyxopyranosyl bromide, 2,4-Dideoxy-2,4-difluoroglucose; D-form, 2,4-Dideoxy-2,4-difluoroglucose, β-D-Pyranose-form, 1,6-Anhydro, Lyxosyl bromide; α-D-Pyranose-form, 2-C-Bromo, tribenzoyl, Lyxosyl chloride; α-D-Pyranose-form, Tribenzoyl, 2-C-chloro, Lyxosyl chloride, β-D-Pyranose-form, Tribenzoyl, 2-C-chloro, Methyl 4,6-O-benzylidene-2-bromo-2-deoxy-β-D-ribohexopyranosid-3-ulose, Methyl 4,6-O-benzylidene-2-bromo-2,3-dideoxy-threo-hex-3-enopyranoside; -α-D-form, Methyl 2-deoxy-2-fluoro-α-D-arabino-furanoside, Methyl 3,4,6-ti-α-O-acetyl-2-deoxy-2-fluoro-α-D-glucopyranoside, 2,3,4,6-Tetraacetamido-2,3,4,6-tetra-deoxy-α-D-glucopyranoside, 2,3,4,6-Tetraamido-2,3,4,6-tetradeoxy-glucose; D-form, 1,3,4,5-Tetra-O-benzoyl-α-L-sorbopyranosyl bromide, 1,3,4,5-Tetra-O-benzoyl-α-L-sorbopyranosyl chloride, Benzyl 3-deoxy-3-fluoro-()-D-glucopyranoside, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, 1,2-O-Cyclohexylidene-3-deoxy-'-fluoro-α-D-glucofuranose, 3-Deoxy-3-fluoro-D-gluconic acid, 3-Deoxy-α-flouroglucose, D-form, Methyl 3-bromo-3,6-dideoxy-α-D-xylo-hexopyranosid-4-ulose, 2,3,4,6-Tetraacetamido-2,3,4,6-tetra-deoxy-α-D-glucopyranose, 1,4,6-Tetra-O-acetyl-3-deoxy-3-flouro-D-glucopyranose, 1,2,4,6-Tetra-O-acetyl-3-deoxy-3-fluoro-β-D-glucopyranose, 2,3,4,6-Tetraamino-2,3,4,6-tetradeoxyglucose: D-form, 1,6-Anhydro-2,4-dideoxy-2,4-difluoroglucopyranose; β-D-form, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside 4-Deoxy-4-fluoroglucose; D-form, 2,6-Diamino-2,6-dideoxygalactose; α-D-Pyranose-fom, 4,6-Dichloro-4,6-dideoxygalactose; D-form, 2,4-Dideoxy-2,4-difluoroglucose; D-form, 2,4-Dideoxy-2,4-difluoroglucose; β-D-Pyranose-form. 1,6-Anhydro, Methyl 4,6-Dichloro-4,6-dideoxy-2,3-di-O-tosyl-α-D-galactopyranoside, Methyl 4,6-Dichloro-4,6-dideoxy-2,3-di-O-tosyl-β-D-galactopyranoside, Methyl 4,6-dichloro-4,6-dideoxy-α-D-galactopyranoside, Methyl 4,6-dichloro-4,6-dideoxy-O-D-galactopyranoside, Methyl 4,6-dichloro-4,6-dideoxy-α-D-glucopyranoside, 2,3,4,6-Tetraacetoamido-2,3,4,6-tetradeoxy-α-D-glucopyranose, 2,3,4,6-Tetraamino-2,3,4,6-tetradeoxyglucose; D-form, 5-Deoxy-5-fluoro-1,2-O-isopropylidene-α-D-xylofuranose, 5-Deoxy-5-fluoroxylose; D-Furanose-form, 2,3,4,6-Tetraacetamido-2,3,4,6-tetradeoxy-α-D-glucopyranose, 3,5-O-Benzylidene-6-deoxy-6-fluoro-1,2-O-isopropylidene-α-D-glucofuranose, Benzyl 2,3,4,6-tetraacetamido-2,3,4,6-tetradeoxy-α-D-glucopyranoside, Benzyl 2,3,4,6-tetrabenzamido-2,3,4,6-tetradeoxy-α-D-glucopyranoside, Benzyl 2,3,4-tri-O-benzyl-6-bromo-6-deoxy-α-D-glucopyranoside, 6-Bromo-6-deoxy-1,2:3,4-di-O-iso-propylidene-α-D-galactopyranose, 6-Bromo-6-deoxy-1,2::3,4-di-O-iso-propylidene-α-L-galactopyranose, 6-Bromo-6-deoxy-1,2,3,5-di-O-iso-propylidene-α-D-glucofuranose, 6-Bromo-6-deoxygalactose; D-Pyranose-form, 6-Bromo-6-deoxyglucose; D-form, 6-Deoxy-6-fluoro-1,2:3,4-di-O-isopropylidene-α-D-galactopyranose. 6-Deoxy-6-flouro-1,2,3,5-di-O-methylene-α-D-glucofuranose, 6-Deoxy-6-fluoro-α-D-galactopyranose 1-(dihydrogen phosphate), 6-Deoxy-6-fluor-o(galactose, α-D-Pyranose-form, 6-Deoxy-6-fluoro-α-D-glucopyranosyl fluoride, 6-Deoxy-6-fluoro-β-D-glucopyranosyl fluoride, 6-Deoxy-6-fluoroglucose. D-form, 6-Deoxy-6-iodo-2,3,4-tri-O-acetyl-α-D-mannopyranosyl bromide, 4,6-Dichloro-4.6-dideoxygalactose D-form, 6',6-Dichloro-6',6-dideoxyhexabenxoyl-sucrose, 1,2',2,3,3',4',6'-Hepta-O-acetyl-6-deoxy-6-iodo-D-lactose, Methyl 4-O-benzoyl-6-bromo-6-deoxy-galactopyranoside; α-D-form, Methyl 4-O-benzoyl-6-bromo-6-deoxy-galactopyranoside; β-D-form, Methyl 4-O-benzoyl-6-bromo-6-deoxy-glucopyranoside, Methyl 4-O-benzoyl-6-bromo-6-deoxy-glucopyranoside; β-D-form, Methyl 6-bromo-6-deoxy-c-D-galactopyranoside, Methyl 6-bromo-6-deoxy-α-D-(glucopyranoside, Methyl 6-bromo-6-deoxy-α-D-glucopyranoside, Methyl 6-bromo-6-deoxy-3,4-O-isopropylidene-α-D-galactopyranoside, Methyl 6-bromo-6-deoxy-3,4-O-isopropylidene-β-D-galactopyranoside, Methyl 6-deoxy-6-fluoro-α-D-glucopyranoside, Methyl 3,4-di-O-acetyl-6-bromo-6-deoxy-3-O-mesyl-α-D-glucopyranoside, Methyl 4,6-dichloro-4,6-dideoxy-α-D-(galactopyranoside, Methyl 4,6-dichloro-4,6-dideoxy-α-D-glucopyranoside, Methyl 2,3,4-tri-O-acetyl-6-bromo-6-deoxy-α-D-galactopyranoside, Methyl 2,3,4-tri-O-acetyl-6-bromo-6-deoxy-β-D-galactopyranoside, Methyl 2,3,4-tri-O-acetyl-6-bromo-6-deoxy-α-D-glucopyranoside, Methyl 2,3,4-tri-O-acetyl-6-deoxy-6-fluoro-α-D-glucopyranoside, Methyl 2,3,4-tri-O-benzyl-6-bromo-6-deoxy-c-D-glucopyranoside, Methyl 2,3,4-tri-O-benzyl-6-bromo-6-deoxy-β-D-glucopyranoside, 1,2,3,4-Tetra-O-acetyl-6-bromo-6-deoxy-α-D-glucopyranoside, 1,2,3,4-Tetra-O-acetyl-6-deoxy-6-fluoro-α-D-glucopyranose, 1,2,3,4-Tetra-O-acetyl-6-deoxy-6-fluoro-D-glucopyranose, 2,3,4,6-Tetraamine-2,3,4,6-tetradeoxy-glucose; D-form, 2,3,4-Tri-O-acetyl-6-deoxy-6-fluoro-α-D-galactopyranosyl bromide, 2,3,4-Tri-O-acetyl-6-deoxy-6-fluoro-α-D-glucopyranosyl fluoride, 2,3,4-Tri-O-acetyl-6-deoxy-6-fluoro-D-glucopyranosyl fluoride, N-Acetyl-L-arabinosylamine, N-Acetyl-D-mannopyranosylamine, N-Acetyl-2,3,4,6-tetra-O-acetyl-α-D-galactopyranosylamine, N-Acetyl-2,3,3,4,6-tetra-O-acetyl-β-D-galactopyranosylamine, N-Acetyl-2,3,4-tri-O-acetyl-D-xylosamine, N-Acetyl-2,3,4-tri-O-acetyl-L-xylosamine, N-Acetyl-D-xylosamine, Arabinosylamine; L-form, N-Benzoyl-D-mannopyranosylamine, N-Benzyl-D-glucosylamine, N-Benzyl-D-mannopyranosylamine, 1-(2-Bromo-2-deoxy-3,4,6-tri-O-acetyl-β-D-glucopyranosyl)-4-methylpyridinium bromide, 2,3:5,6-Di-O-isopropylidene-N-phenyl-D-mannosylamine, Fructosylamine; D-form, N-Benzyl, Fructosylamine; D-form, N-Phenyl, Galactosylamine; D-form, 1-α-D-Glucopyranosyl)pyridinium bromide, 1-(β-D-Glucopyranosyl)pyridinium bromide, Glucosylamine; D-form, Glucosylamine; o-D-Pyranose-form, N-Phenyl, 2,3,4,6-tetra-Ac1,2:3,4-Di-O-isopropylidene-α-D-erythro-2-, pentulose, 6-(1H-Indol-3-yl)-8-(2,3,4,5-tetrahydroxypentyl)-2-, 4,7-(1H, 3H, 8H)-pteridinetrione, 1-00009, Lyxosylamine; D-form, Lyxosylamine, D-form, N-(4-Nitrophenyl), in L-00059, Lyxosylamine; L-form, Mannosylamine, D-form, Mannosylamine; α-D-Pyranose-form, N-Methyl-L-rhamnopyranosylamine, N-Phenyl-D-arabinosylamine, N-Phenyl-L-arabinosylamine, N-Phenyl-α-D-galactopyranosylamine, N-Phenyl-β-D-galactopyranosylamine, N-Phenyl-α-D-glucosylamine, N-Phenyl-β-D-glucosylamine, N-Phenyl-L-rhamnopyranosylamine, Rhamnosylamine, L-Pyranose-form, D-Ribopyranosylamine, Ribosylamine; D-Pyranose-form, N-Ph, Sorbosylamine; L-form, Sorbosylamine; L-form, N-Benzyl, Sorbosylamine; L-form, N-Phenyl, 1-(2,3,4,6-Tetra-O-acetyl-α-D-glucopyranosyl)pyridinium bromide, 1-(2,3,4,6-Tetra-O-acetyl-α-D-glucopyranosyl)pyridinium bromide, 2,3,4,6-Tetra-O-acetyl-D-glucosylamine, 2,3,4,6-Tetra-O-acetyl-D-mannosylamine, 1-(2,3,4,6-Tetra-O-benzylglucopyranosyl)pyridinium(1+)β-D-form, Trigluoromethanesulfonat 1',6',6'-Triamino-1',6',6'-trideoxysucrose, 1-(Xylopyranosyl)pyridinium(1+), α-D-form, Bromide, 1-(Xylopyranosyl)pyridinium(1+), α-D-form, Bromide, Xylosylamine; D-form, Xylosylamine; L-form, 2-Acetamido-3-O-(2-acetamido-2,-dideoxy-5,6-O-isopropylidene-α-D-erythro-hex-2-enofuranosyl)-1,4-anhydro-2-deoxy-5,6-O-isopropylidene-D-arabino-hex-1-enitol, 2-Acetamido-3-O-(2-acetamido-2,3-dideoxy-5,6-O-isopropylidene-β-D-erythro-hex-2-enofuranosyl)-1,4-anhydro-2-deoxy-5,6-O-isopropylidene-D-arabino-hex-1-enitol, 2-Acetamido-1-O-acetyl-2-deoxy-α-D-glucopyranose, 2-Acetamido-1-O-acetyl-2-deoxy-3,4,6-tri-O-benzyl-α-D-glucopyranose, 2-Acetamido-1-O-acetyl-2-deoxy-3,4,6-tri-O-benzyl-β-D-glucopyranose, 4-Acetamido-2-amino-2,4,6-trideoxy-D-glucose, 2-Acetamido-1,4-anhydro-2-deoxy-5,6-O-isopropylidene-arabino-hex-1-enitol; D-form, 2-Acetamido-4,6-O-benzylidene-2,3-deoxy-D-erythro-hex-2-enono-1,5-lactone, 2-Acetamido-2-deoxy-D-allose, 2-Acetamido-2-deoxy-D-arabinose, 2-Acetamido-2-deoxy-L-arabinose, 2-Acetamido-2-deoxy-1,3-di-O-acetyl-α-D-glucopyranose, 2-Acetamido-2-deoxy-1,3-di-O-acetyl-4,6-O-isopropylidene-α-D-glucopyranose, 2-Acetamido-2-deoxy-3,4-di-O-methyl-D-(glucose, 2-Acetamido-2-deoxy-3,6-di-O-methyl-D-glucose, 2-Acetamido-2-deoxy-4,6-di-O-methyl-D-(glucose, 2-Acetamido-2-deoxy-D-galactose, 2-Acetamido-2-deoxyglucose D-form, 2-Acetamido-2-deoxyglucose; α-D-.Pyranose-form, 2-Acetamido-2-deoxyglucose; α-D-Pyranose-form, 2-Acetamido-2-deoxy-α-D-glucose 1-(dihydrogen phosphate), 2-Acetamido-2-deoxy-β-D-glucose 1-(dihydrogen phosphate), 2-Acetamido-2-deoxy-4,6-O-isopropylidene-D-glucopyranose, 2-Acetamido-2-deoxy-D-mannose, 2-Acetamido-2-deoxy-3-O-methylglucose D-form, 2-Acetamido-2-deoxy-4-O-methylglucose; D-form, 2-Acetamido-2-deoxy-6-O-methylglucose; D-form, 2-Acetamido-2-deoxy-1,3,4,6-tetra-O-acetyl-α-D-galactopyranose, 2-Acetamido-2-deoxy-1,3,4,6-tetra-O-acetyl-β-D-galactopyranose, 2-Acetamido-2-deoxy-1), 4,6-tetra-O-acetyl-β-D-mannopyranose, 2-Acetamido-2-deoxy-1,4,6-tetra-O-acetyl-β-L-mannopyranose, 2-Acetamido-2-deoxy-3,4,6-tri-O-acetyl-α-D-glucopyranosyl bromide, 2-Acetamido-2-deoxy-3,4,6-tri-O-acetylglucopyranosyl chloride, 2-Acetamido-2-deoxy-3,4,6-tri-O-methyl-D-glucose, 2-Acetamido-2-deoxy-α-D-xylose. 2-Acetamido-2-deoxy-α-L-xylose, 2-Acetamido-2,6-dideoxy-D-galactose, 2-Acetamido-2,6-dideoxy-L-galactose, 2-Acetamido-2,6-dideoxy-D-glucose, 2-Acetamido-2,3-dideoxy-D-threo-hex-2-enionic acid γ-lactone, 2-Acetamido-2,3-dideoxy-D-erythro-hex-2-enonolactone, 2-Acetamido-2,3-dideoxy-D-erythro-hex-2-enono-1,4-lactone, 2-Acetamido-2,3-dideoxy-D-threo-hex-2-enono-1.5-lactone, 2-Acetamido-1,2-dideoxy-D-arabino-hex-1-enopyranose, 2-Acetamido-2,3-dideoxy-5,6-O-isopropylidene-D-erythro-hex-2-enonic acid γ-lactone, 2-Acetamido-2,3-dideoxy-5,6-O-isopropylidene-D-threo-hex-2-enonic acid γ-lactone, 2-Acetamido-2,3-dideoxy-4,6-O-isopropylidene-D-erythro-hex-2-enono 1,5-lactone, 2-Acetamido-2,3-dideoxy-4,6-O-isopropylidene-D-threo-hex-2enono-1,5-lactone, 2-Acetamido-3,4,6-tri-O-acetyl-2-deoxy-α-D-,galactopyranosyl chloride, Allyl 2-acetamido-2-deoxyglucopyranoside; α-D-form, Allyl 2-acetamido-2-deoxyglucopyranoside; β-D-form, 2-Amino-N-benzyloxycarbonyl-2-deoxy-D-glucopyranose, 2-Amino-5-O-carbamoyl-2-deoxy-L-xylonic acid, 2'-Amino-2'-deoxyadenosine, 2-Amino-2-deoxyallose; D-form, 2-Amino-2-deoxyaltrose; D-Pyranose-form, 2-Amino-2-deoxyaltronic acid; L-form, 2-Amino-2-deoxyarabinose; D-form, 2-Amino-2-deoxyarabinose; L-form, 2-Amino-2-deoxy-4,6-di-O-methyl-D-glucose, 2-Amino-2-deoxygalactopyranosyl bromide; α-D-form, Tri-Ac, 2-Amino-2-deoxy-α-D-galactopyranosyl phosphate, 2-Amino-2-deoxygalacturonic acid; D-form, 2-(2-Amino-2-deoxyglucofuranosyl)adenine; α-D-form, 2-(2-Amino-2-deoxyglucofuranosyl)adenine; β-D-form, 2-Amino-2-deoxygluconic acid; D-form, 2-Amino-2-deoxygluconic acid; D-form, 2-Me, 2-Amino-2-deoxygluconic acid; D-form, 3,4,6-Tri-Me, 2-Amino-2-deoxygluconic acid, D-form, Me ester, 2-Amino-2-deoxygluconic acid; D-form, N-Benzoyl, Et ester, 2-Amino-2-deoxygluconic acid; D-form, N-Me, 2-Amino-2-deoxygluconic acid, D-form, N-Ac, 4,6-O-isopropylidene, 2-Amino-2-deoxygluconic acid; D-form, N-Ac, Me ester, 2-Amino-2-deoxygluconic acid; D-form, N-Ac, Me ester, 3,4,6-tribenzyl, 2-Amino-2-deoxygluconic acid; D-form, N-Ac, Me ester, 5,6-O-isopropylidene, 2-Amino-2-deoxygluconic acid; D-form, N-Ac, Me ester, 3,4,5,6-tetra-Ac, 2-Amino-2-deoxygluconic acid, D-form, N-Ac, 1,4-lactone, 2-Amino-2-deoxygluconic acid; D-form, N-Ac, 1,4-lactone, 5,6-isopropylidene, 2-Amino-2-deoxygluconic acid; D-form, N-Ac, 1,5-lactone, 2-Amino-2-deoxygluconic acid; D-form, N-Ac, 1,5-lactone, 3,4,6-tribenzyl, 2-Amino-2-deoxygluconic acid, D-form, N-Ac, 1,5-lactone, 3,4-di-Me, 2-Amino-2-deoxygluconic acid; D-form, N-Ac, 1,5-lactone, 4,5-O-isopropylidene, 2-Amino-2-deoxygluconic acid, D-form, N-Ac, 1,5-lactone, 4,6-O-benzylidene, 2-Amino-2-deoxyglucopyranosyl bromide, α-D-form, Tri-Ac, 2-Amino-2-deoxyglucopyranosyl phosphate; α-D-form. 2-Amino-2-deoxyglucose; D-form, N-Me, 2-Amino-2-deoxyglucose; α-D-Pyranose-form, 2-Amino-2-deoxyglucose, β-D-Pyranose-form, 2-Amino-2-deoxyglucose; 1-(dihydrogen phosphate). D-Form, 2-Amino-2-deoxyglucose 3-(dihydrogen phosphate); D-form, 2-Amino-2-deoxyglucose 6-(dihydrogen phosphate), D-form, 2-Amino-2-deoxyglucuronic acid. D-form, 2-Amino-2-deoxyglucose, D-form, 2-Amino-w-deoxygulose; L-form, 2-Amino-2-deoxyglucuronic acid; L-form, 2-Amino-2-deoxyidose; D-form, 2-Amino-2-deoxyidose; L-form, 2-Amino-2-deoxylyxose; D-form, 2-Amino-2-deoxylyxose; L-form, 2-Amino-2-deoxymannose; D-form, 2-Amino-2-deoxylyxose; L-form, 2-Amino-2-deoxymannose; L-form, 2-Amino-2-deoxymannuronic acid; D-form, 2-Amino-2-deoxy-3-O-methylglucose; D-form, 2-Amino-2-deoxy-4-O-methylglucose; D-form, 2-Amino-2-deoxy-6-O-methylglucose; D-form, 2-(2-Amino-2-deoxyribofuranosyl)adenine; α-D-form, 2-Amino-2-deoxyribose; D-form, 2-Amino-2-deoxyribose; L-form, 2-Amino-2-deoxytalose; D-form, 2-Amino-2-deoxy-1,3,4,6-tetra-O-acetyl-α-D-glucopyranose, 2-Amino-2-deoxy-1,3,4,6-tetra-O-acetyl-α-D-glucopyranose, 2-Amino-2-deoxy-3,4,5-tri-O-benzoyl-α-D-galactopyranosyl bromide, 2-Amino-2-deoxy-D-xylonic acid, 2-Amino-2-deoxy-L-xylonic acid, 2-Amino-2-deoxyxylose; α-D-form, 2-Amino-2-deoxyxylose; α-L-form, 2-Amino-2,6-dideoxygalactose; D-form, 2-Amino-2,6,-dideoxygalactose; L-form, 2-Amino-2,6,-dideoxygalactose; DL-form, 2-Amino-2,6,-dideoxyglucose; D-form, 2-Amino-2,6,-dideoxyglucose, L-form, 2-Amino-2,6,-dideoxyglucose; L-form, N-Me, 2-Amino-2,3-dideoxy-2,6,-dideoxyglucose; L-form, N-Me, 2-Amino-2,3-dideoxy-ribo-hexopyranose; D-form, 2-Amino-2,6-dideoxymannose, D-form, 2-Amino-2,6-dideoxymannose; L-form, 2-Amino-2,6-dideoxytalose; D-form, 4-Aminophenyl 2-acetamido-2-deoxygalactopyranoside; α-D-form, 4-Aminophenyl 2-acetamido-2-deoxygalactopyranoside; β-D-form, 4-Aminophenyl 2-acetamido-1-deoxygalactopyranoside, β-D-form, 2-Amino-1,3,4,6-tetradeoxy-6-methylamino-D-ribo-heptose, in P-00019, 2-Amino-3,4,5-trihydroxypentanoic acid; (2R,3R,4R)-form, 4,-O-Isopropylidene, 2-Benzamido-2-deoxy-D-allose, 2-Benzamido-2-deoxyglucose; D-form, 2-Benzamido-2-deoxy-1,3,4,6-tetra-O-acetyl-α-D-glucopyranose, 2-Benzamido-3,4,6-tri-O-benzoyl-2-deoxy-α-D-(glucopyranosyl bromide, Benzyl 2-acetamido-4,6-O-benzylidene-2-deoxy-α-D-glucopyranoside, Benzyl 2-acetamido-3-O-benzyl-4,6-O-isopropylidene-β-D-glucopyranoside, Benzyl 2-acetamido-2-deoxygalactopyranoside; α-D-form, Benzyl 2-acetamido-2-deoxy-4,6-O-isopropylidene-β-D-glucopyranoside, Benzyl 2acetamido-3,6-di-O-benzyl-2-deoxyglucopyranoside. α-D-form, Benzyl 2 amino-4,6-O-benzylidene-2-deoxy-α-D-glucopyranoside-3-(dihydrogen phosphate), Benzyl 2-amino-α-2-deoxyglucopyranoside; α-D-form, Benzyl 2-amino-2-deoxyglucopyranoside; β-D-form, Benzyl 2-deoxy-2-phthalimido-β-D-glucopyranoside, Benzyl 2,4-diacetamido-2,4-dideoxy-α-D-galactopyranoside, Benzyl 2,3-diacetamido-2,3-dideoxy-α-D-glucopyranoside, Benzyl 2,4-diacetamido-2,4,6-dideoxy-α-D-glucopyranoside, Benzyl 2,4-diamino-2,4-dideoxy-α-D-glucopyranoside, Chondrosamine, Chondrosine, 2-Deoxy-2-()-hydroxytetradecanoylamino)glucose; (D,R) form, 2-Deoxy-2-(3-hydroxytetradecanoylamino)glucose; (D,S)-form, 2-Deoxy-2-phthalimidoglucose, β-D-pyranose form, 2-Deoxy-3,4,6-tri-O-acetyl-w-trifluoroacetamido-α-D-galactopyranosyl bromide, 2,4-Diacetamido-1,3-di-O-acetyl-2,4,6-dideoxy-D-glucopyranose, 2,6-Diacetamido-2,6-dideoxy-α-D-allopyranoside, 2,6-Diacetamido-2,6-dideoxy-α-D-galactopyranose, 2,3-Diacetamido-2,3-dideoxy-α-D-glucopyranose, 2,4-Diacetamido2,4-dideoxy-D-glucose, 2,6-Diacetamido-2,6-dideoxy α-D'-mannopyranose, 2,6-Diacetamido-2,3,4,6-tetradeoxy-D-erythro-hexose diethyl dithioacetal, 2,4-Diacetamido-2,4,6-trideoxy-D-galactose, 2,4-Diacetamido-2,4,6-trideoxy-D-glucose, 2,3-Diamino-2,3-dideoxyallose, 2,6-Diamino-2,6-dideoxyallose; o-D-Pyranose-form, 2,3-Diamino-2,3-dideoxygalactose; D-form-2,4-Diamino-2,4-dideoxygalactose, D-form, 2,3-Diamino-2,3-dideoxyglucose, α-D-Pyranose-form, 2,3-Diamino-2,3-dideoxyglucose, β-D-Pyranose form, 2,4-Diamino-2,4-dideoxy(glucose; D-form, acid; D-form, 2,6-Diamino-2,6-dideoxymannose, α-D-Pyranose-form, 2,6-Diamino-2,4,5,6-tetradeoxy-arabino-heptaric acid, 2,6-Diamino-2,4,5,6-tetradeoxy-lyxo-heptaric acid, 2,6-Diamino-2,4,5,6-tetradeoxy-ribo-heptaric acid, 2,6-Diamino-2,4,5,6-tetradeoxy-xylo-heptaric acid, 3,4-Di-O-methyl-D-glucosylamine, 3,6-Di-O-methyl-D-glucosamine, 8-Ethoxycarbonyl 2-acetamido-2-deoxy-3-O-α-D-galactopyranosyl-β-D-glucopyranoside, 8-Ethoxycarbonyloctyl 2-acetamido-2-deoxyglucopyranoside; β-D-form, Ethyl 2,6-diacetamido-2,3,4,6-tetradeoxy-α-D-glycero-hex-4-enopyranoside, Ethyl 2,4-diacetamido-2,3,4,6-tetradeoxy-β-D-arabino-hexopyranoside, Ethyl 2,6-diacetamido-2,3,4,6-tetradeoxy-α-D-erythro-hexopyranoside, Ethyl 2,6-diacetamido-2,3,6-trideoxy-α-D-ribo-hexopyranoside, Ethyl β-D-glucosaminide, Hybrimycin A$_1$, Hybrimycin C$_2$, Kasuganobiosamine, Lacto-N-biose-1, Lansioside A, 2-(4-Methoxycarbonylbutanecarboxamido)ethyl 2-acetamido-2-deoxygalactopyranoside, α-D-form, 2-(4-Methoxycarbonylbutanecarboxamido)ethyl-2-acetamido-2-deoxy-α-'-β-D-galactopyranosyl-α-D-galactopyranoside, 2-(4-Methoxycarbonylbutanecarboxamido)ethyl 2-acetamido-2-deoxygalactopyranoside, β-D-form, 2-(4-Methoxycarbonylbutanecarboxamido)ethyl-2-acetamido)-2-deoxy-3-O-β-D-galactopyranoside, 8-(Methoxycarbonyl)octyl 2-acetamido-4,6-O-benzylidene-2-deoxy-α-D-glucopyranoside, 8-(Methoxycarbonyl)octyl 2-acetamido-4,6-O-benzylidene-2-deoxy-β-D-glucopyranoside, 8-(Methoxycarbonyl)octyl 2-acetamido-2deoxyglucopyranoside. α-D-form, 8-(Methoxycarbonyl)octyl 2-acetamido-2-deoxyglucopyranoside, β-D-form, Methyl 2-acetamido-4-O-acetyl-3,6-anhydro-2-deoxy-α-D-glucopyranoside, 2-Methyl-[2-acetamido-4-O-acetyl-6-O-benzyl-3-O-(2-butenyl)-1,2-dideoxy-α-D-glucopyrano]-[2,1-d]-2-oxazoline, Methyl 2-acetamido-3-O-acetyl-2-deoxy-4,6-O-isopropylidene-β-D-glucopyranosie, Methyl 2-acetamido-4,6-O-benzylidene-2-deoxy-α-D-allopyranoside, Methyl 2-acetamido-4,6-O-benzylidene-2-deoxy-α-D-altropyranoside, Methyl 2-acetamido-4,6-O-benzylidene-2-deoxy-α-D-ribo-hexopyranosid-3-ulose, Methyl 2-acetamido-4,6-O-benzylidene-2-deoxy-β-D-ribo-hexopyranosid-3-ulose, Methyl 2-acetamido-4,6-O-benzylidene-2-deoxy-3-O-mesyl-α-D-glucopyranoside, Methyl 2-acetamido-4,6-O-benzylidene-2-deoxy-3-O-methyl-α-D-glucopyranoside, Methyl 2-acetamido-4,6-O-benzylidene-2-deoxy-α-D-talopyranoside, Methyl 2-acetamido-4,6-O-benzylidene-2,3-dideoxy-α-D-ribo-hexopyranoside, Methyl 2-acetamido-2-deoxy-α-D-altropyranoside, Methyl 2-acetamido-2-deoxy-3,4-di-O-methyl-α-D-glucopyranosie, Methyl 2-acetamido-2-deoxy-3,6-di-O-methyl-α-D-talopyranoside Methyl 2-acetamido-2-deoxy-4,6-di-O-methyl-α-D-glucopyranoside, Methyl 2-acetamido-2-deoxy-4,6-di-O-methyl-β-D-glucopyranoside, Methyl 2-acetamido-2-deoxyglucopyranoside, α-D-form, Methyl 2-acetamido-2-deoxyglucopyranoside; β-D-form, Methyl 2-acetamido-2-deoxy-α-D-gulopyranoside, Methyl 2-acetamido-2-deoxy-3,6-O-methyl-α-D-glucopyranoside Methyl 2-acetamido-2-deoxy-3-O-methylglucopyranoside, α-D-form, Methyl 2-acetamido-2-deoxy-4-O-methylglucopyranoside; α-D-form, Methyl 2-acetamido-2-deoxy-6-O-methylglucopyranoside; α-D-form, Methyl 2-acetamido-2-deoxy-α-D-talopyranoside, Methyl 2-acetamido-2-deoxy-6-tosyl-α-D-altropyranoside, Methyl 2-acetamido-2-deoxy-6-tosyl-α-D-glucopyranoside, Methyl 2-acetamido-2-deoxy-3,4,6-ti-α-benzyl-β-D-glucopyranoside, Methyl 2-amino-4,6-O-benzylidene-2-deoxy-α-D-allopyranoside, Methyl 2-amino-4,6-O-benzylidene-2-deoxy-α-D-glucopyranoside, Methyl 2-amino-4,6-O-benzylidene-2-deoxy-α-D-idopyranoside, Methyl 2-amino-4,6-O-benzylidene-2-deoxy-β-D-idopyranoside, Methyl 2-amino-2-deoxy-β-D-altropyranoside, Methyl 2-amino-2-deoxyglucopyranoside: α-D-form, Methyl 2-amino-2-deoxyglucopyranoside: β-D-form, Methyl 2-amino-2-deoxy-α-D-lyxofuranoside, Methyl 2-amino2-α-deoxy-β-D-ribopyranoside, Methyl 2-amino-2-deoxy-β-L-ribopyranoside, Methyl-2-amino-2-dideoxy-α-D-ribo-hexopyranoside, Methyl 3,6-anhydro-2-acetamido-2-deoxy-β-D-glucopyranoside, Methyl 2-benzamido-4,6-O-benzylidene-2-deoxy-α-D-allopyranoside, N ethyl 2-benzamido-4,6-O-benzylidene-2-deoxy-α-D-glucopyranoside, Methyl 2-benzamido-4,6-O-benzylidene-2-deoxy-α-ribo hexopyranosid-3-ulose, Methyl 2-benzamido-4,6-O-benzylidene-2-deoxy-'-O-tosyl-c-D-glucopyranoside, Methyl 2-benzamido-2-deoxy-4,6-di-O-tosyl-β-D-glucopyranoside, Methyl 2-benzamido-2-deoxyglucoranoside; α-D-form, Methyl 2-benzamido-2-deoxy-3,4,6-tri-O-acetyl-α-D-glucopyranoside, Methyl 2-benzamido-2,3-dideoxy-β-D-ribo-hexopyranoside, Methyl 2-deoxy-2-phthalimido-1-thio-3,4,6-tri-O-acetyl-β-D-glucopyranoside, Methyl 2,6-diacetamido-2,3,4,6,7-pentadeoxy-α-DL-ribo-heptopyranoside, Methyl 2,4-diacetamido-2,3,4,6-tetradeoxy-α-D-arabino-hexopyranoside, Methyl 2,4-diacetamido-2,3,4,6-tetradeoxy-β-D-arabino-hexopyranoside, Methyl 2,6-diacetamido-2,3,6-trideoxy-α-D-ribo-hexofuranoside, Methyl 2,6-diacetamido-2,3,6-trideoxy-α-D-ribo hexopyranoside, Methyl 3,5-di-O-acetyl-2-benzamido-2-deoxy-α-D-xylofuranoside, Methyl 4,6-di-O-acetyl-2,3-dibenzamido-2,3-dideoxy-β-D-galactopyranoside, Methyl 2,6-diamino-2,3,4,5-tetradeoxy-α-D-erythrohexopyranoside, Methyl 2,6-dibenzamido-2,6-dideoxy-α-D-allopyranoside, Methyl 2,3-dibenzamido-2,3-dideoxy-β-D-galactopyranoside, Methyl 4,6-dichloro-4,6-dideoxy-2,3-di-O-tosyl-α-D-galactopyranoside, Methyl 4,6-dichloro-4,6-dideoxy-2,3-di-O-tosyl-β-D-galactopyranoside, Methyl 4,6-dichloro-4,6-dideoxy-β-D-galactopyranoside, 2-Methyl-(3,4,6-tri-O-acetyl-1,2-dideoxyglucopyrano[2,1-d]-2-oxazoline; α-D-form, Metrizamide, Neosamine B, Neosamine C, Paromamine, Pneumosamine, Purpurosamine B, Streptobiosamine, 1,3,4, 6-Tetra-O-acetyl-2-(N-acetylbenzamido)-2-deoxy-α-D-glucopyranose, 2-Trehalosamine, 3,4,6-Tri-O-acetyl-2-benzamido-2-deoxy-α-D-glucopyranosyl bromide, 3,4,6-Tri-O-acetyl-2-deoxy-2-phthalimido-β-D-glucopyranosyl bromide, O-(3,4,6-Tri-O-acetyl-2-deoxy-2-phthalimido-β-D-glucopyranosyl)trichloracetimidate, 2,3,5-Triamino-2,3,5-trideoxy-D-arabino-1,4-lactone, 3,4,6-Tri-O-benzyl-D-glucosamine, 2,2,2-Trichloroethyl 2-acetamido-2-deoxy-3-O-β-D-galactopyranosyl-β-D-glucopyranoside, 2,2,2-Trichloroethyl 2-acetamido-2-deoxyglucopyranoside. β-D-form, 2,2,2-Trichloroethyl 2-deoxy-3,6di-O-benzyl-2-phthalimido-D-glucopyranoside, 3,4,6-Tri;-O-methyl-d-glucosamine, 3-Acetamido-3-deoxy-1,2:5,6-di-O-isopropolidene-α-D-allofuranose, 3-Acetamido-3-deoxy-D-D-glucopyranose, 3-Acetamido-3-deoxy-1,2-O-isopropylidene-α-D-allofuranose, 3-Acetamido-3-deoxy-1,2-O-isopropylidene-α-D-glucofuranose, 3-Acetamido-3,6-dideoxy-D-galactose, 3-Acetamido-3,6-dideoxy-D-talose. 3-Acetamido-1,2,5-tri-O-acetyl-3-deoxy-β-D-ribofuranose, 3-Acetamido-2,3,6-trideoxy-D-arabino-hexopyranose, 3-Acetamido-2,3,6-trideoxy-D-lyxo-hexose, Aclacinomycin A, Aclacinomycin B, Acosamine, Akalvine, 3-Amino-3-deoxyglucose; β-D-Pyranose-form, Me glycoside, N-Ac, 3-Amino-3-deoxy-1,2-O-isopropylidene-α-D-ribofuranose, 3-Amino-3-deoxyribose, 3-Amino-1,2:5,6-di-O-cyclohexylidene-3-deoxy-α-D-allofuranose, 3-Amino-3,6-dideoxyglucose; D-form, 3-Amino-3,6-dideoxyglucose; L-form, 3-Amino-3,6-dideoxytalose; D-form, 3-Amino-3,6-dideoxytalose; L-form, 3-Amino-2,3,6-trideoxy-arabino-hexose; D-Pyranose-form, Amphotericin B, Angolamycin, 3-Benzamido-4-O-benzoyl-2,3,6-trideoxy-3-C-methyl-α-L-xylo-hexopyranose, 3-Benzamido-2,3,6-trideoxy-D-lyxo-hexose, 3-Benzamido-2,3,6-trideoxy-L-lyxo-hexose, Benzyl 2,3-diacetamido-2,3-dideoxy-α-D-glucopyranoside, Duanosamine; L-form, 3-Deoxy-1,2-O-isopropylidene-3-(N-methylacetamido)-β-L-arabinofuranose, 3-Deoxy-1,2-O-isopropylidene-3-(N-methylacetamido)-α-D-xylofuranose, 3-Deoxy-3'-(N-methylacetamido)-L-arabinose, 3-Deoxy-3-methylaminoxylose; D-form 10-Deoxymethymycin, Desosamine, 2,3-Diacetamido-2,3-dideoxy-α-D-glucopyranose, in D-00147, 2,3-Diamino-2,3-dideoxyallose; D-form, 2,3-Diamino-2,3-dideoxygalactose. D-form, 2,3-Diamino-2,3-dideoxyglucose; α-D-Pyranose-form, 2,3-Diamino-2,3-dideoxyglucose; β-D-Pyranose-form, 3,6-Diamino-5-hydroxylhexanoic acid, 3,6-Dideoxy-3-dimethylaminoglucose, β-D-Pyranose-form, 3,6-Dideoxy-3-dimethylaminoglucose; β-L-Pyranose-form, 3-(Dimethylamino)-2,3,6-trideoxy-lyxo-hexapyranose; α-D-form, 3-(Dimethylamino)-2,3,6-trideoxy-arabino-hexose; D-form, Ethyl 3-benzamido-3-C-methyl-2,3,6-trideoxy-α-L-lyxo-hexopyranoside, Ethyl 3,4,6-trideoxy-3-dimethylamino-α-D-α-xylo-hexopyranoside, Ethyl 3,4,6-trideoxy-3-dimethylamino-β-D-xylo-hexopyranoside, Garosamine; L-form, Hedamycin, Isorhodomycin A, Kanosamine, Methyl 3-acetamido-2-O-acetyl-3,6-dideoxy-β-D-galactopyranoside, Methyl 3-acetamido-4-O-acetyl-3,6-dideoxy-β-D-galactopyranoside, Methyl 3-acetamido-4,6-O-benzylidene-3-deoxy-α-D-glucopyranoside, Methyl 3-acetamido-2,5-di-O-acetyl-O-deoxy-β-D-ribofuranose, Methyl 3-acetamido-2,5-di-O-acetyl-3-deoxy-α-D-ribofuranoside, Methyl 3-acetamido-2,4-di-O-acetyl-2-deoxy-α-D-ribopyranoside, Methyl 3-acetamido-2,4-di-O-acetyl-3,6-dideoxy-β-D-galactopyranoside, Methyl 3-acetamido-3,6-dideoxy-β-D-galactopyranoside, Methyl 3-acetamido-3,6-dideoxy-α-L-glucopyranoside, Methyl 3-acetamido-3,6-dideoxy-β-L-glucopyranoside, Methyl 3-acetamido-3,6-dideoxy-β-L-mannopyranoside, Methyl 3-acetamido-3,6-dideoxy-α-D-talopyranoside, Methyl 3-acetamido-3,6-dideoxy-α-L-talopyranoside. Methyl 3-acetamido-2,3,6-trideoxy-α-D-arabino-hexopyranoside, Methyl 3-acetamido-2,3,6-trideoxy-β-D-arabino-hexopyranoside, Methyl 3-acetylamino-3-deoxy-2,4,6-tri-O-acetyl-α-D-glucopyranoside, Methyl 3-amino-4,6-O-benzylidene-3-deoxy-α-D-glucopyranoside. Methyl 3-amino-3-deoxy-β-D-glucopyranoside, Methyl 3-amino-3-deoxy-β-D-ribofuranose, Methyl 3-amino-3,6-dideoxy-β-D-galactopyranoside, Methyl 3-amino-3,6-dideoxy-α-L-galactopyranoside. Methyl 3-amino-3,6-dideoxy-α-D-glucopyranoside, Methyl 3-amino-3,6-dideoxy-α-L-glucopyranoside, Methyl 3-amino-3,6-dideoxy-β-L-glucopyranoside, Methyl 3-amino-3,6-dideoxy-α-D-mannopyranoside, Methyl 3-amino-3-C-methyl-2,3,6-trideoxy-α-L-lyxo-hexopyranoside, Methyl 3-amino-2,3,6-trideoxy-α-L-lyxo-hexoside, Methyl 3-amino-2,3,6-trideoxy-3-C-methyl-α-L-xylo-hexopyranoside, Methyl 3-benzamido-4-O-benzoyl-2,3,6-dideoxy-3-C-methyl-α-L-xylo-hexopyranoside, Methyl 3-benzamido-4-O-benzoyl-2,3,6-trideoxy-3-C-methyl-D-L-xylo-hexopyranoside, Methyl 3-benzamido-2,3,6-trideoxy-3-C-methyl-α-L-xylo-hexopyranoside, Methyl 5-O-benzyl-3-deoxy-3-(methylamino)-α-D-xylofuranoside, Methyl 5-O-benzyl-3-deoxy-3-(methylamino)-β-D-xylofuranoside, Methyl 3-deoxy-2,5-di-O-benzyl-3-(N-methylacetamido)-α-D-xylofuranoside, Methyl 3-deoxy-3-methylamino-α-D-arabinofuranoside, Methyl 3-deoxy-3-methylamino-α-D-arabinopyranoside, Methyl 3-deoxy-3-(methylamino)-α-L-arabinopyranoside, Methyl 3-deoxy-3-(methylamino)-()-D-xylopyranoside, Methyl 3-deoxy-3-(methylamino)-β-D-xylopyranoside, Methyl 3-deoxy-O-(dimethylamino)-β-L-xylopyranoside, Methyl 3-deoxy-4-C-methyl-3-(N-methylacetamido)-β-L-α-arabinopyranoside, Methyl 4,6-di-O-acetyl-2,3-dibenzamido-2,3-dideoxy-β-D-galactopyranoside, Methyl 2,3-dibenzamido-2,3-dideoxy-β-D-galactopyranoside, Methyl 3,6-dideoxy-α-dimethylamino-α-D-glucopyranoside, Methyl 3,6-dideoxy-3-dimethylamino-α-L-glucopyranoside, Methyl 3-(dimethylamino)-2,3,6-trideoxy-β-D-arabino-hexopyranoside, Methyl 3-(dimethylamino)-2,3,6-trideoxy-α-D-arabino-hexopyranoside, Methyl 3-(dimethylamino)-2,6-trideoxy-α-D-lyxo-hexopyranoside, Methyl(methyl 3-benzamido-2-O-benzoyl-3,4-dideoxy-α-D-xylo-hexopyranoside)uronate, Methyl(methyl 3-benzamido-2-O-benzoyl-3,4-dideoxy-β-D-xylo-hexopyranoside)uronate, Methyl 2,3,6-trideoxy-3-dimethylamino-α-L-ribo-hexopyranoside Methyl 2,3,6-trideoxy-3-dimethylamino-β-L-ribo-hexopyranoside, Mycosamine, Rhodosamine, Ristosamine, 3-Trehalosamine, 2,3,5-Triamino-2,3,5-trideoxy-D-α-arabinono-1,4-lactone, 3,4,6-Trideoxy-3-dimethylamino-xylo-hexose; L-form, Vancosamine, 4-Acetamido-2-amino-2,4,6-trideoxy-D-glucose, 4-Acetamido-4-deoxy-D-galactose, Amicetamine, 4-Amino-4-deoxygalactose D-form, 4-Amino-4-deoxyglucuronic acid, D-form, 4-Amino-4,6-dideoxygalactose D-Pyranose-form, 4-Amino-4,6-dideoxymannose, D-form, 4-Amino-2,4,6-dideoxy-3-O-methyl-arabino-hexose; L-form, Benzyl 2,4-diacetamido-2,4-dideoxy-α-D-galactopyranoside, Benzyl 2,4-diacetamido-2,4,6-trideoxy-β-D-glucopyranoside, Benzyl 2,4-diamino-2,4-dideoxy-α-D-galactopyranoside, Benzyl 2,4-diamino-2,4-dideoxy-α-D-glucopyranoside, 2,4-Diacetamido-1,3-di-O-acetyl-2,4,6-trideoxy-D-glucopyranose, 2,4-Diacetamido-2,4-dideoxy-D-glucose, 2,4-Diacetamido-2,4,6-trideoxy-D-galactose, 2,4-Diacetamido-2,4,6-trideoxy-D-glucose, 2,4-Diamino-2,4-dideoxygalactose; 2,4-Diamino-2,4- dideoxyglucose 4,6-Dideoxy-4-methylamino-α-D-glucopyranoside, 4,6-Dideoxy-3-C-methyl-4-(methylamino)mannose, D-form, 4-Dimethylamino-2,3,4,6-tetradeoxy-threo-hexose; D-form, Ethyl 2,4-diacetamido-2,3,4,6-tetradeoxy-β-D-arabino-hexopyranoside, Forosamine, wGougerotin, Kasuganobiosamine, Kijanose; D-form, Methyl 4-acetamido-4-deoxyerythofuranoside; L-form, 2,3-Di-Ac, Methyl 4-acetamido-4-deoxy-α-D-galactopyranoside, Methyl 4-acetamido-3-O-ethyl-2,4,6-trideoxy-β-D-1-ribo-hexopyranoside, Methyl 4-acetamido-2,4,5-trideoxy-3-O-methyl-α-L-arabino-hexopyranoside, Methyl 4-acetamido-2,4,6-trideoxy-3-O-methyl-3-L-arabino-hexopyranoside, Methyl 4-acetamido-2,4,6-trideoxy-3-O-methyl-α-D-ribo-hexopyranoside, Methyl 4-(acetamido)-2,4,6-dideoxy-3-O-methyl-α-D-xylo-hexopyranoside, Methyl 4-acetamido-2,4,6-trideoxy-3-O-methyl-α-D-ribo-hexopyranoside, Methyl 4-amino-4-deoxy-α-D-glucopyranosiduronic acid, Methyl 4-amino-4,6-dideoxy-α-D-galactopyranoside, Methyl 4-amino-4,6-dideoxy-α-D-glucopyranoside, Methyl 4-amino-4,6-dideoxy-α-D-mannopyranoside, Methyl 4-amino-4,6-dideoxy-α-L-mannopyranoside, Methyl 4-amino, 2,3,5-trideoxy-α-D-erythro-hex-2-enopyranosiduronic acid, Methyl 4-amino-2,4,6-trideoxy-3-O-methyl-α-D-xylo-hexopyranoside, Methyl 2,4-diacetamido-2,3,4,7-tetradeoxy-α-D-arabino-hexopyranoside, Methyl 2,4-diacetamido-2,3,4,6-tetradeoxy-β-D-arabino-hexopyranoside, Methyl 4-(dimethylamino)-2,3,4,6-tetradeoxy-α-D-threo-hexopyranoside, Methyl α-sibrosaminide. Methyl β-sibrosaminide, Mitiphylline, 4-Trehalosamine, Viosamine, N-Acetylneuraminic acid, 6-O-(N-Acetyl-α-D-neuraminyl)-D-galactose, 5-Amino-5-deoxymannose, A-00130, 1,5-Dideoxy-1,5-imino-D-glucitol, 1,5-Dideoxy-1,5-(methylimino)-D-glucitol, N-Glycolylneuraminic acid, Neuraminic acid, Sialic acid, 2,3,5-Triamino-2,3,5-trideoxy-D-arabinono-1,4-lactone, 1,2,5-Trideoxy-4-O-(β-D-glucopyranosyl)-1,5-imino-D-arabino-hexitol, 6-Acetamido-6-deoxy-1,2,3,4-tetra-O-acetyl-α-D-glucopyranose, 6-Acetamido-6-deoxy-1,2,3,4-tetra-O-acetyl-β-D-glucopyranose, 6-Amino-6-deoxy-1,2,3, 4-di-O-isopropylidene-oα-D-galactopyranose, 6-Amino-6-deoxygalactose, D-form, 6-Amino-6-deoxyglucose; D-form, 2-Amino-2,3,4,6-tetradeoxy-6-methylamino-D-ribo-heptose, 6-(4-Azido-3,5-diiodobenzamido-2-hydroxy)-6-deoxygalactose D-form, 6-Benzamido-6-deoxy-D-galactose, 2,6-Diacetamido-2,6-dideoxy-α-D-allopyranoside 2,6-Diacetamido-2,6-dideoxy-β-D-galactopyranose, 2,6-Diacetamido-2,6-dideoxy-α-D-mannopyranose, 2,6-Diacetamido-2,3,4,5-tetradeoxy-D-erythro-hexose diethyl dithioacetal, 2,6-Diamino-2,6-dideoxyallose; α-D-Pyranose-form, 2,6-Diamino-, 6-dideoxygalactose; α-D-Pyranose-form, 2,6-Diamino-2,6-dideoxymannose; α-D-Pyranose-form, 6',6-Diamino-6',6-dideoxysucrose, 3,6-Diamino-5-hydroxyhexanoic acid, 2,6-Diamino-2,4,5,6-tetradeoxy-arabino-heptaric acid, 2,6-Diamino-2,4,5,6-tetradeoxy-lyxo-heptaric acid, 2,6-Diamino-2,4,5,6-tetradeoxy-ribo-heptaric acid, 2,6-Diamino-2,4,5,6-tetradeoxy-xylo-heptaric acid, Ethyl 2,6-diacetamido-2,3,4,6-tetradeoxy-α-D-flycero-hex-4-enopyranoside, Ethyl 2,6-diacetamido-2,3,4,6-tetradeoxy-α-D-erythro-hexopyranoside, Ethyl 2,6-diacetamido-2,3,6-trideoxy-α-D-ribo-hexopyranoside, wGougerotin, Lincosamine, Di-Me dithioacetal, Methyl 6-amino-6,8-dideoxy-1-thio-β-D-erythro-α-D-galacto-octopyranoside. Methyl 2,6-diacetamido-2,3,4,6,7-pentadeoxy-α-DL-ribo-heptopyranoside, Methyl 2,6-diacetamido-2,3,6-trideoxy-α-D-ribo-hexofuranoside, Methyl 2,6-diacetamido-2,3,6-trideoxy-α-D-ribo-hexopyranoside, Methyl 2,6-diamino-2,3,4,6-tetradeoxy-α-D-erythro-hexopyranoside, Methyl 2,6-dibenzamido-2,6-dideoxy-α-D-allopyranoside, Neosamine B, Neosamine C, Purpurosamine B, 1',6',6-Triamino-1',6',6-trideoxysucrose, 1-Amino-1-deoxyglucitol; D-form, 2-Amino-2-deoxyglucitol; D-form, B, HCl, 1-Amino-1-deoxymannitol, D-form, 1-Amino-1-deoxyribitol; D-form, 1-Amino-1-deoxyribitol, L-form, Benzyl 2,4-diamino-2,4-dideoxy-α-D-galactopyranoside. 1-Deoxy-1-(methylamino)-D-glucitol, 1,4-Diacetamido-1,4-dideoxy-D-glucitol, 1,4-Diacetamido-2,3,5,6-tetra-α-O-acetyl-1,4-dideoxy-D-,glucitol, 1,2-Diamino-1,2-dideoxyglucitol. D-form, 1,4-Diamino-1,4-dideoxyglucitol; D-form, 1,2-Diamino-1,2-dideoxymannitol; D-form, neo-Inositol; 1,4-Diamino-1,4-dideoxy, 1,5-Anhydro-2-azido-2-deoxy-D-ribo-hex-1-enitol, 1,6-Anhydro-2,4-diazido-2,4-dideoxy-β-D-glucopyranose, 2-Azido-5-O-benzoyl-'-O-(4-nitrobenzoyl)-α-D-arabinofuranosyl chloride, 2-Azido-2-deoxyglucopyranosyl bromide; α-D-form, 2-Azido-2-deoxyglucose, D-form, 2,4-Diazido-2,4-dideoxyglucose, D-form, Methyl 2-azido-4,6-O-benzylidene-2-deoxy-α-D-ribo-hexopyranosid-3-ulose. Methyl 2-azido-4,5-O-benzylidene-2,3-dideoxy-α-D-erythro-hex-2-enopyranoside, 4-Aminophenyl 1-thio-β-D-fucopyranoside, 4-Aminophenyl 1-thio-α-L-fucopyranoside, 4-Aminophenyl 1-thio-β-L-fucopyranoside, 4-Aminophenyl 1-thiogalactopyranoside. β-D-form, 4-Aminophenyl 1-thioglucopyranoside; β-D-form, 4-Aminophenyl 1-thiomannopyranoside, α-D-form, 4-Aminophenyl 1-thioxylopyranoside; β-D-form, Benzyl 1-thio-α-D-glucopyranoside, 1,6-Dithioglucose, D-form, Ethyl 2,3,4,6-tetra-O-acetyl-1-thio-α-D-mannopyranoside, Ethyl 1-thio-α-D-galactofuranoside, Ethyl 1-thio-α-D-galactopyranoside, Ethyl 1-thio-β-D-galactopyranoside, Ethyl 1-thio-α-D-glucofuranoside, Ethyl 1-thio-β-D-glucofuranoside, Ethyl 1-thio-α-D-glucopyranoside, Ethyl-1-thio-α-D-mannopyranoside, Ethyl 1-thio-α-D-ribofuranoside, β-D-Galactopyranosyl 1-thio-α-D-galactopyranoside, 1,2-O-Isopropylideneapiose, O-L-threo-form, 3'-Thio, 3,3'-di-Ac, w Lincomycin, Methyl 6-amino-6,8-dideoxy-α-thio-β-D-erythro-α-D-galacto-octopyranoside, Methyl 2-deoxy-2-phthalimido-1-thio-3,4,6-tri-O-acetyl-:-D-glucopyranoside, Methyl 1-thio-β-D-galactopyranoside, Methyl 6-thio-β-D-galactoseptanoside, Methyl 1-thio-α-D-glucopyranoside, Methyl 1-thio-β-D-glucopyranoside, Methyl 1-thio-β-D-xylopyranoside, 1,2,3,4,6-Penta-O-acetyl-6-thio-α-D-galactopyranose, 1,2,3,4,5-Penta-O-acetyl-6-thio-α-D-galactoseptanose, 1,2,3,4,5-Penta-O-acetyl-6-thio-β-D-galactoseptanose, Penta-O-acetyl-1-thio-β-D-glucopyranoside, Phenyl 2,3,4,6-tetra-O-acetyl-6-thio-α-D-galactopyranoside, Phenyl 2,3,4,6-tetra-O-acetyl-6-thio-β-D-galactopyranoside, Phenyl 1-thio-α-D-galactofuranoside, Phenyl 1-thio-α-D-glucofuranoside, Phenyl 1-thio-α-D-glucopyranoside, Pirlimycin, 1-Selenoglucose, wSinigrin, 2,3,4,6-Tetra-O-acetyl-1-thio-β-D-glucopyranose, 1-Thioarabinose, L-form, 1-Thioglucose, D-form, 1-Thiomannose, 5-D-Pyranose-form, 1-Thioribose; D-form, 1-Thioxylose; D-form, 2,3,4-Tri-O-acetyl-1,6-di-S-benzoyl-1,6-dithio-β-D-glucopyranose, 2-Acetamido-2-deoxy-5-thio-β-D-glucopyranose, 2-Amino-2-deoxy-5-thioglucose; α-D-Pyranose-form, N, 1,3,4,6-Penta-Ac, 1,6-Anhydro-3-deoxy-4S-phenyl-4-thio-β-D-erythro-hexopyranos-2-ulose, 6-O-Benzoyl-D-glucose diethyldithioacetal, 6-Deoxy-5-thiotalose, L-Pyranose-form, 1,6-Dithioglucose; D-form, 5,6-O-Ethylidene-D-galactose diethyldithioacetal, Galactose diethyldithioacetal; D-form, Glucose diethyldithioacetal; D-form, Glucose diethyldithioacetal; D-form, 6-Benzoyl, 2,3:4,5-di-O-isopropylidene, D-Glucothiapyranose, 1,2-O-Isopropylidenegalactopyranose, α-D-form, 4,6-O-Ethylidene, 3-(methylthiomethyl), and Methyl 2,3,4-tri-O-acetyl-α-D-lyxopyranoside. Further stabilising agents include organic compounds selected from CRC Handbook of Physics & Chemistry (1972–73 Edition).
1. 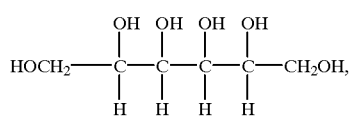
2. 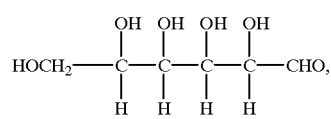
3. 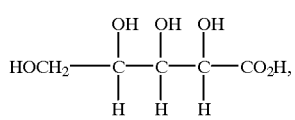
4. 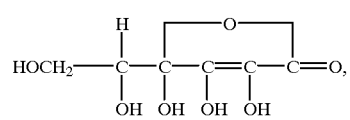
5. 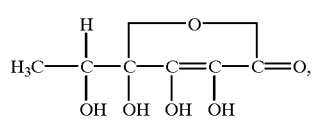
6. 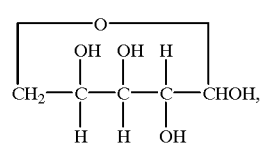
7. 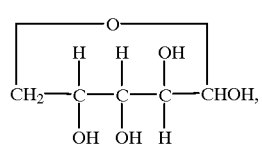
8. 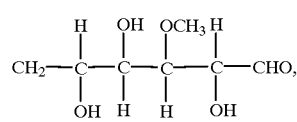
9. 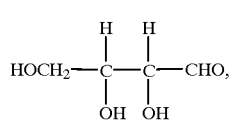
10. 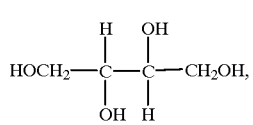
11. 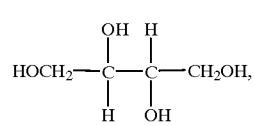
12. 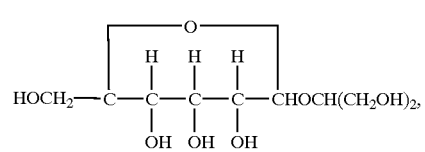
13. 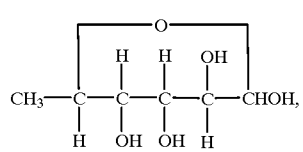
14. 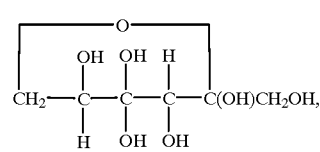
15. 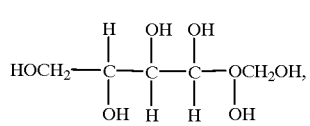
16. 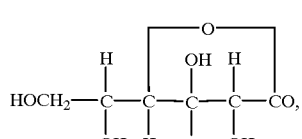
17. 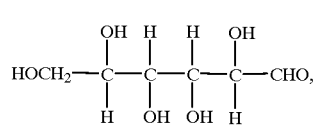
18. 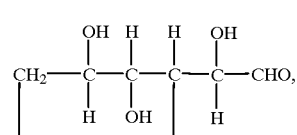
19. 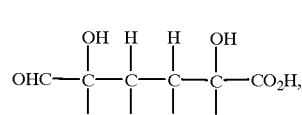
20. 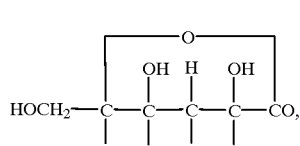

-continued
21. 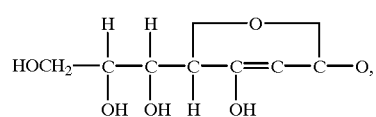
22. 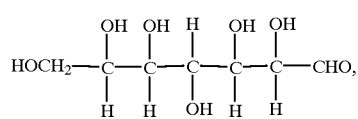
23. 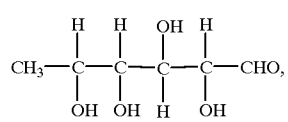
24. 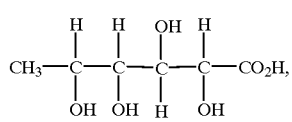
25. 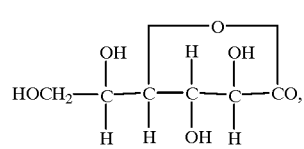
26. 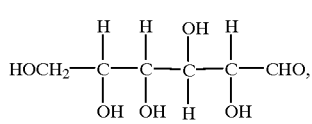
27. 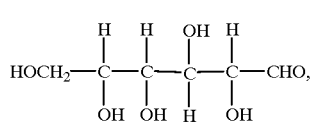
28. 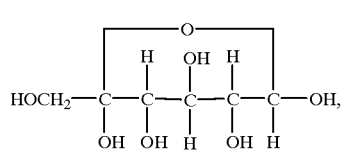
29. 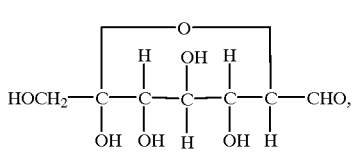
30. 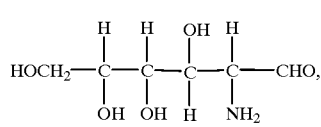
31. 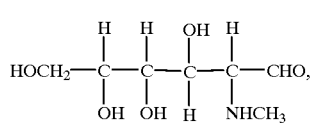
32. 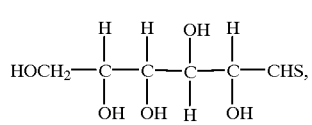
33. 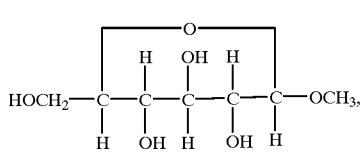
34. 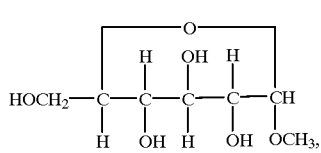
35. 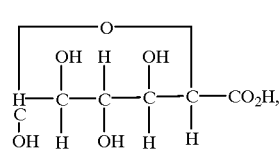
36. 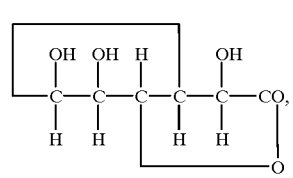
37. 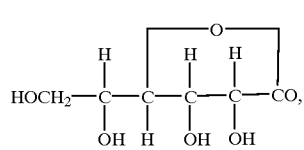
38. 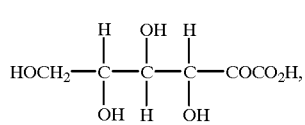
39. 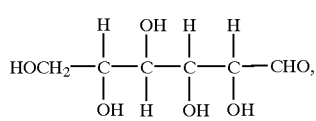
40. 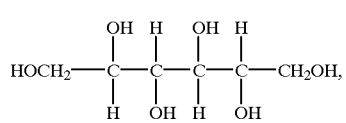

-continued
41. 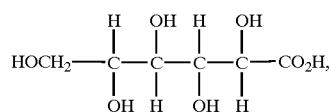
42. 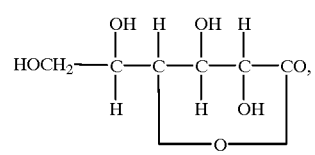
43. 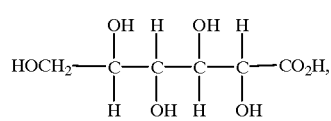
44. 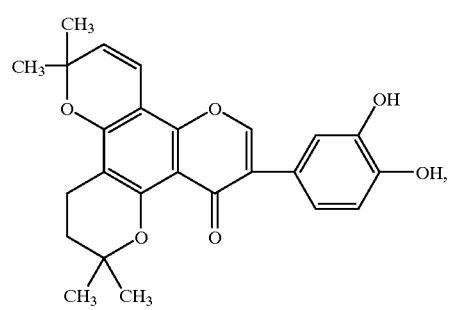
45. 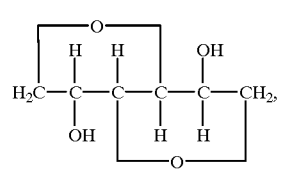
46. 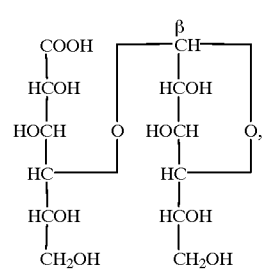
47. 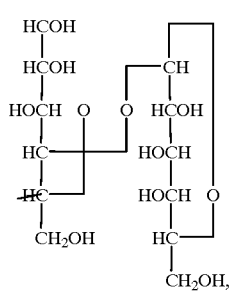
48. 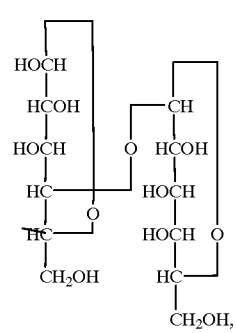
49. 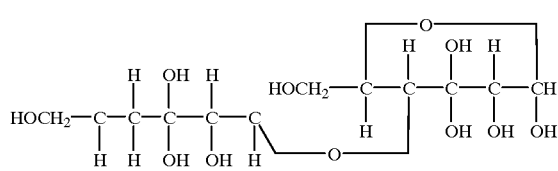
50. 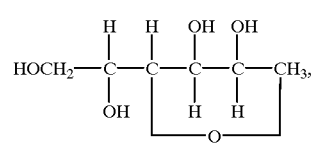
51. 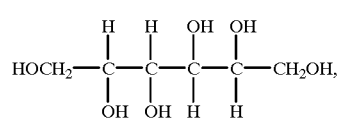
52. 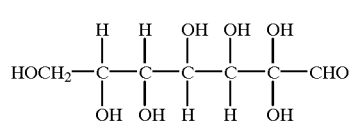
53. 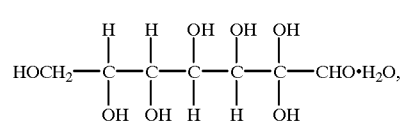

-continued
54. 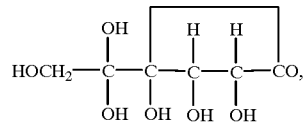
55. 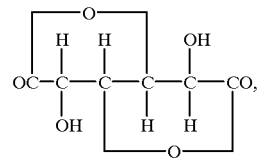
56. 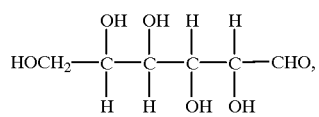
57. 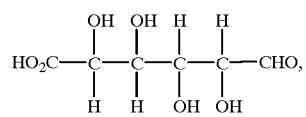
58. 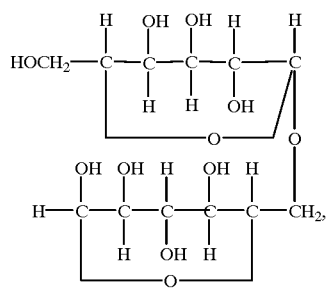
59. 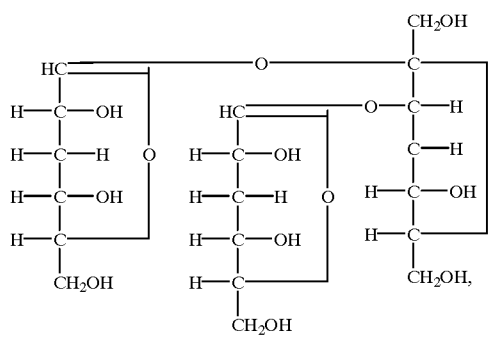
60. 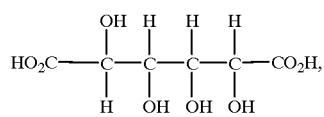
61. 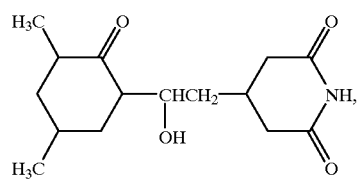
62. 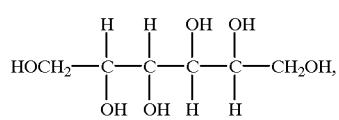
63. 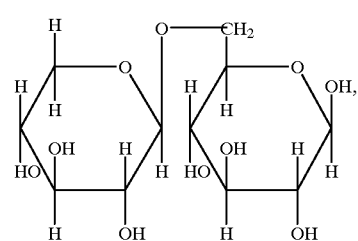
64. 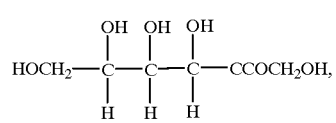

-continued
65. 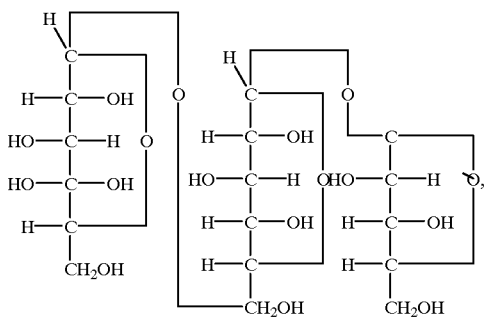
66. 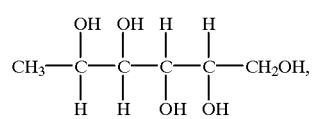
67. 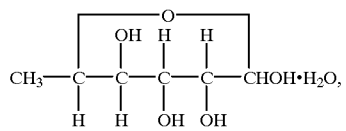
68. 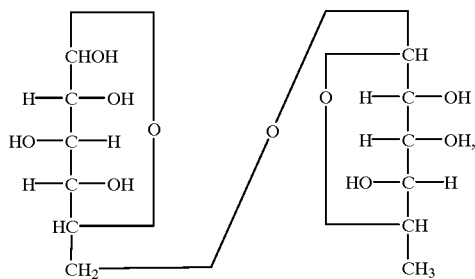
69. 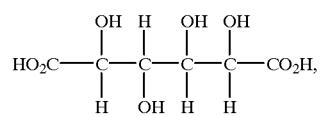
70. 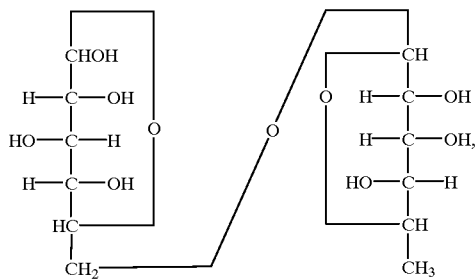
71. 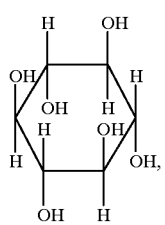
72. 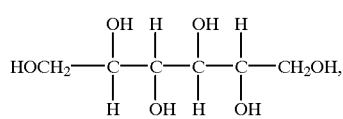
73. 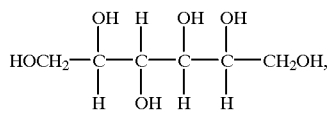

74. 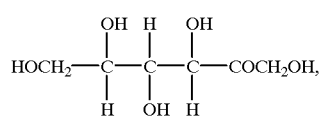
75. 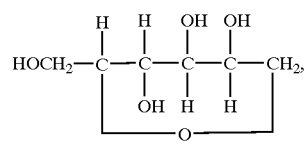
76. 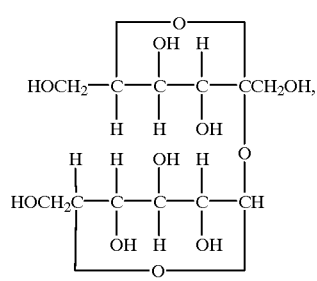
77. 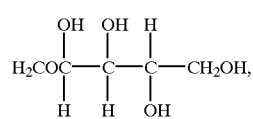
78. 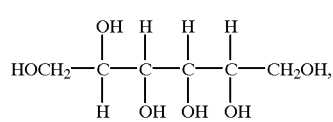
79. 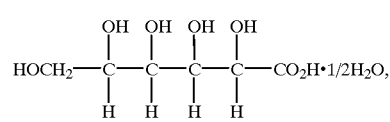
80. 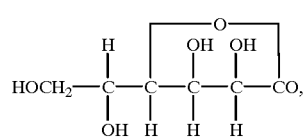
81. 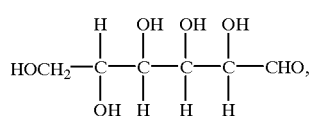
82. 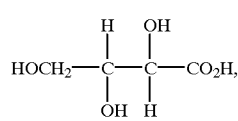
83. 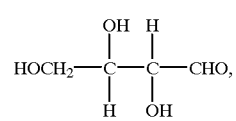
84. 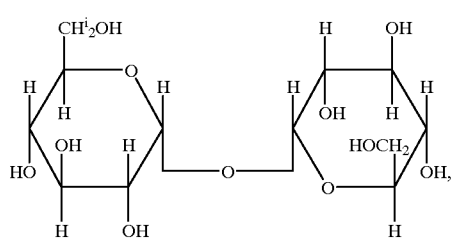
85. 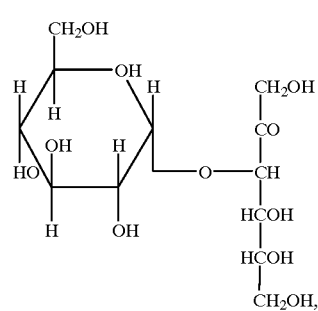
86. 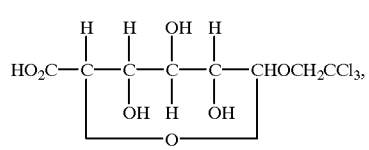

-continued

| | | | |
|---|---|---|---|
| 87. | 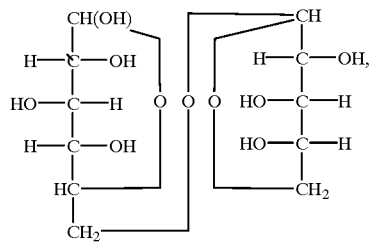 | 88. | 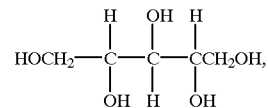 |
| 89. | 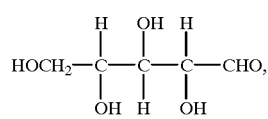 | 90. | 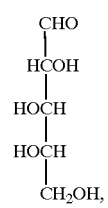 |
| 91. | 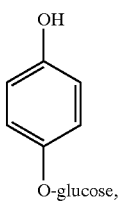 | 92. | 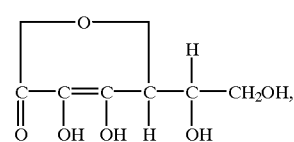 |
| 93. | 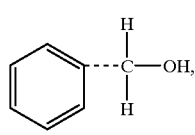 | 94. | HOCH$_2$CH$_2$OCH$_2$CH$_2$OH, |
| 95. | HOCH$_2$CH:CHCH$_2$OH, | 96. | CH$_3$(CH$_2$)$_2$OH, |
| 97. | (C$_4$H$_9$OCO$_2$CH$_2$)$_2$O, | 98. | HOCH$_2$CH$_2$CH(OH)CH$_3$, |
| 99. | HOCH$_2$CH$_2$CH$_2$CH$_2$OH, | 100. | CH$_3$CH$_2$OCH$_2$OCH$_3$, |
| | 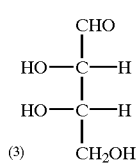 (1) | | 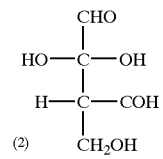 (2) |
| 101. | 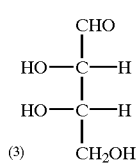 (3) | | 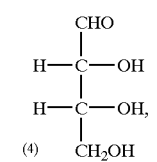 (4) |
| 102. | C$_2$H$_5$COC$_2$H$_5$, | 103. | C$_2$H$_5$OOCCH:CHCOOC$_2$H$_5$. |

| Further examples of stabilising agents | | | |
|---|---|---|---|
| Stabilising Agent | CAS Registry Number | Molecular Formula | Abbreviation |
| Polyphosphates | | | |
| sodium tripolyphosphate | [7758-29-4] | Na$_5$P$_3$O$_{10}$ | STPP |
| hexametaphosphoric acid | [18694-07-0] | H$_6$O$_{18}$P$_6$ | |

-continued

Further examples of stabilising agents

| Stabilising Agent | CAS Registry Number | Molecular Formula | Abbreviation |
|---|---|---|---|
| Aminocarboxylic acids | | | |
| ethylenediaminetetraacetic acid | [60-00-4] | $C_{10}H_{16}N_2O_8$ | EDTA |
| hydroxyethylenediaminetriacetic acid | [150-39-0] | $C_{10}H_{18}N_2O_7$ | HEDTA |
| nitrilotriacetic acid | [139-13-9] | $C_6H_9NO_6$ | NTA |
| N-dihydroxyethylglycine | [150-25-4] | $C_6H_{13}NO_4$ | 2-HxG |
| ethylenebis(hydroxyphenylglycine) | [1170-02-1] | $C_{18}H_{20}N_2O_6$ | EHPG |
| 1,3-Diketones | | | |
| acetylacetone | [123-54-6] | $C_5H_8O_2$ | acac |
| trifluoroacetylacetone | [367-57-7] | $C_5H_5F_3O_2$ | tfa |
| thenoyltrifluoroacetone | [326-91-0] | $C_8H_5F_3O_2S$ | TTA |
| Hydroxycarboxylic acids | | | |
| tartaric acid | [526-83-0] | $C_4H_6O_6$ | |
| citric acid | [77-92-9] | $C_6H_8O_7$ | cit |
| gluconic acid | [133-42-6] | $C_6H_{12}O_7$ | |
| 5-sulfosalicylic acid | [97-05-2] | $C_7H_6O_6S$ | 5-SSA |
| Polyamines | | | |
| ethylenediamine | [107-15-3] | $C_2H_8N_2$ | en |
| diethylenetriamine | [111-40-0] | $C_4H_{13}N_9$ | dien |
| triethylenetetramine | [112-24-3] | $C_6H_{16}N_4$ | trien |
| triaminotriethylamine | [4097-89-6] | $C_6H_{18}N_4$ | tren |
| Aminoalcohols | | | |
| triethanolamine | [102-71-6] | $C_6H_{15}NO_3$ | TEA |
| N-hydroxyethylethylenediamine | [111-41-1] | $C_4H_{12}N_2O$ | hen |
| Aromatic heterocyclic bases | | | |
| dipyridyl | [366-18-7] | $C_{10}H_8N_2$ | dipy. bipy |
| o-phenanthroline | [66-71-7] | $C_{12}H_8N_2$ | phen |
| Phenols | | | |
| salicylaldehyde | [90-02-8] | $C_7H_6O_2$ | |
| disulfopyrocatechol | [149-46-2] | $C_6H_6O_8S_2$ | Tiron, PDS |
| chromotropic acid | [148-25-4] | $C_{10}H_8O_8S_2$ | DNS |
| Aminophenols | | | |
| oxine, 8-hydroxyquinoline | [148-24-3] | $C_9H_7NO$ | Q, ox |
| oxinesulfonic acid | [84-88-8] | $C_9H_7NO_4S$ | |
| Oximes | | | |
| dimethylglyoxime | [95-45-4] | $C_4H_8N_2O_2$ | |
| salicylaldoxine | [94-67-7] | $C_7H_7NO_2$ | |
| Schiff bases | | | |
| disalicylaldehyde 1,2-propylenedi-imine | [94-91-7] | $C_{17}H_{18}N_2O_2$ | |
| Tetrapyrroles | | | |
| tetraphenylporphin | [917-23-7] | $C_{44}H_{30}N_4$ | |
| phthalocyanine | [574-93-6] | $C_{32}H_{16}N_8$ | |
| Sulfur compounds | | | |
| toluenedithiol (Dithiol) | [496-74-2] | $C_7H_8S_2$ | tdth |
| dimercaptopropanol | [59-52-9] | $C_3H_8OS_2$ | BAL |
| thioglycolic acid | [68-11-1] | $C_2H_4O_2S$ | |
| potassium ethyl xanthate | [140-89-6] | $C_3H_6OS_2Na$ | |
| sodium diethyldithiocarbamate | [148-18-5] | $C_5H_{11}NS_2Na$ | |
| dithizone | [60-10-6] | $C_{13}H_{12}N_4S$ | dz |
| diethyl dithiophosphoric acid | [298-06-6] | $C_4H_{11}O_2PS_2$ | |
| thiourea | [62-56-6] | $CH_4N_2S$ | |
| Synthetic macrocylic compounds | | | |
| dibenzo-[18]-crown-6 | [14187-32-7] | $C_{20}H_{24}O_6$ | |
| hexamethyl-[14]-4,11-diene-$N_4$ | [29419-92-9] | $C_{16}H_{32}N_4$ | |
| (2,2,2-cryptate) | [23978-09-8] | $C_{18}H_{36}N_2O_8$ | |

-continued

Further examples of stabilising agents

| Stabilising Agent | CAS Registry Number | Molecular Formula | Abbreviation |
|---|---|---|---|
| Polymers | | | |
| polyethyleneimines | | | PEI |
| | [9002-98-6] | $(C_2H_5N)_x$ | |
| | [25988-99-2] | $(C_2H_5N)_x$ | |
| | [32167-41-2] | $(C_2H_6N)_nC_8HF_{17}O_2S$ | |
| polymethacryloylacetone | [25120-51-8] | $(C_7H_{10}O_2)_x$ | |
| poly(p-vinylbeznyliminodiacetic acid | [30395-28-9] | $(C_{13}H_{15}NO_4)_x$ | |
| Phosphoric acids | | | |
| nitrilotrimethylenephosphonic acid | [6419-19-8] | $C_3H_{12}NO_9P_3$ | NTPO, ATMP |
| ethylenediaminetetra(methylenephosphoric acid) | [1429-50-1] | $C_6H_{20}N_2O_{12}P_4$ | EDTPO |
| hydroxyethylidenediphosphonic acid | [2809-21-4] | $C_2H_8O_7P_2$ | HEDP |

[b]Formula is $(HOOCCH_2)_2N(CH_2)_nN(CH_2COOH)_2$.
[c]Propylenedinitrilotetraacetic acid [1939-36-2], $C_{11}H_{18}N_2O_8$.
[d]Tetramethylenedinitrilotetraacetic acid [1798-13-6], $C_{12}H_{20}N_2O_8$.
[e]Pentamethylenedinitrilotetraacetic acid [1798-14-7], $C_{13}H_{22}N_2O_8$.
[f]Glycine [56-40-6], $C_2H_5NO_2$.
[g]Iminodiacetic acid [142-73-4], $C_4H_7NO_4$.
[h]Log K = Log $K_1K_2$.
[i]1,3-Propanediamine [109-76-2], $C_3H_{10}N_2$.
[k]N-2-Aminoethyl-1,2-ethanediamine[111-40-0], $C_4H_{13}N_3$.

Diethylenetriaminepentakis-(methylenephosphonic acid) disodium salt "Briquest 543-45AS", Nitrilotris(methylene-phosphonic acid) "Briquest 301-50A", Potassium Nitrilotris (methylenephosphonate)-N-oxide "Briquest 3010-25K", Sodium nitrilotris(methylenephosphonate) "Briquest 301-325", 1-hydroxyethane-1,1-diphosphonic acid "Briquest A-DPA-60A", Sodium acid pyrophosphate, Sodium tripolyphosphate, Sodium hexametaphosphate, polyphosphates, organophosphonates, phosphonates, hydroxamic acids $H_2O$ soluble, 8-hydroxyquinolone and 5-sulfo-8-hydroxyquinoline, catecholates (catechol), hydroxypyridinonate, benzoylphenylhydroxylamine-precipitates v .+, rhodotorulic acid, 2,3-dihydroxybenzoic acid, 2,3-dihydroxyterephthalate amides, pyridoxal isonicotinoyl hydrazone, ethylenebis-O-hydroxyphenylglycine, N,N'-bis(O-Hydroxybenzyl)ethylenediamine-N,N'-diacetic acid, 1-methoxyethyl-3-hydroxypyrid-4-one, 1-ethyl-3-hydroxypyrid-4-one, N-(2,3-Dimercaptopropyl) phthalamidic acid, catecholamic acid, quinamic acid, triethylenetetramine (TRIEN), glutathione, 1,4,7,10-tetraazacyclotetradecane, N-acetyl-L-cysteine, deferroxamine, 4,5-dihydroxy-1,3-benzene-disulfonic acid (TIRON), diethylenetriaminepentaacetic acid, deforoxamine mesylate, 2,3-dimercapto-1-propanol (BAL), BAL-glucoside, nitrilotriacetic acid, L-cysteine, hydroxyethylethylenediaminetriacetic acid, cyclohexanediaminetetraacetic acid, triethylenepentaminehexaacetic acid, N-Acetyl-D,L-cysteine, sodium-2,3-dimercaptopropane sulphonate, propanetrithiol, meso-2,3-dimercaptosuccinic acid, dimethyl meso-2,3-dimercaptosuccinate, di (isopropyl)meso-2,3-di mercaptosuccinate, N-substituted xylamines and glucamines, (N-arylhydroxamic acids), N-m-Chlorophenylpalmito hydroxamic acid, and N-Benzylbenzohydroxamic acid.

Other examples of stabilising agents

| No. | Hydroxamic acid |
|---|---|
| 1. | N-Phenylbenzo- |
| 2. | N-Phenyl-3-styrylacrylo- |
| 3. | N-Phenyl-p-methoxycinnamo- |
| 4. | N-m-Tolyl-p-methoxycinnamo- |
| 5. | N-p-Tolyl-p-methoxycinnamo- |
| 6. | N-p-Chlorophenyl-p-methoxy-cinnamo- |
| 7. | N-Phenyl-3,4-methylenedioxy-cinnamo- |
| 8. | N-m-Tolyl-3,4-methylene-dioxycinnamo- |
| 9. | N-p-Tolyl-3,4-methylenedioxycinnamo- |
| 10. | N-p-Chlorophenyl-3,4-methylenedioxycinnamo- |
| 11. | N-Phenylcinnamo- |
| 12. | N-o-Tolylcinnamo- |
| 13. | N-m-Tolylcinnamo- |
| 14. | N-p-Tolyl-cinnamo- |
| 15. | N-p-Chloro-phenylcinnamo- |
| 16. | N-Phenyl-2-furanacrylo- |
| 17. | N-m-Tolyl-2-furanacrylo- |
| 18. | N-p-Tolyl-2-furanacrylo- |
| 19. | N-p-Chlorophenyl-2-furanacrylo- |
| 20. | N-Phenylsorbo- |
| 21. | N-m-Tolylsorbo- |
| 22. | N-p-Tolylsorbo- |
| 23. | N-p-Chlorophenylsorbo- |
| 24. | N-Phenylcrotono- |
| 25. | N-p-Tolylcrotono- |
| 26. | N-p-Chlorophenylcrotono- |
| I | N-o-chlorophenyl-o-chloro Benzo |
| II | N-m-chlorophenyl-myristo- |
| III | N-m-chlorophenyl-palmito- |
| IV | N-m-chlorophenyl stearo- |
| V | N-o-chlorophenyl myristo- |
| VI | N-o-chlorophenyl palmito- |
| VII | N-o-chlorophenyl stearo |
| VIII | N-m-chlorophenyl-o-chloro Benzo- |

The stabilising agent may be a surfactant. The surfactant may be an anionic, cationic, amphoteric or nonionic surfactant. Mixtures of surfactants may be used but some surfactants are incompatible such as a mixture of anionic and cationic surfactants. Examples of anionic surfactants are water-soluble soaps or water-soluble synthetic surface active compounds. Examples of the soaps are unsubstituted or substituted ammonium salts of higher fatty acids ($C_{10}$–$C_{22}$), such as the sodium or potassium salts of oleic acid or stearic acid or of natural fatty acid mixtures such as Coconut oil or tallow oil, alkali metal salts, alkaline earth metal salts or fatty acid methyllaurin salts. Examples of synthetic surfactants are alkylarylsulphonates, sulphonated benzimidazole derivatives, fatty alcohol sulphates, or fatty alcohol sulphonates.

Examples of alkylarylsulphonates are the calcium, sodium or triethanolamine salts of dodecylbenzenesulphonic acid, dibutylnaphthalenesulphonic acid, of a condensate of naphthalenesulphonic acid and formaldehyde or the phosphate salt of the phosphoric acid ester of an adduct of p-nonylphenol with 4 to 14 moles of ethylene oxide. Examples of sulphonated benzimidazole derivatives are 2 sulphonic acid groups and one fatty acid radical containing approximately 8 to 22 carbon atoms. Examples of fatty alcohol sulphates or sulphonates are unsubstituted or substituted ammonium salts such as $C_8$–$C_{22}$ alkyl radical including the alkyl moiety of acyl radicals such as the calcium or sodium salt of lignosulphonic acid, of a mixture of fatty alcohol sulphates from naturally occurring fatty acids, of dodecylsulphate, alkali metal salts or alkaline earth metal salts or the salts of sulphated and sulphonated fatty alcohol/ethylene oxide adducts.

Examples of non-ionic surfactants are polyglycol ether derivatives of aliphatic or cycloaliphatic alcohols having approximately 3 to 30 glycol ether groups and approximately 8 to 20 carbon atoms in the (aliphatic) hydrocarbon moiety; saturated or unsaturated fatty acids and alkylphenols having approximately 6 to 18 carbon atoms in the alkyl moiety of the alkylphenols; water-soluble adducts of polyethylene oxide with ethylenediaminopolypropylene glycol, polypropylene glycol, or alkylpolypropylene glycol having approximately 1 to 10 carbon atoms in the alkyl chain, having approximately 20 to 250 ethylene glycol ether groups and approximately 10 to 100 propylene glycol ether groups in the usual ratio of 1 to ethylene glycol moiety:propylene glycol moiety; fatty acid esters of polyoxyethylene sorbitan such as polyoxyethylene sorbitan trioleate; octylphenoxypolyethoxyethanol; polyethylene glycol; tributylphenoxypolyethyleneethanol; polypropylene/polyethylene oxide adducts; castor oil polyglycol ethers; nonylphenolpolyethoxyethanols.

Examples of cationic surfactants are quaternary ammonium salts in the form of halides, methylsulphates or ethylsulphates which have as N-substituent at least one $C_8$–$C_{22}$ alkyl radical or unsubstituted or halogenated lower alkyl or benzyl or hydroxy-lower alkyl radicals, such as stearyltrimethylammonium chloride or benzyldi(2-chloroethyl)ethylammonium bromide.

Examples of amphoteric surfactants are the aminocarboxylic and aminosulphonic acids and salts thereof such as alkali metal 3-(dodecylamino)propioniate and alkali metal 3-(dodecylamino)propane-1-sulphonate or alkyl and alkylamido betaines such as cocamidopropyl betaine.

Examples of surfactants which may be used in the combination are surfactants from the Teric® series such as N4 Teric, Teric BL8, Teric 16A16, Teric PE61, Alkanate 3SL3, N9 Teric, G9 A6 Teric or from the Rhodafac® series such as Rhodafac RA 600. Further examples are Calgon® (sodium hexametaphosphate), Borax® (sodium decahydrate borate), soap, sodium lauryl sulphate, or sodium cholate. Further examples of surfactants are described in "Encyclopedia of Chemical Technology", Kirk Othmer, 3rd edition, Volume 8, John Wiley & Sons 1982, "Handbook of Surfactants", M. R. Porter, Blackie (Glasgow and London), Chapman and Hall (USA) 1991, "Encyclopedia of Surfactants", compiled by Michael and Irene Ash, Volumes I–III, Chemical Publishing Co. 1980–1981, "Encyclopedia of Surfactants", compiled by Michael and Irene Ashi, Volume IV, Chemical Publishing Co. 1985. "A Formulary of Detergents and Other Cleaning Agents", compiled by Michael and Irene Ash, Chemical Publishing Co. 1980, "Emulsifying Agents An Industrial Guide". Ernest W. Flick, Noyes Publications 1990, "What Every Chemical Technologist Wants To Know About . . . Volume IV Conditioners, Emollients and Lubricants", compiled by Michael and Irene Ash, Edward Arnold 1990, "McCutcheon's Detergents and Emulsifiers Annual", MC Publishing Corp., Glen Rock, N.J., USA, 1988 and "Tensid-Taschenbuch", H. Stache, 2nd edition, C. Hanser Verlag, Munich, Vienna, 1981, the contents of all of which are incorporated herein by cross reference. Typically more than one surfactant is used. Generally the amount of surfactant used in the combination is 0.5 to 99 wt %, preferably 20 to 90 wt %, more preferably 50 to 80 wt %, based on the total weight of the combination.

The oxidation and reduction and other products of the above compounds are included within the definition of stabilising agent. The reason for this is that many of the above compounds listed above may be converted to other products in the electrolyte solution. For example, organic compounds may be oxidised/reduced into other compounds or may combine with the vanadium ions/compounds to form new products or the products of the above compounds may combine with vanadium ions/compounds to form new products. It may be these other products which act as stabilising agents. Thus throughout the specification and claims "stabilising agent" is to be taken to include products arising after addition of any of the above compounds or any other stabilising agent to the electrolyte solution.

Generally the stabilising agent is a polyhydric alcohol, polyamine or polymercapto group containing chain or cyclic organic compound with 2 or more —OH, —$NH_2$ and/or SH groups or mixtures of these. Preferably these groups are in secondary or tertiary positions for improved stability to oxidation.

Generally, the stabilising agent is $K_2SO_4$, $Na_2SO_4$, urea, glycerine, a derivative of glycerine, oxalic acid or a salt of oxalic acid, such as ammonium oxalate, sodium oxalate, potassium oxalate, rubidium oxalate, caesium oxalate, magnesium oxalate, calcium oxalate or strontium oxalate, saccharide including L-and D-isomers and α and β forms, including acid-soluble, monosaccharides such as glucose, fructose, mannose, an aldose including aldomonose, aldodiose, aldotriose, aldotetrose, aldopentose, aldohexose, aldoheptose, aldooctose, aldononose, and aldodecose, a ketose including ketomonose, ketodiose, ketotriose, ketotetrose, ketopentose, ketohexose, ketoheptose, ketooctose, ketononose, and ketodecose, idose, galactose, allose, arabinose, gulose, fucose, glycose, glycosulose, erythrose, threose, ribose, xylose, lyxose, altrose, idose, talose, erythrulose, ribulose, mycarose, xylulose, psicose, sorbose, tagatose, glucuronic acid, glucaric acid, gluconic acid, glucuronic acid, glyceraldehyde, glucopyranose, glucofuranose, aldehydo-glucose, arabinofuranose, galacturonic acid, manuronic acid, glucosamine, galactosamine and neuraminic acid, disaccharides such as sucrose, maltose, cellobiose, lactose, and trehalose, acid-soluble, branched or unibranched or cyclic, homo-or hetero-oligosaccharides including di-, tri-, tetra-, penta-, hexa-, hepta-, octa-, nona- and deca- saccharides, cyclodextrin, cycloheptaamylose, cyclomaltoheptaose, and acid-soluble, branched or unbranched or cyclic, homo-or hetero-polysaccharides such as a small starch molecules, as well as homo or heteropolymers thereof, glycosides such as ethyl glucopyranoside. D-fructose, L-fructose, D-talose, L-talose, D-ribose, L-ribose, D-altrose, L-altrose, D-lyxose, L-lyxose, D-xlose, L-xylose, D-inositol, L-inositol, L-arabinose, L-sorbose, D-glucose, L-glucose, D-galactose, L-galactose, D-mannose, L-mannose, methyl β-D-xylopyranoside, methyl β-L-xylopyranoside, D-xylose, L-xylose, β-D-galactopyranoside, β-L-galactopyranoside, methyl α-D-mannopyranoside, methyl α-D-glucopyranoside, methyl α-L-glucopyranoside, 2-deoxy-D-ribose, methyl phenyl β-D-galactopyranoside, D-mannose, L-mannose, methyl β-D-arabinopyranoside, 2-deoxy-D-galactose, and 2-deoxy-D-glucose are specific examples of such saccharides. Stabilising agents may also be a polyhydric alcohol, such as —CH—CHOH—$CH_2$OH, —$CH_2$-$(CHOH)_2$—$CH_2$OH, —$CH_2$-$(CHOH)_3$—$CH_2$-OH, —$CH_2$-$(CHOH)_4$—$CH_2$OOH, or mannitol, sorbitol, glycidol, inositol, pentaerythritol, galacitol, adonitol, xylitol, alabitol, monosodium glutamate, ariflic acid, triethylenetetramine (TRIEN), D-penicillamine, D, L-penicillamine ascorbic acid, sodium citrate, potassium citrate, plus compound numbers 6, 7, 15, 16, 17, 19, 24, 35, 40, 43, 44, 50, 51, 52, 53, 54, 55, 56, 57, 58, 60, 62, 63, 66, 67, 68, 72, 73, 74, 75, 76, 77, 78, 79, 80, 81, 82, 83, 84, 85, 86, 87, 88, 89, or mixtures of 2 or more of above or the following compounds from CRC Handbook of Chemistry and Physics (1977–73 edition) (incorporated herein by cross reference) with nos. m120, p1881, r1, r27, r55, t25p, t255, m153, a778, a782, a790, a1391, a1394, c231, c737, d186, e82, e84, e147, e148, f39, f174, f175, f176, g5, g29, g30, g33, g34, g37, g38, g39, g41, g50, g52, g53, g54, g55, g56, g57, g214, g217, g218, 12, 13, 1166, 14, 15, and 16.

Particularly desirable are $K_2SO_4$, urea, adonitol, allitol, D-allose, L-allose, α-altrose, ammonium oxalate, D-arabinose (α and β forms), L-arabinose (α and β forms), D-arabitol, DL-arabitol, L-arabitol, D-arabonic acid, DL-arabonic acid, L-arabonic acid, 3 methyl D-fucose, d-epifucitol, 1-epifucitol, 1-epifucose, β-fructose (D-), fucose, α-fucose (L-), D-galactitol, galactonic acid, D-galactose, gluco-O-heptose, glucomethylose, gluconal, D-gluconic acid, sodium gluconate, potassium gluconate, ammonium gluconate, D-glucose, D-α-glucose, D-β-glucose, α-methyl-D-glucoside, gulose, glycerine, β-methyl-D-glucoside, D-glucuronic acid, iditol, L-idonic acid, idose (D-and L-), inositol (allo-. cis-, D-, epi-, L-, muco-, myo-, neo-, scyllo-), D-mannitol, DL-mannitol, L-mannitol, D,α-mannoheptose, D,β-mannoheptose, D,β-mannoheptose monohydrate, mannonic acid (D and L), D-mannose, DL-mannose, DL-mannose, L-mannose, D,α-mannuronic acid, β-mannuronic acid (and Na, K and ammonium salts), mucic acid (and Na, K and ammonium salts), D-ribose, saccharic acid, scyllitol, sorbitol (D-and L-), sorbose (D-, DL-and L-), tagatose, talitol, talonic acid (and Na, K and ammonium salts), talose, xylitol, xylose, lactose, fructose, γ-lactone (and Na, K and ammonium salts), idonic acid (and Na, K and ammonium salts), ammonium gluconate, or mixtures of 2 or more of the foregoing.

Typically the stabilising agent is at least one compound selected from the group consisting of (i) substituted ring carbon compounds (aryl and alkyl and alkenyl) containing 3 or more (typically 3–15, more typically 3–10) carbon atoms including at least two groups selected from the group consisting of —OH, =O, —COOH, —$NH_2$, and —SH, (ii) $C_2$–$C_{12}$ primary, secondary or tertiary carbon chain compounds selected from the group consisting of $C_2$–$C_{12}$ alkyl, $C_2$–$C_{12}$ alkenyl, and $C_2$–$C_{12}$ alkynyl, the carbon chain compound including at least two groups selected from the group consisting of —OH, =O, —COOH, —$NH_2$, and —SH, (iii) ring or chain polyphosphates containing at least 2 P atoms, optionally 2–12 P atoms, and including at least two groups selected from the group consisting of —OH and =O, (iv) polyphosphonates, (v) lactose, sorbitol, fructose, glucose, inositol, myo-inositol, glycerine, tartaric acid, asparagine, sodium tripolyphosphate, sodium hexametaphosphate, sodium acid pyrophosphate, nitrilotris (methylene-phosphonic acid), potassium nitrilotris (methylenephosphonate) N-oxide, and sodium nitrilo-tris (methylenephosphonate), (vi) sugars, (vii) carbohydrates, (viii) amino acids, (ix) ammonium compounds.

More typically for vanadium ions, the stabilising agent is $K_2SO_4$, $Na_2SO_4$, urea, ammonium oxalate, glycerine, sodium gluconate, galactose, galactitol, γ-lactone (and Na and K salt), idose, idonic acid (and Na and K salt), iditol, mannose, mannitol, mannonic acid (and Na and K salt), sorbitol, inositol, fructose, fucose, triethylenetetramine, or mixtures of 2 or more of these. A mixture of inorganic and organic stabilising agents may be used.

The stabilising agent in the anolyte may be the same as the stabilising agent in the catholyte. Alternatively, the stabilising agent in the anolyte may be different from the stabilising agent in the catholyte.

The stabilising agent may be used in an amount ranging from 0.0001% to 40% or 0.01% to 20% wt/vol wt/vol (in the case of solids, for example) or wt/wt (i.e. wt of stabilising agent:wt of solution or wt of stabilising agent:wt of redox ions being stabilised) or vol/vol (i.e. vol of stabilising agent:vol of solution) or vol/wt (i.e. vol of stabilising agent:wt of solution or vol of stabilising agent:wt of redox ions being stabilised) in the case of stabilising agents that are liquids, ) or mole/mole (i.e. mole of stabilising agent:mole of redox ions being stabilised) for example. Typically, the stabilising agent is used in an amount of from 0.05% to 20%, more typically 0.1% to 10%, even more typically 0.5% to 8%, and even more typically 0.5% to 7% wt/vol or wt/wt or vol/vol or vol/wt. A stabilising amount of stabilising agent is generally less than the amount required to completely chelate or complex all the redox ions or redox couple(s) present in solution. That is, typically the stabilising agent is present in an amount that is a molar fraction of the amount of stabilising that would be required to completely chelate or complex all the redox ions or redox couple(s) present in solution (e.g,. <20% mole/mole of stabilising agent:redox ions or redox couple(s)). Even more typically, the stabilising agent is used in an amount of from 0.25% to 5%. Yet more typically, the stabilising agent is used in an amount of from 0.5% to 3%. An effective stabilising amount of a stabilising agent can be added to the vanadium containing electrolyte solution prior to, during or after the preparation of a vanadium redox electrolyte solution. The desired amount of stabilising agent for a given redox ion will be readily ascertained by a person skilled in the art without undue experimentation. Thus the stabilising agent is typically used in one of the following ranges: 0.01% to 20% wt/vol, 0.01% to 20% wt/wt, 0.01% to 20% vol/vol, 0.01% to 20% vol/wt, 0.01% to 20% mole/mole, 0.05% to 20% wt/vol, 0.05% to 20% wt/wt, 0.05% to 20% vol/vol, 0.05% to 20% vol/wt, 0.05% to 20% mole/mole, 0.1% to 25 10% wt/vol, 0.1% to 10% wt/wt, 0.1% to 10% vol/vol, 0.1% to 10% vol/wt, 0.1% to 10% mole/mole, 0.5% to 8% wt/vol, 0.5% to 8% wt/wt, 0.5% to 8% vol/vol, 0.5% to 8% vol/wt, 0.5% to 8% mole/mole, 0.5% to 5% wt/vol, 0.5% to 5% wt/wt, 0.5% to 5% vol/vol, 0.5% to 5% vol/wt, 0.5% to 5% mole/mole, 0.75% to 3% wt/vol, 0.75% to 3% wt/wt, 0.75% to 3% vol/vol, 0.75% to 3% vol/wt, 0.75% to 3% mole/mole, 1% to 2% wt/vol, 1% to 2% wt/wt, 1% to 2% vol/vol, 1% to 2% vol/wt or 1% to 2% mole/mole.

The cells and batteries of the invention may be constructed according to generally known methods for construction of redox cells.

The electrochemical reactions of the redox cell can be conducted in any electrochemical cell which has an anode compartment and a cathode compartment through which the appropriate fluids can be transported. A particular redox cell in which the stabilising agents may be used to particular advantage is an all-vanadium battery described in U.S. Pat. No. 4,786,567, the contents of which are incorporated herein by cross reference (but unexpectedly and surprisingly with vanadium ion concentrations up to 10M).

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the separator can be a microporous separator or a ionically conducting membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark), Selemion (Trade Mark) or New Selemion (Trade Mark) material as manufactured by Asahi Glass Company. Other suitable membranes are as disclosed in International Application No. PCT/AU92/00491, the contents of which are incorporated herein by cross reference).

Although the design of the anode and cathode compartments of the redox cell are not critical to the practice of this invention, certain embodiments are preferred. For example, a parallel plate electrochemical cell in which anode and cathode compartments alternate in order to increase voltage and decrease current is a preferred embodiment. The configuration of the cell may be such that there are intermediate bipolar electrodes between end plate electrodes. The electrode material will depend on the nature and composition of the anolytes and catholytes in the redox cell and are typically chosen on efficiency and stability grounds, i.e. the higher the efficiency and the greater stability in the particular anolyte and catholyte used in the redox battery, then generally the more it is favoured. Typical positive and negative electrodes may be metal, carbon/graphite, with suitable metals including transition metals such as titanium, iron, nickel, copper, silver, platinum, gold, palladium, tin, tantalum, cobalt, cadmium, lead, ruthenium oxide, and alloys and mixtures thereof. Suitable carbon/graphite electrodes include those described in International Patent Application No. PCT/AU93/00456 incorporated herein by cross reference, glassy (amorphous) carbons, reticulated vitreous carbons, pyrolytic carbons, carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os, Re, Rh and/or Ag; platinised Ti; platinised Ru; platinised Ir; platinised Pd; Pt; Pt black; dimensionally stabilized anode (DSA-Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Tl; Bi; Pb; In; Cd; Ga; Sb; Zn; Pb/Hg; Pb/Bi; Hg/In; Hg/Cd; or Hg/Ga or other suitable electrodes. Generally, carbon/graphite electrodes such as glassy (amorphous) carbons, reticulated vitreous carbons, pyrolytic carbons, carbon and graphite felt, mat, plate, rod, knit, fibre, and cloth; are bonded onto a conducting substrate such as carbon impregnated teflon, carbon impregnated polyethylene, carbon impregnated polypropylene, carbon impregnated polystyrene, carbon impregnated polyvinylchloride and carbon impregnated polyvinylidenechloride, etc. Thus for the positive electrode typical stable materials include graphite/carbon based electrodes, Dimensionally Stable Anodes i.e. metal oxides such as $TiO_2$, $RuO_2$, $Ir_2O_3$, PtO, $MnO_2$ or mixtures of these coated onto a titanium substrate. Alternatively coatings of anion activated polypyrrole on conducting plastic where the conducting plastic can be graphite impregnated polyethylene/polypropylene or polyethylene/polypropylene impregnated with a mixture of 5–50% polypyrrole powder plus 5–20% graphite fibres or graphic felt/cloth/mat bonded onto a substrate of conducting plastic made of carbon black (10–50%), polyethylene or polypropylene (40–60%) and rubber (such as EPR) (10–40%). These conducting plastics can be used as substrates for coating polypyrrole electroactive films. For the negative reducing electrode typical cathode stable materials include raphite, carbon, graphite filled conducting plastics, Pb, Pt, Au, nickel, steel, etc or graphite felt/cloth/mat bonded onto a conducting plastic substrate made of carbon black, polyethylene or polypropylene and rubber.

The construction of the electrode will depend on the material type, with metal electrodes generally being in the form of plates, bars, and screens, or being sintered to form a highly porous structure. The positive and negative electrodes can be any shape desired. It is preferred that the positive and negative electrodes are rectangular-plate shaped. Metal electrodes may also be formed by depositing a film or layer of the metal on a nonconductive substrate, such as glass. The structure of carbon/graphite electrodes will depend upon the type of carbon. Glassy carbon electrodes are generally flat, polished surfaces while reticulated vitreous carbons are glass-like porous structures, typically pyrolyzed polyacrylonitriles. Pyrolytic carbons are produced by vapour phase deposition of carbon on a substrate, resulting in a polycrystalline structure with a high degree of atomic orientation. Preferred is the use of graphite, carbon/graphite or carbon felt electrodes which have been found to provide particularly effective catalytic sites after an oxidation pretreatment. The graphite, carbon/graphite or carbon felt electrodes are generally bonded onto a conducting carbon or graphite filled plastic electrode to form the final electrode configuration (see International Patent Application No. PCT/AU93/00456 incorporated herein by cross reference). Carbon felts are generally woven from yarns which are bundles of individual carbon monofilaments generally having a diameter in the range from about 1 to 50 μm, usually in the range from about 5 to 10 μm. The yarns will typically include from about 100 to 20,000 monofilaments, usually having from about 3,000 to 6,000 filaments. The denier of the yarns used as in fabricating the carbon felts will typically be in the range from about 500 to 5,000 mg/m, usually being in the range from about 1,000 to 2,000 mg/m. Denier is equal to the number of grams which yield 9,000 meters of the yarn or filament. The yarns are woven by conventional weaving machines yielding large fabrics which may be cut into the desired dimensions for the electrode. Each electrode may employ a plurality of layers of the fabric, so that the final dimensions of the electrode may vary widely. Generally, the electrodes will have a height in the range from about 0.5 cm to 2 meters, more typically, 5 to 1000 cm, a width in the range from about 0.1 cm to 2 meters, more typically, 5 to 1000 cm$^2$, and a thickness in the range from about 0.1 cm to 1.0 cm. The particular dimensions chosen will depend primarily on the power Output of the electrochemical cell. Carbon felts suitable for use in the present invention may be obtained commercially from suppliers such as FMI Fibre Materials, Inc., Biddleford, Me.; Hercules, Inc., Wilmington, Del.; Celanese Engineering, Chatham, N.J.; Ultra Carbon Corp., Bay City, Mich.; and Union Carbide Corp., Mitsubishi, Japan, Toray, Japan, Kurelia, Toyoba, Japan, Sigri, Germany, Specialty Polymers and Composites Division, Danbury, Conn.

The redox cell includes monopolar and bipolar type discharge cells charge cells or charge/discharge cells. A bipolar discharge cell typically includes a plurality of positive discharge compartments each having a positive discharge electrode therein and a plurality of negative discharge compartments each having a negative discharge electrode therein and wherein each of the compartments are separated by a membrane. A bipolar discharge cell is typically of the flat plate-or filter press-type.

For other methods of dissolving $V_2O_5$ and other vanadium salts are disclosed below. The methods described herein can be readily be modified to take advantage of the present invention by adding an effective stabilising amount of a stabilising agent to the vanadium containing electrolyte solution prior to, during or after the preparation of a vanadium redox electrolyte solution.

According to another embodiment of this invention there is provided a process for producing a stabilized vanadium electrolyte solution, above saturated concentration, by dissolving and reducing a reducible vanadium compound disposed in, but not wholly dissolved in, an aqueous electrolyte containing a stabilizing amount of a stabilizing agent by utilizing an electrochemical cell which aqueous electrolyte is in electrical contact with a positive electrode and a negative electrodes to dissolve and reduce at least a part of the compound in the electrolyte solution.

According to a further embodiment of this invention there is provided a process for producing a stabilized vanadium electrolyte solution, above saturated concentration, by dissolving and reducing a reducible vanadium compound disposed in, but not wholly dissolved in, an aqueous electrolyte containing a stabilizing amount of a stabilizing agent by utilizing an electrochemical cell having a positive compartment containing a catholyte in electrical contact with a positive electrode, a negative compartment containing an anolyte comprising an aqueous electrolyte in electrical contact with a negative electrode, and an ionically conducting separator disposed between the positive and negative compartments and in contact with the catholyte and( the anolyte to provide ionic communication therebetween which process comprises adding the vanadium compound to the aqueous electrolyte or wherein the vanadium compound is predisposed in the aqueous electrolyte, and providing electrical energy from an external circuit to the positive and negative electrodes to dissolve and and reduce at least a part of the compound in the aqueous electrolyte.

The aqueous electrolyte can include vanadium (II) and/or vanadium (III) ions predisposed therein. The vanadium compound is thus reduced and dissolved by the V(I)/V(III) ions in the presence of a stabilizing amount of a stabilizing agent on addition to the aqueous solution and resultant V(IV) ions can be reduced at the negative electrode to V(II)/V(III) ions. Generally above saturated concentrations, or 0.1 to 15M, or 0.05 to 10M typically 0.25M to 5M V(II)/V(III) ions are including in the aqueous electrolyte. By V(II)/V(III) is meant V(II) ions alone or V(III) alone or a mixture of V(II) and V(II) ions.

According to another embodiment of this invention there is provided a process for producing a stabilized vanadium electrolyte solution, above saturated concentration, by dissolving and reducing a reducible vanadium compound disposed in, but not wholly dissolved in, an aqueous electrolyte containing a stabilizing amount of a stabilizing agent which process comprises adding a chemical reductant to the electrolyte solution to dissolve and reduce the compound in the electrolyte solution.

According to a further embodiment of this invention there is provided a process for producing a stabilized vanadium electrolyte solution, above saturated concentration, by dissolving and reducing a reducible vanadium compound disposed in, but not wholly dissolved in, an aqueous electrolyte containing a stabilizing amount of a stabilizing agent by utilizing a chemical reductant and an electrochemical cell having the aqueous electrolyte in electrical contact with a positive electrode and a negative electrode which process comprises:

(a) adding a chemical reductant to the electrolyte solution to assist in dissolution and reduction of the compound in the electrolyte solution; and (b) providing electrical energy from an external circuit to the positive and negative electrodes to dissolve and reduce at least a part of the compound in the electrolyte solution.

According to another embodiment of this invention there is provided a process for producing a stabilized vanadium electrolyte solution, above saturated concentration, by dissolving and reducing a reducible vanadium compound disposed in, but not wholly dissolved in, an aqueous electrolyte containing a stabilizing amount of a stabilizing agent by utilizing a chemical reductant and an electrochemical cell having a positive compartment containing a catholyte in electrical contact with a positive electrode, a negative compartment containing an anolyte comprising the aqueous electrolyte in electrical contact with a negative electrode, and an ionically conducting separator disposed between the positive and negative compartments and in contact with the catholyte and the anolyte to provide ionic communication therebetween which process comprises:

(a) adding a chemical reductant to the anolyte to assist in dissolution and reduction of the compound in the anolyte; and (b) providing electrical energy from an external circuit to the positive and negative electrodes to dissolve and reduce at least a part of the compound in the electrolyte solution.

Alternative processes for the preparation of a stabilised vanadium electrolyte solution, optionally highly supersaturated with vanadium ions can be performed by adapting the processes described in AU85862/91, the contents of whiclih are incorporated by cross reference, by adding a stabilizing agent to the electrolyte solution during or prior to the preparation of the vanadium electrolyte solution.

The chemical reductant can be a V(II), V(III) or V(IV) compound, which is soluble in the electrolyte solution or an aqueous solution containing V(II), V(III) and/or V(IV) ions, particularly an aqueous solution of $VOSO_4$.dihydrate, hydrated $(V_2(SO_4)_3)$ and/or $VSO_4.7H_2O$, in an amount sufficient to dissolve and reduce the vanadium C compound. It is particularly preferred that a V(II) or V(III) compound, or the the aqueous solution contains V(II) and/or V(III) ions.

The chemical reductant may also be $KH(C_2O_4.H_2O$, $K_2C_2O_4$, $Na_2C_2O_4$, $(NH_4)_2C_2O_4NH_4HC_2O_4.H_2O$, $LiHC_2O_4.H_2O)$, $NaHC_2O_4.H_2O$, $Li_2C_2O_4$, $SO_2$, $H_2C_2O_4$, $H_2SO_3$, $NaHSO_3$, $Na_2SO_3$, $Na_2SO_3$, $Na_2S_2O_4$, $Na_2S_2O_5$, $Na_2S_2O_6$, $Li_2SO_3$, $Li_2SO_6$, $KHSO_3$, $K_2SO_3$, $K_2S_2O_3$, $K_2S_2O_4$, $K_2S_2O_5$, $K_2S_2O_6$, $NH_4HSO_3$, $(NH_4)_2SO_3$, $(NH_4)_2SO_4$, $(NH_4)_2SO_5$, $N_2H_4$, $H_2N_2H_2.H_2O$, $H_2N_2H_2.H_2SO_4$, $(NH_4)_2SO$, $NaBH_4$, $LiBH_4$, $KBH_4$, $Be(BH_4)_2$, $D_2$, $T_2$, $S$, $H_2O_2$, hydrazine, sulphurous acid, hydrazine dihydrochloride, hydrogen peroxide, $CaH_2$, $MgH_2$, $H_2$ or calcium and magnesium salts of sulphurous acid, alkali-hydrogen-phosphites (Li, K, Na), alkali hypophosphites (Li, K, Na), hydroxyl amines, pyrosulphurous acid and dithioneous acid. Other chemical reductants can be used. For example, in principle it should possible to use a reducing organic water-soluble compound such as a reducing organic water-soluble mercapto group-containing compound including SH—containing water-soluble lower alcohols (including SH—containing $C_1$–$C_{12}$ primary, secondary and tertiary alkyl alcohols), SH—containing $C_1$–$C_{12}$ primary, secondary and tertiary alkyl carboxylic acids, SH—containing $C_1$–$C_{12}$ primary, secondary and tertiary alkyl amines and salts thereof, SH—containing $C_1$–$C_{12}$ primary, secondary and tertiary alkyl amine acids and di- or tripeptides such as 2-mercaptoethylamine hydrochloride, 2-mercaptoethanol, 2-mercaptopropionylglycine, 2-mercaptopropionic acid, cystenylglycine, cysteine, carbamoyl cysteine, homocysteine, glutathione, cysteine hydrochloride ethyl ester and acetylcysteine. In principle it should also be possible to employ photocatalytic reduction and photoreduction at a semiconductor photocathode.

Reductants such as $(NH_4)_2C_2O_4NH_4HC_2O_4.H_2O$, $SO_2$, $S$, $H_2O_2$, $H_2C_2O_4$, $NH_4HSO_3$, $(NH_4)_2SO_3$, $(NH_4)_2SO_4$, $(NH_4)_2SO_5$, $N_2H_4$, $H_2N_2H_2.H_2O$, $H_2N_2H_2.H_2SO_4$, $(NH_4)_2SO_6$ and $H_2$ are particularly advantageous as reductants since at least some of the reaction product is gaseous permitting higher concentrations of vanadium ions to be prepared and reducing further treatment of electrolyte solution to remove unwanted products.

The vanadium compound can be ammonium metavanadate ($NH_4VO_3$); ammonium vanadium sulphate ($NH_4V(SO_4)_2$); barium pyrovanadate ($Ba_2V_2O_7$); bismuth vanadate ($Bi_2O_3$ $V_2O_5$); cesium vanadium sulphate ($VCs(SO_4)_2$ $12H_2O$); iron metavanadate ($Fe(VO_2)_3$); lead metavanadate ($Pb(VO_5)_2$); potassium metavanadate ($KVO_3$); potassium vanadium sulphate ($KVSO_4$), rubidium vanadium sulphate ($RbV(SO_4)_2$); sodium meta vanadate ($NaVO_3$); meta vanadic acid ($HVO_3$); sodium orthovanadate ($Na_3VO_4$); sodium pyrovanadate ($Na_4V_2O_7$); sodium hexavanadate ($Na_4V_6O_{17}$); thallium pyrovanadate ($Tl_4V_2O_7$); thallium metavanadate ($TlVO_3$); thallium pyrovanadate ($ThV_2O_7$ $6H_2O$); vanadium pentoxide ($V_2O_5$): vanadium sulphate ($V(SO_4)_2$); $V_2O_3$, $V_2O_4$, $VO_2$, $VO$ and calcium and magnesium vanadates including calcium metavanadate and magnesium metavanadate. Other vanadium salts and complexes can also be dissolved and reduced in an electrolyte solution by the processes of the invention. For example, in principle it should also be possible to produce highly supersaturated stabilized vanadium electrolyte solutions containing stabilizing agents by dissolving and reducing vanadium salts occurring in vanadium-bearing minerals such as patronite, bravoite, sulvanite, davidite, roscoelite, carnotite, vanadinite, descloizite, cuprodescloizite, vanadiferous phosphate rock and titaniferous magnetite using the processes of the invention as well as for recovering vanadium from spent catalysts and fly-ash.

Vanadium salts or complexes such as ammonium metavanadate ($NH_4VO_3$) and ammonium vanadium sulphate ($NH_4V(SO_4)_2$) $V_2O_5$, $V_2O_3$, $V_2O_4$, $VO_2$, are particularly advantageous since they permit higher concentrations of vanadium ions to be prepared and reduce further treatment of electrolyte solution to remove unwanted products.

The electrolyte typically comprises an aqueous solution which includes $H_2SO_4$, trifluoromethanesulphonic acid, $Na_2SO_4$, $K_2SO_4$, ammonium sulphate, $H_3PO_4$, $Na_3PO_4$, $K_3PO_4$, $HNO_3$. $KNO_3$, $NaNO_3$, $C_6$–$C_{14}$ arylsulphonic acid such as p-toluenesulphonic acid monohydrate, sulphamic acid, $C_1$–$C_6$ alkylsulphonic acid such as methylsulphonic acid and ethylsulphonic acid or acetic acid or mixtures thereof in a concentration of from 0.01M to 15M. 0.01M to 10M or 0.25M to 10M, more typically 1M to 10M, even more typically 2 to 9M, yet even more typically 3 to 8M, yet even more typically 4 to 7M, and yet even more typically 5 to 8M. It is especially preferred to use $H_2SO_4$ in a concentration of from 0.25M to 10M, more typically 1M to 10M, even more typically 2 to 9M, yet even more typically 3 to 8M, yet even more typically 4 to 7M, and yet even more typically 5 to 8M.

The processes of the invention are typically performed in the temperature range 1–99° C., or 5–60° C. more typically 15–40° C.

During the processes of the invention the electrolyte solution is typically stirred or agitated preferably with a mechanical stirrer or by fluidization of the solid reactants using electrolyte solution flow.

The processes of the invention are typically, but not necessarily, conducted under an inert atmosphere such as nitrogen, argon, helium or neon or mixtures thereof. The positive and negative electrodes can be any shape desired. It is preferred that the positive and negative electrodes are rectangular-plate shaped although the positive electrode can be an expanded metal sheet to allow for zero gap from the membrane while facilitating escape of $O_2$ gas.

The positive and negative electrodes can be carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; nonwoven carbon fibre material; cellulose; carbon and graphite felt, mat, plate, rod, knit, fibre, and cloth, carbon impregnated teflon, carbon impregnated polyethylene, carbon impregnated polypropylene, carbon impregnated polystyrene, carbon impregnated polyvinylchloride and carbon impregnated polyvinylidenechloride, impregnated with and/or coated with Au, Pt, Ir, Ru, Os, Re, Rh and/or Ag; platinised Ti; platinised Ru; platinised Ir; platinised Pd; Pt; Pt black; dimensionally stabilized anode (DSA-Ti or Ti alloy core, coated at least partially with titanium dioxide which coating is coated or doped in turn with a noble metal coating selected from the group consisting of Pt, Pd, Os, Rh, Ru, Ir and alloys thereof); Au; Pd; Ir; Ru; Os; Re; Rh; Hg; Ag; Tl; Bi; Pb; In; Cd; Ga; Sb; Zn; Pb/Hg; Pb/Bi; Hg/In; Hg/Cd; or Hg/Ga or other suitable electrodes.

In particular the positive electrode can be selected from the group consisting of DSA; Pb; Pb alloy (E.g. Pb—Bi alloy); platinised Ti; platinised Ru; platinised Ir; and $V_2Os$ coated on Pb, Ti, Zr, Hf, Ta, W or Nb which are also suitable materials for use as positive charge electrodes in an all-vanadium redox charge cell as has been disclosed in the PCT/AU88/00472, the contents of which are incorporated herein by cross reference. $V_2O_5$ coated electrodes would be unsuitable negative electrodes as they would dissolve. A DSA electrode performs well as a positive or negative electrode.

Preferably a DSA, Pb, $V_2O_5$ on Pb or graphite anode is used. It is preferred that a Pb or graphite cathode is used.

The electrochemical cell is typically a cell of the "membrane-type", that is it employs a membrane rather than a diaphragm to separate a positive compartment from a negative compartment. The membrane employed is typically sheet-like and can transport electrolyte ions whilst at the same time being hydraulically-impermeable in contrast to a diaphragm (typically asbestos) which allows restricted electrolyte transfer between compartments. Thus the ionically conducting separator can be a microporous separator or a membrane fabricated from a polymer based on perfluorocarboxylic acids or a proton exchange polymer such as sulphonated polystyrene, sulphonated polyethylene or a substantially fluorinated sulphonic acid polymer such as Nafion (Trade Mark) or membranes of Flemion (Trade Mark) or Selemion (Trade Mark) material as manufactured by Asahi Glass Company.

The electrochemical cell includes monopolar and bipolar type cells. A bipolar cell typically includes a plurality of positive compartments each having a positive electrode therein and a plurality of negative compartments each having a negative electrode therein and wherein each of the compartments are separated by a membrane. A bipolar cell is typically of the flat plate-or filter press-type.

By the processes of the invention stabilized electrolyte solution having vanadium ions in sufficient concentration in an aqueous electrolyte, above saturated concentrations, or 0.1 to 15M or 0.25M to 10M, typically 1M to 10M, and more typically 1.5M to 8M which are suitable for use in a practical all-vanadium battery can be prepared in a single step process. Typically a stabilized aqueous electrolyte having vanadium ions 0.01M to 10M or 0.25M to 10M, more typically 1M to 10M, even more typically 2 to 9M, yet even more typically 3 to 8M, yet even more typically 4 to 7M, and yet even more typically 5 to 8M or 5 to 6M or 5 to 7M or 4 to 5M or 3 to 4M or 2 to 3M or 2 to 3.5M or 3.5 to 5.5M or 4.5 to 5.5M or 3.5 to 4.5M or 2.5 to 3.5M or 2.75 to 3.75M or 3.75 to 4.75M or 4.75 to 5.75M or 5.75 to 6.75M or 7.5 to 7.5M or 6.5 to 7.5M or 5 to 5.5M or 5.5 to 6.5M or 5.001 to 10M or 5.001 to 5.5M, or 5.001 to 6M or 5.001 to 6.5M or 5.001 to 7M or 5.001 to 8M or 5.001 to 9M, for example, vanadium ions (including V(II), V(III), V(IV), and V(V) ions) may be prepared. It is especially preferred to use $H_2SO_4$ in a concentration of from 0.25M to 10M, more typically 1M to 10M, even more typically 2 to 9M, yet even more typically 3 to 8M, yet even more typically 4 to 7M, and yet even more typically 5 to 8M. By passage of the appropriate number of coulombs an electrolyte solution consisting of 50% M V(III) to 50% M V(IV) can be obtained. Equal volumes of this solution can then be used for each half-cell so that no overcharge of the positive side is required for the initial charging process.

If precipitation of the V(V) does eventually occur however, it can easily be redissolved and reduced by combining the V(II)/V(III) catholyte with the anolyte containing suspension and/or adding an additional stabilising amount of stabilising agent. This will result in a solution which is mixture of V(III) and V(IV) as in an uncharged battery which can readily be recharged and return battery to its original state. Occasional mixing of the catholyte and anolyte is beneficial as it assists in rebalancing the cell. Unequal rates of diffusion of the different ions of vanadium across a membrane gradually leads to a greater concentration of vanadium ions on one side, but by periodically mixing the catholyte and anolyte and equally dividing the volumes into the +ve and −ve tanks, a rebalanced cell can be readily achieved. Alternatively any precipitate formed in the battery can be redissolved by reversing the polarity of the cell or stack (or battery) and slowly recharging the electrolyte solutions.

According to another embodiment of this invention there is provided an all-vanadium redox charge cell having:

a negative charge compartment having a negative charge electrode for charging a charge anolyte in electrical contact with said negative charge electrode, the charge anolyte comprising an electrolyte solution containing trivalent and/or tetravalent vanadium ions above saturated concentrations and optionally a stabilizing amount of a stabilizing agent;

a positive charge compartment having a positive charge electrode for charging a charge catholyte in electrical contact with said positive charge electrode, the charge catholyte comprising an electrolyte solution containing a stabilizing amount of a stabilizing agent and tetravalent vanadium ions above saturated concentrations; and an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode.

The positive and negative charge electrodes can be any shape desired. It is preferred that the positive and negative charge electrodes are rectangular-plate shaped.

The positive and negative charge electrodes are chosen from electrode materials which are stable in the charge catholyte and charge anolyte respectively in the potential ranges in which the respective charge reactions occur.

The negative charge electrode has a higher hydrogen overvoltage than copper to minimise $H_2$ evolution during the charging reaction at the positive charge electrode. Low $H_2$ evolution during charging means low volume water loss from the cell electrolyte solution, low risk of $H_2$ explosion and high coulombic charging efficiency at the negative charge electrode. The negative charge electrode can be selected from the group consisting of Tl; Bi; Pb; Hg; In; Cd; Ag; Ga; Sb; Zn; Pb/Hg; Pb/Bi; Hg/In; Hg/Cd; Hg/Ga; Hg/Ag; carbon and graphite felt, mat, plate, rod, knit, fibre, and cloth; carbon impregnated teflon; carbon impregnated polyethylene; carbon impregnated polypropylene; carbon impregnated polystyrene; carbon impregnated polyvinylchloride; carbon impregnated polyvinylidenechloride; glassy carbon; non-woven carbon fibre material; and cellulose (most of the metallic materials could not be used to discharge the negative half-cell because they will corrode or passivate at the discharge potentials). In an all-vanadium redox charge cell in which the charge anolyte comprises above saturated concentrations, or 0.01M–15M trivalent/tetravalent vanadium ions in 00.01M–18M, or 0.1M–10M $H_2SO_4$ and the charge catholyte comprises above saturated concentrations, or 0.00M–15M pentavalent-tetravalent vanadium redox system in 0.01M–18M $H_2SO_4$, the open circuit potential of the negative charge cell is about –0.4V vs SHE. It is preferable to select the negative charge electrode from electrode materials which are stable to corrosion at the open circuit potential. Whilst some of the preceding negative charge electrode materials will dissolve/complex/corrode at open circuit (e.g. Cd and In) they can still be utilized but in such instances there is a need to continuously apply a suitable negative potential to such materials as they are bought into contact with the anolyte, so that the potential of the materials is more negative than –0.4V vs SHE, thus preventing the materials from corroding.

The inventor has found surprisingly that many materials are unsuitable for use as a positive charge electrode and they have also found unpredictably that a number of materials which are suitable for use as the positive charge electrode can be selected from the group consisting of DSA, platinised Ti; platinised Ru; platinised Ir; and $V_2O_5$ coated on Pb, Ti, Zr, Hf, Ta, W or Nb. The $V_2O_5$ coated electrodes would be unsuitable for the positive half-cell in a discharging battery as it would dissolve at the discharge potential range. A DSA electrode would perform well for both charging and discharging but it is an expensive electrode material and the lifetime of DSA electrodes is limited as has been found by cycling experiments.

The charge cell of the invention includes monopolar and bipolar type charge cells. A bipolar charge cell typically includes a plurality of positive charge compartments each having a positive charge electrode therein and a plurality of negative charge compartments each having a negative charge electrode therein and wherein each of the compartments are separated by a membrane. A bipolar charge cell is typically of the flat plate or containing filter press-type.

The charge cell can include a charge anolyte reservoir for storing charge anolyte operatively coupled to the negative charge compartment by charge anolyte supply and return lines via a pump and a charge catholyte reservoir for storing charge catholyte operatively coupled to the positive charge compartment by charge catholyte supply and return lines via a pump.

In an alternative arrangement the charge cell can include a charge anolyte charge reservoir having charge anolyte charge supply and return line or lines for charging further charge anolyte which is to be delivered to the negative charge compartment and a charge catholyte charge reservoir having charge catholyte charge supply and return line or lines for charging further charge catholyte which is to be delivered to the positive charge compartment an charge anolyte storage reservoir having charge anolyte storage supply and return line or lines for storing charge anolyte from the negative charge compartment and a charge catholyte storage reservoir having charge catholyte storage supply and return line or lines for storing charge catholyte from the positive charge compartment and pumping means operatively coupled to the charge anolyte storage line or lines and/or the charge anolyte charge line or lines and to the charge catholyte storage line or lines and/or the charge catholyte charge line or lines for pumping:

(i) the charge catholyte through the charge catholyte storage line or lines, the positive charge compartment and the charge catholyte charge line or lines; and (ii) the charge anolyte solution through the charge anolyte solution storage line or lines, the negative charge compartment and the charge anolyte solution charge line or lines.

According to a further embodiment of this invention there is provided a process for charging a charge anolyte and a charge catholyte of an all-vanadium redox charge cell having:

a negative charge compartment containing a charge anolyte and having a negative charge electrode for charging said charge anolyte in electrical contact with said negative charge electrode, the charge anolyte comprising an electrolyte solution containing a stabilizing amount of a stabilizing agent and trivalent and/or tetravalent vanadium ions above saturated concentrations;

a positive charge compartment containing a charge catholyte and having a positive charge electrode for charging said charge catholyte in electrical contact with said positive charge electrode, the charge catholyte comprising an electrolyte solution containing a stabilizing amount of a stabilizing agent and tetravalent vanadium ions above saturated concentrations; and an ionically conducting charge separator disposed between the positive and negative charge compartments to provide ionic communication between the charge catholyte and the charge anolyte; and wherein the positive charge electrode is stable in the charge catholyte in the charge potential range during oxidisation of tetravalent vanadium ions to pentavalent vanadium ions at the positive charge electrode and the negative charge electrode is stable in the charge anolyte in the charge potential range during reduction of tetravalent and trivalent vanadium ions to divalent vanadium ions at the negative charge electrode;

which process comprises providing electrical energy to the positive and negative charge electrodes to derive stabilised divalent vanadium ions in the charge anolyte above saturated concentrations, and stabilised pentavalent vanadium ions in the charge catholyte above saturated concentrations.

A further embodiment of the invention involves an electrochemical apparatus for power delivery employing an array of cells comprising a positive electrode at one end of the array, a negative electrode at the other end of the array, and one or more bipolar electrodes between the end electrodes. A solution of hydrogen peroxide or a bubbly dispersion of air/oxygen in an electrolyte solution is pumped through the positive half cells of the array while a stabilized solution of V(II) or V(II)/V(III) is pumped through the negative half-cells to produce energy (and thus electricity) according to the reactions:

Positive electrode: $H_2O_2 + 2H^+ + 2e \rightarrow 2H_2O$ or $$\frac{1}{2}O_2 + 2H^+ + 2e \rightarrow H_2O$$

Negative electrode: $\frac{1}{2}V^{2+} \rightarrow 2V^{3+} + 2e$

DESCRIPTION OF DRAWINGS

Preferred embodiments of the invention are described below with reference to the following drawings in which:

FIG. 27 depicts effect of sulphuric acid concentration on V(II) sulphate solubility;

FIG. 28 depicts effect of sulphuric acid concentration on V(III) sulphate solubility; and FIG. 29 depicts effect of sulphuric acid concentration on vanadyl sulphate solubility.

BEST MODE AND OTHER MODES OF CARRYING OUT THE INVENTION

Figure 1:
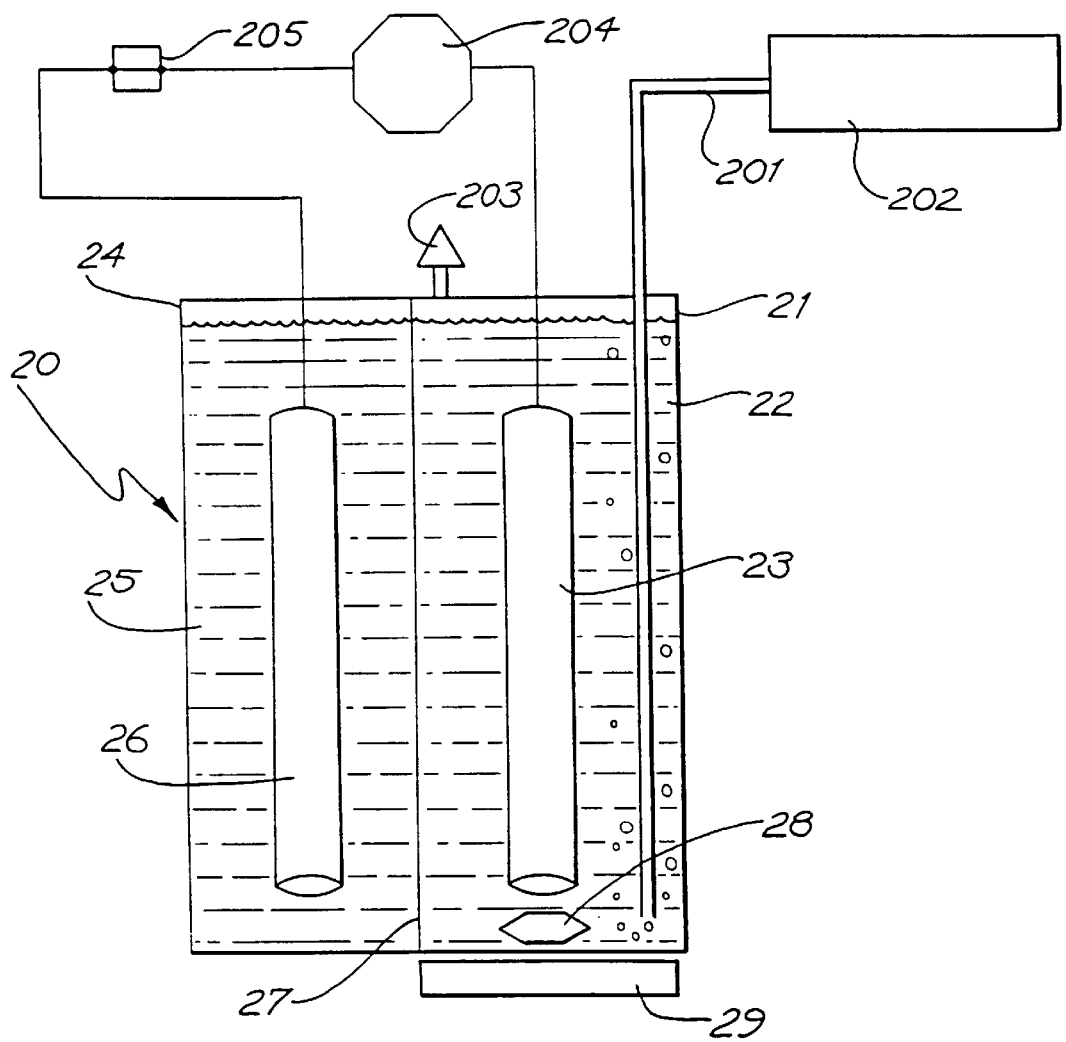
FIG. 1 depicts schematically an electrochemical cell having an ionically conducting separator for dissolving and reducing a reducible vanadium-containing salt or complex.

Referring to FIG. 1 an electrochemical cell 20 for dissolving and reducing a reducible vanadium-containing salt or complex has a positive compartment 24 containing a catholyte in electrical contact with positive electrode 26. Cell 20 has a negative compartment 21 containing an anolyte 22 in electrical contact with positive electrode 23. Positive electrode 26 is electrically coupled to a negative electrode 23 via electrical power source 204 and switch 205 which are connected in series. Power source 204 can be a dc battery capable of delivering of at least about 2.3 volts over and above resistant losses of cell 20. Ionically conducting separator 27 is disposed between positive and negative compartments 24 and 21 and is in contact with catholyte and anolyte 22 to provide ionic communication therebetween. A preferred separator 27 is a Selemion or New Selmion or Flemion or Nafion membrane. Catholyte 25 is typically 1M to 12M $H_2SO_4$. Anolyte 22 is typically 1M to 12M $H_2SO_4$ and contains a reducible vanadium-containing salt or complex such as $V_2O_5$ in powder form and optionally a stabilising amount of stabilising agent.

To dissolve and reduce the powdered $V_2O_5$, anolyte 22 is stirred by teflon coated magnetic stirrer bar 28 which is driven by magnetic stirrer/hot plate 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. The temperature of the solution may be at room temperature but is typically maintained in an elevated temperature range above room temperature from 25 to 70° C., typically 35–50° C., during the dissolution process (typically by using hot plate 29). Switch 205 is closed so as to deliver 2.5 volts between negative and positive electrodes 23 and 26. The following reactions take place at negative electrode 23 or in positive compartment 21 as a consequence of reaction of ions formed by reactions which take place at negative electrode 23:

(a) $V(V)+3e^- \rightarrow V(II)$
(b) $V(V)+2e^- \rightarrow V(II)$
(c) $V(V)+e^- \rightarrow <V(IV)$
(d)
   (i) $V(II)+V(IV) \rightarrow 2V((II)$
   (ii) $V(II)+1,2V_2O_5 \rightarrow V(III)/V(IV)$
   (iii) $V(III)+1,2V_2O_5 \rightarrow 2V(IV)$
   (iv) $V(IV)+1,2V_2O_5 \rightarrow V(V)$ (in solution)+V(IV)

From the above reactions the V(II), V(II) and V(IV) ions dissolved in anolyte 22 reduce the $V_2O_5$ powder and overall are reduced to the extent of forming dissolved V(III) and V(IV) ions. Powdered $V_2O_5$ which comes in direct contact with negative electrode 23 is directly reduced.

Figure 2:
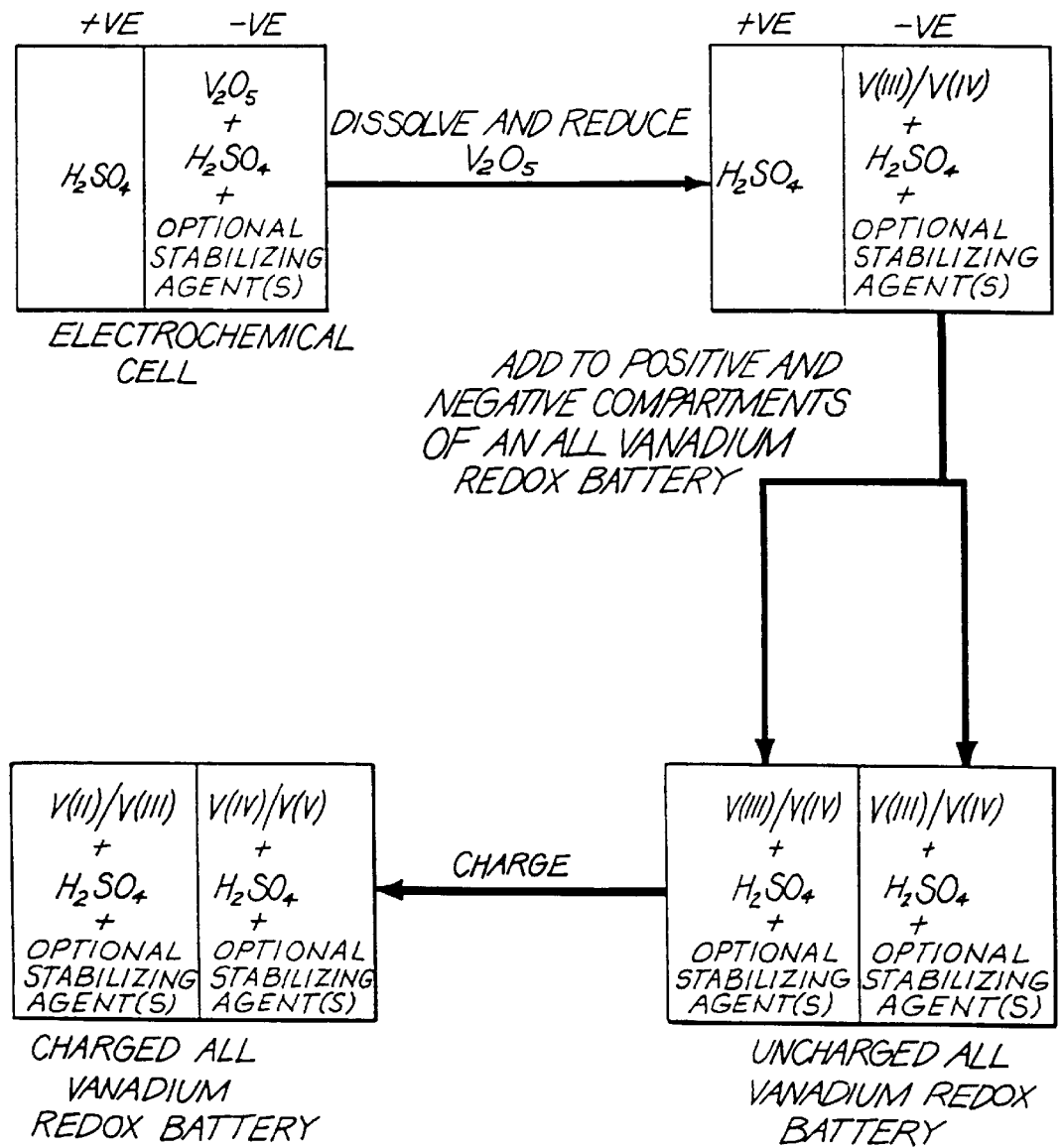
FIG. 2 depicts schematically a batch process for dissolving and reducing a reducible vanadium-containing salt or complex.
Figure 3:
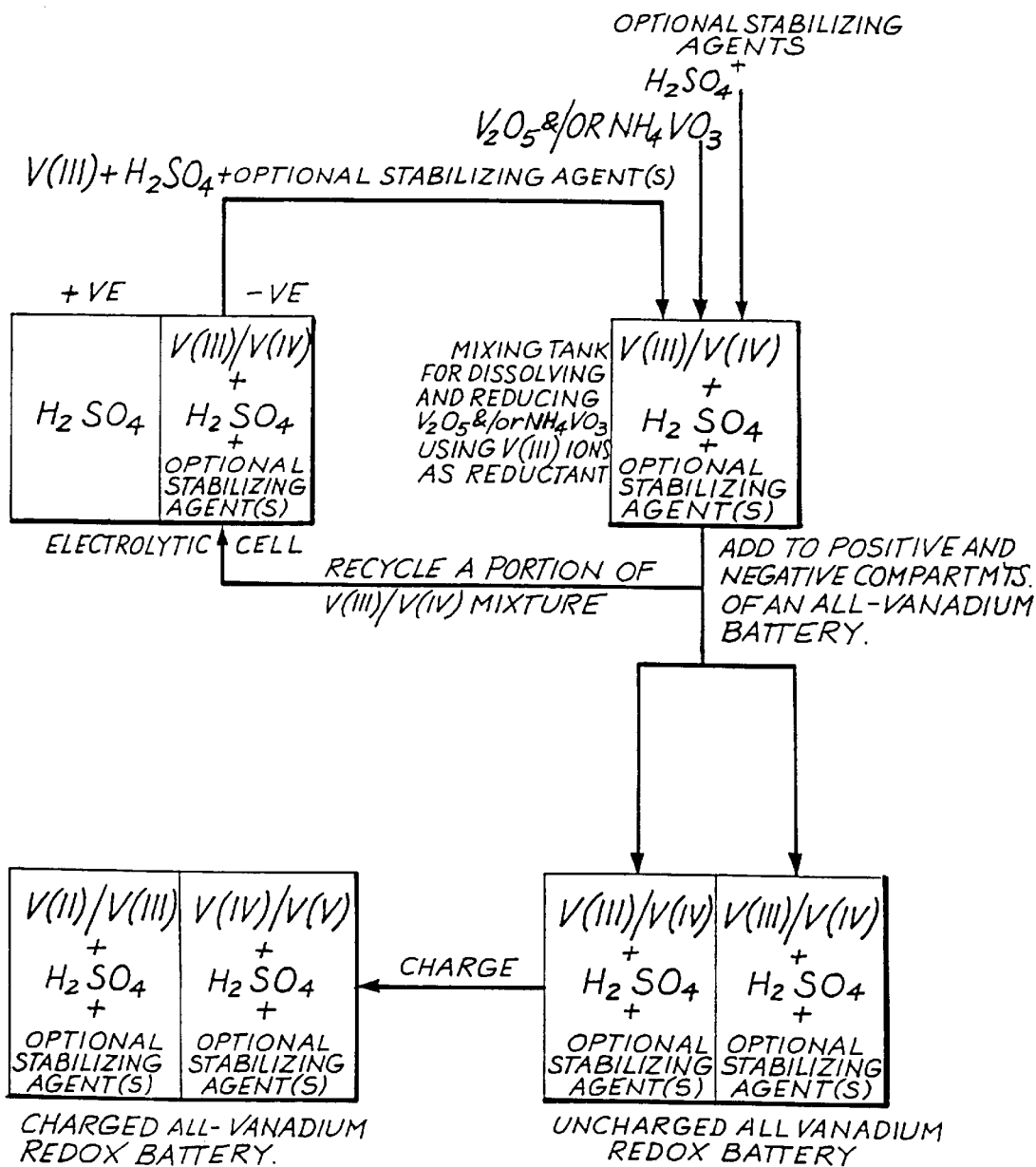
FIG. 3 depicts schematically a continuous process for dissolving and reducing a reducible vanadium-containing salt or complex.

Enough powdered $V_2O_5$ is used to form a HED solution. Initially a viscous HED solution is formed (which may be a colloidal particle/solution mixture) of vanadium ions (typically >1.8M vanadium ions, typically 3.01M–10M, more typically 5.01M–6.5M). The viscous HED solution is then typically maintained, with or without stirring, at room temperature for about 3 weeks to a month or more, or at 25–95° C. for 0.1 day–30 days, typically 0.5 day–20 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions. An example of a batch process for preparing a HED all-vanadium electrolyte solution for a charged all vanadium redox battery containing using the process of the invention is depicted in FIG. 2. An example of a continuous process for preparing a HED all-vanadium electrolyte solution for a charged all vanadium redox battery using the process of the invention is depicted in FIG. 3.

Figure 4:
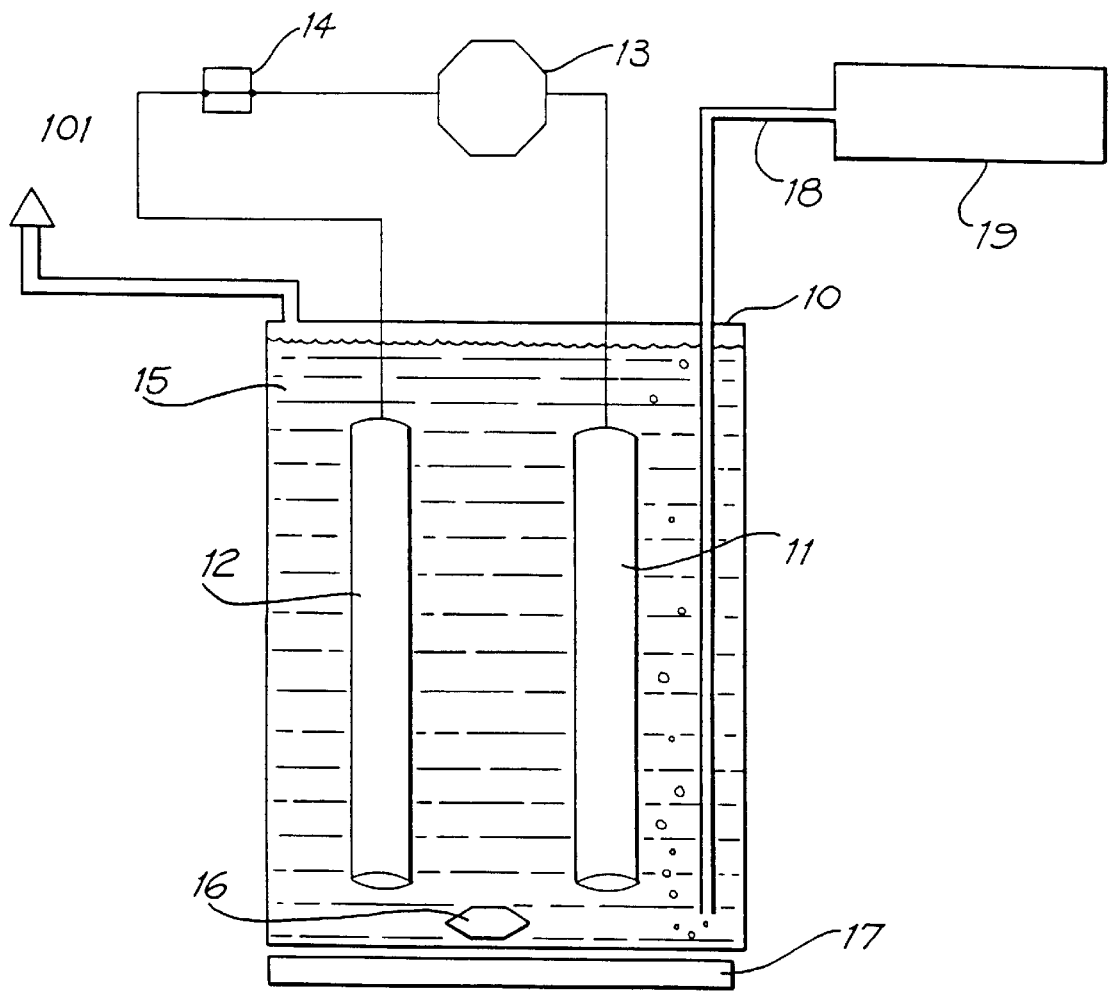
FIG. 4 depicts schematically an electrochemical cell which does not have an ionically conducting separator for dissolving and reducing a reducible vanadium compound, the electrolyte solution produced comprising typically a mixture of V(IV) and V(V) ions in the electrolyte solution.

Referring to FIG. 4 an electrochemical cell 10 for dissolving and reducing a reducible vanadium compound has a negative electrode 11 and a positive electrode 12 which are electrically coupled via electrical power source 13 and switch 14 which are connected in series. Power source 13 can be a dc battery capable of delivering at least about 0.5 to about 2.0 volts over and above resistance losses of cell 10. Cell 10 contains an aqueous electrolyte which is in electrical contact with positive and negative electrodes 12 and 11. Electrolyte solution is preferably 0.5M to 12M $H_2SO_4$ and contains 3.01M to 10M, more typically 4–8M vanadium from a reducible vanadium compound such as $V_2O_5$ or ammonium metavanadate in powder form and optionally a stabilising amount of stabilising agent.

To dissolve and reduce the powdered $V_2O_5$ electrolyte solution 15 is stirred by teflon coated stirrer bar 16 which is driven by magnetic stirrer/hot plate 17 disposed below cell 10. Nitrogen is bubbled through electrolyte solution 15 via line 18 which delivers nitrogen from nitrogen gas cylinder 19 to which it is coupled. Nitrogen is vented from cell 10 via vent 101. The temperature of the solution may be at room temperature but is typically maintained in an elevated temperature range above room temperature from 25 to 70° C., typically 35–50° C., during the dissolution process (typically by using hot plate 17). Switch 14 is closed so as to deliver 0.5 to 2.0 volts between negative and positive electrodes 11 and 12. Initially a viscous HED solution is formed (which may be a colloidal particle/solution mixture) of vanadium ions (typically >3M vanadium ions, typically 3.01M–10M, more typically 5.01M–6.5M). The viscous HED solution is then typically maintained, with or without stirring, at room temperature for about 3 weeks to a month or more, or at 25–80° C. for 0.1 day–25 days, typically 1 day–15 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions.

Figure 5:
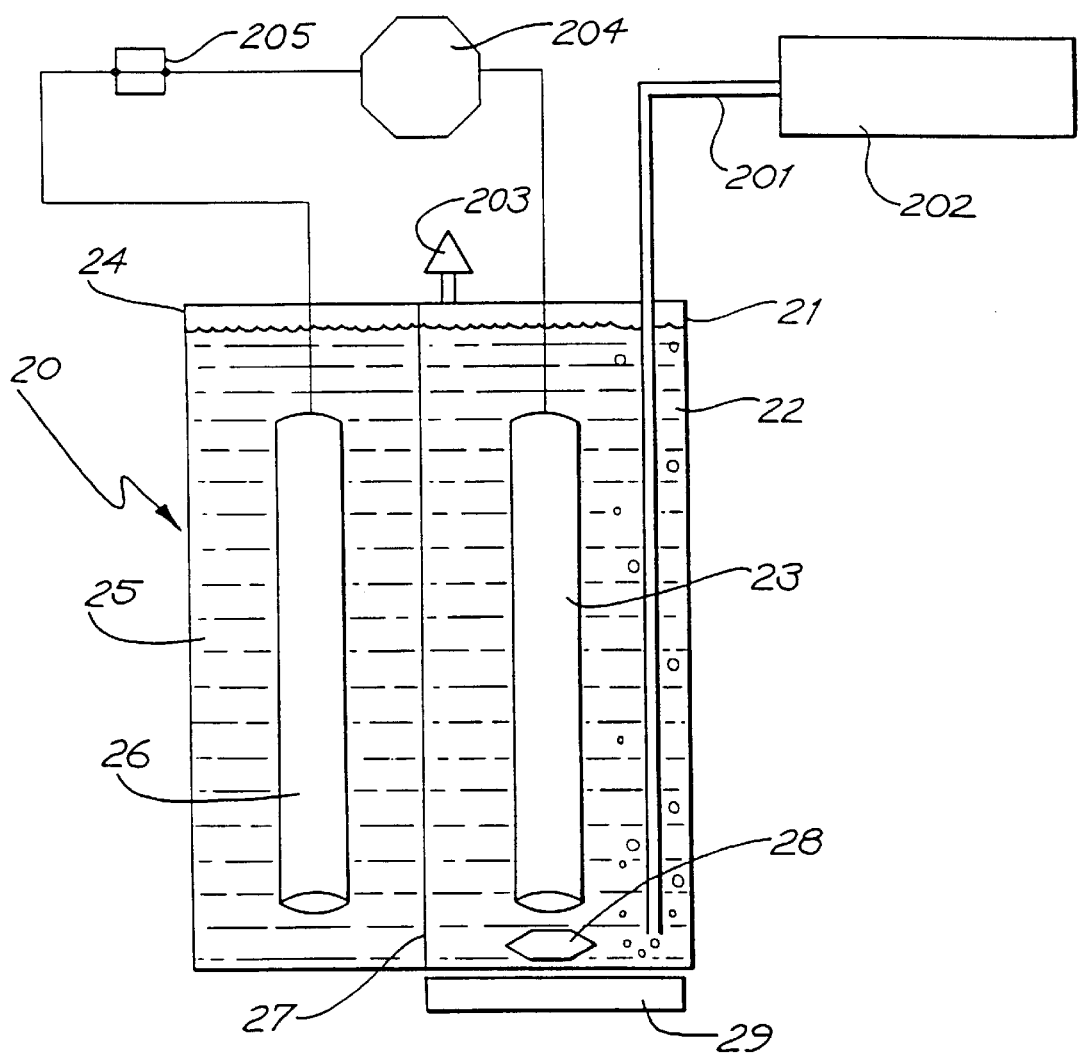
FIG. 5 depicts schematically an electrochemical cell having an ionically conducting separator for dissolving and reducing a reducible vanadium C compound.

Referring to FIG. 5 an electrochemical cell 20 for dissolving and reducing a reducible vanadium compound has a positive compartment 24 containing a catholyte 25 in electrical contact with positive electrode 26. Cell has a negative compartment 21 containing an anolyte 22 in electrical contact with positive electrode 23. Positive electrode 26 is electrically coupled to a negative electrode 23 via electrical power source 204 and switch 205 which are connected in series. Power source 204 can be a dc battery capable of delivering at least about 2.3 volts over and above resistance losses of cell 20. Ionically conducting separator 27 is disposed between positive and negative compartments 24 and 21 and is in contact with catholyte 25 and anolyte 22 to provide ionic communication therebetween. A preferred separator 27 is a Nafion membrane or new Selmion membrane. Anolyte 22 is preferably 2M to 12M $H_2SO_4$ and a reducible vanadium compound such as $V_2O_5$ in powder form and optionally a stabilising amount of a suitable stabilising agent.

To dissolve and reduce the powdered $V_2O_5$, anolyte 22 is stirred by teflon coated magnetic stirrer bar 28 which is driven by magnetic stirrer/hot plate 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. Switch 205 is closed so as to deliver 2.5 volts between negative and positive electrodes 23 and 26. The temperature of the solution may be at room temperature but is typically maintained in an elevated temperature range above room temperature from 25 to 70° C., typically 35–50° C., during the dissolution process (typically by using hot plate 29).

The V(II), V(III) and V(IV) ions produced by reduction of the $V_2O_5$ powder and dissolved in anolyte 22 reduce the $V_2O_5$ powder and form dissolved and reduced V(II), V(III) and V(IV) ions. Powdered $V_2O_5$ which comes in direct contact with negative electrode 23 is directly reduced and at positive electrode 26, water is decomposed producing $O_2$. Enough $V_2O_5$ powder is at least dissolved to the extent of forming a viscous HED solution (which may be a colloidal particle/solution mixture) of vanadium ions (>1.8M vanadium ions typically >3M vanadium ions, typically 3.01M–10M, more typically 5.01M–6.5M). The viscous HED solution is then typically maintained, with or without stirring, at 35–65° C. for 0.5 day–25 clays, typically 1 day–15 days, until its viscosity substantially decreases. The V(II), V(III) and V(IV) ions in the HED solution, before or after reducing the viscosity of the HED solution, may be reduced to form a solution of V(II)/V(II) ions or oxidised to form a solution of V(IV)/V(V) ions. A stabilising amount of a stabilising agent may be optionally added. An effective amount of immobilizing agent may be added to the reduced and/or oxidised solution to immobilize the solution(s) if required.

Figure 6:
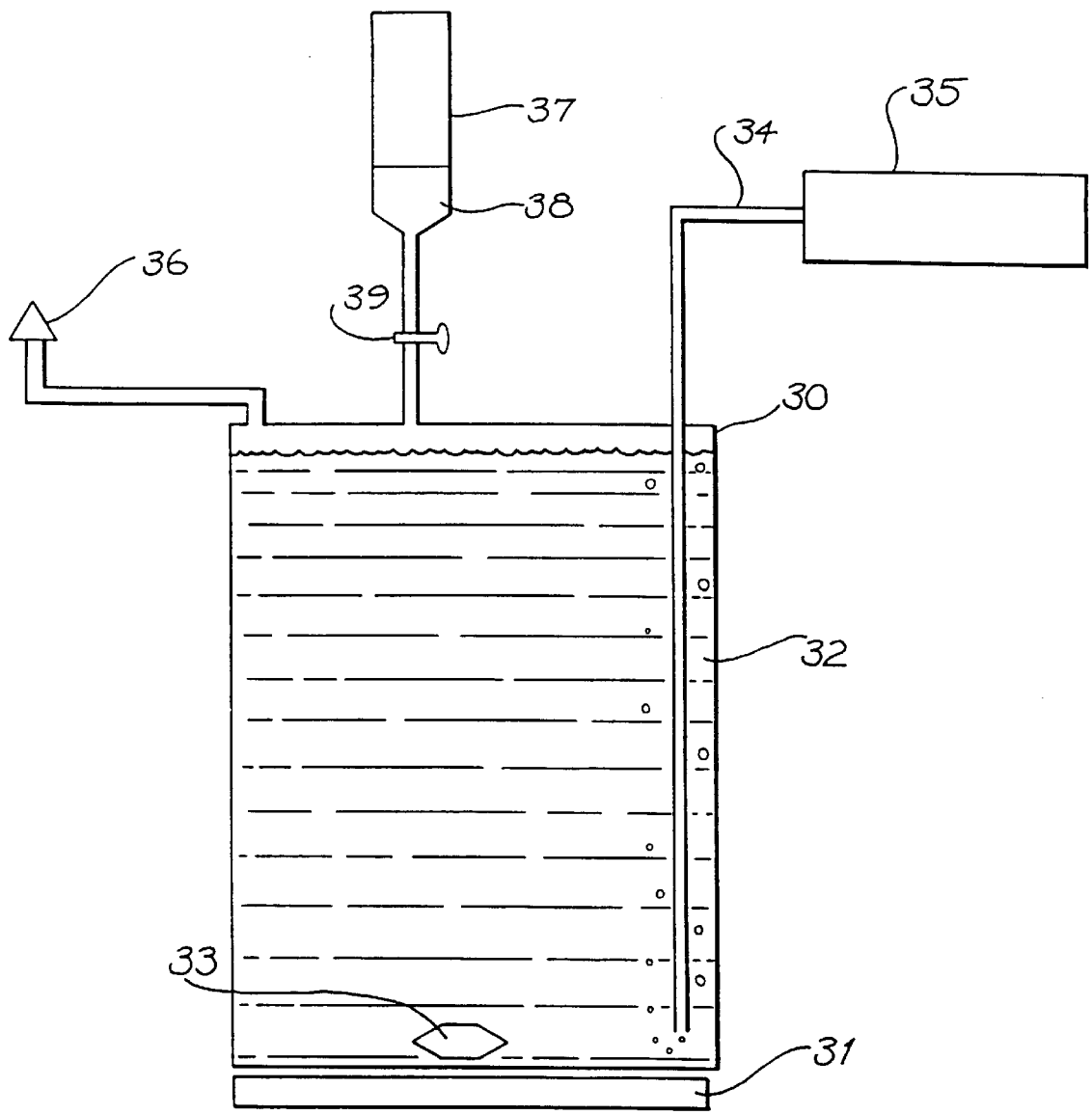
FIG. 6 depicts schematically an apparatus for dissolving and reducing a reducible vanadium compound.

Referring to FIG. 6 a container 30 for dissolving and reducing ammonium metavanadate or vanadium pentoxide or other reducible vanadium salts or complexes is disposed on top of magnetic stirrer 31. For exemplification a process of dissolving and reducing ammonium vanadate is described. Container 30 contains an aqueous electrolyte solution 32 comprising 0.5M to 12M $H_2SO_4$ and ammonium vanadate in powder form and optionally a stabilising amount of a stabilising agent.

To dissolve 1.801M to 10M, typically 3.01M to 10M of the powdered ammonium vanadate electrolyte solution 32 is stirred by teflon coated stirrer bar 33 which is driven by magnetic stirrer/hot plate 31. Nitrogen is bubbled through electrolyte solution 32 via line 34 which delivers nitrogen from nitrogen gas cylinder 35 to which it is coupled. Nitrogen is vented from container 30 via vent 36. The temperature of the solution may be at room temperature but is typically maintained in an elevated temperature range above room temperature from 25 to 70° C., typically 35–50° C., during the dissolution process (typically by using hot plate 31). A chemical reductant preferably $SO_2$, $H_2O_2$, or oxalic acid (0.05M to 10M) is added to electrolyte solution 32 from reservoir 37 by opening tap 39. Sufficient reductant is added to dissolve and reduce the ammonium vanadate powder in electrolyte solution 32, optionally in the presence of a stabilising amount of a suitable stabilising agent, to initially form a viscous HED solution (which may be a colloidal particle/solution mixture) of vanadium ions (>1.8M vanadium ions, typically 1.801–10M, more typically 2.01–10M, even more typically 3.01M–10M, more typically 4.01M–6.5M, more typically 5.01M–6.5M). The viscous HED solution is then typically maintained, with or without stirring, at 25–75° C. for 0.1 day–25 days, typically 1 day–15 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions.

Figure 7:
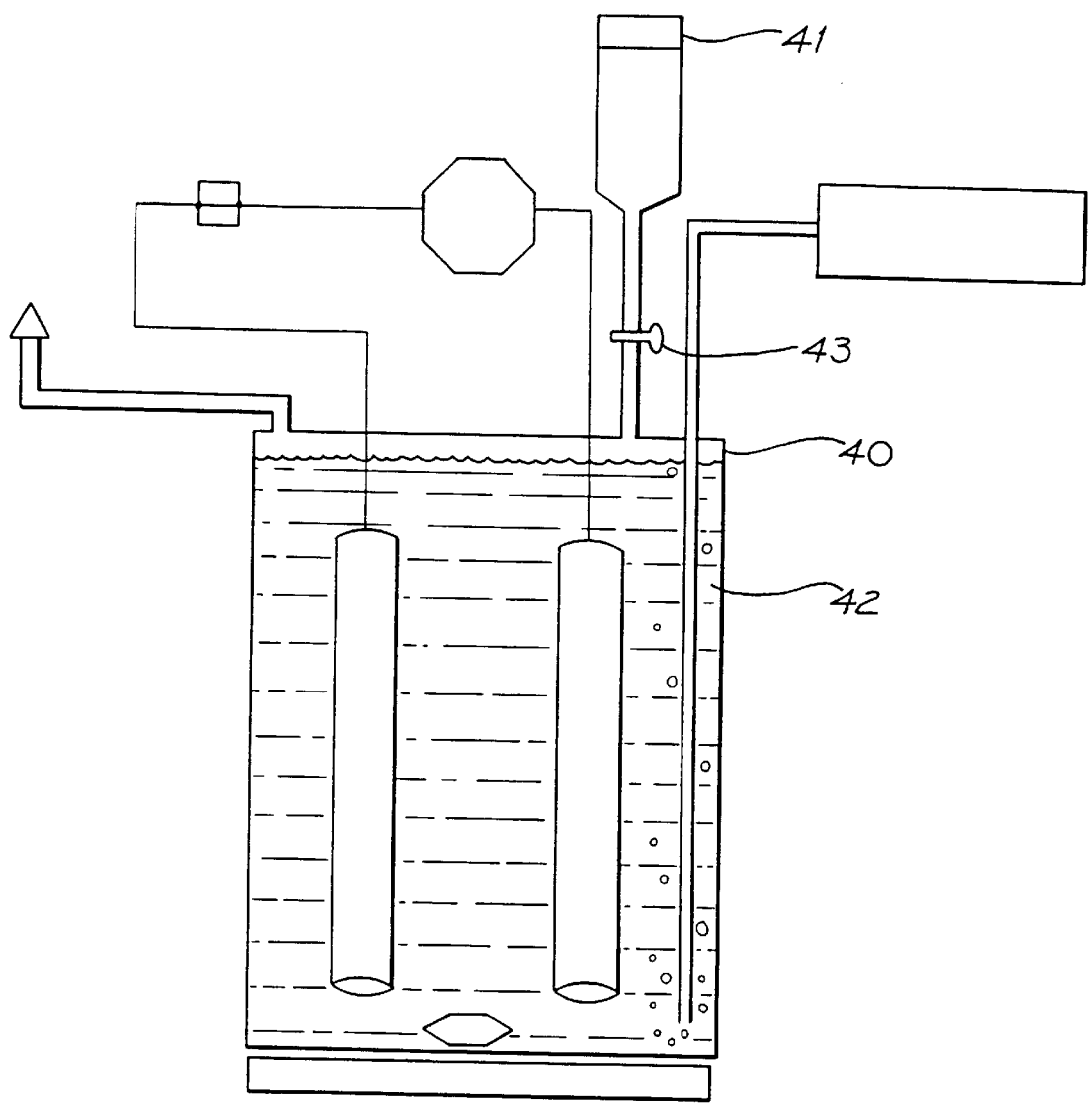
FIG. 7 depicts schematically an electrochemical cell which does not have an ionically conducting separator for dissolving and reducing a reducible vanadium compound, the electrolyte solution produced comprising typically a mixture of V(IV) and V(V) ions in the electrolyte solution.

Referring to FIG. 7 an electrochemical cell 40 for dissolving and reducing a reducible vanadium compound is the same as electrochemical cell 10 shown in FIG. 4 except it includes a reservoir 41 which contains a chemical reductant preferably $SO_2$ or oxalic acid (0.05M to 10M, more typically 0.1 to 1M). The temperature of the solution may be at room temperature but is typically maintained in an elevated temperature range above room temperature from 25 to 70° C., typically 35–50° C., during the dissolution process (typically by using a hot plate). Electrochemical cell 40 can be used to dissolve and reduce a reducible vanadium compound such as 3.01M to 10M (or more) $V_2O_5$ in the same way as electrochemical cell 10 in FIG. 4 is used except the chemical reductant is added to electrolyte solution 42 from reservoir 41 by opening tap 43. Sufficient reductant is added to assist in dissolving and reducing the $V_2O_5$ powder which is in electrolyte solution 42 prior to further reduction. A stabilising amount of a suitable stabilising agent may be optionally added.

The following reactions take place at negative electrode II or as a consequence of reactions of ions formed by reactions which take place at negative electrode 11:
  (a) $V^{5+}+3e^-\rightarrow V^{2+}$
  (b) $V^{5+}+2e^-\rightarrow V^{3+}$
  (c) $V^{5+}+e^-\rightarrow V^{4+}$
  (d)
    (i) $V^{2+}+V^{4+}\rightarrow 2V^{3+}$
    (ii) $V^{2+}+\frac{1}{2}V_2O_5\rightarrow V^{3+}/V^{4+}$
    (iii) $V^{3+}+\frac{1}{2}V_2O_5\rightarrow 2V^{4+}$
    (iv) $V^{4+}+\frac{1}{2}V_2O_5\rightarrow V^{5+}$ (in solution)$+V^{4+}$ From the above reactions the V(II), V(III) and V(IV) ions dissolved in electrolyte solution 15 reduce the $V_2O_5$ powder and form dissolved and reduced V(II), V(III), V(IV) and V(V) ions. Powdered $V_2O_5$ which comes into contact with negative electrode 11 is also reduced. At positive electrode 12 the following reactions take place:
  (a) $V^{2+}\rightarrow V^{3+}$, $V^{4+}$ or $V^{5+}$ (in solution)+1,2 or $3e^-$
  (b) $V^{3+}\rightarrow V^{4+}$ or $V^{5+}$ (in solution)+1 or $2e^-$
  (c) $V^{4+}\rightarrow V^{5+}$ (in solution)+$1e^-$
  (d) $H_2O\rightarrow O_2$ From the immediately preceding reactions whilst V(II), V(III) and V(IV) ions are oxidised to higher oxidation states at positive electrode 12 the higher oxidation state vanadium ions thus formed remain in solution. Initially a viscous HED solution is formed (which may be a colloidal particle/ solution mixture) of vanadium ions (>1.8M vanadium ions, typically >2M vanadium ions, even more typically >3M vanadium ions, typically 3.01M–10M, more typically 5.01M–6.5M). The Viscous HED solution is then typically maintained, with or without stirring, at room temperature for about 3 weeks to a month or more, or at 25–80° C. for 0.1 day–25 days, typically 1 day–15 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions.

Figure 8:
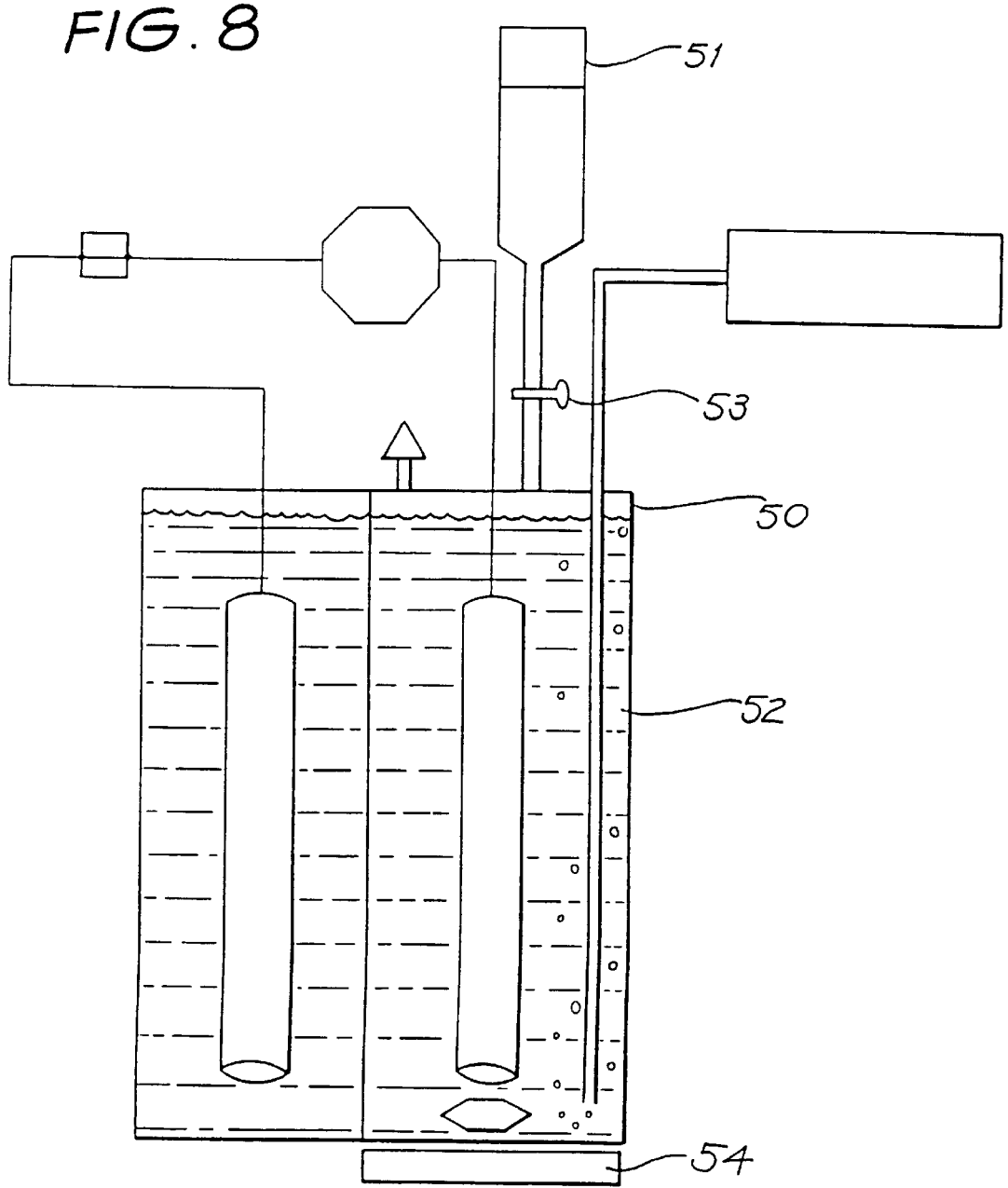
FIG. 8 depicts schematically an electrochemical cell having an ionically conducting separator for dissolving and reducing a reducible vanadium compound.

Referring to FIG. 8 an electrochemical cell 50 for dissolving and reducing a reducible vanadium compound is the same as electrolyte solution chemical cell 20 in FIG. 5 except it has a reservoir 51 which contains a chemical reductant preferably oxalic acid (0.05M to 5M). Electrochemical cell 50 can be used to dissolve and reduce 3–10M, for example, of a reducible vanadium compound such as $V_2O_5$ in the same way as electrochemical cell in FIG. 5 is used except the chemical reductant is added to electrolyte solution 52 from reservoir 51 by opening tap 53. Sufficient reductant is added to assist in dissolving and reducing the $V_2O_5$ powder which is in electrolyte solution 52. A stabilising amount of a suitable stabilising agent is optionally added. The temperature of the solution may be at room temperature but is typically maintained( in an elevated temperature range above room temperature from 25 to 70° C., typically 35–50° C., during the dissolution process (typically by using magnetic stirrer/hot plate 54). Initially a viscous HED solution is formed (which may be a colloidal particle/solution mixture) of vanadium ions (>1.8M vanadium ions, typically >2M vanadium ions, even more typically >3M vanadium ions, typically 3.01M–10M, more typically 5.01M–6.5M). The viscous HED solution is then typically maintained, with or without stirring, at room temperature for about 3 weeks to a month or more, or at 25–80° C. for 0.1 day–25 days, typically 1 day–15 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions.

Figure 9:
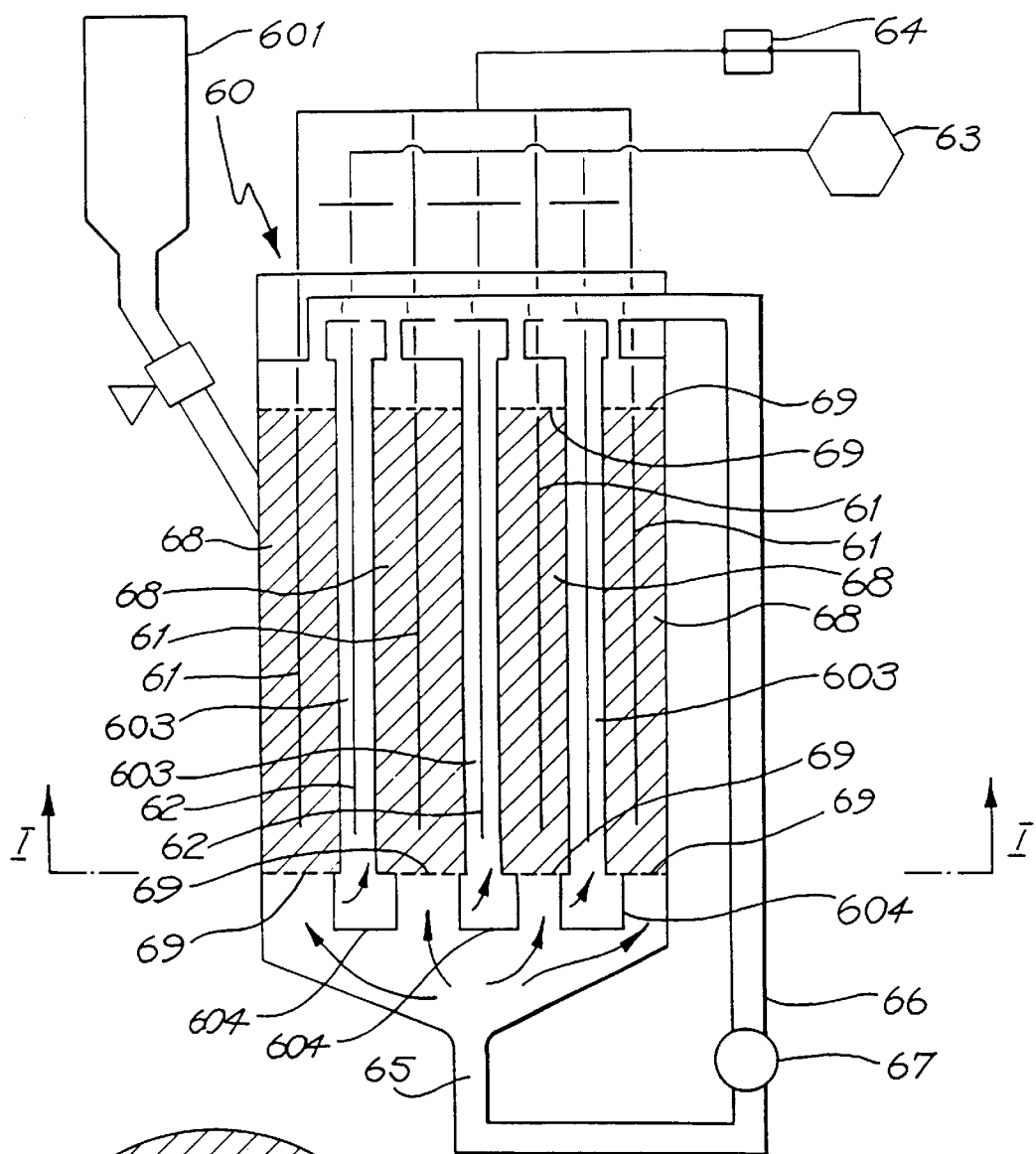
FIG. 9(a) depicts schematically an alternative electrochemical cell for dissolving and reducing a reducible vanadium compound.
FIG. 9(b) is a bottom cross-sectional view along the line I—I in FIG. 9(a)
Figure 9:
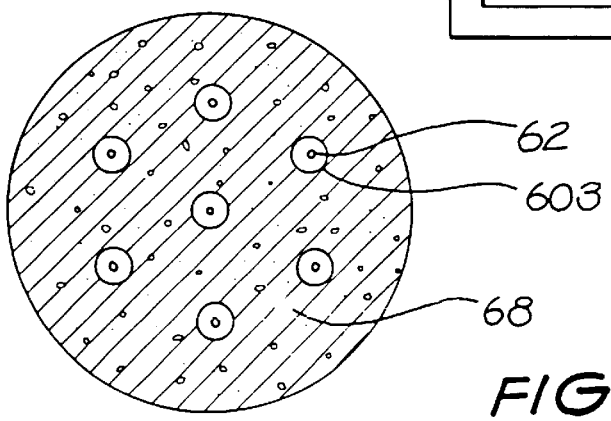

FIG. 9(a) depicts an alternative electrochemical cell 60 for producing a highly supersaturated vanadium solution by dissolving and( reducing a reducible vanadium compound optionally in the presence of a stabilising amount of a suitable stabilising agent. Cell 60 has negative electrodes 61 and positive electrodes 62 which are electrically coupled via electrical power source 63 and switch 64 which are connected in series. Power source 63 can be a dc battery capable of delivering of at least 2.5 volts over and above resistance losses of cell 60. An aqueous electrolyte solution 65 is recirculated through cell 60 via recalculation line 66 which includes pump 67. Electrolyte solution 65 is preferably 1M to 12M $H_2SO_4$ and contains 3M to 10M, more typically 3.01 to 8.5M of a reducible vanadium compound such as $V_2O_5$ or ammonium metavanadate in powder form in negative compartments 68 which contain the powdered compound by filter elements 69 located at either end of each negative compartment. Elements 69 can be glass frits or synthetic filter cloth. The compound containing electrolyte solution 64 can be added to negative compartments 68 from reservoir 601 by opening tap 602. Positive compartments 603 are separated from negative compartments 68 by ionically conducting separators or microporous separators 604 which are disposed in cell 60 at the bottom of positive compartment 603.

In use electrolyte solution 65 is recirculated through cell 60 and about 2.3 volts (excluding resistance losses) is applied between negative electrodes 61 and positive electrodes 62 respectively. Typically, the current density at negative the cathode is from about 5 to about 50 $mA.cm^2$, while at the anode, the current density is from about 10 to about 300 $mA.cm^2$. The temperature of the solution may be at room temperature but is typically maintained in an elevated temperature range above room temperature from 25 to 70° C., typically 35–50° C., during the dissolution process (typically by using a hot plate). Flow of electrolyte solution 65 through negative compartments 68 agitates the compound therein and maintains the powder in a fluidized state and over a period of time the powdered compound dissolves and is reduced into electrolyte solution 65. The dissolution and reduction of the compound in electrolyte solution 65 can be assisted by adding a chemical reductant such as oxalic acid or $H_2O_2$ or bubbling a gaseous chemical reductant such as $SO_2$ through electrolyte solution 65. Initially a viscous HED solution is formed (which may be a colloidal particle/solution mixture) of vanadium ions ((>1.8M vanadium ions, typically >2M vanadium ions, even more typically >3M vanadium ions, typically 3.01M–10M, more typically 5.01M–6.5M). The viscous HED solution is then typically maintained, with or without stirring, at room temperature for about 3 weeks to a month or more, or at 25–80° C. for 0.1 day–25 days, typically 1 day–15 days, until its viscosity substantially decreases. The V(II), V(III) and V(IV) ions in the HED solution, before or after reducing the viscosity of the HED solution, may be reduced to form a solution of V(II)/V(III) ions or oxidised to form a solution of V(IV)/V(V) ions.

Figure 10A:
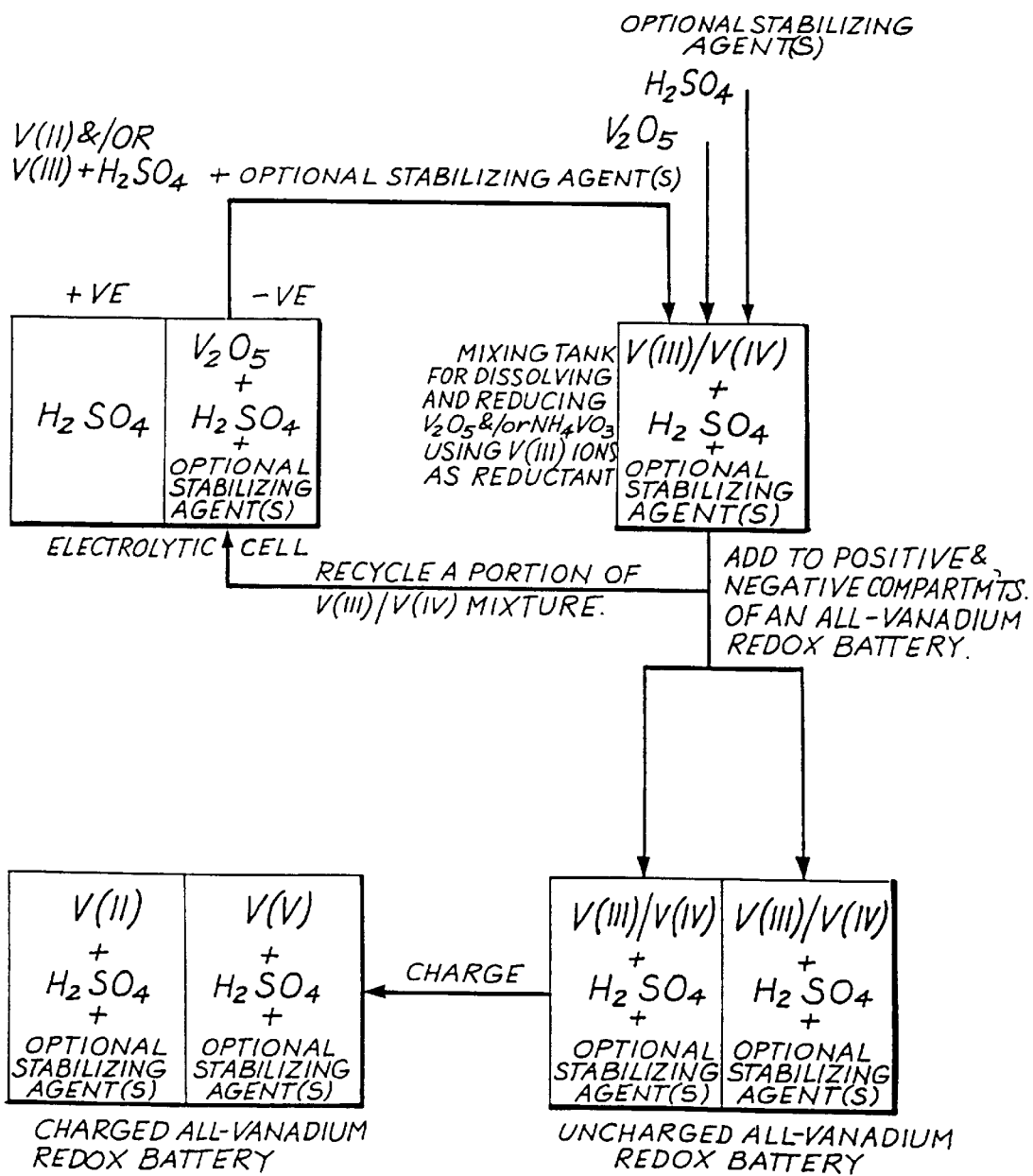
FIG. 10(a) depicts schematically an alternative process using an electrochemical cell having an ionically conducting separator for generating V(II) or V(III) ions by reducing a mixture of V(IV) and V(III) and $V_2O_5$, and a mixing tank for dissolving $V_2O_5$ or other vanadium salt using the V(II) and or V(III) ions as reducing agent.
Figure 10B:
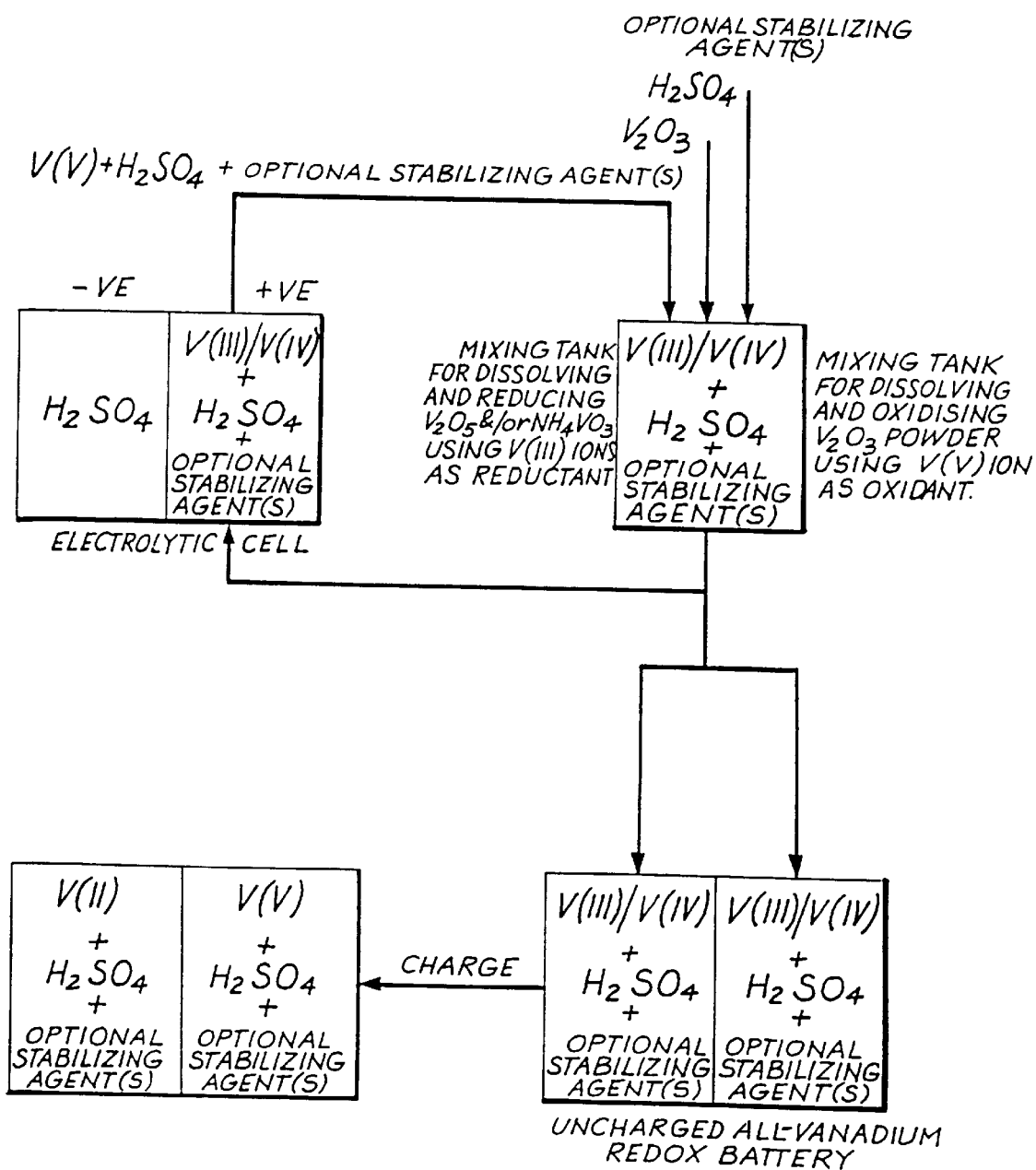
FIG. 10(b) depicts schematically an alternative process using an electrochemical cell having an ionically conducting separator for generating V(II) or V(II) ions by oxidising a mixture of V(III)/V(IV) and a mixing tank for dissolving $V_2O_3$ or other vanadium V(II) or V(III) salt using the V(V) as oxidising agent.
Figure 11:
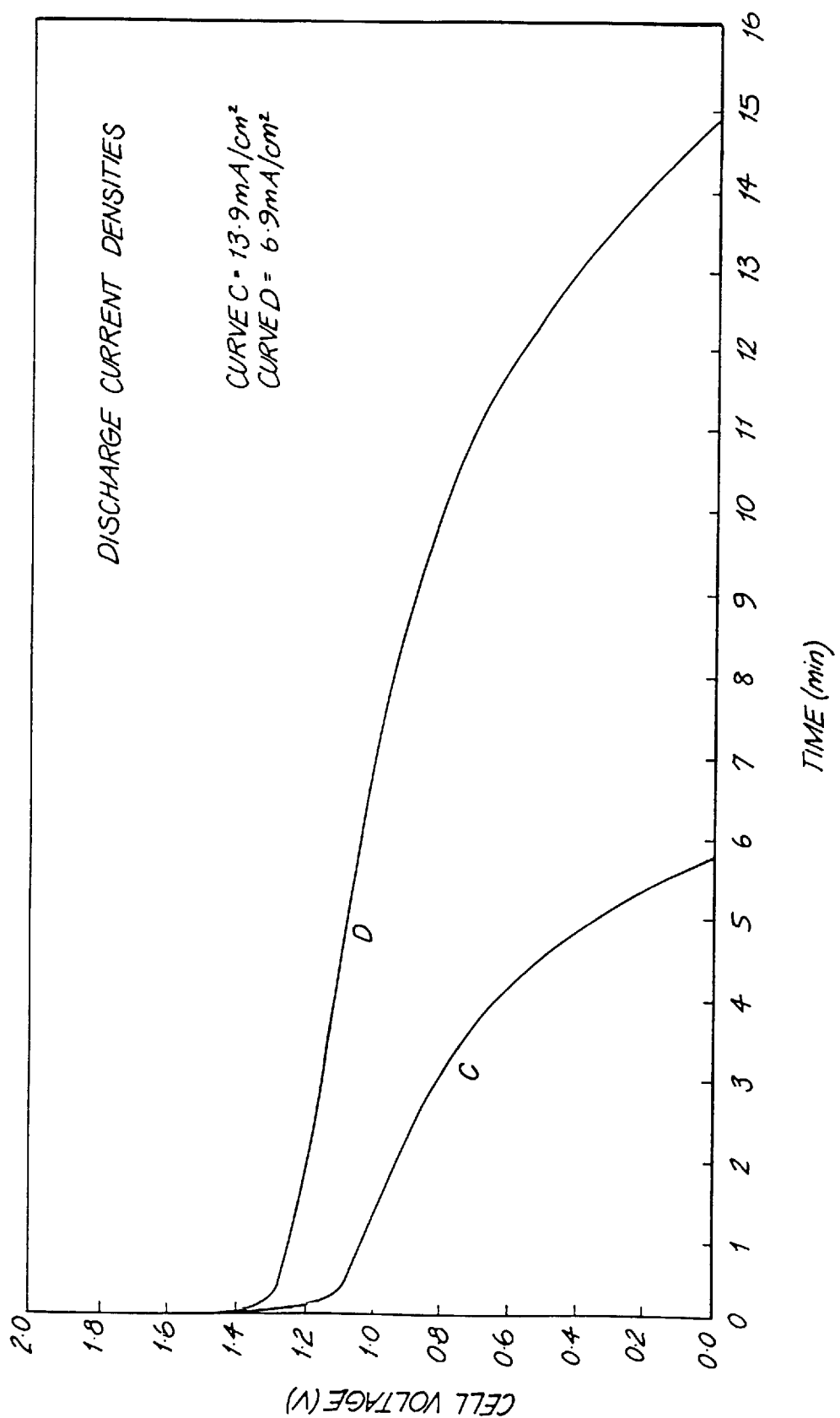
FIG. 11 are discharge curves as a function of time at various current densities for an all-vanadium redox battery; employing 5.5M vanadium sulphate in 3M $H_2SO_4$ and operating at 40° C.

FIG. 10(a) shows a batch or Continuous process for preparing HED electrolyte solutions respectively. In FIG. 10(a) 1.801M–10M, typically 2–5M, $V_2O_5$ powder (or $NH_4VO_3$ powder), and $H_2SO_4$, and optionally a stabilising amount of a stabilising agent, are fed into a mixing tank and a solution of V(III) is added continuously as a leachant/reductant for the $V_2O_5$. The V(III) reduces the $V_2O_5$ to V(IV) producing a solution containing a 50:50 l mixture of V(III) and V(IV) ions at supersaturation levels. Part of this electrolyte solution is recycled to the negative compartment of an electrolytic cell where it is reduced to V(III) and returned to the mixing tank for further leaching of $V_2O_5$. The remaining V(III)/V(IV) electrolyte solution is used as feed for the positive and negative half-cells of a vanadium redox cell which upon charging, produces electrolyte solutions of V(II)/V(III) and V(IV)/V(V) in the negative and positive ½-cells respectively. Initially a viscous HED solution is formed (which may be a colloidal particle/solution mixture) of vanadium ions (>1.8M vanadium ions, typically >2M vanadium ions, even more typically >3M vanadium ions, typically 3.01M–10M, more typically 5.01M–6.5M). The viscous HED solution is then typically maintained, with or without stirring, at room temperature for about 3 weeks to a month or more, or at 25–80° C. for 0.1 day–25 days, typically 1 day–15 days, until its viscosity substantially decreases. The V(II), V(II) and V(IV) ions in the HED solution, before or after reducing the viscosity of the HED solution, may be reduced to form a solution of V(II)/V(III) ions or oxidised to form a solution of V(IV)/V(V) ions. FIG. 10(b) depicts schematically an alternative process using an electrochemical cell having an ionically conducting separator for generating V(II) or V(III) ions by oxidising a mixture of V(III)/V(IV) and a mixing tank for dissolving $V_2O_3$ or other vanadium V(II) or V(III) salt using the V(V) as oxidising agent;

FIG. 11 shows discharge curves for a vanadium redox cell employing 5.5M vanadium electrolyte solutions at 2 current densities.

Figure 12:
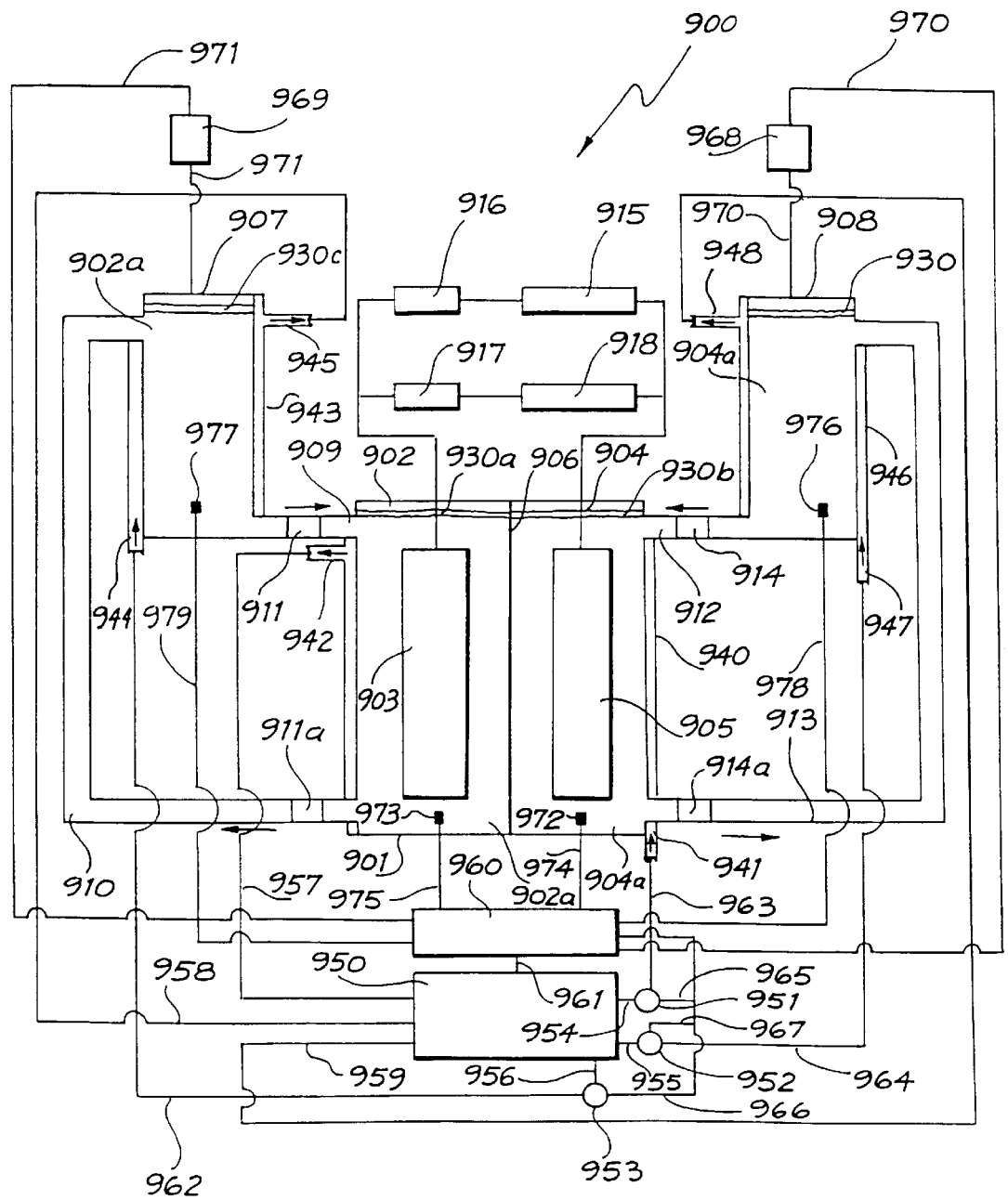
FIG. 12 depicts an all-vanadium redox battery system.

FIG. 12 schematically depicts an all-vanadium redox battery system 900. System 900 includes an all-vanadium redox battery 901 having a negative compartment 902 which includes an anolyte 902a therein in electrical contact with a negative electrode 903 and a positive compartment 904 which includes a catholyte 904a therein in electrical contact with a positive electrode 905. An ionically conducting separator 906 is disposed between negative and positive compartments 902 and 904 and is in contact with anolyte 902a and catholyte 904a to provide ionic communication therebetween. Anolyte 902a and catholyte 904a are typically prepared by a method in which a HED solution of a soluble vanadium salt such as $V_2O_5$ or ammonium vanadate is electrolytically reduced in an aqueous solution of concentrated sulphuric acid (1–12M) to a 100% $V^{3+}$ oxidation state. $V_2O_5$ powder is then added to the $V^{3+}$ solution and is induced to dissolve in the $V^{3+}$ solution by the $V^{3+}$ ions which act as a leaching agent for the $V_2O_5$. This solution is then placed in an electrolysis cell and reduced to $V^{3.5+}$. Additional $V_2O_5$ powder (in an amount to produce a final supersaturated solution, typically 3.01–10M vanadium ions) is added to $V^{3.5+}$ solution and mixed by mechanical stirring and after the dissolution reaction is completed the solution is filtered. The vanadium oxidation state of the solution obtained is typically close to 100% $V^{4+}$. The supersaturated (e.g. 5–10M) V(IV) electrolyte solution is then placed into anolyte reservoir 907 and negative compartment 902 and catholyte reservoir 908 and positive compartment 904. Thin air sealing layers 903a, 930b, 930c and 930d of paraffin oil are placed in negative and positive compartments 902 and 904 and into anolyte reservoir 907 and catholyte reservoir 908 to substantially seal anolyte 902a and catholyte 904a from air. Initially anolyte 902a and catholyte 904a are viscous HED solutions (which may be a colloidal particle/solution mixtures) of vanadium ions (>1.8M vanadium ions, typically >2M vanadium ions, even more typically >3M vanadium ions, typically 3.01M–10M, more typically 5.01M–6.5M). The viscous HED solution may be maintained, with or without stirring, e.g. by pumping, at room temperature for about 3 weeks to a month or more, or at 25–80° C. for 0.1 day–25 days, typically 1 day–15 days, until their viscosity substantially decrease. Anolyte 902a is pumped through negative compartment 902 and anolyte reservoir 907 via anolyte supply and return lines 909 and 910 by anolyte pumps 911 and 911a, and at the same time catholyte 904a is pumped through positive compartment 904 and catholyte reservoir 908 via catholyte supply and return lines 912 and 913 by catholyte pumps 914 and 914a. Redox battery 901 is charged by providing electrical energy from power source 915 to positive and negative electrodes 903 and 905 by closing switch 916 and opening switch 917 whereby electricity flows in negative and positive electrodes 903 and 905 from power supply 915 to produce a supersaturated concentration of divalent vanadium ions in anolyte 902a and a supersaturated concentration of pentavalent vanadium ions in catholyte 904a. Redox battery 911 may be insulated so as to substantially prevent or significantly reduce crystallisation or precipitation of vanadium substances/compounds from the catholyte and/or anolyte, i.e. so the temperature of the operating redox battery 901 is maintained typically above 20° C. (unless a stabilising agent is used in which case depending on the stabilising agent it may be possible to operate above 0° C.), more typically above 25° C., typically in the range 25° C.–50° C. via heating and/or cooling jacket 940 having inlet 941 and outlet 942. Inlets 941, 944 and 947 are coupled to pumps 951, 953 and 952 via lines 962, 963 and 964. Computer 960 is coupled to pumps 951, 953 and 952 via lines 965, 966 and 967 to control the speed of such pumps and to reservoirs 968 and 969 via lines 970 and 971 to control the Outputs of such reservoirs. Reservoirs 968 and 969 are coupled to reservoirs 904a and 902a via lines 970 and 971. Computer 960 is linked to probes 972 and 973 via lines 974 and 975 and to probes 976 and 977 via lines 978 and 979. Computer 960 may be linked to pumps 914a, 911a, 914 and 911 to, control the speed of such pumps. Probes 972, 973, 976 and 977 may be simply probes for measuring temperature or may each consist of a plurality of probes which measure desired parameters (e.g. temperature, pH, electrolyte concentration, total sulphate concentration, vanadium ion concentration, vanadium redox couple concentration, stabilising agent concentration, flow rate, and/or oxygen concentration). Once a particular parameter is detected by one or more of probes 972, 973, 976 and 977 a signal is sent via the appropriate line to computer 960 which in turn sends a signal, if required to the appropriate entity (e.g. one of pumps 951, 952 or 953 or to supply 950 or to reservoir 968 or 969) to take the appropriate action. For instance, the temperature of anolyte 902a in anolyte reservoir 907 is maintained and/or controlled typically above 20° C. (unless a stabilising agent is used in which case depending on the stabilising agent it may be possible to operate above 0° C.), more typically above 25° C., typically in the range 25° C.–50° C. via heating and/or cooling jacket 943 having inlet 944 and outlet 945 (steam, hot water, cold water or water at an appropriate temperature may be passed at an appropriate rate through jacket 943 under the control of computer 960 to maintain and/or control the temperature of anolyte 902a in reservoir 907). The temperature of catholyte 904a in catholyte reservoir 908 is maintained and/or controlled typically above 20° C. (unless a stabilising agent is used in which case depending on the stabilising agent it may be possible to operate above 0° C.), more typically above 25° C., typically in the range 25° C.–50° C. via heating and/or cooling jacket 946 having inlet 947 and outlet 948 (steam, hot water, cold water or water at an appropriate temperature may be passed at an appropriate rate through jacket 946 under the control of computer 960 to maintain and/or control the temperature of reservoir 904a in reservoir 908). Steam, hot water, cold water or water at an appropriate temperature may be passed at an appropriate rate through jacket 940 under the control of computer 960 to maintain the temperature at the desired temperature or within the desired temperature range of anolyte 902a and catholyte 904a in battery 901 via steam, hot water, cold water or water supply 950 which is coupled to pumps 951, 952 and 953 via lines 954, 955 and 956, to outlets 942, 945 and 948 via lines 957, 958 and 959 and to computer 960 via line 961. The temperatures of anolyte 902a and catholyte 904a may be manually or automatically monitored using a thermometer or thermostat or other appropriate temperature sensing device and the temperature of anolyte 902a and catholyte 904a controlled or maintained manually or automatically by adjusting the flow rate of steam, hot water, cold water or water at an appropriate temperature through the appropriate heating jacket(s) 940, 943 and/or 946. Alternatively, a wider operating temperature may be achieved by the use of a suitable stabilising agent in anolyte 902a and catholyte 904a. Reservoirs 968 and 969 may contain stabilising agent and/or electrolyte which can be added to reservoirs 904a and 902a as appropriate under the control of computer 960.

Electricity is derived from redox battery 911 by opening switch 916, closing switch 917 and withdrawing electrical energy via load 918 which is in electrical communication with negative and positive electrodes 903 and 905. redox battery 901 is recharged by opening switch 917, closing switch 916 and providing electrical energy front power source 915 to derive a supersaturated solution of divalent ions in anolyte 902a and a supersaturated solution of pentavalent ions in catholyte 904a. The anolyte 902a and catholyte 904a may be rebalanced 904a prior to, during or after the recharging process, to take into account any cross-contamination between anolyte 902a and catholyte 904a.

Figure 13:
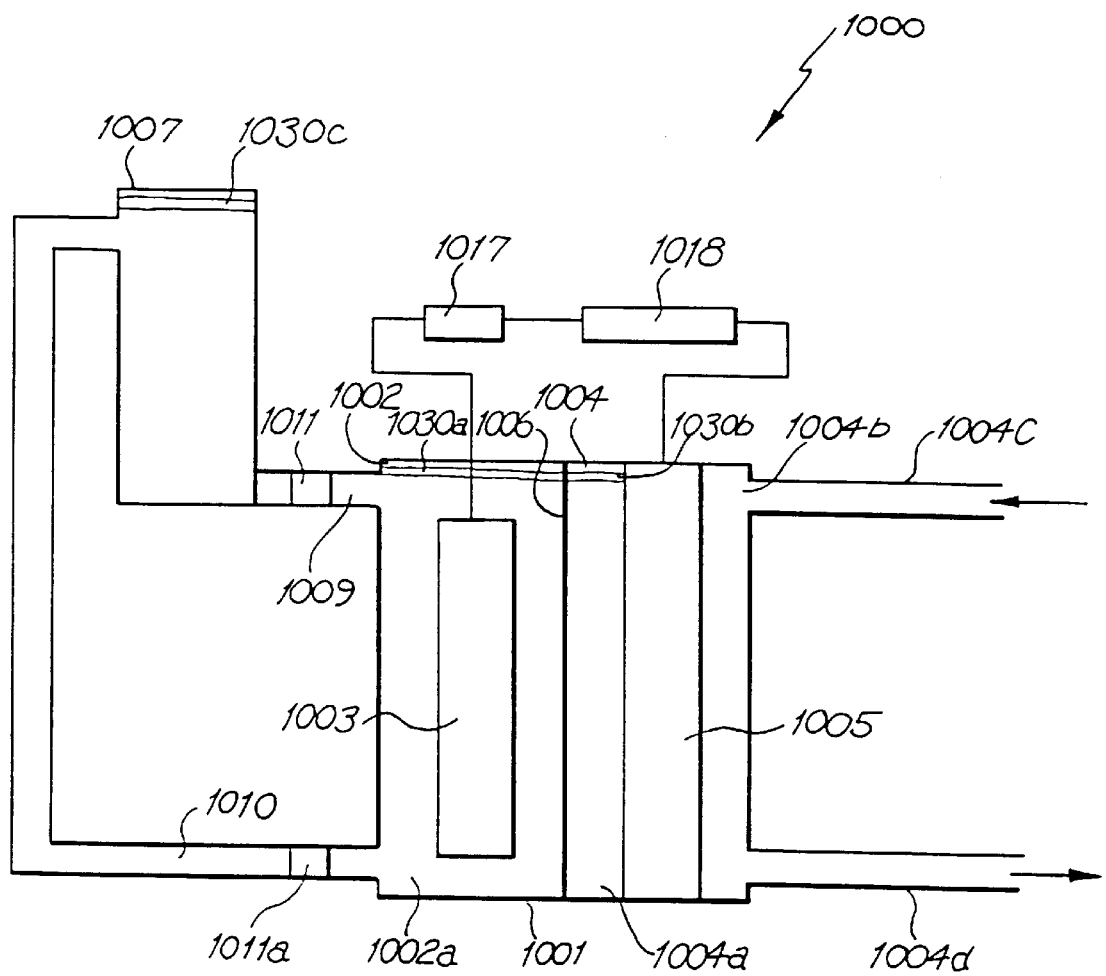
FIG. 13 depicts an all-vanadium redox battery fuel cell system.

FIG. 13 schematically depicts an all-vanadium redox battery/fuel cell system 1000. System 1000 includes an all-vanadium redox battery/fuel cell 1001 having a negative compartment 1002 which includes an anolyte 1002a therein in electrical contact with a negative electrode 1003 and a positive compartment 1004 which includes a catholyte 1004a therein in electrical contact with a positive oxygen/air electrode 1005. An ionically conducting separator 1006 is disposed between negative and positive compartments 1002 and 1004 and is in contact with anolyte 1002a and catholyte 1004a to provide ionic communication therebetween. Anolyte 1002a and catholyte 1004a are typically prepared by a method in which a solution of a vanadium compound such as $V_2O_5$ powder is electrolytically reduced, optionally in the presence of a stabilising amount of a suitable stabilising agent, in an aqueous solution of concentrated sulphuric acid (1–10M) to a 100% $V^{3+}$ oxidation state. $V_2O_5$ powder is then added to the V solution and is induced to dissolve in the $V^{3+}$ solution by the $V^{3+}$ ions which act as a leaching agent for the $V_2O_5$. This solution is then placed in an electrolysis cell and reduced to $V^{3+}$. Additional $V_2O_5$ powder (in an amount to produce a final supersaturated solution) is added to $V^{3.5+}$ solution and mixed by mechanical stirring and after the dissolution reaction is completed the solution is filtered. The vanadium oxidation state of the solution obtained is typically close to 100% $V^{4+}$. The supersaturated (e.g. 5–10M) Part of the, V(IV) electrolyte solution is then reduced to V(II) in a separate anolyte charging cell (not shown) and placed into anolyte reservoir 1007 and negative compartment 1002. Part of the V(IV) electrolyte solution may be optionally oxidised to V(V) in a separate catholyte charging cell (not shown) and placed in positive compartment 1004. Thin air sealing layers 1030a, 1030b, and 1030c of paraffin oil are placed in negative and positive compartments 1002 and 1004 and into anolyte reservoir 1007 to substantially seal anolyte 1002a and catholyte 1004a from air. Anolyte 1002a is pumped through negative compartment 1002 and anolyte reservoir 1007 via anolyte supply and return lines 1009 and 1010 by anolyte pumps 1011 and 1011a, and at the same time oxygen or an oxygen containing gas such as air, is passed through compartment 1004b via inlet line 1004c and water exits compartment 1004b via exit line 1004d. Catholyte 1004a is charged by passing oxygen or an oxygen containing gas over oxygen/air electrode 1005 (e.g. a porous carbon oxygen electrode) to oxidise vanadium (IV) to vanadium(V) in catholyte 1004a. Anolyte 1002a may be charged in a separate charging cell (as may catholyte 1004a when all of anolyte 1002a is discharged to rebalance system 1000). Initially catholyte 1004a and anolyte 1002a are viscous HED solutions (which may be a colloidal particle/solution mixture) of vanadium ions (typically >3M vanadium ions, typically 3.01M–10M, more typically 5.01M–6.5M). The viscous HED solutions are then optionally maintained, with or without stirring, e.g. by pumping, at room temperature for about 3 weeks to a month or more, or at 25–80° C. for 0.1 day–25 days, typically 1 day–15 days, until their viscosities substantially decrease. Electricity is derived from redox battery 1001 by closing switch 1017 and withdrawing electrical energy via load 1018 which is in electrical communication with negative and positive electrodes 1003 and 1005. Since catholyte 1004a is instantaneously regenerated by oxygen via oxygen/air electrode 1005, a catholyte reservoir is not required, thus permitting, for a given size battery, twice the volume of the anolyte to be carried on a vehicle such as a car and thereby doubling the range before refuelling. System 1000 has a theoretical energy density of 270.7 Wh/kg. The anolyte 1002a and catholyte 1004a may be rebalanced 1004a prior to, during or after the recharging process, to take into account any cross-contamination between anolyte 1002a and catholyte 1004a.

Figure 14:
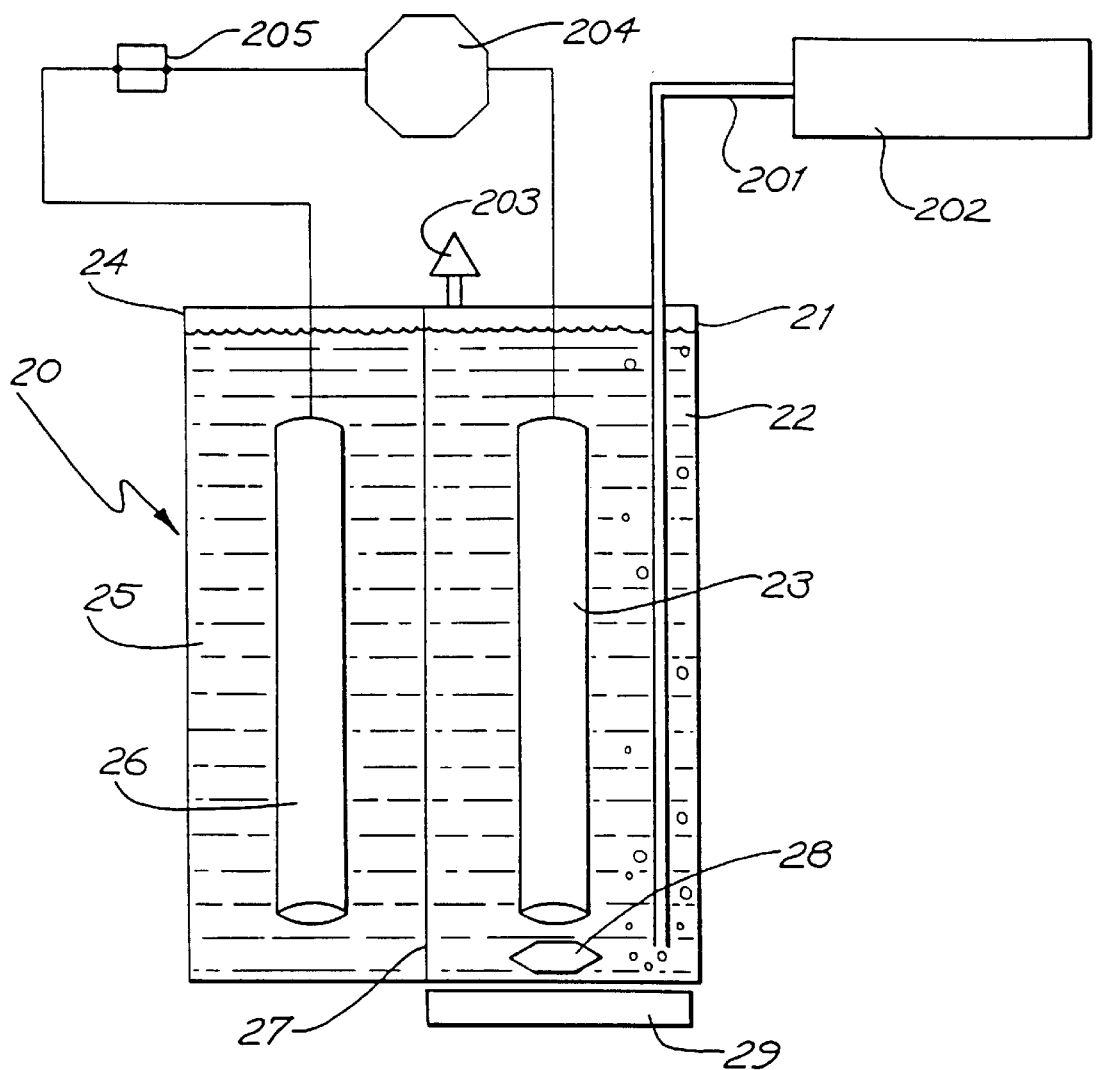
FIG. 14 depicts schematically an electrochemical cell having an ionically conducting separator for dissolving and reducing a reducible vanadium-containing salt or complex in the presence of a stabilising agent.

Referring to FIG. 14 an electrochemical cell 20 for dissolving and reducing a reducible vanadium-containing salt or complex has a positive compartment 24 containing a catholyte in electrical contact with positive electrode 26. Cell 20 has a negative compartment 21 containing an anolyte 22 in electrical contact with positive electrode 23. Positive electrode 26 is electrically coupled to a negative electrode 23 via electrical power source 204 and switch 205 which are connected in series. Power source 204 can be a dc battery capable of delivering of at least about 2.3 volts over and above resistant losses of cell 20. Ionically conducting separator 27 is disposed between positive and negative compartments 24 and 21 and is in contact with catholyte 25 and anolyte 22 to provide ionic communication therebetween. A preferred separator 27 is a Selemion or New Selmion or Flemion or Nafion membrane. Catholyte 25 is typically 1M to 6M $H_2SO_4$. Anolyte 22 is typically 1M to 6M $H_2SO_4$ and contains a reducible vanadium-containing salt or complex such as $V_2O_5$ in powder form. Anolyte 22 also contains a stabilising agent is used in an amount typically in the range of from 0.1 to 20 wt %, more typically 0.25% to 7.5 wt % (or vol %). Yet more typically, the stabilising agent is used in an amount of from 1% to 3 wt % or 1.5 to 5 wt %.

To dissolve and reduce the powdered $V_2O_5$, anolyte 22 is stirred by teflon coated magnetic stirrer bar 28 which is driven by magnetic stirrer 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. Switch 205 is closed so as to deliver 2.5 volts between negative and positive electrodes 23 and 26. The following reactions take place at negative electrode 23 or in positive compartment 21 as a consequence of reaction of ions formed by reactions which take place at negative electrode 23:

(a) $V(V)+3e^- \rightarrow V(II)$
(b) $V(V)+2e^- \rightarrow V(III)$
(c) $V(V)+e^- \rightarrow V(IV)$
(d)
   (i) $V(II)+V(IV) \rightarrow 2V(III)$
   (ii) $V(II)+1,2V_2O_5 \rightarrow V(III)/V(IV)$
   (iii) $V(III)+1,2V_2O_5 \rightarrow 2V(IV)$
   (iv) $V(IV)+1,2V_2O_5 \rightarrow V(V)$ (in solution)+V(IV)

From the above reactions the V(II), V(III) and V(IV) ions dissolved in anolyte 22 reduce the $V_2O_5$ powder and overall are reduced to the extent of forming dissolved V(III) and V(IV) ions. Powdered $V_2O_5$ which comes in direct contact with negative electrode 23 is directly reduced. Overall the reactions in the anolyte can be represented as:

Reducing Conditions $V_2O_5$+stabilising agent→V(III)/V(IV)+stabilising agent

The addition of a stabilising agent as defined above to an aqueous solution of a vanadium salt can have a very substantial effect on the solubility of that salt. Thus, vanadium pentoxide is normally very slightly soluble in water (0.07 g/l). However, with the addition of as little as 0.5–3% by weight of stabilising agent (e.g. glycerine+ammonium oxalate) a 0.5M solution of vanadium ions in water can be prepared. Similarly, a 0.487M solution of vanadium pentoxide may be prepared in 3M $H_2SO_4$ by boiling and subsequently cooling. When 0.5–3% by weight of stabilising agent is added, a concentration of up to 3.5–5M vanadium ions is achievable (depending on the stabilising agent) by simple dissolution.

In an all vanadium redox cell tested by the inventors which did not include an effective stabilising amount of a stabilising agent, the V(II)/V(IV) electrolyte solution, prepared by the electrolytic dissolution of $V_2O_5$ powder, had a maximum concentration of vanadium of 2.46M, and is stable at room temperature. With the addition of 0.5–9%, more typically 2–3% by weight of stabilising agent (glycerine+ammonium oxalate based on the weight of vanadium pentoxide) a concentration of up to 4.21M $V_2O_5$ can be achieved. This solution is stable at room temperature for a period of at least several months. In the event that vanadium salts start precipitation from solution, further additions of stabilising agent can be made to the solution, as required.

Figure 15:
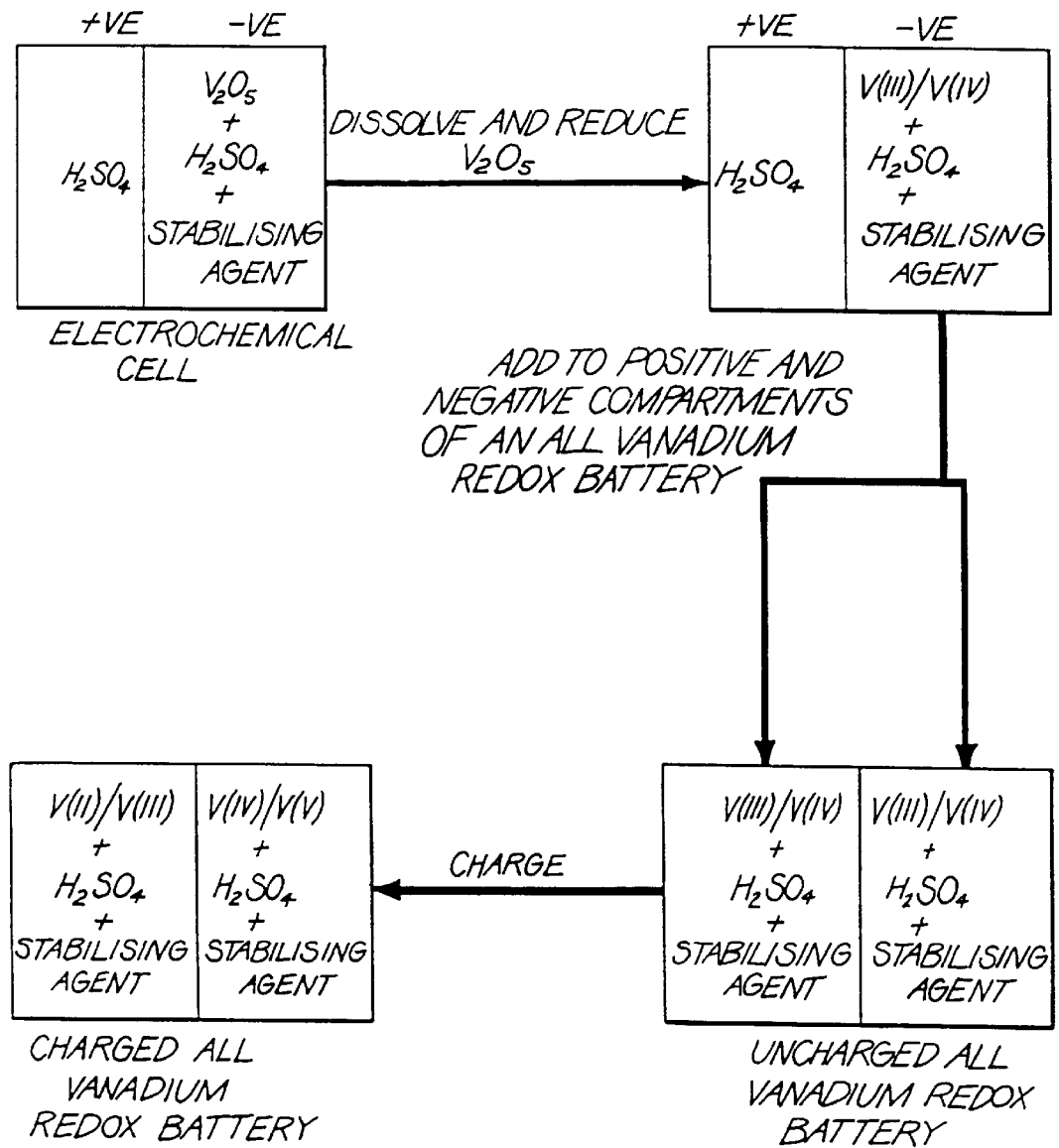
FIG. 15 depicts schematically a batch process for dissolving and reducing a reducible vanadium-containing salt or complex in the presence of a stabilising agent.
Figure 16:
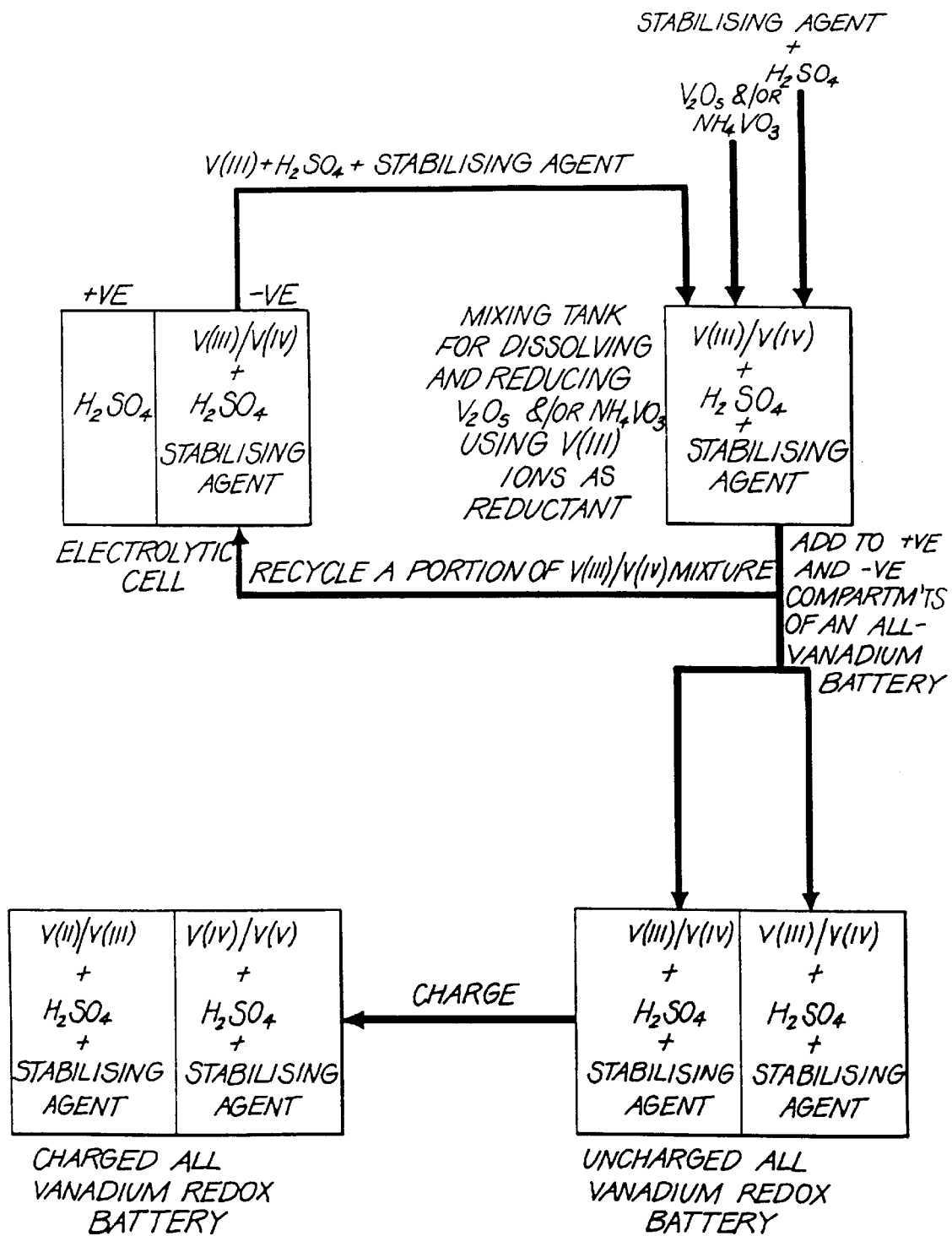
FIG. 16 depicts schematically a Continuous process for dissolving and reducing a reducible vanadium-containing salt or complex in the presence of a stabilising agent.

An example of a batch process for preparing a stabilised all-vanadium electrolyte solution for a charged all vanadium redox battery containing using the process of the invention is depicted in FIG. 15. An example of a continuous process for preparing a stabilised all-vanadium electrolyte solution for a charged all vanadium redox battery using the process of the invention is depicted in FIG. 16.

Figure 17:
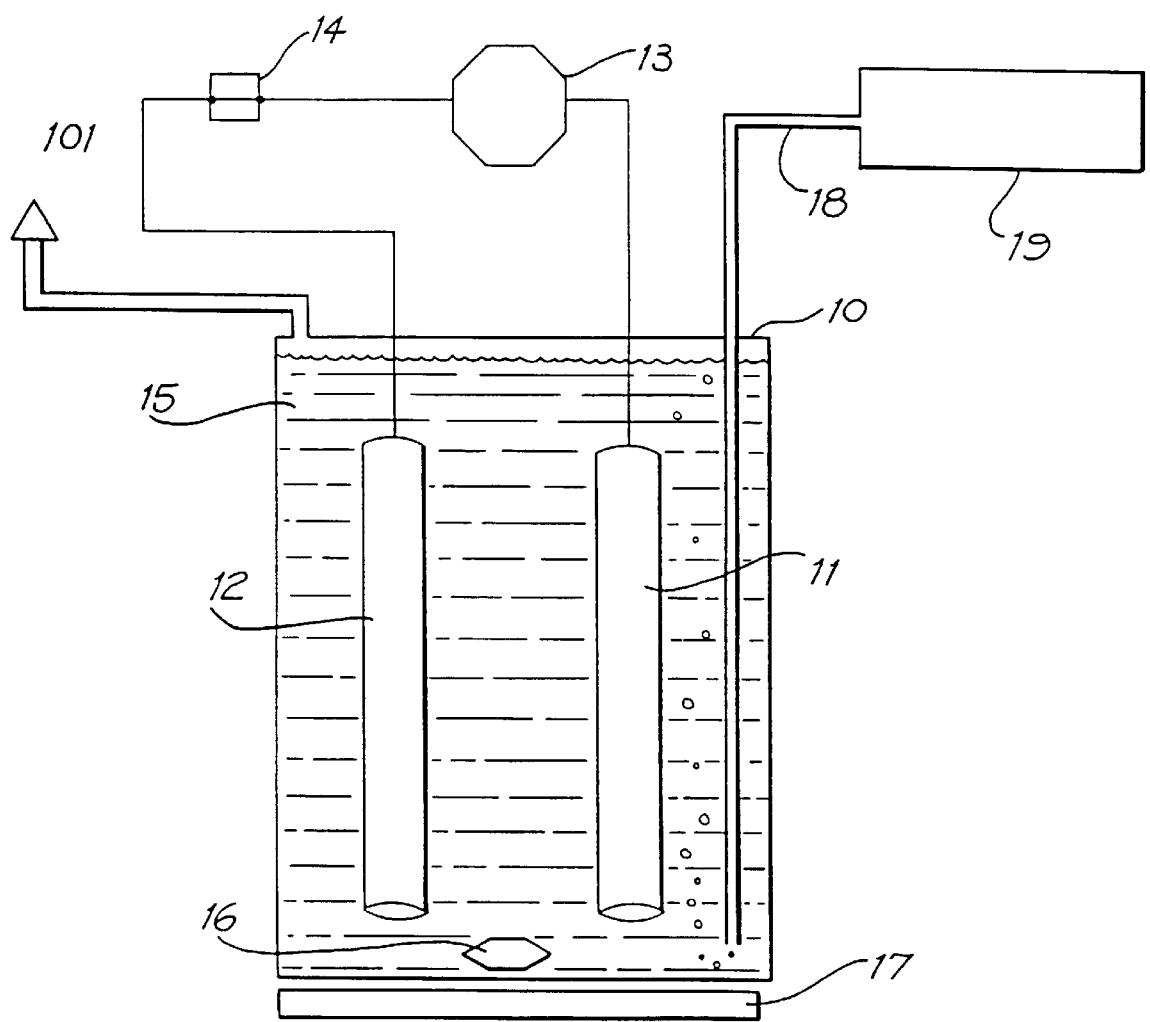
FIG. 17 depicts schematically an electrochemical cell which does not have an ionically conducting separator for dissolving and reducing a reducible vanadium compound, the electrolyte solution produced comprising typically a mixture of V(IV) and V(V) ions in the electrolyte solution.

Referring to FIG. 17 an electrochemical cell 10 for dissolving and reducing a reducible vanadium compound has a negative electrode 11 and a positive electrode 12 which are electrically coupled via electrical power source 13 and switch 14 which are connected in series. Power source 13 can be a dc battery capable of delivering at least about 0.5 to about 2.0 volts over and above resistance losses of cell 10. Cell 10 contains an aqueous electrolyte containing a stabilizing amount of a stabilizing agent 15 which is in electrical contact with positive and negative electrodes 12 and 11. Electrolyte solution 15 is preferably 0.5M to 10M $H_2SO_4$ and contains 0.001M to 2M of a stabilizing agent such as inositol or glycerine and 0.5M to 10M, more typically 3.5–7M of a reducible vanadium compound such as $V_2O_5$ or ammonium metavanadate in powder form.

To dissolve and reduce the powdered $V_2O_5$ electrolyte solution 15 is stirred by teflon coated stirrer bar 16 which is driven by magnetic stirrer 17 disposed below cell 10.

Nitrogen is bubbled through electrolyte solution 15 via line 18 which delivers nitrogen from nitrogen gas cylinder 19 to which it is coupled. Nitrogen is vented from cell 10 via vent 101. Switch 14 is closed so as to deliver 0.5 to 2.0 volts between negative and positive electrodes 11 and 12.

Figure 18:
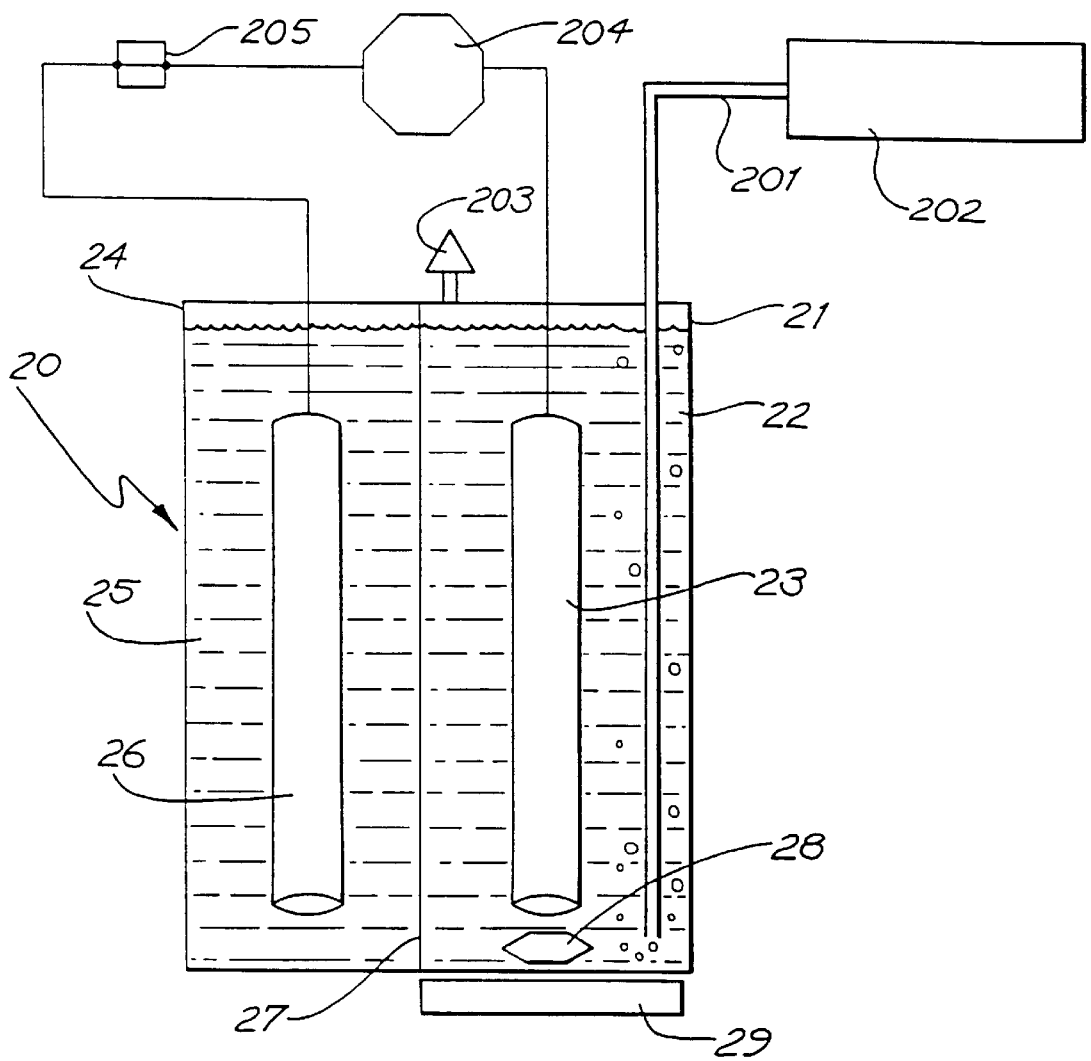
FIG. 18 depicts schematically an electrochemical cell having an ionically conducting separator for dissolving an(d reducing a reducible vanadium compound in the presence of a stabilizing agent.

Referring to FIG. 18 an electrochemical cell 20 for dissolving and reducing a reducible vanadium compound has a positive compartment 24 containing a catholyte with a stabilizing agent 25 in electrical contact with positive electrode 26. Cell 20 has a negative compartment 21 containing an anolyte 22 in electrical contact with positive electrode 23. Positive electrode 26 is electrically coupled to a negative electrode 23 via electrical power source 204 an(d switch 205 which are connected in series. Power source 204 can be a dc battery capable of delivering at least about 2.3 volts over and above resistance losses of cell 20. Ionically conducting separator 27 is disposed between positive and negative compartments 24 and 21 and is in contact with catholyte 25 and anolyte 22 to provide ionic communication therebetween. A preferred separator 27 is a Nafion membrane or Selmion CMV membrane. Anolyte 22 is preferably 0.5M to 6.0M $H_2SO_4$ and contains an effective stabilizing amount of a stabilizing agent (typically 0.5–7.5% w/w), such as inositol or glycerine and a reducible vanadium compound such as $V_2O_5$ in powder form.

To dissolve and reduce the powdered $V_2O_5$, anolyte 22 is stirred by teflon coated magnetic stirrer bar 28 which is driven by magnetic stirrer 29 disposed below negative compartment 21. Nitrogen is bubbled through anolyte 22 via line 201 which delivers nitrogen from nitrogen gas cylinder 202 to which it is coupled. Nitrogen is vented from negative compartment 21 via vent 203. Switch 205 is closed so as to deliver 2.5 volts between negative and positive electrodes 23 and 26.

The V(II), V(III) and V(IV) ions produced by reduction of the $V_2O_5$ powder and dissolved in anolyte 22 reduce the $V_2O_5$ powder and form dissolved and reduced V(II), V(III) and V(IV) ions. Powdered $V_2O_5$ which comes in direct contact with negative electrode 23 is directly reduced and at positive electrode 26, water is decomposed producing $O_2$. The V(II), V(III) and V(IV) ions may be reduced to form a solution of V(II)/V(III) ions or oxidised to form a solution of V(IV)/V(V) ions. An effective amount of immobilizing agent may be added to the reduced or oxidised solution to immobilize the solution if required.

Figure 19:
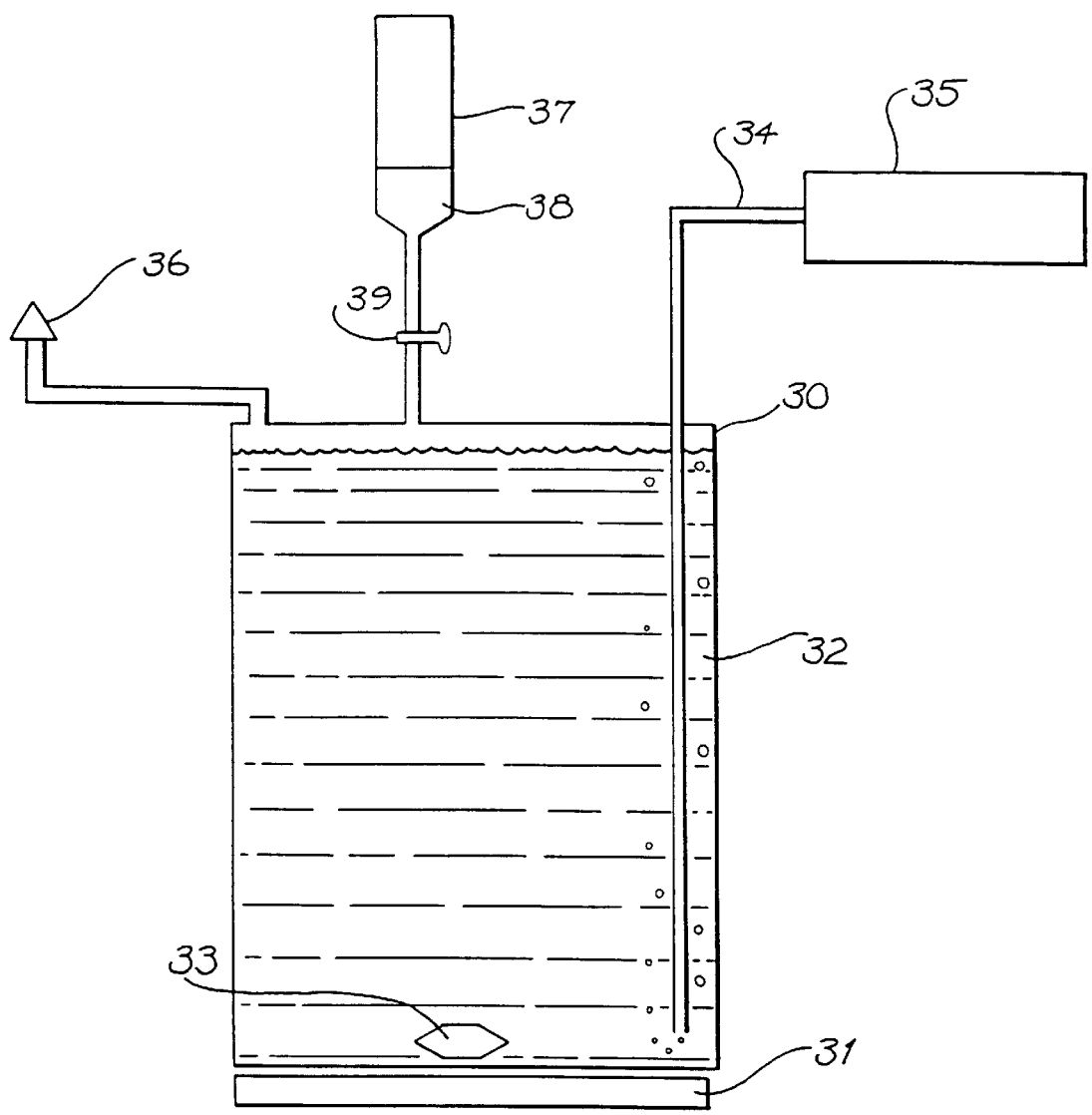
FIG. 19 depicts schematically an apparatus for dissolving and reducing a reducible vanadium compound in the presence of a stabilizing agent.

Referring to FIG. 19 a container 30 for dissolving and reducing ammonium metavanadate or vanadium pentoxide or other reducible vanadium salts or complexes is disposed on top of magnetic stirrer 31. For exemplification a process of dissolving and reducing ammonium vanadate is described. Container 30 contains an aqueous electrolyte 32 comprising 0.5M to 10M $H_2SO_4$ an effective stabilizing amount of the stabilizing agent (typically 0.75–5% w/w), such as glycerine, inositol or sodium gluconate, and ammonium vanadate in powder form.

To dissolve 0.5M to 10M of the powdered ammonium vanadate electrolyte solution 32 is stirred by teflon coated stirrer bar 33 which is driven by magnetic stirrer 31. Nitrogen is bubbled through electrolyte solution 32 via line 34 which delivers nitrogen from nitrogen gas cylinder 35 to which it is coupled. Nitrogen is vented from container 30 via vent 36. A chemical reductant preferably $SO_2$ or oxalic acid (0.05M to 10M) is added to electrolyte solution 32 from reservoir 37 by opening tap 39. Sufficient reductant is added to dissolve and reduce the ammonium vanadate powder in electrolyte solution 32.

Figure 20:
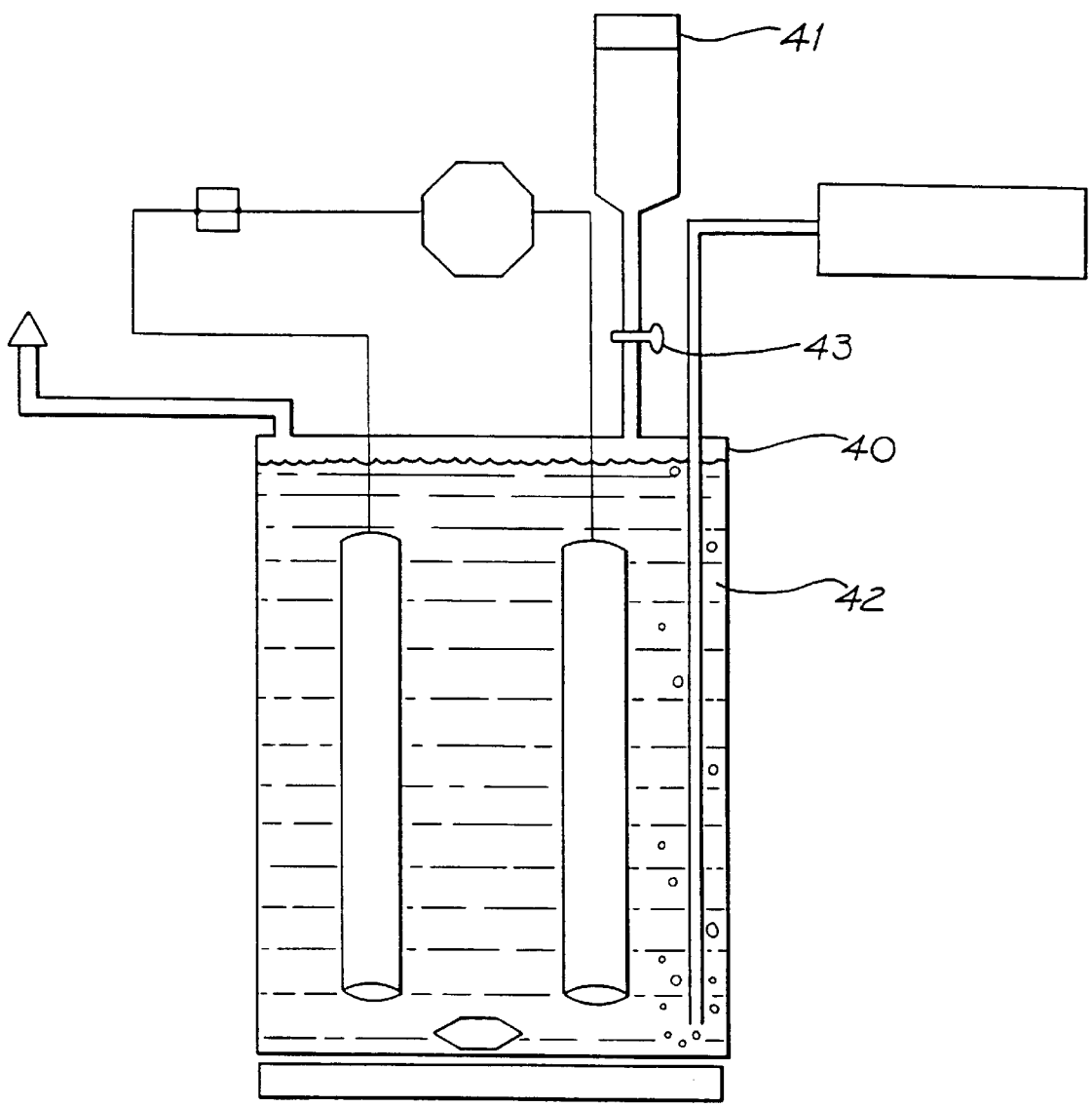
FIG. 20 depicts schematically an electrochemical cell which does not have an ionically conducting separator for dissolving and reducing a reducible vanadium compound, the electrolyte solution produced comprising typically a mixture of V(IV) and V(V) ions in the electrolyte solution.

Referring to FIG. 20 an electrochemical cell 40 for dissolving and reducing a reducible vanadium compound is the same as electrochemical cell 10 shown in FIG. 17 except it includes a reservoir 41 which contains a chemical reductant preferably $SO_2$ or oxalic acid (0.05M to 10M, more typically 0.1 to 1M). Electrochemical cell 40 can be used to dissolve and reduce a reducible vanadium compound such as $V_2O_5$ in the same way as electrochemical cell 10 in FIG. 17 is used except the chemical reductant is added to electrolyte solution 42 from reservoir 41 by opening tap 43. Sufficient reductant is added to assist in dissolving and reducing the $V_2O_5$ powder which is in electrolyte solution 42 prior to further reduction.

The following reactions take place at negative electrode 11 or as a consequence of reactions of ions formed by reactions which take place at negative electrode 11:

(a) $V^{5+} + 3e^- \rightarrow V^{2+}$
(b) $V^{5+} + 2e^- \rightarrow V^{3+}$
(c) $V^{5+} + e^- \rightarrow V^{4+}$
(d)
   (i) $V^{2+} + V^{4+} \rightarrow 2V^{3+}$
   (ii) $V^{2+} + \frac{1}{2}V_2O_5 \rightarrow V^{3+}/V^{4+}$
   (iii) $V^{3+} + \frac{1}{2}V_2O_5 \rightarrow 2V^{4+}$
   (iv) $V^{4+} + \frac{1}{2}V_2O_5 \rightarrow V^{5+}$ (in solution $+V^{4+}$ From the above reactions the V(II), V(III) and V(IV) ions dissolved in electrolyte solution 15 reduce the $V_2O_5$ powder and form dissolved and reduce(d V(II), V(III), V(IV) and V(V) ions. Powdered $V_2O_5$ which comes into contact with negative electrode 11 is also reduced. At positive electrode 12 the following reactions take place:

(a) $V^{2+} \rightarrow V^{3+}$, $V^{4+}$ or $V^{5+}$ (in solution) $+1,2$ or $3e^-$
(b) $V^{3+} \rightarrow V^{4+}$ or $V^{5+}$ (in solution) $+1$ or $2e^-$
(c) $V^{4+} \rightarrow V^{5+}$ (in solution) $+1e^-$
(d) $H_2O \rightarrow O_2$ From the immediately preceding reactions whilst V(II), V(III) and V(IV) ions are oxidised to higher oxidation states at positive electrode 12 the higher oxidation state vanadium ions thus formed remain in solution.

Figure 21:
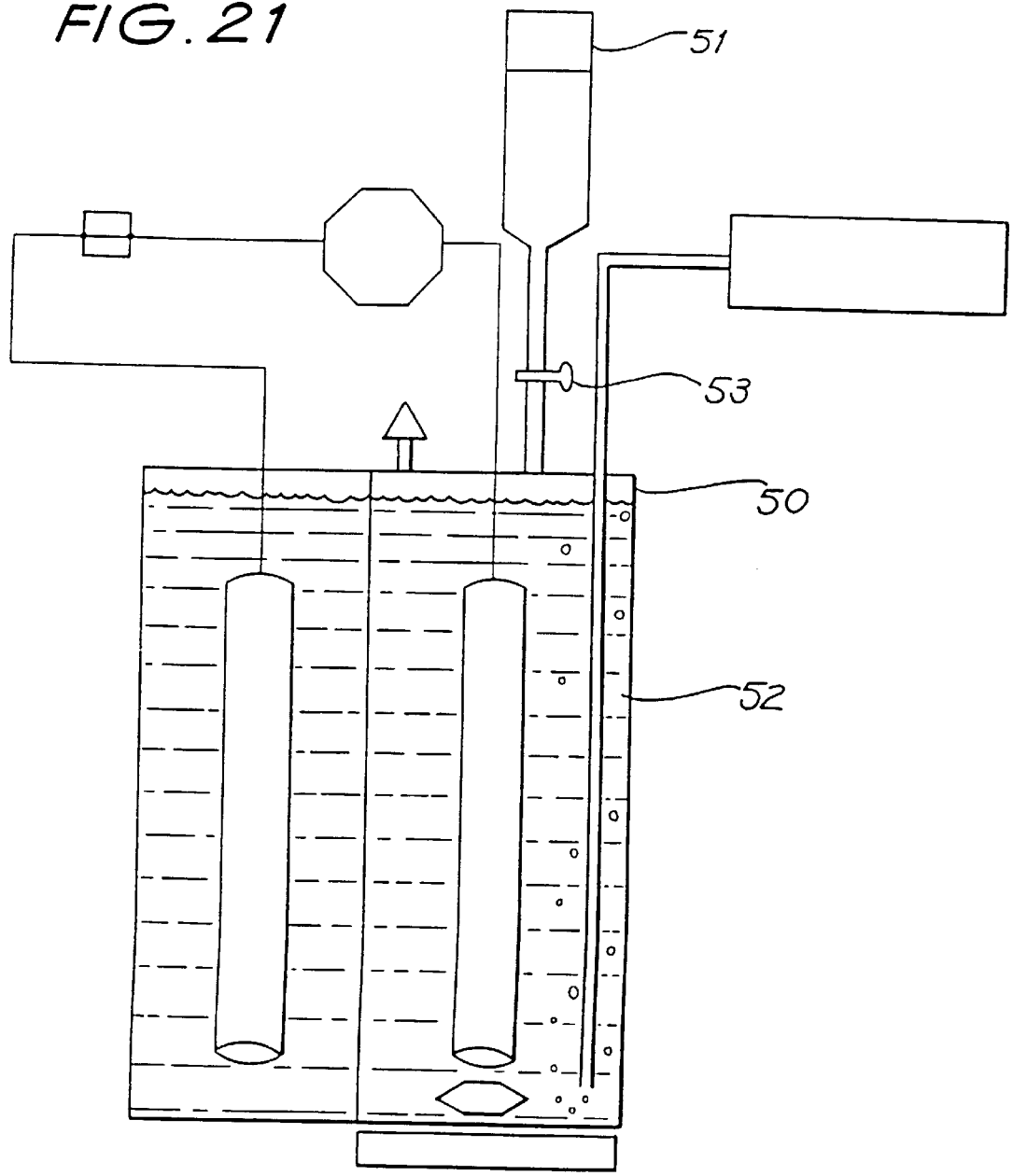
FIG. 21 depicts schematically an electrochemical cell having an ionically conducting separator for dissolving and reducing a reducible vanadium compound.

Referring to FIG. 21 an electrochemical cell 50 for dissolving and reducing a reducible vanadium compound is the same as electrochemical solution chemical cell 20 in FIG. 18 except it has a reservoir 51 which contains a chemical reductant preferably oxalic acid (0.05M to 5M). Electrochemical cell 50 can be use(d to dissolve an(d reduce 3–9M, for example, of a reducible vanadium compound such as $V_2O_5$ in the same way as electrochemical cell 20 in FIG. 18 is used except the chemical reductant is added to electrolyte solution 52 from reservoir 51 by opening tap 53. Sufficient reductant is added to assist in dissolving and reducing the $V_2O_5$ powder which is in electrolyte solution 52.

Figure 22:
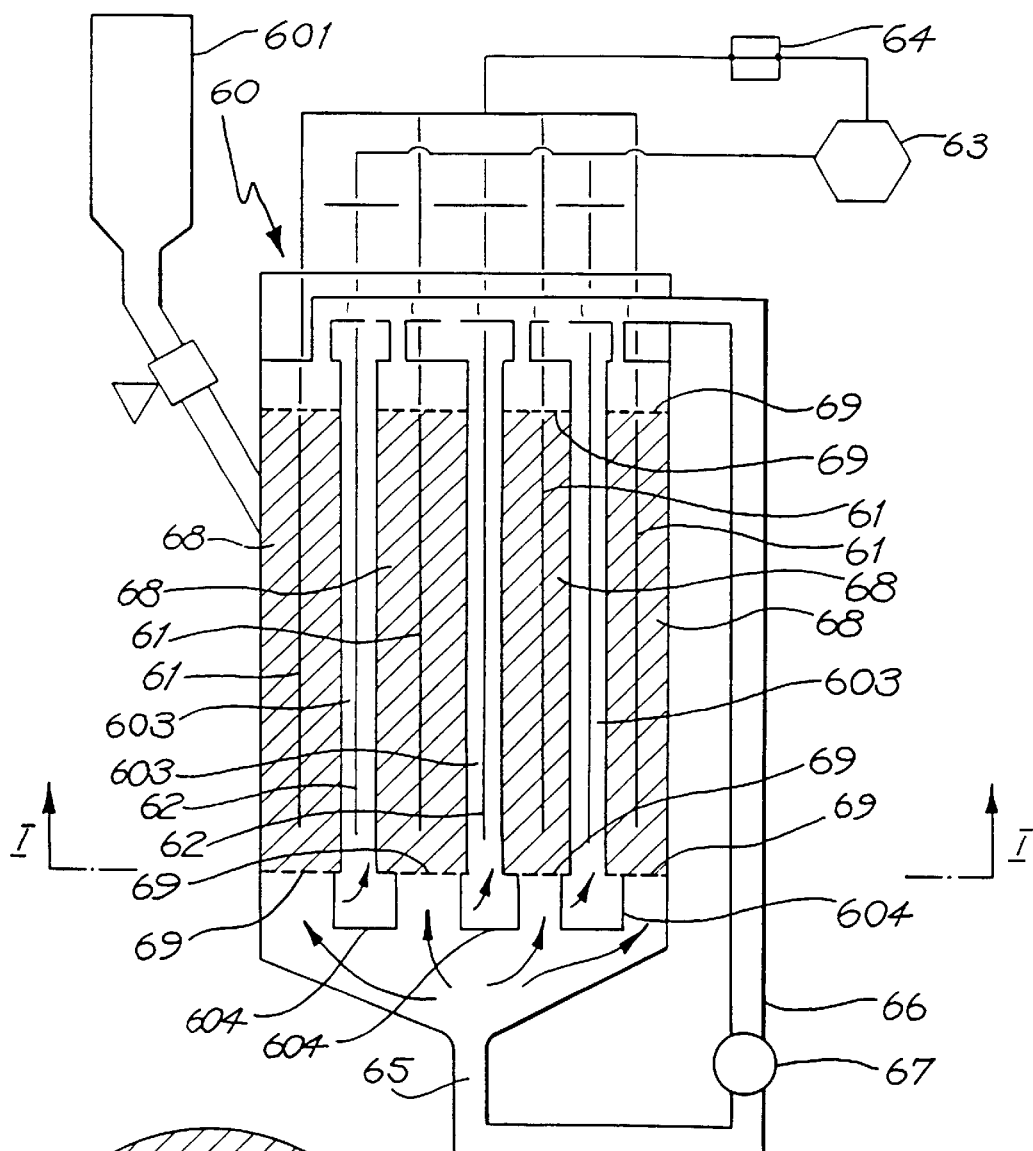
FIG. 22(a) depicts schematically an alternative electrochemical cell for dissolving and reducing a reducible vanadium compound.
FIG. 22(b) is a bottom cross-sectional view along the line I—I in FIG. 22(a)
Figure 22:
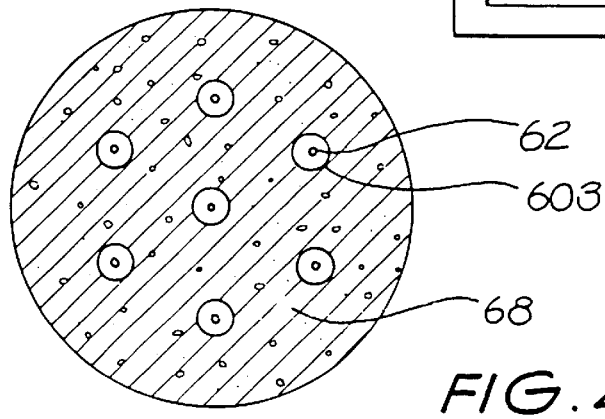

FIG. 22($a$) depicts an alternative electrochemical cell 60 for producing a highly supersaturated vanadium solution containing stabilizing agent by dissolving and reducing a reducible vanadium compound. Cell 60 has negative electrodes 61 and positive electrodes 62 which are electrically coupled via electrical power source 63 and switch 64 which are connected in series. Power source 63 can be a dc battery capable of delivering of at least 2.5 volts over and above resistance losses of cell 60. An aqueous electrolyte 65 is recirculated through cell 60 via recirculation line 66 which includes pump 67. Electrolyte solution 65 is preferably 0.5M to 10M $H_2SO_4$ and contains an effective stabilizing amount of a stabilizing agent (typically 0.75–5% w/w), such as glycerine, fructose or inositol and a 0.1M to 10M, more typically 2.5 to 8.5M of a reducible vanadium compound such as $V_2O_5$ or ammonium metavanadate in powder form in negative compartments 68 which contain the powdered compound by filter elements 69 located at either end of each negative compartment. Elements 69 can be glass frits or synthetic filter cloth. The compound containing electrolyte solution 64 can be added to negative compartments 68 from reservoir 601 by opening tap 602. Positive compartments 603 are separated from negative compartments 68 by ionically conducting separators or microporous separators 604 which are disposed in cell 60 at the bottom of positive compartment 603.

In use electrolyte solution 65 is recirculated throgh cell 60 and about 2.3 volts (excluding resistance losses) is applied between negative electrodes 61 and positive electrodes 62 respectively. Typically, the current density at negative the cathode is from about 5 to about 50 mA.cm$^{-2}$, while at the anode, the current density is from about 10 to about 300 mA.cm$^2$. Flow of electrolyte solution 65 through negative compartments 68 agitates the compound therein and maintains the powder in a fluidized state and over a period of time the powdered compound dissolves and is reduced into electrolyte solution 65. The dissolution and( reduction of the compound in electrolyte solution 65 can be assisted by adding a chemical reductant such as oxalic acid or bubbling a gaseous chemical reductant such as $SO_2$ through electrolyte solution 65.

Figure 23:
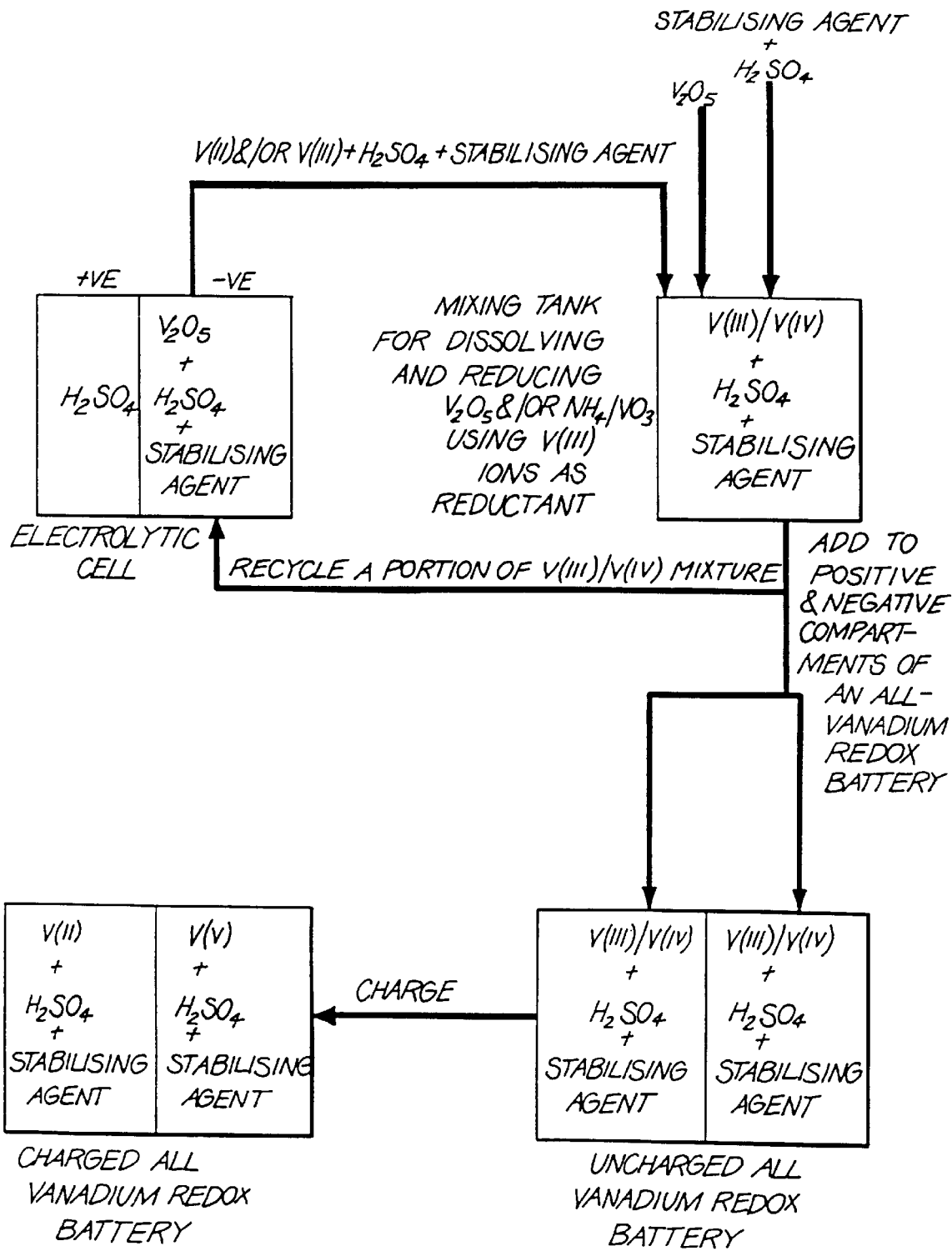
FIG. 23 depicts schematically an alternative process using an electrochemical cell having an ionically conducting separator for generating V(II) or V(III) ions by reducing a mixture of V(IV) and V(III) and $V_2O_5$, and a mixing tank for dissolving $V_2O_5$ or other vanadium salt in the presence of stabilizing agents, using the V(II) and or V(III) ions as reducing agent.

FIG. 23 shows a batch or continuous process for preparing stabilized electrolyte solutions respectively. In FIG. 23 an effective stabilizing amount of the stabilizing agent (typically 0.75–5% w/w), $V_2O_5$ powder (or $NH_4VO_3$ powder), and $H_2SO_4$ are fed into a mixing tank and a solution of V(III) is added continuously as a leachant/reductant for the $V_2O_5$. The V(III) reduces the $V_2O_5$ to V(IV) in the presence of the stabilizing agent producing a solution containing a 50:50 mixture of V(III) and V(IV) ions at supersaturation levels. Part of this electrolyte solution is recycled to the negative compartment of an electrolytic cell where it is reduced to V(III) and returned to the mixing tank for further leaching of $V_2O_5$. The remaining V(III)/V(IV) electrolyte solution with stabilizing agent is used as feed for the positive and negative half-cells of a vanadium redox cell which upon charging, produces stabilized electrolyte solutions of V(II)/V(III) and V(IV)/V(V) in the negative and positive ½-cells respectively.

Figure 25:
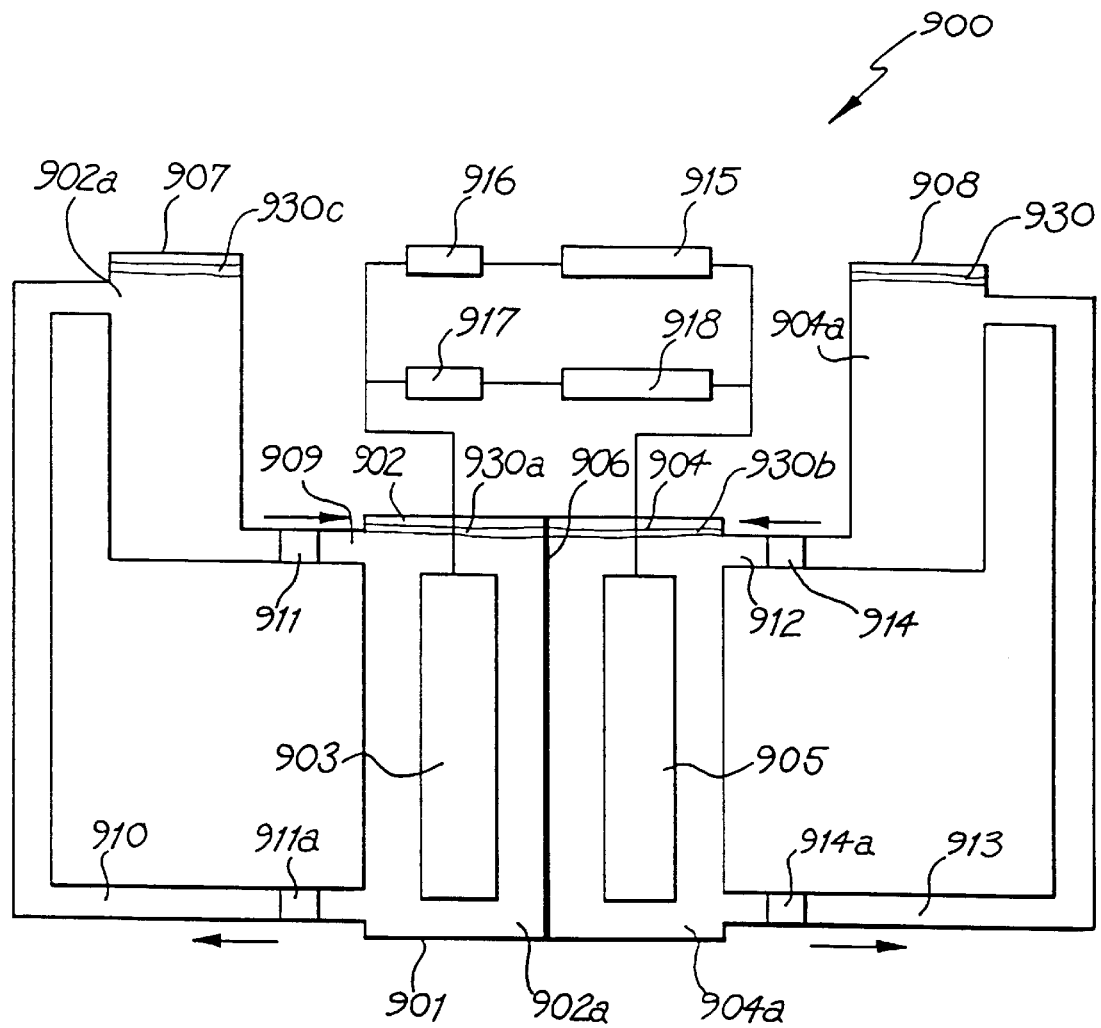
FIG. 25 depicts an all-vanadium redox battery system.

FIG. 25 schematically depicts an all-vanadium redox battery system 900. System 900 includes an all-vanadium redox battery 901 having a negative compartment 902 which includes includes an anolyte 902a therein in electrical contact with a negative electrode 903 and a positive compartment 904 which includes a catholyte 904a therein in electrical contact with a positive electrode 905. An ionically conducting separator 906 is disposed between negative and positive compartments 902 and 904 and is in contact with anolyte 902a and catholyte 904a to provide ionic communication therebetween. Anolyte 902a and catholyte 904a are typically prepared by a method in which a solution of a soluble vanadium salt such as ammonium vanadate is electrolytically reduced in an aqueous solution of concentrated sulphuric acid (1–10M) to a 100% V$^{3+}$ oxidation state. $V_2O_5$ powder and an effective stabilising amount of a stabilising agent (typically 0.5–10% w/w) is then added to the V$^{3+}$ solution and is included to dissolve in the V$^{3+}$ solution by the V$^{3+}$ ions which act as a leaching agent for the $V_2O_5$. This solution is then placed in an electrolysis cell and reduced to V$^{3.5+}$. Additional $V_2O_5$ powder (in all amount to produce a final supersaturated solution) and an effective stabilising amount of a stabilising agent (typically 0.5–10% w/w) is added to V$^{3.5+}$ solution and mixed by mechanical stirring an(d after the dissolution reaction is completed the solution is filtered. The vanadium oxidation state of the solution obtained is typically close to 100% V$^{4+}$. The supersaturated (e.g.4–10M) V(IV) electrolyte solution is then placed into anolyte reservoir 907 and negative compartment 902 and catholyte reservoir 908 and positive compartment 904. Thin air sealing layers 903a, 930b, 930c and 930d of paraffin oil are placed in negative and positive compartments 902 and 904 and into anolyte reservoir 907 and catholyte reservoir 908 to substantially seal anolyte 902a and catholyte 904a from air. Anolyte 902a is pumped through negative compartment 902 and anolyte reservoir 907 via anolyte supply and return lines 909 and 910 by anolyte pumps 911 and 911a, and at the same time catholyte 904a is pumped through positive compartment 904 and catholyte reservoir 908 via catholyte supply and return lines 912 and 913 by catholyte pumps 914 and 914a. Redox battery 901 is charged by providing electrical energy from power source 915 to positive and negative electrodes 903 and 905 by closing switch 916 and opening switch 917 whereby electricity flows in negative and positive electrodes 903 and 905 from power supply 915 to produce a supersaturated concentration of divalent vanadium ions in anolyte 902a and a supersaturated concentration of pentavalent vanadium ions in catholyte 904a. Electricity is derived from redox battery 911 by opening switch 916, closing switch 917 and withdrawing electrical energy via load 918 which is in electrical communication with negative and positive electrodes 903 and 905.

Redox battery 901 is recharged by opening switch 917, closing switch 916 and providing electrical energy from power source 915 to derive a supersaturated solution of divalent ions in anolyte 902a and a supersaturated solution of pentavalent ions in catholyte 904a. Additional stabilising agent may be added to anolyte 902a and catholyte 904a prior to, during or after the recharging process, if desired or if necessary. The anolyte 902a and catholyte 904a may be rebalanced 904a prior to, during or after the recharging process, to take into account any cross-contamination between anolyte 902a and catholyte 904a.

Figure 26:
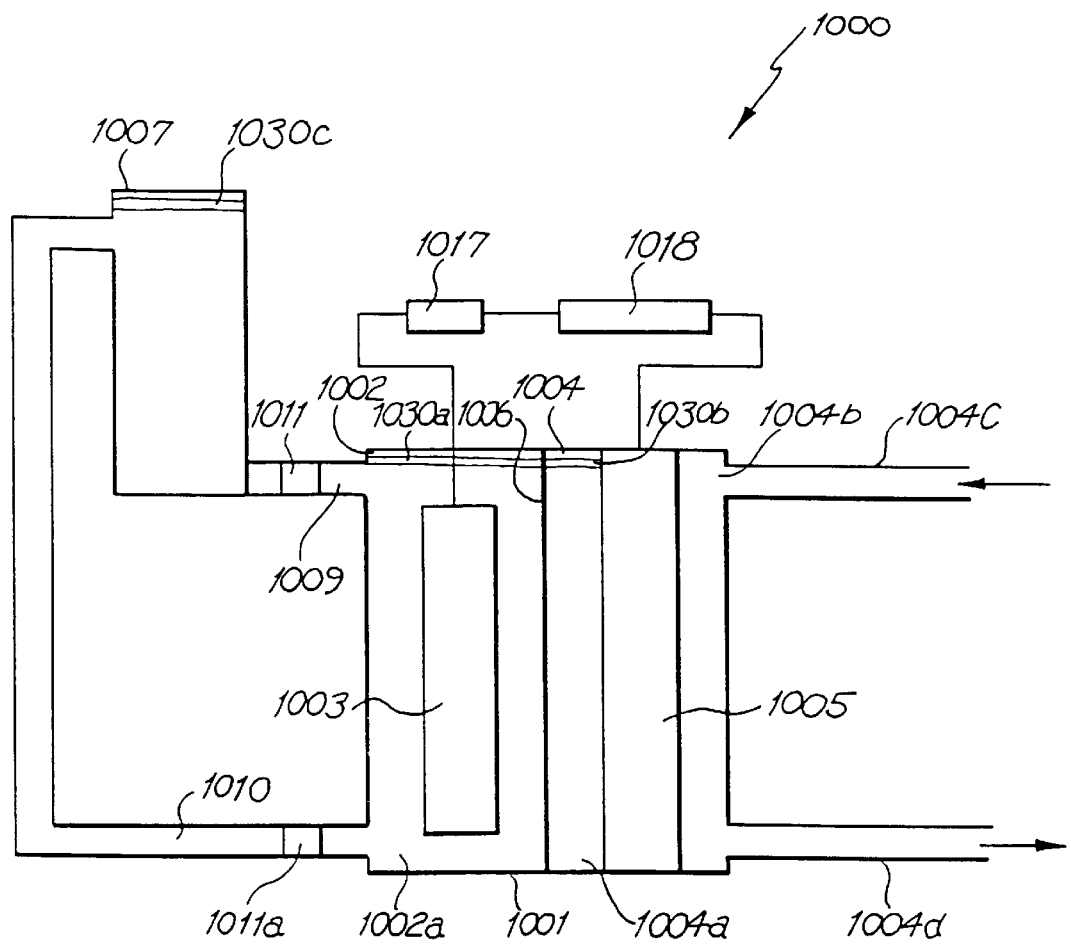
FIG. 26 depicts an all-vanadium redox battery fuel cell system.

FIG. 26 schematically depicts an all-vanadium redox battery/fuel cell system 1000. System 1000 includes an all-vanadium redox battery/fuel cell 1001 having a negative compartment 1002 which includes includes an anolyte 1002a therein in electrical contact with a negative electrode 1003 and a positive compartment 1004 which includes a catholyte 1004a therein in electrical contact with a positive oxygen/air electrode 1005. An ionically conducting separator 1006 is disposed between negative and positive compartments 1002 and 1004 and is in contact with anolyte 1002a and catholyte 1004a to provide ionic communication therebetween. Anolyte 1002a and catholyte 1004a are typically prepared by a method in which a solution of a vanadium compound such as $V_2O_5$ powder is electrolytically reduced in an aqueous solution of concentrated sulphuric acid (1–10M) to a 100% V$^{3+}$ oxidation state (the solution may contain stabilising agent). $V_2O_5$ powder and an effective stabilising amount of a stabilising agent (typically 0.5–10% w/w) is then added to the V$^{3+}$ solution and is induced to dissolve in the V$^{3+}$ solution by the V$^{3+}$ ions which act as a leaching agent for the $V_2O_5$. This solution is then placed in an electrolysis cell and reduced to V$^{3.5+}$. Additional $V_2O_5$ powder (in an amount to produce a final supersaturated solution) and an effective stabilising amount of a stabilising agent (typically 0.5–10% w/w) is added to V$^{3.5+}$ solution and mixed by mechanical stirring and after the dissolution reaction is completed the solution is filtered. The vanadium oxidation state of the solution obtained is typically close to 100% V$^{4+}$. The supersaturated (e.g. 4–10M) Part of the V(IV) electrolyte solution is then reduced to V(II) in a separate anolyte charging cell (not shown) and placed into anolyte reservoir 1007 and negative compartment 1002. Part of the V(IV) electrolyte solution may be optionally oxidised to V(V) in a separate catholyte charging cell (not shown) and placed in positive compartment 1004. Thin air sealing layers 1030a, 1030b, and 1030c of paraffin oil are placed in negative an(d positive compartments 1002 and 1004 and into anolyte reservoir 1007 to substantially seal anolyte 1002a and catholyte 1004a from air. Anolyte 1002a is pumped through negative compartment 1002 and anolyte reservoir 1007 via anolyte supply and return lines 1009 and 1010 by anolyte pumps 1011 and 1011a, and at the same time oxygen or an oxygen containing gas such as air, is passed through compartment 1004b via inlet line 1004c and water exits compartment 1004b via exit line 1004d. Catholyte 1004a is charged by passing oxygen or an oxygen containing gas over oxygen/air electrode 1005 (e.g. a porous carbon oxygen electrode) to oxidise vanadium (IV) to vanadium(V) in catholyte 1004a. Anolyte 1002a may be charged in a separate charging cell (as may catholyte 1004a when all of anolyte 1002a is discharged to rebalance system 1000). Electricity is derived from redox battery 1001 by closing switch 1017 and withdrawing electrical energy via load 1018 which is in electrical communication with negative and positive electrodes 1003 an(d 1005. Since catholyte 1004a is instantaneously regenerated by oxygen via oxygen/air electrode 1005, a catholyte reservoir is not required, thus permitting, for a given size battery, twice the volume of the anolyte to be carried on a vehicle such as a car and thereby doubling the range before refuelling. System 1000 has a theoretical energy density of 270.7 Wh/kg.

Additional stabilising agent may be added to anolyte 1002a and catholyte 1004a prior to, during or after the recharging process, if desired or if necessary. The anolyte 1002a and catholyte 1004a may be rebalanced 1004a prior to, during or after the recharging process, to take into account any cross-contamination between anolyte 1002a and catholyte 1004a.

EXAMPLES

Example 1

A 5.5M V(V) solution was prepared by electrolytically oxidising 5.5M $VOSO_4$ in 3M $H_2SO_4$. This solution was stable for more than 2 weeks at room temperature followed by 8 weeks at 50° C. When the solution was initially prepared it was very thick and viscous. This solution became less viscous however on standing. After about 2 weeks at 50° C., its viscosity was almost as low as that of a 2M V(V) solution. A sample stored at room temperature however, took more than 4 weeks to reach a similar low viscosity.

Example 2

$SO_2$ may bubbled through a solution of 3 moles per liter $V_2O_5$ in 9M sulphuric acid produced 6M V(IV).

Substantially all the $V_2O_5$ powder dissolved and was reduced by the $SO_2$ to form V(IV) ions in solution initially. By containing the $SO_2$ bubbling the V(IV) ions were further reduced. $SO_2$ bubbling was continued until the potential of the solution reached that of a 50:50 mixture of V(III) and V(IV) (approx. 0.3 V vs S.C.E. for 2M vanadium in 2M $H_2SO_4$), which is a suitable HED electrolyte solution for use in a practical all-vanadium battery.

Example 3

An electrolyte solution consisting of 50:50 ratio of 6M V(III) and V(IV) in 9M $H_2SO_4$ may be prepared by electrolyzing a slurry of 3M of $V_2O_5$ powder in 1 liter 9M $H_2SO_4$ in a cell as depicted in FIG. 1.

The process is generally carried out with a separator between the anode and cathode. Since a separator is used, the electrolyte solution in contact with the cathode is usually continuously stirred. Cell Voltage ≅2.5 Volts. Substantially all the $V_2O_5$ powder dissolves and is reduced at the cathode to form V(III)/V(IV) ions in solution. The cell temperature was 40° C.

Example 4

As for Example 2. except that $SO_2$ was bubbled through the electrolyte solution to assist in reduction of $V_2O_5$ as well as to keep powder in suspension.

Example 5

As for Example 3, except that $SO_2$ was bubbled through the electrolyte solution to assist in reduction of $V_2O_5$ as well as to keel) powder in suspension.

Example 6

A 6M solution of a V(III)/V(IV) mixture can be prepared by adding 3 moles per liter $V_2O_5$ to 9M $H_2SO_4$ in a cell as depicted in FIG. 1 at 40° C. The polarity of the cell is then reversed and the V(III)/V(IV) mixture is oxidised to produce a 6M V(V) solution which was stable at room temperature for 3 weeks. The temperature was then increased to 50° C. and no precipitate was formed even after 8 weeks.

Example 7

A 5M solution of V(II)/V(IV) can be prepared by adding 2.5 moles per liter $V_2O_5$ to 6M $H_2SO_4$ and electrolytically dissolving in a cell as depicted in FIG. 1 at 40° C. The polarity of the cell is then reversed and the vanadium is oxidised to produce a 5M V(V) solution which is stable at a temperature of 50° C. for over 8 weeks.

Example 8

The electrolyte solution was prepared by a method in which the $V_2O_5$ electrolysis process was separated into two different steps. The solution electrolysis step involved the electrolytic reduction of a solution of vanadium ions to a 100% $V^{3+}$ oxidation state. $V_2O_5$ is induced to dissolve in the $V^{3+}$ solution by the $V^{3+}$ ions which acts as a leaching agent for the $V_2O_5$.

A 5.1M vanadium solution was prepared by taking 200 ml of 1.87M $V^{3+}$ solution in about 3M sulphuric acid and adding 35 g of $V_2O_5$ powder. The powder dissolved after about 10 minutes and the resulting solution was 3.3M V(IV) in 5.35M sulphate. This solution was then placed in an electrolysis cell and reduced to $V^{3.5+}$. A 160 ml portion of the $V^{3.5+}$ solution and 48 g of $V_2O_5$ powder was mixed by mechanical stirring. The dissolution reaction again proceeded quickly (within about mill) and after reaction the mixture was taken and filtered. The filtered solution was titrated with 0.2M $KMnO_4$ and the resulting concentration of vanadium obtained was 5.1M. The oxidation state of the solution obtained was close to 100% $V^{4+}$ with a sulphate concentration of 5.35M. The 5.1M V(IV) electrolyte solution was then placed into both the positive and negative compartments of a small redox battery with an ionically conducting separator therebetween and charged up to the $V^{2+}$ and V(V) states in the positive and negative half cells respectively using a current of approximately 10 mA/cm². The battery was discharged at various current densities and the resultant cell voltage vs time curves as shown in FIG. 11.

Example 9

A 7.1M vanadium solution was prepared by taking 400 ml of 1.87M $V^{3+}$ solution in about 3M sulphuric acid and adding 68 g of $V_2O_5$ powder plus 44 ml of 18M $H_2SO_4$. The powder was stirred until fully dissolved and the final solution was 3.4M V(IV). From this solution a volume of 350 ml was placed in the negative compartment of an electrolysis cell and reduced to $V^{3+}$. To this solution 120 g of $V_2O_5$ powder was added to produce a final V(IV) solution. The concentration of the final solution was determined as 7.1M $V^{4+}$. This solution was stable at 40° C. for 3 weeks.

Several methods for preparing vanadium electrolyte solutions are described in the present application. These methods can be used directly to prepare the supersaturated solutions of $V^{3+}$/V(IV) ions. Alternatively, a 2M vanadium solution can be prepared by any of these methods. The supersaturated solution can then be prepared by removing the appropriate amount of water by evaporation, pervaporation or by boiling either at atmospheric pressure or under vacuum until the desired vanadium concentration is reached. Such a process would allow stable supersaturated solutions to be prepared for direct application in the vanadium redox cell.

Further concentrations of the vanadium electrolyte solution can also be undertaken, however either by addition or excess $V_2O_5$ power during electrolytic or chemical reduction, or by further evaporation or boiling so as to produce a $V^{3+}$/V(IV) vanadium electrolyte solution concentrate in the form of a slurry or gel. Such a slurry or colloidal concentrate would allow the volume and weight reductions to be achieved, thus allowing transport costs to be dramatically reduced. Before use in the vanadium battery, the electrolyte solution concentrate can readily be reconstituted simply by adding water until the desired concentration is obtained.

Preparation of the electrolyte solution concentrate takes place at elevated temperatures (above 40° C.) at which the V(II), V(III) and/or V(IV) vanadium ions are in solution. Cooling to room temperature will lead to the formation of a colloidal suspension or vanadium sulphate slurry in the supporting electrolyte solution. Typically, the vanadium content would be in the range 5–20 moles per liter of slurry. The electrolyte solution concentration could be readily reconstituted before use in the vanadium redox battery simply by adding water or dilute acid with or without slight heating to aid redissolution.

A 15M vanadium concentrate can be prepared by slowly adding $V_2O_5$ powder to 15M $H_2SO_4$ in the negative compartment of an electrolysis cell at 60° C. until all of the $V_2O_5$ has been dissolved and reduced to a 50:50 mixture of $V^{3+}$ and V(IV) in $H_2SO_4$. On cooling to room temperature, the concentrate sets to form a colloidal paste but on reheating to 50° C. and adding water or dilute acid, a 5M solution can be prepared for the vanadium redox cell, and adding water or dilute acid, a 5M solution can be prepared for the vanadium redox cell.

Example 10

A 4M $V^{3.5+}$ solution was employed in an all vanadium redox cell using electrodes of syri carbon felt bonded onto a conducting plastic substrate and New Selemion (Type 3) membrane. The cell was charged and discharged several times at a current density of 30 mA/cm² at an ambient temperature of 20 to 30° C. without any precipitation in the positive or negative electrolyte solutions. The cell was then left at 50% state-of-charge for 3 days, during which time the solution temperature dropped below 20° C. overnight. When the pumps were switched on again, a solution blockage was noted in the negative ½ cell. The cell polarity was then reversed and the cell recharged at 20 mA/cm² with the pumps off. After a short period, the pumps were switched back on and no blockage was observed on the negative side. The cell was fully charged and further charge-discharge cycling continued for several weeks with no precipitation problems.

Example 11

Studies show that the rate of the thermal precipitation of V(V) to $V_2O_5$ increases with increasing temperature but decreases with increasing acid concentration in accordance with the following equilibrium:

$$\frac{1}{2}V_2O_{5(v)} + H'_{(aq)} = VO'_{2(aq)} + \frac{1}{2}H_2O_{(V)}$$

The equilibrium constant K is given by:

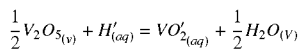

where log K=0.66+0.06 at 25° C. [10].

In an effort to increase the energy density of the vanadium redox flow cell, the thermal precipitation reaction of V(V) ions in $H_2SO_5$ has been investigated in greater detail in order to establish the optimum acid concentration, temperature range and precipitation kinetics.

While V(V) solutions of concentrations between 1 and 2M were found to exhibit fairly rapid precipitation rates at temperatures above 40° C., surprising results were in fact obtained with more concentrated solutions This example describes the preparation of V(V) solutions of over 5M which show no signs of thermal precipitation even after several months at temperatures as high as 50° C.

Due to the very low solubility of $V_2O_5$ in $HSO_4$ V(V) solutions of above 0.1M must be prepared indirectly by oxidation from the more soluble lower oxidation states. In the present study, the V(V) solutions were thus prepared by oxidising $V_2O_3$ or $VOSO_4$. The $VOSO_4$ solutions or $V_2O_3$ were placed in the positive side of a two-compartment electrolysis cell which employed $H_2SO_4$ of the same concentration as the catholyte. Two lead electrodes were employed and the ½-cells were separated by an ion exchange membrane (Selemion AMV. Asahi Glass Co. Japan). Nitrogen gas was bubbled through the anolyte to maintain good mass transfer during the electrolysis which was carried out at a current density of 10–20 mA/cm². The oxidation was continued until the blue V(IV) solution was converted to the deep yellow to yellow-brown colour characteristic of V(V) in $H_2SO_4$.

Samples of each of the V(V) solutions prepared were stored at both room temperature and at 40–50° C. and their appearance monitored regularly to detect the appearance of any precipitate. Where precipitation was observed, samples were removed periodically, filtered and titrated with $KMnO_4$ to determine the chalice in the vanadium concentration.

A number of V(V) solutions of different vanadium concentration were prepared by oxidation of $VOSO_4$ solutions in sulphuric acid and their compositions are given in Table 1.

To investigate their thermal stability at elevated temperatures, sealed samples of each solution were placed in a water bath at 40° C. and inspected daily so as to observe their appearance and any signs of precipitation. The results are presented in Table 2.

As expected, the solution of 1.5M V(V), showed no precipitation during the 30 day test while increasing the V(V) concentration LIP to 2.0M resulted in an increased rate of thermal precipitation. Thus a 2M V(V) solution in 3M $H_2SO_4$ showed the first signs of precipitation after only two clays at 40° C. Increasing the acid concentration to 4M however, increased the stability of the solution so that it took 7 days before any precipitate was observed. This is consistent with the equilibrium reaction given by:

$$VO'_{2(aq)} + \frac{1}{2}H_2O_{(V)} = \frac{1}{2}V_2O_{5(s)} + H'_{(aq)}$$

which shows that increasing the hydrogen ion concentration shifts the reaction to the left, thus increasing the stability of the $VO_2^+$ ion. After 30 days at 40° C. however, all of the solution samples 1–4 showed very heavy precipitation.

A very surprising result was however obtained when the V(V) concentration was increased to 3M and above. Rather than increasing the rate of thermal precipitation, these solutions showed absolutely no sign of precipitation over the 30 day test period.

What was even more surprising however, was the fact that viscosity of the concentrated V(V) solutions decreased dramatically with time. When initially prepared, the 5.4M V(V) solution for example, was extremely viscous and very difficult to pour. After 30 days at the elevated temperature however, the viscosity had decreased to a similar level as that of the more dilute 2M V(V) solution.

To further study this unexpected phenomenon samples of the V(V) solutions were also exposed to the even higher temperature of 50° C. Again, the 2M V(V) solution is 3M $H_2SO_4$ precipitated after less than 2 days, however the 3M and above V(V) solutions showed no signs of precipitation even after 2 months at 50° C. The temperature of the 5.4M V(V) solution was further increased to 60° C. and again no precipitate was observed. Although this behaviour cannot be explained at this time, it may be possible that a different V(V) species forms at concentrations of 3M and above, which is not subject to the thermal precipitation reaction of $VO_2^+$.

TABLE 1

Composition of the V(V) solutions prepared.

| Solution No. | [V(V)] (moles/L) | [$H_2SO_4$] (moles/L) | [$SO_4$] (moles/L) |
|---|---|---|---|
| 1 | 1.5 | 3.6 | 4.3 |
| 2 | 1.8 | 3.6 | 4.5 |
| 3 | 2.0 | 3.0 | 4.0 |
| 4 | 2.0 | 4.0 | 5.0 |
| 5 | 3.1 | 4.5 | 6.0 |
| 6 | 4.4 | 5.8 | 7.0 |
| 7 | 5.4 | 4.3 | 7 0 |

TABLE 2

Appearance of the V(V) solutions stored for 30 days at 4° C.

| Solution No. | [V(V)] (moles/L) | Time for initial evidence of precipitation (days) | Appearance of solution after 30 days |
|---|---|---|---|
| 1 | 1.5 | no ppt | no ppt |
| 2 | 1.8 | 12 days | thick ppt |
| 3 | 2.0 | 2 days | thick ppt |

TABLE 2-continued

Appearance of the V(V) solutions stored for 30 days at 4° C.

| Solution No. | [V(V)] (moles/L) | Time for initial evidence of precipitation (days) | Appearance of solution after 30 days |
|---|---|---|---|
| 4 | 2.0 | 7 days | thick ppt |
| 5 | 3.1 | no ppt | no ppt |
| 6 | 4.4 | no ppt | no pp5 |
| 7 | 5.4 | no pp5 | no ppt |

The above results would suggest that a high $H_2SO_4$ concentration should be employed to stabilize the V(V) solution against thermal precipitation at temperatures above 40° C. in the vanadium redox battery. Unfortunately however, further experiments revealed that the solubilities of the V(II), V(III) and V(IV) ions in fact decrease with increasing acid concentration as illustrated in FIGS. 1 to 3.

In order to avoid precipitation of any of the four vanadium species during charge/discharge cycling of the vanadium battery employing supersaturated vanadium electrolyte solutions above 2 moles therefore, higher operating temperatures (above 20° C.) combined with medium to high acid concentrations must be chosen. Fortunately, the rate of precipitation of each vanadium ion is relatively slow, so it is possible to operate with supersaturated solutions which should not precipitate in the cell if the battery is regularly charged and discharged.

The rate of precipitation can be further reduced within the operating temperature range by employing a range of stabilizing agents which are described in the other examples of this application.

Example 12

The effect of addition of glycerol, another known strong stabilising agent, was compared to the effect of addition of ammonium oxalate. This stabilising agent was chosen for this study and used very small % (by volume) of 98% glycerine. A 2M $V^V$ electrolyte solution was mixed with 1 to 20% by volume of glycerol and the mixtures were allowed to A stand at room temperature. After 10 days of performing the test, that all of the yellow $V^V$ solutions had changed to blue solutions. Thus even a very small quantity of this stabilising agent reduced the $V^V$ solution to the $V^{IV}$ oxidation state. The rate of reduction increased with the increase of the amount of glycerine solution added.

Example 13

$SO_2$ may bubbled through a solution of 0.1M $V_2O_5$ in 2M sulphuric acid produced V(IV), but due to the low solubility of $V_2O_5$, only very dilute solutions can be prepared in this manner. Such dilute solutions are not suitable for use in a practical all-vanadium battery.

Concentrated solutions of V(IV), V(III) and/or V(II) ions can be prepared as follows. Two moles of $V_2O_5$ powder were suspended in 1 liter of 2M $H_2SO_4$ and 1% glycerine +2% ammonium oxalate and $SO_2$ gas was bubbled through suspension, Substantially all the the $V_2O_5$ powder dissolved and was reduced by the $SO_2$ to form V(IV) ions in solution initially. By continuing the $SO_2$ bubbling the V(IV) ions were further reduced. $SO_2$ bubbling was continued until the potential of the solution reached that of a 50:50 mixture of V(III) and V(IV) (approx. 0.3 V vs S.C.E. for 2M vanadium in 2M $H_2SO_4$), which is a suitable electrolyte solution containing stabilising agent for use in a practical all-vanadium battery.

Example 14

An electrolyte solution consisting of 50:50 ratio of V(III) and V(IV) in 2M $H_2SO_4$ and 2% glycerine may be prepared by electrolyzing a slurry of 1M of $V_2O_5$ powder in 1 liter 4M $H_2SO_4$ in a cell as depicted in FIG. 14.

The process is generally carried out with a separator between the anode and cathode. Since a separator is used, the electrolyte solution in contact with the cathode is usually continuously stirred. Cell Voltage ≅2.5 Volts. Substantially all the $V_2O_5$ powder dissolves and is reduced at the cathode to form V(III)/V(IV) ions in solution.

Example 15

As for Example 13, except that $SO_2$ was bubbled through the electrolyte solution to assist in reduction of $V_2O_5$ as well as to keel) powder in suspension.

Example 16

As for Example 14, except that $SO_2$ was bubbled through the electrolyte solution to assist in reduction of $V_2O_5$ as well as to keel) powder in suspension.

Example 17

A 6M solution of a V(III)/V(IV) mixture can be prepared by adding 3 moles per liter $V_2O_5$ to 6M $H_2SO_4$ containing 1% fructose and electrolysing in a cell as depicted in FIG. 14. The polarity of the cell is then reversed and the V(II)/V(IV) mixture is oxidised to produce a 6M V(V) solution which is stable at room temperature for 3 weeks.

Example 18

A 5M solution of V(III)/V(IV) can be prepared by adding 2.5 moles per liter $V_2O_5$ to 6M $H_2SO_4$ containing 1% sorbitol and electrolytically dissolving in a cell as depicted in FIG. 14. The polarity of the cell is then reversed and the vanadium is oxidised to produce a 5M V(V) solution which is stable at room temperature for over 3 weeks.

Example 19

The electrolyte solution was prepared by a method in which the $V_2O_5$ electrolysis process was separated into two different steps. The solution electrolysis step involved the electrolytic reduction of a solution of vanadium ions to a 100% $V^{3+}$ oxidation state. $V_2O_5$ is induced to dissolve in the $V_{3+}$ solution by the $V_{3+}$ ions which acts as a leaching agent for the $V_2O_5$.

Figure 24:
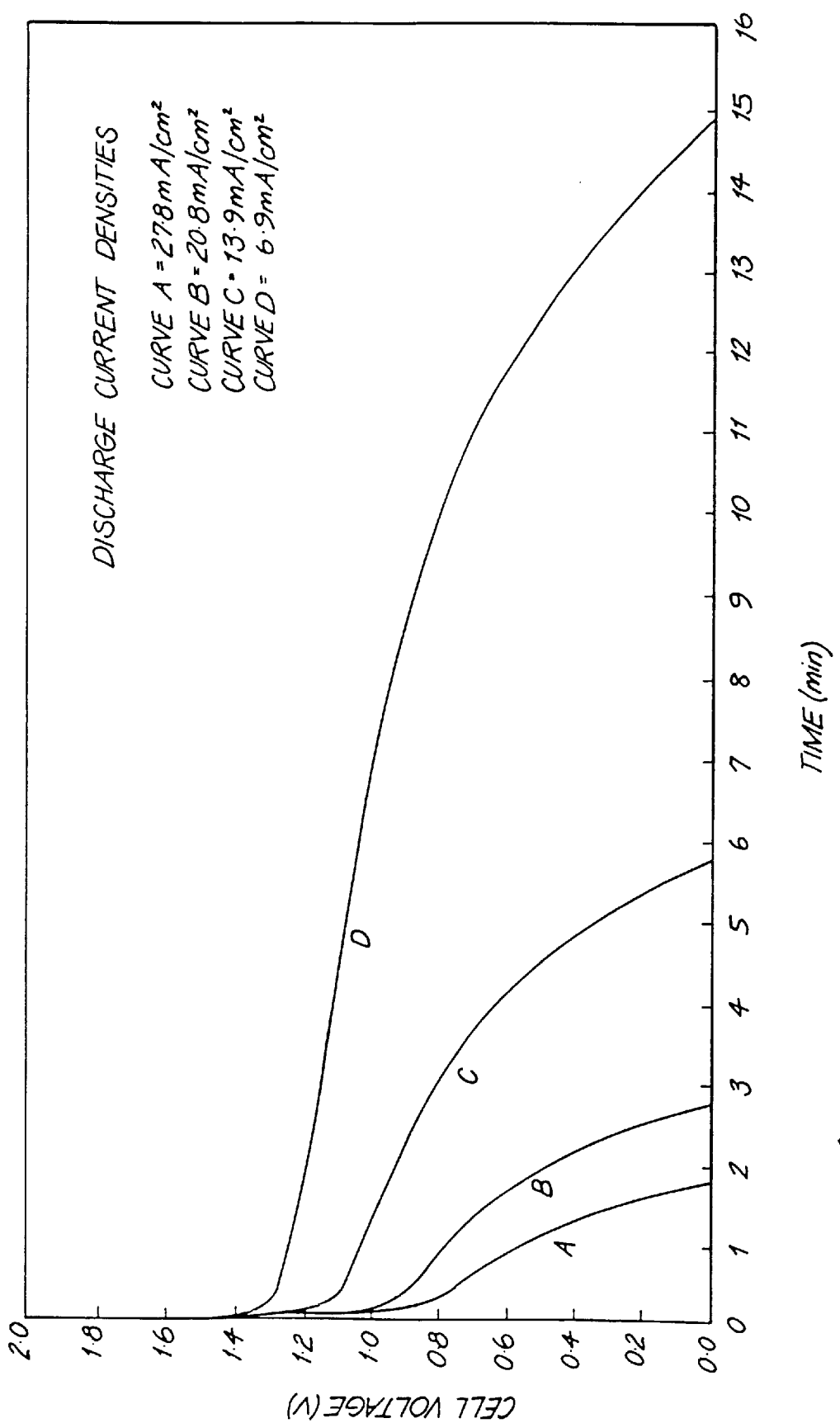
FIG. 24 are discharge current density curves as a function of time for an all-vanadium redox battery.

A 5.1M vanadium solution was prepared by taking 200 ml of 1.87M $V^{3+}$ solution in about 3M sulphuric acid and adding 35 g of $V_2O_5$ powder plus 0.6 g of D-fructose. The powder dissolved after about 10 minutes and the resulting solution was 3.3M V(IV) in 5.35M sulphate. This solution was then placed in an electrolysis cell and reduced to $V^{3.5+}$. A 160 ml portion of the $V^{3.5+}$ solution, 48 g of $V_2O_5$ powder and 0.1 g of D-fructose was mixed by mechanical stirring. The dissolution reaction again proceeded quickly (within about 10 min) and after reaction the mixture was taken and filtered. The filtered solution was titrated with 0.2M $KMnO_4$ and the resulting concentration of vanadium obtained was 5.1M. The oxidation state of the solution obtained was close to 100% $V^{4+}$ with a sulphate concentration of 5.35M. The 5.1M V(IV) electrolyte solution was then placed into both the positive and negative compartments of a small redox battery with an ionically conducting separator therebetween and charged up to the $V^{2+}$ and V(V) states in the positive and negative half cells respectively using a current of approximately 10 $mA/cm^2$. The battery was discharged at various current densities and the resultant cell voltage vs time curves as shown in FIG. 24.

Example 20

A 7.1M vanadium solution was prepared by taking 400 ml of 1.87M $V^{3+}$ solution in about 3M sulphuric acid and adding 68 g of $V_2O_5$ powder plus 44 ml of 18M $H_2SO_4$. To this was added 6.9 g of D-fructose which was 1% w/w. The powder was stirred until fully dissolved and the final solution was 3.4M V(IV). From this solution a volume of 350 ml was placed in the negative compartment of an electrolysis cell and reduced to $V^{3+}$. To this solution 120 g of $V_2O_5$ powder was added and 1.2 g of D-fructose was also added to produce a final V(II) solution containing 1% w/w D-fructose. The concentration of the final solution was determined as 7.1M $V^{4+}$. This solution was stable at room temperature for 6 days before a slight precipitate started to appear.

Example 21

The vanadium redox flow battery typically employs 1–12M vanadium electrolyte solutions consisting of V(II)/(III) ions in the negative half-cell and V(IV)/V(V) ions in the positive half-cell. The vanadium redox cell electrolyte solution is prepared by electrolytic or chemical reduction of $V_2O_5$ (or other V(V) solid compound) to produce a 50:50 mixture of $V^{3+}$ and V(IV) ions (referred to as $V^{3.5+}$) in the supporting electrolyte solution. This $V^{3.5+}$ electrolyte solution is then introduced into both ½ cells of the redox cell stack where it is charged to V(II) and V(V) oxidation states in the negative and positive half cells respectively.

Subsequent charge-discharge reactions are:

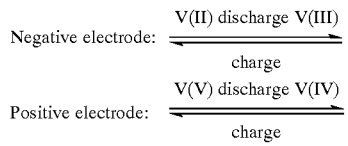

"The energy density of the vanadium redox battery is determined by the concentration of vanadium ions in the electrolyte solutions. The solubility of the V(II), V(III) and V(IV) ions increases with increasing temperature, however, V(V) undergoes thermal precipitation at temperatures above 30° C. Thus a 2M vanadium battery electrolyte solution would be stable for long periods over the temperature range 20–30° C., but either V(II) or V(III) would precipitate in the negative half cell solution at lower temperatures, while V(V) would undergo slow thermal precipitation at higher temperatures. If the battery undergoes continuous charge-discharge cycling, the temperature range of a 2M solution could be increased to 10–40° C. since the ions are being continuously converted from one form to the other and therefore have no time to nucleate.

If the battery would be required to remain in a fully charged condition for long periods of time however, then the concentration would need to he reduced to around 1.8M is the temperature is expected to go outside the range 20–30° C. This would, however, result in a decreased energy density which may be undesirable."

When low levels of a suitable stabilising agent(s) are added to the electrolyte solution during the powder dissolution step, it has been found that stable supersaturated solutions of vanadium ions can be prepared, this dramatically increasing the energy density of the vanadium redox flow battery.

Different stabilising agents have been found to stabilise the vanadium electrolyte solutions to different degrees of supersaturation. For example, 3.6M solutions can be produced in the presence of 1 wt % glycerine plus 2 wt % ammonium sulphate, while a 7M vanadium electrolyte solution has been successfully charged and discharged in a vanadium redox flow cell in the presence of 1 wt % D-fructose.

The different extent of stabilisation is related to the absorption of these additives on the surface of the nuclei, giving rise to electrostatic repulsion which inhibits precipitation by retarding crystal growth. These stabilising agents can either be organic or inorganic. Inorganic additives include ammonium compounds, phosphates and polyphosphates.

For example, a diphosphoric acid has the following structure:

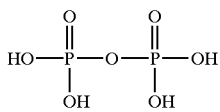

which contains —OH and =O groups which are able to absorb on the surface of the nuclei and inhibit precipitation.

Typical organic compounds contain one or more —OH, =O, —SH or —$NH_2$ groups, or combinations of these groups which can also absorb on the surface of the nuclei and inhibit precipitation. Such inorganic and organic compounds (containing one or more polar groups), when used in stoichiometric quantities act as complexing agents for transition metal cations.

Surprisingly however, it has been discovered that when used in low concentrations in the vanadium redox electrolyte solution, their ability to absorb on the surface of the charged nuclei causes them to act as inhibitors for precipitation, thus allowing stable supersaturated solutions to be prepared.

Other inorganic compounds which have the same properties include:

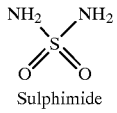 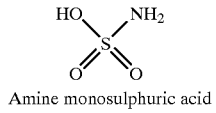

Sulphimide        Amine monosulphuric acid

Sulphimide, $(NH_2SO_2)_3$, imidosulphonamide, $NH(NH_2SO_2)_2$, as well as ammonia derivatives of phosphorous acids, e.g.; $H_2[PO_3NH_2]$, $H[OP—OH—NH]$, OP—NH—$NH_2$, OPN, $O_3P_2OH(NH_2)_3$, and $HNP_2—O_2$ NH $(NH_2)_2$ and thiophosphoric acid derivatives e.g.: $PS(NH_2)_3$.

Several methods for preparing stabilized vanadium electrolyte solutions are described in the present application. These methods can be used directly to prepare the supersaturated solutions of VI/V(IV) ions. Alternatively, a 2M vanadium solution can be prepared by any of these methods in the presence of the stabilising agent. The supersaturated solution can then be prepared by removing the appropriate amount of water by evaporation, pervaporation or by boiling either at atmospheric pressure or under vacuum until the desired vanadium concentration is reached. Such a process would allow stable supersaturated solutions to be prepared for direct application in the vanadium redox cell.

Further concentrations of the vanadium electrolyte solution can also be undertaken, however either by addition or excess $V_2O_5$ power during electrolytic or chemical reduction, or by further evaporation or boiling, so as to produce a $V^{3+}/V(IV)$ vanadium electrolyte solution concentrate in the form of a slurry or gel. Such a slurry or colloidal concentrate would allow huge volume and weight reductions to be achieved, thus allowing transport costs to be dramatically reduced. Before use in the vanadium battery, the electrolyte solution concentrate can readily be reconstituted simply by adding water until the desired concentration is obtained.

Preparation of the electrolyte solution concentration takes place at elevated temperatures (above 40° C.) at which the V(II), V(III) and/or V(IV) vanadium ions are in solution. Cooling to room temperature will lead to the formation of a colloidal suspension or vanadium sulphate slurry in the supporting electrolyte solution. Typically, the vanadium content would be in the range 5–20 moles per liter of slurry. The electrolyte solution concentration could be readily reconstituted before use in the vanadium redox battery simply by adding water or dilute acid with or without slight heating to aid redissolution.

A 15M vanadium concentrate can be prepared by slowly adding $V_2O_5$ powder to 15M $H_2SO_4$ plus 0.1% fructose stabilising agent in the negative compartment of an electrolysis cell at 60° C. until all of the $V_2O_5$ has been dissolved and reduced to a 50:50 mixture of $V^{3+}$ and V(IV) in $H_2SO_4$. On cooling to room temperature, the concentrate sets to form a colloidal paste but on reheating to 50° C. and adding water or dilute acid, a 5M stabilised solution can be prepared for the vanadium redox cell.

Example 22

A large number of compounds were screened as potential stabilising agents for V(V) solutions by adding 0.03 g of each to separate vials containing 25 ml of 2M V(V) solution in 4M $H_2SO_4$. These vials were placed in a water bath at 45° C. for up to 20 days after which time they were removed and left to stand at room temperature for a further 15–23 days. The solutions were then reduced to a lower oxidation state with zinc and titrated with potassium permanganate to determine the final vanadium concentration and the results are shown in the following table:

Studies of $V^{5+}$ 25 ml 2M at 45° C. & 0.03 g Additive

| Vial No. | Additive | 20 days at 45° C. then room temperature for t = ? days |
|---|---|---|
| 101 | Control - No additive | 0.83M |
| 103 | Starch | 1.25 M dark green t = 15 days |
| 105 | Glycerol | 1.6 M dark green, t = 15 days |
| 107 | Sorbitol | 1.08 M dark green, t = 15 days |
| 109 | Myo-Inositol (INSOL) | 1.17 M dark green, t = 15 days |
| 111 | Methyl α-β-Gluco-pyranoside | 1.16 M dark green, t = 15 days |
| 113 | Mannitol | 1.18 M dark green, t = 15 days |
| 115 | Lactose | 1.629 M dark green, t = 16 days |
| 117 | D-Fructose | 1.12 M dark green, t = 16 days |
| 119 | D-Glucose | 0.889 M dark green, t = 16 days |
| 121 | Methyl-α-D-Glucopyranoside | 0.699 M dark green, t = 16 days |
| 123 | D Gluconic Acid (Na) | 1.037 M dark green, t = 16 days |
| 125 | Succinic Acid | 0.847 M (green/yellow) t = 16 days |
| 127 | Malic Acid (Fizz) | 0.984 M dark green, t = 16 days |
| 129 | L-Ascorbic Acid | 1.13 M dark green, t = 16 days |
| 131 | Citric Acid | 1.06 M dark green, t = 16 days |

Studies of $V^{5+}$ 25 ml 2M at 45° C. & 0.03 g Additive

| Vial No. | Additive | 20 days at 45° C. then room temperature for t = ? days |
|---|---|---|
| 133 | Trisodium citrate | 0.932 M dark green, yellow, t = 16 days |
| 135 | Tartaric Acid | 0.9411 M dark green, t = 16 days |
| 137 | Polytetrahydrofuran | 0.996 M dark green, t = 16 days |
| 139 | Furfural | 1.22 M dark green, t = 16 days |
| 141 | Sodium dodecyl sulphate (Fizz) | 0.897 M green/yellow, t = 16 days |
| 143 | Sodium lauryl sulphate | 0.883 M dark green, t = 16 days |
| 145 | Poly 4-Styrene | 0.99 M yellow/green, t = 19 days |
| 147 | Urea | 0.89 M yellow/green, t = 19 days |
| 149 | Thiourea | 1.19 M dark green, t = 19 days |
| 151 | Ethanolamine | 1.095 M dark green, t = 19 days |
| 153 | Glycine | 1.011 M dark green, t = 19 days |
| 155 | Nitrilotriacetic acid | 0.989 M dark green, t = 19 days |
| 157 | Ethylenediaminetetra acetic acid | 0.997 M green/yellow, t = 19 days |
| 159 | Di(2-Ethylhexyl) Phosphate | 0.68 M green/yellow, t = 19 days |
| 161 | Boric oxide | 0.918 M green/yellow, t = 19 days |
| 163 | $H_3PO_4$ | 0.995 M green/yellow, t = 19 days |
| 165 | Ammonium oxalate | 1.014 M green/yellow, t = 21 days |
| 167 | Ammonium sulphate | 1.00 M green/yellow, t = 21 days |
| 169 | Potassium persulphate | 1.03 M yellow/brown, t = 21 days |
| 171 | Glyclyglycin | 0.95 M mid green, t = 21 days |
| 173 | α-N-Benzoyl DL-Alanine | 0.97 M yellow/green, t = 21 days |
| 175 | Phenylalanine | 0.94 M yellow/green, t = 21 days |
| 177 | D-Lysine | 0.896 M yellow/green, t = 21 days |
| 179 | L-Cystine | 0.94 M dark green, t = 21 days |
| 181 | Aspartic Acid | Not liquid - not titratable |
| 183 | Glutomic Acid | 9 days at 45° C. followed by 23 days at room temperature |
| 185 | L-Histidine Mono HCl Mono 14 | 1.18 M mid green |
| 187 | Asparagine | 1.403 M dark green |
| 189 | Iso-isoleucine | 1.210 M mid green-brown |
| 191 | Glutamine | 1.230 M dark green. |

Example 23

Several additional compounds were screened by adding 1 wt. % to a 2M V(V) solution in $M.H_2SO_4$ and placing in a water bath at 44° C. to observe any colour change (indicating reduction of the V(V)) and the appearance of any precipitate. The results are summarised in the following table where:

| | |
|---|---|
| 50A | Briquest 301-50A(nitrilotris(methylene-phosphonic acid) |
| 25K | Briquest 3010-25K(Potassium nitrilotris(methylenephosphonate)-N-oxide) |
| 32S | Briquest 301-325(Sodium nitrilotris(methylenephosphonate)). |
| D1 | Sodium tripolyphosphate |
| C1 | Sodium hexametaphosphate |
| B1 | Sodium acid pyrophosphate |

| | | Appearance after x days at 44° C. | | | | |
|---|---|---|---|---|---|---|
| Additive | wt % | 1 day | 2 days | 3 days | 8 days | 16 days |
| Blank | — | yellow, slight precipitate | yellow, more precipitate | yellow, more precipitate | large amount of precipitate | solid |
| Arrowroot | 1 | dark blue, no precipitate | dark blue, no precipitate | blue/black, no precipitate | blue/black, no precipitate | blue/black, no precipitate |
| Gelatin | 1 | blue/yellow, no precipitate | blue/black, no precipitate | blue/black, no precipitate | blue/black, no precipitate | blue/black, no precipitate |
| 50A | 1 | blue/yellow, no precipitate | dark yellow, no precipitate | dark yellow, no precipitate | dark yellow, very slight precipitate | dark yellow, very slight precipitate |
| 25K | 1 | yellow, slight precipitate | dark yellow, no precipitate | dark yellow, precipitate | dark yellow, very slight precipitate | yellow, more precipitate |
| 32S | 1 | yellow, precipitate | dark yellow, no precipitate | dark yellow, precipitate | dark yellow, very slight precipitate | dark yellow slight precipitate |
| $H_3PO_4$ | 1 | yellow, slight precipitate | yellow, slight precipitate | yellow, more precipitate | yellow, more precipitate | yellow, more precipitate |
| D1 | 1 | yellow, no precipitate | yellow, no precipitate | yellow, no precipitate | yellow, slight precipitate | yellow, slight precipitate |
| C1 | 1 | yellow, no precipitate | yellow, no precipitate | yellow, no precipitate | yellow, very slight precipitate | yellow, slight precipitate |
| B1 | 1 | yellow, no precipitate | yellow, no precipitate | yellow, no precipitate | yellow, very slight precipitate | yellow, slight precipitate |

Example 24

A large number of compounds were screened as stabilising agents for V(II) solutions by adding 1 wt. % to a 2M V(II) solution in 3M $H_2SO_4$ and leaving at ambient temperature for eleven weeks, after which each sample was inspected for the presence of any precipitate. The results are given in the following table which shows that of the compounds tested, D-fructose, D-glucose, thiourea, tartaric acid, ammonium oxalate, ammonium sulphate, potassium persulphate, glycylglycin, 2 N-Benzoyl DL Alanine, phenylalanine, D-lycine, L-cystin, aspartic acid, L-histidine, asparagin, D-L iso-isoleucine and glutamin are effective in inhibiting precipitation of V(II).

2M $V^{2+}$ 25 ml at Room Temperature + 0.003 g

| Vial No. | Additive | Appearance on 2/5/95 |
|---|---|---|
| 200 | Control | Slight precipitate |
| 202 | Starch | Moderate precipitate |
| 204 | Glycerol | Moderate precipitate |
| 206 | Sorbitol | Slight precipitate |
| 208 | Myo Inositol | Moderate precipitate |
| 210 | Mannitol | Significant precipitate |
| 212 | Lactose | Moderate precipitate |
| 214 | D-Fructose | Purple solution, no precipitate * |
| 216 | D-Glucose | Purple solution, no precipitate * |
| 218 | Methyl α D Gluco Pyranoside | Moderate precipitate |
| 220 | D-Gluconic Acid | Moderate precipitate |
| 222 | Succinic Acid | Slight precipitate |
| 224 | Malic Acid | Slight precipitate |
| 226 | Ascorbic Acid | Moderate precipitate |
| 228 | Citric Acid | Moderate precipitate |
| 230 | Tri Sodium Citrate | Moderate precipitate |
| 232 | Tartaric Acid | Purple solution, no precipitate |
| 234 | Polytetrahydrofuran | Moderate precipitate |
| 236 | Furfural | Slight precipitate |
| 238 | Sodium dodecyl sulphate | Many bubbles, moderate precipitate |
| 240 | Sodium lauryl sulphate | Slight precipitate |
| 242 | Poly 4-styrene sulphorate | Slight precipitate |
| 244 | Urea | Moderate precipitate |
| 246 | Thiourea | Black/purple solution, no precipitate * |
| 248 | Ethanolamine | Moderate precipitate |
| 250 | Glycine | Some bubbles, moderate precipitate |
| 252 | Nitrotriacetic Acid | Slight gas, slight precipitate |
| 254 | EDTA | Slight precipitate |
| 256 | D1 (2-Ethylhexyl) $PO_4$ | Gas, slight precipitate |
| 258 | Boric Acid | Slight precipitate |
| 260 | Phosphoric Acid | Slight precipitate |
| 262 | Ammonium oxalate | Purple solution, no precipitate * |
| 264 | Ammonium $SO_4$ | Purple solution, no precipitate * |
| 266 | Potassium Persulphate | Purple solution, no precipitate * |
| 268 | Glycylglycin | Purple solution, no precipitate * |
| 270 | 2 N-Benzoyl DL Alanine | Purple solution, no precipitate * |
| 272 | Phenylalanine | Purple solution, no precipitate * |
| 274 | D-Lycine HCl | Purple solution, no precipitate * |
| 276 | L-Cystin | Purple solution, no precipitate * |
| 278 | Aspartic Acid | Purple solution, no precipitate * |
| 280 | Glutamic Acid | Purple solution, slight precipitate |
| 282 | L-Histidine HCl $H_2O$ | Purple solution, no precipitate * |
| 284 | Asparagin | Purple solution, no precipitate * |
| 286 | D-Liso-isoleucine | Purple solution, no precipitate * |
| 288 | Glutamin | Purple solution, no precipitate * |

What is claimed is:

1. A process of preparing an all-vanadium high energy density ("HED") electrolyte solution concentrate for use in an all-vanadium redox cell or battery in concentratec form or diluted form, the electrolyte solution concentrate comprising vanadium redox ions in a concentration of greater than 3M and an electrolyte, the process comprising:
    a) adding a first vanadium compound to an electrolyte solution in which the first vanadium compound when dissolved in the electrolyte solution produces vanadium redox ions in the electrolyte solution;
    b) dissolving the first vanadium compound in the electrolyte solution;
    c) oxidizing or reducing the redox ions in the electrolyte solution in which the second vanadium compound when dissolved in the electrolyte solution produces vanadium redox ions in the solution;
    d) adding the second vanadium compound to the electrolyte solution in which the second vanadium compound when dissolved in the electrolyte solution produces vanadium redox ions in the electrolyte solution;
    e) dissolving the second vanadium compound in the electrolyte solution;
    wherein the temperature is maintained above 35° C. and wherein at least one of said first vanadium compound or said second vanadium compound is a vanadium compound in which the vanadium ion is in the +5 oxidation state.

2. The process according to claim 1 wherein the temperature is maintained at above 40° C.

3. The process according to claim 1 further comprising repeating steps (c) to (e) to increase the concentration of the vanadium redox ions in the electrolyte solution.

4. The process according to claim 1 wherein in step (b) said dissolving is selected from the group consisting of chemically dissolvingl simply dissolving, electrolytically dissolving and a combination of chemically dissolving and electrolytically dissolving.

5. The process according to claim 1 further comprising adding a stabilising agent to the electrolyte solution during any of steps (a) to (e).

6. The process according to claim 5 wherein the stabilising agent added is an inorganic phosphate or an ammonium compound.

7. The process according to claim 6 wherein the ammonium compound is ammonium sulphate.

8. The process according to claim 1 comprising the further step of maintaining the temperature of the electrolyte solution concentrate at 35° to 99° to reduce its viscosity.

9. The process according to claim 8 wherein the temperature is maintained for a period of 0.1 to 30 days.

10. The process according to claim 1 wherein the first vanadium compound is a reducible vanadium compound and steps (b) and (c) comprise adding a chemical reductant to the electrolyte solution to dissolve and reduce the reducible vanadium compound disposed in, but not wholly dissolved in an electrolyte solution comprising $H_2SO_4$.

11. The process according to claim 10 wherein the reducible vanadium compound comprises a V(V) compound and the chemical reductant comprises S, $SO_2$, $H_2SO_3$, $H_2O_2$, oxalic acid or a V(IV) and/or V(III) and/or V(II) compound.

12. The process according to claim 10 wherein the reducible vanadium compound comprises a V(IV) and/or V(V) compound and the chemical reductant comprises a V(III) and/or V(II) compound.

13. The process according to claim 10 wherein the reducible vanadium compound is either $V_2O_5$ or $NH_4VO_3$, and the chemical reductant comprises a V(III) compound.

14. The process according to claim 10 wherein the reducible vanadium compound is $V_2O_5$ and/or $NH_4VO_3$ and the chemical reductant comprises an aqueous solution of $VOSO_4$ dihydrate and/or hydrated $V_2(SO_4)_3$ and/or $VSO_4 \cdot 7H_2O$; or $VO_2$, and/or $V_2O_3$, and/or $V_2O_4$, and/or $NH_4V(SO_4)_2$.

15. The process according to claim 1 wherein the first vanadium compound is an oxidisable vanadium compound and steps (b) and (c) comprise adding a chemical oxidant to the electrolyte solution to dissolve and oxidise the oxidisable vanadium compound disposed in, but not wholly dissolved in an electrolyte solution comprising $H_2SO_4$.

16. The process according to claim 15 wherein the oxidisable vanadium compound is a solid V(III) and/or V(II) compound and the chemical oxidant comprises a solid V(V) and/or V(IV) compound.

17. The process according to claim 15 wherein the oxidisable vanadium compound is a solid V(IV) and/or solid V(III) and/or V(II) compound and the chemical oxidant comprises a solid V(V) compound.

18. The process according to claim 15 wherein the oxidisable vanadium compound is solid $V_2O_3$ and/or solid $V_2O_4$ and/or solid $VOSO_4$, and the oxidant comprises solid ammonium metavanadate and/or solid $V_2O_5$.

19. The process of claim 15 wherein the oxidisable vanadium compound is solid $V_2O_3$ and the oxidant is solid $V_2O_5$ and/or solid ammonium metavanadate.

20. The process according to claim 1, wherein the electrolyte is $H_2SO_4$.

21. The process according to claim 1 further comprising cooling the electrolyte solution concentrate to room temperature to prepare an all-vanadium electrolyte colloidal suspension or slurry comprising a mixture of trivalent and tetravalent vanadium ions, said suspension being capable of reconstitution by the addition of the required amount of water, with or without heating, to redissolve the vanadium suspension/slurry to form an all-vanadium HED electrolyte solution of the required concentration for use in the all-vanadium redox cell or battery.

22. The process according to claim 21 wherein the vanadium concentration in the concentrate is 5–20M.

23. The process according to claim 21 wherein the electrolyte solution has a 50:50 ratio of trivalent and tetravalent vanadium ions.

24. The process according to claim 1, wherein the electrolyte solution concentrate is an aqueous electrolyte solution concentrate and comprising the further step of concentrating the solution by boiling or pervaporation or applying vacuum and/or heat to remove the desired amount of water so as to produce a vanadium electrolyte solution of concentration above 3M.

25. A process of preparing an all-vanadium electrolyte solution of the required concentration for use in the all-vanadium battery, comprising the steps of:

(a) preparing an electrolyte solution concentrate according to claim 1.

(b) adding water or dilute acid.

26. The process according to claim 25, further comprising the step of maintaining the temperature of the solution at 35° C. to 99° C. to reduce precipitation of the vanadium redox ions from the electrolyte solution to a rate whereby the all-vanadium electrolyte solution is acceptable for use in an all-vanadium redox battery.

27. The process according to claim 26, wherein the temperature is maintained for a period of 0.1 to 30 days.

* * * * *